US011844465B2

(12) United States Patent
Sterngold et al.

(10) Patent No.: US 11,844,465 B2
(45) Date of Patent: Dec. 19, 2023

(54) SINGLE-USE FOOD PREPARATION CONTAINER ASSEMBLIES, SYSTEMS AND METHODS

(71) Applicant: BLIX LTD., Valletta (MT)

(72) Inventors: Ariel Sterngold, Jerusalem (IL); Marcel Hendrikus Simon Weijers, Assen (NL); Dorian Capuano, Mishmar Ayalon (IL); Dagan Recanati, Givat Brenner (IL); Refael Kshntovsky, Gedera (IL); Andreas Jacobus Louis Nijsen, Enschede (NL); Johannes Gabriel Kuster, Enschede (NL); Joris Bronkhorst, Enchede (NL); Hans Constant Dikhoff, Eindhoven (NL); Sybren Yme Leijenaar, Sint Nicolaasga (NL); Krijn Maltha, Dokkum (NL)

(73) Assignee: BLIX LTD., Valletta (MT)

( * ) Notice: Subject to any disclaimer, the term of this patent is extended or adjusted under 35 U.S.C. 154(b) by 453 days.

(21) Appl. No.: 16/956,792

(22) PCT Filed: Jan. 15, 2019

(86) PCT No.: PCT/IL2019/050056
§ 371 (c)(1),
(2) Date: Jun. 22, 2020

(87) PCT Pub. No.: WO2019/142182
PCT Pub. Date: Jul. 25, 2019

(65) Prior Publication Data
US 2021/0078776 A1 Mar. 18, 2021

(30) Foreign Application Priority Data
Jan. 16, 2018 (WO) .................. PCT/IL2018/050057

(51) Int. Cl.
*A47J 43/00* (2006.01)
*A47J 43/046* (2006.01)
(Continued)

(52) U.S. Cl.
CPC ........ *A47J 43/046* (2013.01); *A47G 19/2205* (2013.01); *A47J 43/0716* (2013.01);
(Continued)

(58) Field of Classification Search
CPC ............................ A47J 43/0716; A47J 43/046
See application file for complete search history.

(56) References Cited

U.S. PATENT DOCUMENTS 3,704,864 A 12/1972 Lee
3,785,579 A 1/1974 Voglesonger
(Continued)

FOREIGN PATENT DOCUMENTS

CN 1832698 A 9/2006
CN 101184420 A 5/2008
(Continued)

OTHER PUBLICATIONS

An Office Action summarized English translation and Search Report dated May 6, 2022, which issued during the prosecution of Chinese Patent Application No. 201980015733.3.
(Continued)

*Primary Examiner* — Anshu Bhatia
(74) *Attorney, Agent, or Firm* — Sughrue Mion, PLLC

(57) ABSTRACT

A product preparation system and method for processing a container including a cup body and a cup closure assembly configured for removable operative engagement with the cup body, the cup closure assembly including a hinged spout cover and a user-removable multi-function restricting portion integrally formed as part of the cup closure assembly and detachable therefrom, the user-removable multi-func-
(Continued)

tion restricting portion being operative, when integrally attached to the cup closure assembly to prevent normal user opening of the hinged spout cover.

6 Claims, 174 Drawing Sheets

(51) Int. Cl.

| | |
|---|---|
| ***B65D 47/08*** | (2006.01) |
| ***B65D 55/02*** | (2006.01) |
| ***A47G 19/22*** | (2006.01) |
| ***B65D 51/16*** | (2006.01) |
| ***A47J 43/07*** | (2006.01) |

(52) U.S. Cl.
CPC ..... *B65D 47/0847* (2013.01); *B65D 47/0852* (2013.01); *B65D 51/16* (2013.01); *B65D 55/026* (2013.01); *B65D 2401/05* (2020.05)

(56) References Cited

U.S. PATENT DOCUMENTS

| | | | |
|---|---|---|---|
| 4,355,446 | A | 10/1982 | Shimajiri et al. |
| 4,446,979 | A | 5/1984 | Gach et al. |
| D313,975 | S | 1/1991 | Horie |
| D315,335 | S | 3/1991 | Frischer |
| D334,564 | S | 4/1993 | Basara et al. |
| D349,888 | S | 8/1994 | Yamamoto et al. |
| D352,910 | S | 11/1994 | Yamamoto et al. |
| D352,911 | S | 11/1994 | Yamamoto et al. |
| 5,432,306 | A | 7/1995 | Pfordresher |
| 5,823,672 | A | 10/1998 | Barker |
| 5,960,709 | A | 10/1999 | Yip |
| 6,179,139 | B1 | 1/2001 | Heilman |
| 6,450,363 | B1 | 9/2002 | Lin |
| 6,641,298 | B2 | 11/2003 | Safont et al. |
| D501,759 | S | 2/2005 | Sands |
| 7,422,362 | B2 | 9/2008 | Sands |
| 7,600,706 | B2 | 10/2009 | Huang |
| 8,038,338 | B2 | 10/2011 | Maleiro Vilarino et al. |
| 8,113,379 | B2 | 2/2012 | Cai et al. |
| 8,794,822 | B2 | 8/2014 | Serra |
| 9,333,659 | B2 | 5/2016 | Schillheim |
| 9,770,697 | B2 | 9/2017 | Denize et al. |
| 9,924,837 | B1 | 3/2018 | Trojan |
| 10,278,542 | B2 | 5/2019 | Wolf et al. |
| 10,399,050 | B1 | 9/2019 | Bertsch |
| D872,777 | S | 1/2020 | Rashid |
| 10,730,026 | B2 | 8/2020 | Hoare et al. |
| 11,124,335 | B1 | 9/2021 | Mahan |
| 11,325,274 | B1 | 5/2022 | Leung et al. |
| 11,369,230 | B2 | 6/2022 | Guyatt et al. |
| D959,912 | S | 8/2022 | Kuo |
| 11,559,170 | B2 | 1/2023 | Ozana et al. |
| 2002/0048215 | A1 | 4/2002 | McGill |
| 2002/0127307 | A1* | 9/2002 | McGill .............. A47J 43/0716 426/115 |
| 2005/0047272 | A1 | 3/2005 | Sands |
| 2005/0193896 | A1 | 9/2005 | McGill |
| 2006/0176770 | A1 | 8/2006 | Sands |
| 2006/0209627 | A1 | 9/2006 | Mcgill |
| 2007/0200018 | A1 | 8/2007 | Leung et al. |
| 2007/0291585 | A1 | 12/2007 | Sivers |
| 2008/0037360 | A1 | 2/2008 | McGill |
| 2009/0308265 | A1 | 12/2009 | Obersteiner |
| 2010/0191823 | A1 | 7/2010 | Archer et al. |
| 2010/0208549 | A1 | 8/2010 | Kitson |
| 2010/0302897 | A1 | 12/2010 | George et al. |
| 2010/0308046 | A1 | 12/2010 | Serra |
| 2012/0152131 | A1 | 6/2012 | Sands |
| 2013/0121105 | A1 | 5/2013 | Denize et al. |
| 2014/0286123 | A1 | 9/2014 | Arnett et al. |
| 2015/0098298 | A1 | 4/2015 | Sapire |
| 2015/0098299 | A1 | 4/2015 | Sapire |
| 2015/0102046 | A1 | 4/2015 | Steininger |
| 2016/0000266 | A1 | 1/2016 | Potter et al. |
| 2016/0220071 | A1 | 8/2016 | Hewitt et al. |
| 2016/0244250 | A1 | 8/2016 | Dolan, Jr. |
| 2016/0288963 | A1* | 10/2016 | D'Amato .......... B65D 43/0212 |
| 2017/0086621 | A1 | 3/2017 | Bascom et al. |
| 2017/0135516 | A1 | 5/2017 | Fantappiè |
| 2017/0208998 | A1 | 7/2017 | Dickson, Jr. et al. |
| 2017/0251866 | A1 | 9/2017 | Garcia |
| 2017/0340170 | A1 | 11/2017 | Brunner |
| 2018/0073915 | A1 | 3/2018 | Finnance et al. |
| 2018/0140137 | A1 | 5/2018 | Barnard et al. |
| 2018/0279833 | A1 | 10/2018 | Lin |
| 2019/0000275 | A1 | 1/2019 | Sapire |
| 2019/0069725 | A1 | 3/2019 | Wang et al. |
| 2019/0075950 | A1 | 3/2019 | Xu |
| 2019/0144231 | A1 | 5/2019 | Redivo et al. |
| 2019/0282034 | A1 | 9/2019 | Ozana et al. |
| 2019/0382191 | A1 | 12/2019 | Orler |
| 2020/0113388 | A1 | 4/2020 | Sapire |
| 2020/0121115 | A1 | 4/2020 | Oh |
| 2020/0229646 | A1 | 7/2020 | Ozana et al. |
| 2020/0281409 | A1 | 9/2020 | Bannister et al. |
| 2021/0078776 | A1 | 3/2021 | Sterngold et al. |
| 2021/0145217 | A1 | 5/2021 | Roberts et al. |
| 2021/0177210 | A1 | 6/2021 | Tu |
| 2021/0347558 | A1 | 11/2021 | Footz et al. |
| 2022/0073239 | A1 | 3/2022 | Sterngold et al. |

FOREIGN PATENT DOCUMENTS

| | | | |
|---|---|---|---|
| CN | 101188960 | A | 5/2008 |
| CN | 201205232 | | 3/2009 |
| CN | 201527370 | U | 7/2010 |
| CN | 201755125 | | 3/2011 |
| CN | 201822691 | U | 5/2011 |
| CN | 201958462 | U | 9/2011 |
| CN | 201987257 | | 9/2011 |
| CN | 102249036 | A | 11/2011 |
| CN | 102933291 | A | 2/2013 |
| CN | 202829556 | | 3/2013 |
| CN | 203138026 | | 8/2013 |
| CN | 104042131 | A | 9/2014 |
| CN | 104488367 | A | 4/2015 |
| CN | 104523123 | | 4/2015 |
| CN | 204654559 | | 9/2015 |
| CN | 205083231 | | 3/2016 |
| CN | 106395129 | A | 2/2017 |
| DE | 6939265 | U | 1/1970 |
| DE | 19602147 | | 7/1997 |
| DE | 202021105571 | | 12/2021 |
| EP | 2676539 | | 12/2013 |
| EP | 3766394 | | 1/2021 |
| EP | 4014810 | | 6/2022 |
| JP | H0958716 | | 3/1997 |
| JP | 2001-520901 | A | 11/2001 |
| JP | 2008-545467 | A | 12/2008 |
| JP | 2011-167558 | A | 9/2011 |
| JP | 2011-188763 | A | 9/2011 |
| JP | 2015-62461 | A | 4/2015 |
| JP | 5777833 | B1 | 9/2015 |
| JP | 2015-226780 | A | 12/2015 |
| KR | 10-2001-0031481 | A | 4/2001 |
| KR | 1020020056761 | | 7/2002 |
| KR | 10-2008-0028861 | A | 4/2008 |
| KR | 10-2009-0008837 | A | 1/2009 |
| KR | 1020100107653 | | 10/2010 |
| KR | 2020120001706 | | 3/2012 |
| KR | 2020130004955 | | 8/2013 |
| KR | 10-2015-0034181 | A | 4/2015 |
| WO | 00/013563 | | 3/2000 |
| WO | 00/76875 | | 12/2000 |
| WO | 2001/030663 | | 5/2001 |
| WO | 02/28735 | A1 | 4/2002 |
| WO | 2006/041584 | | 4/2006 |
| WO | 2006/083420 | | 8/2006 |
| WO | 2006/126009 | A2 | 11/2006 |
| WO | 2008/068416 | A2 | 6/2008 |
| WO | 2010/041179 | | 4/2010 |

(56) References Cited

FOREIGN PATENT DOCUMENTS

| | | |
|---|---|---|
| WO | 2012/030168 | 3/2012 |
| WO | 2014/110381 | 7/2014 |
| WO | 2015/081381 A1 | 6/2015 |
| WO | 2015/128091 A1 | 9/2015 |
| WO | 2016/067074 A1 | 5/2016 |
| WO | 2018/015962 | 1/2018 |
| WO | 2018/104813 | 6/2018 |
| WO | 2018/191773 | 10/2018 |
| WO | 2019/016790 | 1/2019 |
| WO | 2019/142182 | 7/2019 |
| WO | 2020/148742 | 7/2020 |

OTHER PUBLICATIONS

European Search Report dated May 16, 2022 which issued during the prosecution of Applicant's European App No. 22156559.1.
Notice of Allowance dated May 31, 2022, which issued during the prosecution of Japanese Patent Application No. 2019-524547.
An Office Action dated Jun. 27, 2022, which issued during the prosecution of Australia Patent Application No. 2017301047.
An Office Action summarized English translation and Search Report dated Jul. 1, 2021, which issued during the prosecution of Chinese Patent Application No. 201780057822.5.
An Office Action summarized English translation and Search Report dated May 18, 2021, which issued during the prosecution of Chinese Patent Application No. 201880047466.3.
An Office Action dated Jul. 20, 2021, which issued during the prosecution of Japanese Patent Application No. 2019-524547.
An Office Action dated Jun. 17, 2021, which issued during the prosecution of Brazilian Patent Application No. BR1120190009752.
U.S. Appl. No. 62/364,491, filed Jul. 20, 2016.
U.S. Appl. No. 62/383,639, filed Sep. 6, 2016.
U.S. Appl. No. 62/533,743, filed Jul. 18, 2017.
U.S. Appl. No. 62/340,648, filed May 24, 2016.
An Invitation to pay additional fees dated Jan. 15, 2019, which issued during the prosecution of Applicant's PCT/IL2019/050056.
An International Search Report and a Written Opinion both dated Jun. 19, 2019, which issued during the prosecution of Applicant's PCT/IL2019/050056.
An International Search Report and a Written Opinion both dated Jul. 10, 2019, which issued during the prosecution of Applicant's PCT/IL2019/050374.
An International Search Report and a Written Opinion both dated Jun. 6, 2018, which issued during the prosecution of Applicant's PCT/IL2018/050057.
An International Search Report and a Written Opinion both dated Dec. 5, 2017, which issued during the prosecution of Applicant's PCT/IL2017/050823.
An International Preliminary Report on Patentability dated Jan. 22, 2019, which issued during the prosecution of Applicant's PCT/IL2017/050823.
An Office Action dated Mar. 21, 2019, which issued during the prosecution of Design U.S. Appl. No. 29/624,319.
An International Preliminary Report on Patentability dated Jul. 21, 2020, which issued during the prosection of Applicant's PCT/IL2019/050056.
An International Preliminary Report on Patentability dated Jan. 21, 2020, which issued during the prosecution of Applicant's PCT/IL2018/050057.
European Search Report dated Feb. 10, 2020, which issued during the prosecution of Applicant's European App No. 17830613.0.
An Office Action dated Nov. 12, 2020, which issued during the prosecution of Indian Patent Application No. 201917005158.
An Office Action summarized English translation and Search Report dated Nov. 25, 2021, which issued during the prosecution of Chinese Patent Application No. 201980015733.3.
Partial European Search Report dated Nov. 12, 2021 which issued during the prosecution of Applicant's European App No. 19740812.3.
An Office Action together with summarized English translation dated Sep. 1, 2022, which issued during the prosecution of Korea Patent Application No. 10-2022-7023412.
Partial European Search Report dated Sep. 6, 2022 which issued during the prosecution of Applicant's European App No. 19910439.9.
An Office Action dated Sep. 2, 2022, which issued during the prosecution of Australia Patent Application No. 2017301047.
An Office Action dated Jul. 13, 2022, which issued during the prosecution of U.S. Appl. No. 16/318,627.
European Search Report dated Apr. 14, 2021, which issued during the prosecution of Applicant's European App No. 18836047.
An Office Action together with summarized English translation dated Feb. 1, 2023, which issued during the prosecution of Korea Patent Application No. 10-2023-7001110.
An Office Action summarized English translation and Search Report dated Apr. 6, 2022, which issued during the prosecution of Chinese Patent Application No. 201780057822.5.
Am OFfice Action summarized English translation and Search Report dated Mar. 22, 2023, which issued during the prosecution of Chinese Patent Application No. 202111170014.4.
Notice of Allowance dated Nov. 23, 2022, which issued during the prosecution of Australia Patent Application No. 2017301047.
European Search Report dated Dec. 7, 2022 which issued during the prosecution of Applicant's European App No. 19910439.9.
An Office Action dated Jul. 12, 2022, which issued during the prosecution of U.S. Appl. No. 16/632,053.
Notice of Allowance dated Nov. 23, 2022, which issued during the prosecution of U.S. Appl. No. 16/318,627.
Notice of Allowance dated Sep. 29, 2022, which issued during the prosecution of U.S. Appl. No. 16/318,627.
An Office Action dated Apr. 27, 2022, which issued during the prosecution of U.S. Appl. No. 16/318,627.
Notice of Allowance dated Sep. 18, 2019, which issued during the prosecution of Design U.S. Appl. No. 29/624,319.
An Office Action summarized English translation and Search Report dated Nov. 17, 2021, which issued during the prosecution of Chinese Patent Application No. 201780057822.5.
An International Preliminary Report on Patentability dated Jun. 16, 2021, which issued during the prosecution of Applicant's PCT/IL2019/050374.
An Office Action dated Jun. 12, 2023, which issued during the prosecution of U.S. Appl. No. 16/632,053.
An Office Action dated Sep. 21, 2023, which issued during the prosecution of Korean Patent Application No. 10-2020-7004744.

* cited by examiner

E

E

SINGLE-USE FOOD PREPARATION CONTAINER ASSEMBLIES, SYSTEMS AND METHODS

REFERENCE TO RELATED APPLICATIONS

This application is a National Stage of International Application No. PCT/IL2019/050056 filed Jan. 15, 2019, claiming priority based on International patent Application No. PCT/IL2018/050057, filed Jan. 16, 2018 and entitled SINGLE-USE FOOD PREPARATION CONTAINER ASSEMBLIES, SYSTEMS AND METHODS, the disclosure of which is hereby incorporated by the reference and priority of which is hereby claimed.

Reference is also made to the following patent applications, which are related to the subject matter of the present application, the disclosures of which are hereby incorporated by reference:

U.S. Provisional Patent Application Ser. No. 62/533,743, filed Jul. 18, 2017 and entitled SINGLE-USE FOOD PREPARATION CONTAINER ASSEMBLIES, SYSTEMS AND METHODS; and PCT Patent Application No. PCT/IL2017/050823, filed Jul. 20, 2017 and entitled SINGLE-USE FOOD PREPARATION CONTAINER ASSEMBLY, SYSTEM AND METHOD.

U.S. Provisional Patent Application Ser. No. 62/364,491, filed Jul. 20, 2016 and entitled CUP WITH INTEGRATED BLENDING FUNCTIONALITY; and U.S. Provisional Patent Application Ser. No. 62/383,639, filed Sep. 6, 2016 and entitled FOOD PRODUCT PREPARATION SYSTEM.

FIELD OF THE INVENTION

The present invention relates to computerized and automated processing of products, preferably food products, within a single-use-container.

BACKGROUND OF THE INVENTION

Various types of devices for computerized processing of products, including food products are known.

SUMMARY OF THE INVENTION

The present invention seeks to provide an improved product preparation container assembly which is suitable for being processed by an intelligent driving device. The product preparation container assembly and the intelligent driving device together define a product preparation system which is particularly suitable for use with food products but is not limited to use therewith.

There is thus provided in accordance with a preferred embodiment of the present invention a container including a cup body and a cup closure assembly configured for removable operative engagement with the cup body, the cup closure assembly including a hinged spout cover and a user-removable multi-function restricting portion integrally formed as part of the cup closure assembly and detachable therefrom, the user-removable multi-function restricting portion being operative, when integrally attached to the cup closure assembly to prevent normal user opening of the hinged spout cover.

In accordance with a preferred embodiment of the present invention the user-removable multi-function restricting portion is operative, when integrally attached as part of the cup closure assembly, to prevent normal user disengagement of the cup closure assembly from the cup body. Additionally or alternatively, the user-removable multi-function restricting portion is not reattachable to the cup closure assembly.

Preferably, the cup body defines a rim and an inner circumferential surface and the cup closure assembly includes an interior portion arranged to define a circumferential seal with the inner circumferential surface of the cup body and an outer portion arranged for engagement with the interior portion and bendable disengagement therefrom. Additionally, the container also includes a user openable and tamper evidencing attachment between the interior portion and the outer portion.

Preferably, the interior portion includes at least one open spout portion and the outer portion includes a spout seal for selectably sealing the open spout portion. Additionally or alternatively, the interior portion includes at least one central open portion and the cup closure assembly also includes a rotary blade portion arranged for rotational sealing engagement with the central open portion of the interior portion.

In accordance with a preferred embodiment of the present invention the rotary blade portion is a container contents processor drivable, rotatable blade configured to be located within the cup body and the cup closure assembly defines a seal cooperating with the container contents processor drivable, rotatable blade, the seal having a first static sealing operative orientation, when the rotatable blade is not in rotation, and a second dynamic sealing operative orientation, different from the first static sealing operative orientation, when the rotatable blade is in rotation. Additionally, the rotary blade portion does not contact a remainder of the cup closure assembly.

In accordance with a preferred embodiment of the present invention the interior portion includes a central interior portion opening, the outer portion includes a central outer portion opening and the interior portion and the outer portion are configured to define a liquid-tight seal between the interior portion central opening and the outer portion central opening.

Preferably, the container is configured for use with a container contents processor operative to engage the cup closure assembly and process the consumer usable contents thereof.

In accordance with a preferred embodiment of the present invention the cup closure assembly defines a single-use cover seal and externally rotatably drivable rotary engagement assembly (SUCSERDREA), providing both human and machine sensible tamper-evident and re-use preventing fluid sealing engagement with the cup body. Additionally, the SUCSERDREA also includes an encrypted machine-readable information source.

Preferably, the blade includes a drive shaft engagement portion adapted for axial initial engagement with a drive shaft of a container contents processor and subsequent tightened rotational engagement with the drive shaft upon driven rotation of the drive shaft in engagement with the blade. Additionally, the drive shaft engagement portion is formed with curved splines.

In accordance with a preferred embodiment of the present invention the cup body is formed of plastic.

In accordance with a preferred embodiment of the present invention the cup body is formed of paper. Additionally, the container also includes a support ring underlying and reinforcing a rim of the cup body.

In accordance with a preferred embodiment of the present invention the cup body has a rim and an inner circumferential surface and the cup closure assembly is configured for removable operative engagement with the cup body and includes an interior portion arranged to define a circumferential seal with the inner circumferential surface of the cup body and an outer portion arranged for engagement with the interior portion and bendable at least partial disengagement therefrom.

Preferably, the cup body has a rim and an inner circumferential surface and the cup closure assembly is configured for removable operative engagement with the cup body and includes an interior portion arranged to define a circumferential seal with the inner circumferential surface of the cup body and to define at least one open spout portion and an outer portion arranged for at least partially removable engagement with the interior portion and including a spout seal for selectably sealing the open spout portion.

In accordance with a preferred embodiment of the present invention the cup body has a rim and an inner circumferential surface and the cup closure assembly is configured for removable operative engagement with the cup body, the cup closure assembly including an interior portion arranged to define a circumferential seal with the inner circumferential surface of the cup body and to define at least one central open portion, an outer portion arranged for at least partially removable engagement with the interior portion and a rotary blade portion arranged for rotational sealing engagement with the central open portion of the interior portion.

In accordance with a preferred embodiment of the present invention the cup body has a rim and an inner circumferential surface and the cup closure assembly is configured for removable operative engagement with the cup body, the cup closure assembly including an interior portion arranged to define a circumferential seal with the inner circumferential surface of the cup body and to define a central opening, an outer portion arranged for at least partial removable engagement with the interior portion and defining a central opening, the interior portion and the outer portion being configured to define a liquid-tight seal between the central opening of the interior portion and the central opening of the outer portion.

There is also provided in accordance with a preferred embodiment of the present invention apparatus for processing the container including a container contents processor including a container support configured for supporting the container in an upside-down orientation and an electric motor including a drive shaft, the container support and the electric motor having a first operative orientation, wherein the drive shaft is axially retracted with respect to the container support and a second operative orientation, wherein the drive shaft is axially extended with respect to the container support and operatively engages the container support.

In accordance with a preferred embodiment of the present invention the apparatus is configured for use in a method of processing contents of the container, the method including filling the container with contents to be processed by the container contents processor, detaching the user-removable multi-function restricting portion from the cup closure assembly, placing the container in an upside-down orientation on the container support of the container contents processor, clamping the container in the upside-down orientation onto the container support, processing the contents to be processed by the container contents processor, disengaging the container from the container contents processor following the processing and unclamping the container from the container support.

Preferably, the cup closure assembly is configured for reengagement with the cup body following removal from the cup body. Additionally, the cup closure assembly is configured for manual removal from the cup body in a manner that the interior portion of the cup closure and the outer portion of the cup closure assembly are joined to each other during the removal.

In accordance with a preferred embodiment of the present invention the cup closure assembly is configured for use with either a cup body formed of plastic or a cup body formed of paper and having a reinforced rim.

Preferably, the cup closure assembly is formed of polypropylene.

Preferably, the rotary blade portion is formed of polyoxymethylene. Alternatively, the rotary blade portion is formed of polypropylene.

There is also provided in accordance with another preferred embodiment of the present invention a container including a cup body having a rim and an inner circumferential surface and a cup closure assembly configured for removable operative engagement with the cup body, the cup closure assembly including an interior portion arranged to define a circumferential seal with the inner circumferential surface of the cup body and an outer portion arranged for engagement with the interior portion and bendable at least partial disengagement therefrom.

Preferably, outer portion of the cup closure assembly is configured to define a circumferential engagement with the rim of the cup body. Additionally or alternatively, the outer portion of the cup closure assembly is configured to prevent full disengagement thereof from the interior portion of the cup closure assembly.

In accordance with a preferred embodiment of the present invention the cup closure assembly is configured for use with cup bodies having different sizes and configurations, provided that a circumferential rim of the cup bodies is of a uniform size.

Preferably, the cup closure assembly includes a fluid retaining chamber. Additionally or alternatively, the cup closure assembly includes a snap fit fluid seal between the outer portion of the cup closure assembly and the interior portion of the cup closure assembly.

In accordance with a preferred embodiment of the present invention the cup closure assembly includes a user-engageable flap. Additionally or alternatively, the interior portion of the cup closure assembly includes a peripheral flange.

In accordance with a preferred embodiment of the present invention the interior portion of the cup closure assembly includes a circumferential sealing protrusion.

In accordance with a preferred embodiment of the present invention the cup closure assembly also includes a user openable and tamper evidencing attachment between the interior portion and the outer portion.

There is further provided in accordance with yet another preferred embodiment of the present invention a container including a cup body having a rim and an inner circumferential surface and a cup closure assembly configured for removable operative engagement with the cup body, the cup closure assembly including an interior portion arranged to engage the inner circumferential surface of the cup body, an outer portion arranged for engagement with the interior portion and bendable at least partial disengagement therefrom and a user openable and tamper evidencing attachment between the interior portion and the outer portion.

In accordance with a preferred embodiment of the present invention the tamper evidencing attachment between the interior portion and the outer portion is operative to provide human sensible evidence of previous opening of the container.

In accordance with a preferred embodiment of the present invention the temper evident attachment between the interior portion and the outer portion includes a pair of tamper evidencing tabs. Additionally, the tamper evidencing tabs each include a downwardly-extending portion and a radially outwardly-extending portion extending therefrom. Additionally or alternatively, the tamper evidencing tabs are integrally formed with the inner portion of the cup closure assembly.

In accordance with a preferred embodiment of the present invention the tamper evidencing attachment between the interior portion and the outer portion also includes a pair of apertures operative to receive the tamper evidencing tabs. Preferably, the tamper evidencing tabs have multiple operative orientations. Additionally, the multiple operative orientations include a first operative orientation wherein the downwardly-extending portions of the tamper evidencing tabs and the radially outwardly-extending portions of the tamper evidencing tabs are in a mutually parallel orientation when extending through the pair of apertures.

Preferably, the tamper evidencing and re-use preventing tabs are in the first operative orientation of the tamper evidencing tabs prior to disengagement of the cup closure assembly from the cup body.

In accordance with a preferred embodiment of the present invention the multiple operative orientations include a second operative orientation wherein the tamper evidencing tabs are disengaged from the pair of apertures and the radially outwardly-extending portions of the tamper evidencing tabs assume an extended orientation relative to the downwardly-extending portions of the tamper evidencing and re-use preventing tabs.

Preferably, the tamper evidencing tabs are in the second operative orientation following disengagement of the cup closure assembly from the cup body. Additionally or alternatively, the tamper evidencing tabs normally can no longer assume the first operative orientation once the tamper evidencing are in the second operative orientation.

In accordance with a preferred embodiment of the present invention the interior portion is arranged to define at least one open spout portion and the outer portion is arranged for at least partially removable engagement with the interior portion and includes a spout seal for selectably sealing the open spout portion.

There is still further provided in accordance with still another preferred embodiment of the present invention a container including a cup body having a rim and an inner circumferential surface and a cup closure assembly configured for removable operative engagement with the cup body, the cup closure assembly including an interior portion arranged to define a circumferential seal with the inner circumferential surface of the cup body and to define at least one open spout portion and an outer portion arranged for at least partially removable engagement with the interior portion and including a spout seal for selectably sealing the open spout portion.

In accordance with a preferred embodiment of the present invention the at least one open spout portion of the interior portion of the cup closure assembly includes a protective grid operative to prevent objects of a size greater than a predetermined size from passing therethrough. Additionally, the protective grid is formed with a straw aperture.

Preferably, the spout seal includes an integrally hinged access door.

In accordance with a preferred embodiment of the present invention the spout seal includes a finger engagement portion operative for manual opening of the spout seal. Additionally or alternatively, the spout seal includes a pair of tamper-evidencing protrusions. Preferably, the spout seal is resealably engageable with the open spout portion.

There is even further provided in accordance with another preferred embodiment of the present invention a container including a cup body having a rim and an inner circumferential surface and a cup closure assembly configured for removable operative engagement with the cup body, the cup closure assembly including an interior portion arranged to define a circumferential seal with the inner circumferential surface of the cup body and to define at least one central open portion, an outer portion arranged for at least partially removable engagement with the interior portion and a rotary blade portion arranged for rotational sealing engagement with the central open portion of the interior portion.

Preferably, the interior portion includes a cover and a lid, the lid including at least two mutually concentric downwardly-facing recesses, which are sealingly engaged by corresponding protrusions of the rotary blade portion. Additionally, the at least two mutually concentric downwardly-facing recesses are defined by mutually concentric wall surfaces, defining respective downwardly-facing annular edges, one of which defines an edge surface of an inwardly-facing flange, which is engaged by the rotary blade portion. Additionally or alternatively, the at least two mutually concentric downwardly-facing recesses are formed with radially inwardly-extending protrusions for tight engagement with the rotary blade portion when the rotary blade portion is in a retracted operative orientation, for static liquid sealing therewith.

In accordance with a preferred embodiment of the present invention the lid includes a downwardly-facing, generally planar surface formed with a downwardly-facing blade receiving recess.

In accordance with a preferred embodiment of the present invention the rotary blade portion includes a central driving and sealing portion and a pair of blade portions extending radially outwardly therefrom in opposite directions. Additionally, the central driving and sealing portion includes a pair of mutually radially spaced, concentric sealing walls and a drive shaft engaging wall having, on a radially inwardly-facing surface an arrangement of curved splines, which are configured to engage corresponding recesses on a drive shaft of a container contents processor.

In accordance with a preferred embodiment of the present invention the blade portions each define a top-facing surface, which includes a planar portion and a tapered portion which terminates at a curved cutting edge.

Preferably, the rotary blade portion includes a bottom-facing surface formed with first and second walls, which define dynamic sealing surfaces, each of the first and second walls defining a dynamic radially inwardly-facing circumferential sealing surface and a dynamic radially outwardly-facing circumferential sealing surface.

Preferably, the rotary blade portion also defines static sealing surfaces.

There is yet further provided in accordance with still another preferred embodiment of the present invention a container including a cup body having a rim and an inner circumferential surface and a cup closure assembly configured for removable operative engagement with the cup body, the cup closure assembly including an interior portion arranged to define a circumferential seal with the inner circumferential surface of the cup body and to define a central opening and an outer portion arranged for at least partial removable engagement with the interior portion and defining a central opening, the interior portion and the outer portion being configured to define a liquid-tight seal between the central opening of the interior portion and the central opening of the outer portion.

Preferably, the interior portion includes a cover and a lid and the cover includes a generally circular planar portion having a central aperture and a generally circular circumferential recess surrounding the central aperture. Additionally, the generally circular circumferential recess is separated from the central aperture by a downwardly-facing, generally circular generally circumferential protrusion, which is formed with a radially inwardly-facing inclined surface, which defines a snap fit fluid seal with the lid.

In accordance with a preferred embodiment of the present invention the cover also defines part of a fluid retaining chamber.

In accordance with a preferred embodiment of the present invention a user-engageable front flap is integrally formed with the generally circular planar portion.

Preferably, a pair of apertures are formed at opposite ends of the front flap for receiving the tamper-evidencing tabs.

In accordance with a preferred embodiment of the present invention an integrally hinged access door including integral hinges is formed in generally circular planar portion. Additionally, a pair of tamper-evidencing protrusions are located on opposite sides of the access door and extend radially-outwardly toward an edge of an opening sealed by the access door. Additionally or alternatively, an underside of the access door includes a circumferential downwardly-directed protrusion, an outer surface of which is operative to resealably engage a corresponding surface of the lid.

In accordance with a preferred embodiment of the present invention the circular planar portion is surrounded by a generally circular circumferential edge portion, which defines on a radially inwardly- and downwardly-facing surface thereof a rim, which is operative for snap fit engagement with the rim of the cup body.

There is also provided in accordance with still another preferred embodiment of the present invention a container and container contents processing system including a container, including a cup body and a cup closure assembly configured for removable operative engagement with the cup body, the cup closure assembly including a rotatable blade and a user-removable multi-function restricting portion integrally formed with the cup closure assembly and detachable therefrom, the user-removable multi-function restricting portion being operative, when integrally attached to the cup closure assembly, to prevent normal user disengagement of the cup closure assembly from the cup body and a container contents processor including a container support configured for supporting the container in an upside-down orientation and an electric motor including a drive shaft, the container support and the electric motor having a first operative orientation, wherein the drive shaft is axially retracted with respect to the container support and does not operatively engage the blade, and a second operative orientation, wherein the drive shaft is axially extended with respect to the container support and operatively engages the blade.

In accordance with a preferred embodiment of the present invention the user-removable multi-function restricting portion is operative, when integrally attached as part of the cup closure assembly, to prevent normal user disengagement of the cup closure assembly from the cup body. Additionally or alternatively, the user-removable multi-function restricting portion is not reattachable to the cup closure assembly.

In accordance with a preferred embodiment of the present invention the cup body defines a rim and an inner circumferential surface and the cup closure assembly includes an interior portion arranged to define a circumferential seal with the inner circumferential surface of the cup body and an outer portion arranged for engagement with the interior portion and bendable disengagement therefrom.

In accordance with a preferred embodiment of the present invention the cup closure assembly also includes a user openable and tamper evidencing attachment between the interior portion and the outer portion.

Preferably, the interior portion includes at least one open spout portion and the outer portion includes a spout seal for selectably sealing the open spout portion.

In accordance with a preferred embodiment of the present invention the interior portion includes at least one central open portion and the cup closure assembly also includes a rotary blade portion arranged for rotational sealing engagement with the central open portion of the interior portion.

In accordance with a preferred embodiment of the present invention the rotary blade portion is a container contents processor drivable, rotatable blade configured to be located within the cup body and the cup closure assembly defines a seal cooperating with the container contents processor drivable, rotatable blade, the seal having a first static sealing operative orientation, when the rotatable blade is not in rotation, and a second dynamic sealing operative orientation, different from the first static sealing operative orientation, when the rotatable blade is in rotation.

In accordance with a preferred embodiment of the present invention the rotary blade portion does not contact a remainder of the cup closure assembly.

In accordance with a preferred embodiment of the present invention the interior portion includes a central interior portion opening, the outer portion includes a central outer portion opening and the interior portion and the outer portion are configured to define a liquid-tight seal between the interior portion central opening and the outer portion central opening.

There is further provided in accordance with yet a further preferred embodiment of the present invention a method of processing contents of a container, the method including providing a container including a cup body and a cup closure assembly configured for removable operative engagement with the cup body, the cup closure assembly including a hinged spout cover and a user-removable multi-function restricting portion integrally formed with the cup closure assembly and detachable therefrom, the user-removable multi-function restricting portion being operative, when integrally attached to the cup closure assembly, to prevent normal user opening of the hinged spout cover and the user-removable multi-function restricting portion being operative, when integrally attached to the cup closure assembly, to prevent normal user disengagement of the cup closure assembly from the cup body, detaching the user-removable multi-function restricting portion from the cup closure assembly, filling the container with contents to be processed by the container contents processor, placing the container in an upside-down orientation on the container support of the container contents processor, clamping the container in the upside-down orientation onto the container support, processing the contents to be processed by the container contents processor, disengaging the container from the container contents processor following the processing and unclamping the container from the container support.

Preferably, the method also includes returning the container to an upright orientation and removing the contents of the container from the container.

Preferably, the method also includes removing the cup closure assembly from the cup body. Additionally, the method also includes reengagement of the cup closure assembly with the cup body following removing of the cup closure assembly from the cup body.

In accordance with a preferred embodiment of the present invention normally, during the removing the cup closure assembly from the cup body, the interior portion and the outer portions are joined to each other.

BRIEF DESCRIPTION OF THE DRAWINGS

The present invention will be understood and appreciated more fully from the following detailed description, taken in conjunction with the drawings in which:

FIGS. 4E and 4F being taken along directions indicated by respective arrows E and F in FIG. 4C and FIGS. 4G, 4H and 4I, being taken along lines respective lines G-G, H-H and I-I in FIG. 4D;

FIGS. 6E and 6F being taken in directions indicated by respective arrows E and F in FIG. 6A and FIG. 6G being taken along section line G-G in FIG. 6B;

FIG. 10E being taken along lines E-E in FIG. 10D;

FIG. 11E being taken along lines E-E in FIG. 11D;

FIG. 12E being taken along lines E-E in FIG. 12D;

FIG. 13D being taken along lines D-D in FIG. 13A;

FIG. 14D being taken along lines D-D in FIG. 14A;

FIGS. 18C and 18D showing different rotational orientations of the drive shaft;

FIG. 23D being taken along lines D-D in FIG. 23A;

FIG. 24D being taken along lines D-D in FIG. 24A;

FIGS. 28D and 28E being taken along lines D-D in FIG. 28A and lines E-E in FIG. 28C, respectively;

FIG. 29E being taken along lines E-E in FIG. 29A;

FIG. 33E being taken along lines E-E in FIG. 33C;

FIGS. 40C and 40D being taken along respective section lines C-C and D-D in FIG. 40B;

FIG. 44B being taken along section lines B-B in FIG. 44A, and FIGS. 44C, 44D, 44E and 44F being taken along lines C-C, D-D. 44E-44E and 44D-44D in FIG. 40B, respectively;

FIG. 45 being taken along line B-B in FIG. 44A;

FIG. 56B being taken along section line B-B in FIG. 55A;

FIGS. 57B and 57C being taken along line B-B in FIG. 57A and showing two successive stages of removal;

FIG. 60 being taken along section line 44D-44D in FIG. 40B and corresponding generally to FIG. 46A.

DETAILED DESCRIPTION OF PREFERRED EMBODIMENTS

Figure 1A:
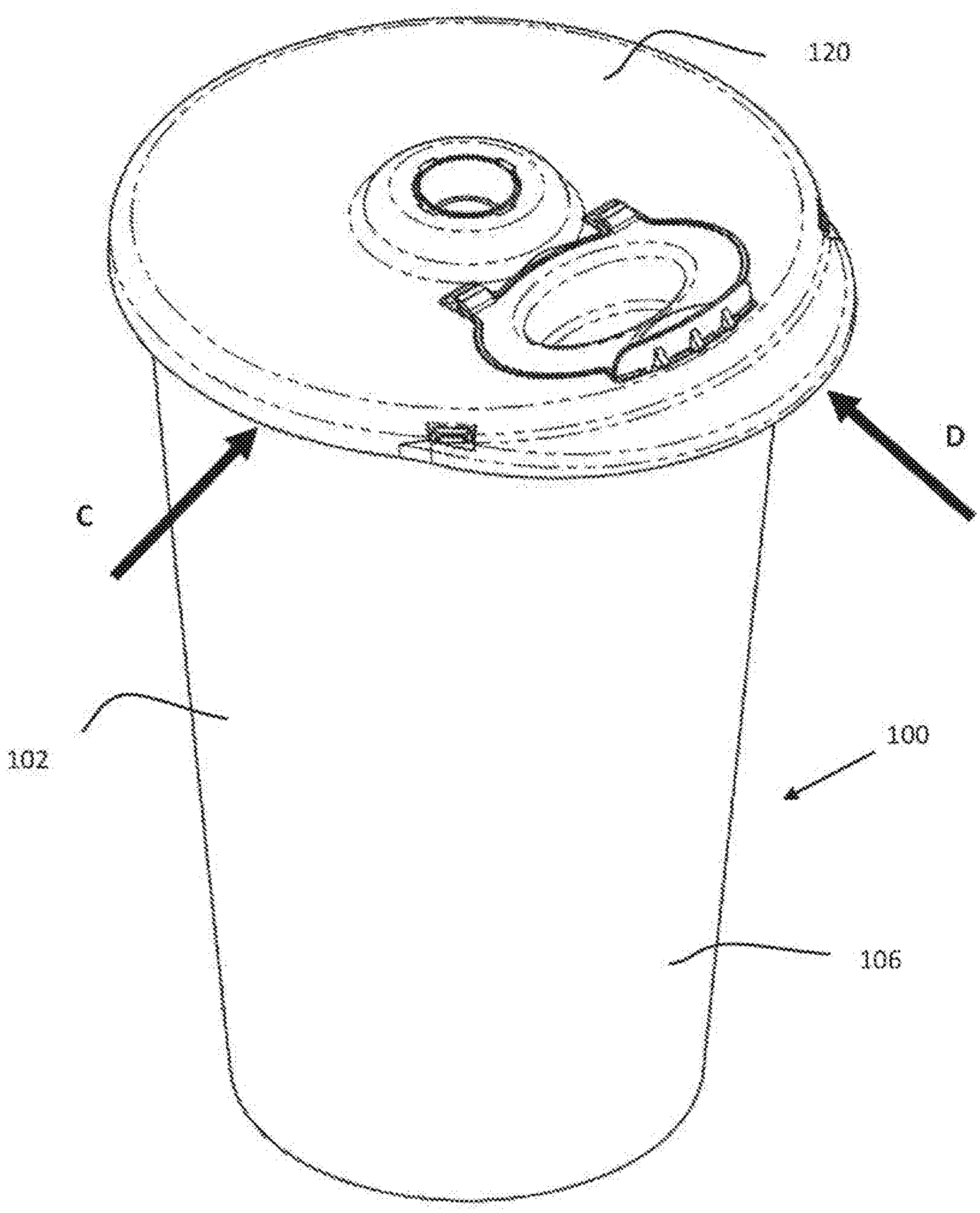
FIGS. 1A and 1B are simplified respective top-facing and bottom-facing pictorial illustrations of a single-use preparation container assembly (SUPCA) constructed and operative in accordance with a preferred embodiment of the present invention.
Figure 1B:
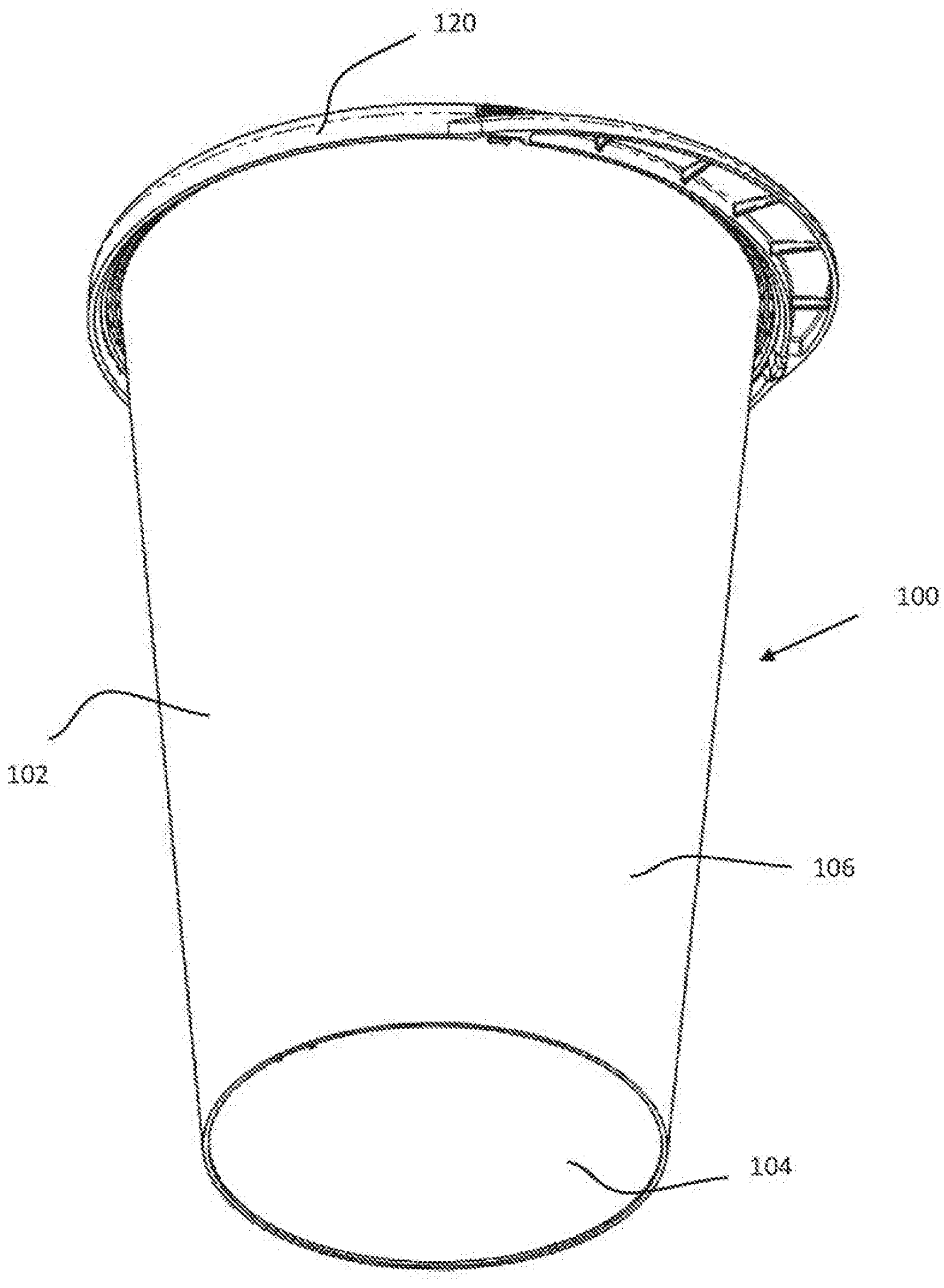
Figure 1C:
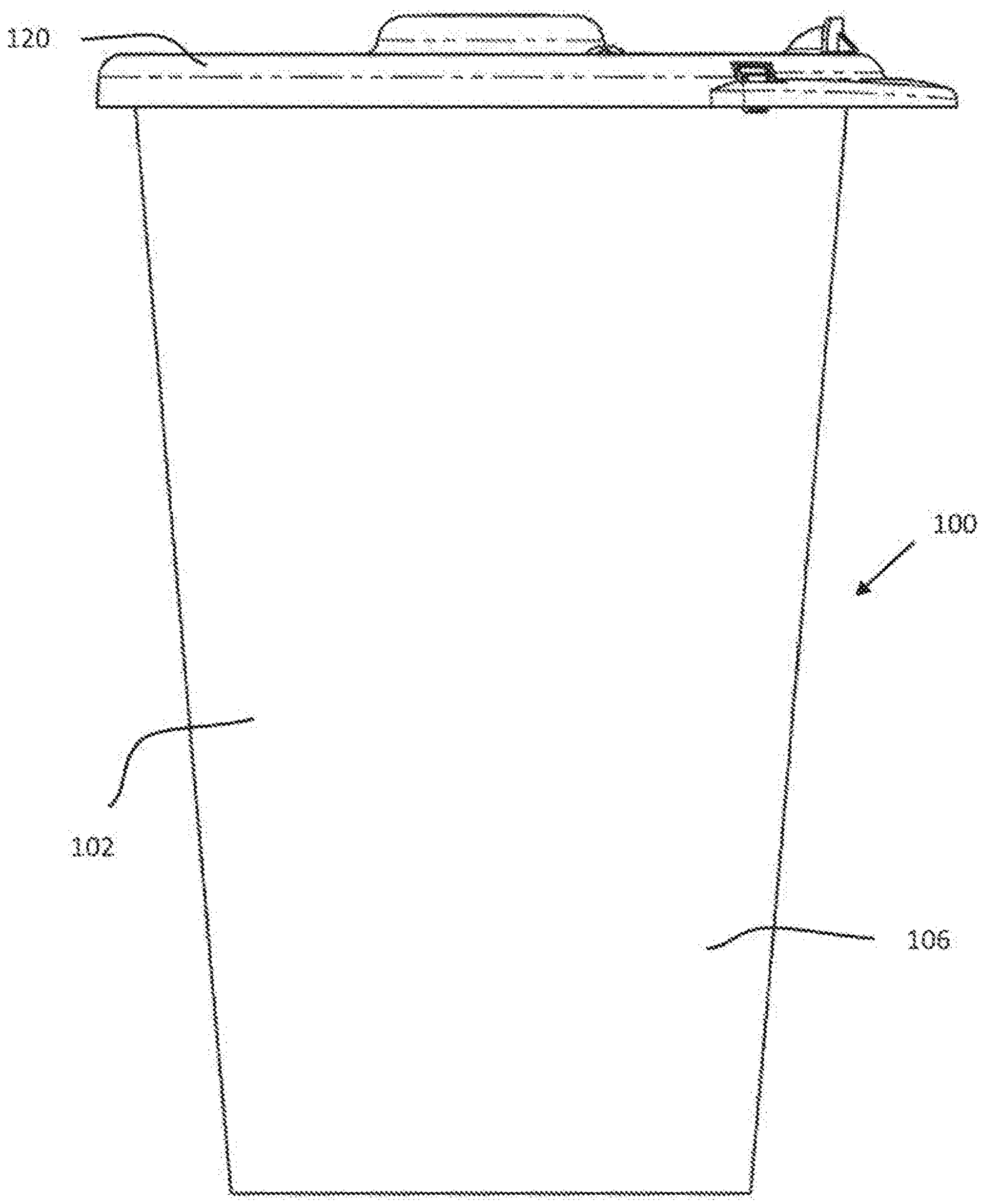
FIGS. 1C and 1D are simplified first and second side view illustrations of the single-use preparation container assembly (SUPCA) of FIGS. 1A and 1B, taken along directions indicated by respective arrows C and D in FIG. 1A.
Figure 1D:
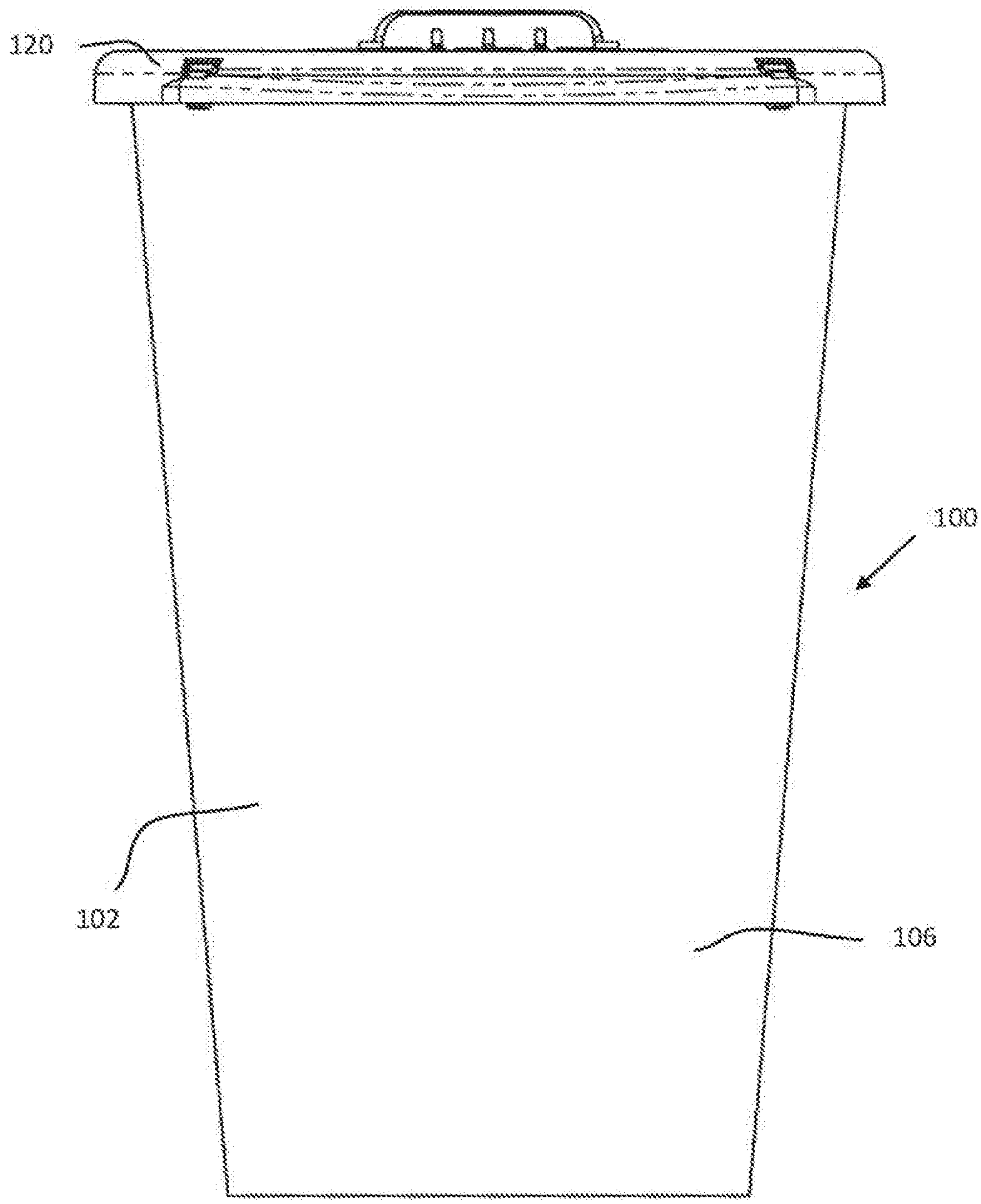
Figure 1E:
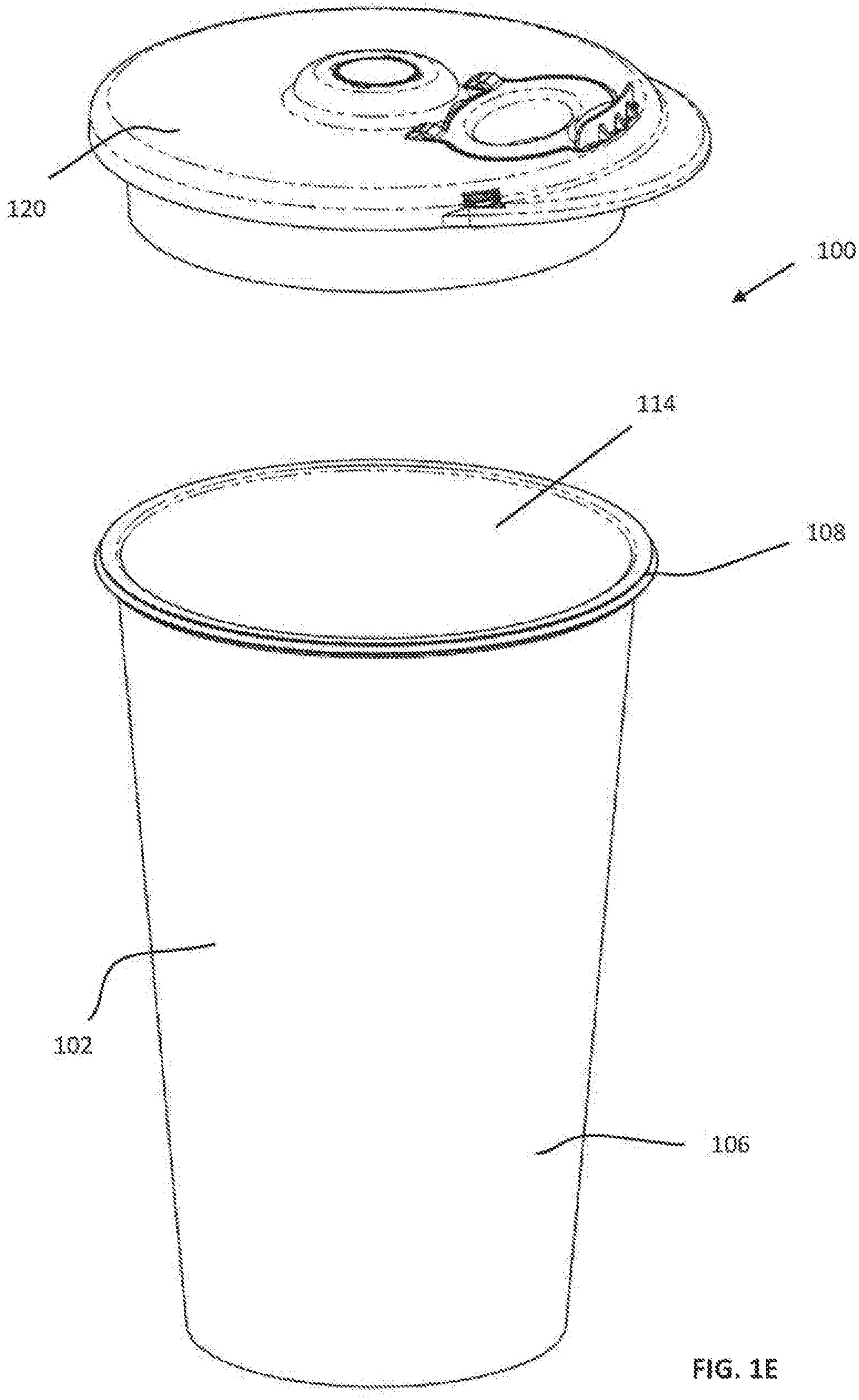
FIGS. 1E and 1F are simplified respective top-facing and bottom-facing partially exploded view illustrations of the single-use preparation container assembly (SUPCA) of FIGS. 1A-ID.
Figure 1F:
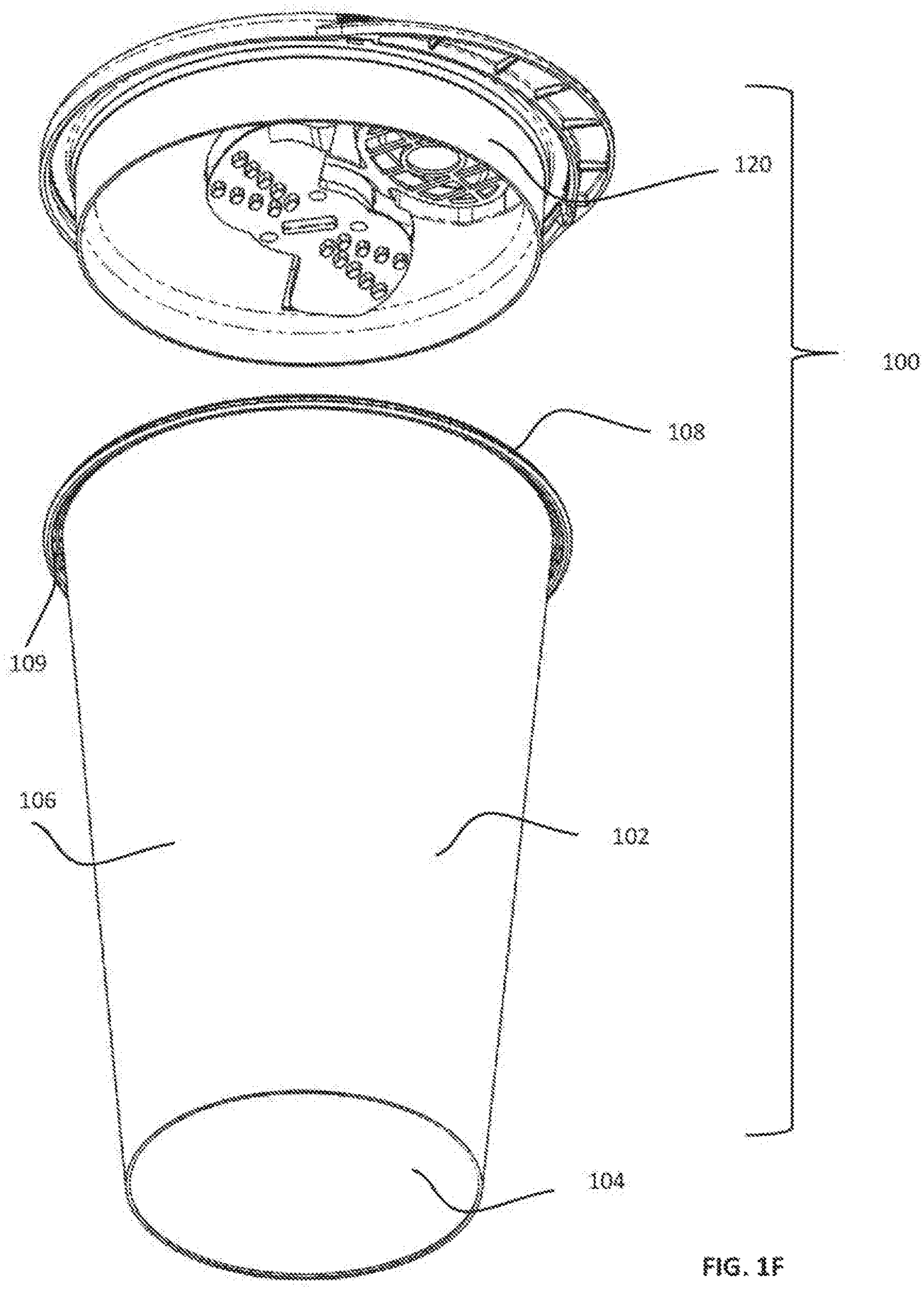
Figure 1G:
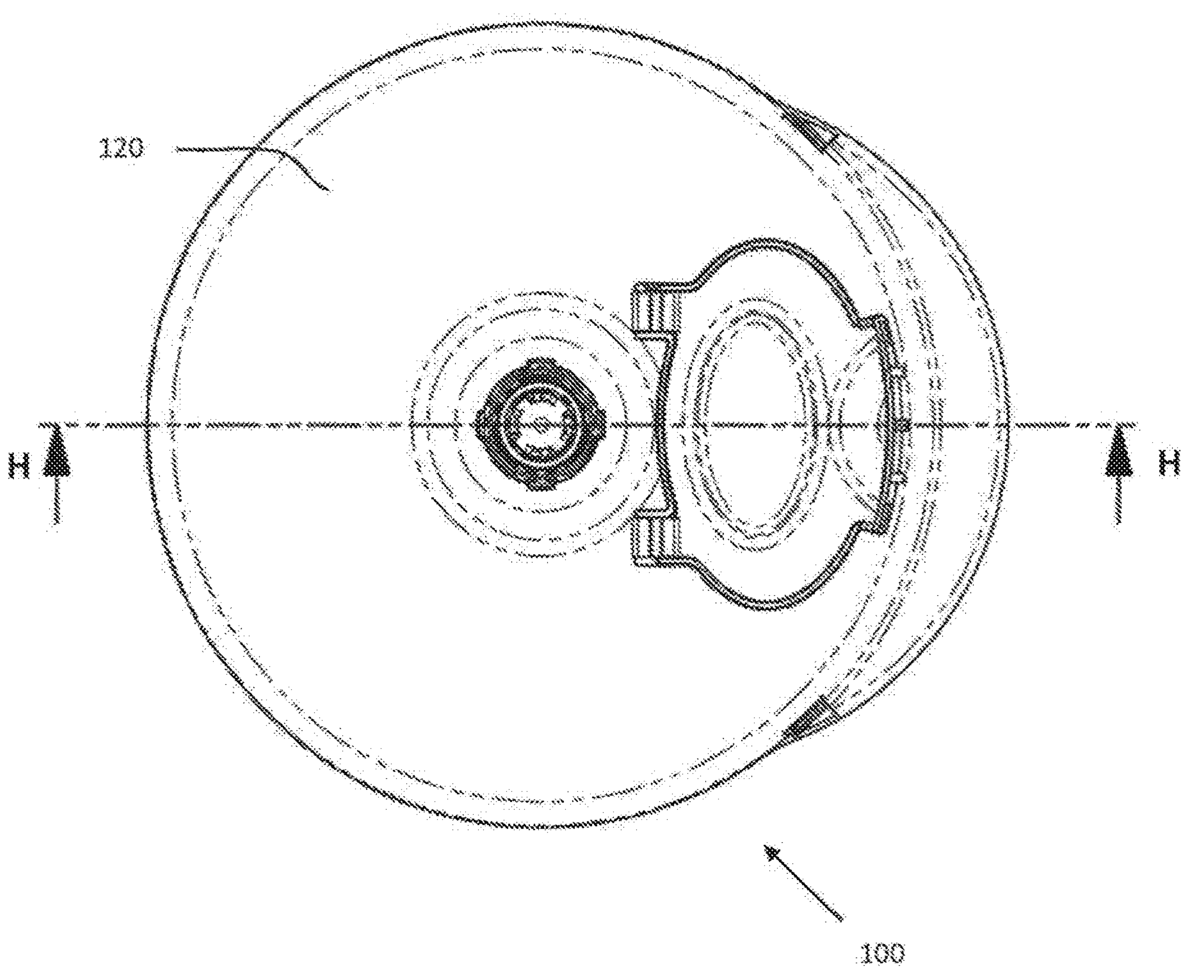
FIG. 1G is a simplified planar top view illustration of the SUPCA of FIGS. 1A-1F.
Figure 1H:
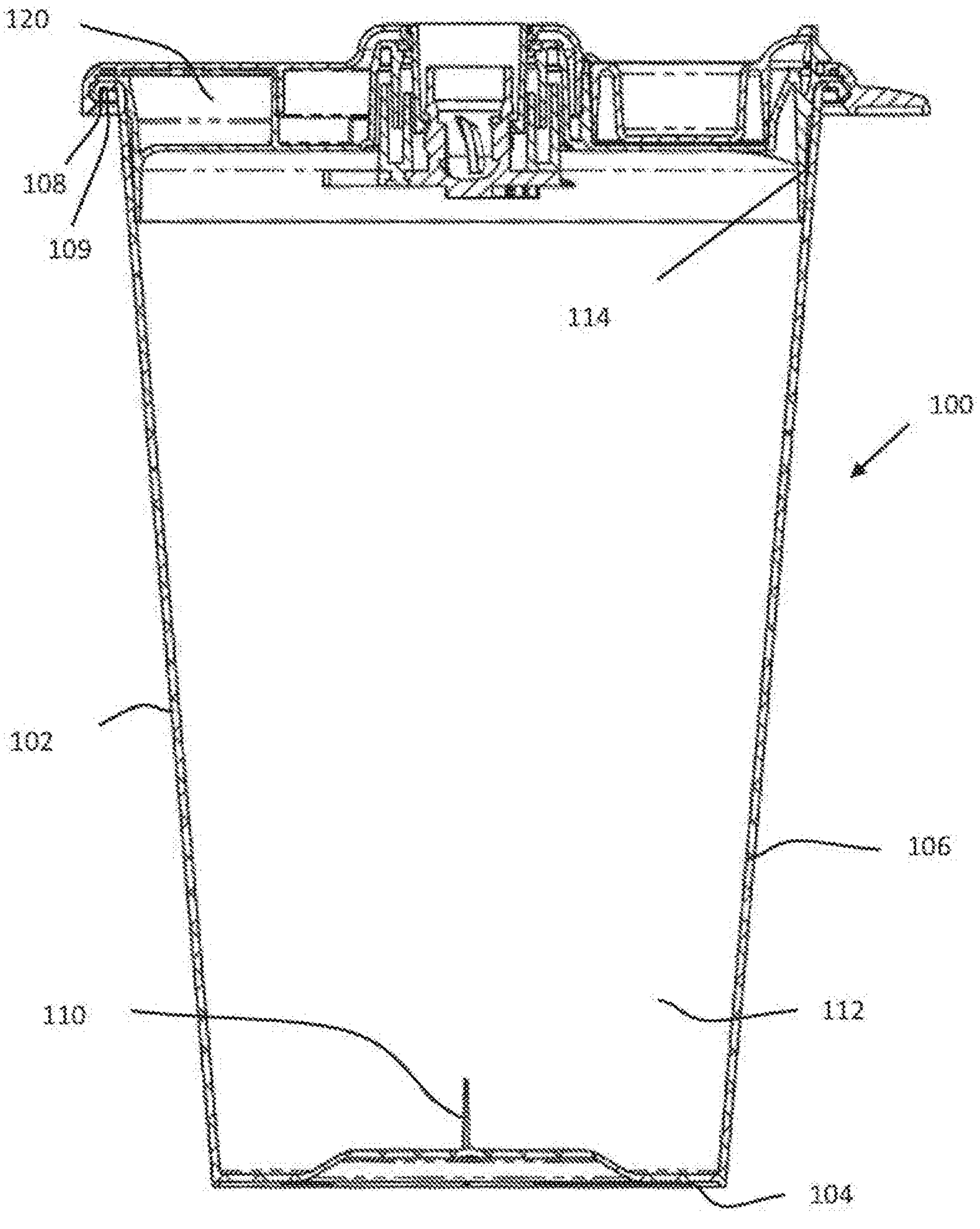
FIG. 1H is a simplified sectional illustration of the SUPCA of FIGS. 1A-1G, taken along lines H-H in FIG. 1G.

Reference is now made to FIGS. 1A and 1B, which are simplified respective top-facing and bottom-facing pictorial illustrations of a single-use preparation container assembly (SUPCA) 100 constructed and operative in accordance with a preferred embodiment of the present invention. FIGS. 1C and 1D, which are simplified first and second side view illustrations of the single-use preparation container assembly (SUPCA) of FIGS. 1A and 1B, taken along directions indicated by respective arrows C and D in FIG. 1A. FIGS. 1E and 1F, which are simplified respective top-facing and bottom-facing partially exploded view illustrations of the single-use preparation container assembly (SUPCA) of FIGS. 1A-1D. FIG. 1G, which is a simplified planar top view illustration of the SUPCA of FIGS. 1A-1F, and FIG. 1H, which is a simplified sectional illustration of the SUPCA of FIGS. 1A-1G, taken along lines H-H in FIG. 1G.

The single-use preparation container assembly (SUPCA) 100 is also referred to as a product container assembly. SUPCA 100 is preferably used for food products but is not limited for use therewith unless explicitly stated hereinbelow.

As seen in FIGS. 1A-1H. SUPCA 100 preferably includes a cup body, such as a single-use container body 102, for containing a food product prior to, during and following food preparation. Single-use container body 102 may be any suitable container body 102 and is preferably a truncated conical shaped container, preferably formed of polypropylene or paper having a bottom wall 104, a truncated conical side wall 106 and a circumferential rim 108. Circumferential rim 108 has a downwardly-facing surface 109. Truncated conical side wall 106 is preferably formed with at least one, and typically three, mutually azimuthally distributed ribs 110 on an inner surface 112 thereof. Ribs 110 are operative to reduce vacuum sealing in the case that multiple single-use container bodies 102 are stacked together. Inner surface 112 includes an upper circumferential portion 114. In FIGS. 1A-1H a plastic cup, preferably formed of polypropylene, is shown.

In accordance with a preferred embodiment of the invention, there is also provided a cup closure assembly, such as a single-use cover seal and externally rotatably drivable rotary engagement assembly (SUCSERDREA) 120, for both human and machine sensible tamper-evident and re-use preventing fluid sealing engagement with single-use container body 102.

SUCSERDREA 120 is preferably used for food products but is not limited for use therewith unless explicitly stated hereinbelow.

It is a particular feature of the present invention that the same SUCSERDREA 120 is configured for use with container bodies 102 having different sizes and configurations, provided that their circumferential rim 108 is of a uniform size.

A preferred embodiment of SUCSERDREA 120 is illustrated in detail in FIGS. 2A-6G. As seen in FIGS. 2A-6G. SUCSERDREA 120 preferably includes a cover 130, a lid 140 and a blade 160. Cover 130 and lid 140 are preferably formed of polypropylene, and blade 160 is preferably formed of polyoxymethylene or polypropylene.

Cover 130, lid 140 and blade 160 are connected to each other in a normally non-fully disengageable manner, preferably by a rotatable snap fit engagement of lid 140 and blade 160 and by a non-rotatable snap fit engagement of cover 130 and lid 140. Blade 160 is arranged for liquid-sealed rotation with respect to cover 130 and lid 140.

SUCSERDREA 120 preferably includes a machine-readable information source 162, preferably an RFID tag, but alternatively a bar-coded label or any other suitable machine-readable information source. Preferably, at least part of the information contained on machine-readable information source 162 is encrypted. Information source 162 may contain some or all of the information relevant to the contents of SUPCA 100 and its processing and/or may provide a reference, such as a link to information available on the internet.

It is appreciated that information source 162 is operative to be read both by a multiple motion intelligent driving device (MMIDD), such as the MMIDD described hereinbelow with reference to FIGS. 7A-37G, and by a generic reader, e.g., one found in a smartphone or other electronic device that either is or is not connected to at least one external network.

Reference is now particularly made to FIGS. 4A, 4B, 4C, 4D, 4E, 4F, 4G, 4H and 4I, which are simplified respective pictorial top, pictorial bottom, planar top, planar bottom, first planar side view, second planar side view, first planar sectional, second planar sectional and third planar sectional illustrations of cover 130, forming part of the single-use cover, seal and externally rotatably drivable rotary engagement assembly (SUCSERDREA) 120 of FIGS. 2A-3B.

Figure 3A:
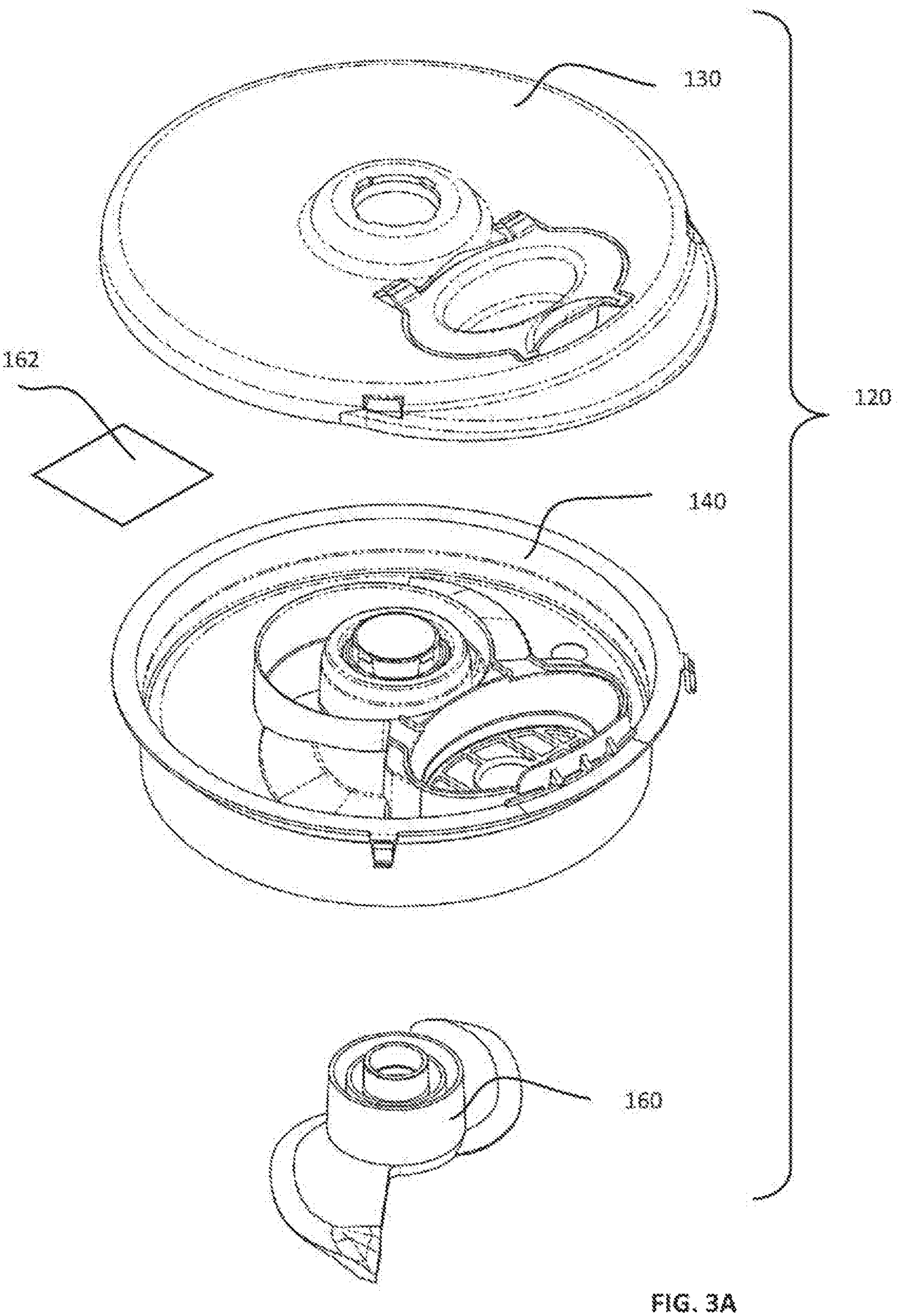
FIGS. 3A and 3B are simplified respective downwardly-facing and upwardly-facing exploded view illustrations of the SUCSERDREA of FIGS. 2A-2C.
Figure 3B:
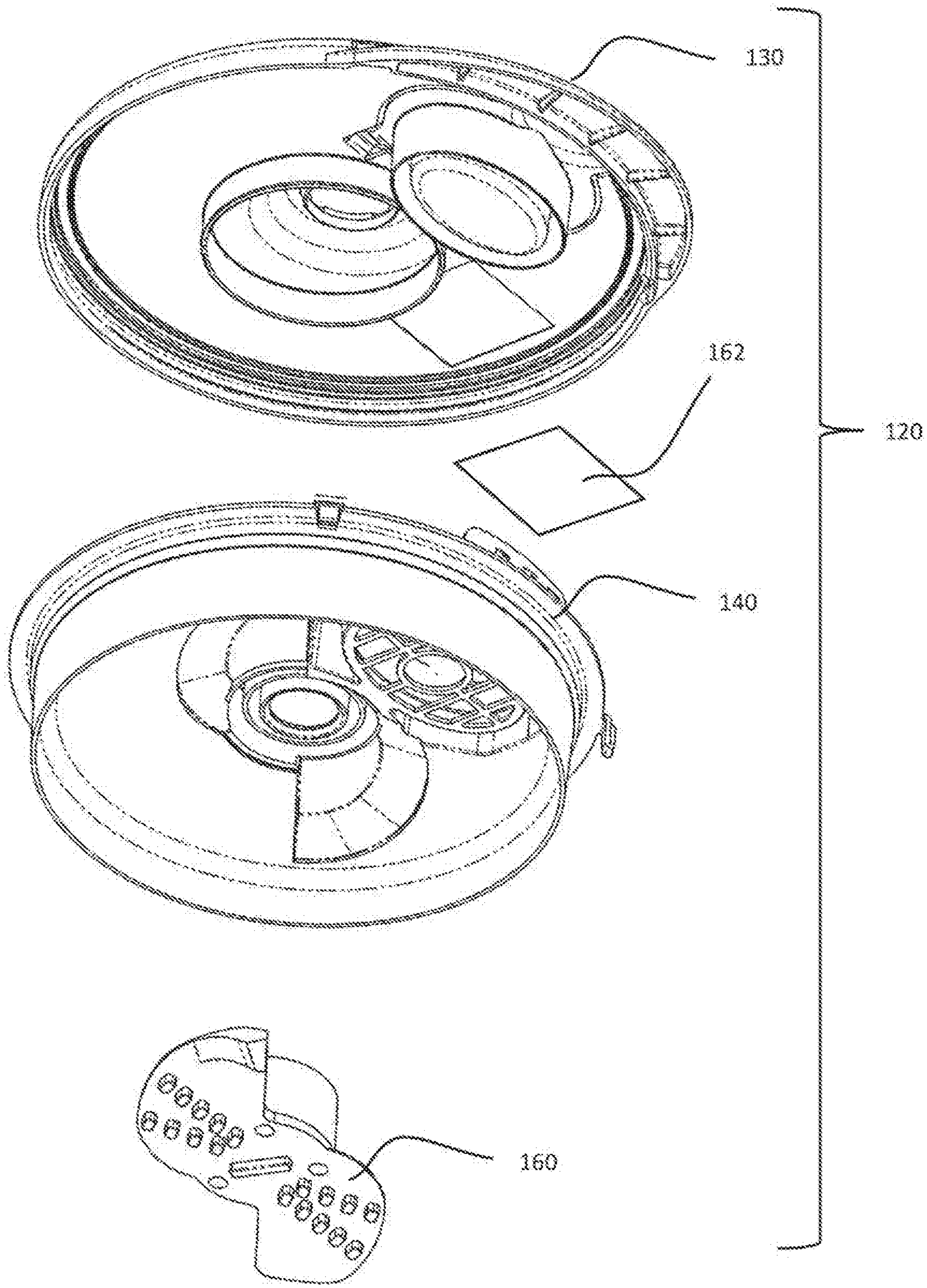
Figure 4A:
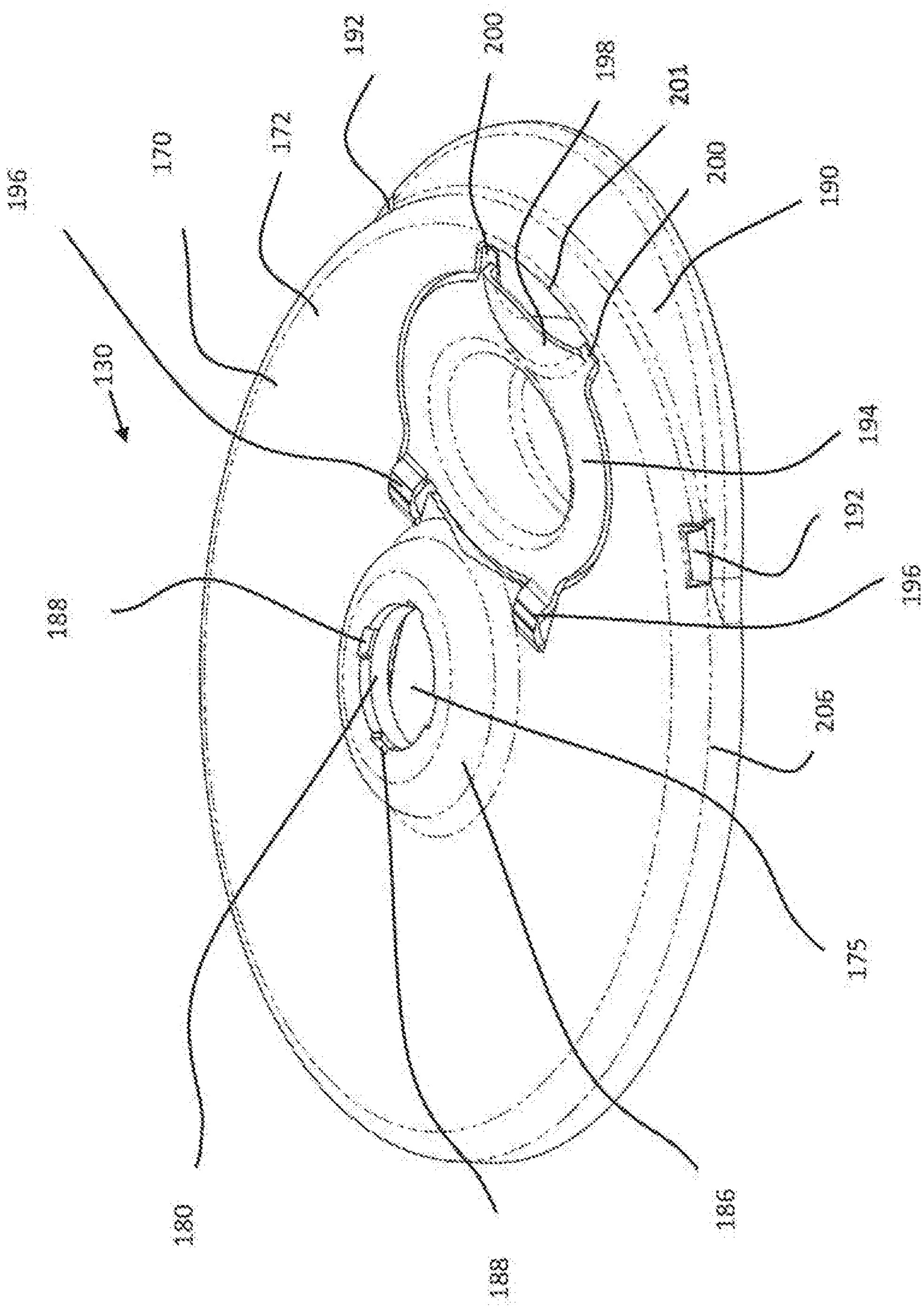
FIGS. 4A, 4B, 4C, 4D, 4E, 4F, 4G, 4H and 4I are simplified respective pictorial top, pictorial bottom, planar top, planar bottom, first planar side view, second planar side view, first planar sectional, second planar sectional and third planar sectional illustrations of a cover, forming part of the single-use cover, seal and externally rotatably drivable rotary engagement assembly (SUCSERDREA) of FIGS. 2A-3B.
Figure 4B:
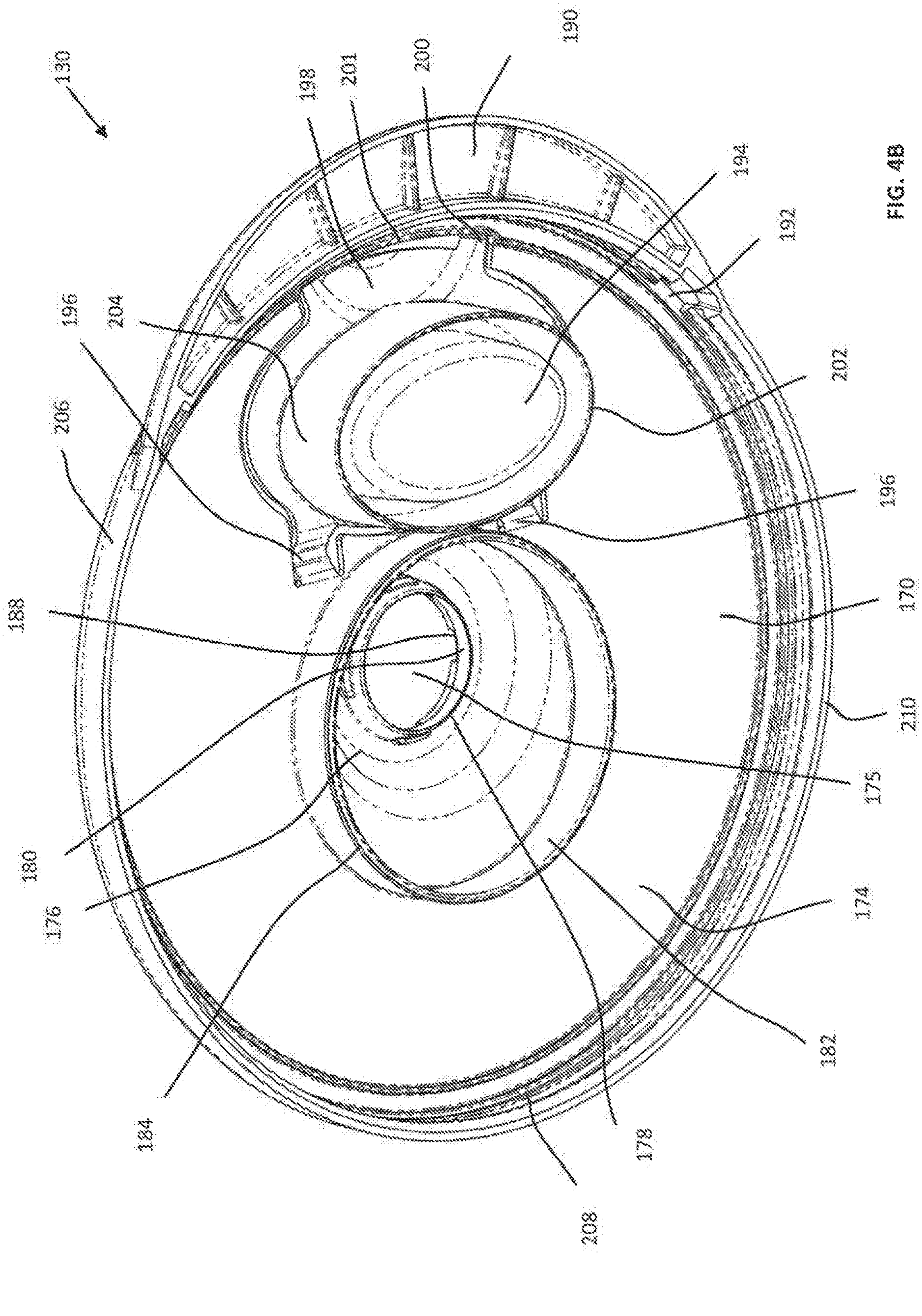
Figure 4C:
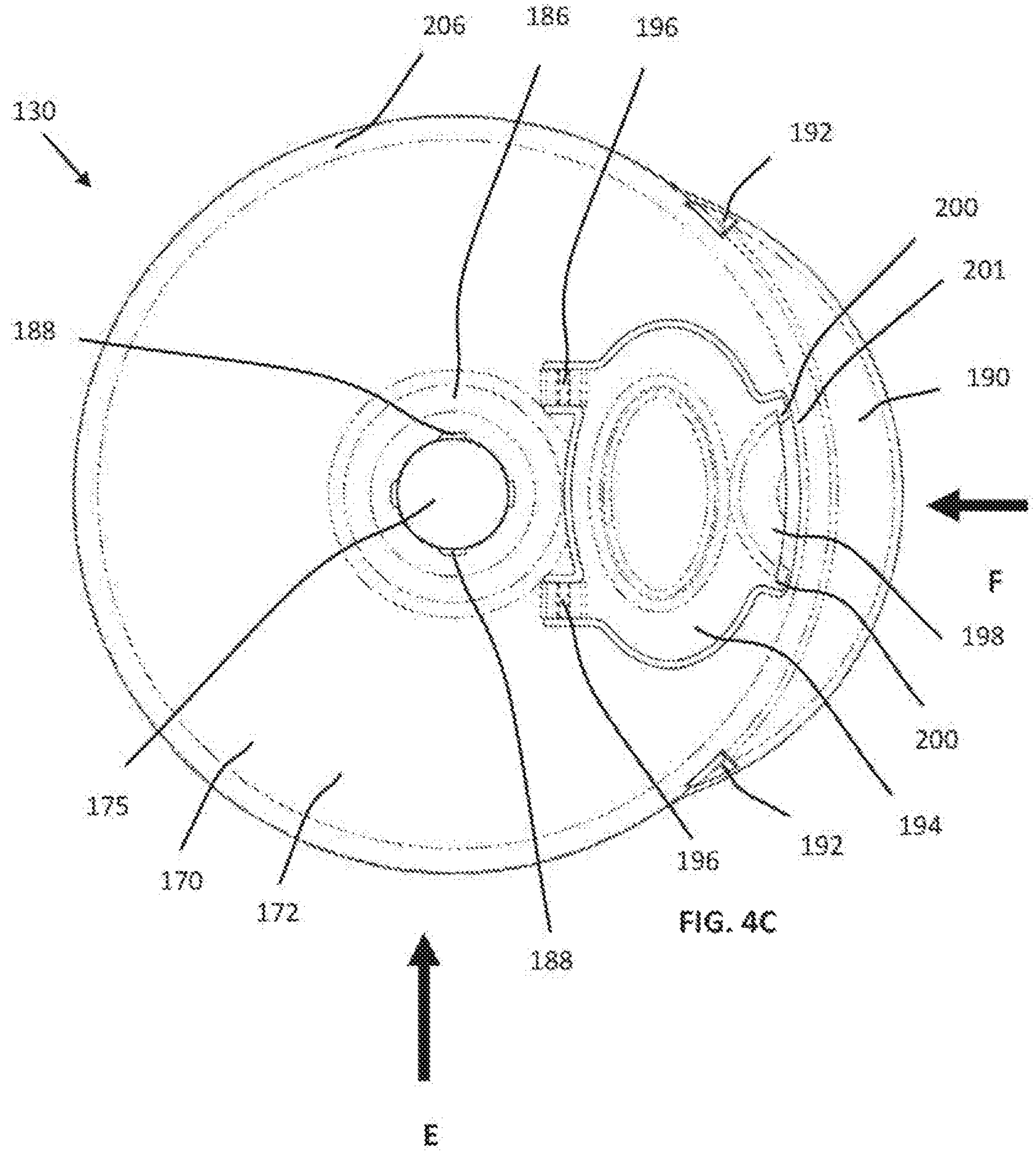
Figure 4D:
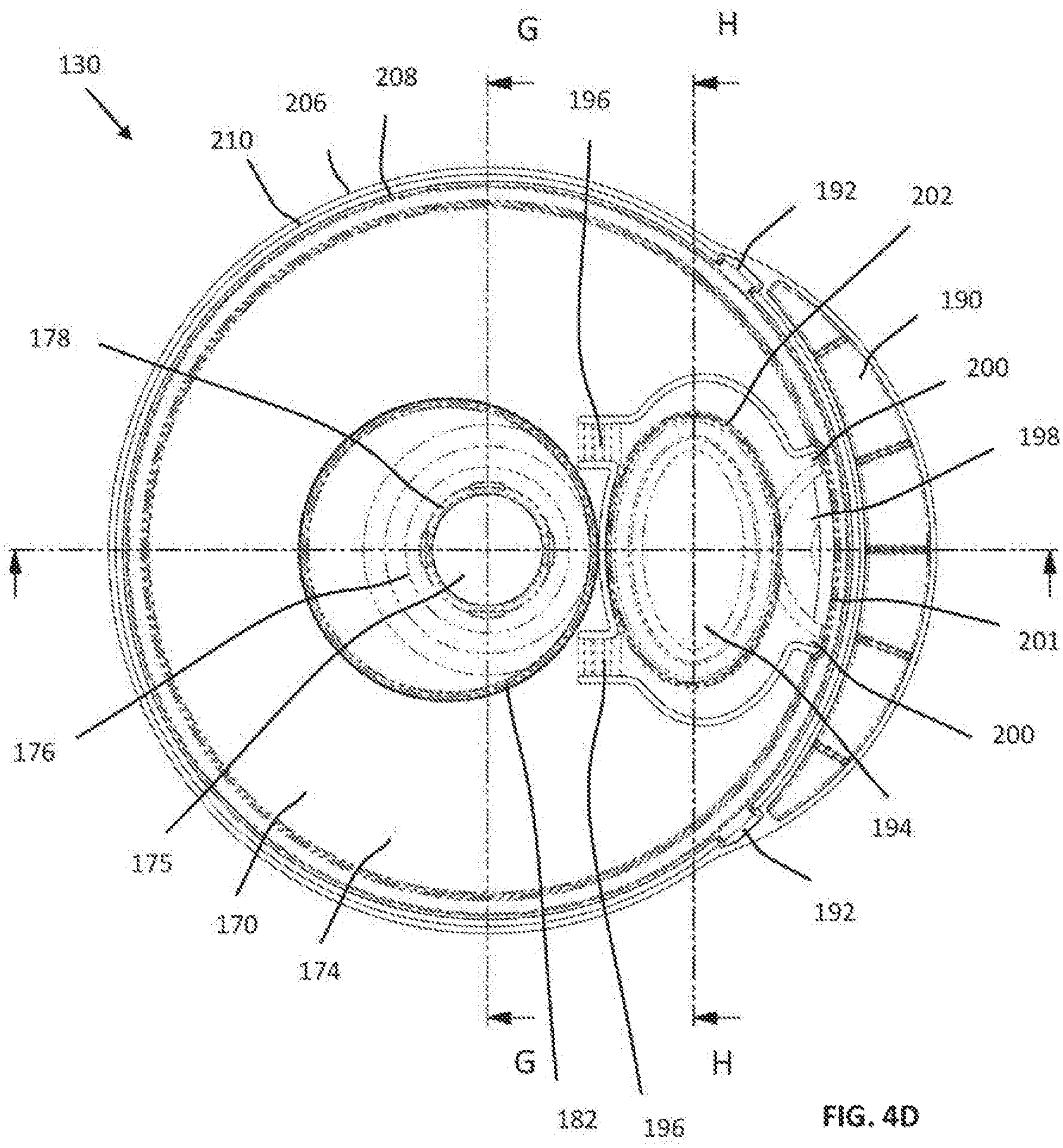
Figure 4E:
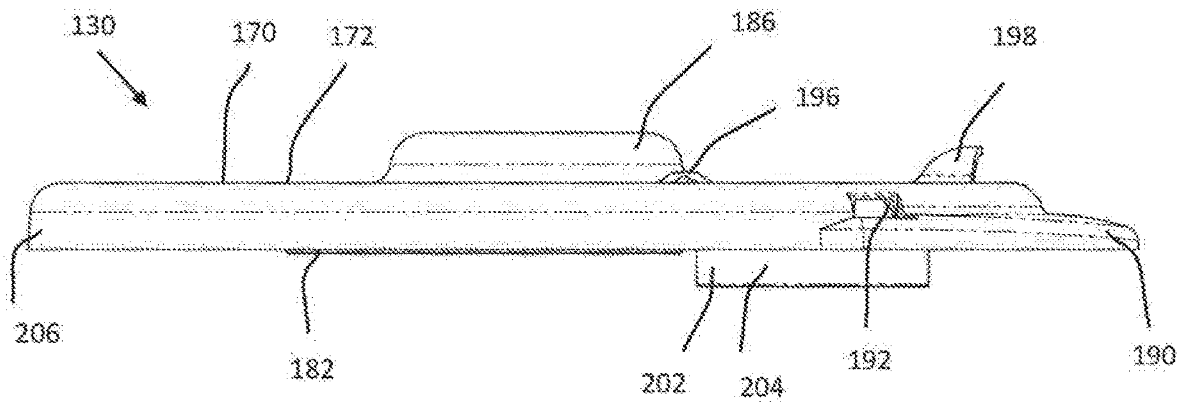
Figure 4F:
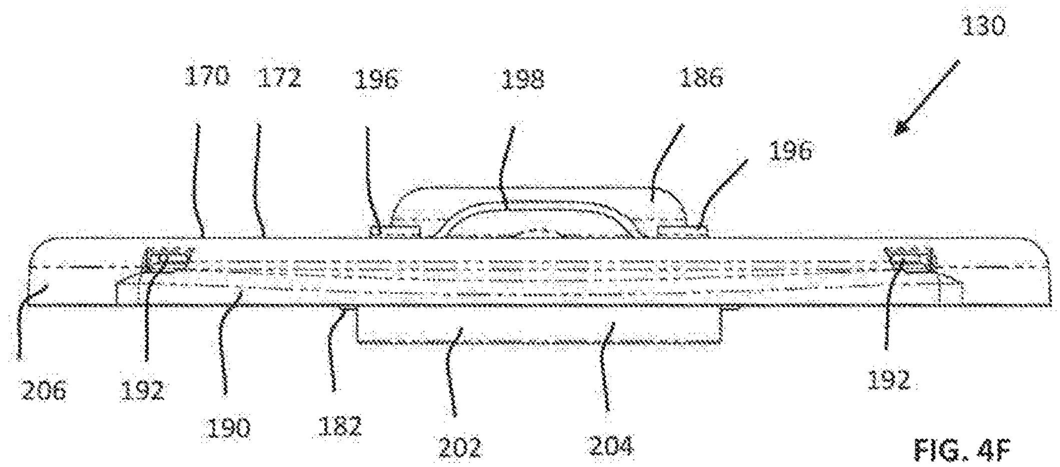
Figure 4G:
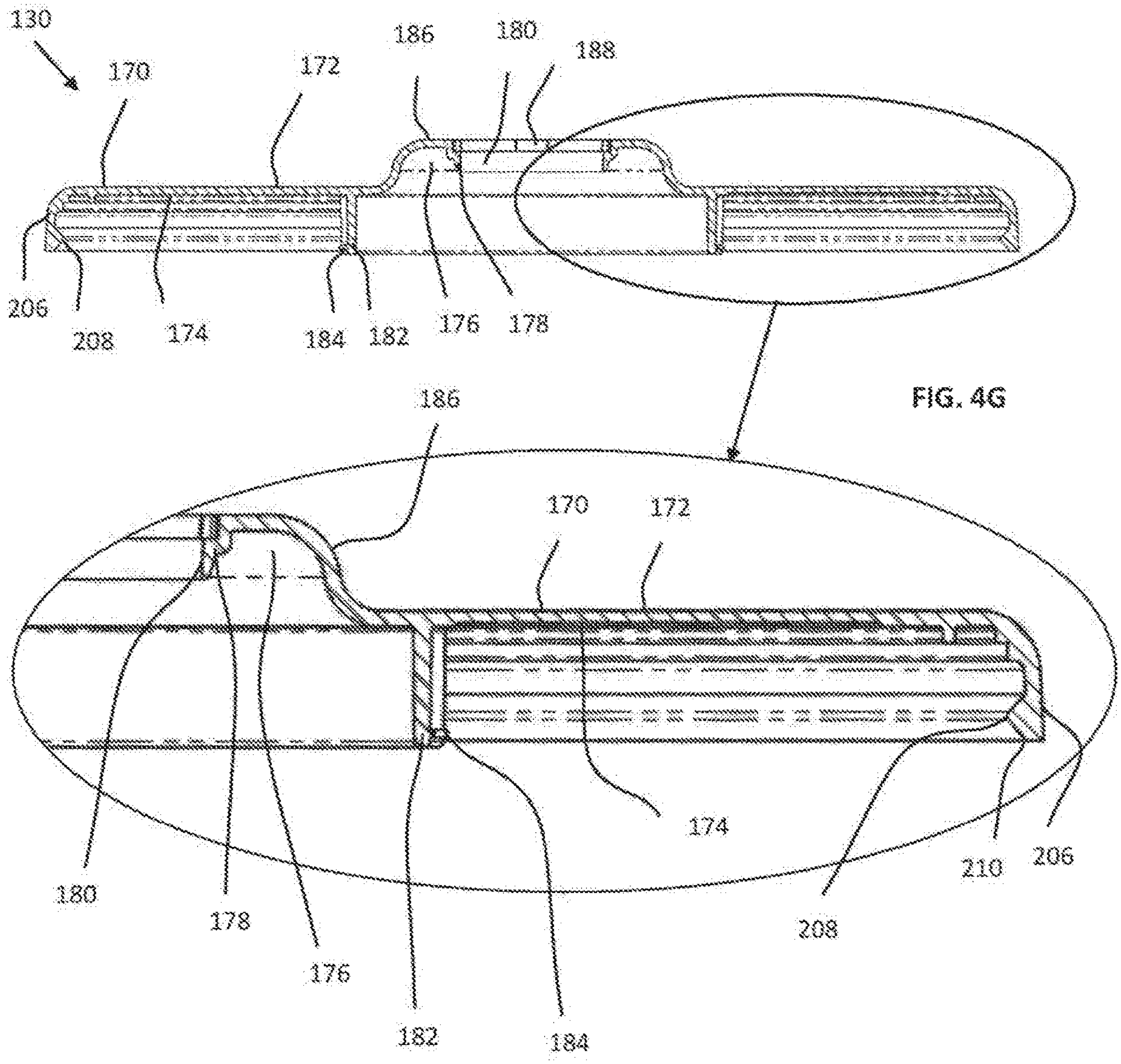
Figure 4H:
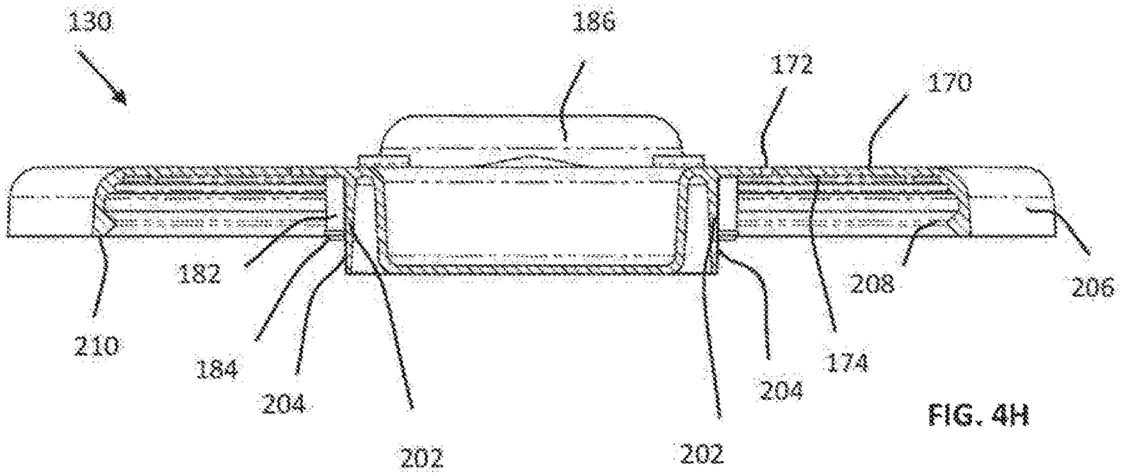
Figure 4I:
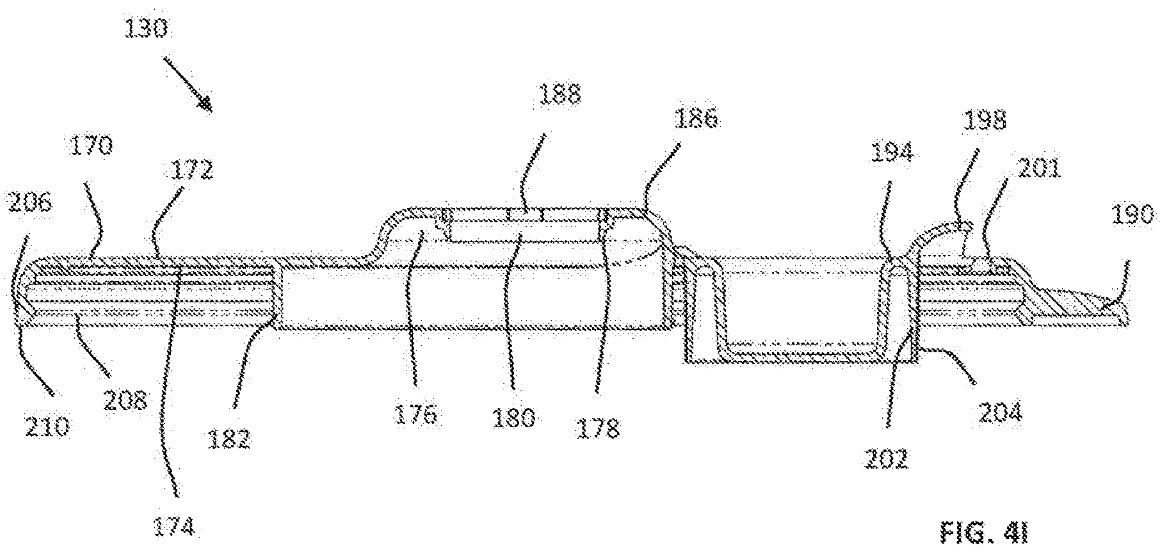

As seen in FIGS. 4A-4I, cover 130 preferably includes a generally circular planar portion 170 having an upwardly-facing surface 172, in the sense of FIG. 3A, and a downwardly-facing surface 174, in the sense of FIG. 3B. A central aperture 175 is formed in generally circular planar portion 170. A generally circular circumferential recess 176 is formed on downwardly-facing surface 174 surrounding central aperture 175. Recess 176 is separated from central aperture 175 by a downwardly-facing, generally circular generally circumferential protrusion 178. Generally circular, generally circumferential protrusion 178 is formed with a radially inwardly-facing inclined surface 180, as seen particularly in an enlargement forming part of FIG. 4G, and defines a snap fit fluid seal with lid 140.

An additional downwardly-facing, generally circular generally circumferential protrusion 182 is formed on downwardly-facing surface 174. Protrusion 182 is not coaxial with protrusion 178 and defines part of a fluid retaining chamber, as is described hereinbelow with reference to FIGS. 5A-5K. Protrusion 182 is formed with a rim 184, as seen particularly in the enlargement forming part of FIG. 4G.

Formed on top surface 172 of generally circular planar portion 170 is a generally annular protrusion 186, which surrounds central aperture 175. Protrusion 186 corresponds to recess 176 formed on surface 174 and is formed with four mutually azimuthally distributed recesses 188 which communicate with central aperture 175.

A user-engageable front flap 190 is integrally formed with generally circular planar portion 170. A pair of apertures 192 are formed at opposite ends of front flap 190 for receiving tamper-evidencing and re-use preventing tabs, as is described hereinbelow with reference to FIGS. 5A-5K.

Also formed in generally circular planar portion 170 is an integrally hinged access door 194 including integral hinges 196. A finger engagement portion 198 is defined as a raised portion of access door 194. A pair of tamper-prevention protrusions 200 are located on opposite sides of access door 194 and extend radially-outwardly toward an edge 201 of an opening sealed by access door 194.

The underside of access door 194 includes a circumferential downwardly-directed protrusion 202, an outer surface 204 of which is operative to resealably engage a corresponding surface of lid 140, as is described hereinbelow with reference to FIGS. 5A-5K.

Circular planar portion 170 is surrounded by a generally circular circumferential edge portion 206, which defines on a radially inwardly- and downwardly-facing surface thereof a rim 208 and a downwardly-facing portion 210, which rim 208 is operative for snap fit engagement with rim 108 of container body 102. Rim 208 is interrupted by apertures 192.

Figure 5A:
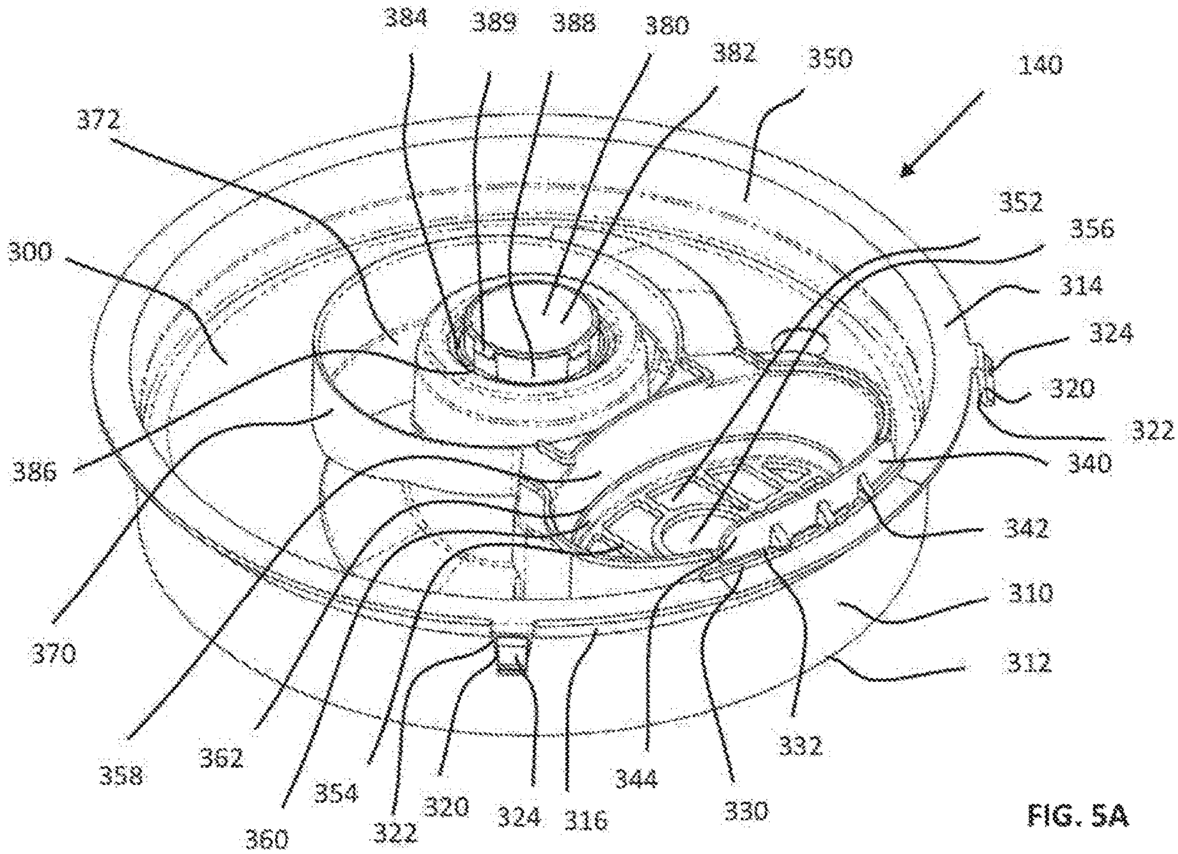
FIGS. 5A and 5B are simplified respective first and second pictorial top illustrations in respective first and second operative orientations of a lid, forming par of the single-use cover, seal and externally rotatably drivable rotary engagement assembly (SUCSERDREA) of FIGS. 2A-4I.
Figure 5B:
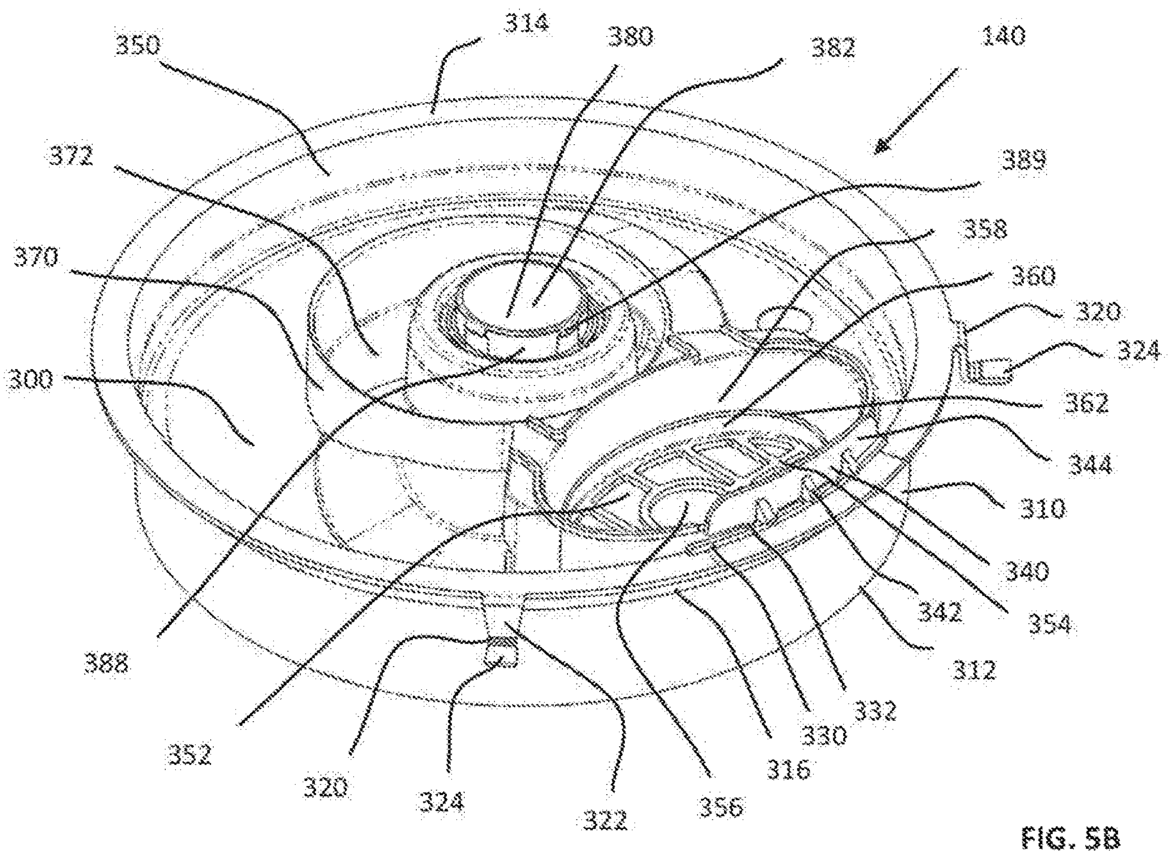

Reference is now made particularly to FIGS. 5A and 5B, which are simplified respective first and second pictorial top illustrations in respective first and second operative orientations of lid 140, forming part of the single-use cover, seal and externally rotatably drivable rotary engagement assembly (SUCSERDREA) 120 of FIGS. 2A-4I, FIGS. 5C and 5D, which are simplified respective first and second pictorial bottom illustrations in the respective first and second operative orientations of FIGS. 5A and 5B of the lid 140 of FIGS. 5A-5B, and FIGS. 5E, 5F, 5G, 5H, 5I, 5J and 5K, which are simplified respective, planar top, planar bottom, first planar side view, second planar side view, first planar sectional, second planar sectional and third planar sectional illustrations of the lid 140 of FIGS. 5A-5D.

As seen in FIGS. 5A-5K, lid 140 preferably is a generally circular, generally planar element 300 having a generally circumferential cylindrical outer edge surface 310 that extends upwardly from a downwardly-facing edge 312 towards a peripheral flange 314. Outer edge surface 310 is configured to sealingly engage upper circumferential portion 114 of inner surface 112 of container body 102, and peripheral flange 314 is configured to seat on rim 108 of container body 102. Sealing between outer edge surface 310 and upper circumferential portion 114 of inner surface 112 of container body 102 is enhanced by a circumferential sealing protrusion 316 formed on outer edge surface 310.

Integrally formed with and extending downwardly and radially outwardly from flange 314 are a pair of tamper evidencing and re-use preventing tabs 320. Tabs 320 each include a downwardly-extending portion 322 and a radially outwardly-extending portion 324 extending from portion 322.

FIG. 5A illustrates tabs 320 in an operative orientation where portions 322 and 324 are forced into a mutually parallel orientation by insertion thereof into apertures 192 in cover 130. FIG. 5B illustrates tabs 320 in an operative orientation where tabs 320 are disengaged from apertures 192, such as by disengagement of SUCSERDREA 120 from container body 102, and thus portion 324 is allowed to assume an extended orientation relative to portion 322. As described in detail hereinbelow with reference to FIG. 48, when portion 324 is in its extended orientation. SUPCA 100 can no longer be processed by a multiple motion intelligent driving device (MMIDD), such as the MMIDD described hereinbelow with reference to FIGS. 7A-37G.

Extending upwardly, in the sense of FIG. 1A, from flange 314 is a shallow elongate protrusion 330, from which extend in turn a plurality of integrally formed frangible connectors 332, which terminate in a user-removable multi-function restricting portion 340, preferably in the form of a tab. User-removable multi-function restricting portion 340 is a generally slightly curved planar element having a plurality of teeth 342 extends radially outwardly from a radially outward surface 344 thereof.

It is appreciated that user-removable multi-function restricting portion 340 is integrally formed with flange 314 and, both prior to and following use of SUPCA 100, as is described hereinbelow with reference to FIGS. 38A-60, shallow elongate protrusion 330 defines a positioning stop for tamper prevention protrusions 200 of access door 194.

It is a particular feature of an embodiment of the present invention that when user-removable multi-function restricting portion 340 is attached to shallow elongate protrusion 330, tamper prevention protrusions 200 and thus access door 194 are effectively locked against opening by engagement of tamper prevention protrusions 200 of cover 130 with user-removable multi-function restricting portion 340.

It is another particular feature of an embodiment of the present invention that when user-removable multi-function restricting portion 340 is attached to shallow elongate protrusion 330, teeth 342 engage top surface 172 of generally circular planar portion 170 at edge 201 of the opening sealed by access door 194 and thus prevent lifting of front flap 190 and subsequent normal disengagement of SUCSERDREA 120 from container body 102, as described in detail hereinbelow with reference to FIGS. 57A-58B.

Extending downwardly, in the sense of FIG. 1A, from flange 314 is a radially-inwardly slightly tapered circumferential surface 350. Disposed inwardly of radially-inwardly circumferential surface 350 along a portion of the extent thereof, is an access opening 352 formed with a protective grid 354, preferably having a straw aperture 356.

Access opening 352 is selectably sealingly engaged by access door 194 of cover 130. The inner periphery of access opening 352 is partially defined by a tapered circumferential surface 358 which terminates downwardly in a non-tapered circumferential surface 360 and defines therewith a shoulder 362. Shoulder 362 is resealably engaged by outer surface 204 of access door 194.

An upwardly-facing, generally circular generally circumferential protrusion 370 is spaced from access opening 352 and defines therewith a fluid retaining chamber 372 which is partially defined by protrusion 182 of cover 130.

Located generally at the center of lid 140 is a rotary drive aperture 380, which is surrounded by a cylindrical wall 382. Surrounding cylindrical wall 382 is a circumferential recess 384 having a plurality of azimuthally distributed liquid passage apertures 386 which allow liquid to pass therethrough from the interior of SUPCA 100 and eventually reach fluid retaining chamber 372.

Formed on a radially outer surface 388 of cylindrical wall 382 are a plurality of azimuthally distributed snap fit protrusions 389 which are operative for snap fit engagement between lid 140 and cover 130 and more specifically engage recesses 188 in cover 130. It is appreciated that surface 180 of cover 130 sealingly engages surface 388 of lid 140 when cover 130, lid 140 and blade 160 are in snap fit engagement.

Figure 5C:
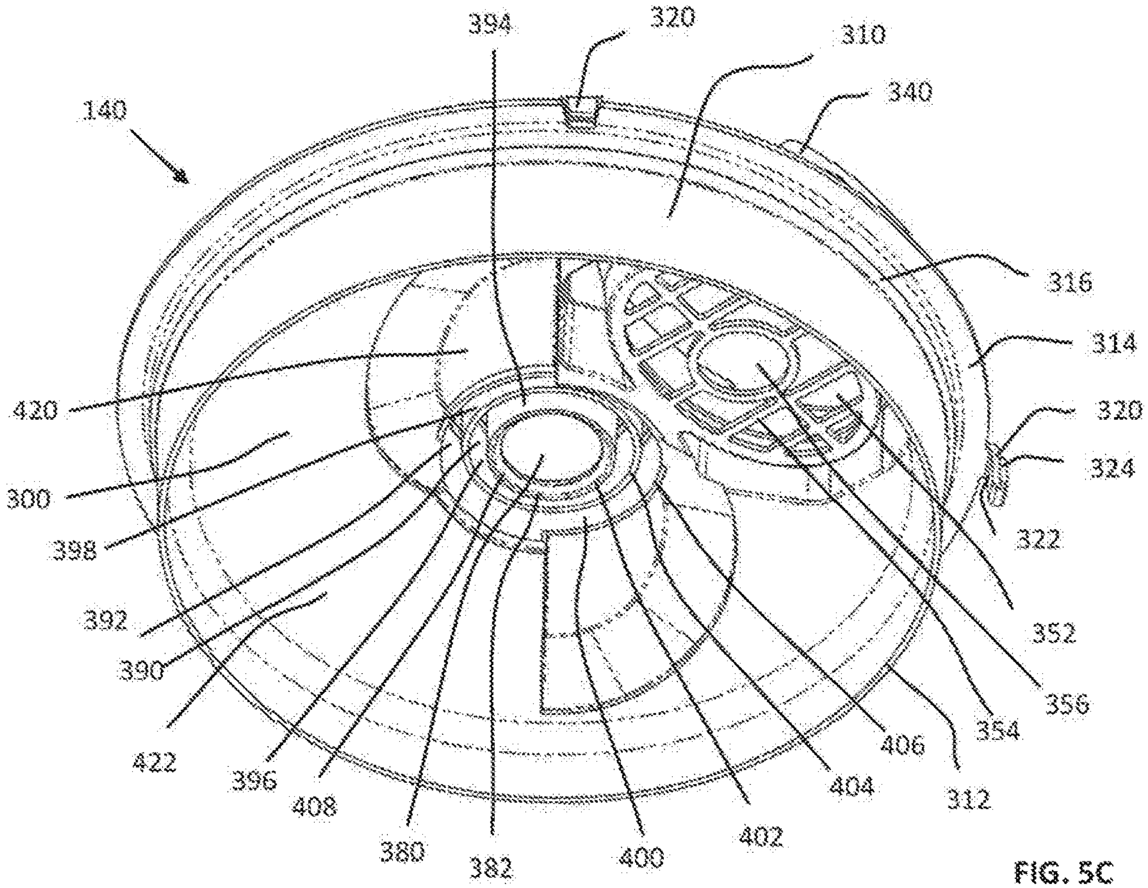
FIGS. 5C and 5D are simplified respective first and second pictorial bottom illustrations in the respective first and second operative orientations of FIGS. 5A and 5B of the lid of FIGS. 5A-5B.
Figure 5D:
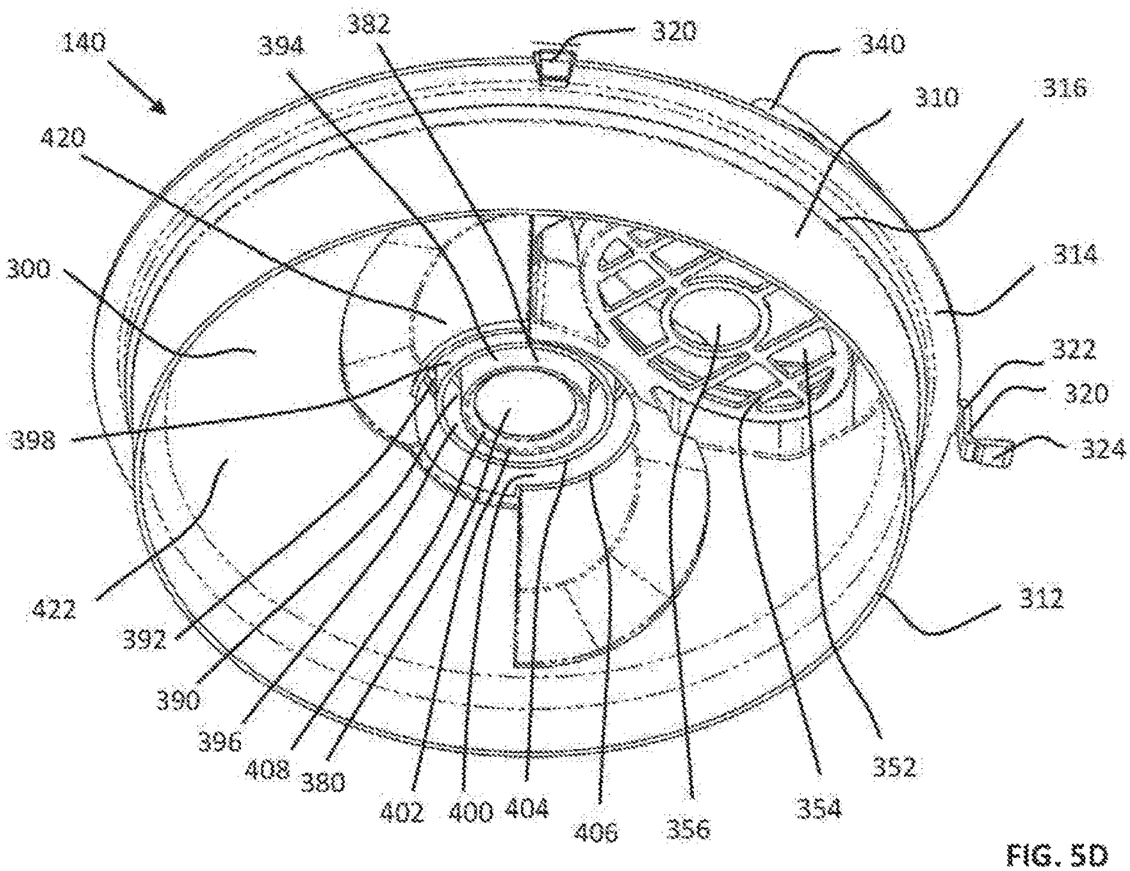
Figure 5E:
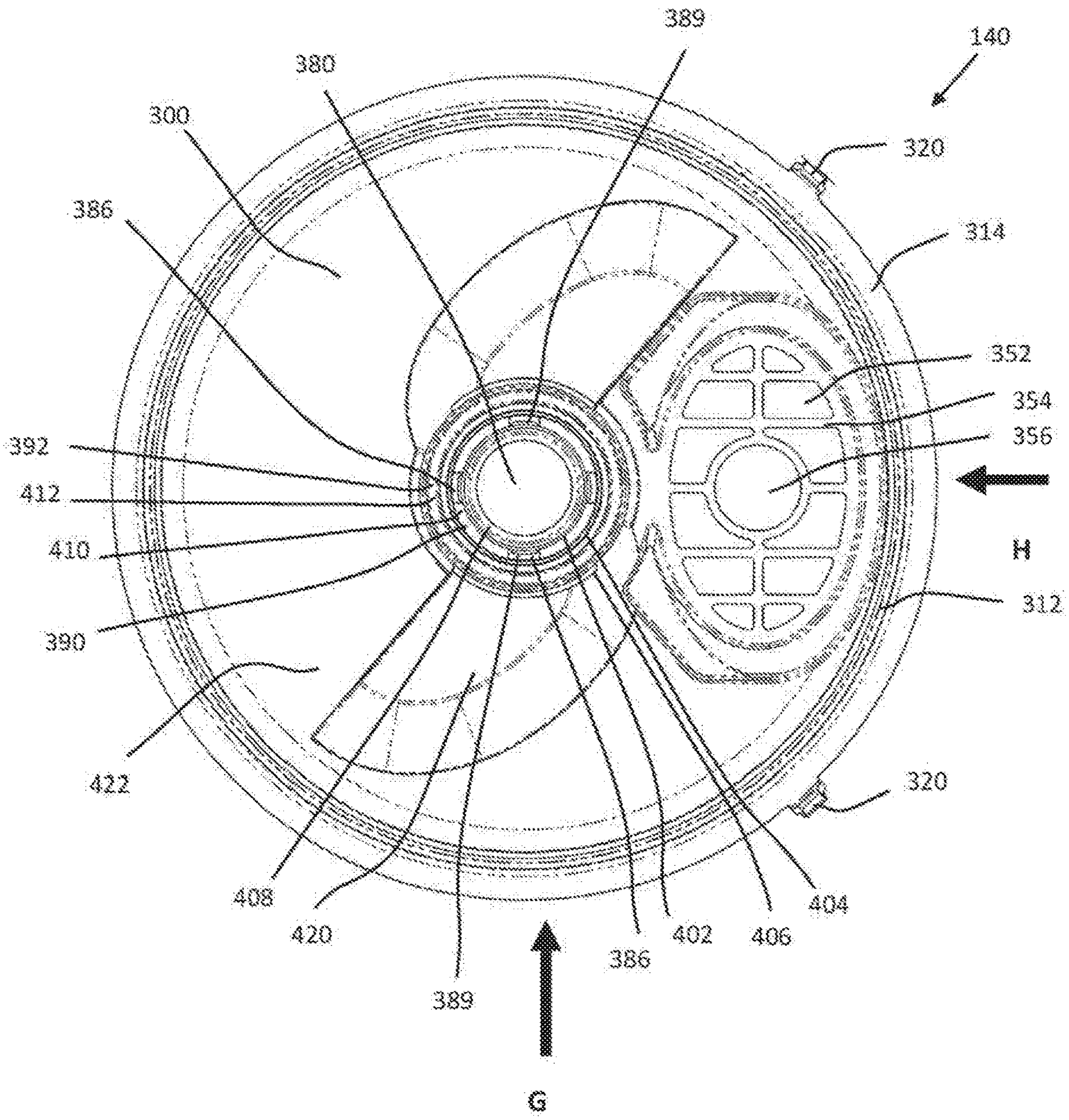
FIGS. 5E, 5F, 5G, 5H, 5I, 5J and 5K are simplified respective planar top, planar bottom, first planar side view, second planar side view, first planar sectional, second planar sectional and third planar sectional illustrations of the lid of FIGS. 5A-5D, FIGS. 5G and 5H being taken along directions indicated by respective arrows G and H in FIG. 5E and FIGS. 5I, 5J, and 5K being taken along respective section lines I-I, J-J and K-K in FIG. 5F.
Figure 5F:
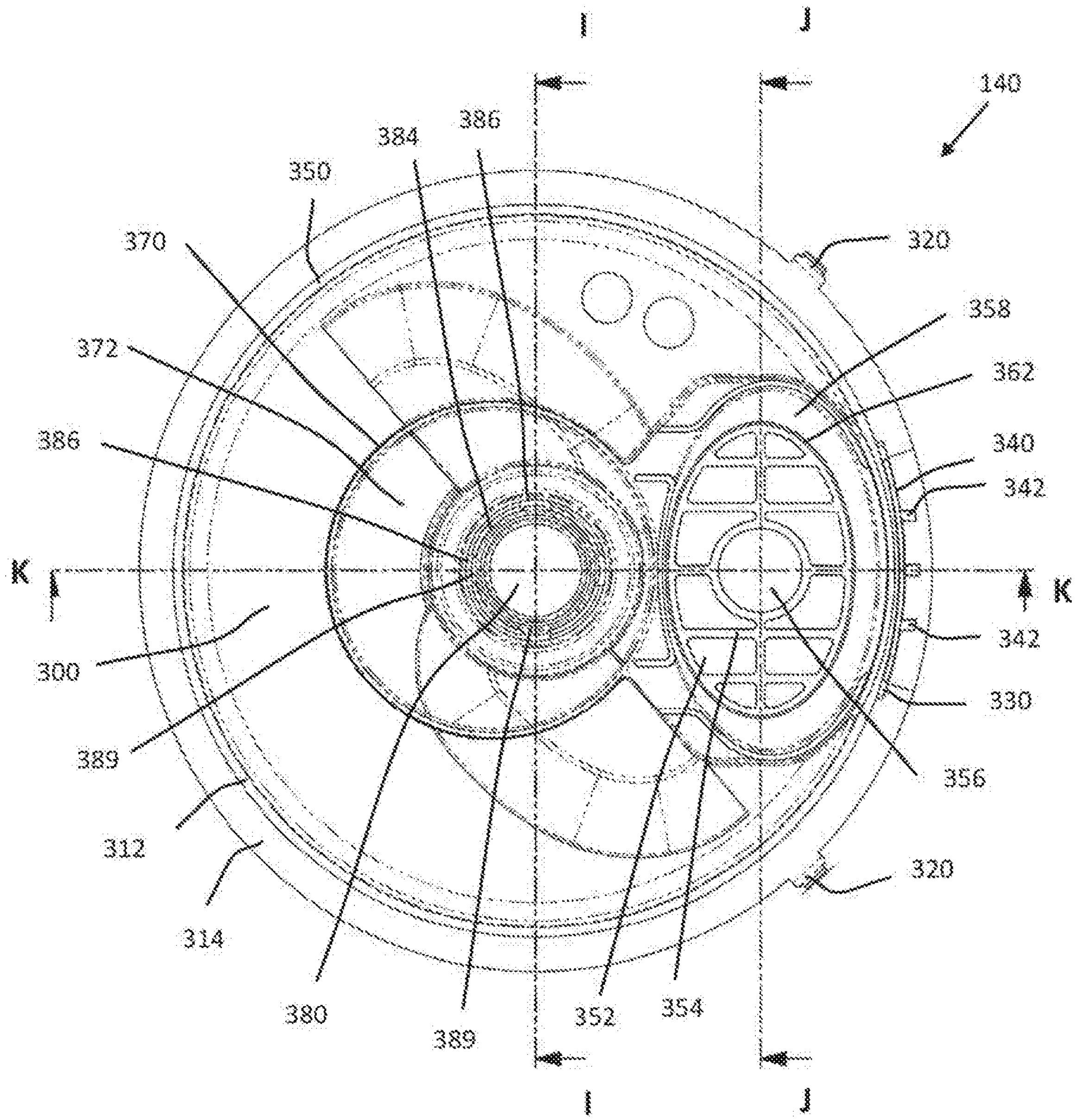
Figure 5G:
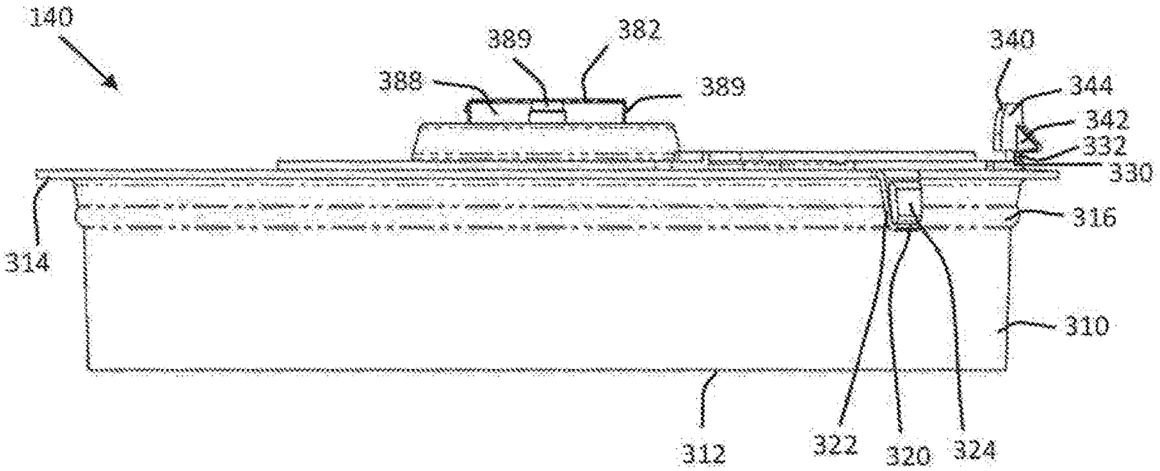
Figure 5H:
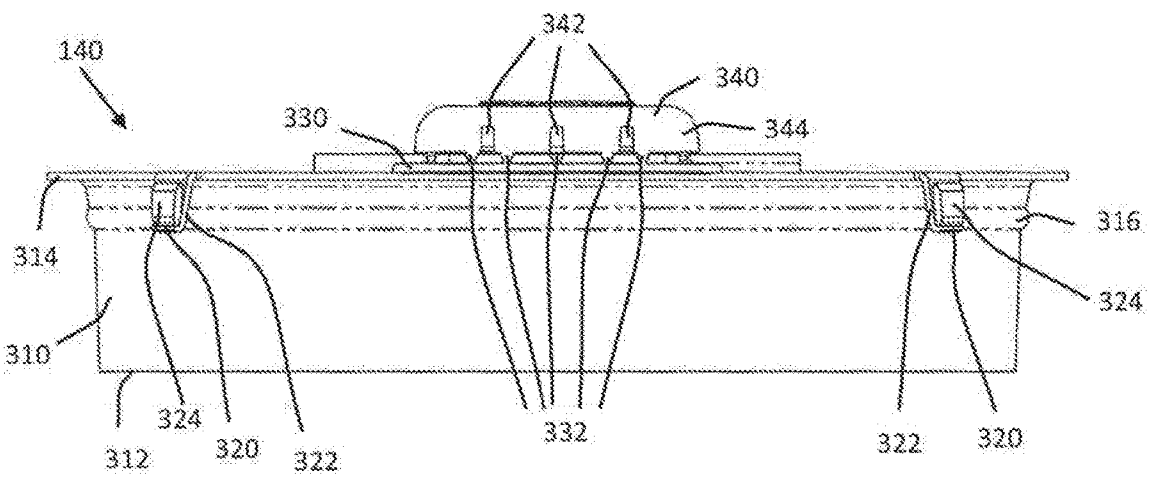
Figure 5I:
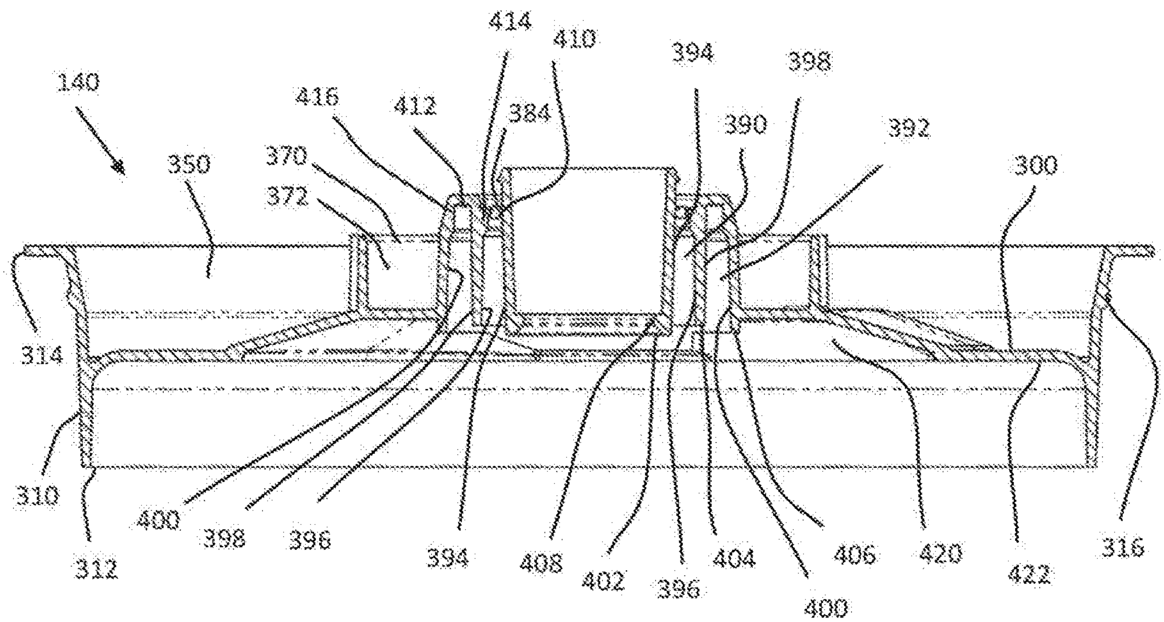
Figure 5J:
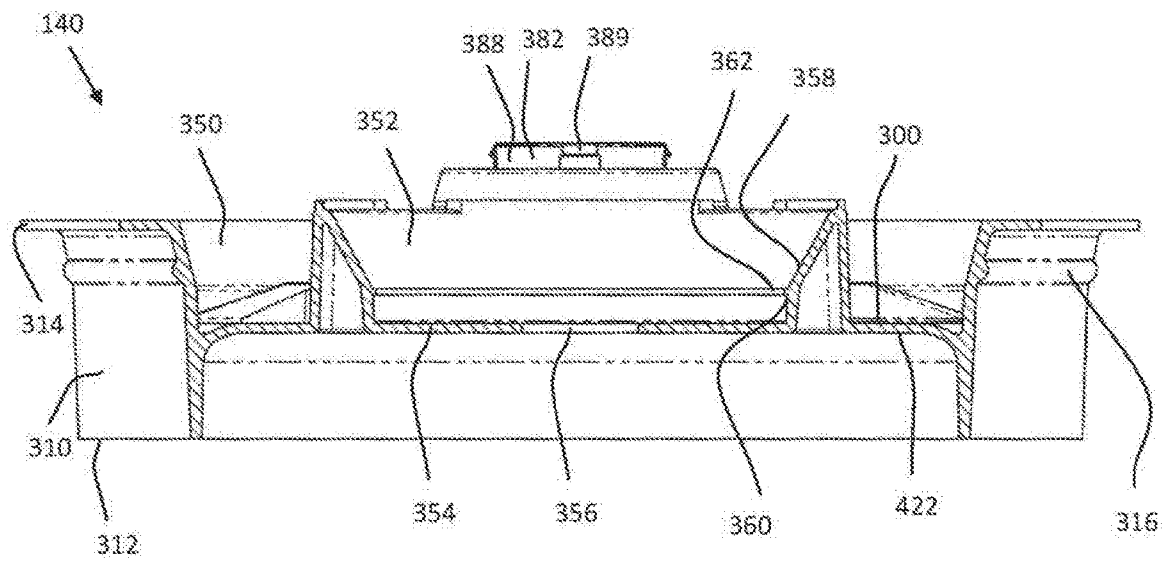
Figure 5K:
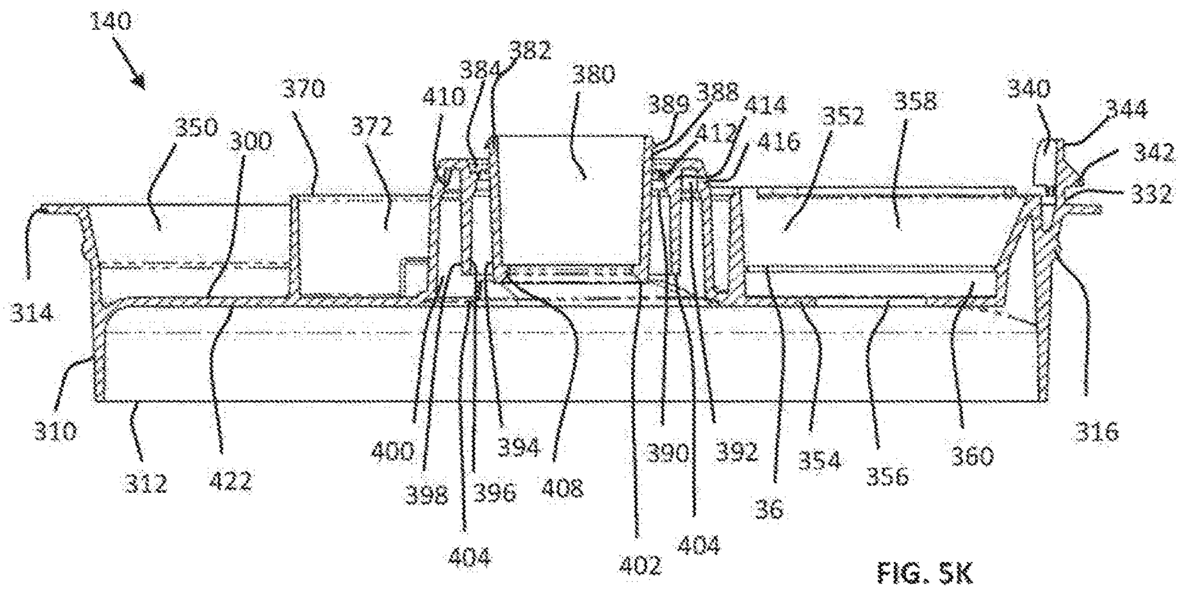
Figure 6A:
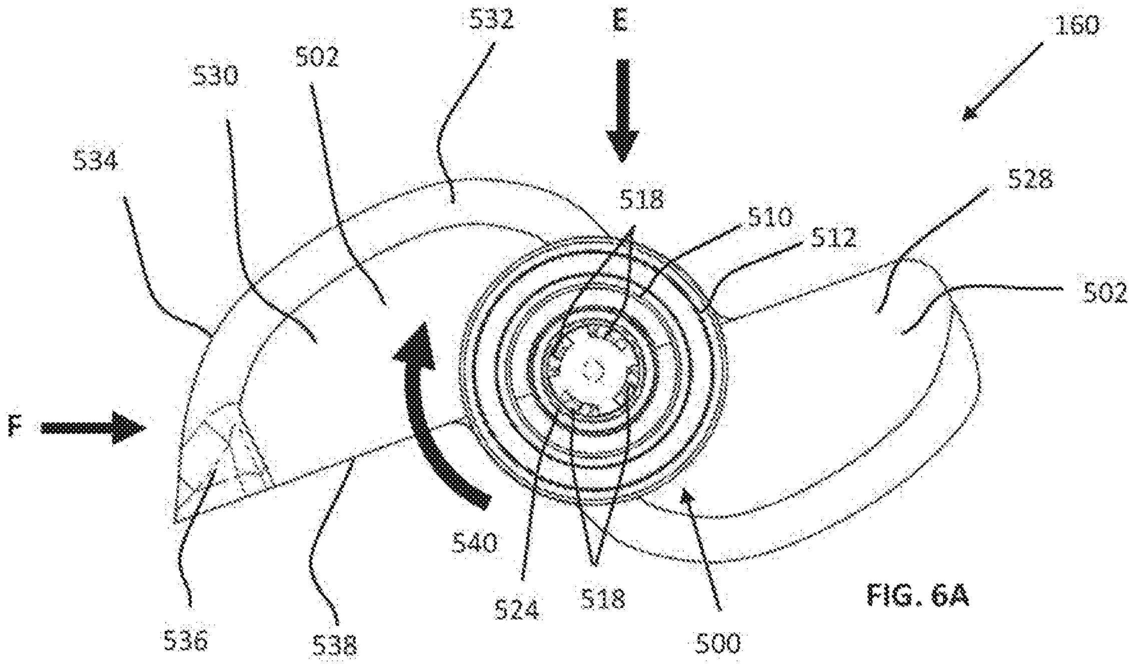
FIGS. 6A, 6B, 6C, 6D, 6E, 6F and 6G are simplified respective planar top, planar bottom, pictorial top, pictorial bottom, first side view, second side view and planar sectional illustrations of a preferred embodiment of a blade, forming part of the single-use cover, seal and externally rotatably drivable rotary engagement assembly (SUCSERDREA) of FIGS. 2A-5K.
Figure 6B:
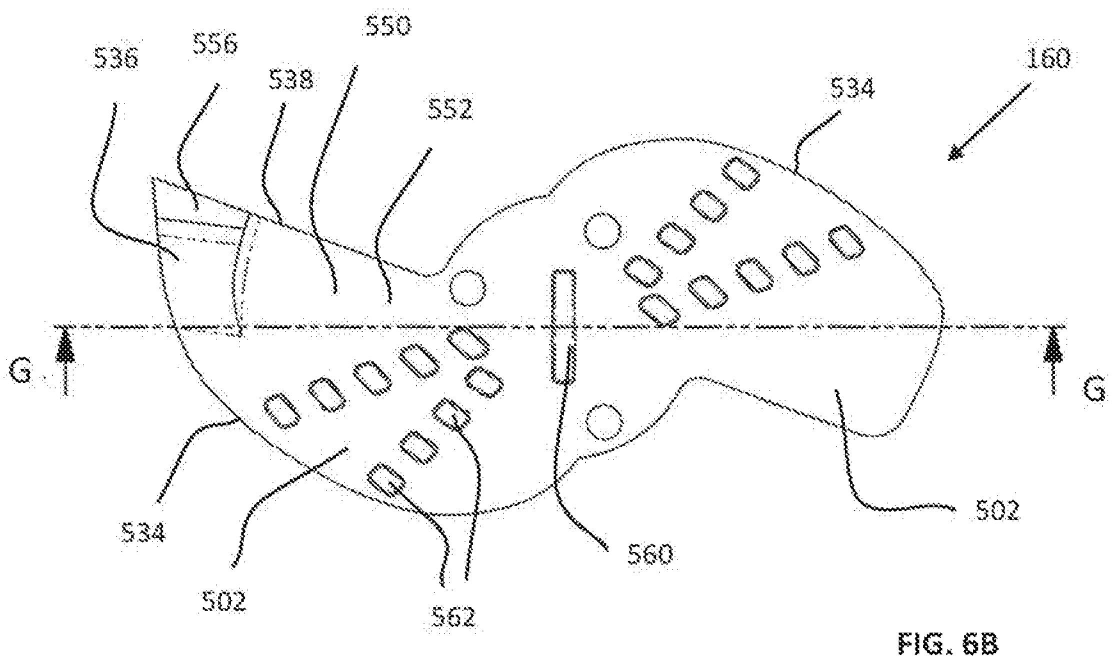
Figure 6C:
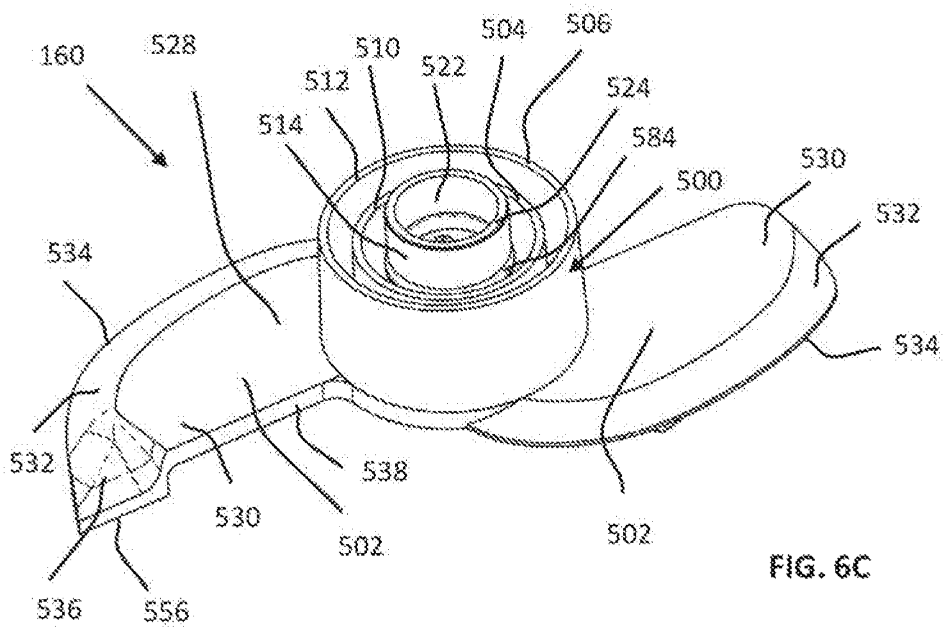
Figure 6D:
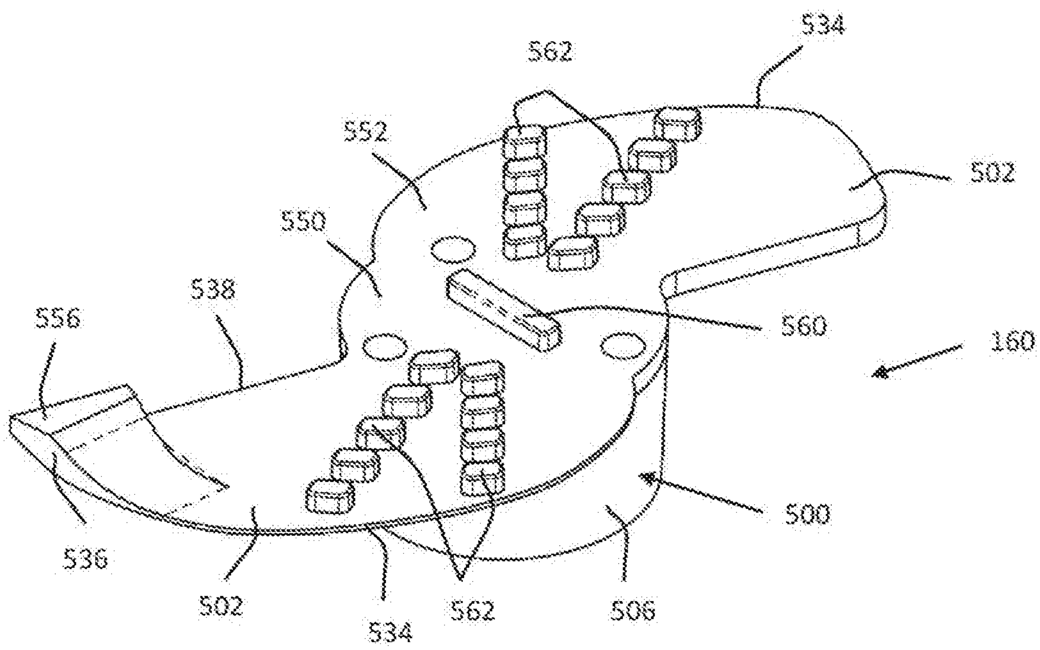
Figure 6E:
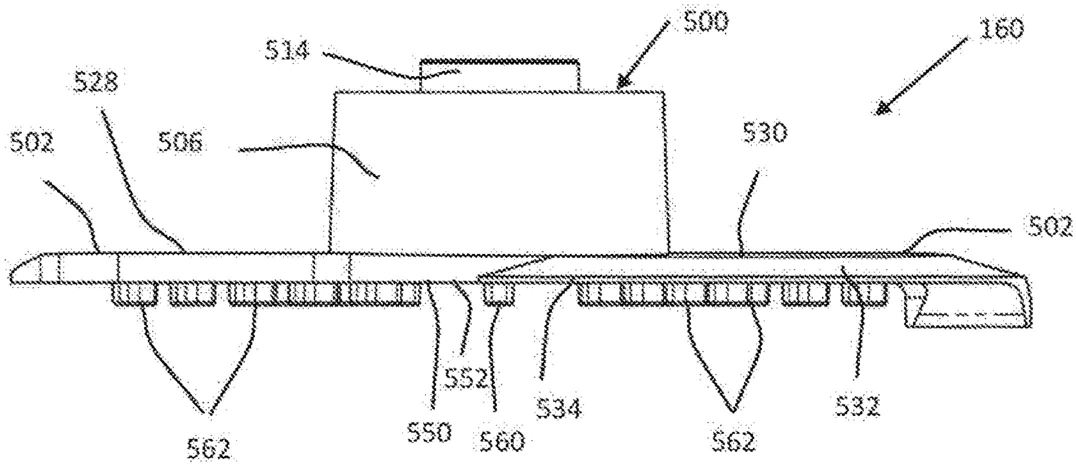
Figure 6F:
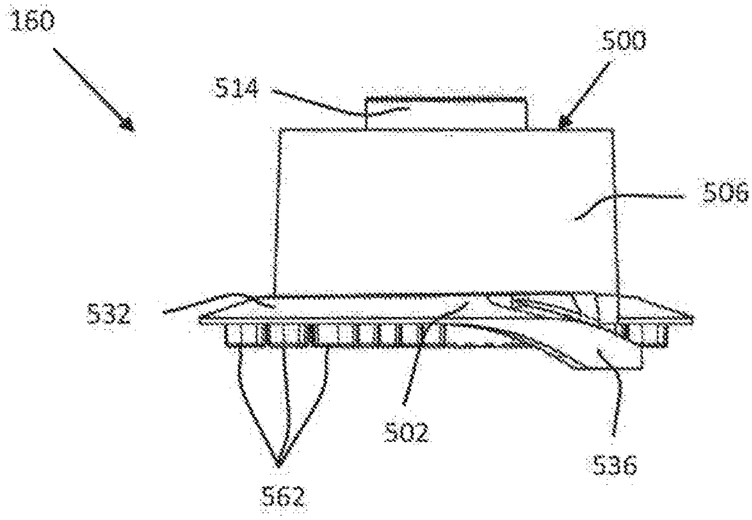
Figure 6G:
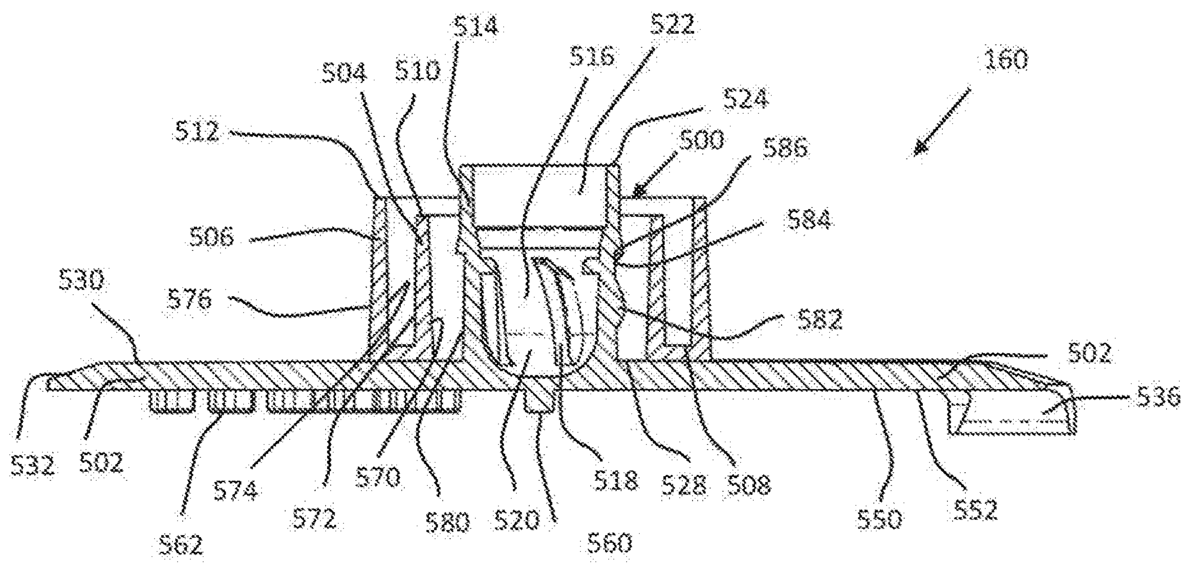

Turning now particularly to FIGS. 5C, 5D and 5E, it is seen that lid 140 preferably includes at least two mutually concentric downwardly-facing recesses 390 and 392, which are sealingly engaged by corresponding protrusions of blade 160, as described in detail hereinbelow with reference to FIGS. 6A-6G. Recesses 390 and 392 are defined by four mutually concentric wall surfaces 394, 396, 398 and 400, defining three respective downwardly-facing annular edges 402, 404 and 406. It is noted that downwardly-facing annular edge 402 defines an edge surface of an inwardly-facing flange 408 which is engaged by blade 160 as described hereinbelow with reference to FIGS. 6A-6G.

Recesses 390 and 392 are also defined by respective base surfaces 410 and 412. Adjacent base surfaces 410 and 412 of respective recesses 390 and 392, concentric wall surfaces 396 and 400 are formed with radially inwardly-extending protrusions 414 and 416 for tight engagement with blade 160 when blade 160 is in a retracted operative orientation for static liquid sealing therewith. It is appreciated that apertures 386 extend through base surface 410 at azimuthally distributed locations thereabout.

A downwardly-facing blade receiving recess 420 is defined in a downwardly-facing, generally planar surface 422 of lid 140.

Reference is now made to FIGS. 6A-6G, which illustrate a preferred embodiment of blade 160 of SUCSERDREA 120. As seen in FIGS. 6A-6G, blade 160 is a unitary element, preferably injection molded from polyoxymethylene or from polypropylene and including a central driving and sealing portion 500 and a pair of blade portions 502 extending radially outwardly therefrom in opposite directions. Central driving and sealing portion 500 includes a pair of mutually radially spaced, concentric sealing walls 504 and 506, extending upwardly, in the sense of FIG. 3A, from a base surface 508 on blade portions 502. Concentric sealing walls 504 and 506 define respective upwardly-facing edge surfaces 510 and 512.

Interiorly of wall 504 and radially spaced therefrom and concentric therewith is a drive shat engaging wall 514 having, on a radially inwardly-facing surface 516 thereof, an arrangement of curved splines 518, which engage corresponding recesses on a drive shaft of a container contents processor, such as a multiple motion intelligent driving device (MMIDD), described hereinbelow with reference to FIGS. 7A-37G. A drive shaft seating recess 520 is defined by surface 516 and also by an annular inwardly-facing surface 522, which defines a circumferential edge 524.

Blade portions 502 each define a top-facing surface 528, which includes a planar portion 530 and a tapered portion 532 which terminates at a curved cutting edge 534. The tapered portion 532 includes a further downwardly and circumferentially tapered portion 536 alongside a trailing edge 538 of at least one of blade portions 502, defined with respect to a blade rotation direction indicated by an arrow 540.

A bottom-facing surface 550 of blade 160 preferably includes a generally planar surface 552, which extends over central driving and sealing portion 500 and most of blade portions 502. Also formed on bottom-facing surface 550 are one or two downwardly and circumferentially tapered portions 556 alongside one or two trailing edges 538 of blade portions 502, which underlie tapered portions 536. Formed on planar surface 552 are preferably a central protrusion 560 and a plurality of mutually spaced radially distributed protrusions 562.

It is appreciated that walls 504 and 506 define dynamic sealing surfaces as described hereinbelow and with reference to FIGS. 50A and 50B:

Wall 504 defines a dynamic radially inwardly-facing circumferential sealing surface 570 and a dynamic radially outwardly-facing circumferential sealing surface 572.

Wall 506 defines a dynamic radially inwardly-facing circumferential sealing surface 574 and a dynamic radially outwardly-facing circumferential sealing surface 576.

An outer surface 580 of drive shaft seating recess 520 includes a plurality, preferably three, of azimuthally distributed protrusions 582 and also includes a circumferential protrusion 584 which defines a shoulder 586 with respect to the adjacent portion of outer surface 580.

It is appreciated that surfaces 572 and 576 both define static sealing surfaces in snap fit engagement with corresponding surfaces of protrusions 414 and 416 of lid 140.

It is appreciated that inwardly-facing flange 408 of lid 140 limits downward movement of blade 160 by engagement with shoulder 586. It is further appreciated that inwardly-facing flange 408 of lid 140 also retains blade 160 in its retracted operative orientation in blade receiving recess 420 of lid 140 by engagement with protrusions 582.

Figure 7A:
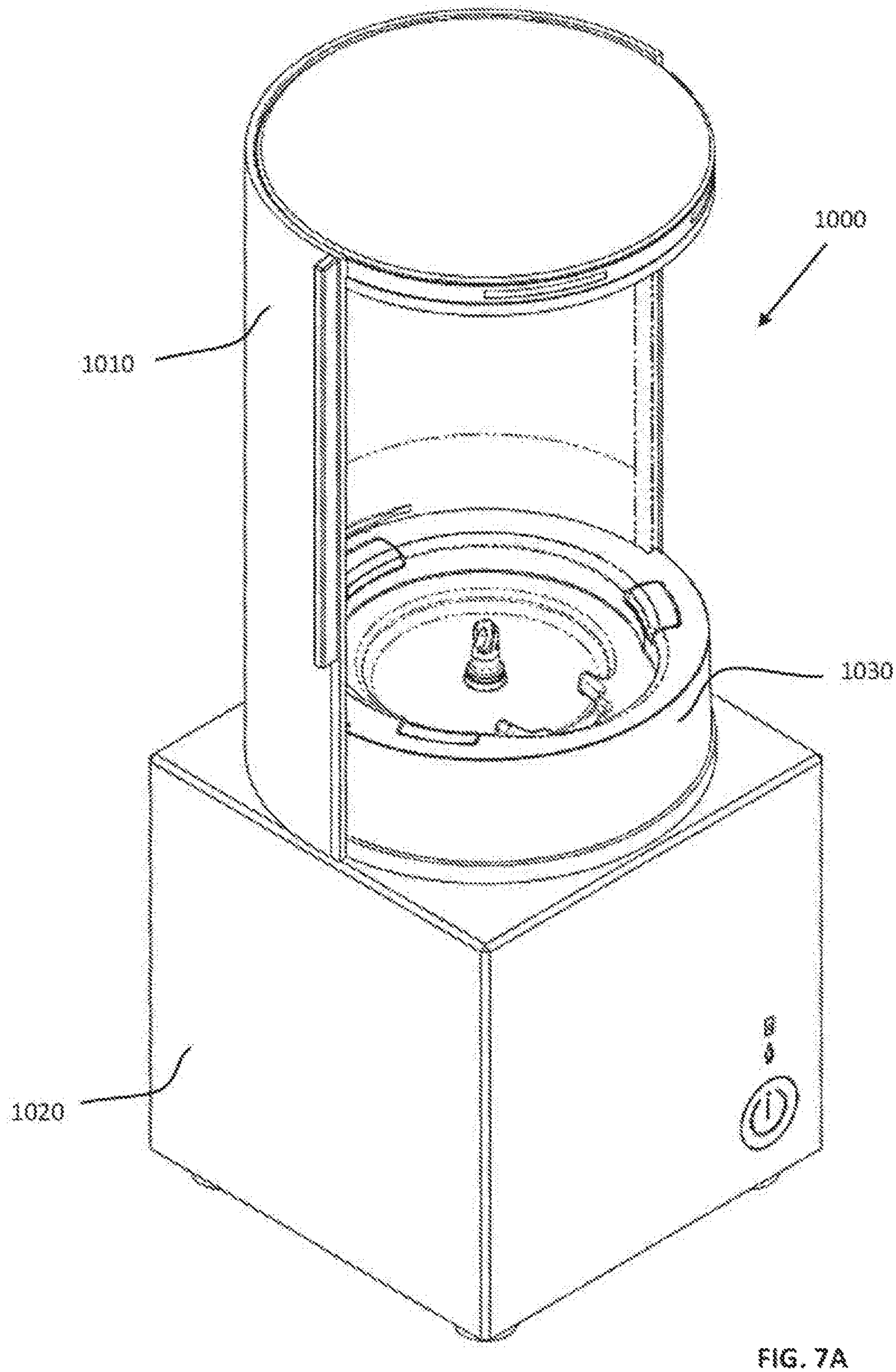
FIGS. 7A and 7B are simplified pictorial illustrations of a preferred embodiment of a multiple motion intelligent driving device (MMIDD) constructed and operative in accordance with a preferred embodiment of the present invention and useful with the SUPCA of FIGS. 1A-6G, in respective door open and door closed states.
Figure 7B:
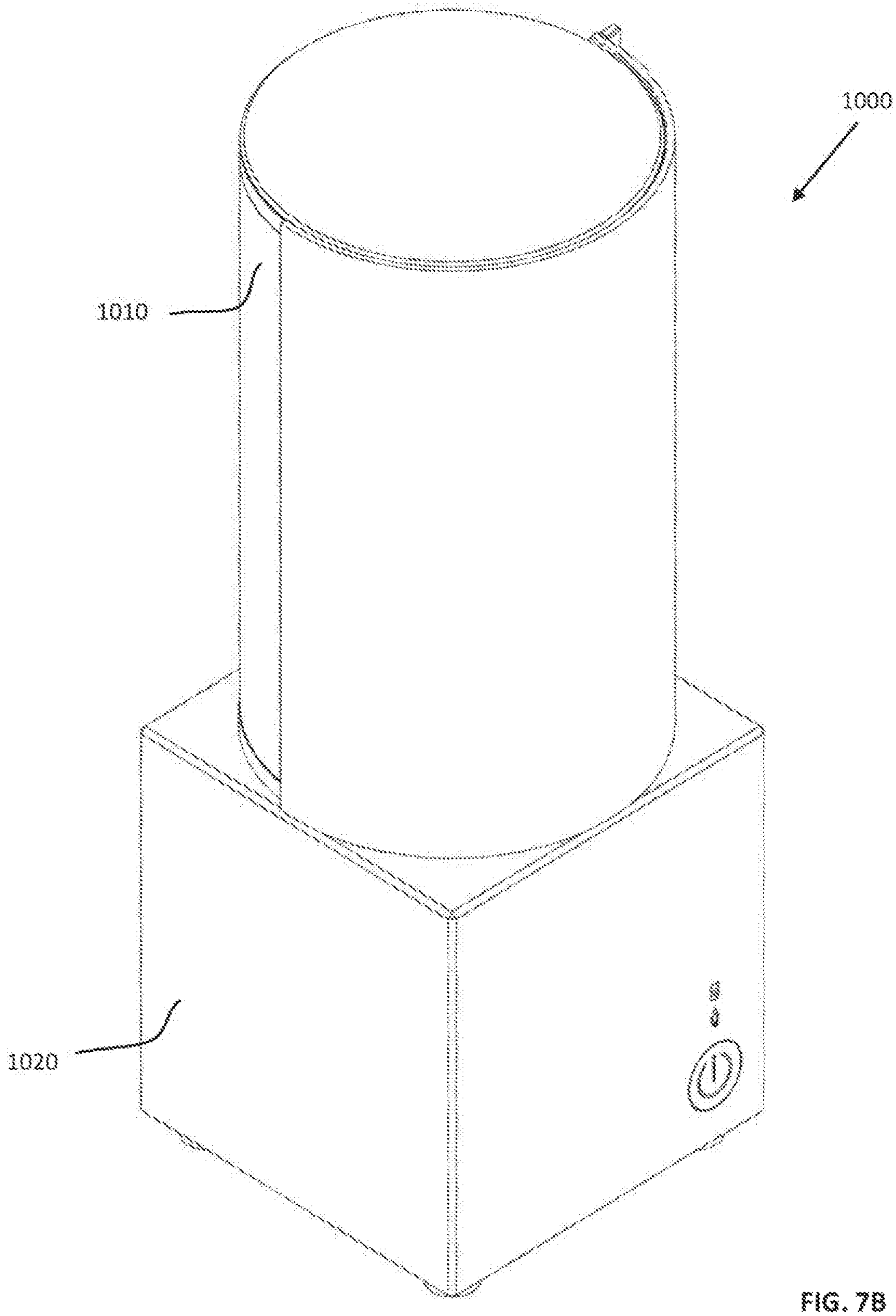
Figure 7C:
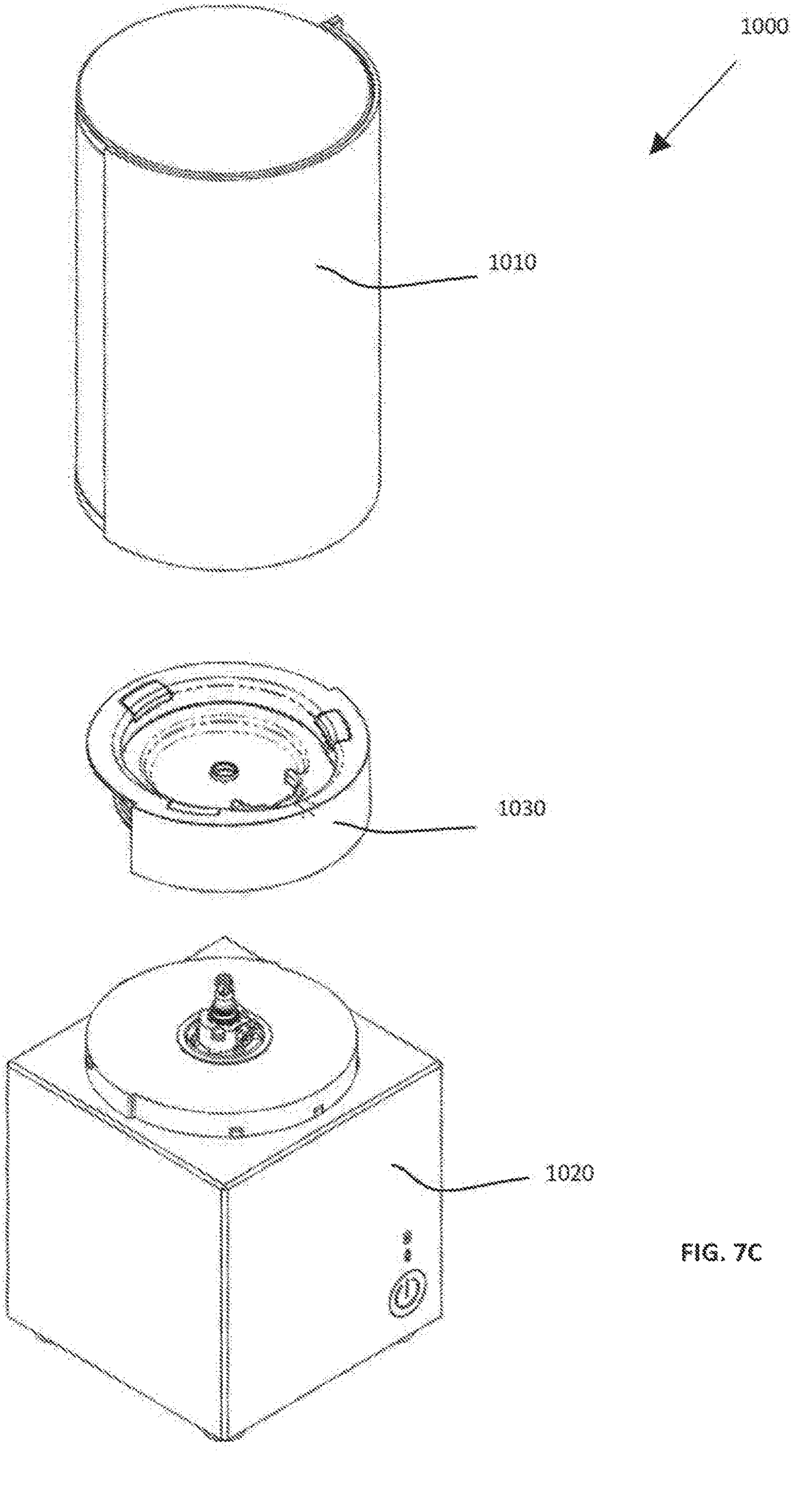
FIG. 7C is a simplified exploded view illustration of the MMIDD of FIGS. 7A & 7B.

Reference is now made to FIGS. 7A-7C, which illustrate a multiple motion intelligent driving device (MMIDD) 1000 constructed and operative in accordance with a preferred embodiment of the present invention and useful with SUPCA 100 of FIGS. 1A-6G.

As seen in FIGS. 7A-7C. MMIDD 1000 includes a top housing assembly 1010, which is shown in FIGS. 7A and 7B in respective door open and door closed operative orientations. Top housing assembly 1010 is supported on a base assembly 1020, which also supports a SUPCA support and clamping assembly (SUPCASCA) 1030, which is surrounded by top housing assembly 1010, when it is in a door closed operative orientation.

It is appreciated that MMIDD 1000 includes a reader module operative to read information source 162 of SUPCA 100. Either this reader module or another module included in MMIDD 1000 is operative to connect to at least one external network and devices thereon using Bluetooth. WiFi or any other wireless platform capabilities.

Figure 8A:
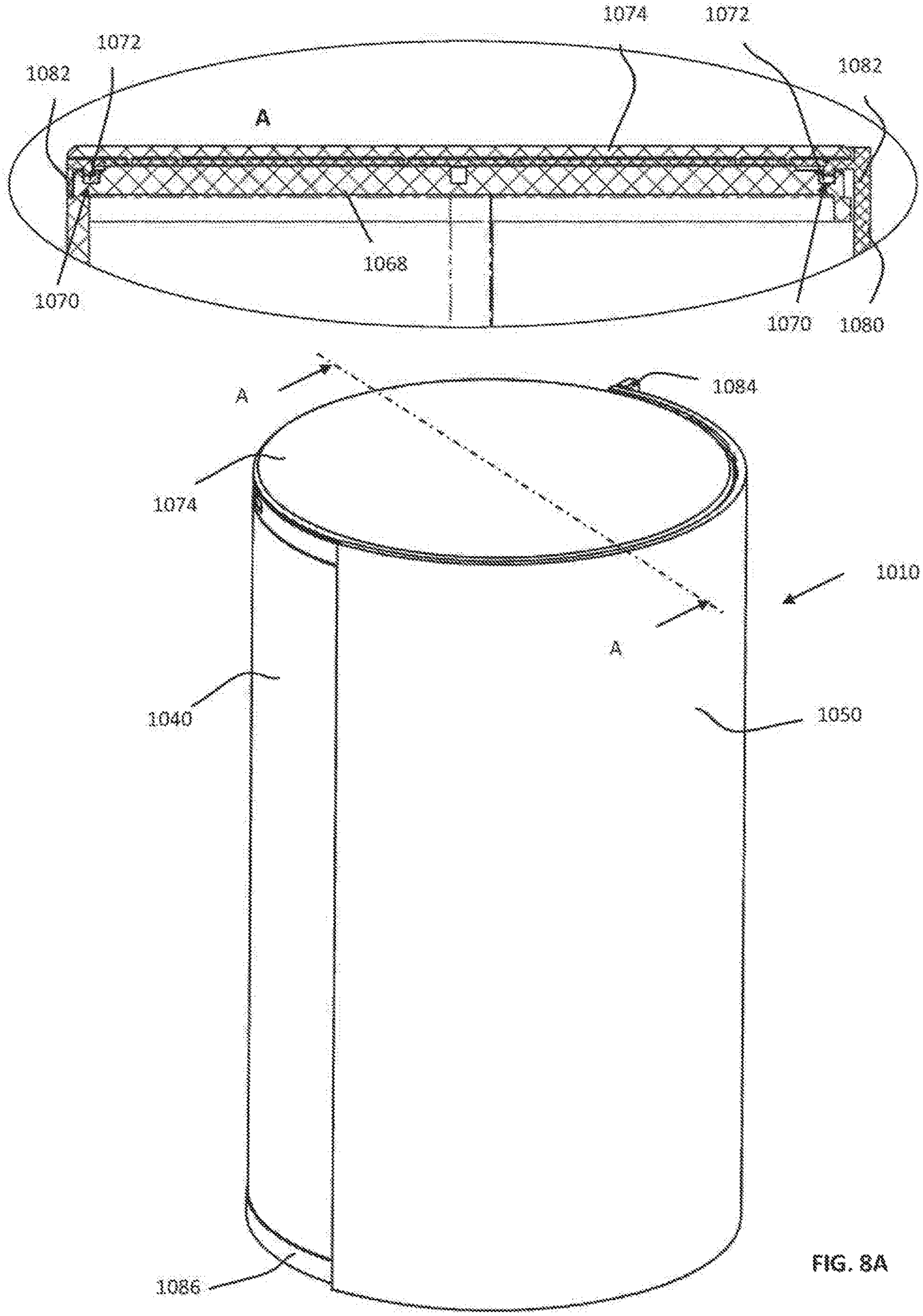
FIG. 8A is a simplified assembled view illustration of the top housing assembly of the MMIDD of FIGS. 7A-7C.
Figure 8B:
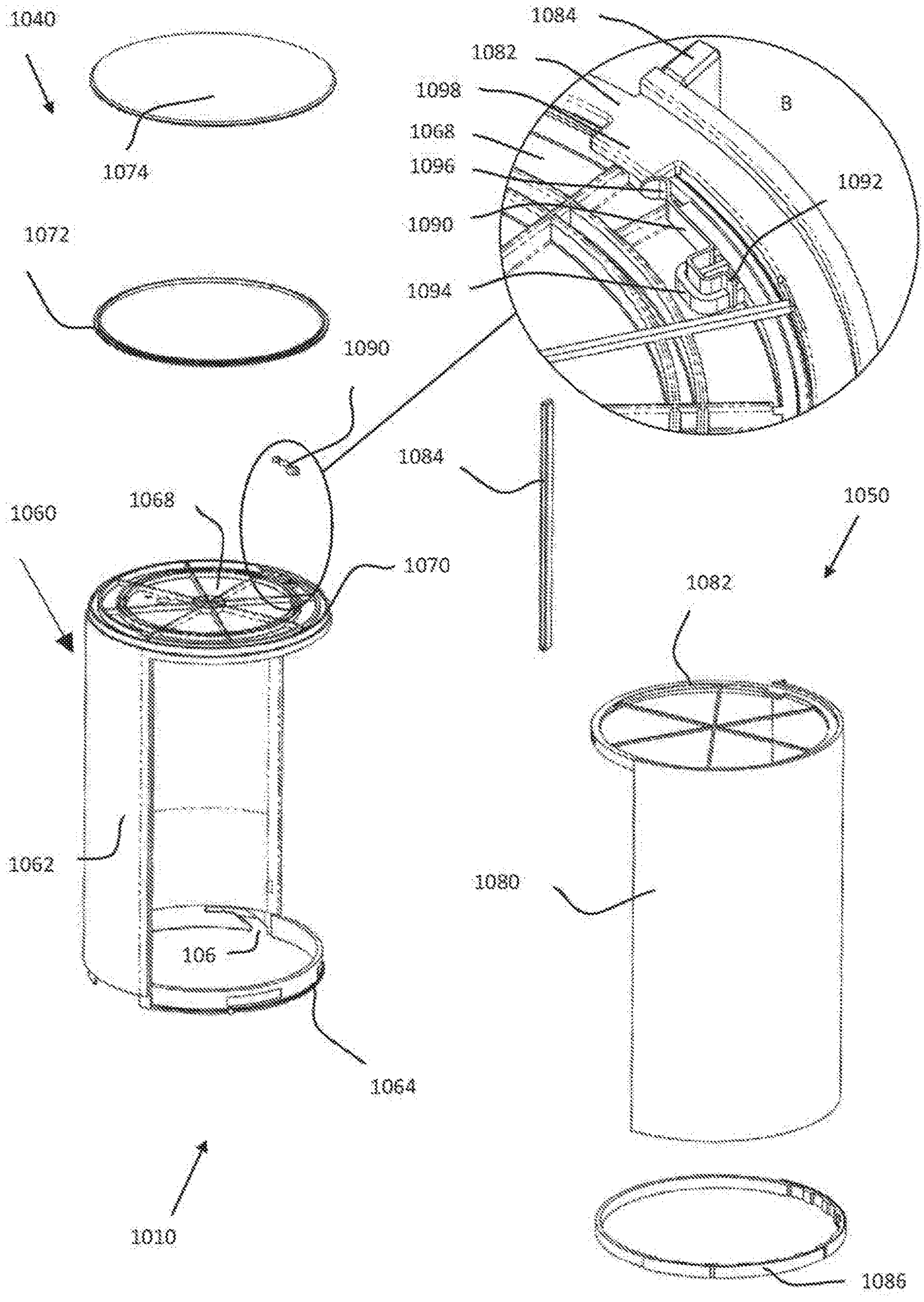
FIGS. 8B and 8C are simplified respective top-facing and bottom-facing exploded view illustrations of the top housing assembly of the MMIDD of FIGS. 7A-7C.
Figure 8C:
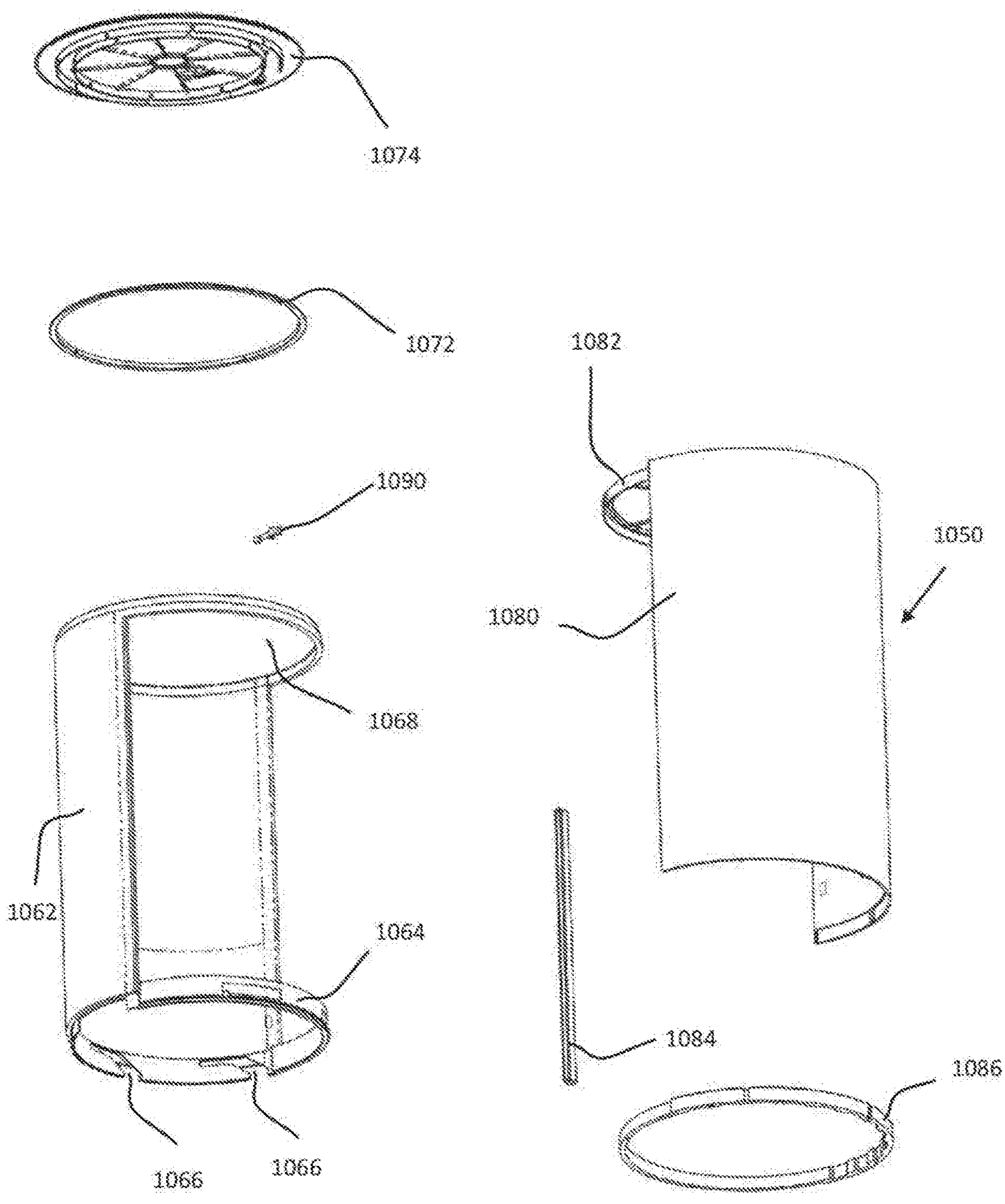
Figure 9A:
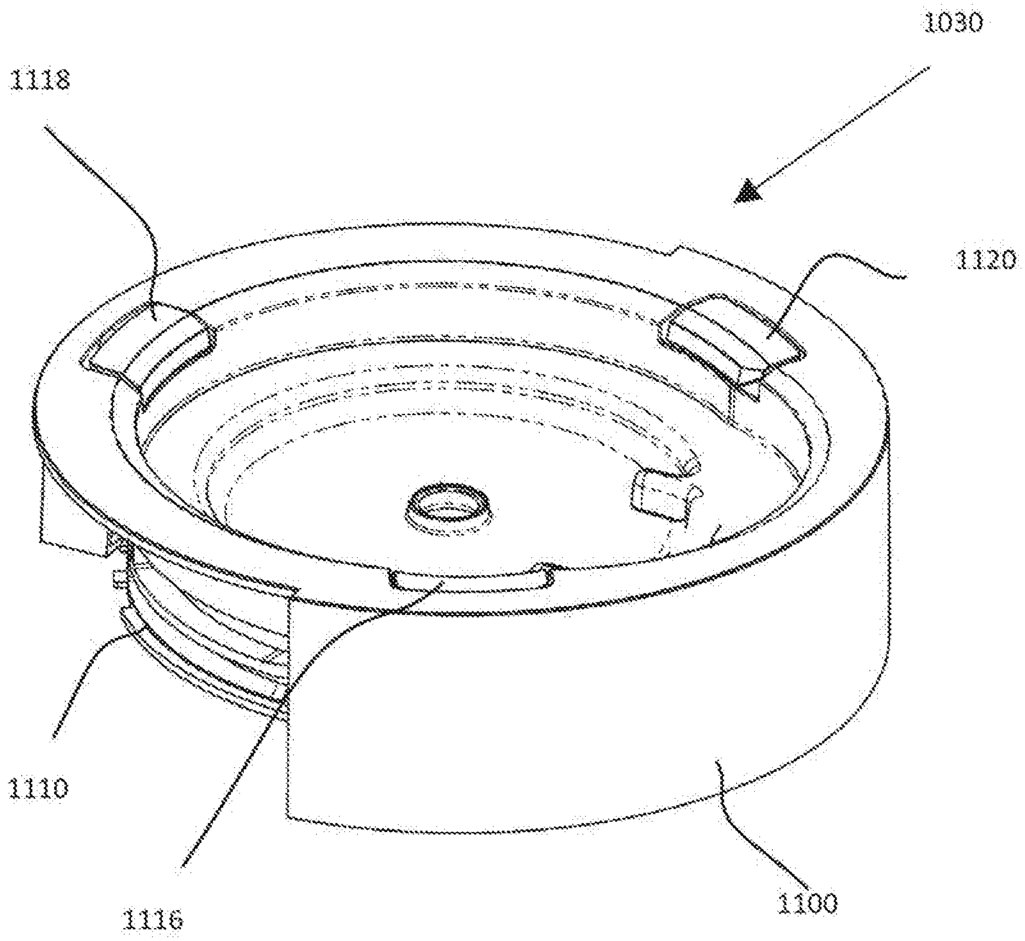
FIGS. 9A, 9B, 9C and 9D are simplified respective pictorial top view, planar top view, planar side view and planar bottom view illustrations of a SUPCA support and clamping assembly (SUPCASCA), forming part of MMIDD of FIGS. 7A-8C.
Figure 9B:
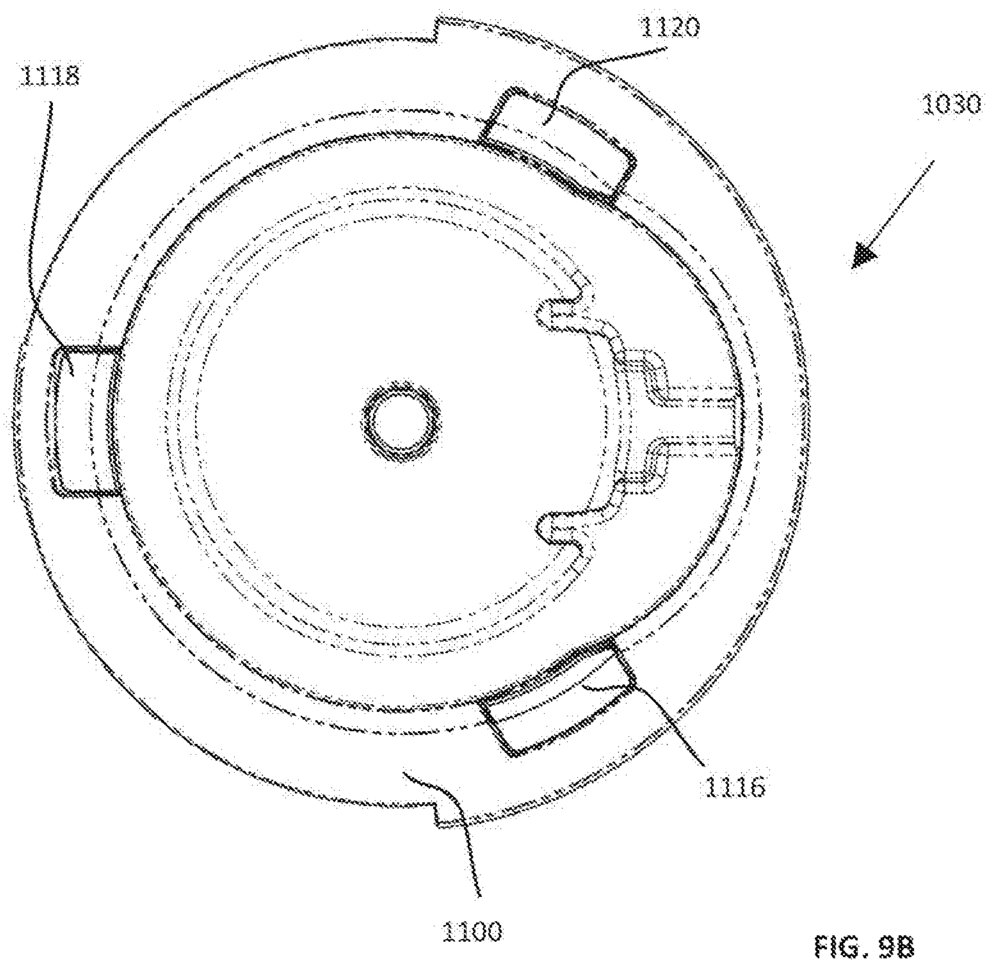
Figure 9C:
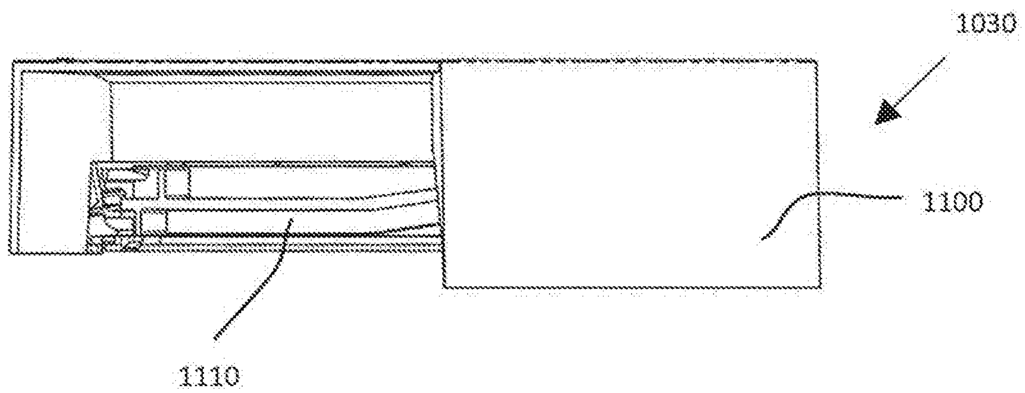
Figure 9D:
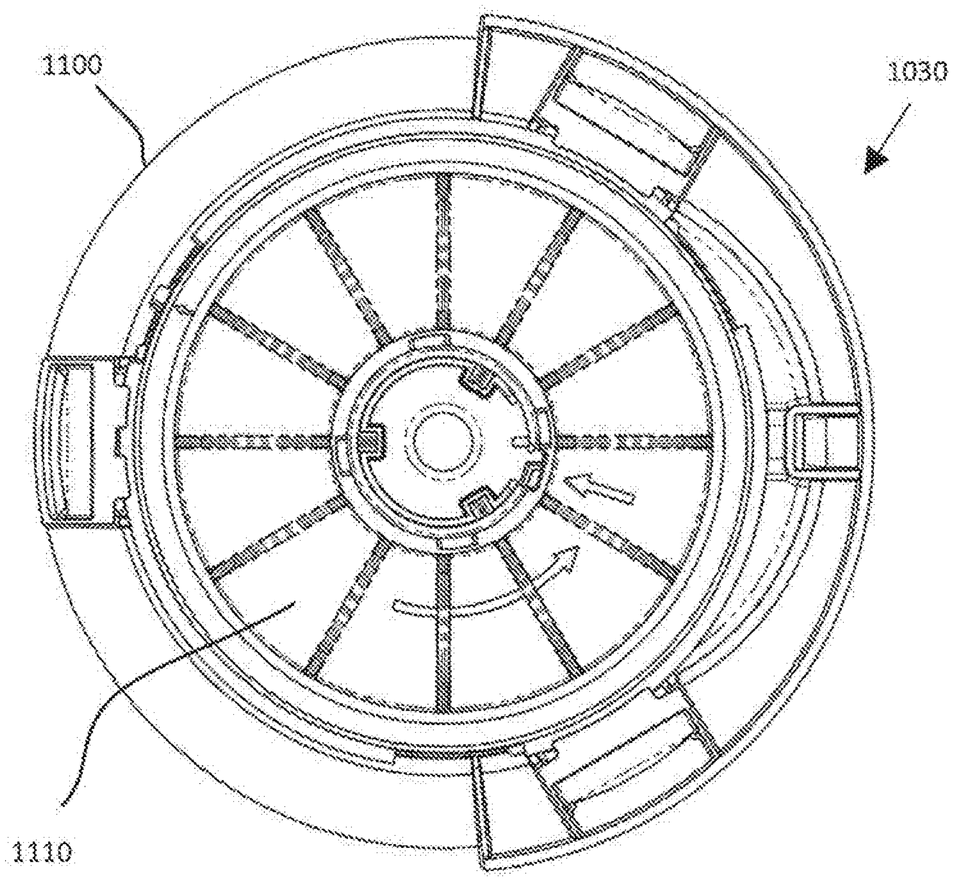
Figure 9E:
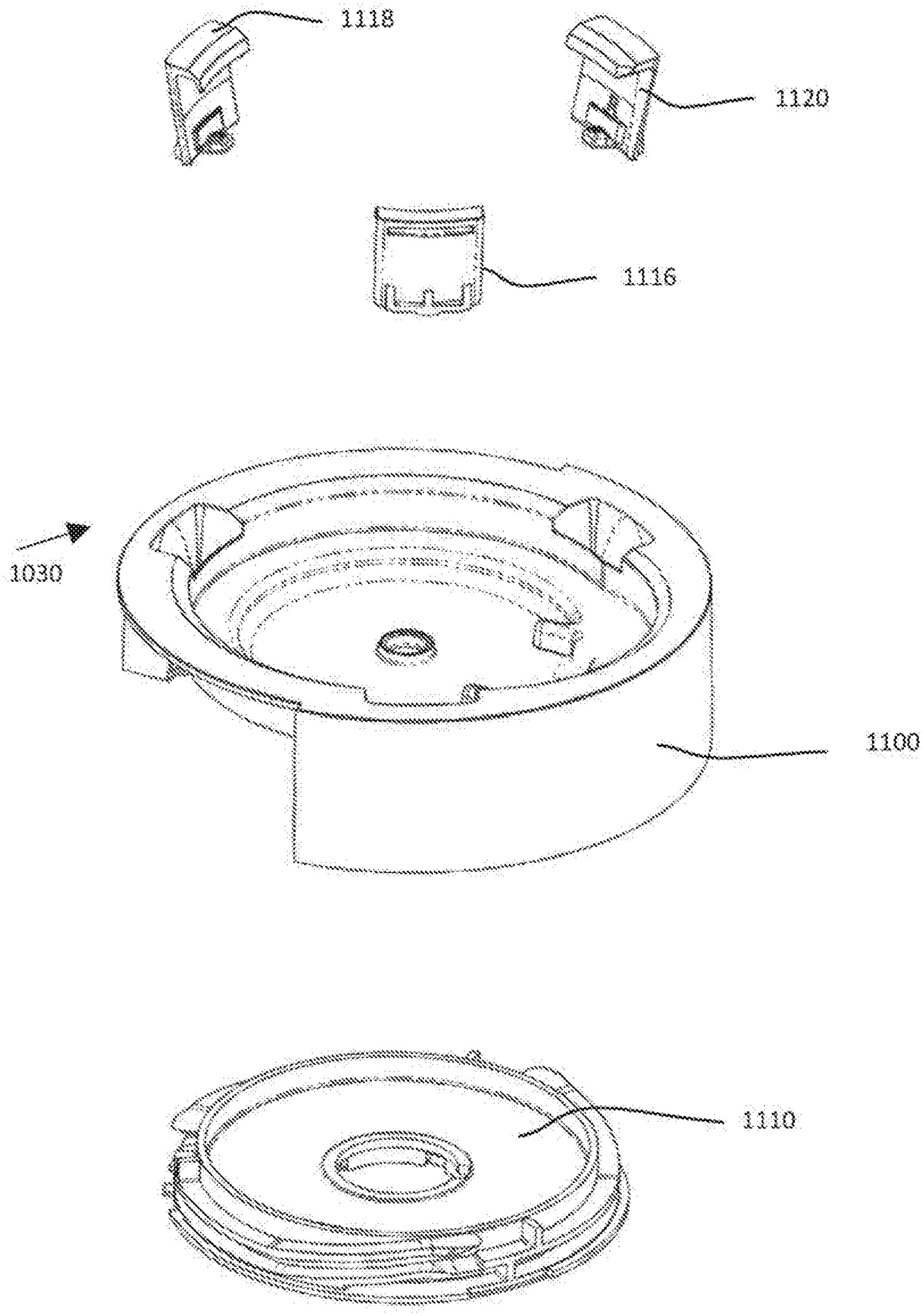
FIG. 9E is a simplified exploded view illustration of the SUPCASCA of FIGS. 9A-9D.

Reference is now made to FIGS. 8A-8C, which are simplified assembled and general exploded view illustrations of top housing assembly 1010 of MMIDD 1000 of FIGS. 7A-7C.

As seen in FIGS. 8A-8C, top housing assembly 1010 includes a static housing assembly 1040 and a rotatable door assembly 1050. Static housing assembly 1040 preferably includes a static housing element 1060 including a semicylindrical upstanding wall portion 1062, integrally formed with a semicylindrical base ring 1064. Semicylindrical upstanding wall portion 1062 is preferably formed with a plurality of radially inward-facing bayonet receiving recesses 1066, each of which has an opening at the base of semicylindrical upstanding wall portion 1062.

Semicylindrical upstanding wall portion 1062 preferably terminates, at an upward end thereof, at a generally circular top portion 1068, which is formed with an upwardly-facing circumferential recess 1070 for receiving a low friction bearing ring 1072, which in turn rotatably supports rotatable door assembly 1050. A top cover 1074 is mounted onto generally circular top element 1068.

Rotatable door assembly 1050 includes a semicylindrical upstanding wall portion 1080 which is integrally formed with a cylindrical top ring 1082. A generally vertical user hand engageable door grip 1084 is mounted onto semicylindrical upstanding wall portion 1080. Rotatable door assembly 1050 further includes a rotation support and guiding ring 1086, which is preferably fixed to upstanding wall portion 1080 by ultrasonic welding.

As seen with particular clarity in sectional enlargement A in FIG. 8A, low friction bearing ring 1072 is seated in circumferential recess 1070 and cylindrical top ring 1082 is rotatably supported thereon. Top cover 1074, which is preferably fixed to static housing element 1060 by ultrasonic welding, overlies recess 1070, low friction ring 1072 and cylindrical top ring 1082.

As seen particularly in enlargement B in FIG. 8B, a spring 1090 is preferably provided for retaining rotatable door assembly 1050 in a closed orientation relative to static housing assembly 1040. A first end 1092 of spring 1090 is fixedly mounted on a mounting protrusion 1094 integrally formed on generally circular top element 1068 of static housing element 1060. A second end 1096 of spring 1090 is operative to engage with a locking protrusion 1098 integrally formed on cylindrical top ring 1082 of rotatable door assembly 1050. Locking protrusion 1098 is preferably formed generally opposite generally vertical user hand engageable door grip 1084.

It is appreciated that during normal operation, engagement of second end 1096 of spring 1090 with locking protrusion 1098 of rotatable door assembly 1050 prevents rotatable door assembly 1050 from rotating relative to static housing element 1060. Thus, top housing assembly 1010 is retained in a door closed operative orientation until a user exerts sufficient force on user hand engageable door grip 1084 to rotate locking protrusion 1098 past spring 1090 and shift top housing assembly 1010 to its door open operative orientation.

Reference is now made to FIGS. 9A-9E, which illustrate SUPCA support and clamping assembly (SUPCASCA) 1030, forming part of MMIDD 1000. As seen in FIGS. 9A-9E, SUPCASCA 1030 preferably includes a support element 1100, which rotatably supports a cam element 1110 and pivotably and slidably supports three clamp elements 1116, 1118 and 1120.

Reference is now made to FIGS. 10A-12H, which are simplified illustrations of clamp elements 1116, 1118 and 1120, forming part of SUPCASCA 1030 of FIGS. 9A-9E. As seen in FIGS. 10A-12H, each of clamp elements 1116, 1118 and 1120 includes a planar generally rectangular portion 1122 having a radially outward-facing surface 1124 and a radially inward-facing surface 1126. Radially outward-facing surface 1124 terminates at a radially inward tapered top surface 1128 of a clamping portion 1130 defining a radially inwardly and downwardly directed clamping groove 1131 which extends to radially inward-facing surface 1126.

Figure 10A:
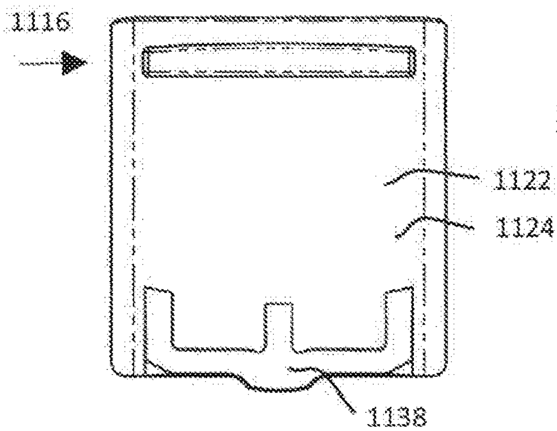
FIGS. 10A, 10B, 10C, 10D, 10E, 10F, 10G and 10H are simplified respective planar rear view, planar front view, planar side view, planar top view, planar sectional view, top-facing pictorial front view, bottom-facing pictorial mar view and bottom-facing pictorial front view illustrations of a first clamp element, forming part of the SUPCASCA of FIGS. 9A-9E.
Figure 10B:
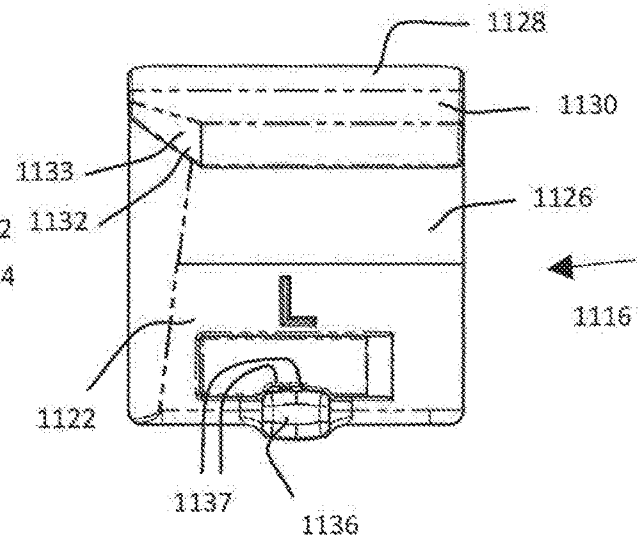
Figure 10C:
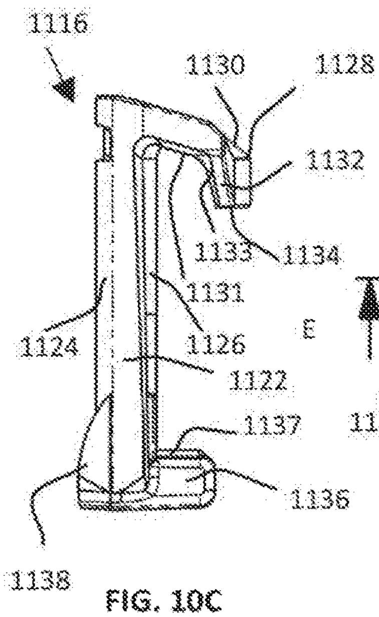
Figure 10D:
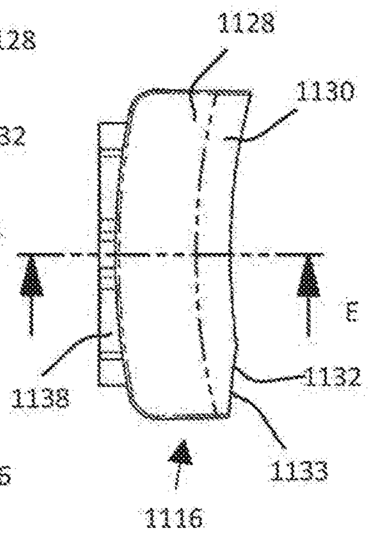
Figure 10E:
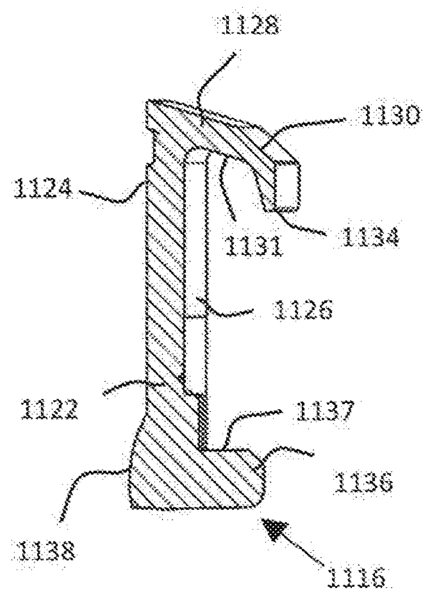
Figure 10F:
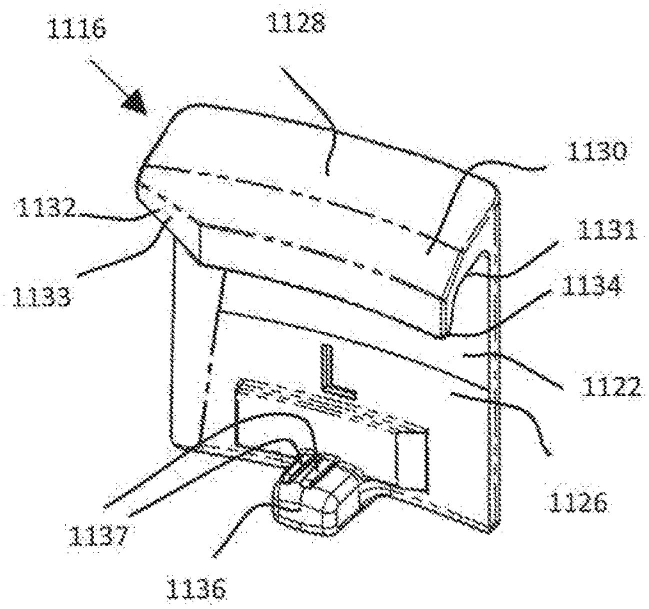
Figure 10G:
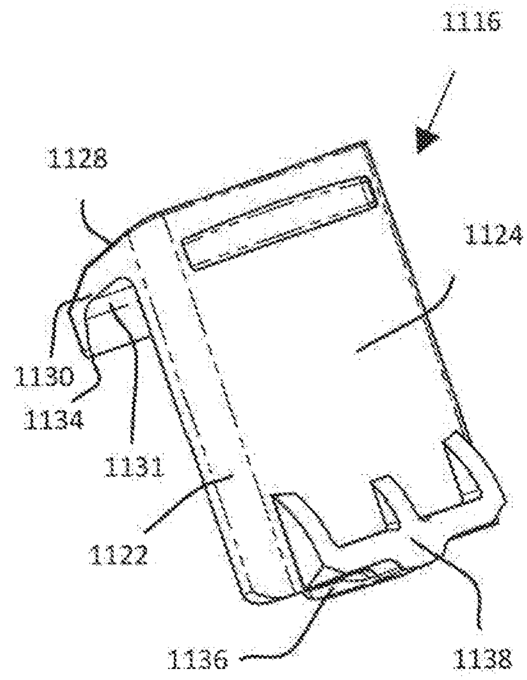
Figure 10H:
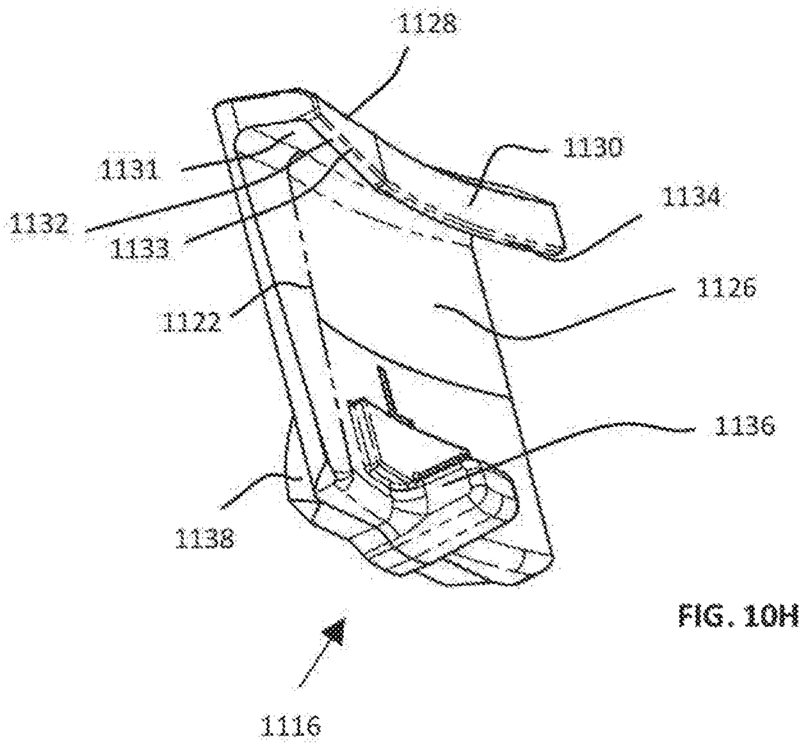
Figure 11A:
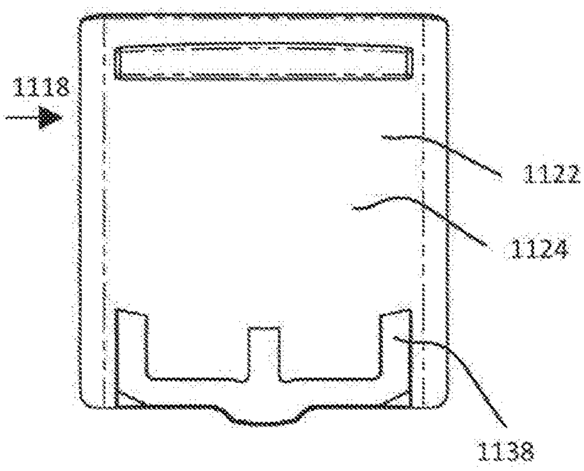
FIGS. 11A, 11B, 11C, 11D, 11E, 11F, 11G and 11H are simplified respective planar mar view, planar front view, planar side view, planar top view, planar sectional view, top-facing pictorial front view, bottom-facing pictorial rear view and bottom-facing pictorial front view illustrations of a second clamp element, forming part of the SUPCASCA of FIGS. 9A-10H.
Figure 11B:
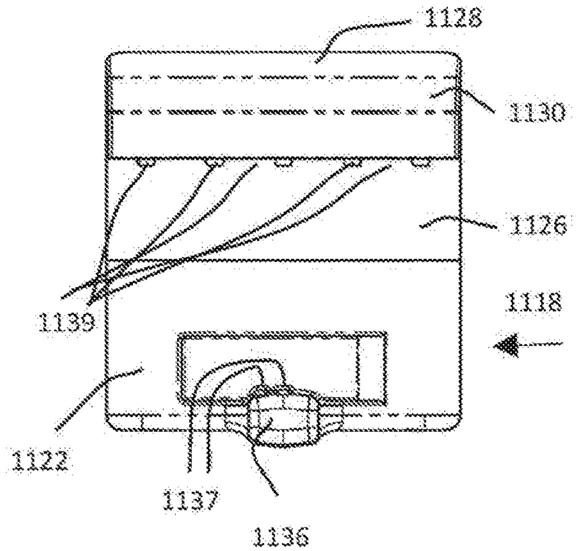
Figure 11C:
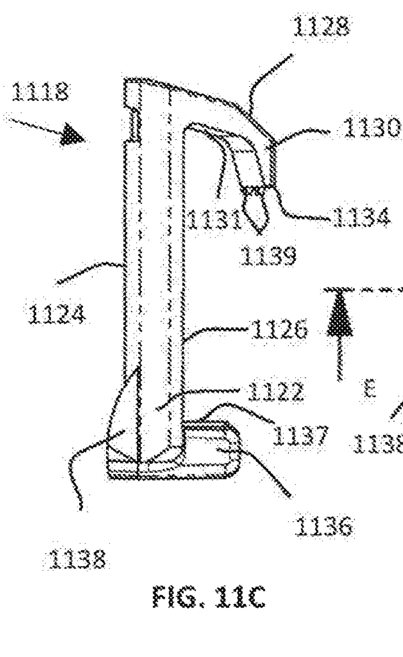
Figure 11D:
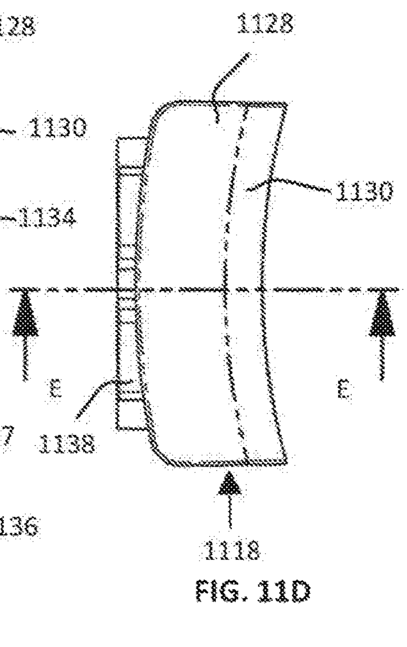
Figure 11E:
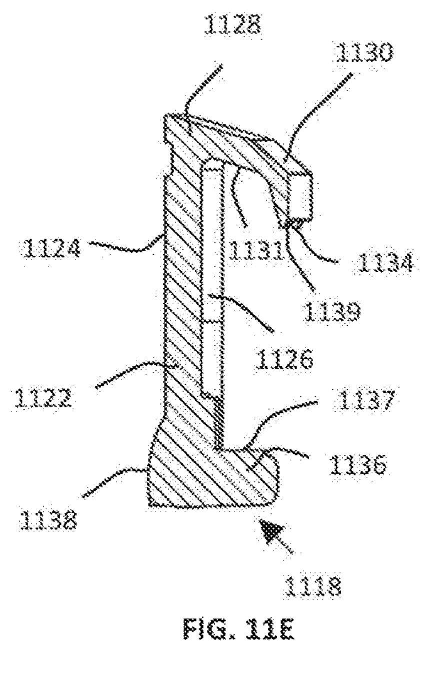
Figure 11F:
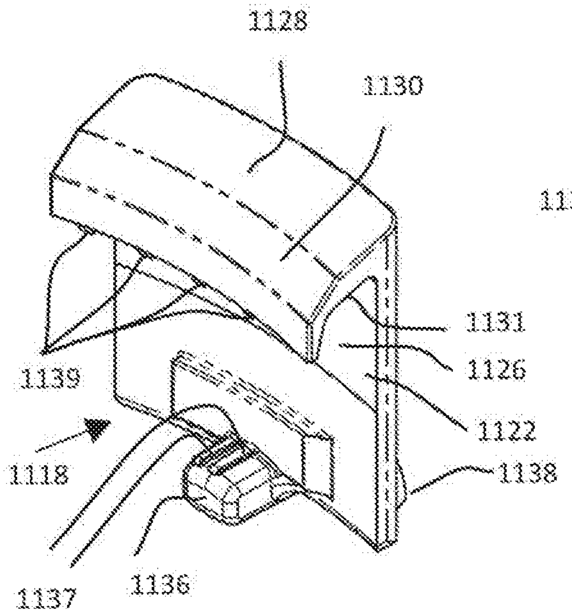
Figure 11G:
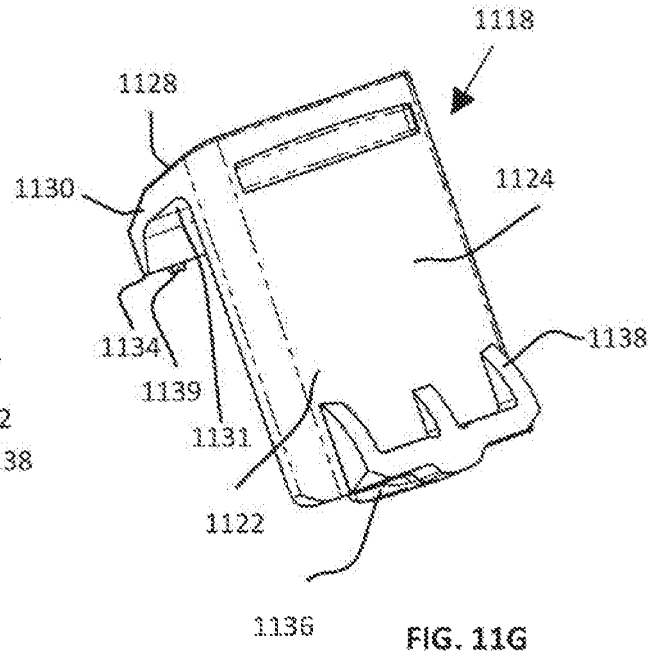
Figure 11H:
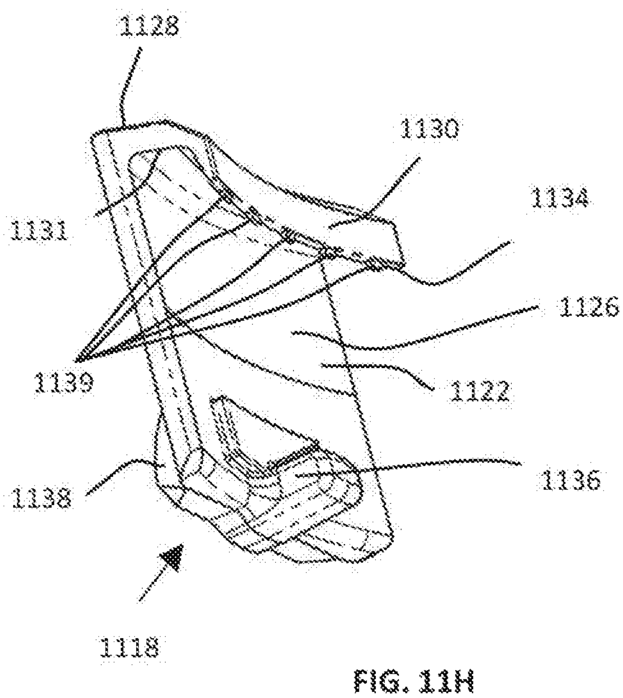
Figure 12A:
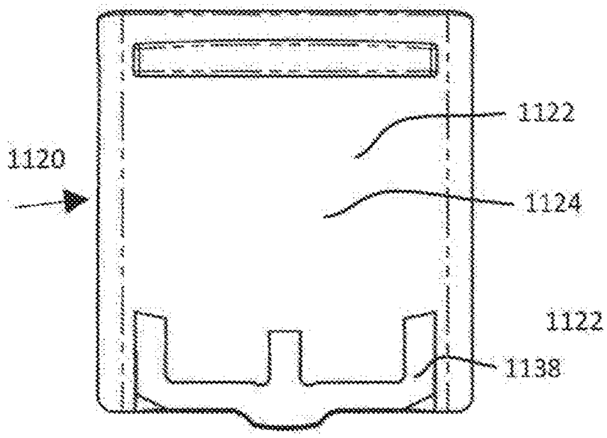
FIGS. 12A, 12B, 12C, 12D, 12E, 12F, 12G and 12H are simplified respective planar rear view, planar front view, planar side view, planar top view, planar sectional view, top-facing pictorial front view, bottom-facing pictorial rear view and bottom-facing pictorial front view illustrations of a third clamp element, forming pan of the SUPCASCA of FIGS. 9A-11H.
Figure 12B:
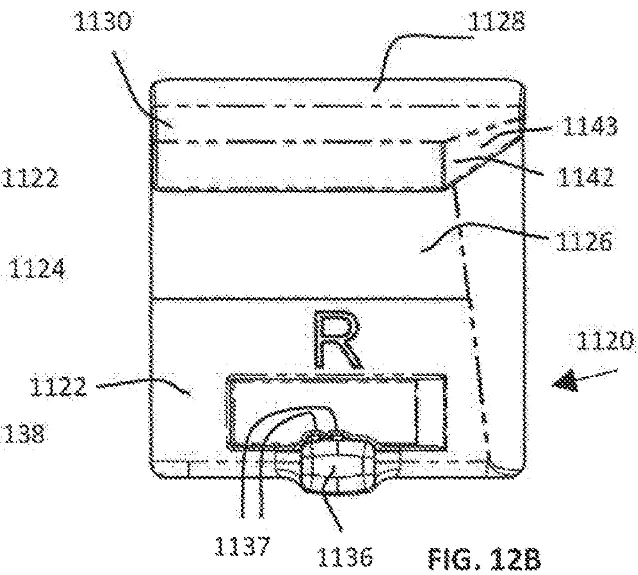
Figure 12C:
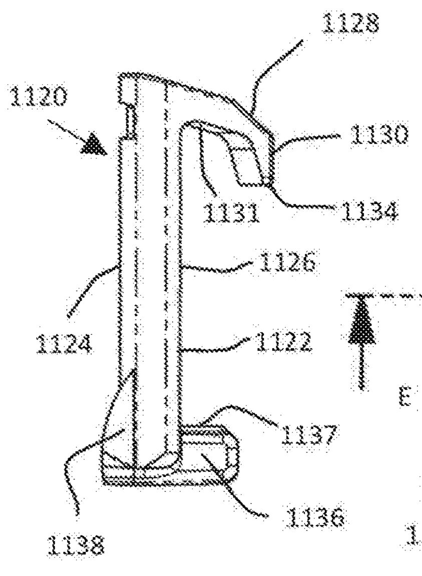
Figure 12D:
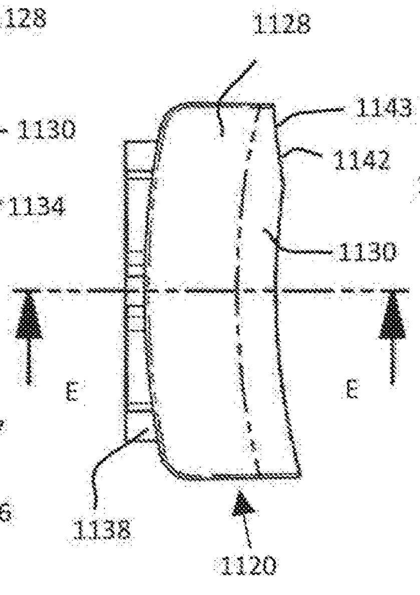
Figure 12E:
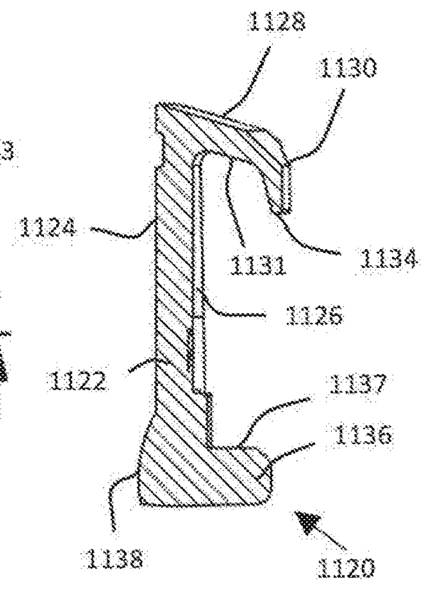
Figure 12F:
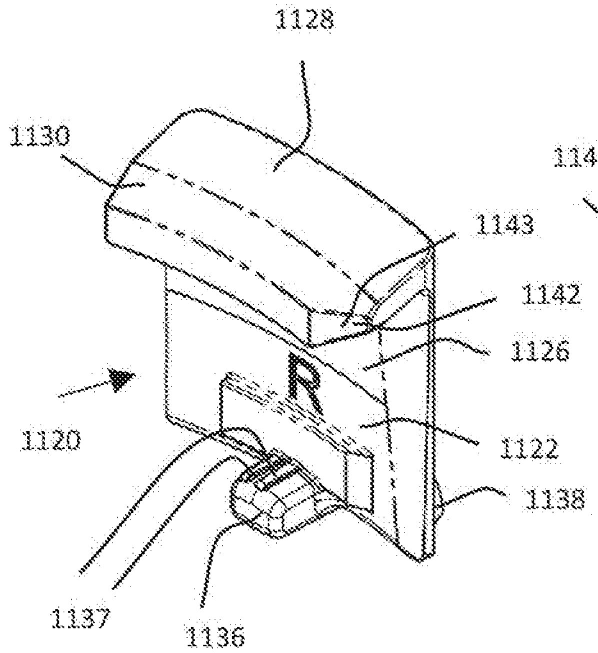
Figure 12G:
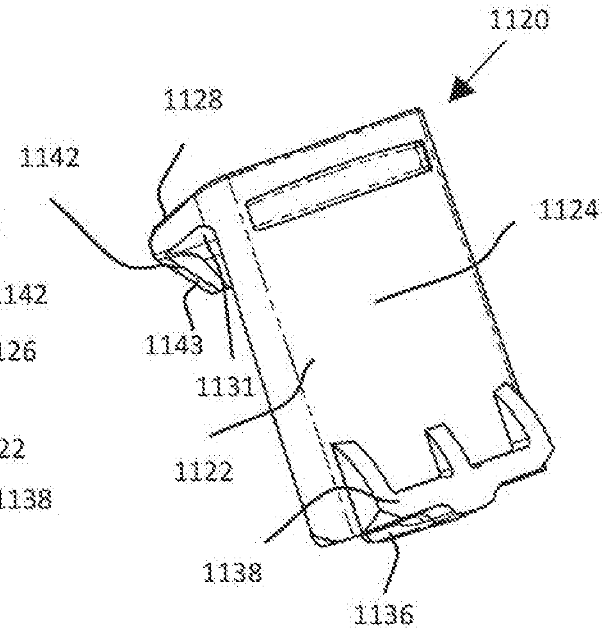
Figure 12H:
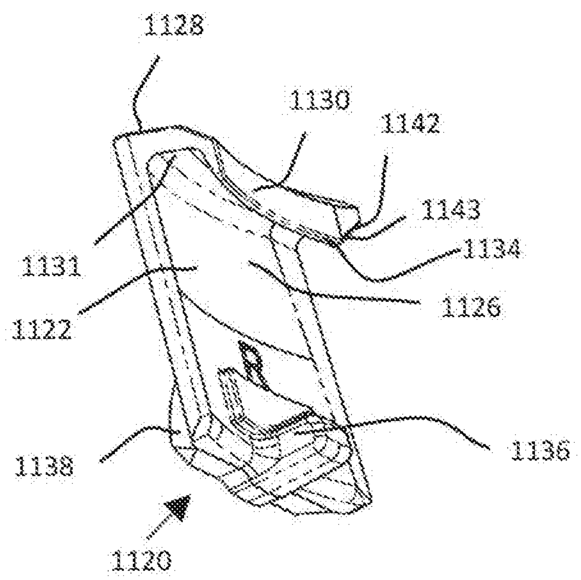
Figure 13A:
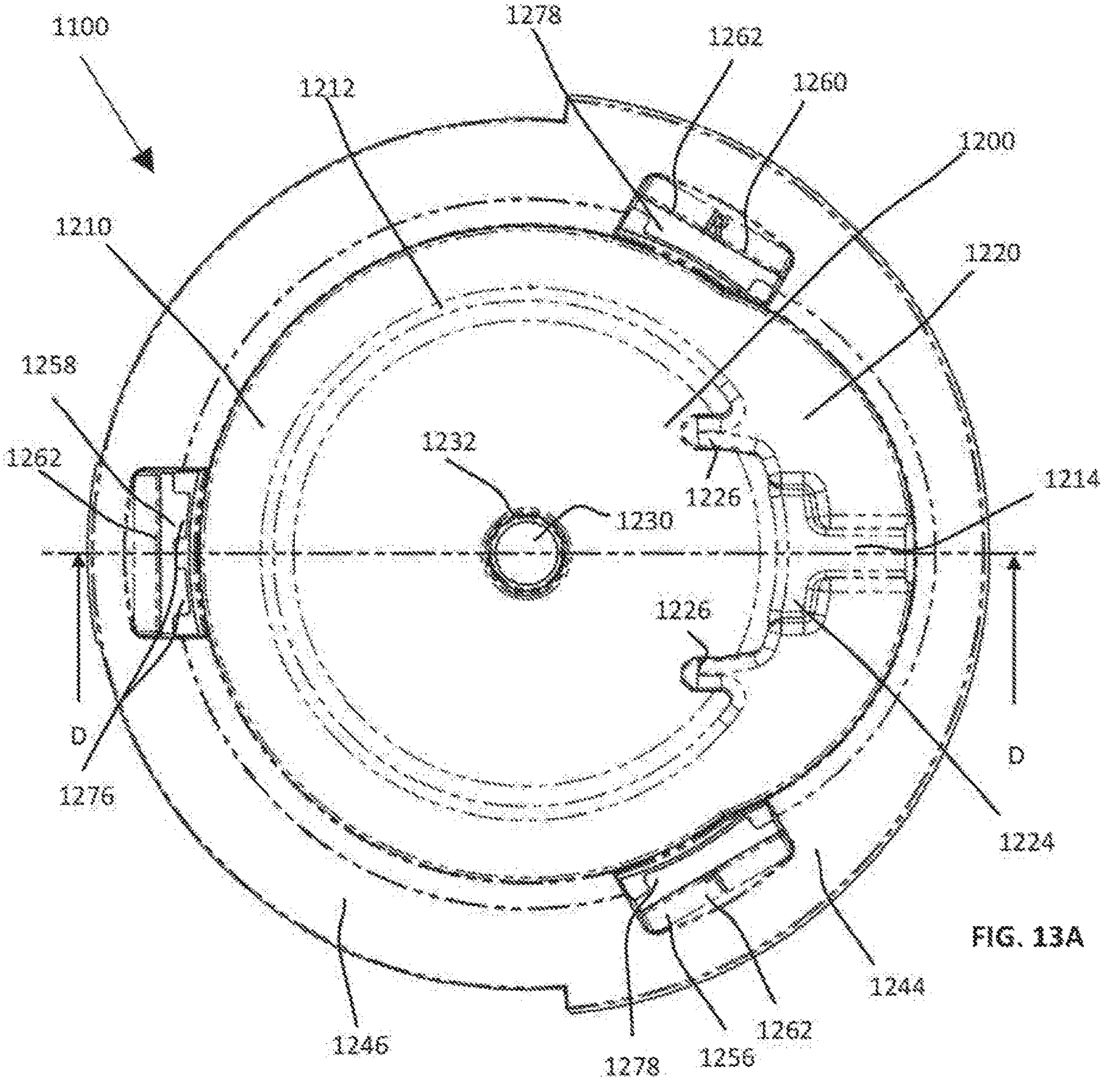
FIGS. 13A, 13B, 13C, 13D, 13E and 13F are simplified respective planar top view, planar side view, planar bottom view, sectional view, pictorial top view and pictorial bottom view illustrations of a support element, forming part of the SUPCASCA of FIGS. 9A-12H.
Figure 13B:
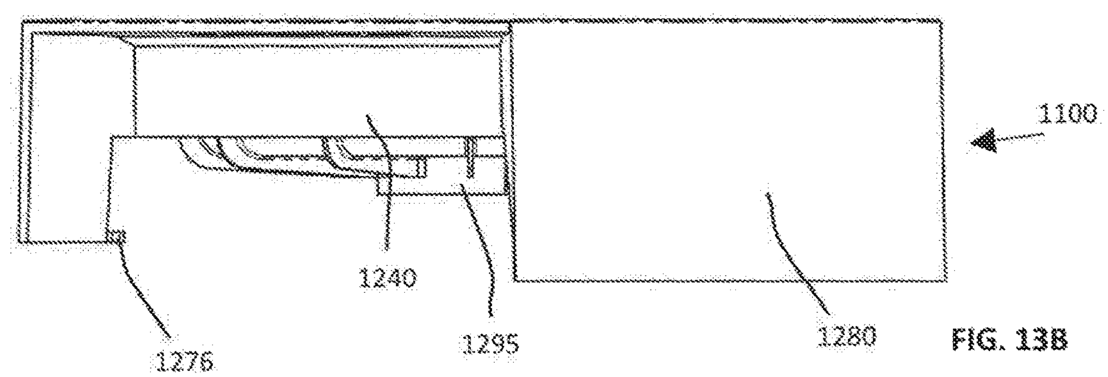
Figure 13C:
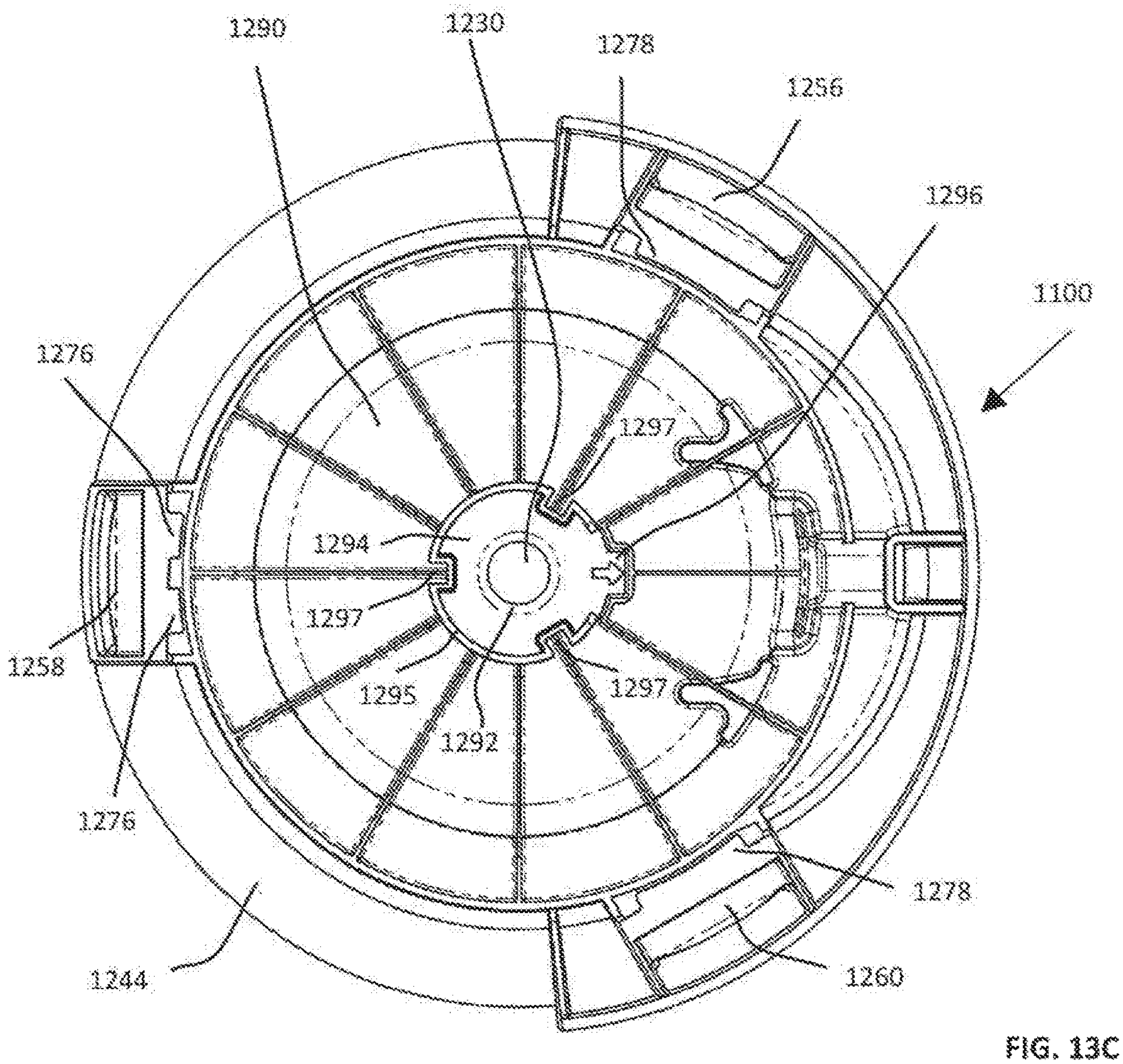
Figure 13D:
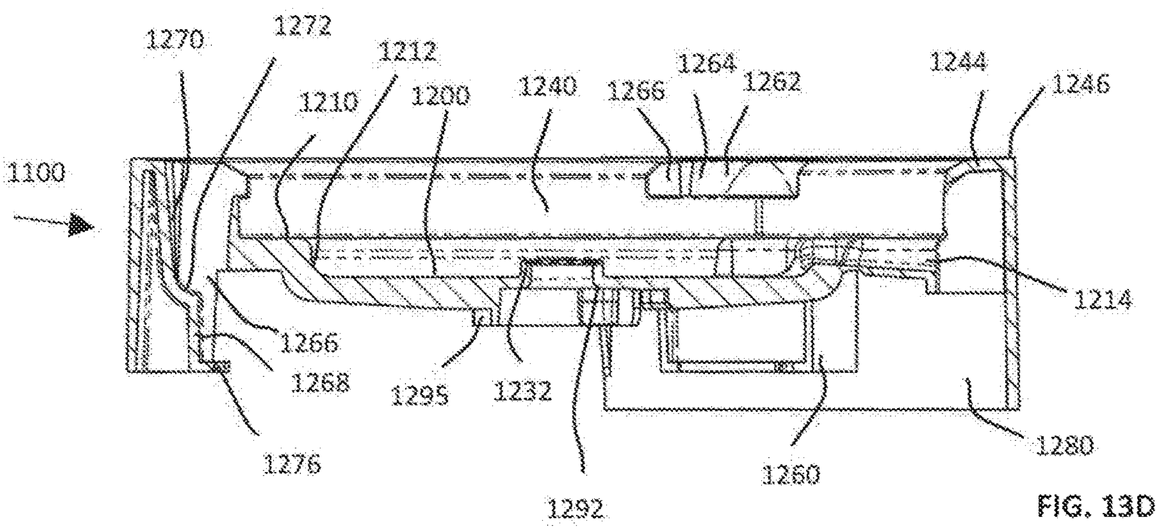
Figure 13E:
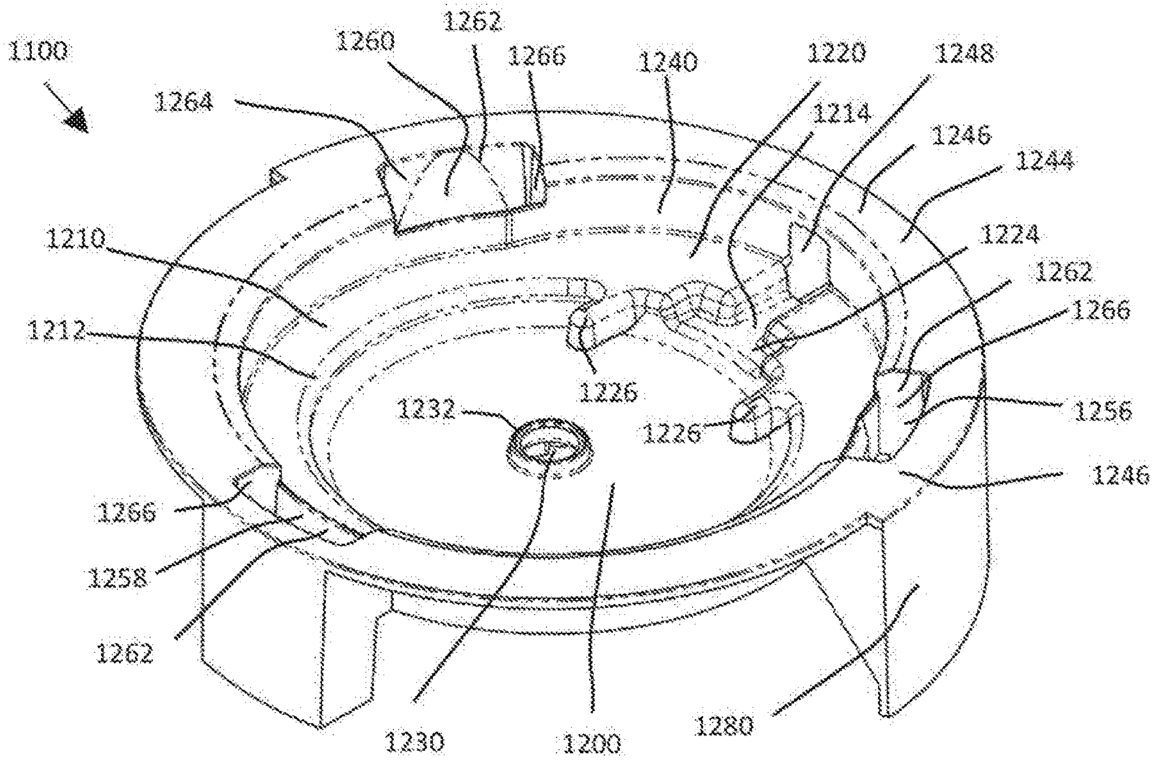
Figure 13F:
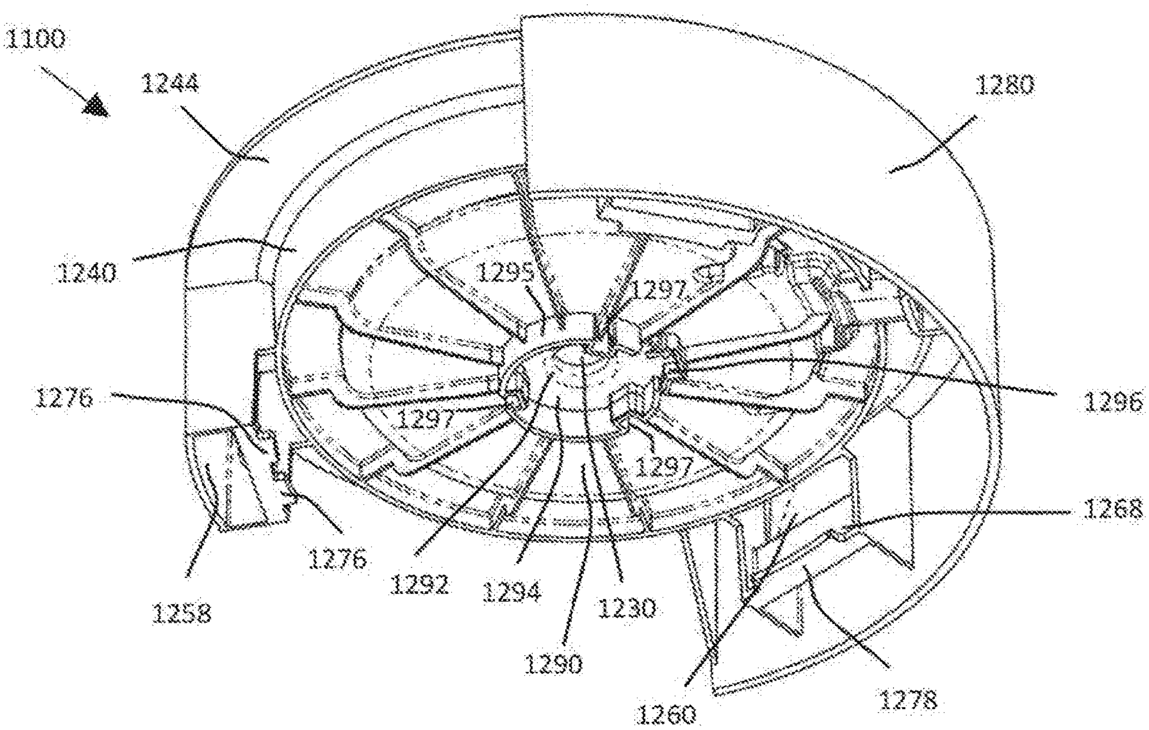

As seen in FIGS. 10A-10H, and particularly in FIGS. 10B and 10F, in clamp element 1116, clamping portion 1130 is preferably formed with a first side 1132 having a bevel 1133 operative to conform to the shape of support element 1100. In each of clamp elements 1116, 1118 and 1120, top surface 1128 and clamping groove 1131 together define a clamping engagement edge 1134.

A cam engagement protrusion 1136 extends radially inwardly at a bottom portion of front surface 1126. Cam engagement protrusion 1136 is preferably formed with a pair of elongate protrusions 1137 on its upper surface, operative to reduce frictional contact with cam element 1110. A support element pivotable and slidable engagement protrusion 1138 is formed on radially outward-facing surface 1124 at a location generally opposite protrusion 1136.

As seen particularly in FIGS. 11A-11H, clamp element 1118 differs from clamp element 1116 in that clamping portion 1130 does not include a beveled side. Additionally, clamping portion 1130 of clamp element 118 is formed with a plurality of protrusions 1139 depending from clamping engagement edge 1134. Protrusions 1139 are operative to help maintain single-use container body 102 and SUCSERDREA 120 in mutually immobilized orientations while MMIDD 1000 processes the contents of SUPCA 100, as described hereinbelow with reference to FIGS. 44A-55H.

As seen particularly in FIGS. 12A-12H, clamp element 1120 differs from clamp element 1116 in that clamping portion 1130 is formed with a second side 1142, opposite side 1132, of clamping portion 1130 having a bevel 1143, to conform to the shape of support element 1100. It is noted that clamp element 1120 is formed without bevel 1133.

Reference is now made to FIGS. 13A-13F, which are simplified illustrations of support element 1100, forming part of SUPCASCA 1030 of FIGS. 9A-12H. As seen in FIGS. 13A-13F, support element 1100 preferably includes a generally circular planar surface 1200 which is surrounded by a raised, generally annular planar container support surface 1210, preferably joined to surface 1200 by a tapered generally circular wall 1212. A spillage channel 1214 extends radially outwardly through tapered circular wall 1212 at a height between the planes of surface 1200 and annular planar container support surface 1210.

It is noted that support surface 1210, although generally annular, is formed with a radially outwardly directed extension 1220, which communicates with spillage channel 1214. Extension 1220 is configured to accommodate user-engageable front flap 190 of cover 130 of SUCSERDREA 120 of SUPCA 100. This configuration is operative to provide centering and desired azimuthal orientation of SUPCA 100 when in operative engagement with MMIDD 1000.

It is also noted that radially inwardly of spillage channel 1214 and communicating therewith, there is formed a widened recessed portion 1224, which is configured to receive finger engagement portion 198 of cover 130 of SUCSERDREA 120 of SUPCA 100. It is further noted that radially inwardly of widened recessed portion 1224 are a pair of radially inwardly directed mutually spaced protrusions 1226, which support access door 194 of cover 130 of SUCSERDREA 120 of SUPCA 100 and prevent it from opening when SUPCA 100 is in operative engagement with MMIDD 1000.

Disposed centrally of generally circular planar surface 1200 is a drive shaft accommodating aperture 1230, which is surrounded by an upstanding circumferential rim 1232 operative to help prevent leaking of spillage located on generally circular planar surface 1200 into the remainder of MMIDD 1000 lying below support element 1100.

Annular planar container support surface 1210 is preferably surrounded by a tapered wall 1240. Wall 1240 terminates in a circumferential planar annular top and radially outwardly-extending wall 1244 having a top-facing surface 1246.

Located on tapered wall 1240 and communicating with spillage channel 1214 is a spillage aperture 1248. Spillage aperture 1248 is operative to direct spillage from spillage channel 1214 away from fluid-sensitive portions of MMIDD 1000.

Walls 1240 and 1244 are formed with a plurality of clamp accommodating pockets 1256, 1258 and 1260, operative to house clamp elements 1116, 1118 and 1120, respectively. Each of pockets 1256, 1258 and 1260 preferably includes an opening 1262, which extends from wall 1240 at a height just below that of wall 1244 radially outwardly along wall 1244. Each of pockets 1256, 1258 and 1260 further includes a radially outwardly-extending wall 1264 and side walls 1266. As seen particularly well in FIG. 13D, radially outwardly-extending wall 1264 includes a radially inwardly-extending lower portion 1268 and a radially outward-extending upper portion 1270 joined by a concave curved surface 1272. In pocket 1258, extending radially inwardly from radially inwardly-extending lower portion 1268 adjacent each of side walls 1266 and underlying opening 1262 are a pair of protrusions 1276. Pockets 1256 and 1260 differ from pocket 1258 in being formed such that extending radially inwardly from radially inwardly-extending lower portion 1268 adjacent each of side walls 1266 and underlying opening 1262 is a single, curved elongate protrusion 1278.

Preferably, a depending circumferential wall 1280 extends along nearly one half of the circumference of wall 1244 at an outer edge thereof.

Underlying surface 1200 is a corresponding circular planar surface 1290 which is formed with a convex curved circumferential wall 1292 surrounding aperture 1230. Surrounding wall 1292 there is formed a generally circular recess 1294, with annular wall 1295. Generally circular recess 1294 and annular wall 1295 are preferably configured to have a radially outwardly-extending rectangular notch 1296 and a plurality of circumferentially distributed radially inwardly-facing motor assembly engagement protrusions 1297.

Reference is now made to FIGS. 14A-14F, which are simplified illustrations of cam element 1110, forming part of SUPCASCA 1030 of FIGS. 9A-13F.

As seen in FIGS. 14A-14F, cam element 1110 preferably is a generally circular planar element, preferably formed of polyoxymethylene (POM) or fiberglass-reinforced polyamide.

Cam element 1110 preferably includes a generally circular disk 1300 having a generally planar top surface 1302 and a generally planar bottom surface 1304 and is formed with a central aperture 1306 having a radially outwardly-extending generally rectangular notch 1308. A circumferential wall 1310 surrounds disk 1300.

Aperture 1306 is surrounded on generally planar top surface 1302 by a generally circular rotational engagement surface 1312 and is surrounded on generally planar bottom surface 1304 by a generally circular ledge surface 1314. Generally circular ledge surface 1314 is surrounded adjacent generally planar bottom surface 1304 by a generally circular wall 1316 that is formed with a plurality of radially outwardly-extending notches 1318. A plurality of mutually equally spaced ribs 1320 preferably extend from circular wall 1316 to circumferential wall 1310 and are joined to planar bottom surface 1304.

Formed on a radially outer surface of circumferential wall 1310 are a plurality of cam channels 1330, preferably three in number, each arranged to operate and selectably position one of clamp elements 1116, 1118 and 1120, located in one each of pockets 1256, 1258 and 1260, respectively, of support element 1100, as described hereinbelow with reference to FIGS. 45-53. Each of clamp elements 1116, 1118 and 1120 are retained in one of cam channels 1330 by engagement of engagement surface 1138 of radially outwardly-facing surface 1124 of each of clamp elements 1116, 118 and 1120 with lower surface 1268 of one each of pockets 1256, 1258 and 1260, respectively.

Figure 14A:
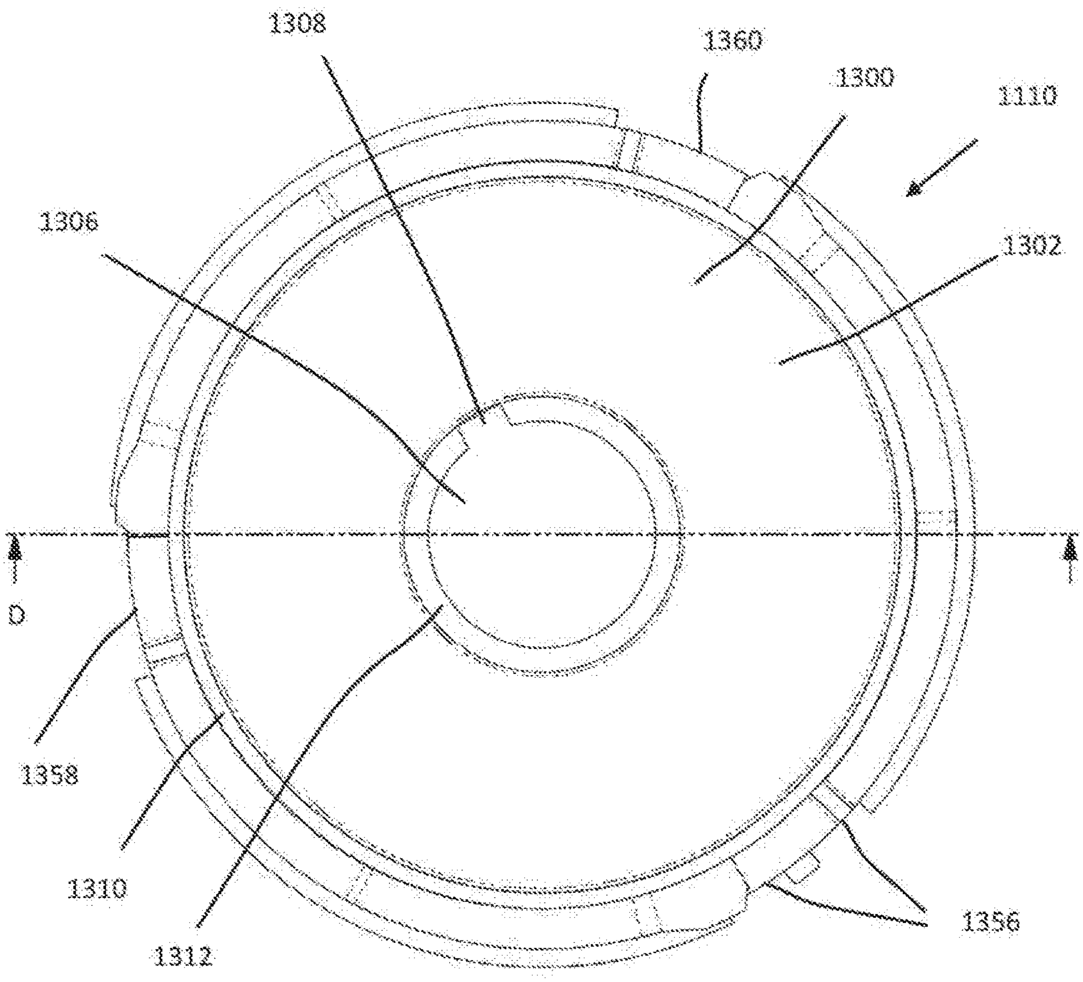
FIGS. 14A, 14B, 14C, 14D, 14E and 14F are simplified respective planar top view, planar side view, planar bottom view, sectional view, pictorial top view and pictorial bottom view illustrations of a cam element, forming part of the SUPCASCA of FIGS. 9A-13F.
Figure 14B:
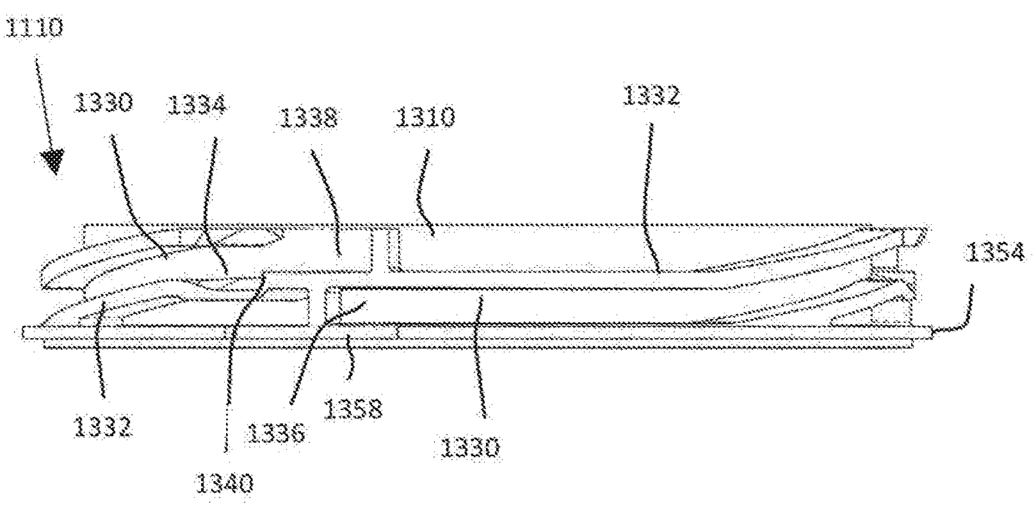
Figure 14C:
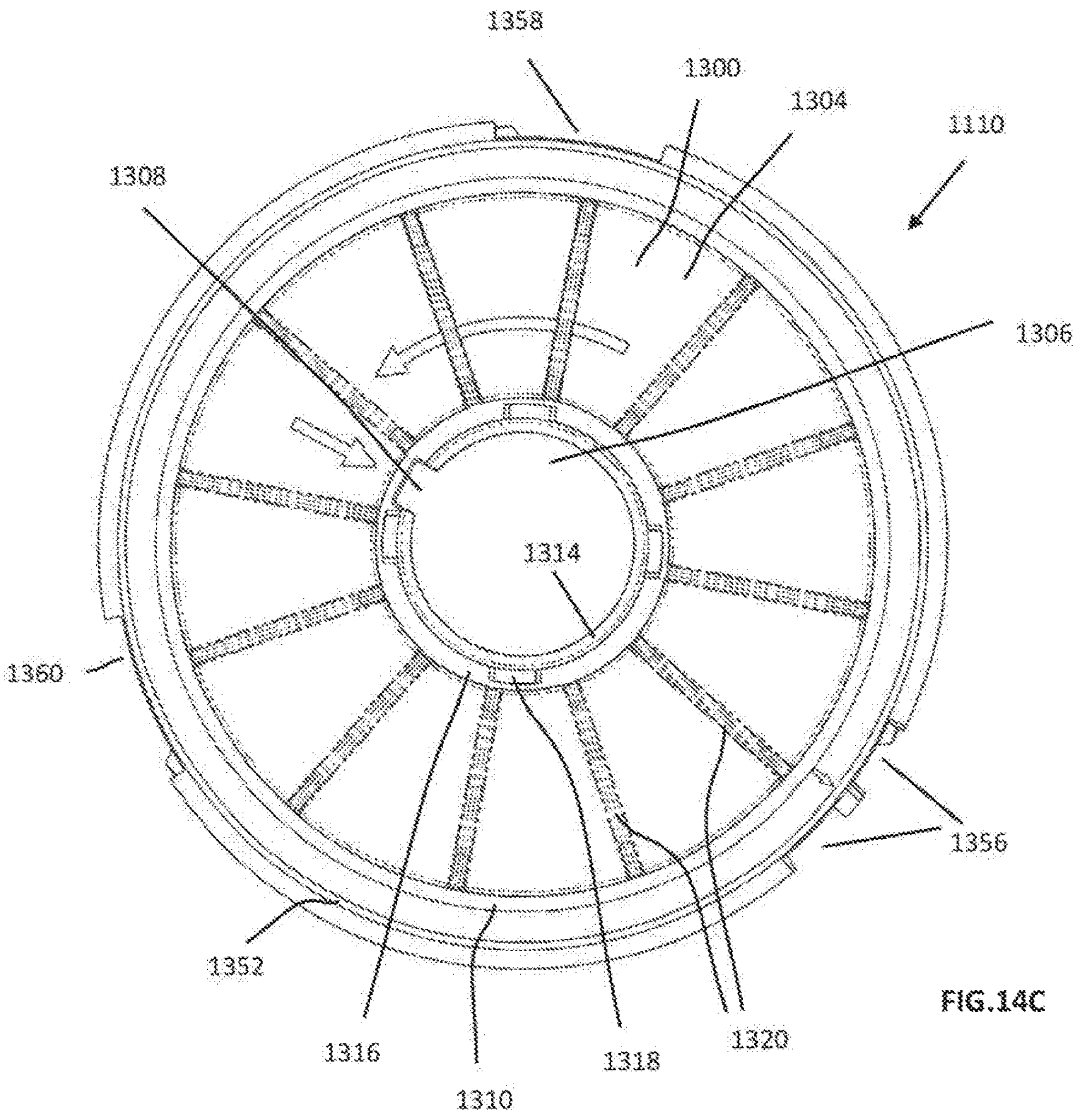
Figure 14D:
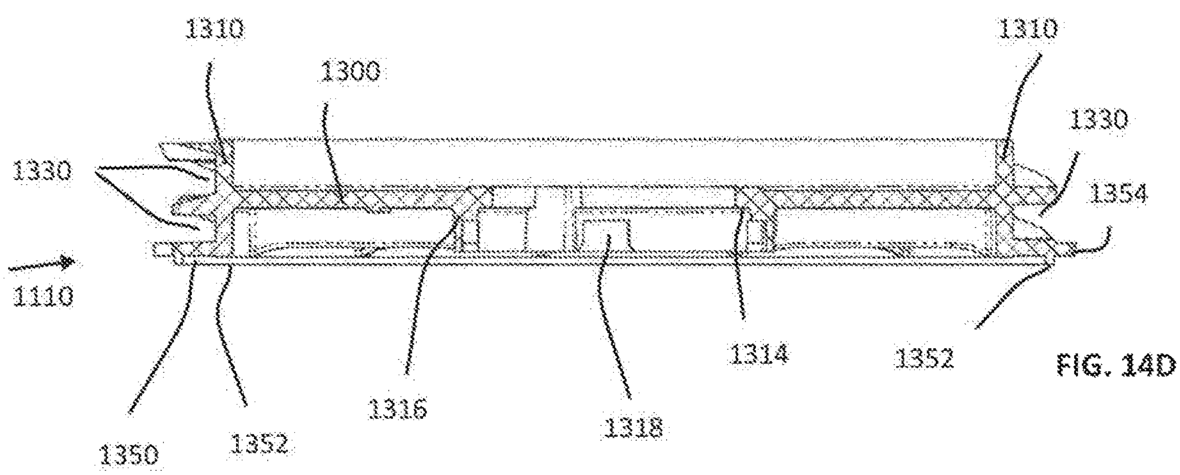
Figure 14E:
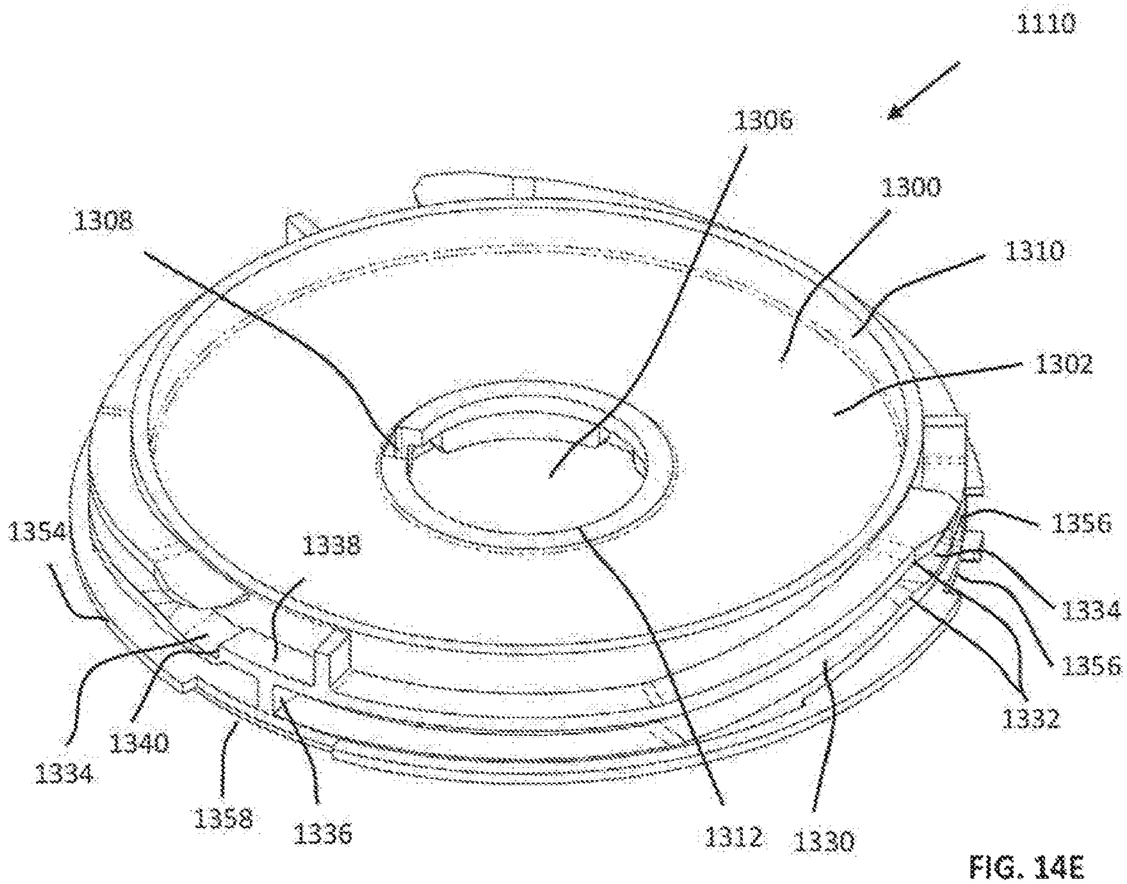

As seen particularly well in FIGS. 14B and 14E, cam channels 1330 are distributed about the outer circumference of cam element 1110 and are partially overlapping. Each cam channel 1330 is defined by a pair of radially outwardly-extending mutually spaced circumferential walls 1332, each of which extends from a first location 1334 therealong to a second location 1336 therealong.

Upstream of first location 1334 is an entry location 1338 wherein, during assembly of SUPCASCA 1030, each of clamp elements 1116, 1118 and 1120 is inserted into cam channel 1330. Generally, each cam channel 1330 extends circumferentially and downwardly through approximately 105 degrees of azimuth. The width of each cam channel 1330, as defined by the separation between adjacent circumferential walls 1332, is at a maximum at first location 1334.

It is a particular feature of the present invention that the operation of cam element 1110 in causing clamp elements 1116, 1118 and 1120 to assume a clamping operative orientation is produced both by the downward orientation of cam channel 1330 from first location 1334 to second location 1336 and by varying the radial extent of a circumferential wall 1332 relative to circumferential wall 1310 along cam channels 1330. Thus it will be seen that at first location 1334, the radial extent of the upper circumferential wall 1332 defining cam channel 1330 is at a maximum, forcing each of clamp elements 1116, 1118 and 1120 located in the cam channel 1330 at first location 1334 in a radially outward direction, and as the cam channel 1330 rotates relative to each of clamp elements 1116, 1118 and 1120 in pocket 1260, the radial extent of the upper circumferential wall 1332 decreases, allowing each of clamp elements 1116, 1118 and 1120 to be biased radially inwardly by engagement of engagement surface 1138 of radially outwardly-facing surface 1124 of each of clamp elements 1116, 1118 and 1120 with lower surface 1268 of one each of pockets 1256, 1258 and 1260, respectively.

This operation is enhanced by construction of cam channels 1330 to have a maximum width between adjacent circumferential walls 1332 at first location 1334 along each cam channel 1330 so as to accommodate radial outward biasing of each of clamp elements 1116, 1118 and 1120 within the cam channel 1330 thereat.

It is appreciated that cam channels 1330 are ach constructed to have a somewhat flexible stopper portion 1340 downstream of entry location 1338 and upstream of the first location 1334 thereof to permit assembly of the device with each of clamp elements 1116, 1118 and 1120 located within cam channel 1330 and to prevent inadvertent disengagement of each of clamp elements 1116, 1118 and 1120 from cam channel 1330. Each cam channel 1330 is blocked at second location 1336, thus preventing disengagement of each of clamp elements 1116, 1118 and 1120 from cam channel 1330 at second location 1336.

Figure 14F:
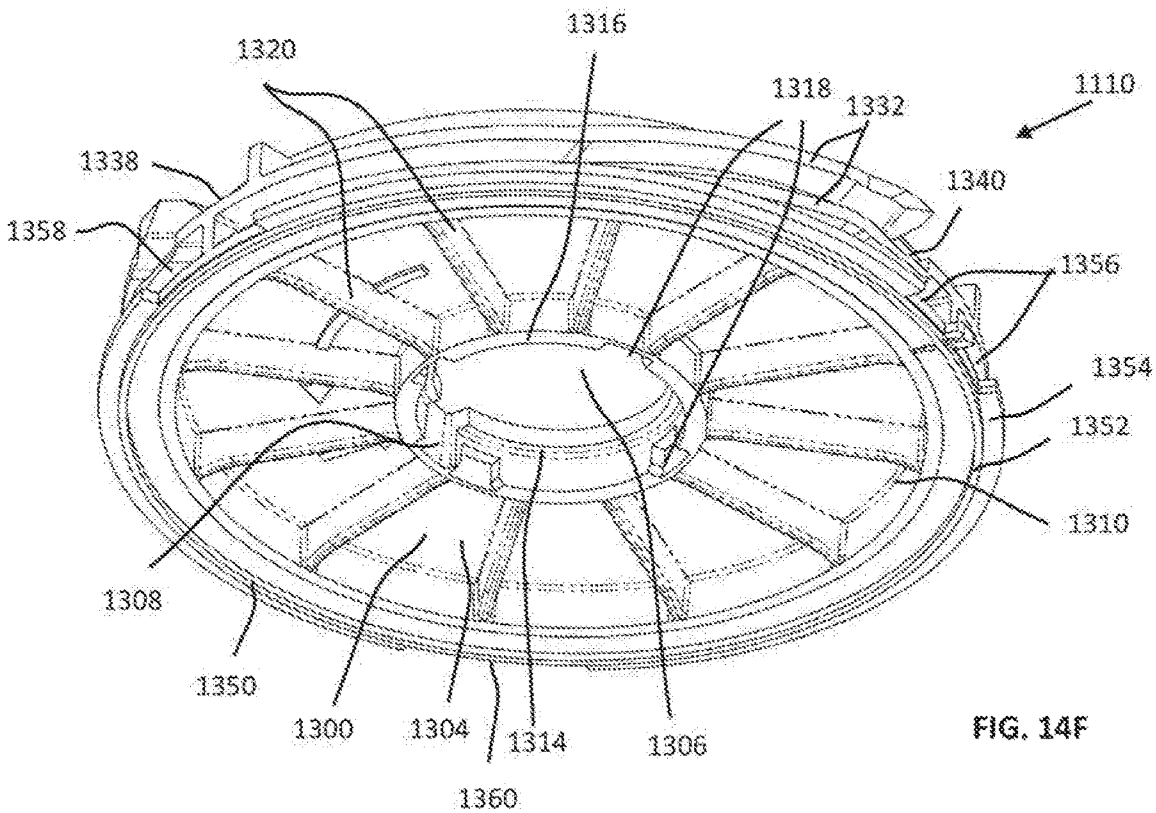
Figure 15A:
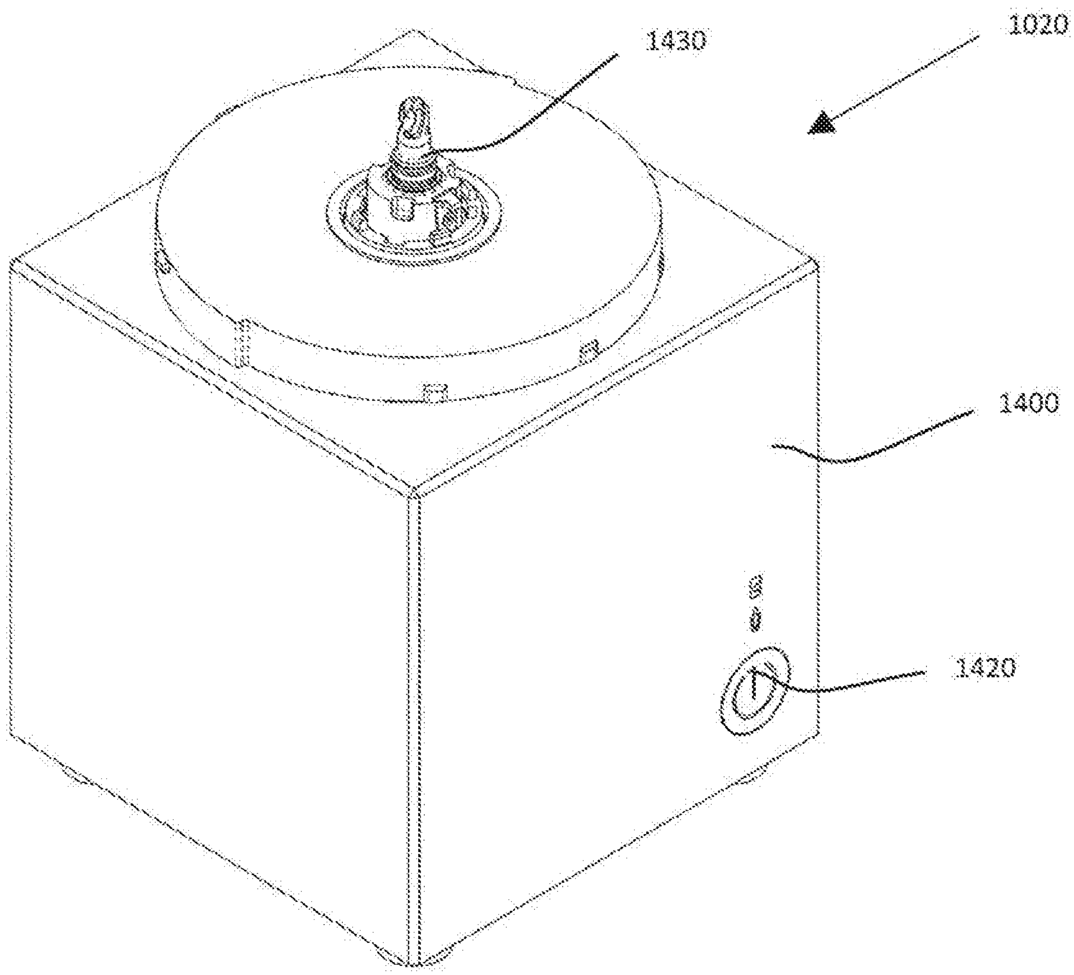
FIGS. 15A, 15B, 15C, 15D and 15E are simplified respective pictorial, planar front, planar top, planar bottom and exploded view illustrations of a base assembly, forming part of the MMIDD of FIGS. 7A-14F.
Figure 15B:
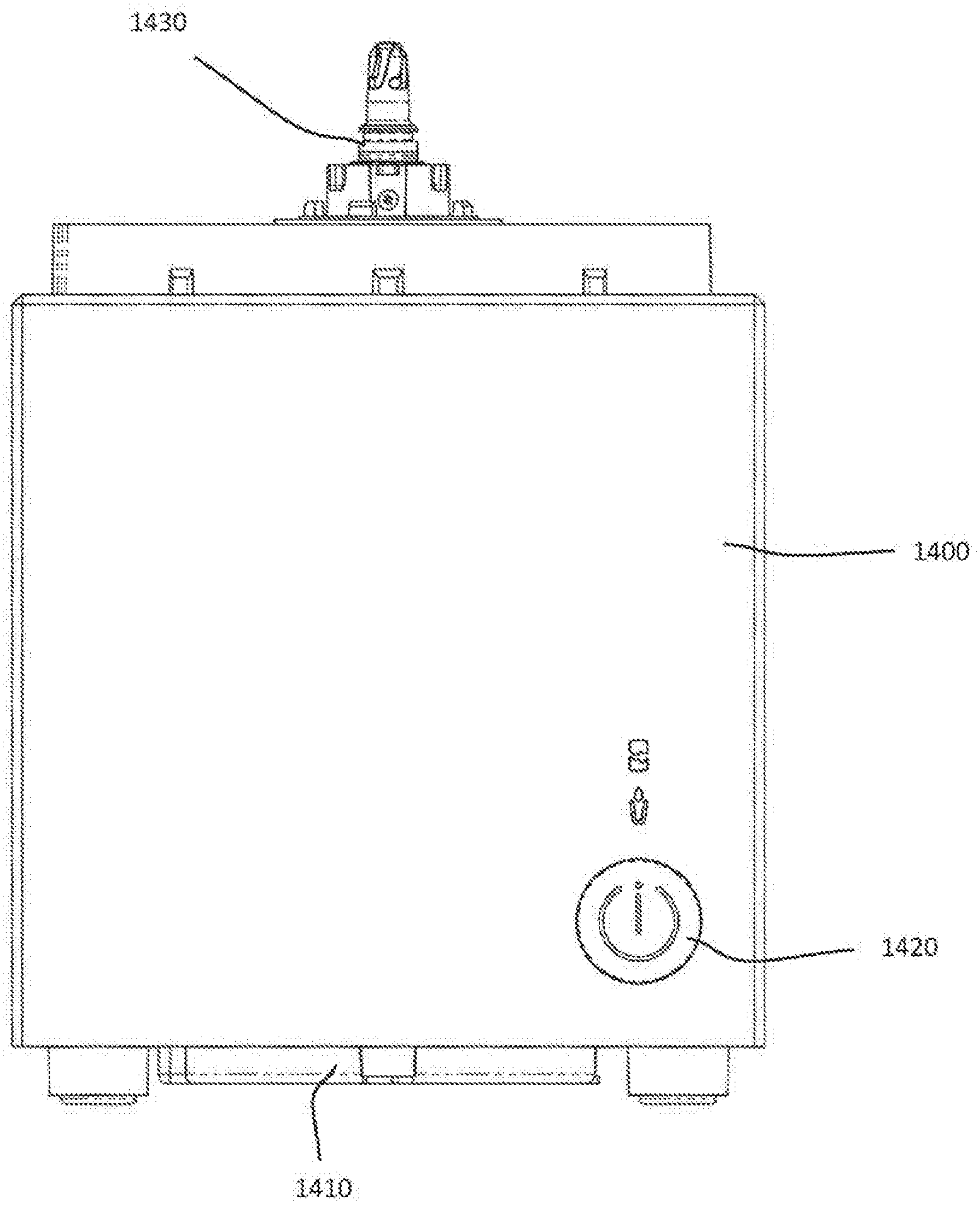
Figure 15C:
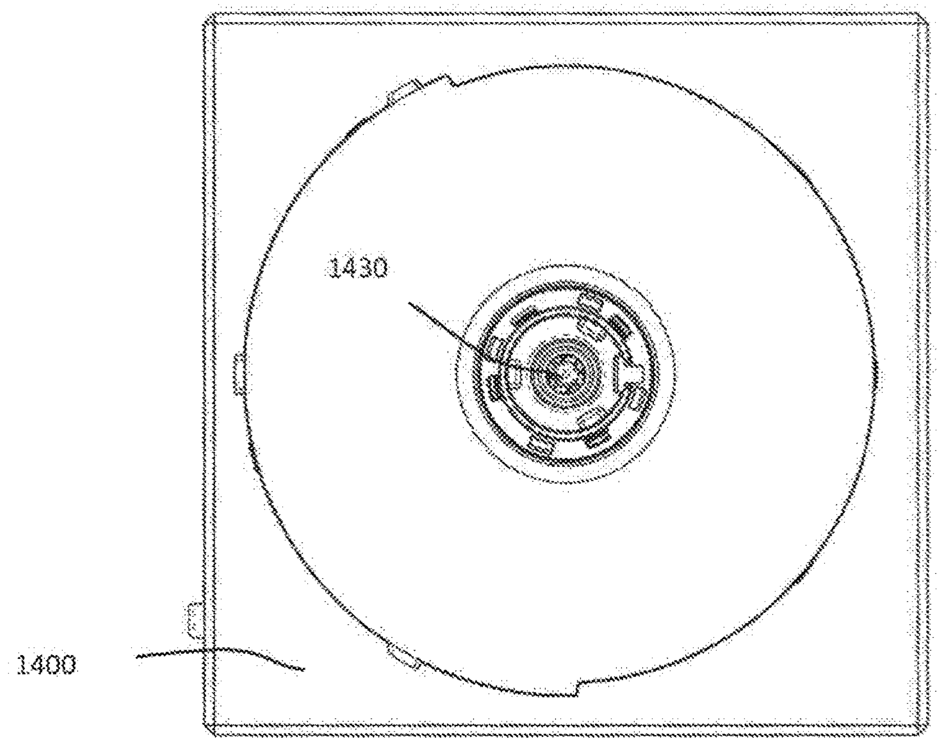
Figure 15D:
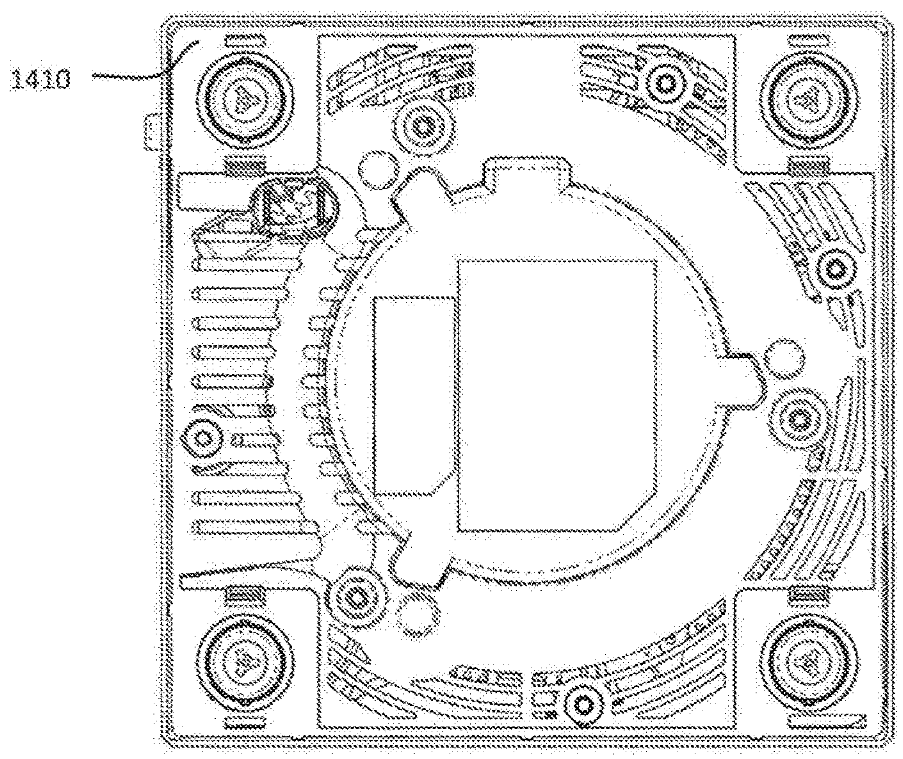
Figure 15E:
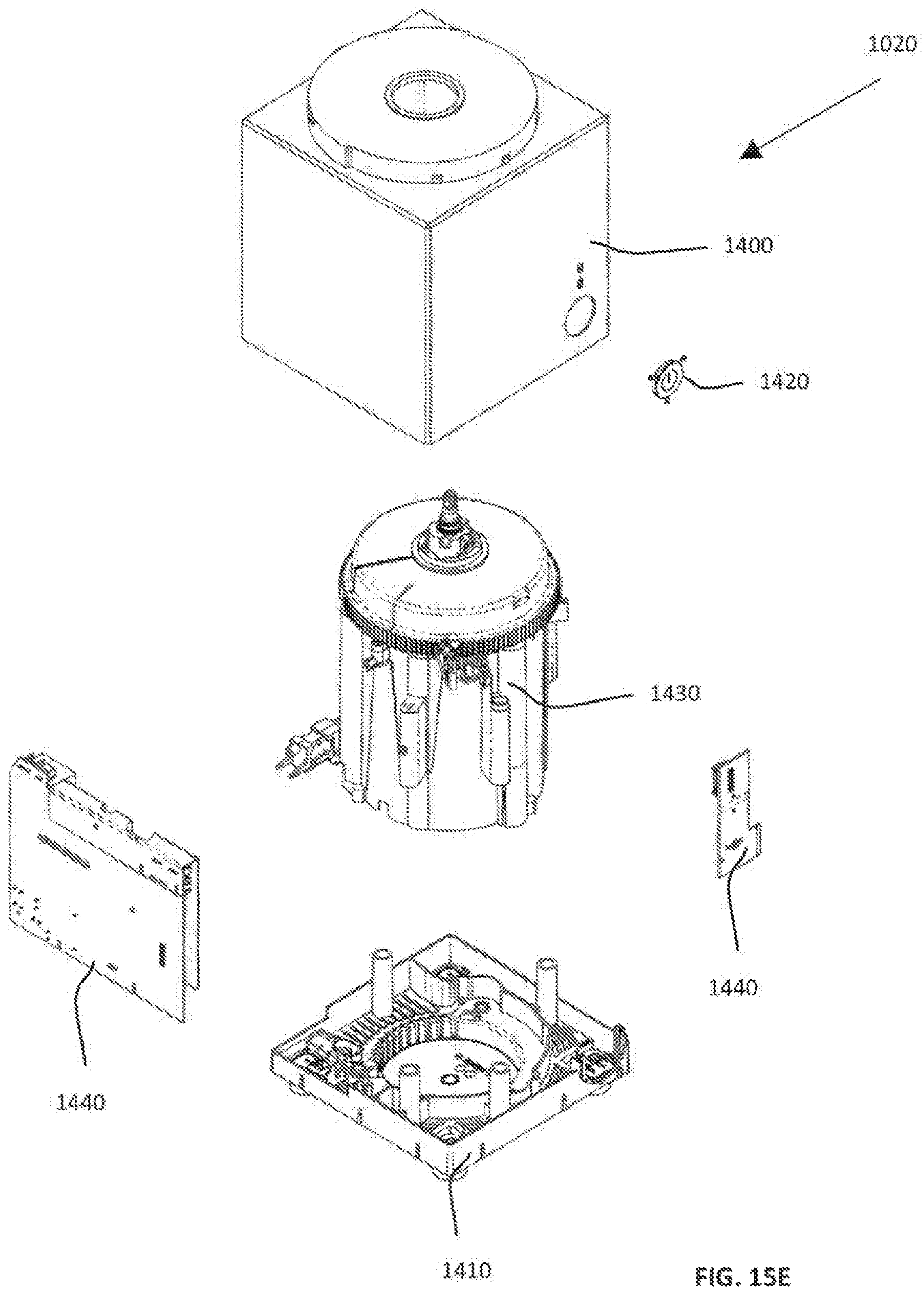

As seen particularly well in FIGS. 14C and 14F, it is a particular feature of the present invention that a generally planar annular wall surface 1350 extends radially outwardly of circumferential wall 1310 below generally planar bottom surface 1304 and is formed with a downwardly-facing circumferential leakage directing protrusion 1352, which is operative to direct liquids away from the interior of MMIDD 1000.

It is also a particular feature of the present invention that a radially outwardly directed edge 1354 of generally planar annular wall surface 1350 is formed with a pair of locating notches 1356, as well as two elongate locating notches 1358 and 1360. Locating notches 1356 are configured to engage protrusions 1276 associated with pocket 1258, and elongate locating notches 1358 and 1360 are configured to engage single, curved elongate protrusion 1278 associated with each of pockets 1260 and 1256, respectively, thereby ensuring proper azimuthal alignment between cam element 1110 and support element 1100.

Reference is now made to FIGS. 15A-15E, which are simplified illustrations of base assembly 1020, forming part of MMIDD 1000 of FIGS. 7A-37G. As seen in FIGS. 15A-15E, base assembly 1020 includes a base housing 1400, which is preferably generally cubic in configuration and is supported on a bottom assembly 1410. Mounted on base housing 1400 is an ON/OFF push button element 1420.

Disposed within base housing 1400 are a vertically displacing rotary drive motor assembly 1430 and a printed circuit board assembly 1440, which preferably contains control electronics which manage operation of MMIDD 1000.

Reference is now made to FIGS. 16A-16E, which are simplified illustrations of base housing 1400, forming part of the base assembly 1020 of FIGS. 15A-15E. As seen in FIGS. 16A-16E, base housing 1400 includes a generally cubic main portion 1450 and a generally cylindrical top portion 1452 integrally formed therewith and having a top surface 1453. Generally cylindrical top portion 1452 is formed with a central aperture 1454, surrounded by a raised rim 1456.

Generally cylindrical top portion 1452 is preferably formed with a plurality of, typically six, radially outwardly-extending protrusions 1458 distributed along an outer periphery of each of a first and second generally semicircular wall portions 1460 and 1462 thereof. Protrusions 1458 are inserted into radially inward-facing bayonet receiving recesses 1066 of static housing element 1060 to provide locking of semicylindrical upstanding wall portion 1062 of static housing assembly 1060 to base housing 1400. Second generally semicircular wall portion 1462 is concentric with first generally semicircular wall portion 1460 but has a smaller outer radius. An aperture 1464 is provided on a front wall 1466 of generally cubic main portion 1450.

Figure 16A:
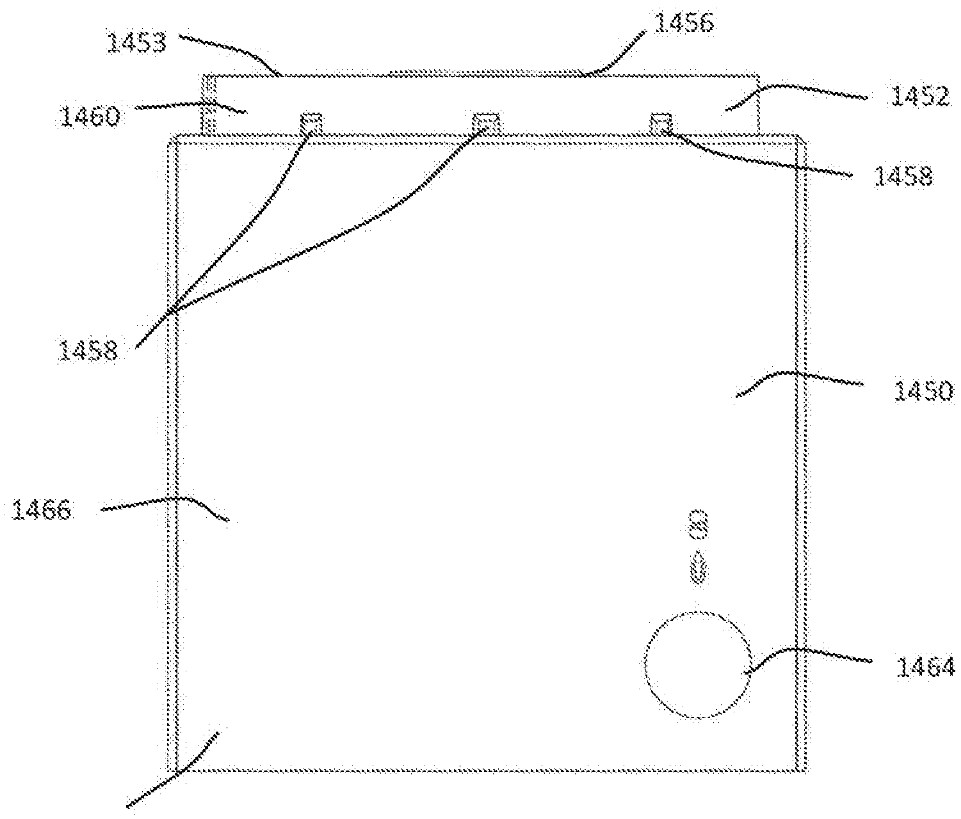
FIGS. 16A, 16B, 16C, 16D and 16E are simplified respective planar front, planar top, planar bottom, upwardly-facing pictorial and downwardly-facing pictorial view illustrations of a base housing, forming part of the base assembly of FIGS. 15A-15E.
Figure 16B:
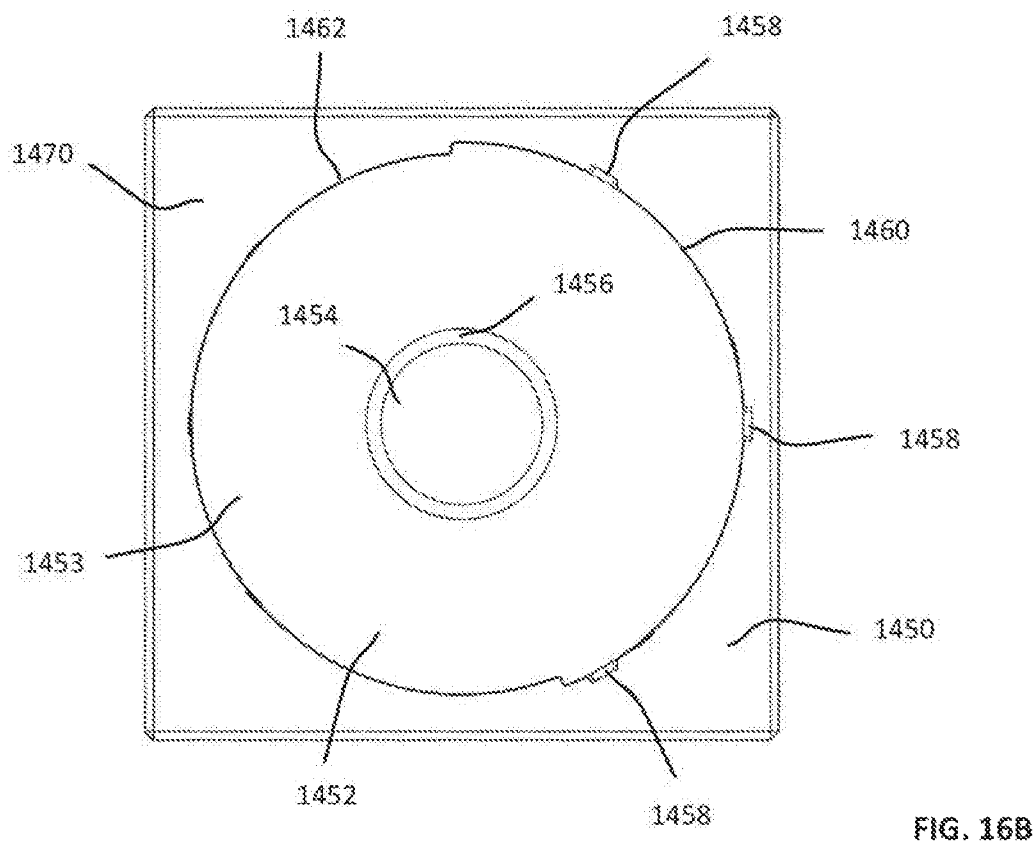
Figure 16C:
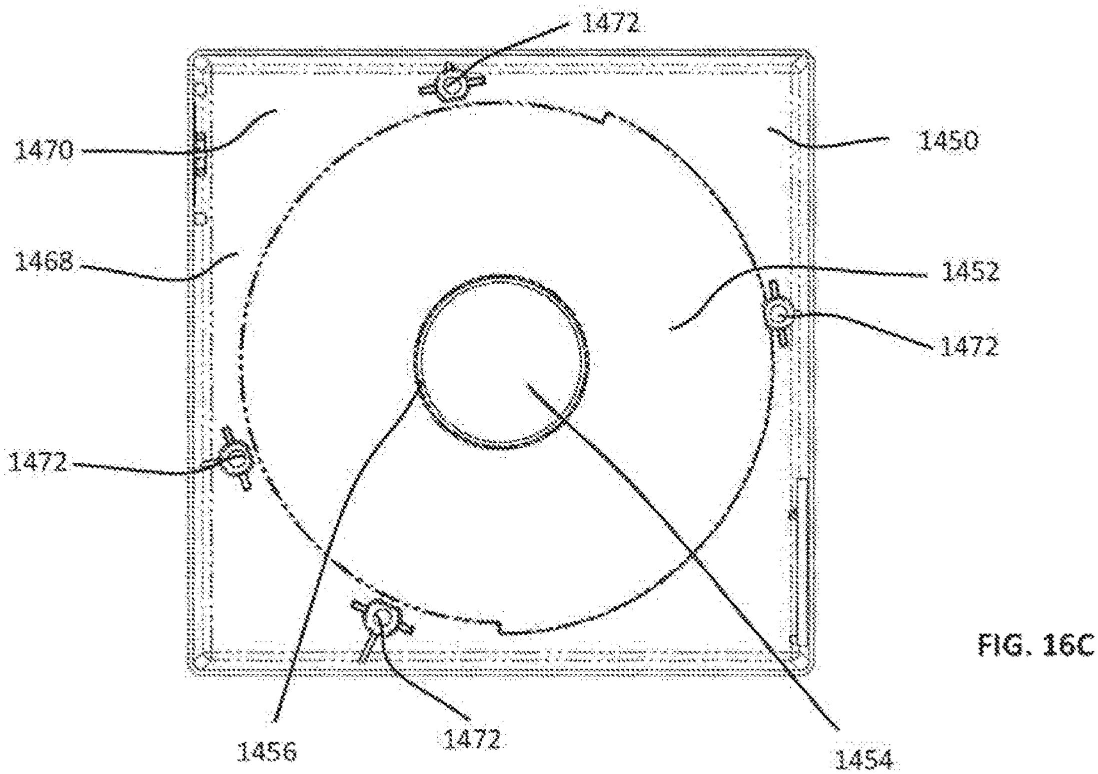
Figure 16D:
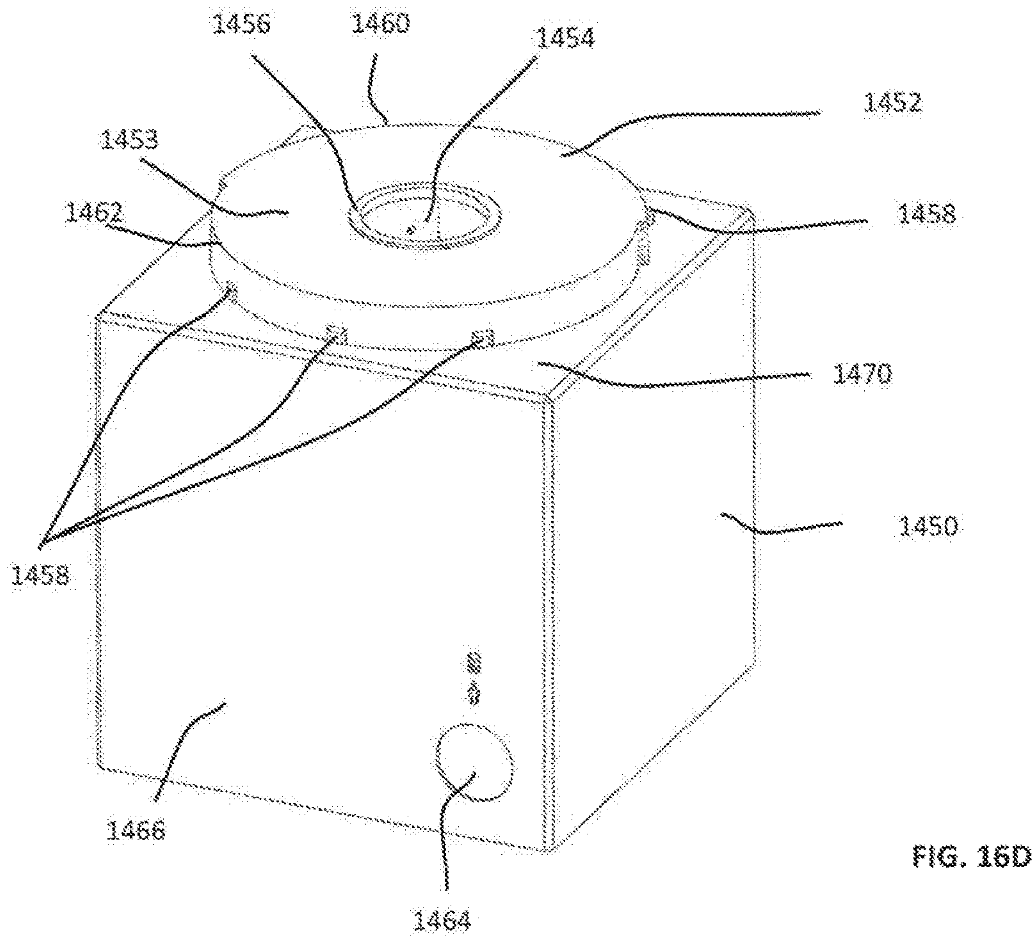
Figure 16E:
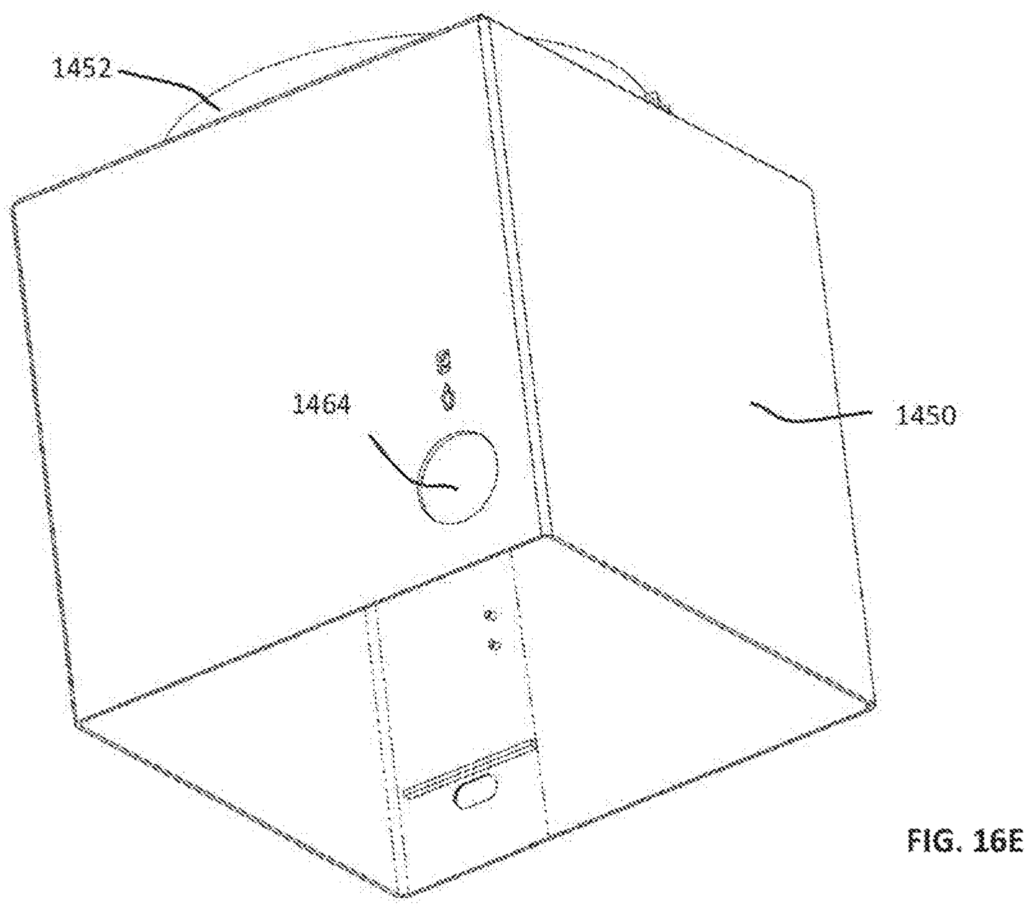

As seen particularly in FIG. 16C, an underside 1468 of a top wall 1470 of generally cubic main portion 1450 is preferably formed with a plurality of screw bosses 1472 for assembly.

Figure 17A:
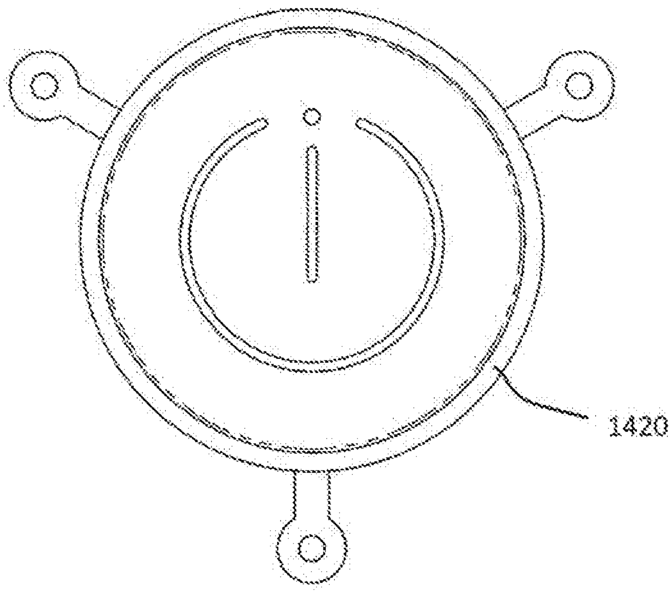
FIGS. 17A, 17B and 17C are simplified respective planar front view, pictorial front view and pictorial rear view illustrations of an ON/OFF push button element, forming part of the base assembly of FIGS. 15A-16E.
Figure 17B:
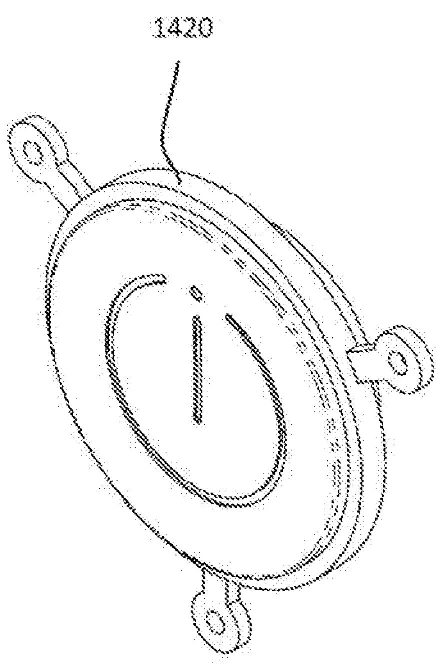
Figure 17C:
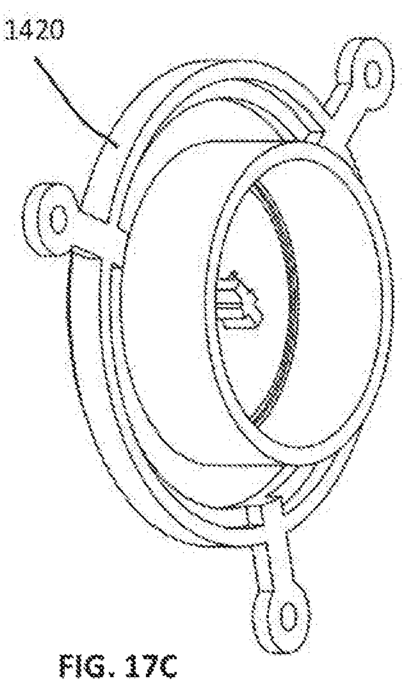

Reference is now made to FIGS. 17A-17C, which are simplified illustrations of ON/OFF push button element 1420, forming part of base assembly 1020 of FIGS. 15A-15E. ON/OFF push button element 1420 is preferably a somewhat flexible plastic element which engages a switch (not shown) and is preferably mounted on one of the printed circuit boards in printed circuit board assembly 1440 located within base housing 1400. ON/OFF push button element 1420 is preferably mounted in aperture 1464 of generally cubic main portion 1450.

Reference is now made to FIGS. 18A-18F, which are simplified illustrations of vertically displacing rotary drive motor assembly 1430, forming part of base assembly 1020 of FIGS. 15A-15E. As seen in FIGS. 18A-18F, vertically displacing rotary drive motor assembly 1430 preferably includes a rotary drive gear 1500, which is rotatably mounted on a motor housing and support assembly 1510. Motor housing and support assembly 1510 in turn supports an auxiliary rotary drive motor 1520 and encloses an axially displaceable rotary drive assembly 1530. A resilient sealing ring 1532 is fixedly mounted on a top surface of rotary drive gear 1500 and centered with respect thereto, as described hereinbelow with reference to FIGS. 21A-21G.

Figure 19:
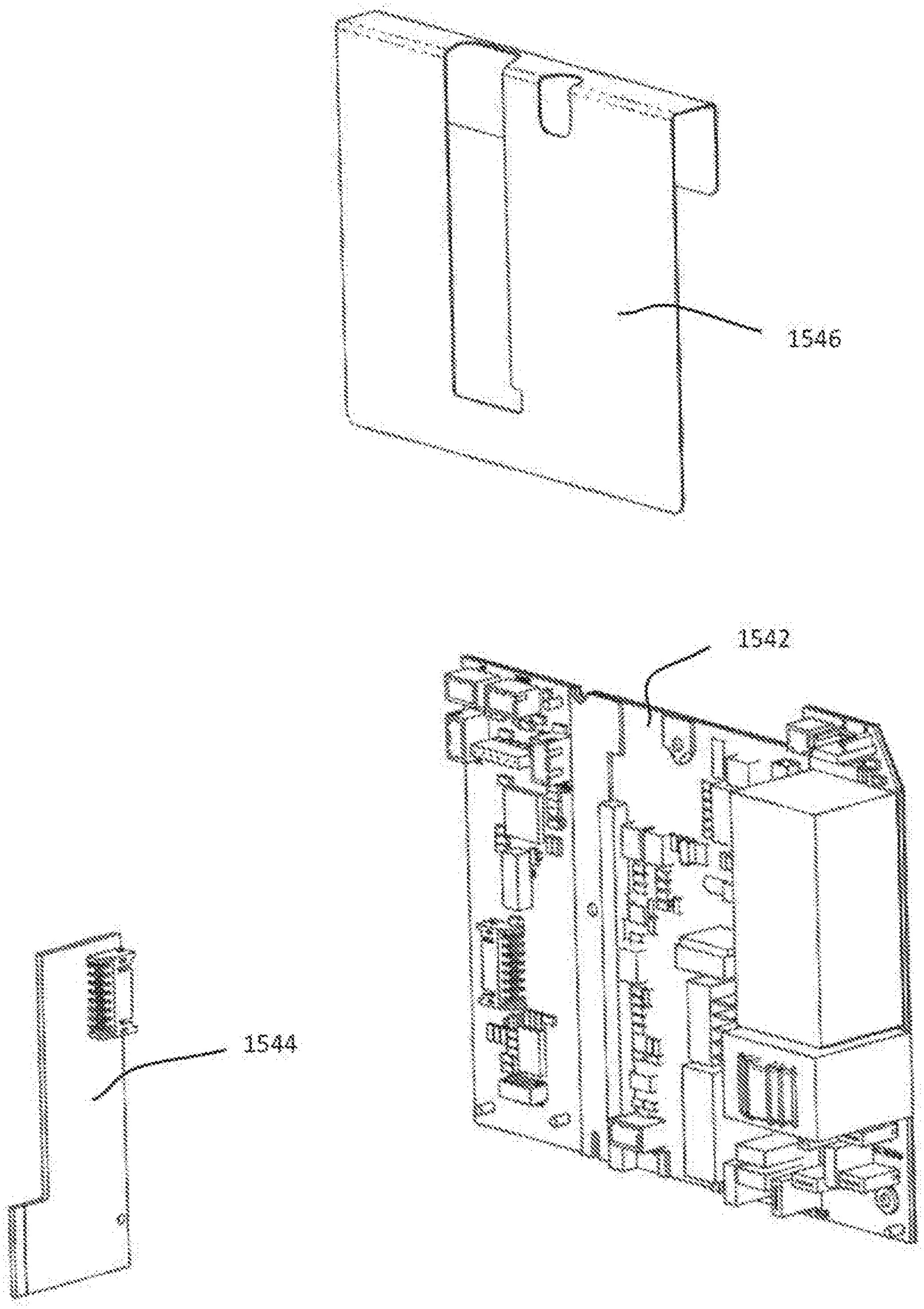
FIG. 19 is a simplified pictorial illustration of a printed circuit board assembly, forming part of the base assembly of FIGS. 15A-18F.

Reference is now made to FIG. 19, which is a simplified pictorial illustration of printed circuit board assembly 1440, forming part of base assembly 1020 of FIGS. 15A-15E. Printed circuit board assembly 1440 preferably includes a plurality of circuit boards 1542 and 1544, as well as a protective cover 1546. It is appreciated that there may be additionally provided multiple various printed circuit boards (not shown) within base housing 1400.

Figure 20A:
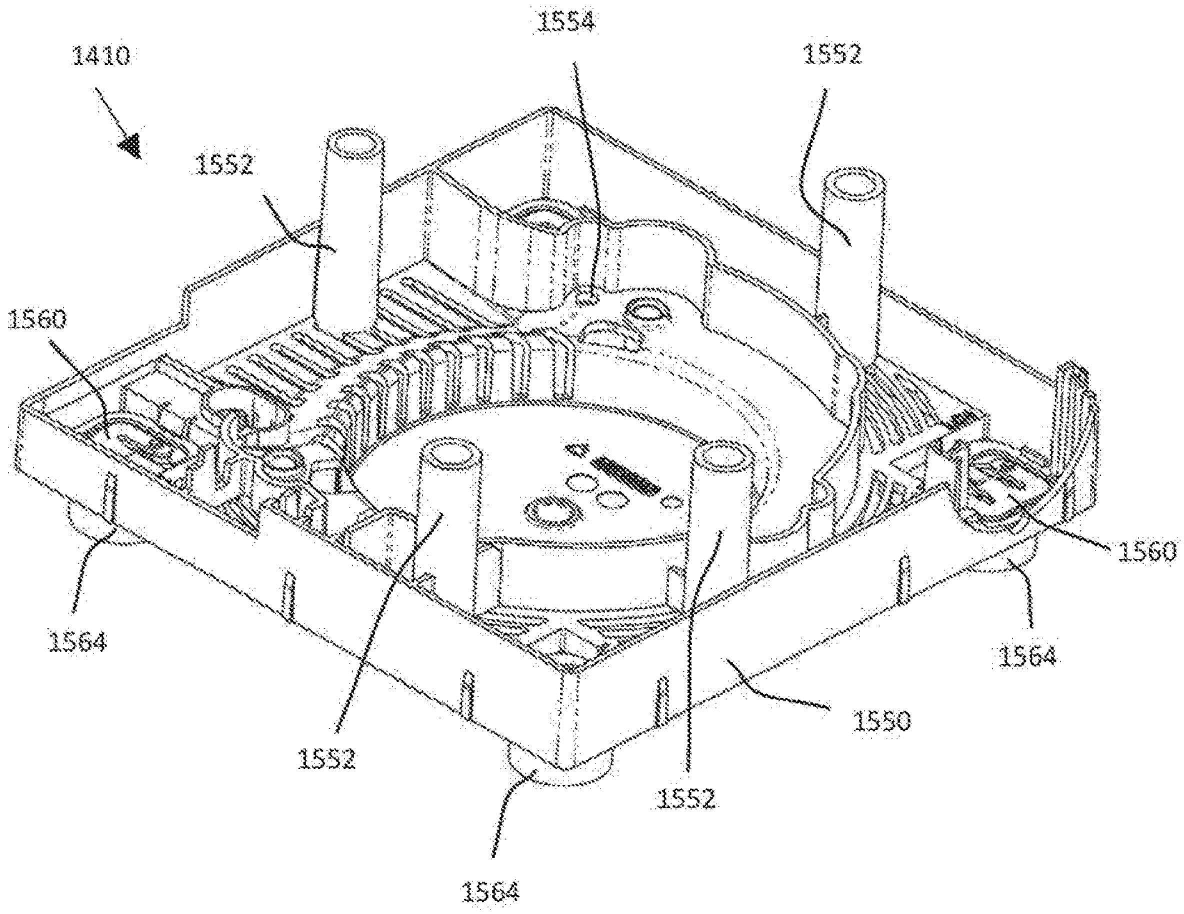
FIGS. 20A and 20B are simplified pictorial respective assembled and exploded view illustrations of a bottom assembly, forming part of the base assembly of FIGS. 15A-19.
Figure 20B:
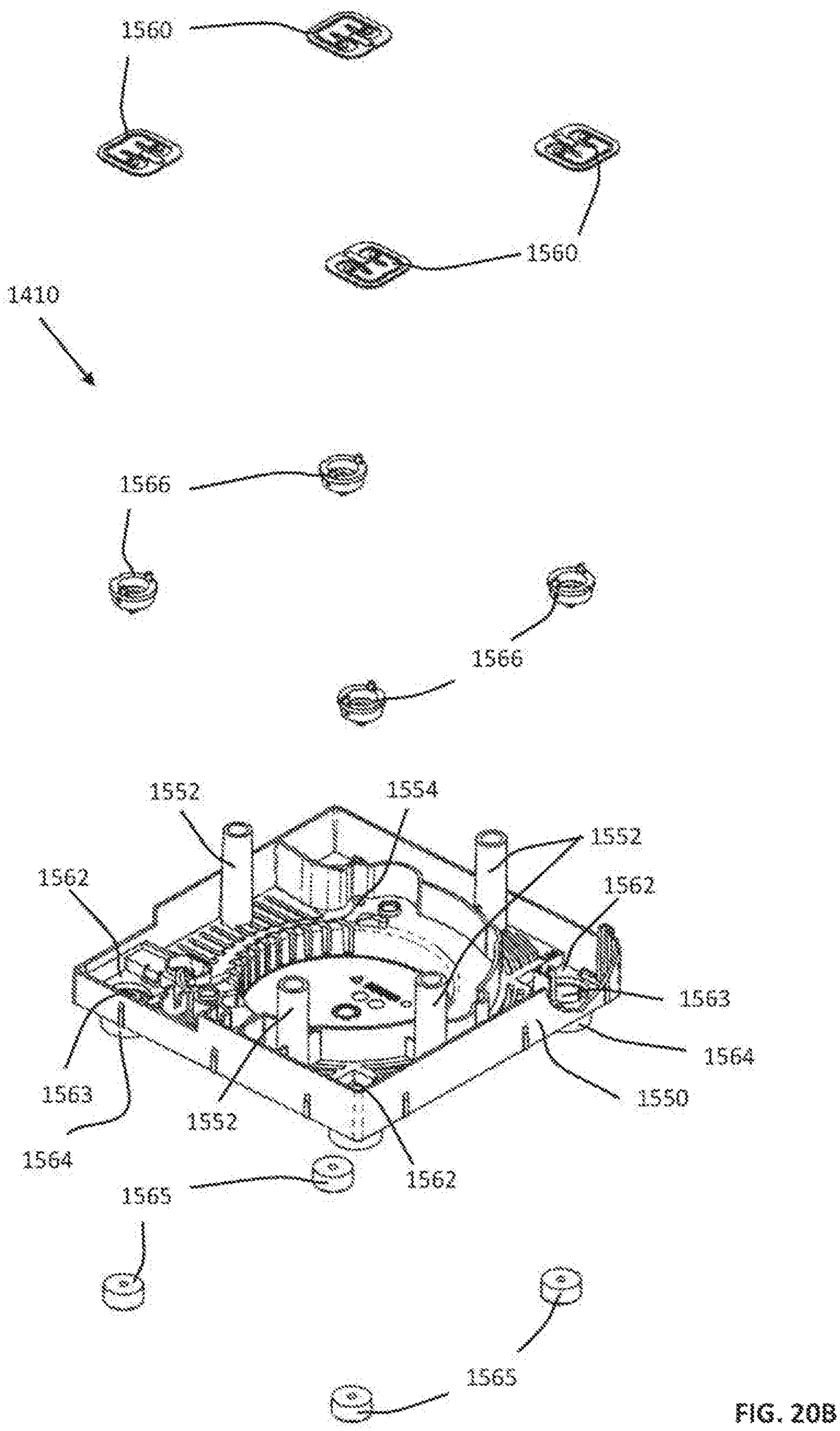
Figure 21A:
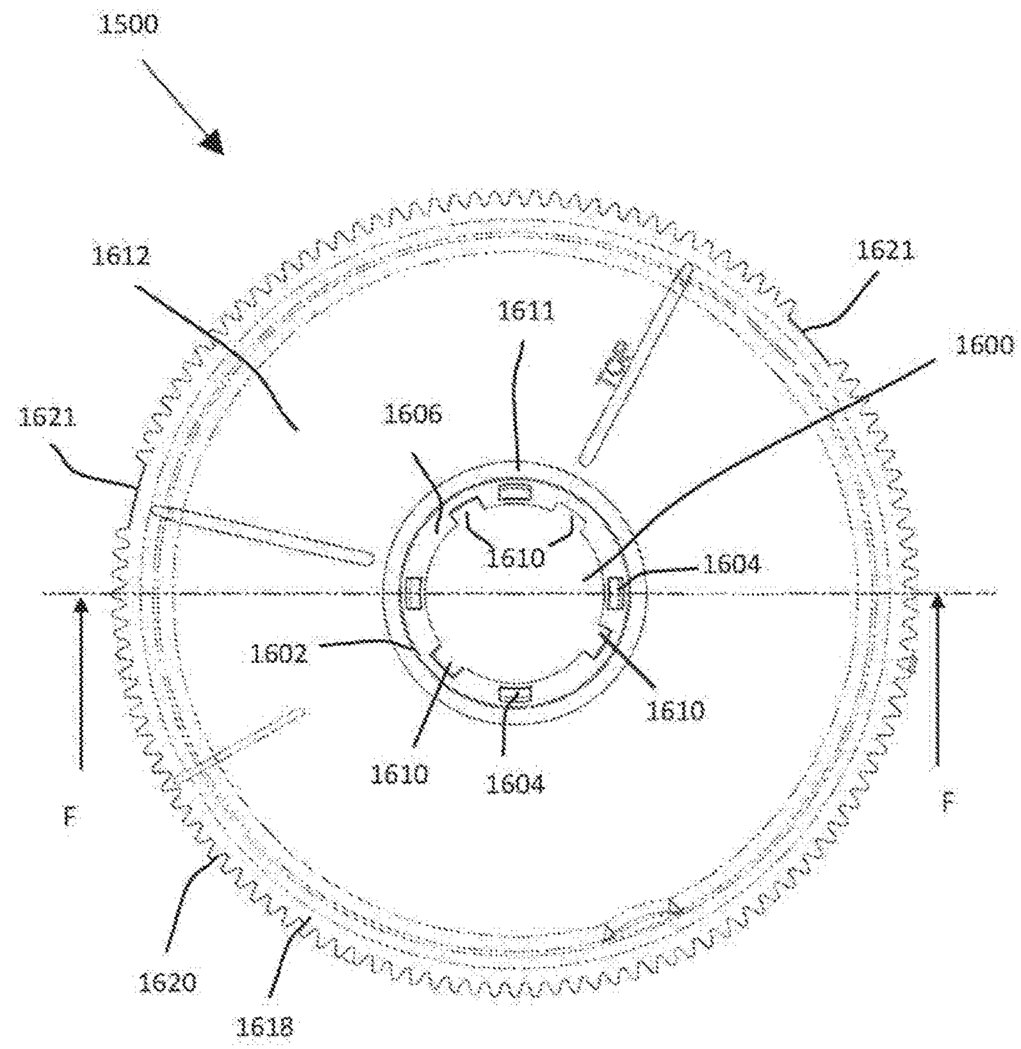
FIGS. 21A, 21B, 21C, 21D, 21E, 21F and 21G are simplified respective planar top, planar side, planar bottom, pictorial top, pictorial bottom, first planar sectional and second planar sectional view illustrations of a rotary drive gear, forming part of the vertically displacing rotary drive motor assembly of FIGS. 18A-18F, FIGS. 21F and 21G being taken along lines F-F in FIG. 21A and G-G in FIG. 21B, respectively.
Figure 21B:
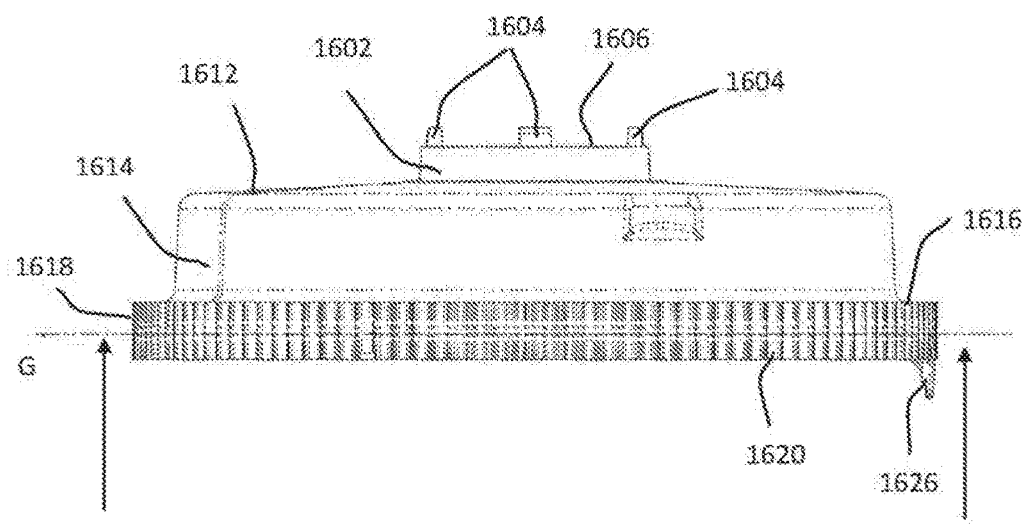
Figure 21C:
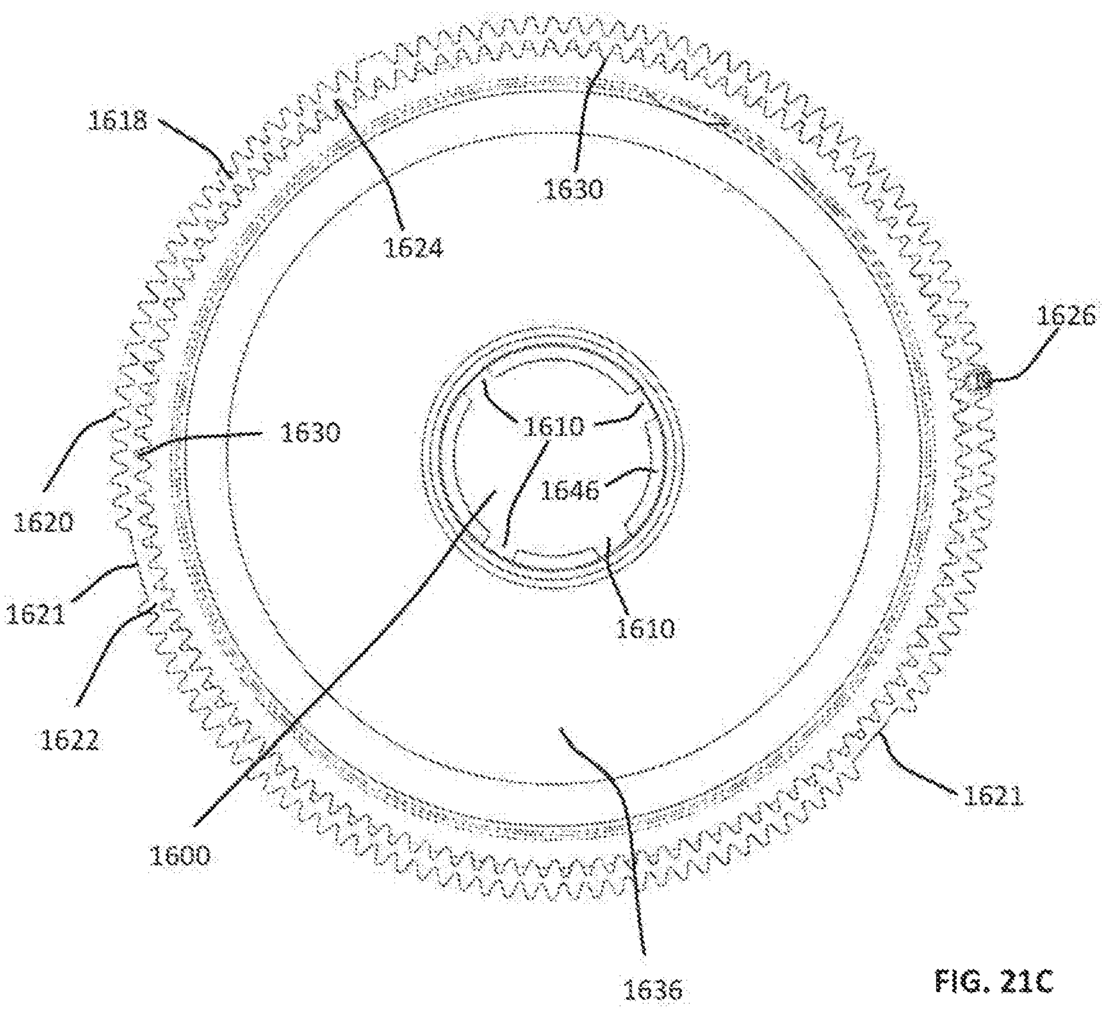
Figure 21D:
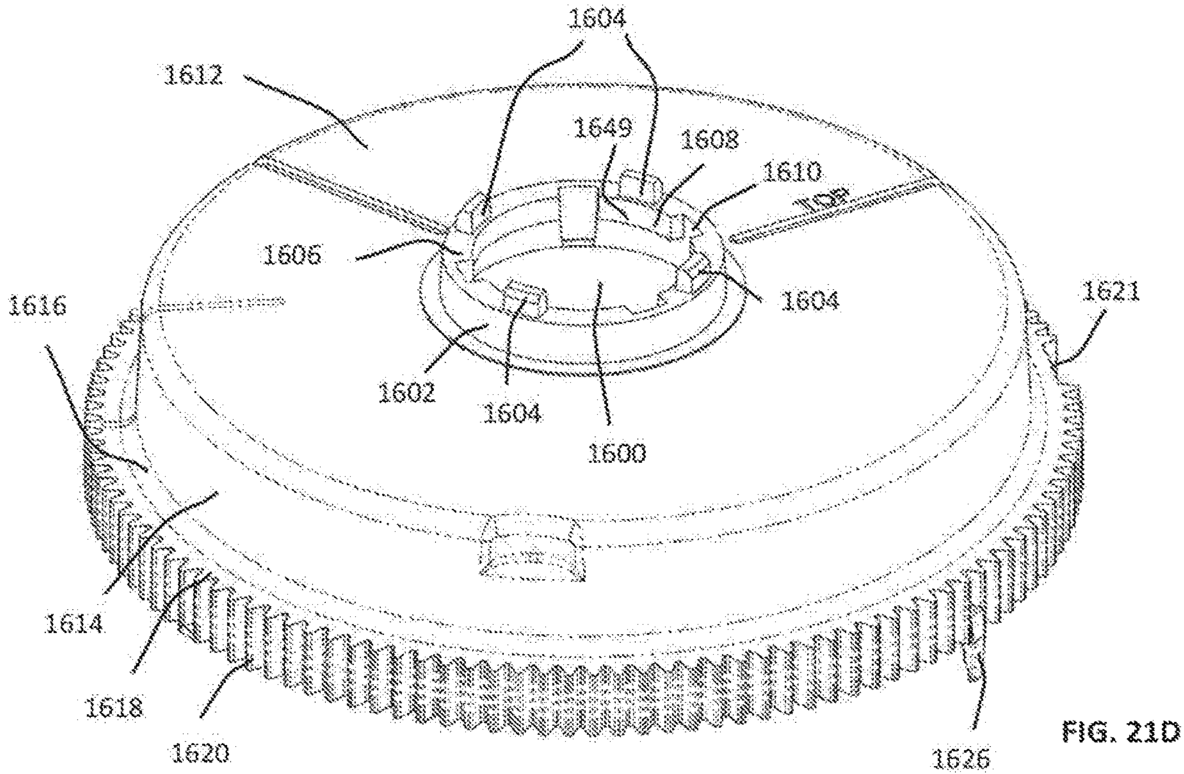
Figure 21E:
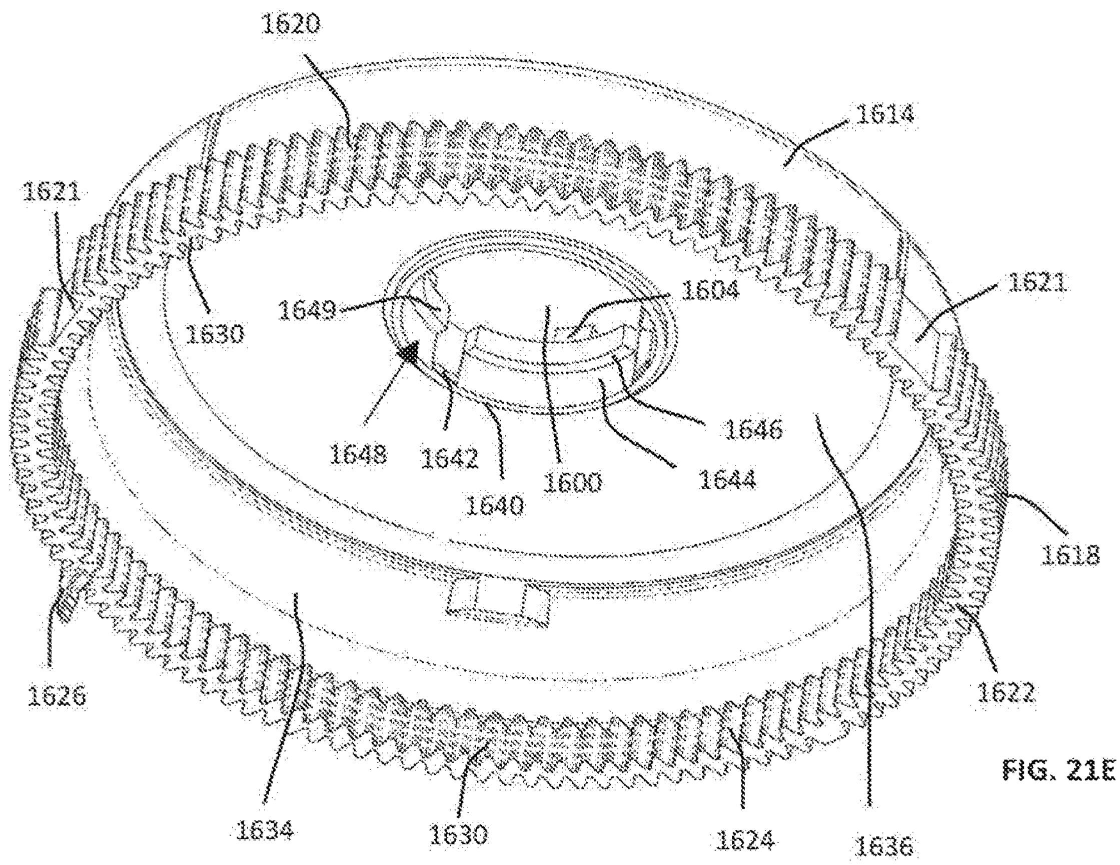
Figure 21F:
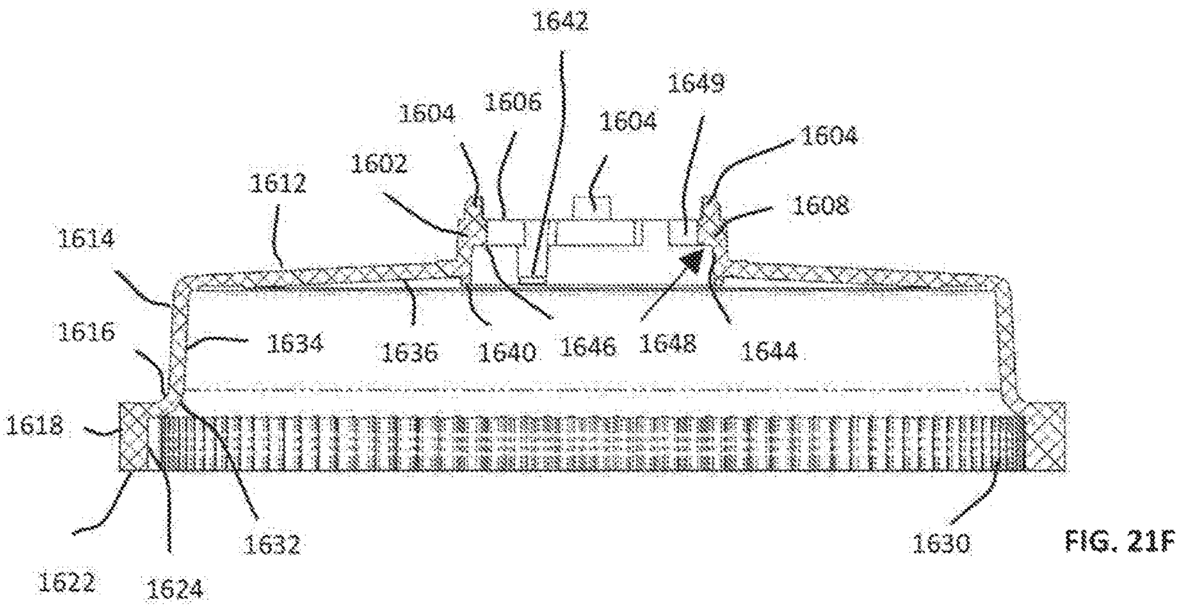
Figure 21G:
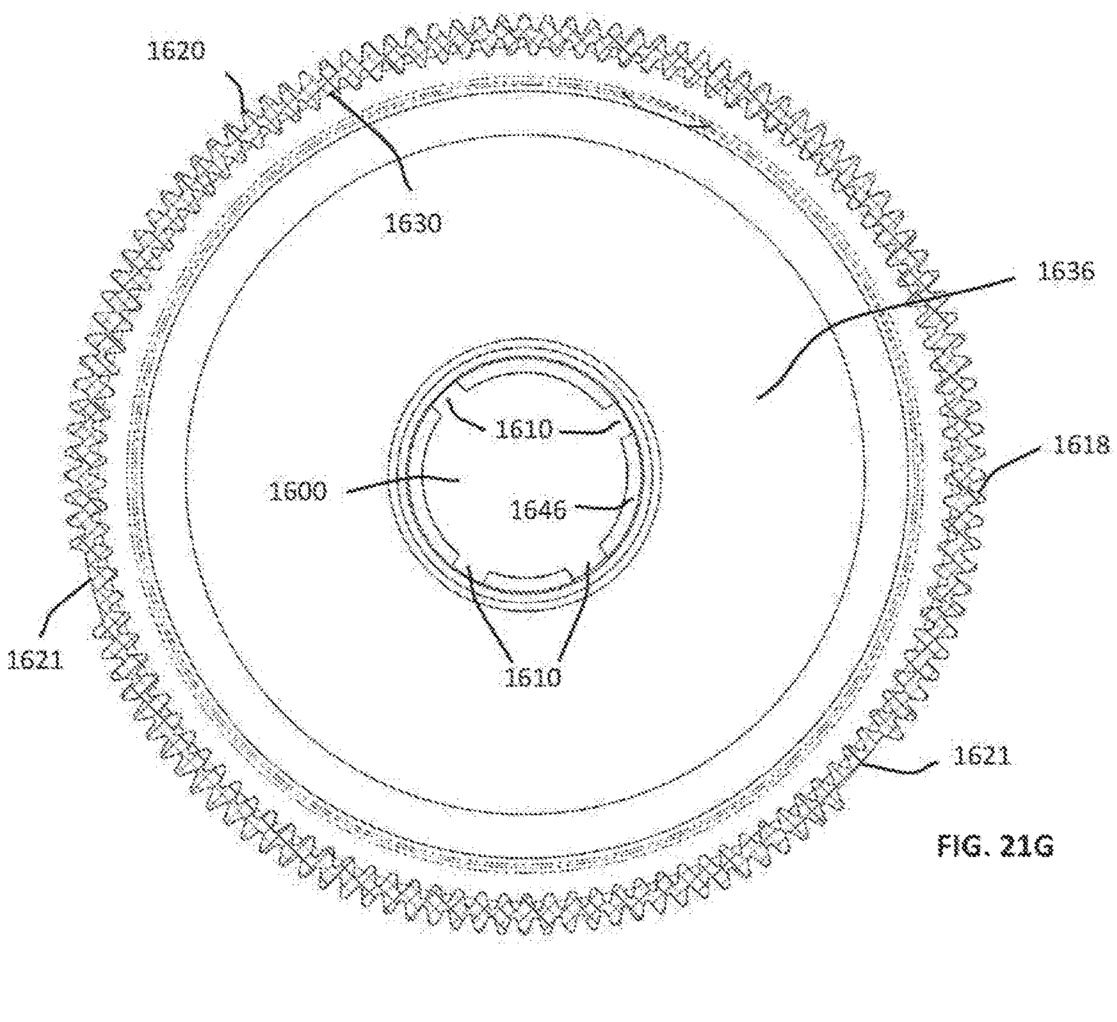
Figure 22A:
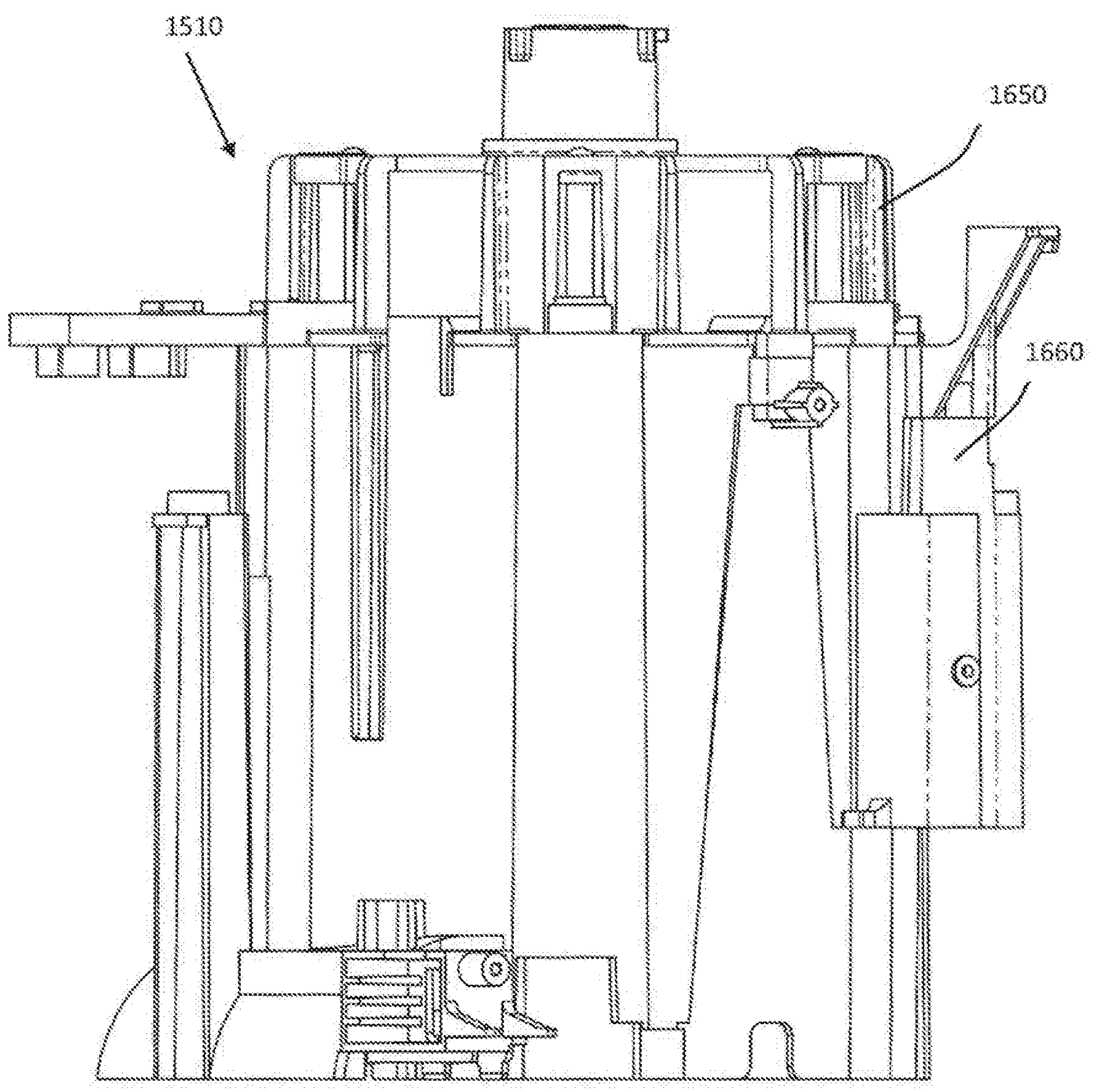
FIGS. 22A, 22B, 22C and 22D are simplified respective planar side, planar top, planar bottom and exploded view illustrations of a motor housing and support assembly, forming part of the vertically displacing rotary drive motor assembly of FIGS. 18A-18F and 21A-21G.
Figure 22B:
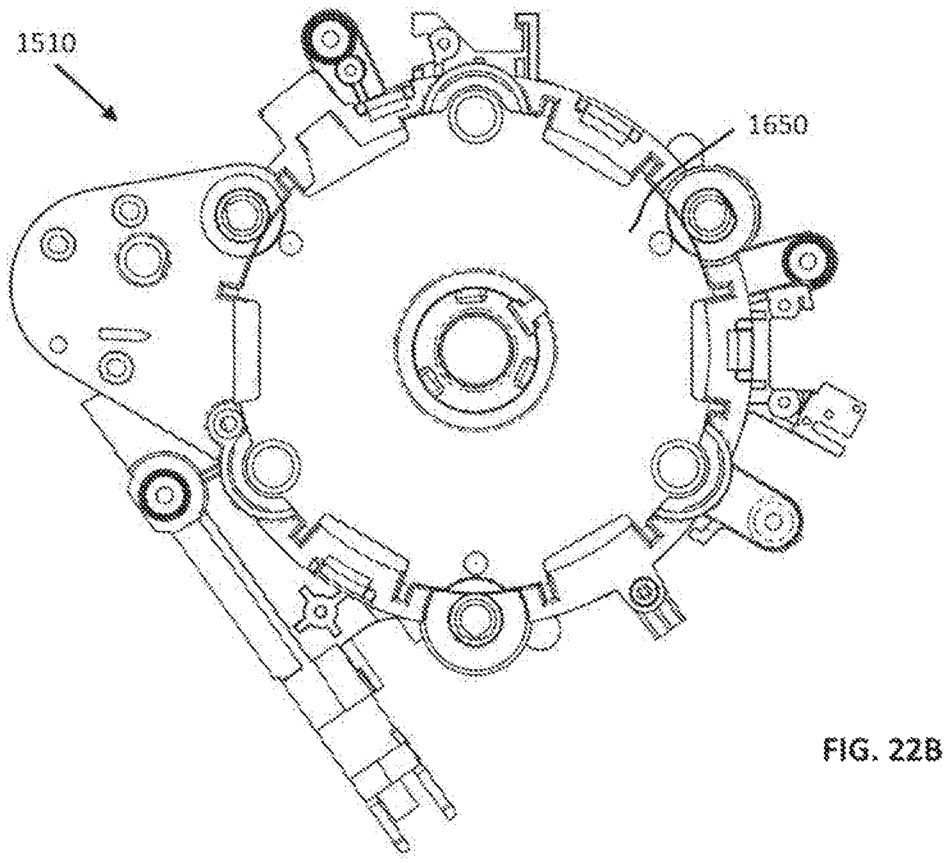
Figure 22C:
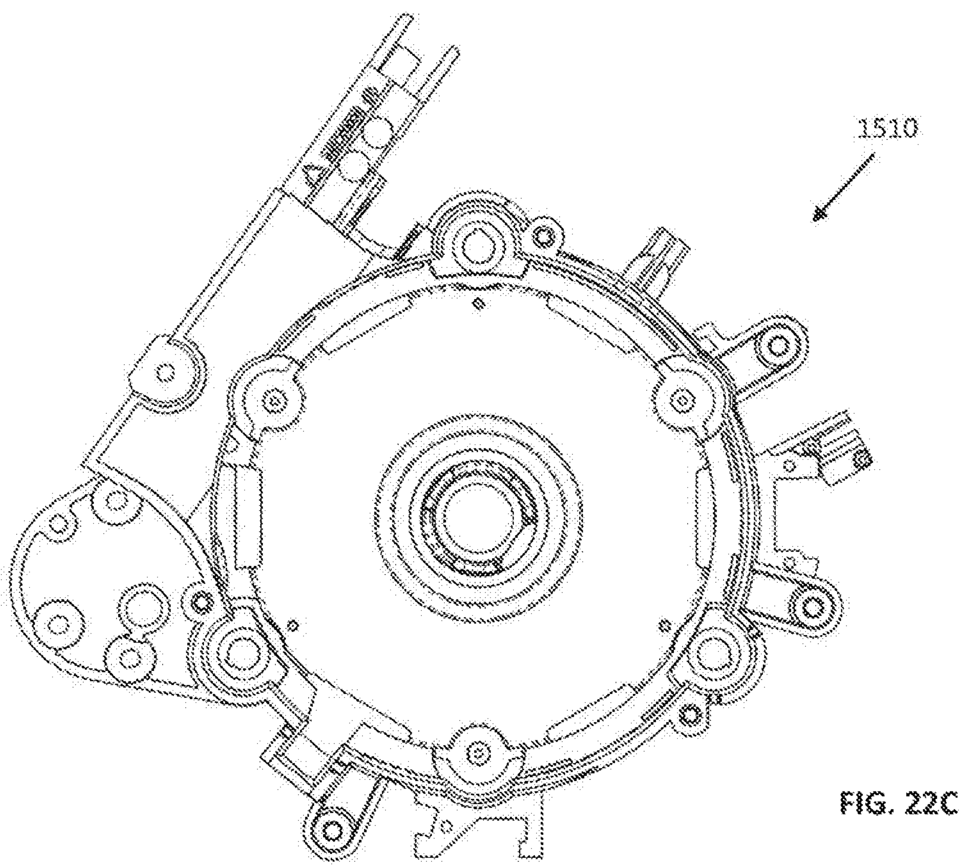
Figure 22D:
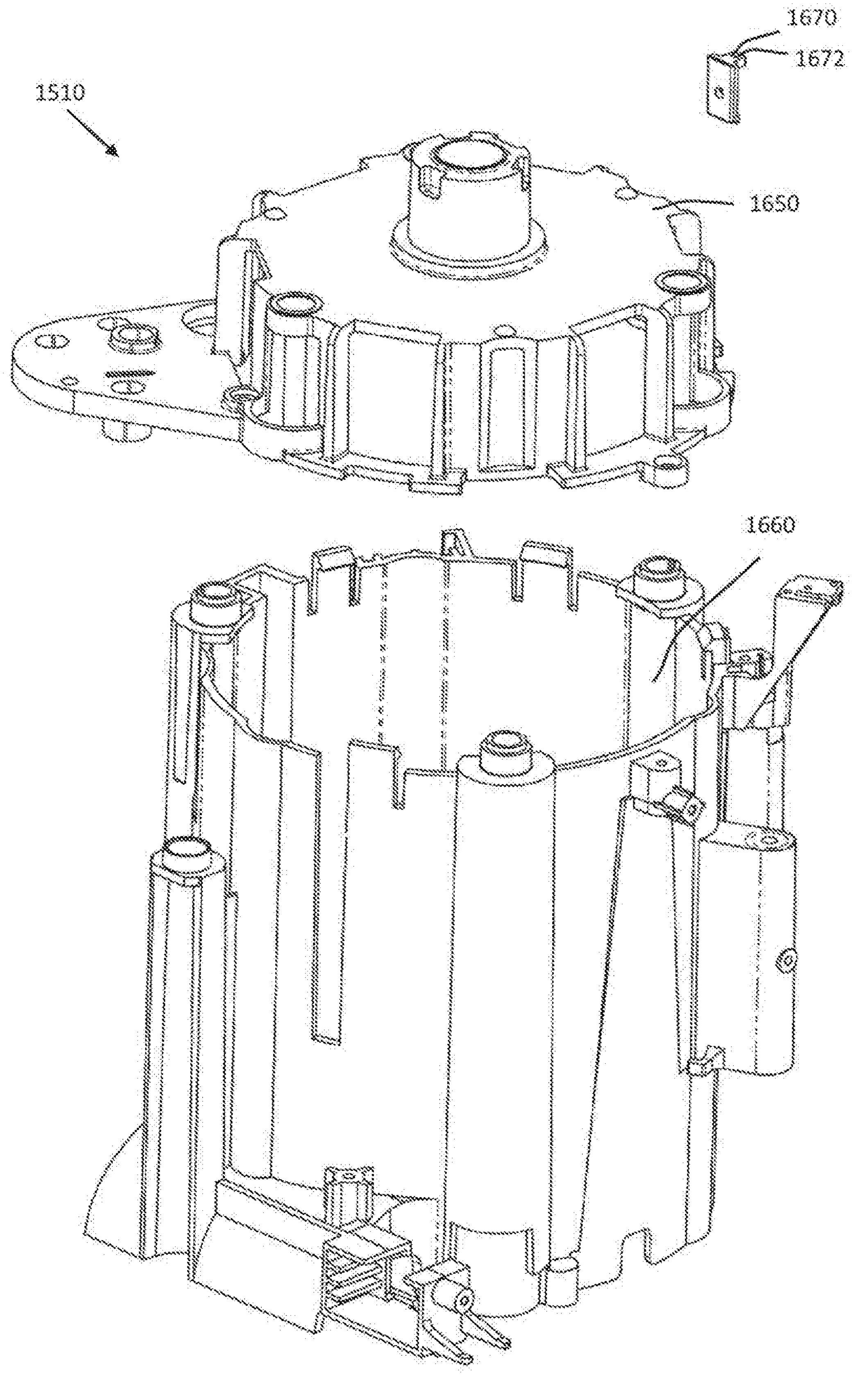

Reference is now made to FIGS. 20A and 20B, which are simplified pictorial respective assembled and exploded view illustrations of bottom assembly 1410, forming part of base assembly 1020 of FIGS. 15A-15E. As seen in FIGS. 20A and 20B, bottom assembly 1410 preferably includes a generally square bottom element 1550 which defines a plurality of upstanding mounting screw guiding bosses 1552, which enable insertion of screws (not shown) which are employed for static mounting of base housing 1400 onto motor housing and support assembly 1510. Bottom element 1550 also defines screw mounting apertures 1554, which accommodate screws (not shown), which are employed for static mounting of motor housing and support assembly 1510 onto bottom element 1550.

A plurality of, preferably four, load cells 1560 are preferably located in a plurality of corresponding corner recesses 1562 in bottom element 1550. Each of corner recesses 1562 is formed with a central aperture 1563. Extending downwardly from each of apertures 1563 is an annular wall 1564, housing a support pad 1565. Each of load cells 1560 is secured to a load cell support 1566, which is in turn secured to a corresponding support pad 1565. Load cells 1560 are preferably model GML624, commercially available from Xi'an Gavin Electronic Technology Co., Ltd Xi'an. Shaanxi. China.

Reference is now made to FIGS. 21A-21G, which are simplified illustrations of rotary drive gear 1500, forming part of vertically displacing rotary drive motor assembly 1430 of FIGS. 18A-18F. As seen in FIGS. 21A-21G, rotary drive gear 1500 preferably is a generally circularly symmetric cap having a central aperture 1600 surrounded by an upstanding circumferential wall 1602 having a plurality of upwardly-extending protrusions 1604 at an upper edge 1606 thereof. Protrusions 1604 are configured to seat in notches 1318 of cam element 1110. A circumferentially inwardly directed annular wall 1608 extends inwardly of circumferential wall 1602 at upper edge 1606 thereof and is formed with a plurality of notches 1610.

At its base, circumferential wall 1602 is surrounded by an annular planar surface 1611, which is operative to seat resilient sealing ring 1532. Annular planar surface 1611 is surrounded by a nearly planar but slightly conical top surface 1612, which terminates in a depending circumferential wall 1614. Circumferential wall 1614 terminates in an annular circumferential surface 1616, which terminates in a further depending circumferential wall 1618 having formed on an outer circumferential surface thereof a radially outwardly directed circumferentially-extending gear train 1620 having a pair of mutually azimuthally spaced blind portions 1621.

Wall 1618 has a bottom edge 1622 and an inner circumferential surface 1624. A protrusion 1626 extends downwardly from bottom edge 1622. Protrusion 1626 is operative to be detected by optical sensors (not shown) mounted on motor housing and support assembly 1510, as described hereinbelow with reference to FIGS. 24A-24E and FIGS. 54A-55H. A radially inwardly directed circumferentially-extending gear train 1630 is formed on inner circumferential surface 1624. Preferably gear trains 1620 and 1630 have an identical pitch and are slightly out of phase. Bottom edge 1622 defines edges of both gear trains 1620 and 1630.

Interiorly and upwardly of inner circumferential surface 1624 them is provided a curved circumferential surface 1632, which underlies annular circumferential surface 1616 and extends to an inner circumferential surface 1634 which lies inwardly of circumferential wall 1614. An inner nearly planar but slightly conical surface 1636 underlies nearly planar but slightly conical top surface 1612.

Surrounding aperture 1600 at the interior of rotary drive gear 1500 is a downwardly-extending annular protrusion 1640 having a plurality of slightly radially inwardly protrusions 1642 formed thereon. Extending upwardly from annular protrusion 1640 is an inner circumferential surface 1644, which terminates in an annular surface 1646 and defines therewith a shoulder 1648. An upper inner circumferential surface 1649 extends upwardly from annular surface 1646.

Reference is now made to FIGS. 22A-22D, which are simplified illustrations of motor housing and support assembly 1510, forming part of vertically displacing rotary drive motor assembly 1430 of FIGS. 18A-18F. As seen in FIGS. 22A-22D, motor housing and support assembly 1510 includes a top element 1650, which is described in detail hereinbelow with reference to FIGS. 23A-23F, a bottom element 1660, which is described in detail hereinbelow with reference to FIGS. 24A-24E, and a right-angle element 1670. Right-angle element 1670 is formed with a radially outwardly protruding finger portion 1672.

Reference is now made to FIGS. 23A-23F, which are simplified illustrations of top element 1650, forming part of motor housing and support assembly 1510 of FIGS. 22A-22D.

As seen in FIGS. 23A-23F, top element 1650 preferably includes a planar wall portion 1700 from which extends upwardly a central upstanding circumferential wall surface 1702, which terminates at an annular generally planar wall surface 1704, which rotatably supports annular surface 1646 of rotary drive gear 1500.

Annular generally planar wall surface 1704 terminates radially inwardly in an upstanding circumferential wall surface 1706, defining at its top portion a boss 1708. Boss 1708 is formed having a cylindrical outer surface 1709 having a plurality of circumferentially distributed recesses 1712, which are engaged by corresponding circumferentially distributed radially inwardly-facing motor assembly engagement protrusions 1297 of wall 1295 of support element 1100. Cylindrical outer surface 1709 of boss 1708 is further formed with a recess 1714 operative to house right-angle element 1670. Right-angle element 1670 corresponds to rectangular notch 1296 of support element 1100.

Peripherally of planar wall portion 1700 are a plurality of mutually spaced depending wall portions 1720, all of which terminate in a generally planar, generally annular wall 1730, which lies parallel to planar wall portion 1700. Wall portions 1720, together with wall portion 1700 and wall 1730, define an array of ventilation apertures 1732. An extension 1752 of wall 1730 supports auxiliary rotary drive motor 1520.

Figure 23A:
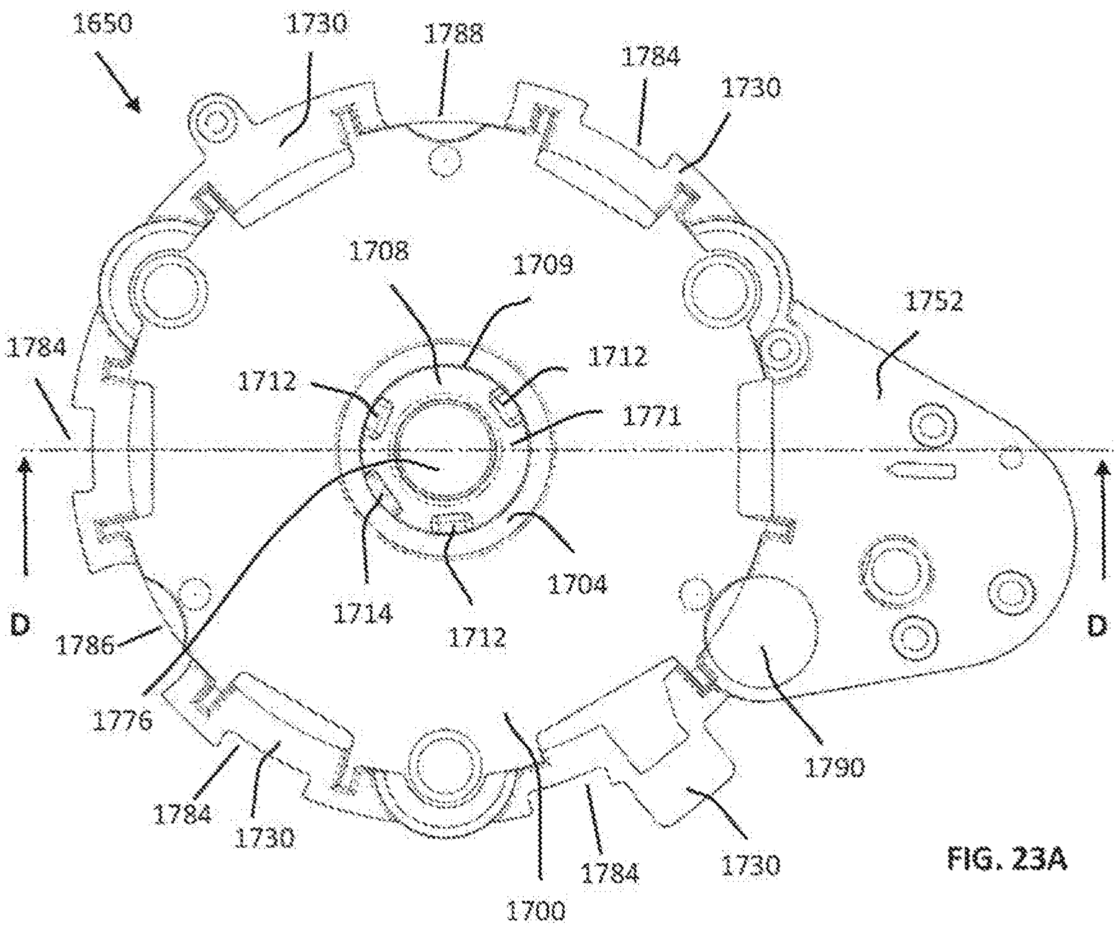
FIGS. 23A, 23B, 23C, 23D, 23E and 23F are simplified respective planar top, planar bottom, planar side, sectional, pictorial top and pictorial bottom view illustrations of a top element, forming part of the motor housing and support assembly of FIGS. 22A-22D.
Figure 23B:
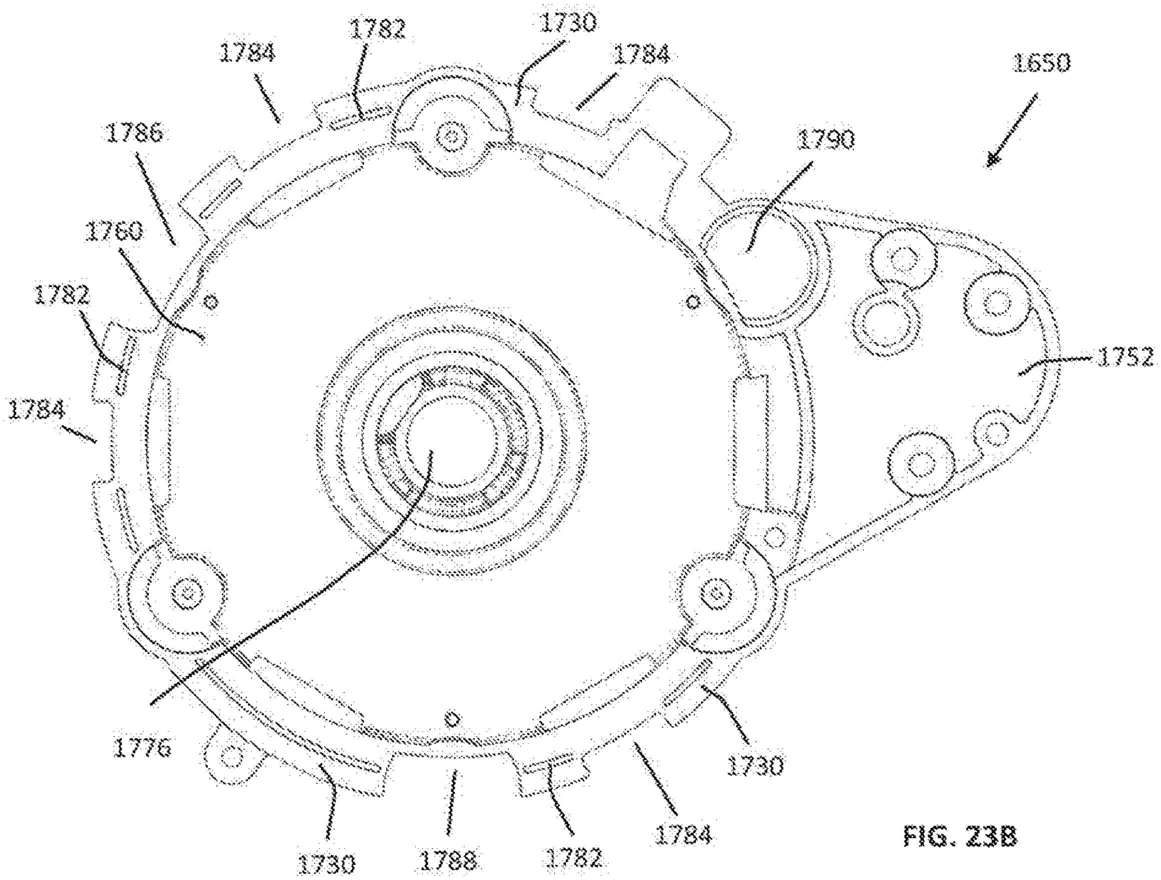
Figure 23C:
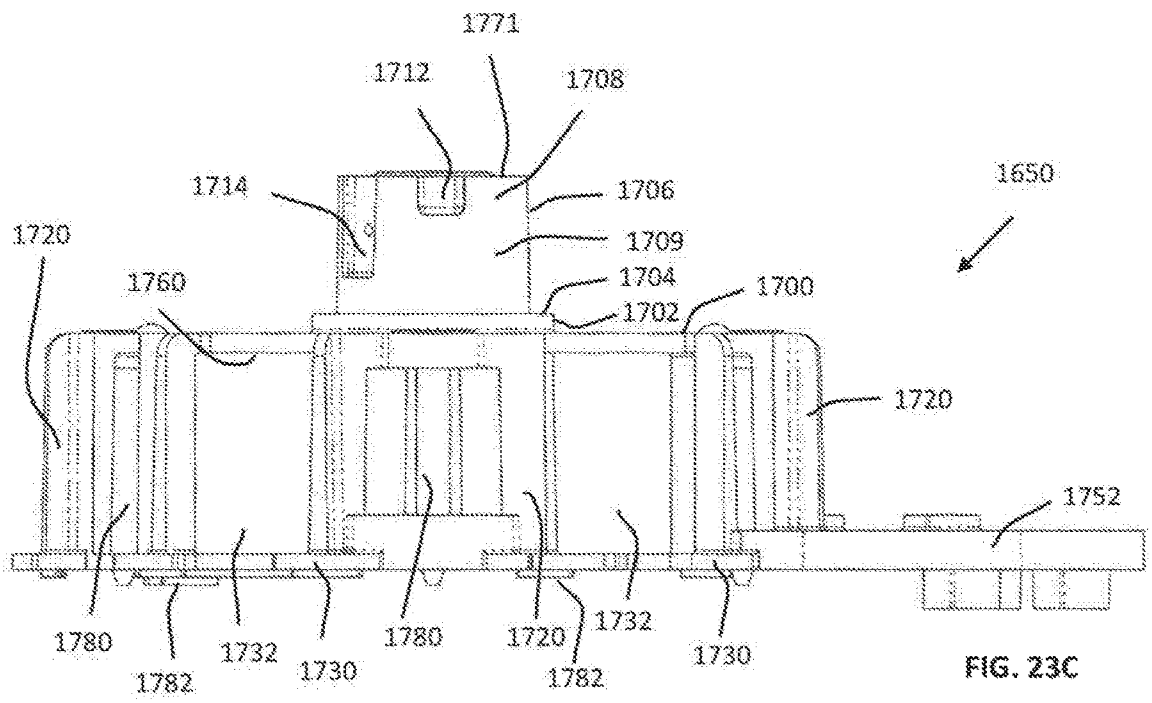
Figure 23D:
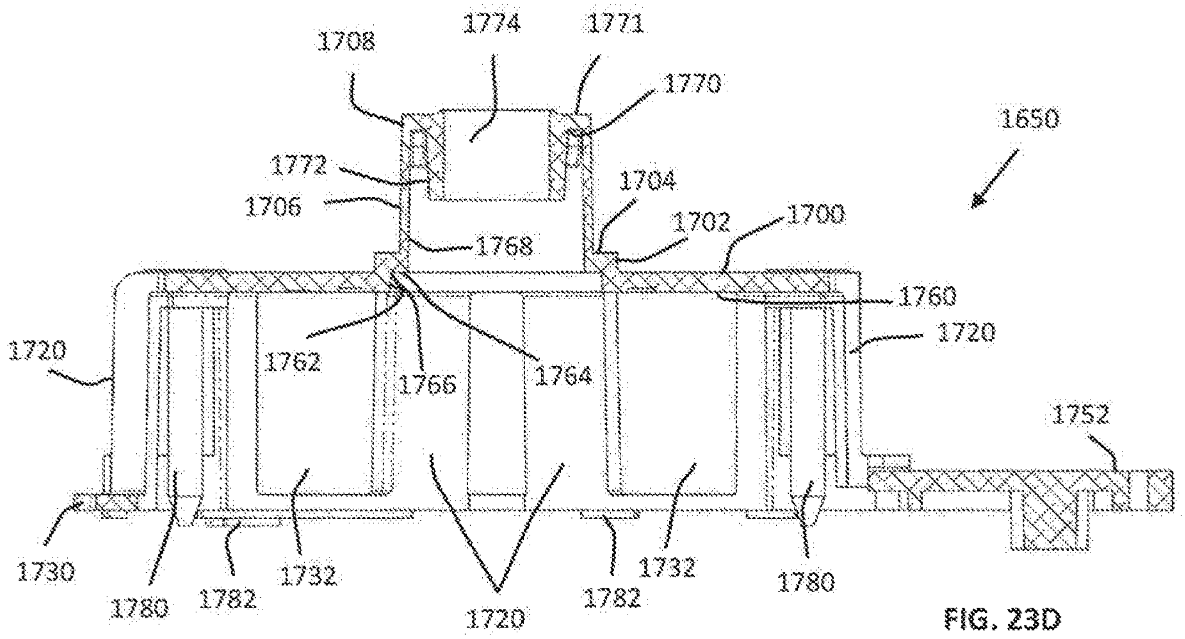
Figure 23E:
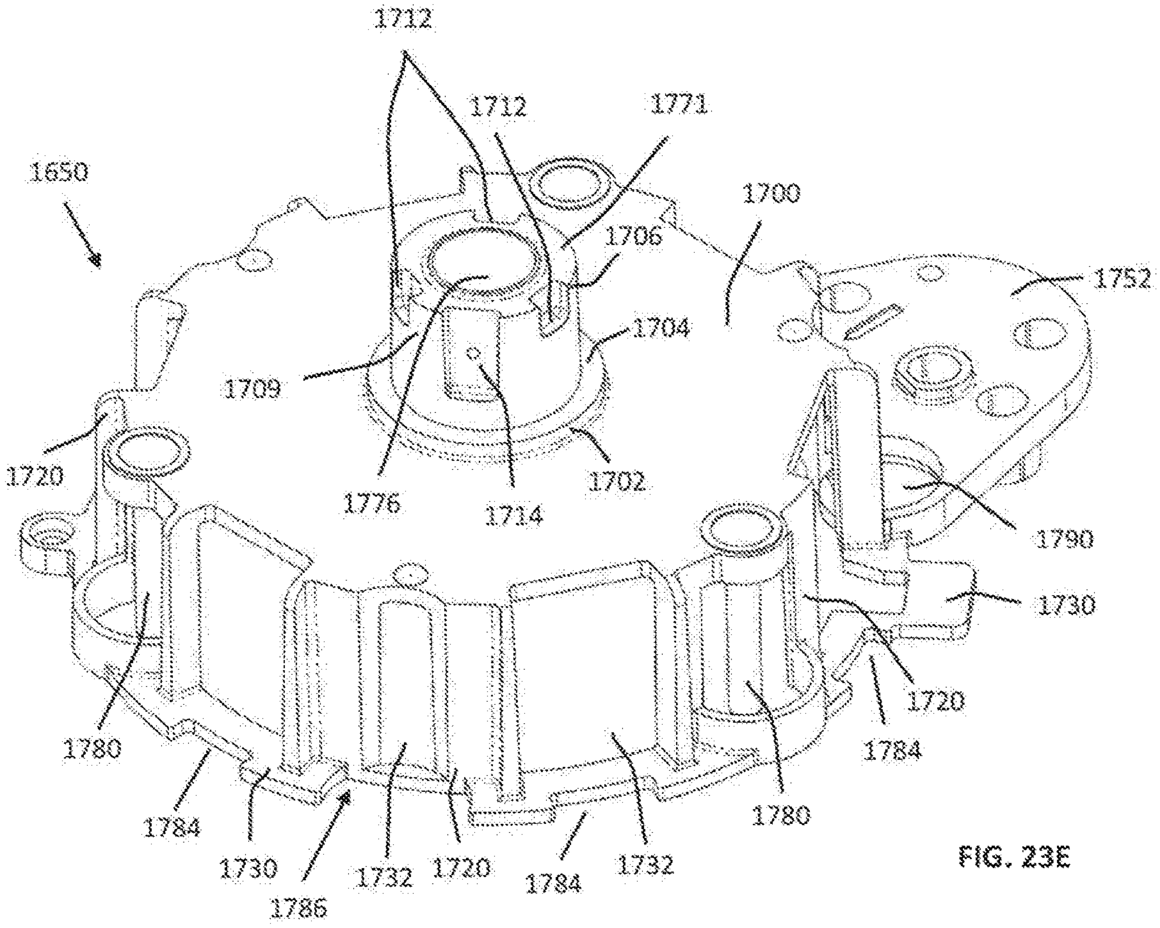
Figure 23F:
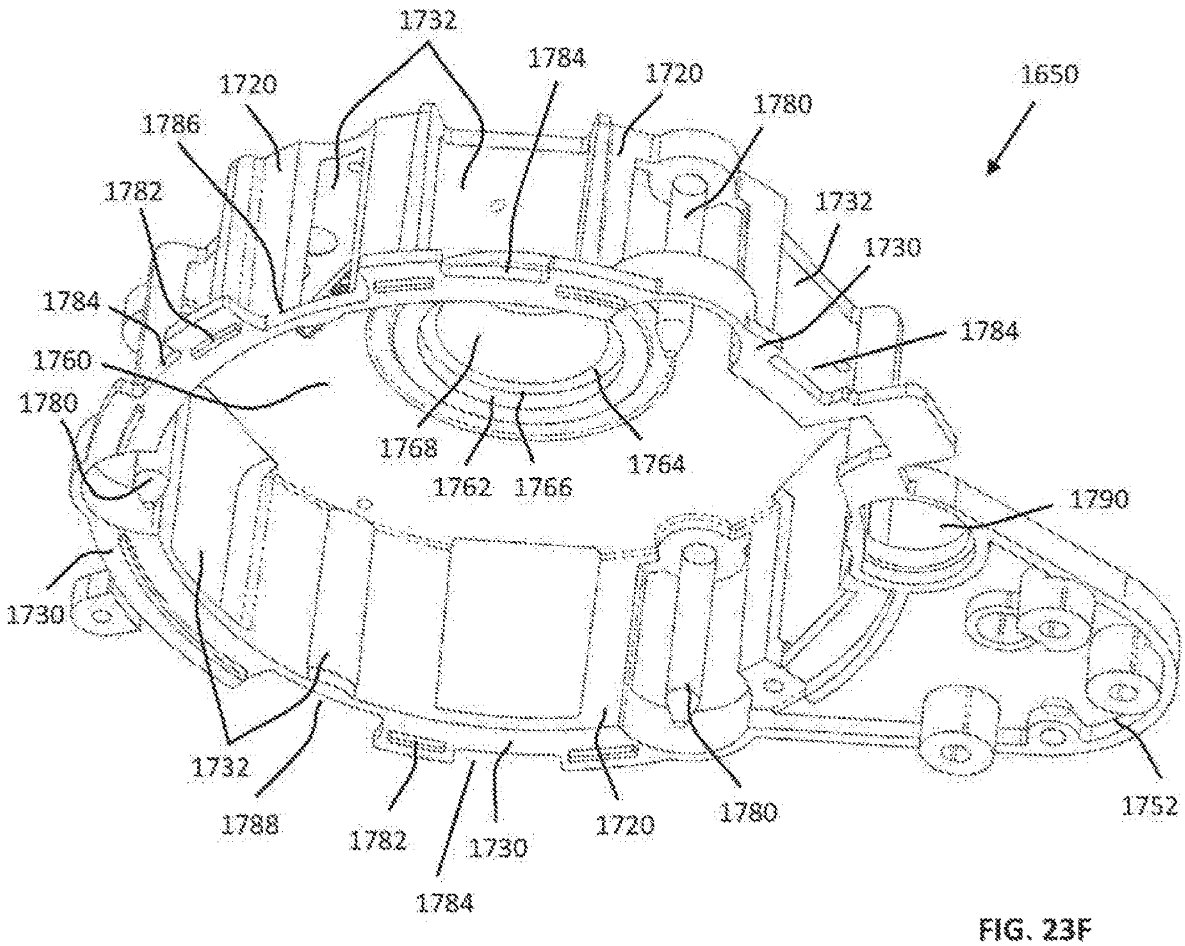
Figure 24A:
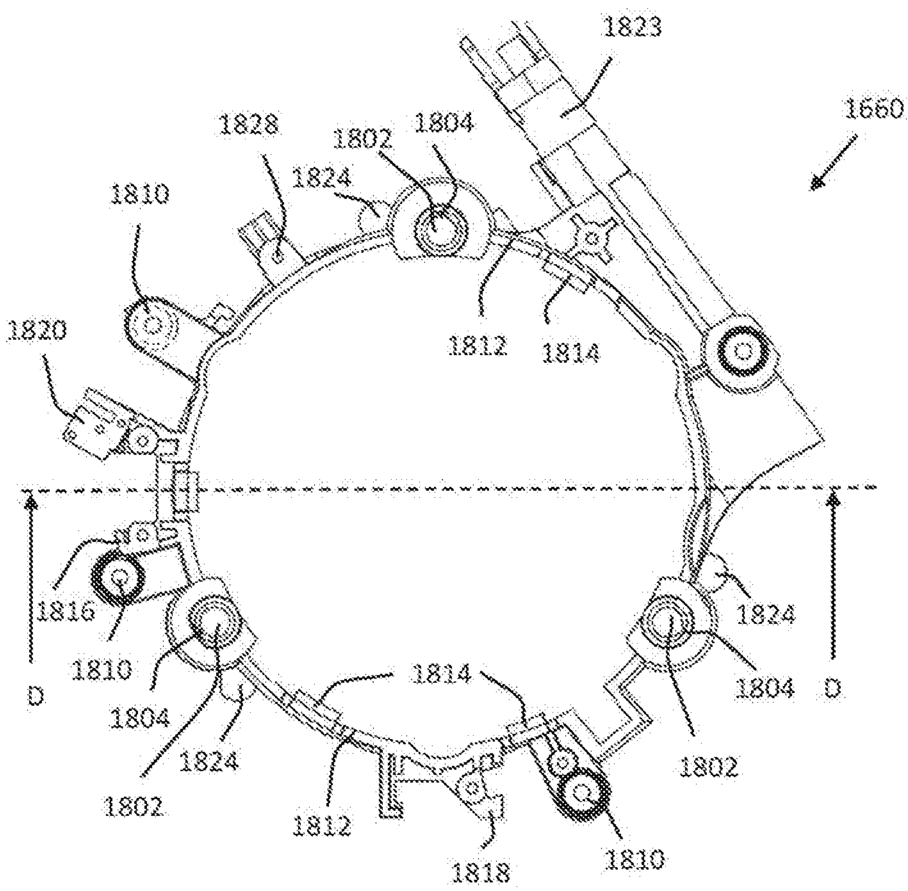
FIGS. 24A, 24B, 24C, 24D and 24E are simplified respective planar top, planar bottom, planar side, sectional and pictorial view illustrations of a bottom element, forming part of the motor housing and support assembly of FIGS. 22A-23F.
Figure 24B:
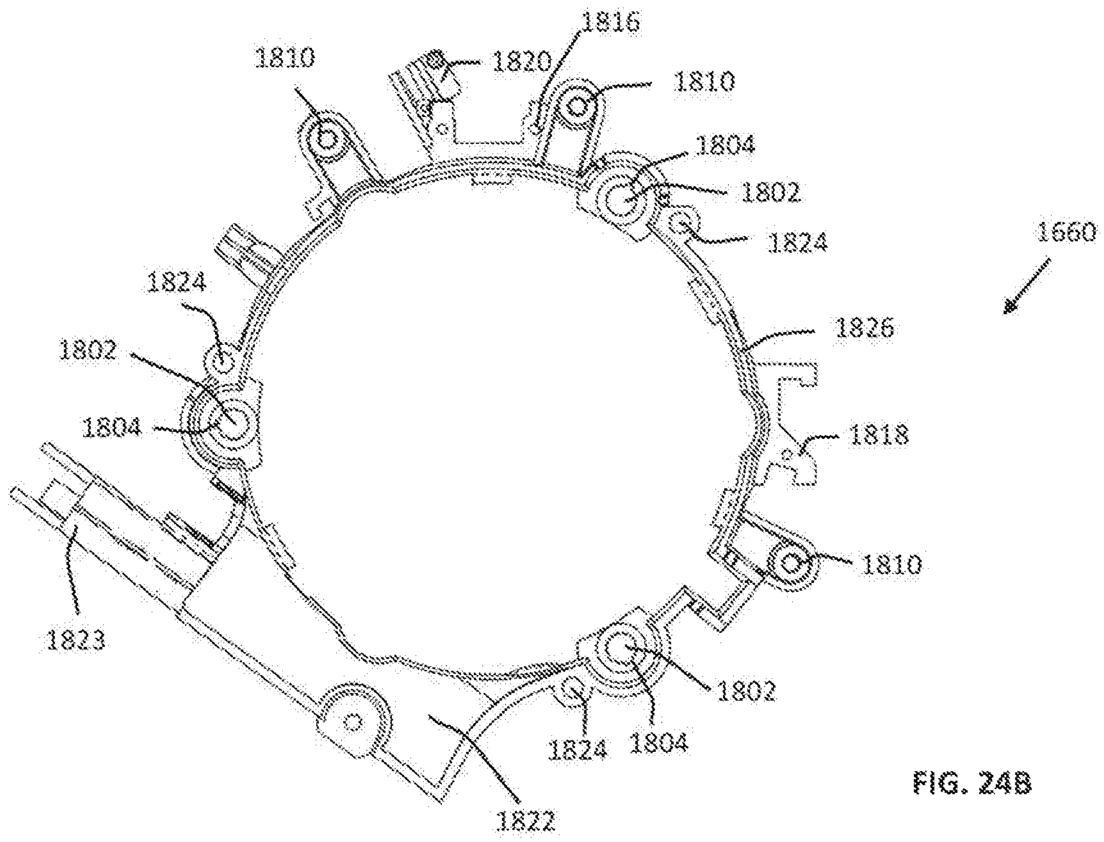
Figure 24C:
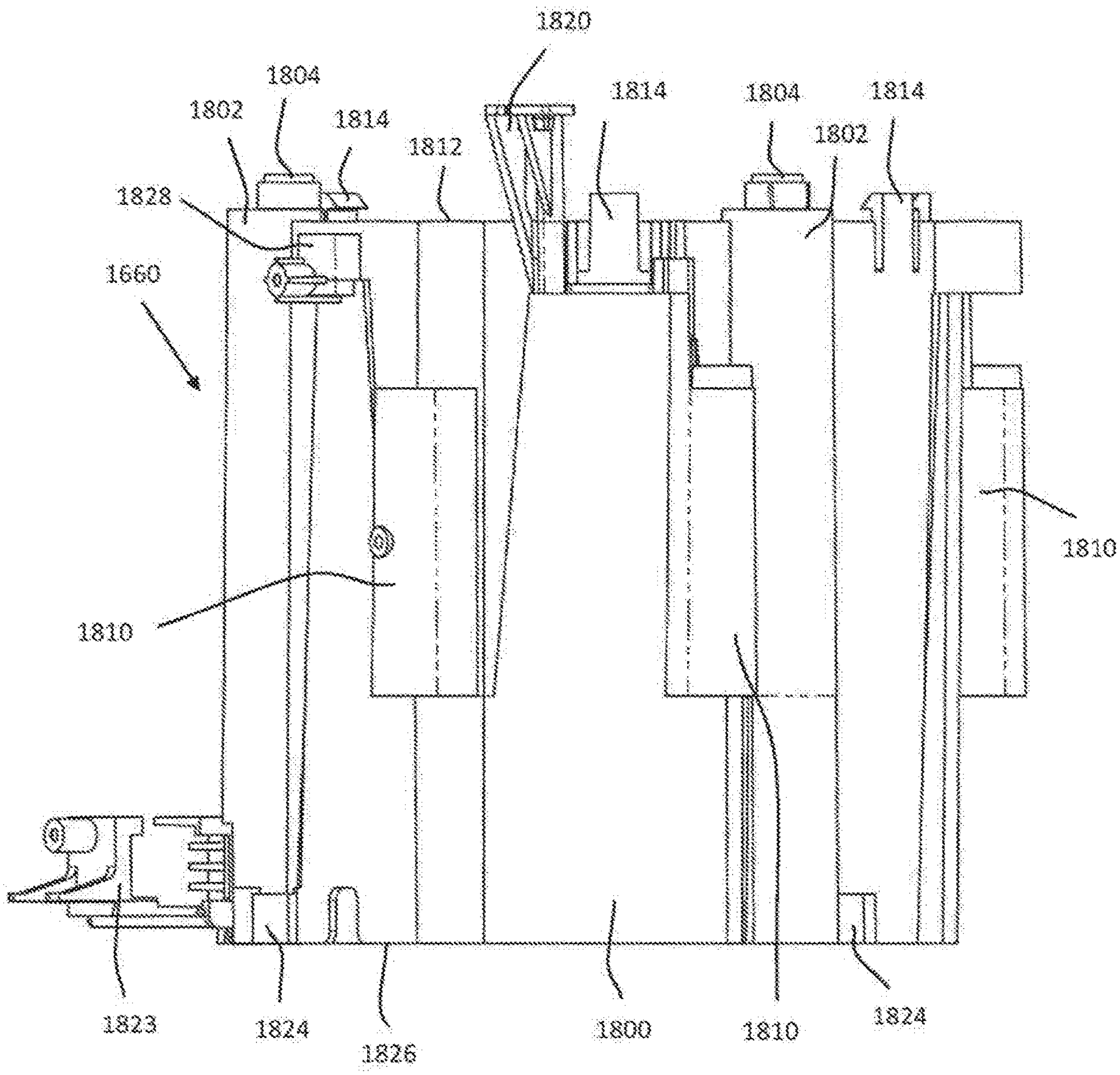
Figure 24D:
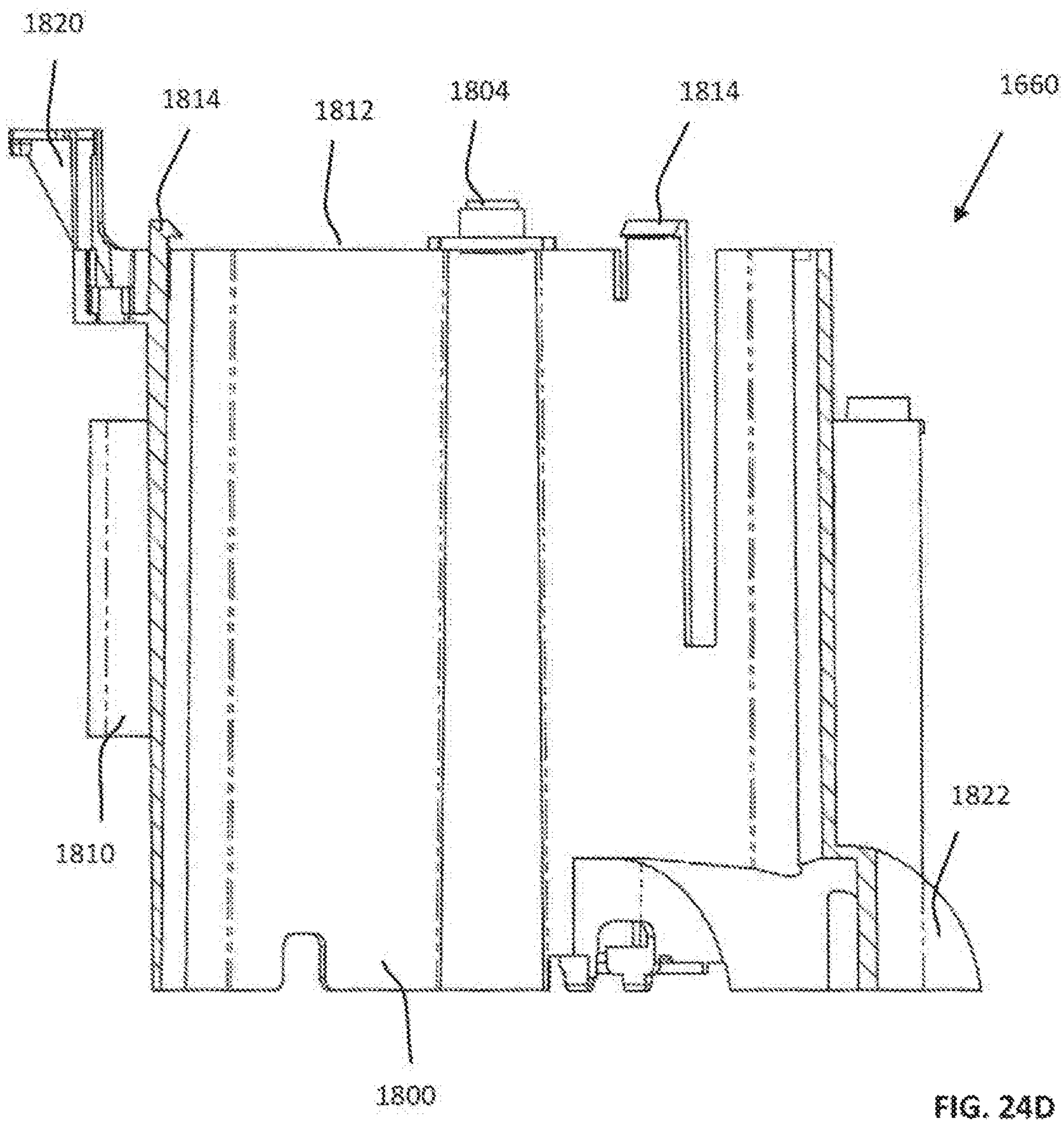
Figure 24E:
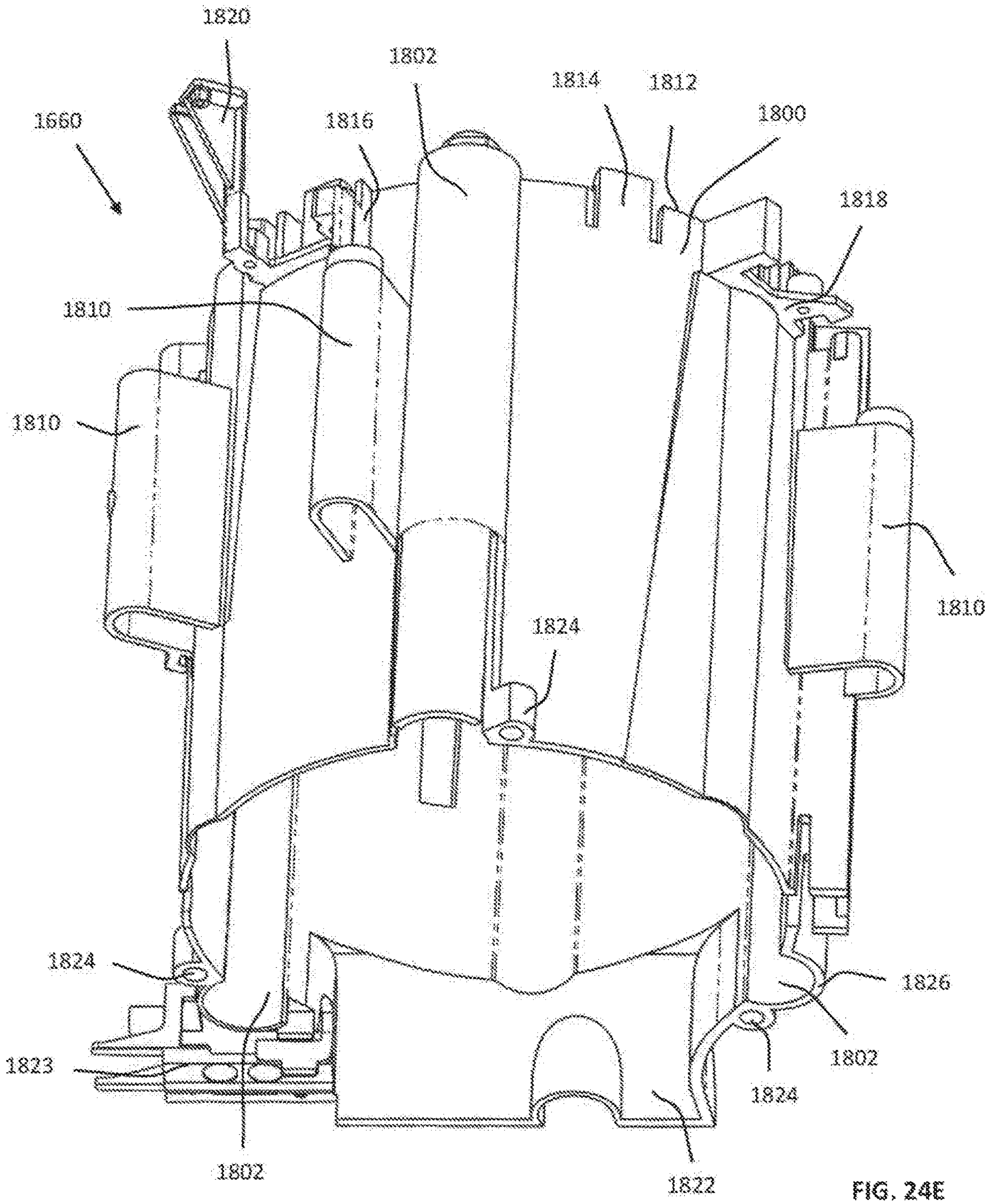
Figure 25A:
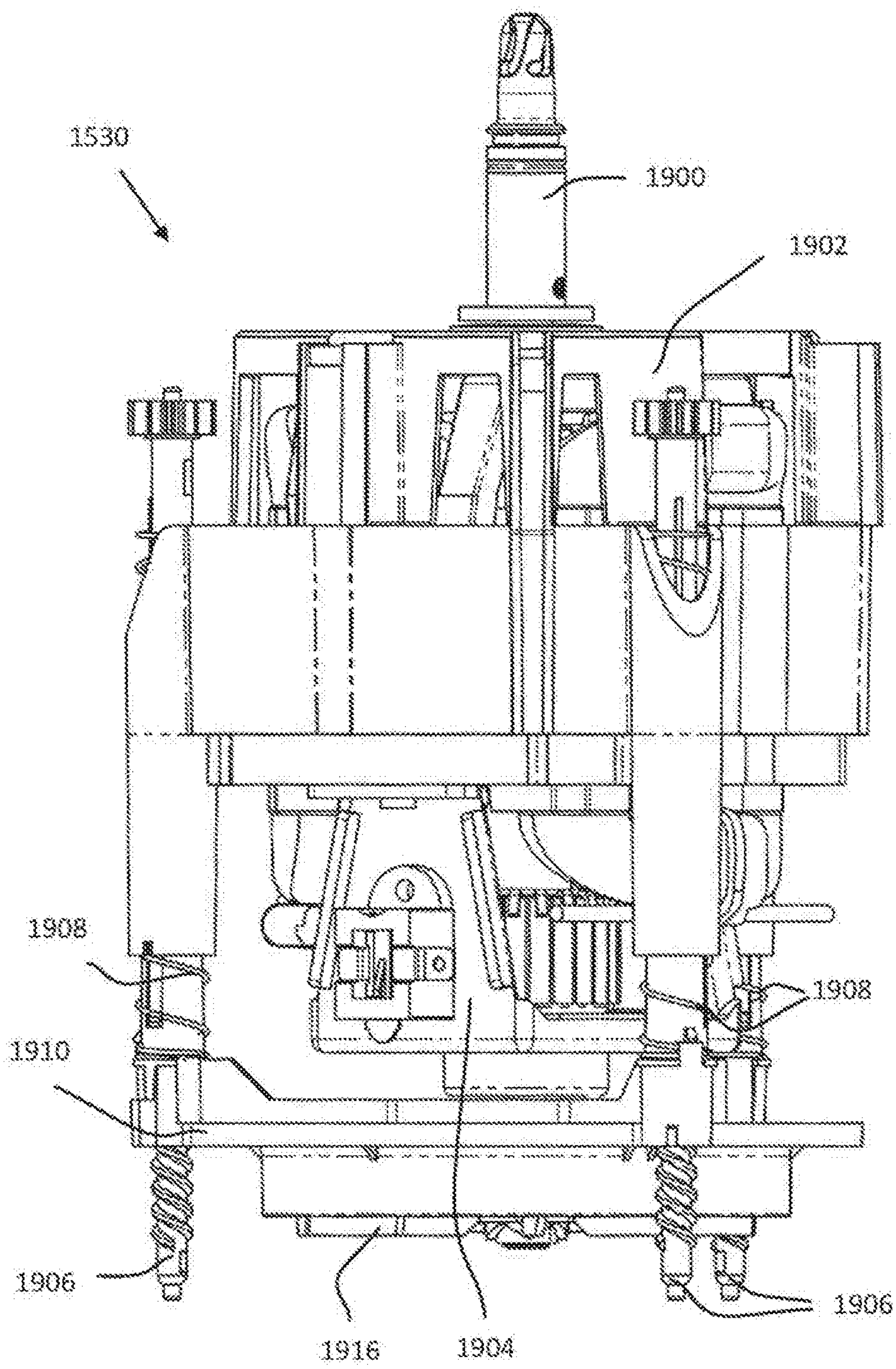
FIGS. 25A, 25B, 25C, 25D and 25E are simplified respective planar side, planar top, planar bottom, pictorial and exploded view illustrations of an axially displaceable rotary drive assembly, forming part of the vertically displacing rotary drive motor assembly of FIGS. 18A-18F and 21A-24E.
Figure 25B:
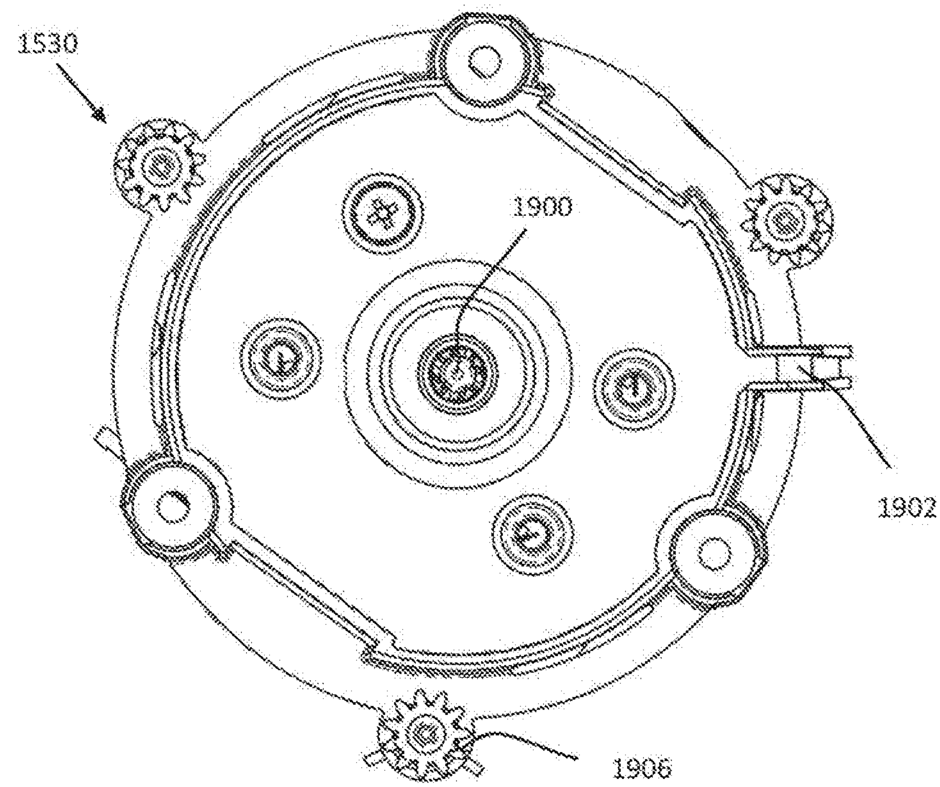
Figure 25C:
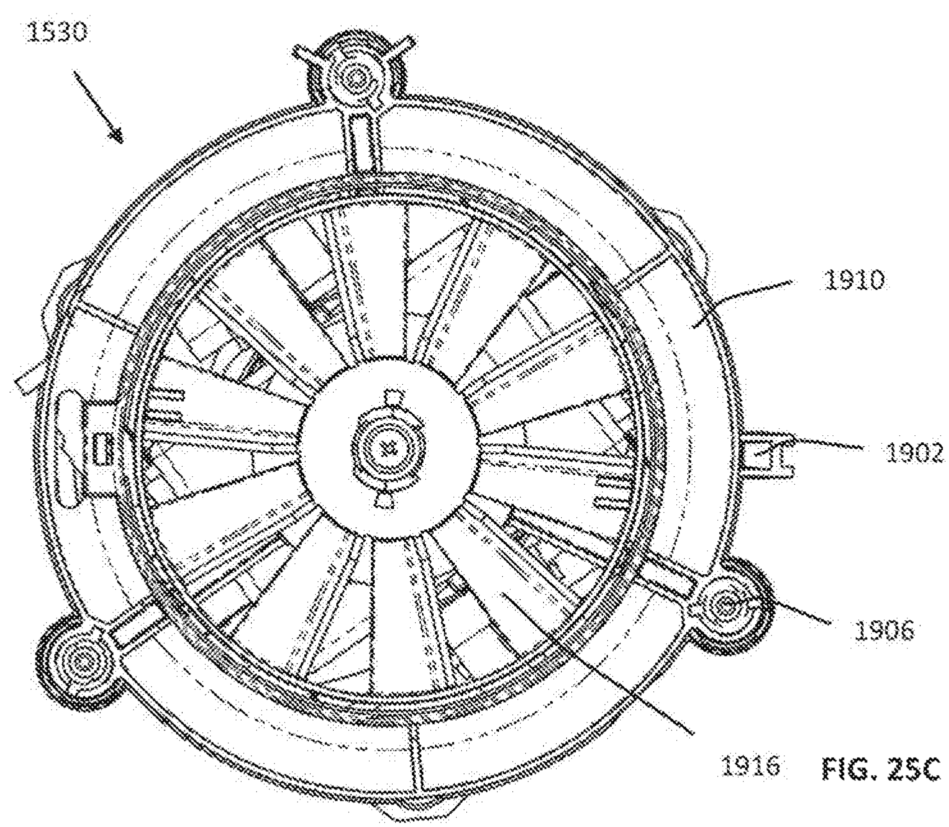
Figure 25D:
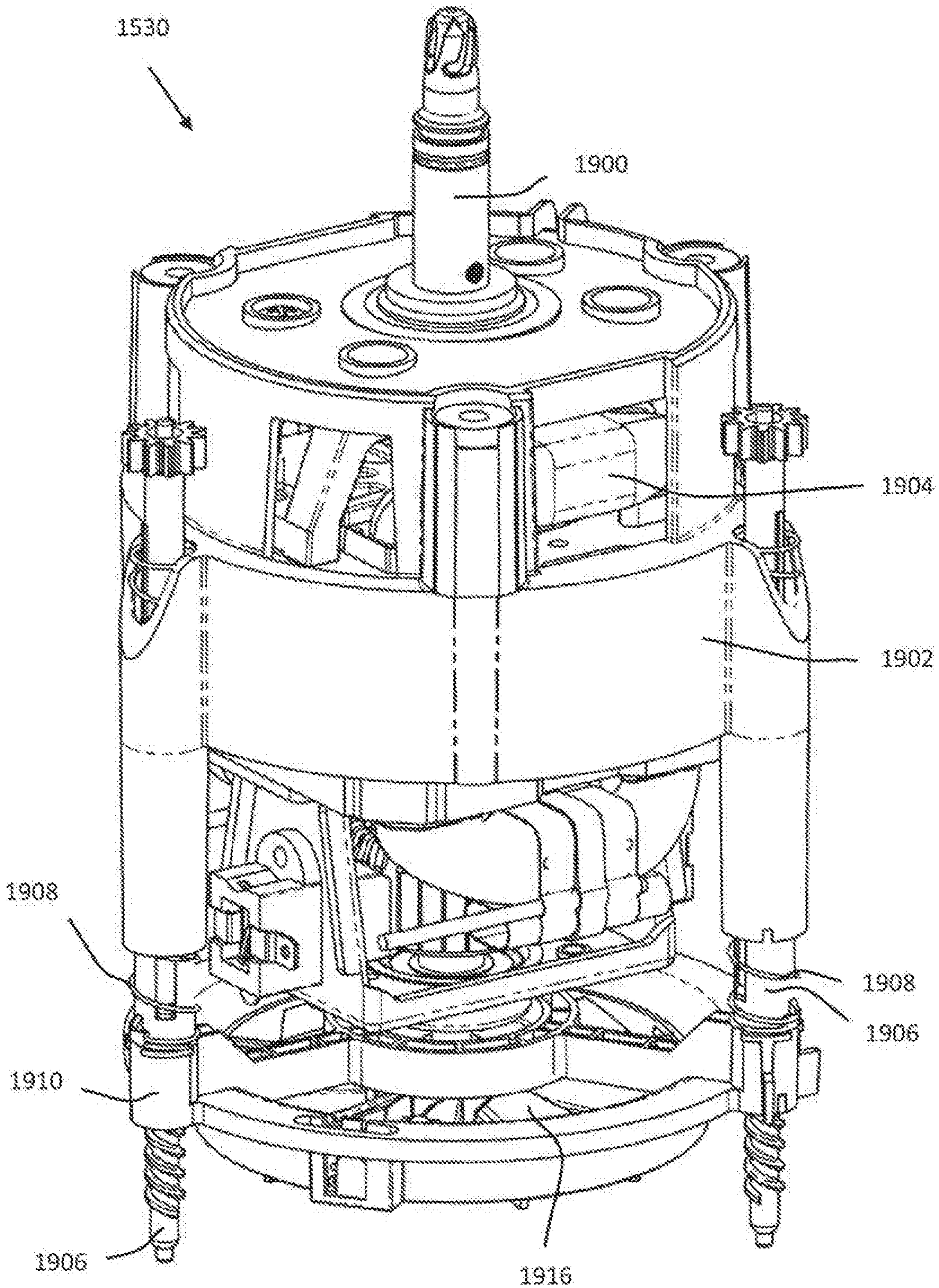
Figure 25E:
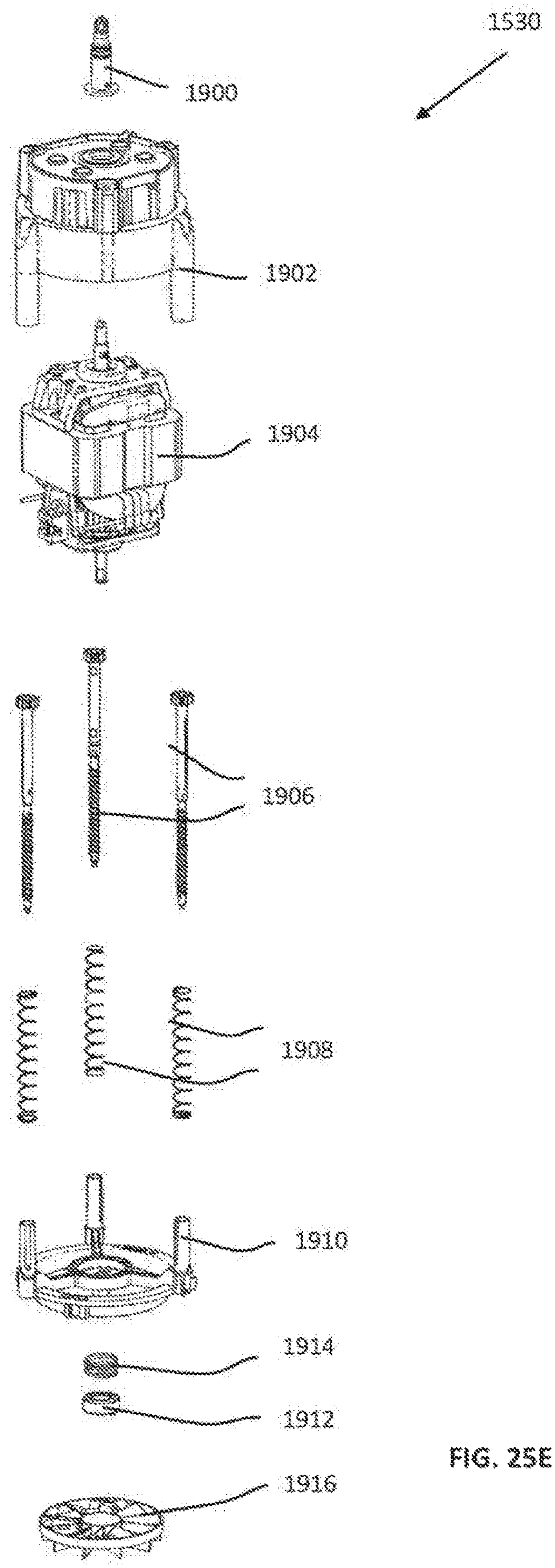

As seen particularly in FIG. 23D, at an underside surface 1760 of planar wall portion 1700 there is defined a central interior circumferential surface 1762, which terminates at an annular wall surface 1764 and defines therewith a shoulder 1766. Annular wall surface 1764 terminates radially inwardly at an inner interior circumferential wall surface 1768, which, in turn, terminates at an underside annular surface 1770, which underlies a top planar annular edge surface 1771 of boss 1708. A depending circumferential wall 1772 extends downwardly from underside annular surface 1770 and defines a radially inwardly directed cylindrical surface 1774 which extends to top planar annular edge surface 1771 and defines therewith an aperture 1776.

A plurality of guiding pins 1780, preferably three in number, extend downwardly from underside surface 1760 for guiding axially displaceable rotary drive assembly 1530 in its vertical displacement relative to motor housing and support assembly 1510. A plurality of mutually circumferentially arranged downwardly-extending protrusions 1782 are formed on wall 1730. A plurality of, preferably four, snap engagement cut outs 1784 are formed at edges of wall 1730. A pair of recesses 1786 and 1788 and an aperture 1790 are provided in wall 1730 and its extension 1752 for accommodating linear displacement spindles (not shown).

Reference is now made to FIGS. 24A-24E, which are simplified illustrations of bottom element 1660, forming pa of motor housing and support assembly 1510 of FIGS. 22A-22D.

As seen in FIGS. 24A-24E, bottom element 1660 is a generally cylindrical element having a cylindrical wall 1800 which generally, but not entirely, has a uniform cross section. Cylindrical wall 1800 preferably defines a plurality of, preferably three, spindle accommodating channels 1802, each of which is formed with a spindle locking socket 1804 for rotatably locking a spindle against vertical displacement relative to bottom element 1660.

Cylindrical wall 1800 also defines a plurality of mounting screw accommodating channels 1810 which receive mounting screws (not shown) which serve to fixedly attach bottom element 1660 to base housing 1400. Formed along a top edge 1812 of cylindrical wall 1800 are a plurality of, preferably four, snap engagement portions 1814 which are configured for snap engagement with top element 1650 at snap engagement cut outs 1784 of top element 1650. Just below top edge 1812 are formed a pair of azimuthally distributed sensor mounting protrusions 1816 and 118 for mounting of a pair of optical sensors (not shown) for sensing the presence of protrusion 1626 and thus a rotational position of rotary drive gear 1500. The optical sensors are preferably model EE-SX1350, commercially available from Omron Corporation, Kyoto, Kyoto Prefecture, Japan.

Preferably extending upwardly from top edge 1812 is a sensor mounting protrusion 1820 for mounting of a Hall effect sensor (not shown) operational to sense a magnet (not shown) that is mounted on rotatable door assembly 1050, and thus to sense whether or not rotatable door assembly 1050 is in a closed orientation relative to static housing assembly 1040. The Hall effect sensor is preferably model S-5716ACDH0-M3T1U, commercially available from ABLIC Inc., Chiba-shi, Japan.

The bottom of cylindrical wall 1800 is preferably formed with a first widened region 1822 for facilitating air flow therefrom and a second widened region 1823 for accommodating electronic circuitry (not shown).

A plurality of threaded screw bosses 1824 are preferably provided at a bottom edge 1826 of cylindrical wall 1800 for accommodating screws (not shown) which attach bottom element 1660 to bottom assembly 1410 at screw mounting apertures 1554.

A plurality of threaded screw bosses 1828 are preferably provided at top edge 1812 of cylindrical wall 1800 for accommodating screws (not shown) which attach bottom element 1660 to top element 1650.

Reference is now made to FIGS. 25A-25E, which are simplified illustrations of axially displaceable rotary drive assembly 1530, forming part of vertically displacing rotary drive motor assembly 1430 of FIGS. 18A-18F. As seen in FIGS. 25A-25E, axially displaceable rotary drive assembly 1530 preferably includes a drive shaft assembly 1900, a motor support bracket assembly 1902, an electric motor 1904, a plurality of, preferably three, spindles 1906, a corresponding plurality of coil springs 1908, a motor lifting element 1910, a linear to rotary converting adaptor 1912, a spring 1914 and a linearly driven rotating ventilating element 1916.

Figure 26A:
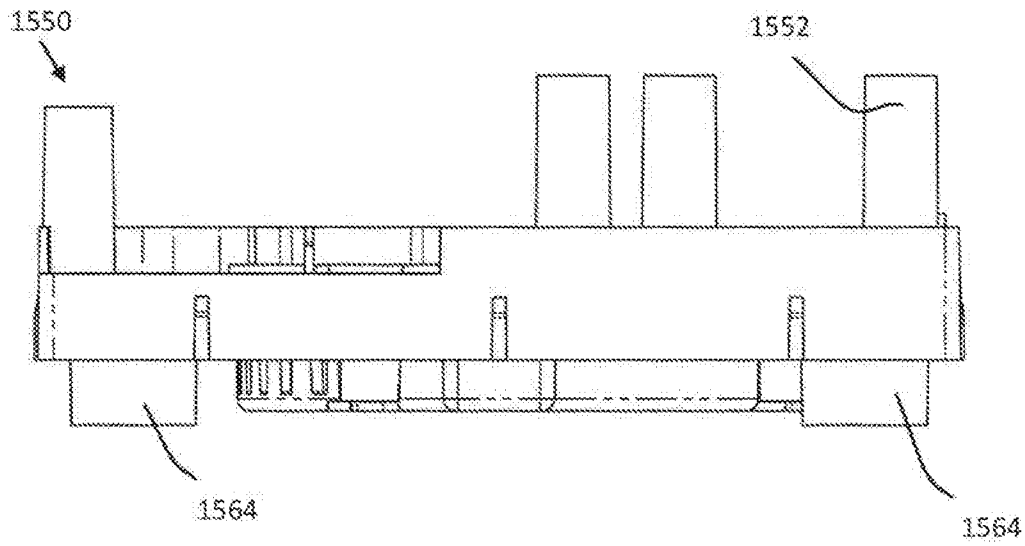
FIGS. 26A, 26B and 26C are simplified respective planar side, planar top and pictorial view illustrations of a bottom element, forming part of the bottom assembly of FIGS. 20A & 20B.
Figure 26B:
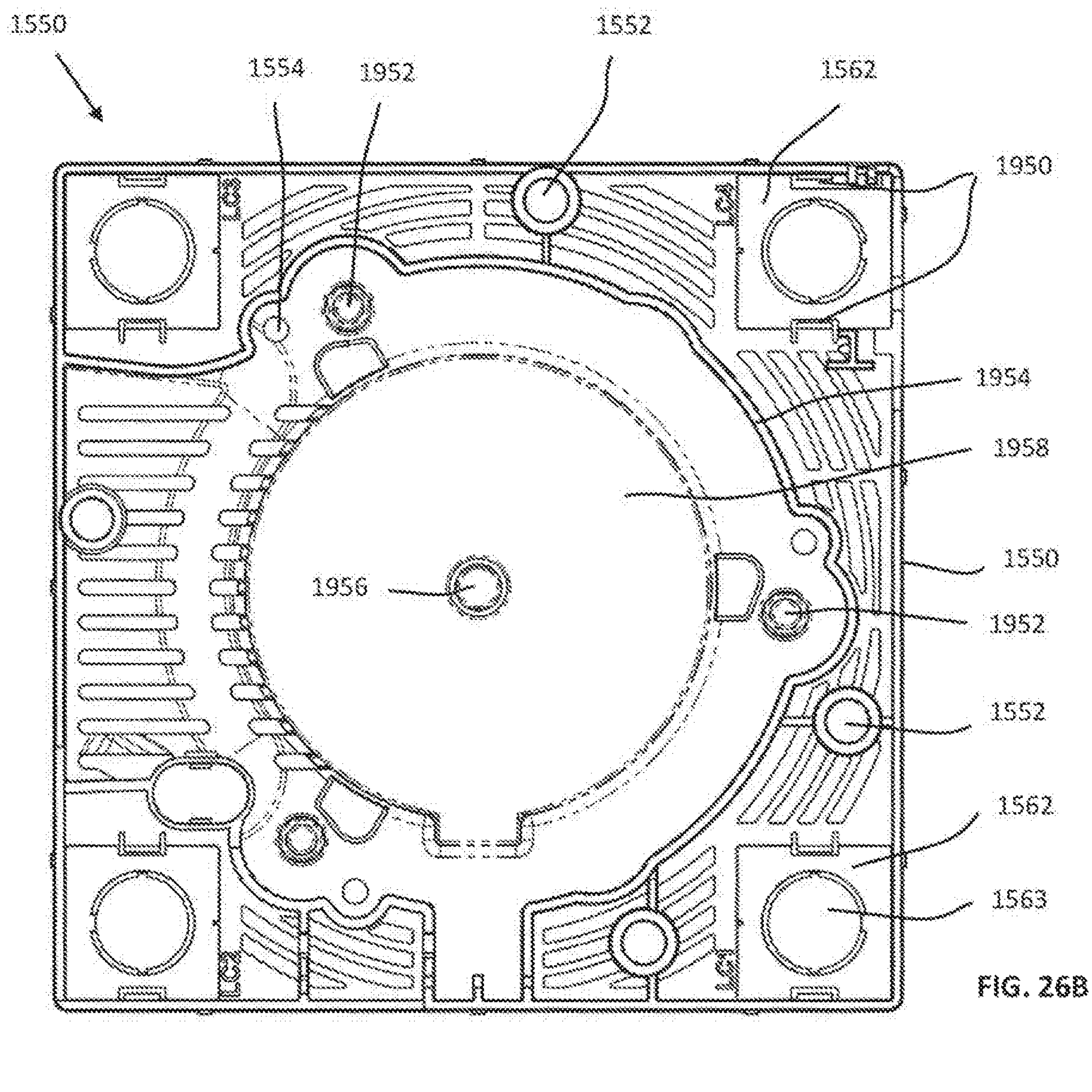
Figure 26C:
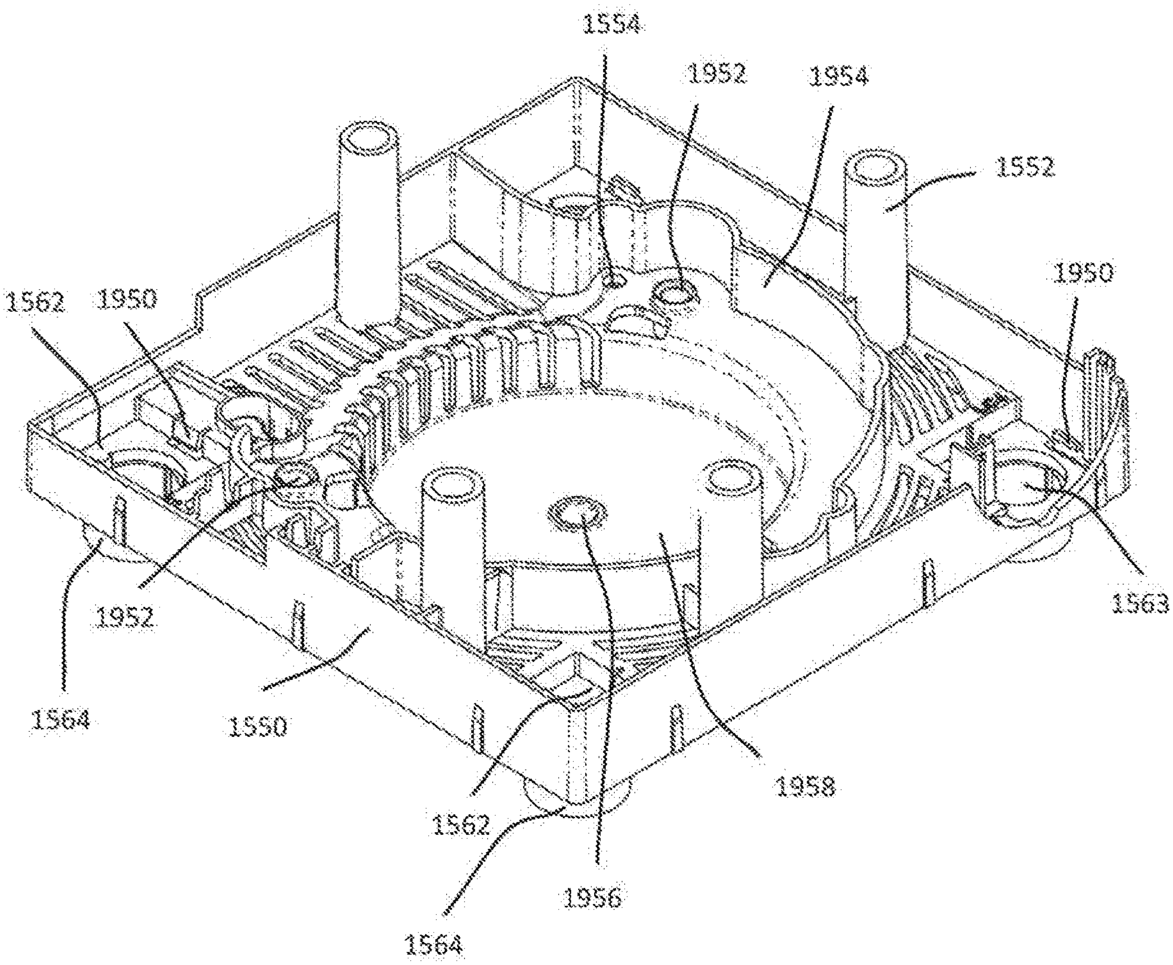

Reference is now made to FIGS. 26A-26C, which are simplified respective planar side, planar top and pictorial view illustrations of bottom element 1550, forming part of bottom assembly 1410 of FIGS. 20A & 20B.

In addition to the elements described hereinabove with reference to FIGS. 20A & 20B, namely the plurality of upstanding mounting screw guiding bosses 1552, the plurality of screw mounting apertures 1554, the corner recesses 1562, the apertures 1563 and the hollow cylindrical shaft portions 1564, it is seen that each corner recess 1562 of bottom element 1550 includes a plurality of, preferably two, snaps 1950, for securing load cells 1560 within corner recesses 1562 of bottom element 1550.

Bottom element 1550 also preferably includes a plurality of, preferably three, apertures 1952 for accommodating spindles 1906.

Bottom element 1550 preferably defines a partially interrupted circumferential wall 1954 for locating bottom element 1660 of motor housing and support assembly 1510 thereon and for separating warm and ambient air flows through bottom element 1660.

Bottom element 1550 preferably also defines a drive shaft engageable socket 1956 on a top-facing planar surface 1958 thereof.

Figure 27A:
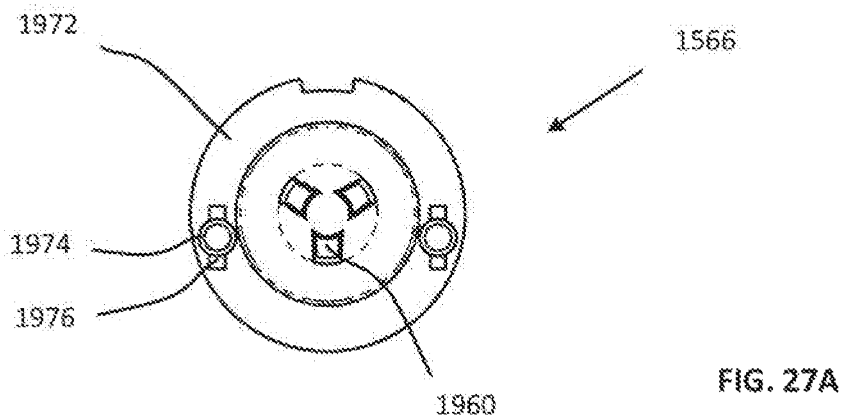
FIGS. 27A, 27B and 27C are simplified respective planar top, planar side and pictorial view illustrations of a load cell support, forming part of the bottom assembly of FIGS. 20A & 20B and 26A-26C.
Figure 27B:
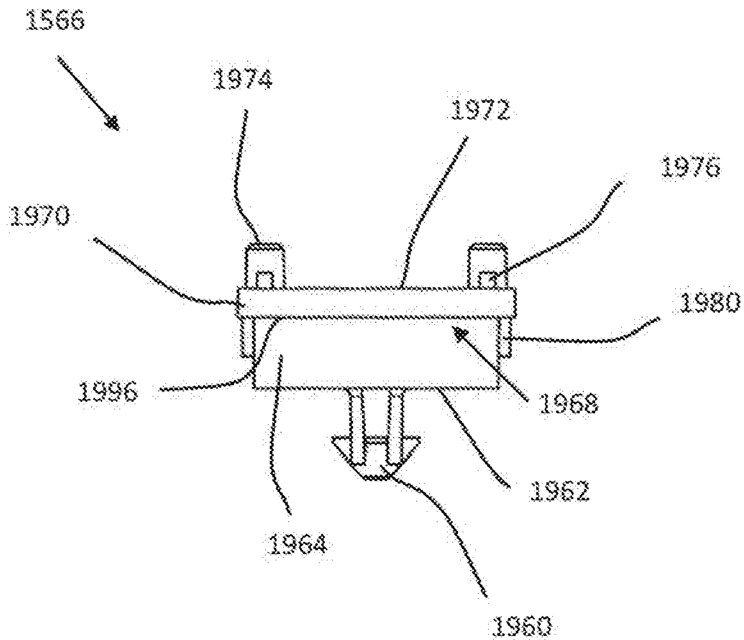
Figure 27C:
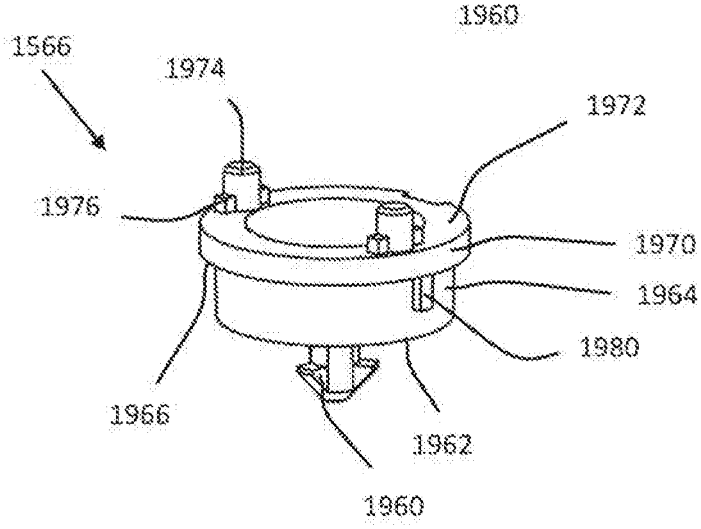
Figure 28A:
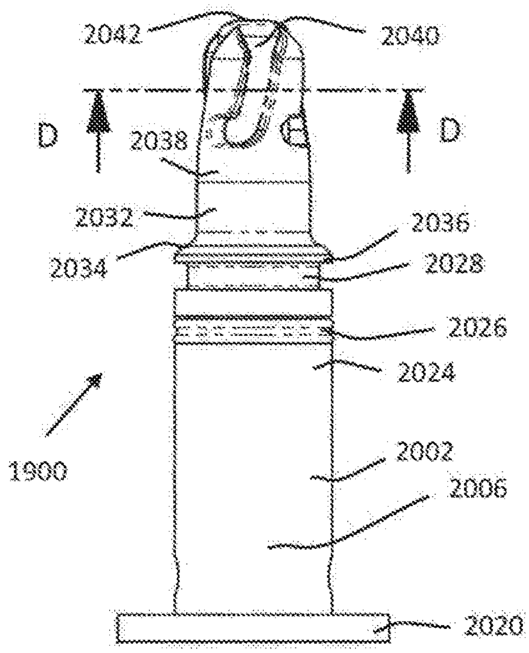
FIGS. 28A, 28B, 28C, 28D and 28E are simplified respective planar side, pictorial, planar top, first sectional and second sectional view illustrations of a drive shaft, forming part of the axially displaceable rotary drive assembly of FIGS. 25A-25E.
Figure 28D:
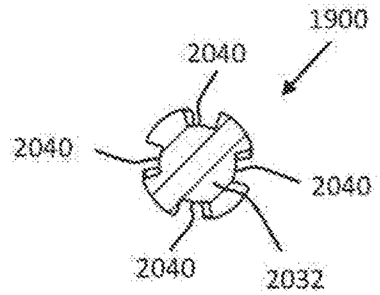
Figure 28C:
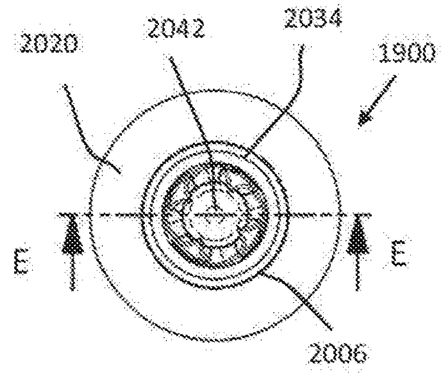
Figure 28B:
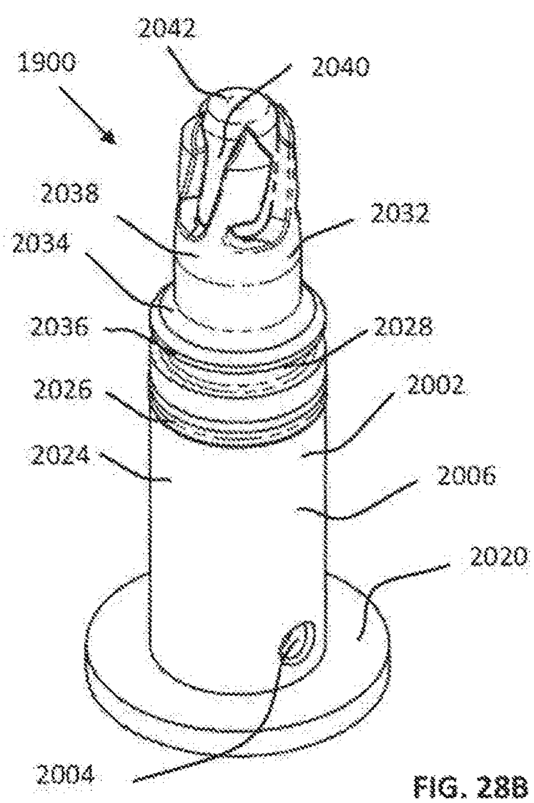
Figure 28E:
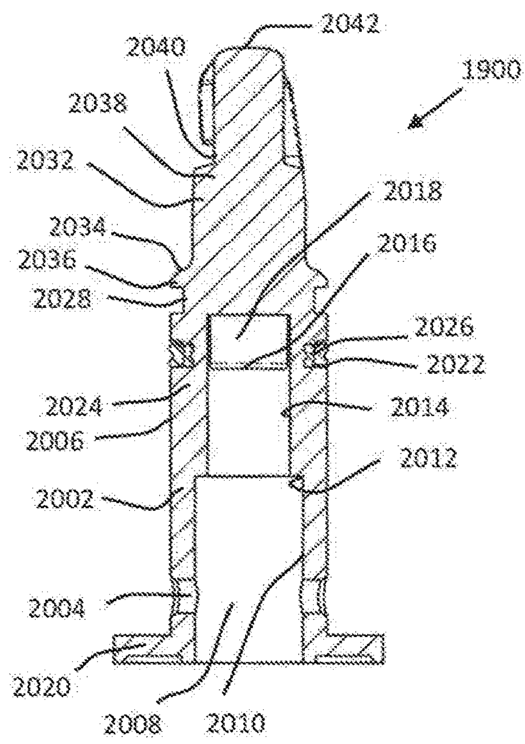
Figure 29A:
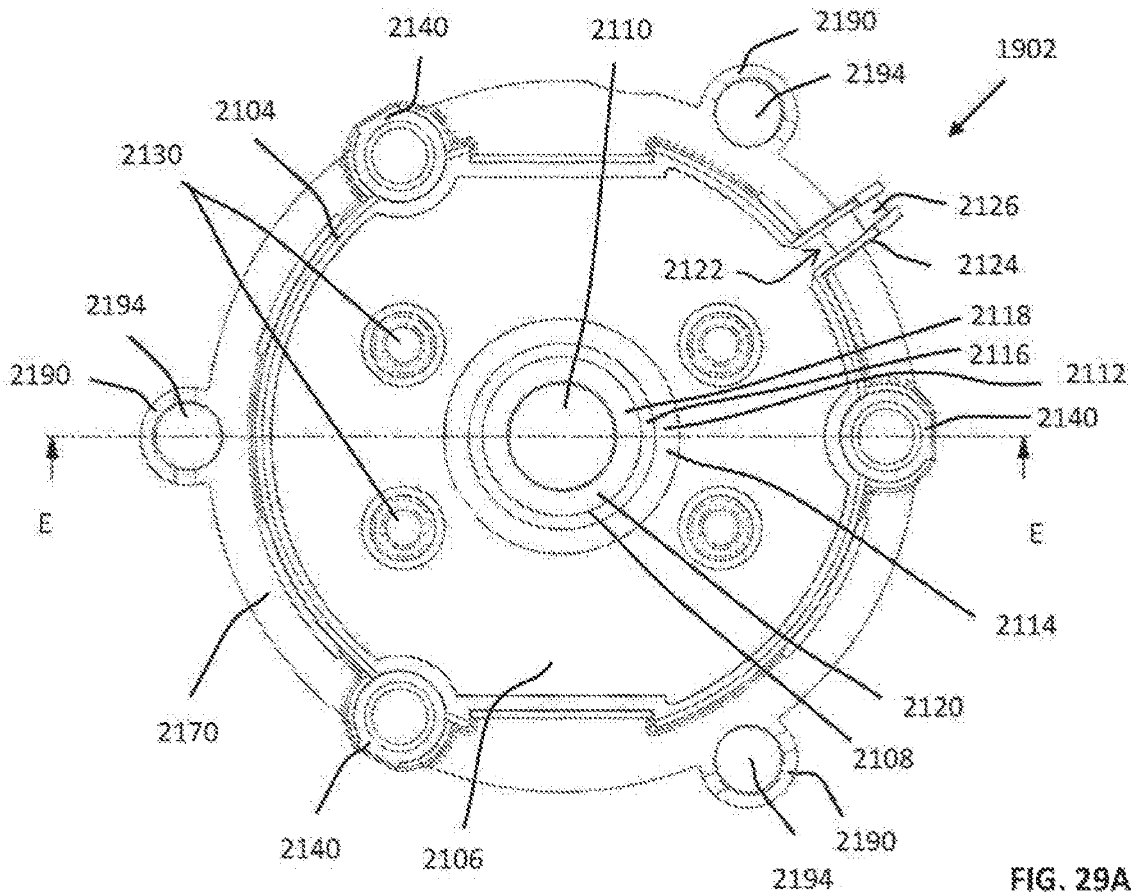
FIGS. 29A, 29B, 29C, 29D and 29E are simplified planar top, planar bottom, planar side, pictorial and sectional illustrations of a motor support bracket, forming part of the axially displaceable rotary drive assembly of FIGS. 25A-25E and 28A-28E.
Figure 29B:
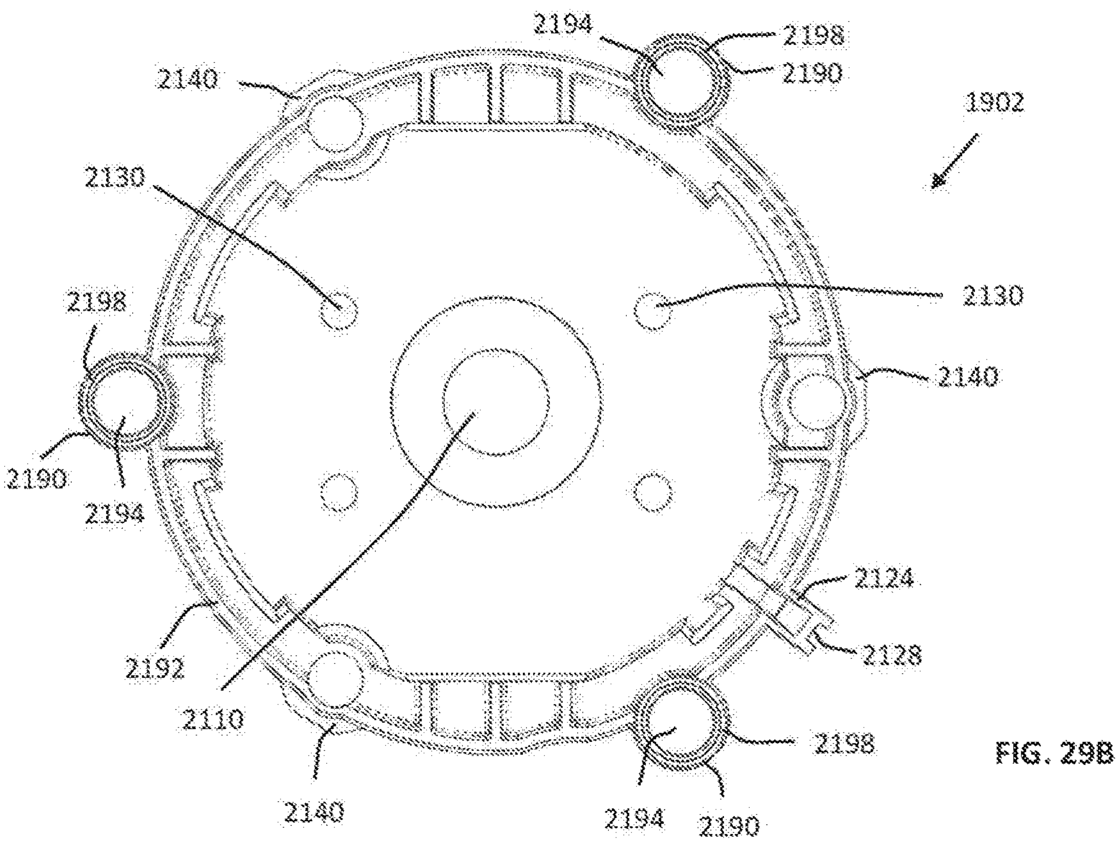
Figure 29C:
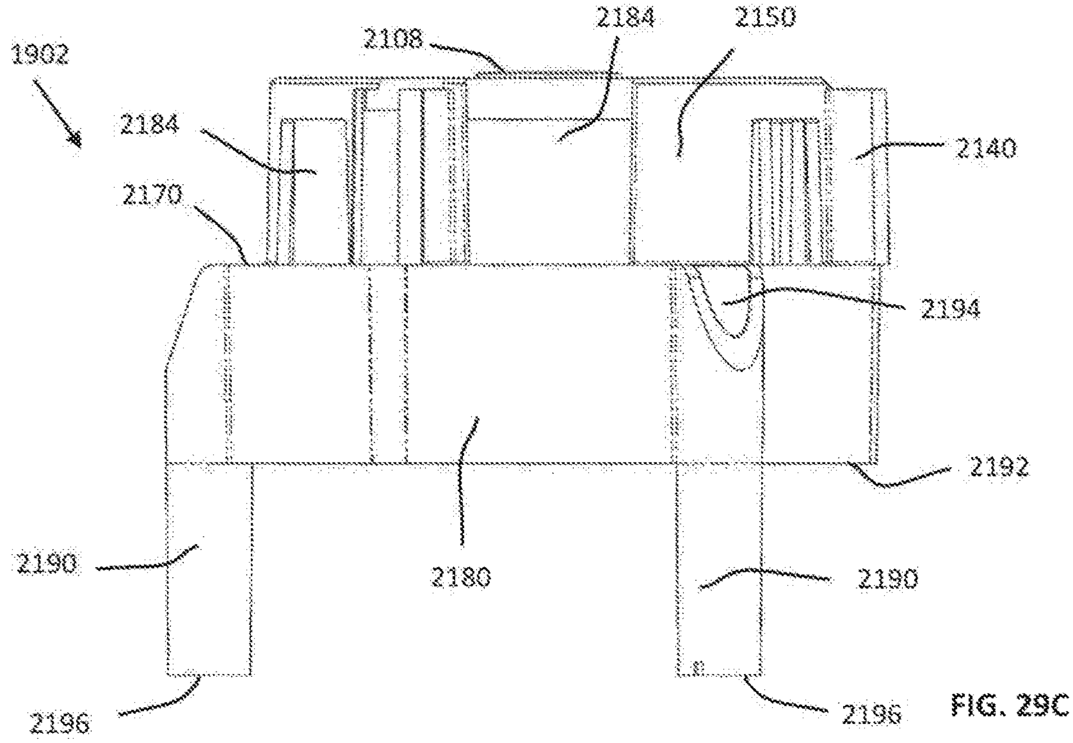
Figure 29D:
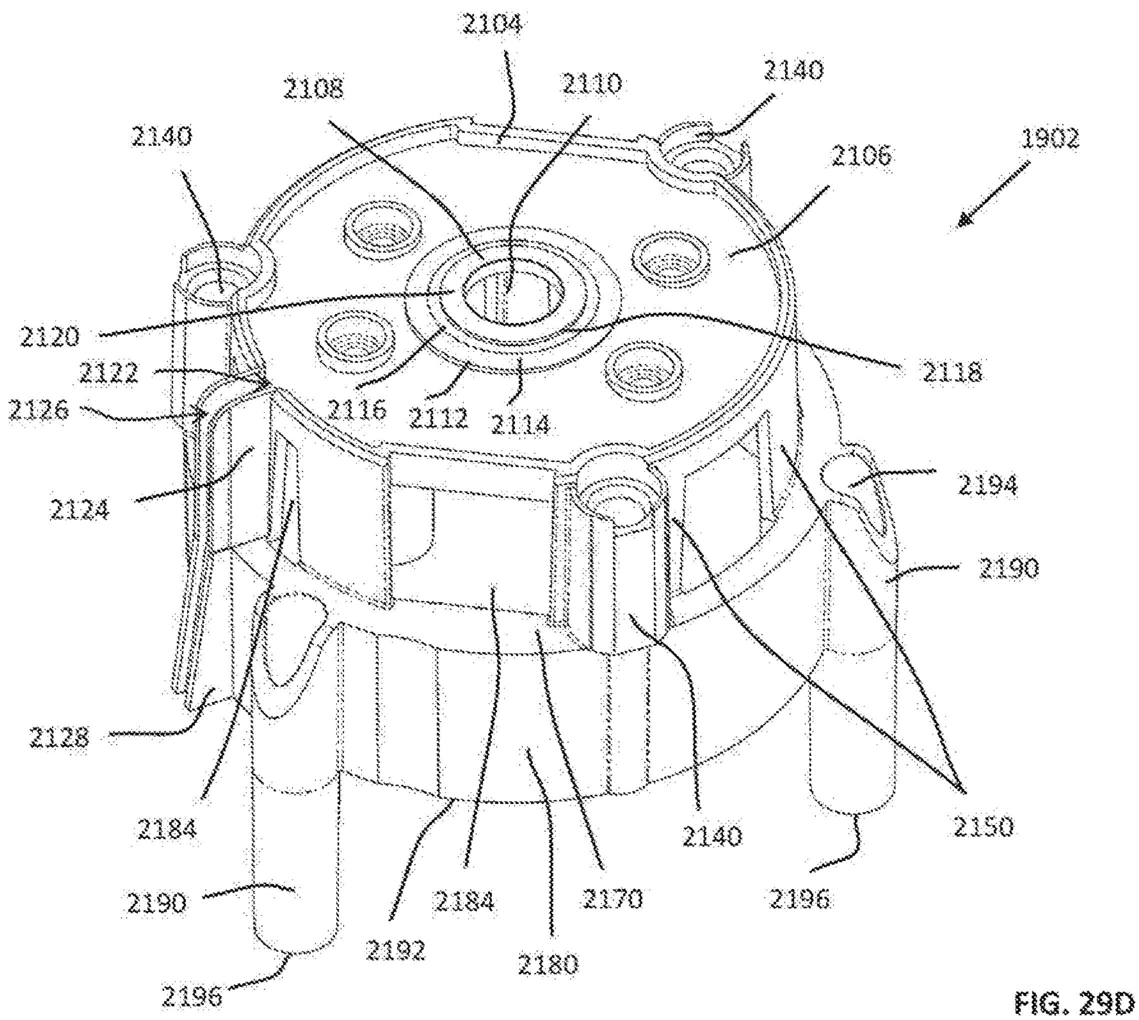
Figure 29E:
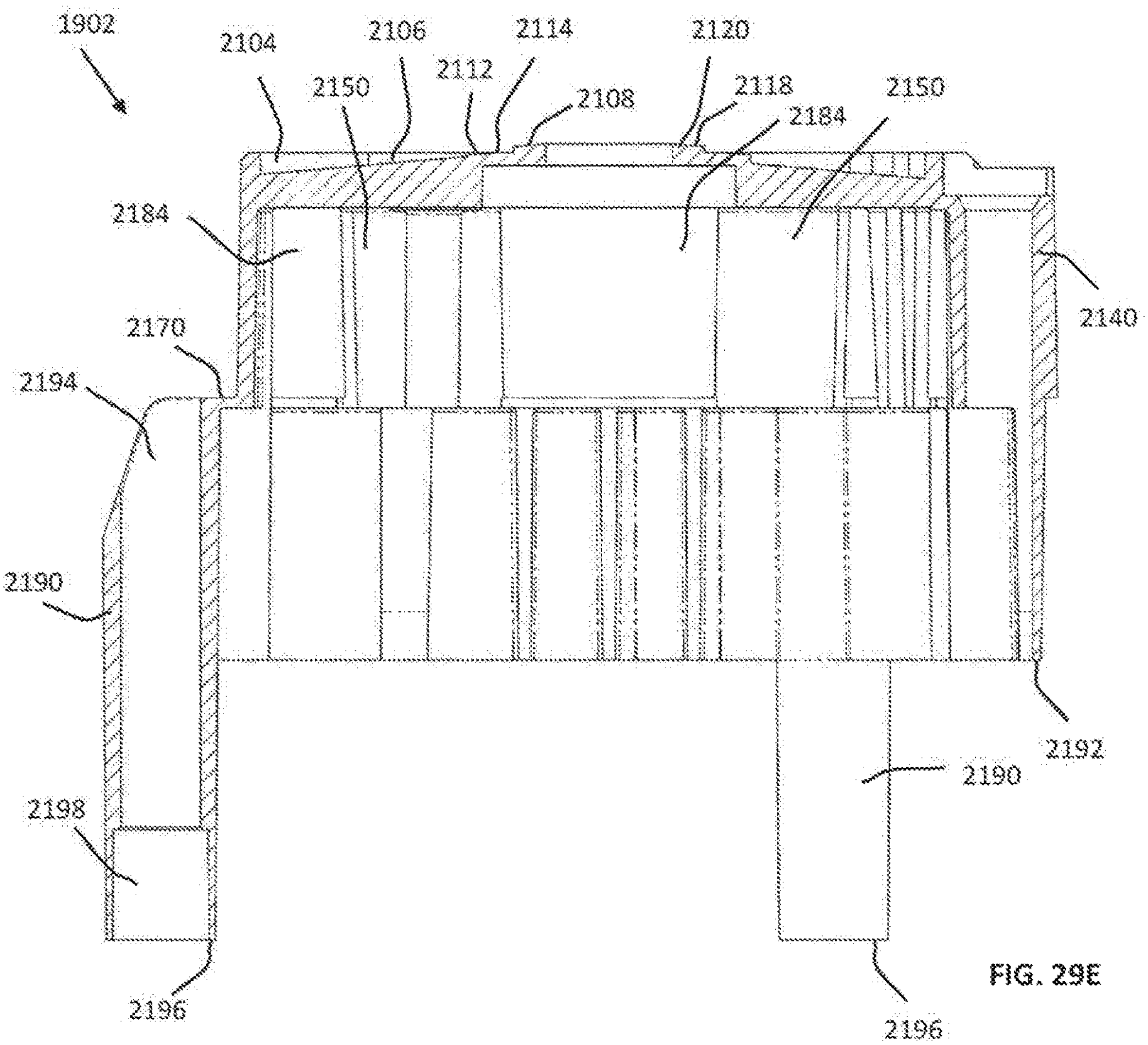

Reference is now made to FIGS. 27A-27C, which are simplified illustrations of load cell support 1566, forming part of bottom assembly 1410 of FIGS. 20A & 20B.

As seen in FIGS. 27A-27C, load cell support 1566 is a generally circular integrally formed element having a central descending barbed stem 1960 operative to secure load cell support 1566 to a corresponding support pad 1565 via a central aperture thereof. Outer surfaces of load cell support 1566 include a bottom surface 1962, a circumferential surface 1964 extending upwardly from bottom surface 1962 and terminating in a downwardly-facing annular surface 1966, thereby defining a circumferential locating shoulder 1968 which seats in a correspondingly configured portion of corner recess 1562.

Extending upwardly from annular surface 196 is a circumferential surface 1970 which extends to a top annular surface 1972. A pair of upstanding load cell locating protrusions 1974 extend upwardly from top annular surface 1972. A pair of side protrusions 1976 extend laterally from each of protrusions 1974. A pair of rotational locating protrusions 1980 extend radially outwardly in opposite directions from circumferential surface 1964.

Reference is now made to FIGS. 28A-28E, which are simplified illustrations of drive shaft assembly 1900, forming part of axially displaceable rotary drive assembly 1530 of FIGS. 25A-25E. As seen in FIGS. 28A-28E, drive shaft assembly 1900 includes a circular cylindrical lower wall 2002, having a pair of side apertures 2004 formed therein. Circular cylindrical lower wall 2002 defines a circular cylindrical outer surface 2006 and has a stepped inner bore 2008.

Stepped inner bore 2008 includes a bottom-most circular cylindrical lower inner wall surface 2010, which terminates at a shoulder 2012. An intermediate circular cylindrical lower inner wall surface 2014 extends upwardly to a downwardly-facing planar surface 2016. A slot 2018, preferably of generally rectangular cross section, extends upwardly from downwardly-facing planar surface 2016.

Circular cylindrical outer surface 2006 is formed with a generally annular flange 2020 at a base thereof and an annular recess 2022 at an upper end 2024 thereof. Annular recess 2022 is operative to house a sealing ring 2026, which is preferably formed from rubber. Above annular recess 2022, circular cylindrical outer surface 2006 is formed with an upper annular recess 2028.

Disposed above circular cylindrical lower wall 2002 is a generally solid section 2032, which defines an annular tapered shoulder 2034 with respect to circular cylindrical outer surface 2006. Shoulder 2034 extends between a circumferential edge 2036 of circular cylindrical outer surface 2006 and a circular tapered outer surface 2038 of generally solid section 2032.

Circular tapered outer surface 2038 is preferably formed with a plurality of curved recesses 2040, which extend upwardly to an upwardly-facing surface 2042, and are configured and arranged to slidably and rotatably receive curved splines 518 of blade 160 (FIGS. 6A-6G).

Reference is now made to FIGS. 29A-29E, which are simplified illustrations of motor support bracket 1902, forming part of axially displaceable rotary drive assembly 1530 of FIGS. 25A-25E.

As seen in FIGS. 29A-29E, motor support bracket 1902 is a generally cylindrical assembly, which includes a top planar generally circular wall 2104 surrounding a recessed nearly planar but slightly conical top surface 2106 which surrounds a tapered boss 2108 having a central aperture 2110. Tapered boss 2108 includes an outer raised portion 2112 having a generally planar top surface 2114, interior of which is a generally inwardly and upwardly tapered raised portion 2116 and interior of which is a central annular raised portion 2118, which surrounds central aperture 2110 and defines a generally planar upper surface 2120 which is higher than surfaces 2114 and 2116.

Top planar generally circular wall 2104 is preferably formed with an opening 2122, which permits liquid outflow therethrough. Aligned with opening 2122 is a radially outwardly-extending protrusion 2124, which defines a liquid outflow channel 2126 which extends downwardly to a liquid outflow channel termination location 2128.

A plurality of bolt mounting holes 2130 are preferably formed in recessed nearly planar but slightly conical top surface 2106 for accommodating motor mounting bolts (not shown), which bolt an electric motor, such as electric motor 1904, to motor support bracket 1902.

A plurality, preferably three, of pin receiving shaft portions 2140 are preferably arranged about recessed nearly planar but slightly conical top surface 2106 and are arranged for slidably receiving guiding pins 1780 of top element 1650, as described hereinabove with reference to FIGS. 23A-23F.

Extending downwardly from top planar generally circular wall 2104, in a generally circular cylindrical arrangement, are a plurality of depending wall sections 2150, some of which preferably surround pin receiving shaft portions 2140.

Depending wall sections 2150 preferably all terminate at a generally circumferential planar wall surface 2170, from which depends in turn, a generally cylindrical wall portion 2180. Wall sections 2150, together with top planar generally circular wall 2104 and generally circumferential planar wall surface 2170, define an array of ventilation apertures 2184. Array of ventilation apertures 2184 is generally mutually aligned within array of ventilation apertures 1732 formed in top element 1650 of motor housing and support assembly 1510. It is a particular feature of the invention that ventilation apertures 2184 lie above liquid outflow channel termination location 2128.

Protruding from generally cylindrical wall portion 2180 are a plurality of spindle guiding shaft portions 2190, which extend below a bottom edge 2192 of cylindrical wall portion 2180. Each of spindle guiding shaft portions 2190 preferably defines a vertical bore 2194, each of which terminates adjacent a lower edge 2196 of spindle guiding shaft portion 2190 in a widened spring seat 2198 for accommodating a coil spring, such as coil spring 1908.

Figure 30A:
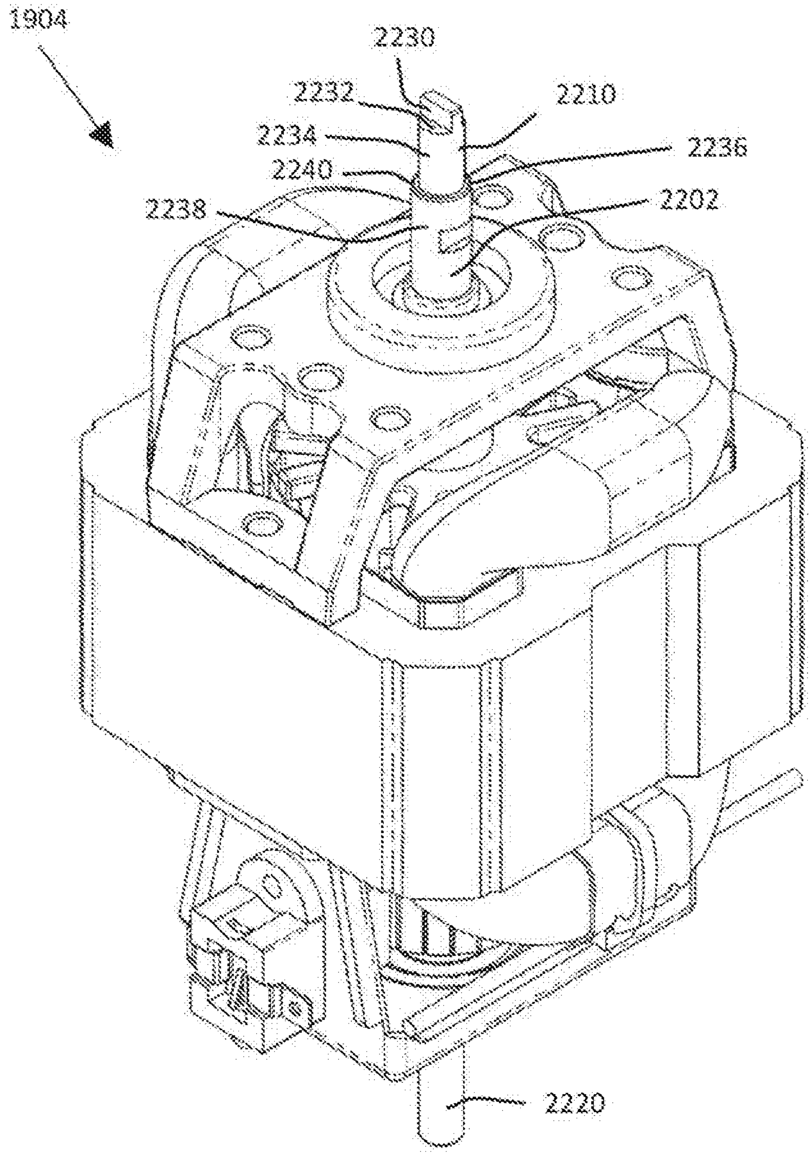
FIGS. 30A and 30B are simplified respective upwardly-facing and downwardly-facing pictorial view illustrations of a modified standard electric motor, forming part of the axially displaceable rotary drive assembly of FIGS. 25A-25E and 28A-29E.
Figure 30B:
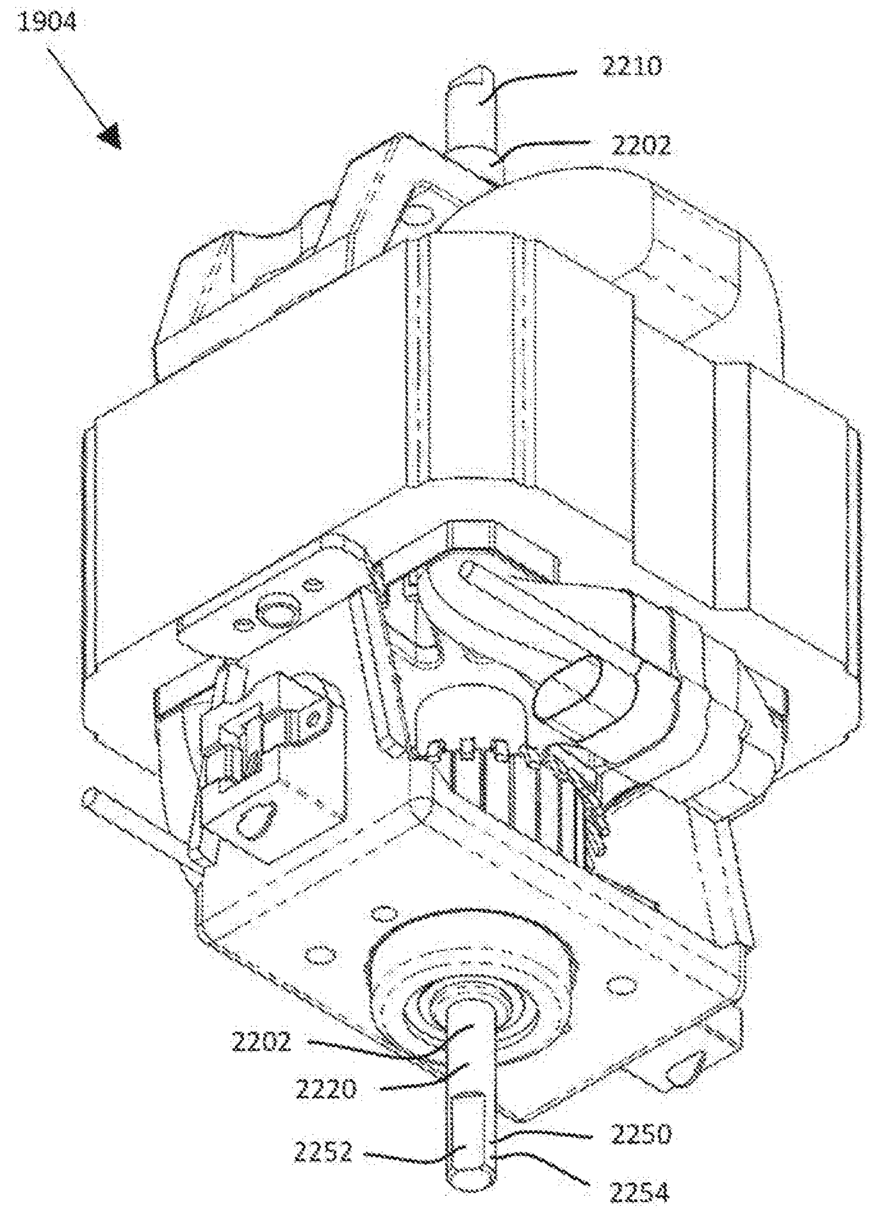

Reference is now made to FIGS. 30A and 30B, which are simplified respective upwardly-facing and downwardly-facing pictorial view illustrations of modified standard electric motor 1904, forming part of axially displaceable rotary drive assembly 1530 of FIGS. 25A-25E. As seen in FIGS. 30A and 30B, electric motor 1904 is generally a model EU9537-1201, manufactured by Euroka Electrical of Dongguan, China, and has a drive shaft 2202 having specially configured drive shaft top and bottom ends 2210 and 2220.

As seen in FIG. 30A, drive shaft top end 2210 is configured to have an uppermost portion 2230 having a generally elongate rectangular cross section, which terminates in a pair of coplanar side surfaces 2232. Underlying the uppermost portion 2230 and side surfaces 2232, the drive shaft top end 2210 includes an intermediate cylindrical portion 2234, which terminates in an annular planar surface 2236. Underlying intermediate cylindrical portion 2234 is the remainder 2238 of drive shaft top end 2210 which has a slightly larger cross section than that of intermediate cylindrical portion 2234 and defines therewith a shoulder 2240.

As seen in FIG. 30B, drive shaft bottom end 2220 is configured to have a bottommost portion 2250 having a generally uniform cross section characterized in that it includes a flat side surface 2252 and a generally circular cylindrical surface 2254.

Figure 31A:
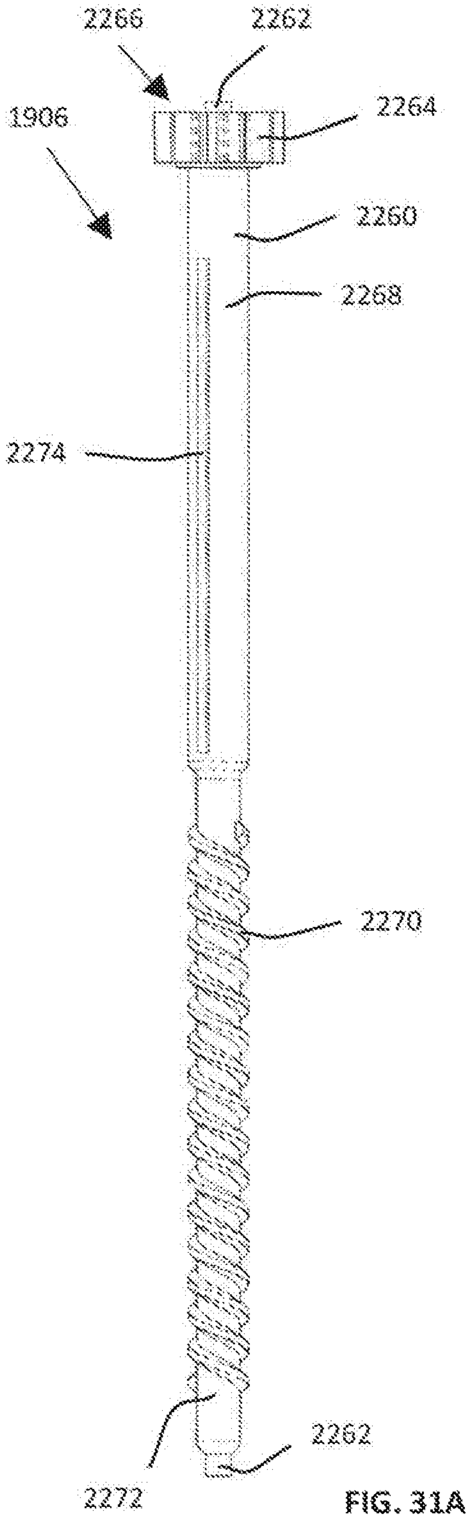
FIGS. 31A and 31B are simplified respective planar side and pictorial view illustrations of a spindle, forming part of the axially displaceable rotary drive assembly of FIGS. 25A-25E and 28A-30B.
Figure 31B:
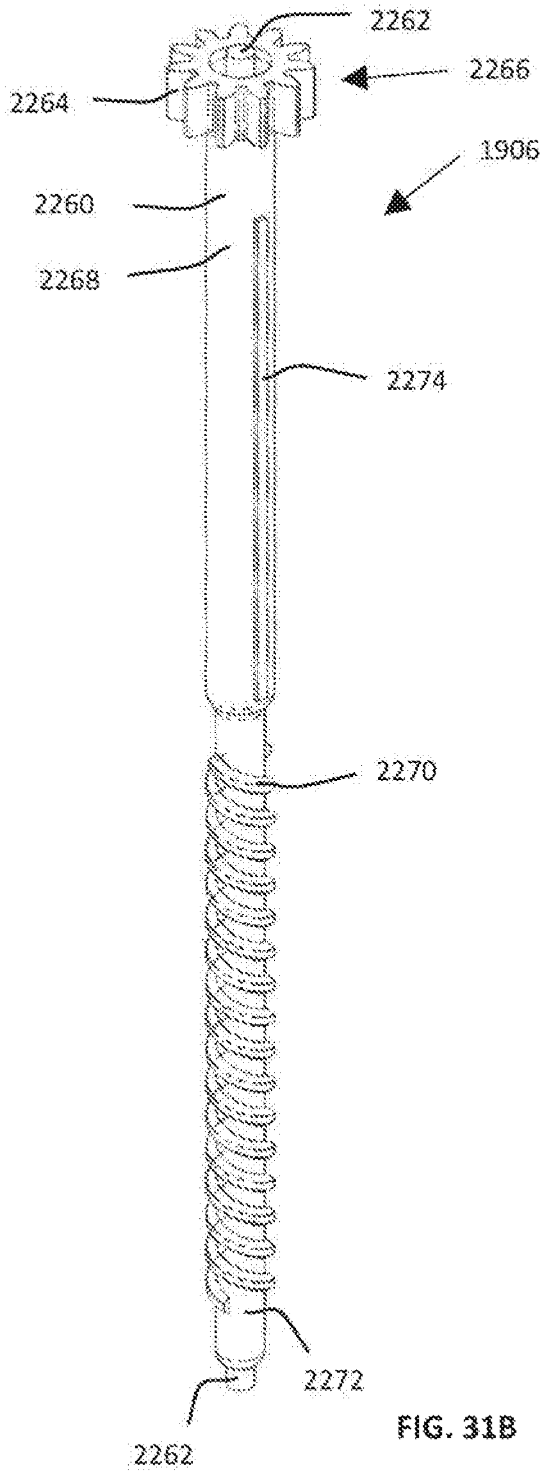
Figure 32A:
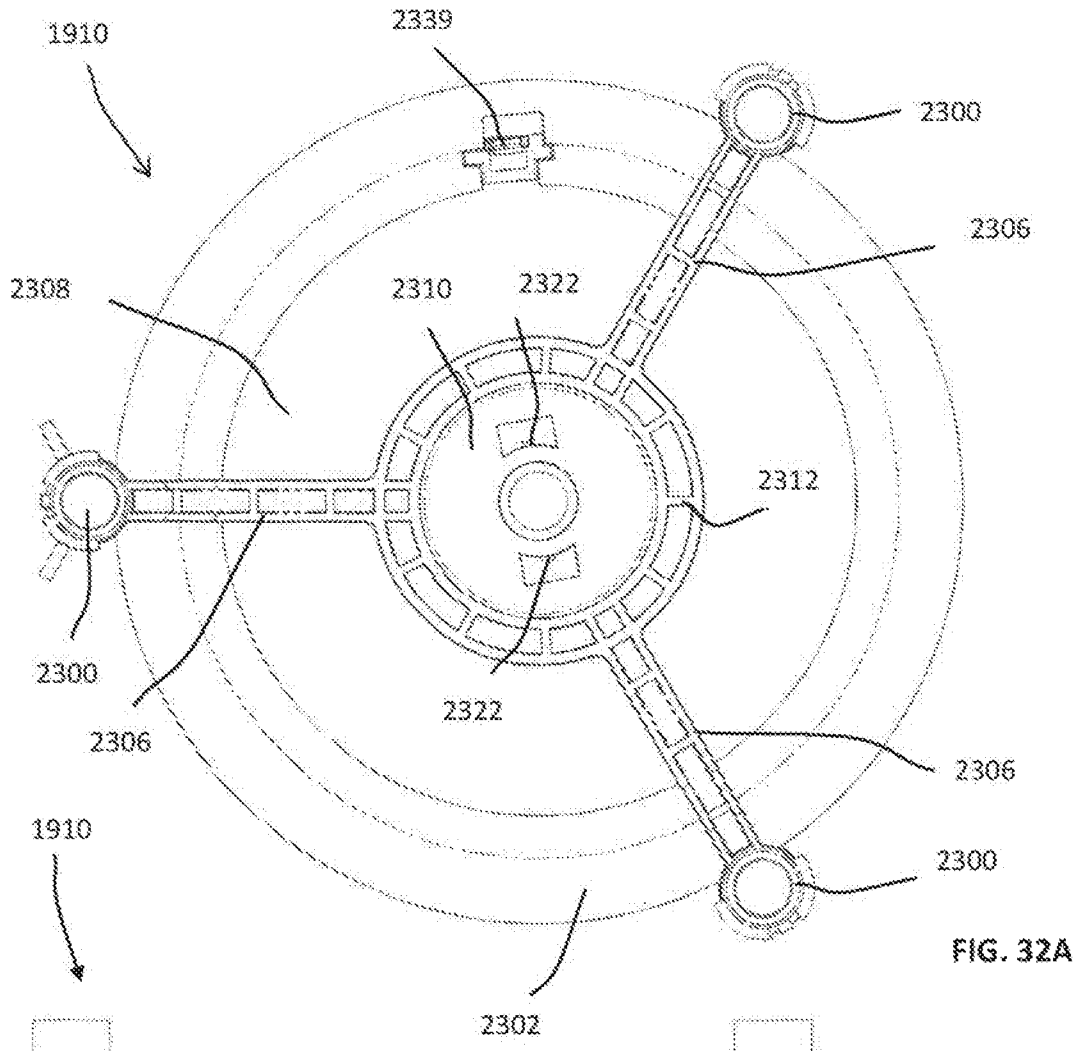
FIGS. 32A, 32B, 32C, 32D and 32E are simplified respective planar top, planar side, planar bottom, top-facing pictorial and bottom-facing pictorial view illustrations of a motor lifting element, forming part of the axially displaceable rotary drive assembly of FIGS. 25A-25E and 28A-31B.
Figure 32B:
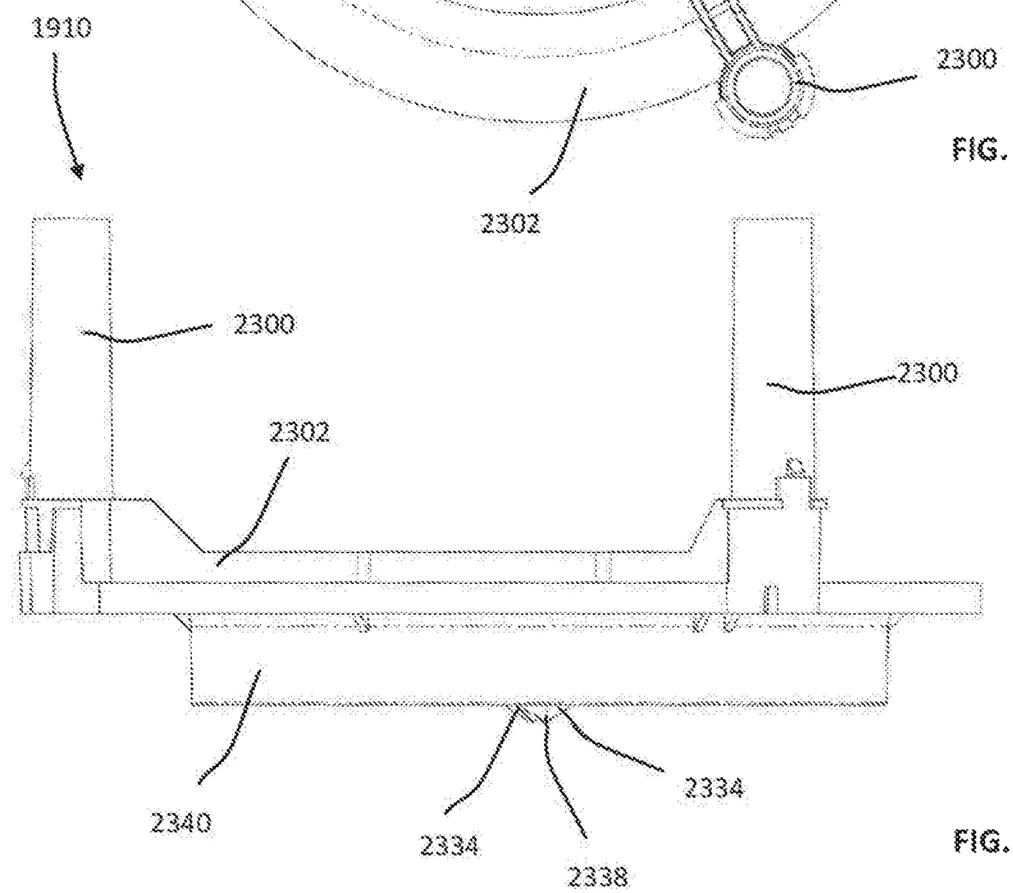
Figure 32C:
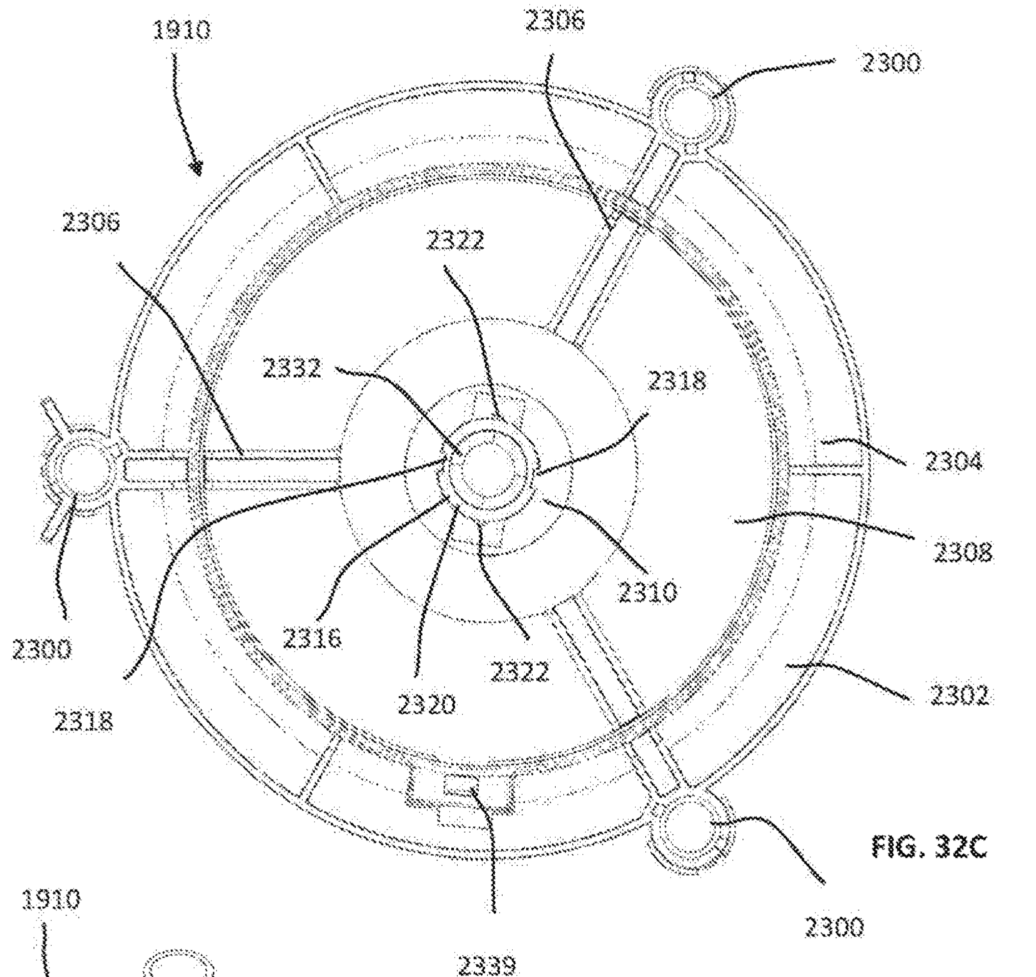
Figure 32D:
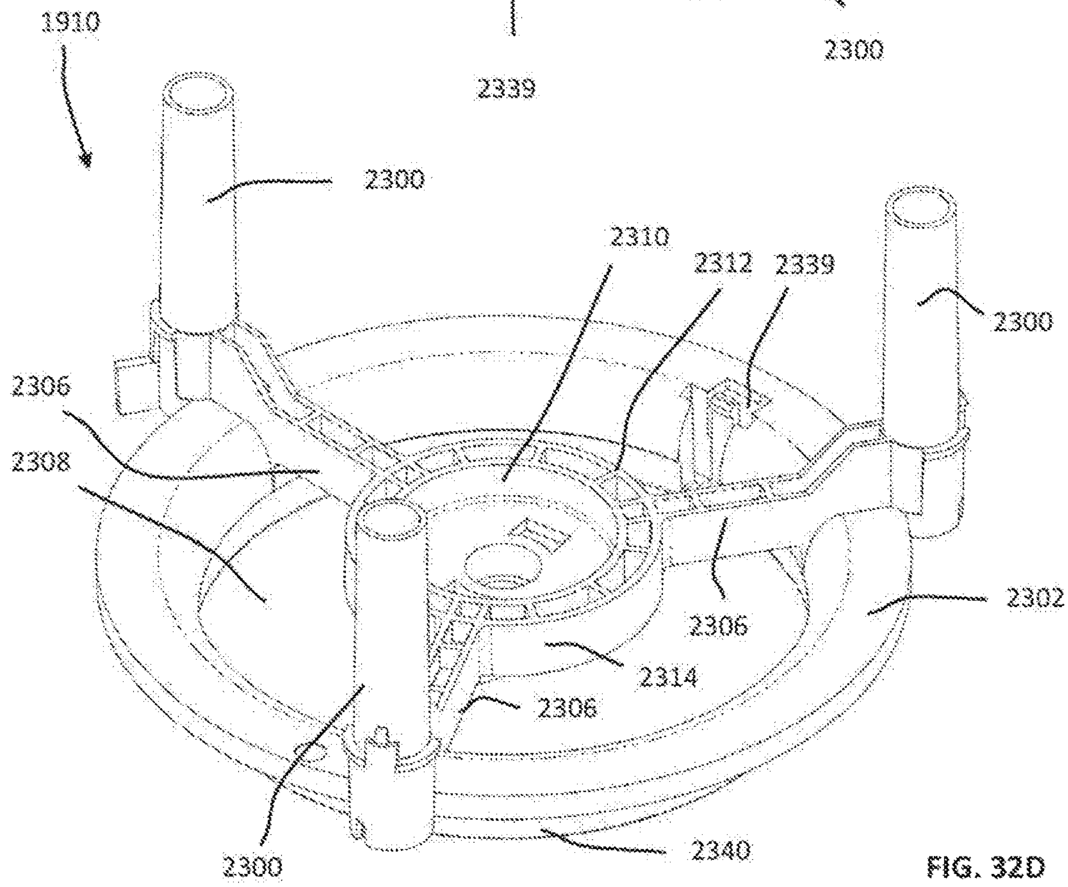
Figure 32E:
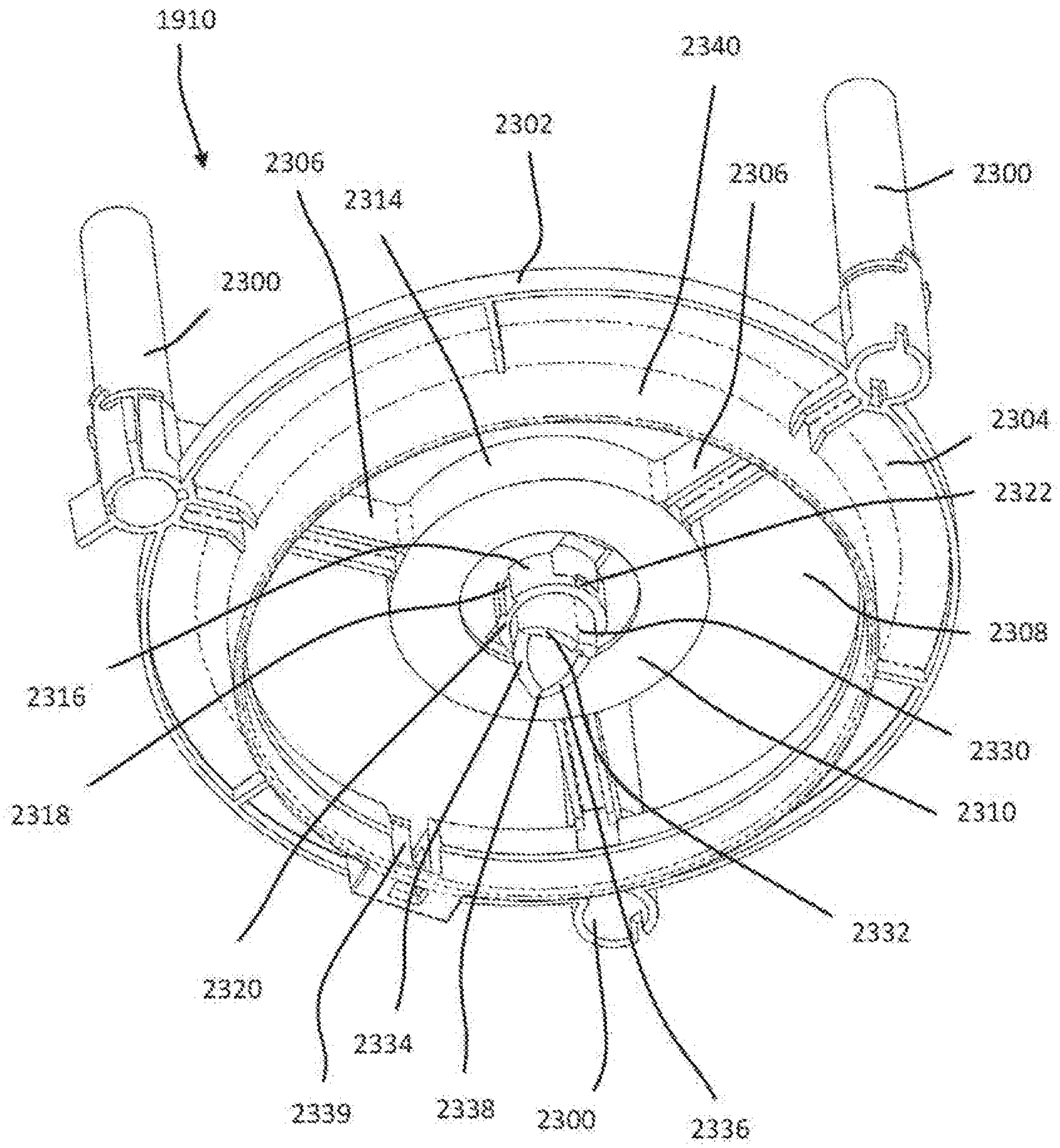
Figure 33A:
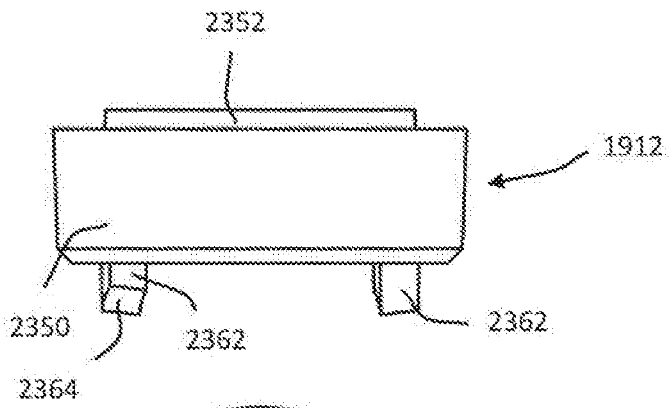
FIGS. 33A, 33B, 33C, 33D and 33E are simplified respective planar side, planar top, planar bottom, bottom-facing pictorial and sectional view illustrations of a linear to rotary converting adaptor, forming part of the axially displaceable rotary drive assembly of FIGS. 25A-25E and 28A-32E.
Figure 33B:
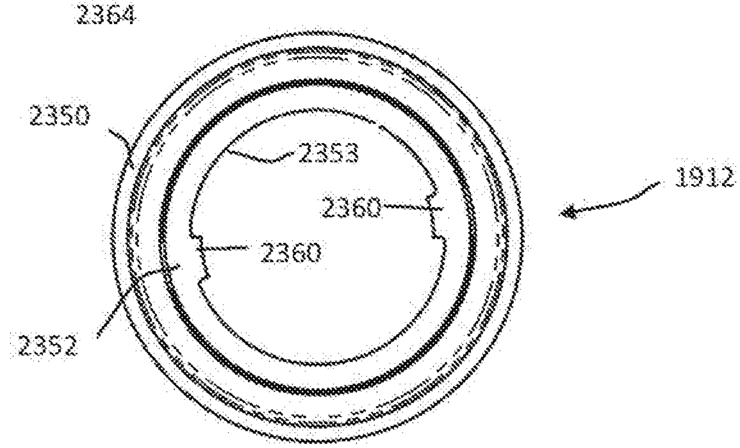
Figure 33C:
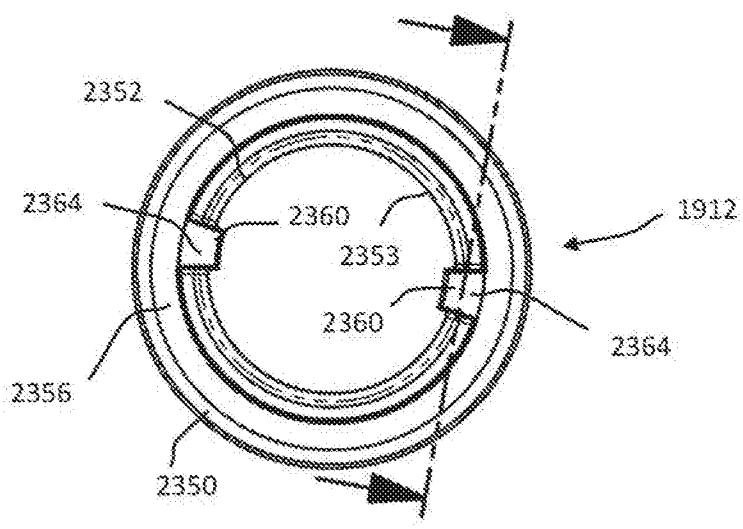
Figure 33D:
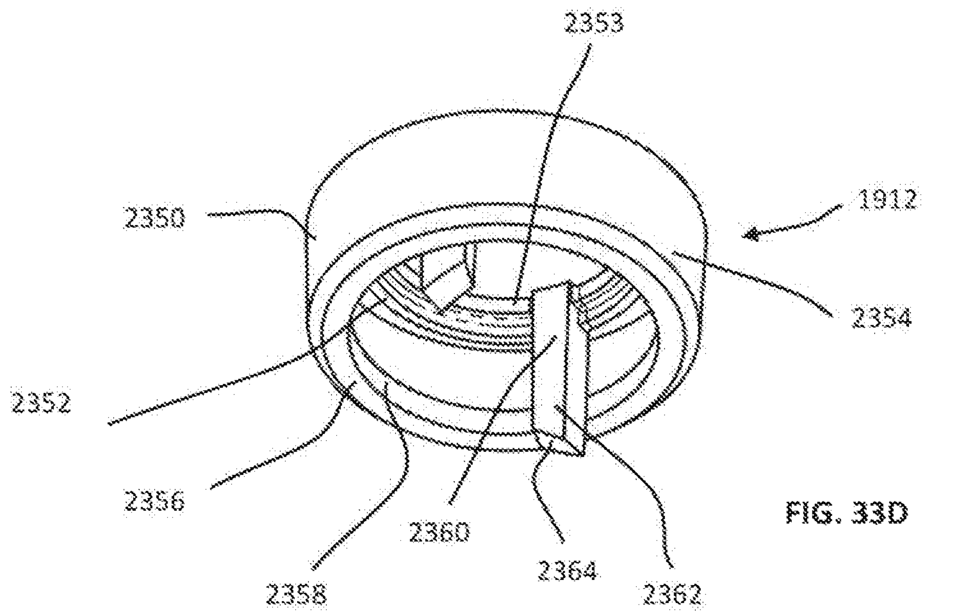
Figure 33E:
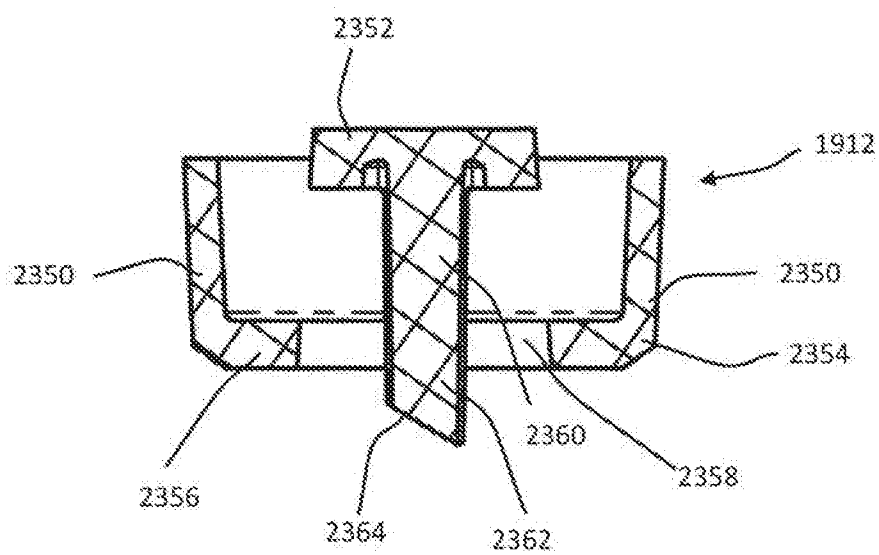
Figure 34A:
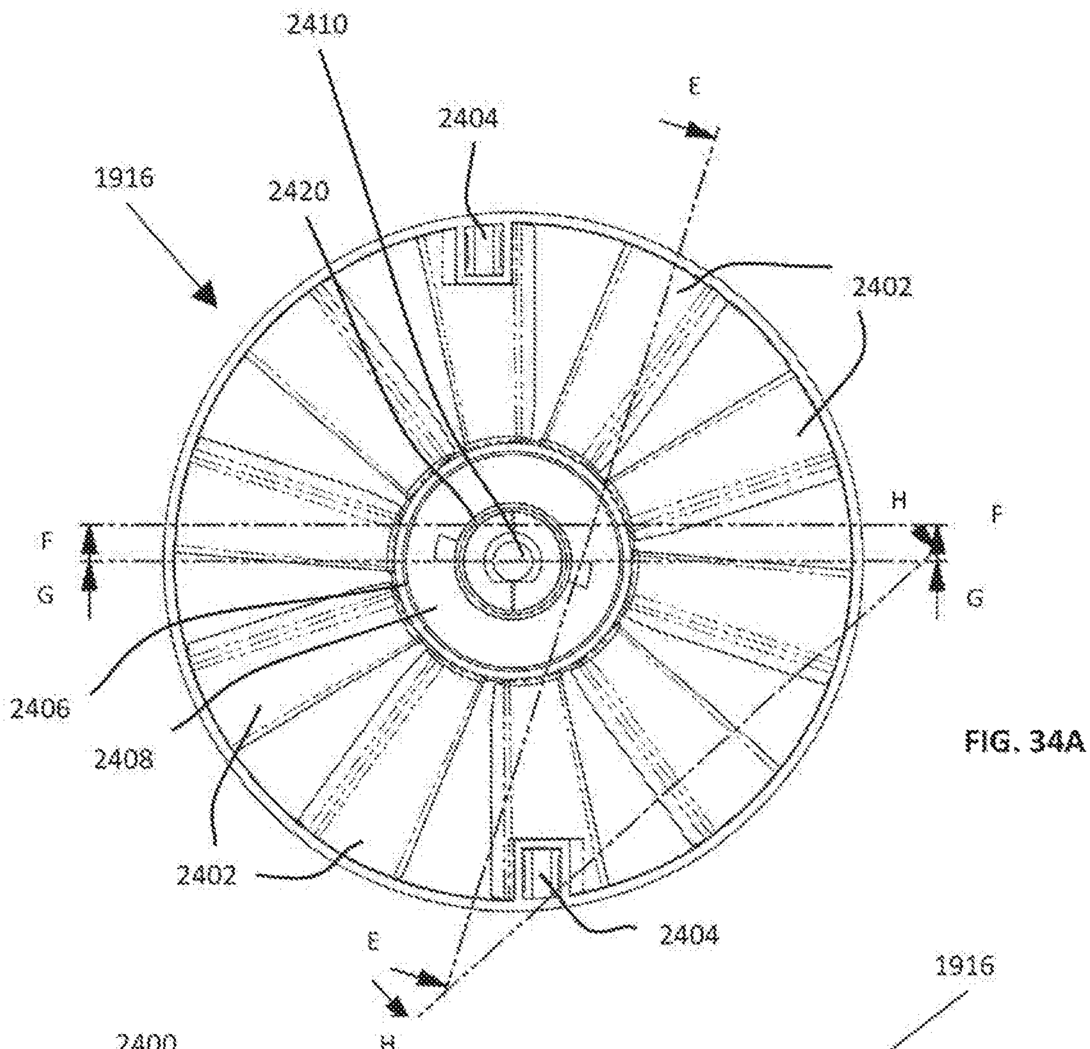
FIGS. 34A, 34B, 34C, 34D, 34E, 34F, 34G and 34H are simplified respective planar top, planar side, top-facing pictorial, bottom-facing pictorial, first sectional, second sectional, third sectional and fourth sectional view illustrations of a linearly driven rotating ventilating element, forming part of the axially displaceable rotary drive assembly of FIGS. 25A-25E and 28A-33E, FIGS. 34E, 34F, 34G and 34H being taken along respective lines E-E, F-F, G-G and H-H in FIG. 34A.
Figure 34B:
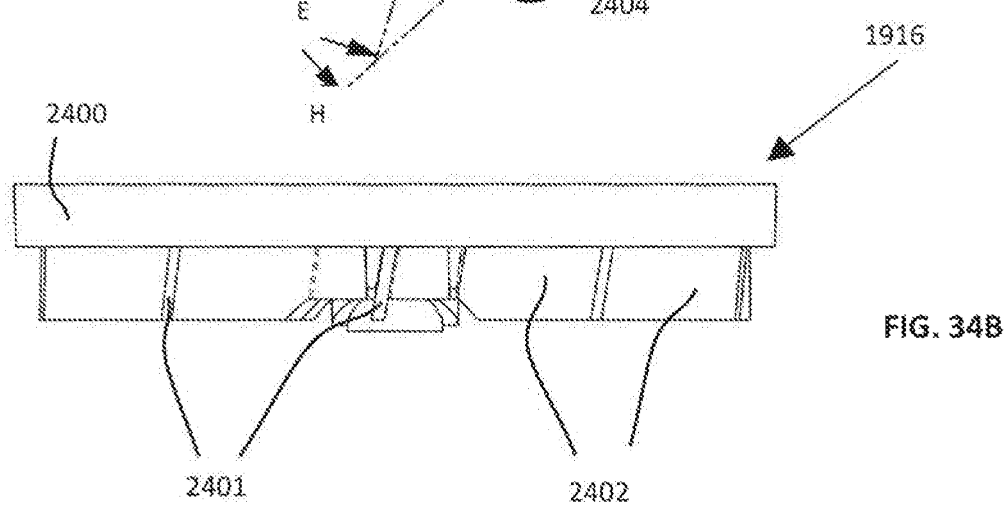
Figure 34C:
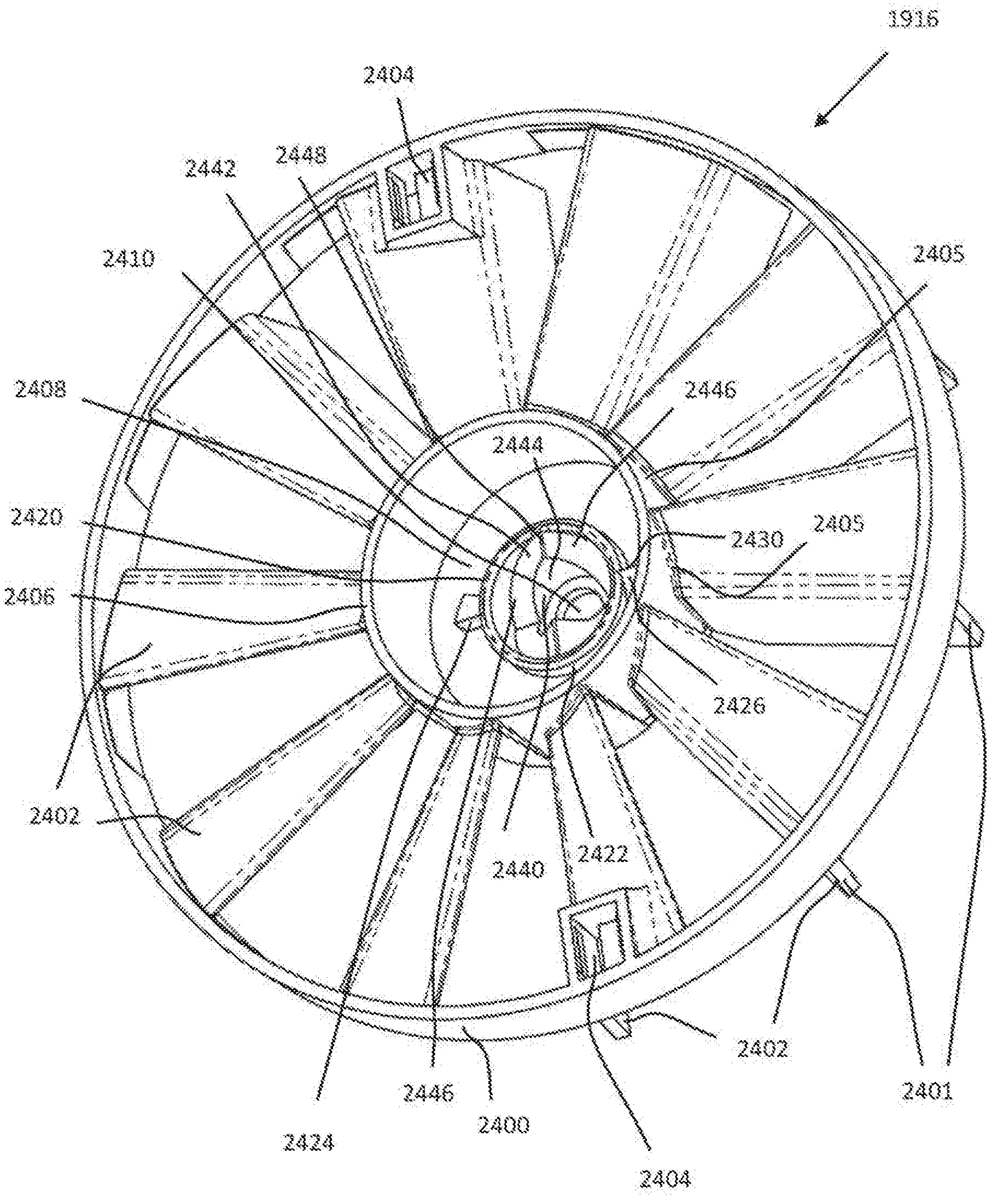
Figure 34D:
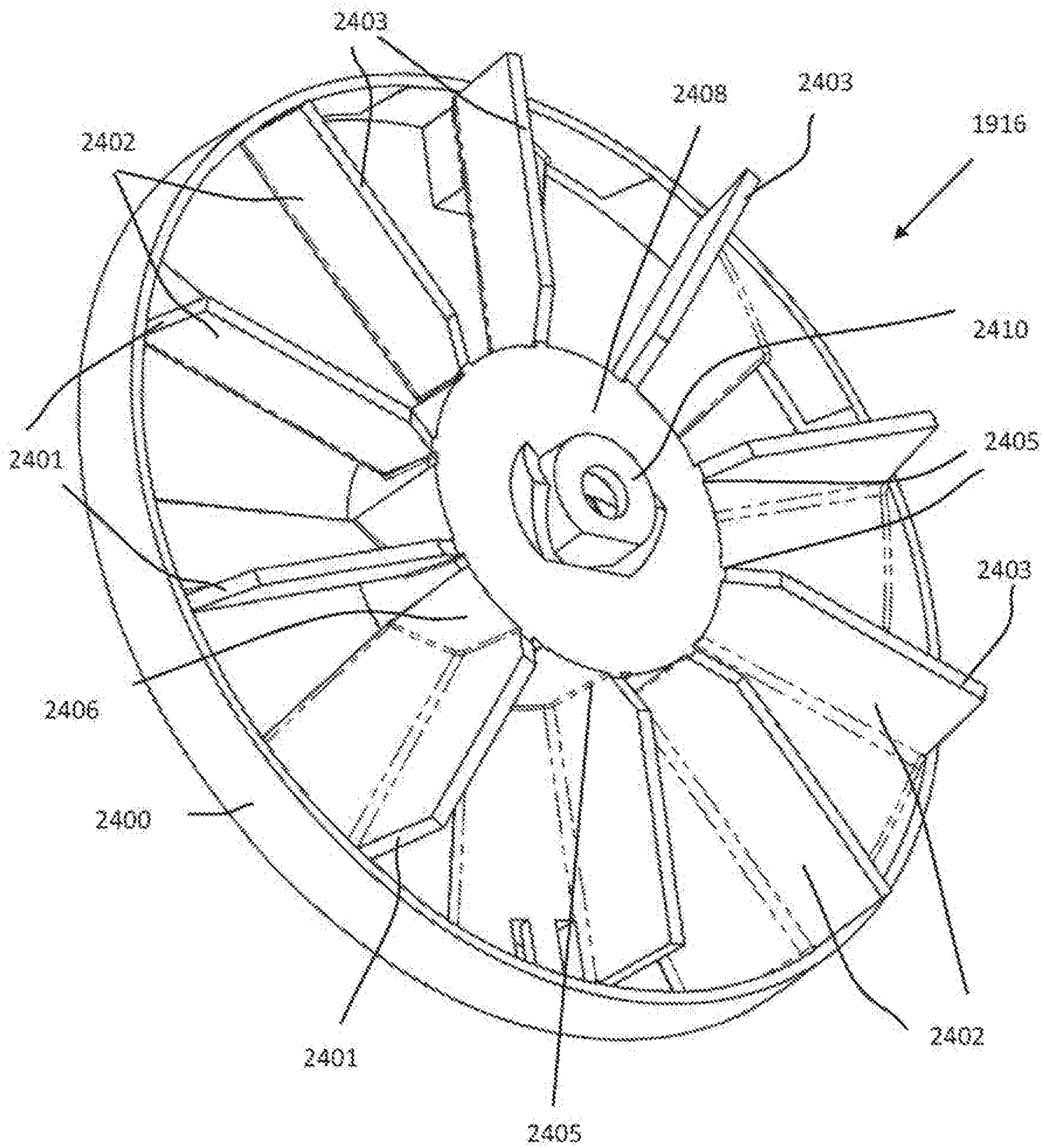
Figure 34E:
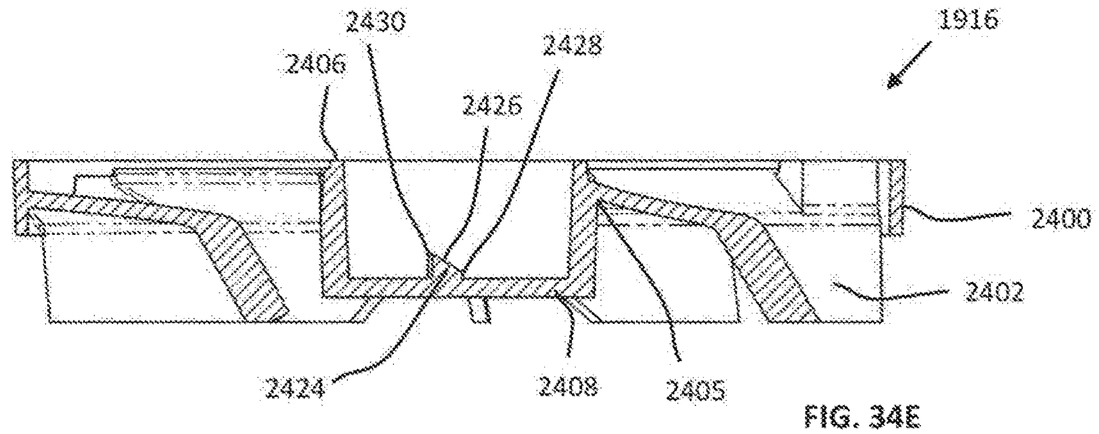
Figure 34F:
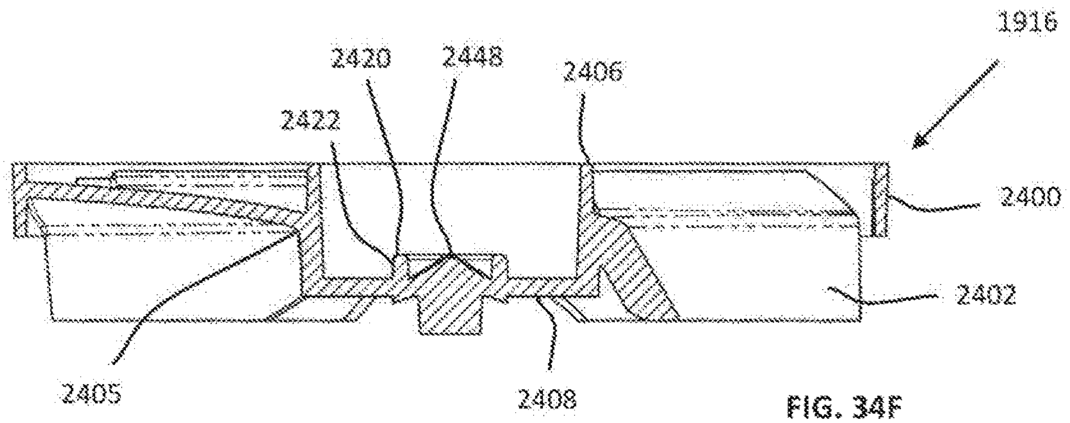
Figure 34G:
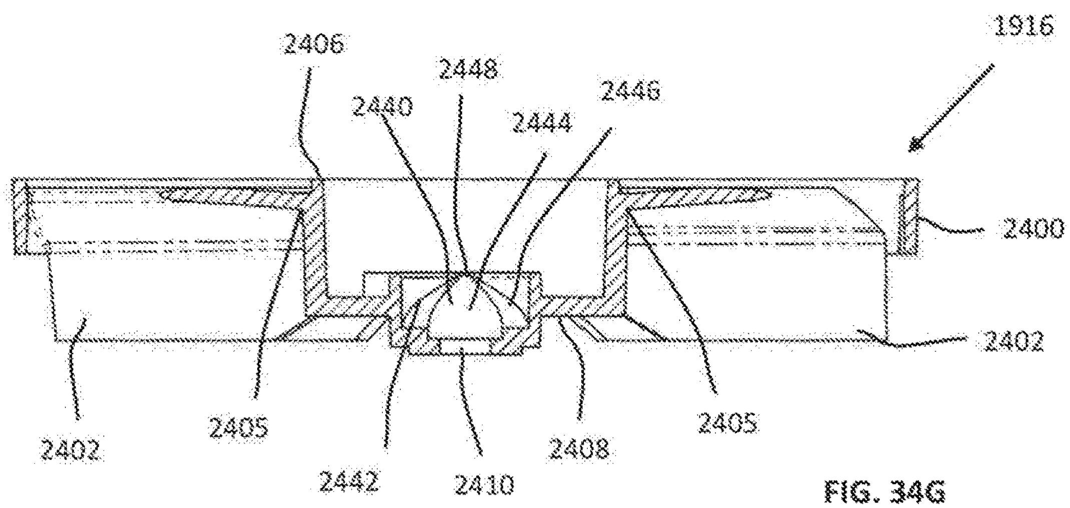
Figure 34H:
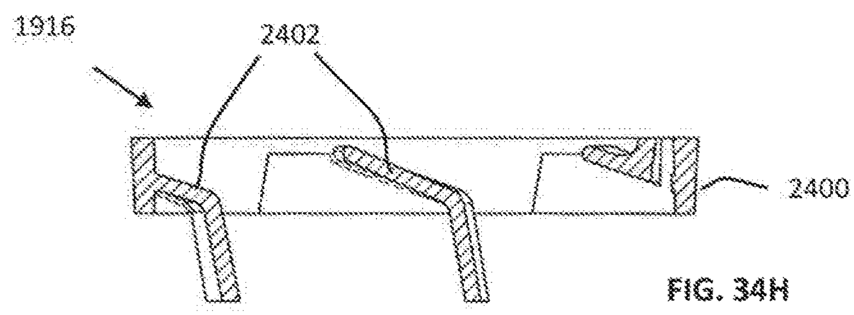

Reference is now made to FIGS. 31A and 31B, which are simplified respective planar side and pictorial view illustrations of spindle 1906, forming pair of axially displaceable rotary drive assembly 1530 of FIGS. 25A-25E.

As seen in FIGS. 31A & 31B, spindle 1906 preferably is an elongate element formed by injection molding of a plastic sheath 2260 over an elongate steel rod 2262. Spindle 1906 preferably includes a gear portion 2264 at a top end 2266 thereof. Below gear portion 2264 is a generally cylindrical portion 2268 which terminates in a helically threaded portion 2270, which terminates in a cylindrical bottom portion 2272. Preferably, generally cylindrical portion 2268 is formed along par of the extent thereof with an elongate side protrusion 2274 operative to provide azimuthal orientation of spindle 1906 during assembly.

Reference is now made to FIGS. 32A-32E, which are simplified illustrations of motor lifting element 1910, forming part of axially displaceable rotary drive assembly 1530 of FIGS. 25A-25E.

As seen in FIGS. 32A-32E, motor lifting element 1910 includes a plurality of upstanding internally threaded spindle receiving sockets 2300, which are disposed about a generally planar annular wall 2302, having a bottom surface 2304. Generally planar annular wall 2302 is preferably formed having a plurality of radial reinforcement ribs 2306 and defining a central ventilation aperture 2308. Disposed centrally of central ventilation aperture 2308 is a linearly displaceable ventilating element positioning hub 2310. Ventilating element positioning hub 2310 is operative to correctly azimuthally position a blade, such as blade 160, upon lowering of axially displaceable rotary drive assembly 1530, such that said blade accurately seats in a downwardly-facing blade receiving recess, such as blade receiving recess 420 of lid 140. This is achieved by correctly azimuthally positioning linearly driven rotating ventilating element 1916, which is rotationally fixed to a drive shaft, such as drive shaft 2202, which in turn is rotationally fixed to said blade, such as blade 160.

Ventilating element positioning hub 2310 is preferably configured to have a planar wall 2312, which is integrally formed with inner portions of radial reinforcement ribs 2306. Extending downwardly from planar wall 2312 is an outer circumferential wall 2314, interiorly of which is an inner circumferential wall 2316 having a pair of outwardly-facing vertical elongate side slots 2318 for receiving a corresponding pair of interior ribs of linear to rotary converting adaptor 1912, thereby contributing to the locking of linear to rotary converting adaptor 1912 against rotation relative to motor lifting element 1910.

Inner circumferential wall 2316 terminates at a downwardly-racing edge 2320 adjacent which is provided a pair of protrusions 2322. It is noted that protrusions 2322 also contribute to the locking of linear to rotary converting adaptor 1912 against linear disengagement from motor lifting element 1910. Inwardly of edge 2320 is a circumferential wall 2330 having a bottom edge 2332 defining a pair of symmetric downwardly-facing teeth 2334, each of which has a pair of inclined tooth surfaces 2336 which meet at a point 2338.

Generally planar annular wall 2302 is preferably formed with a snap 2339 operative to house an rpm sensor (not shown). As seen particularly clearly in FIG. 32E, there is provided a ventilating element surround skirt 2340 which is supported on radial reinforcement ribs 2306. Skirt 2340 defines a continuous downward extension of generally planar annular wall 2302.

Reference is now made to FIGS. 33A-33E, which are simplified illustrations of linear to rotary converting adaptor 1912, forming part of axially displaceable rotary drive assembly 1530 of FIGS. 25A-25E.

As seen in FIGS. 33A-33E, linear to rotary converting adaptor 1912, which is operative to house spring 1914 of axially displaceable rotary drive assembly 1530, includes an outer cylindrical wall 2350 and an inner cylindrical ring 2352 having a radially inwardly-facing surface 2353. Extending radially-inwardly from outer cylindrical wall 2350 at a lower end 2354 thereof, is an annular flange 2356 with a radially inwardly-facing wall portion 2358.

Extending downwardly from radially inwardly-facing surface 2353 of inner cylindrical ring 2352 are a plurality, preferably two, of vertically-extending interior ribs 2360, preferably with dimensions appropriate to be housed in vertical elongate side slots 2318 of motor lifting element 1910 (FIGS. 32A-32E). A lower end 2362 of each of interior ribs 2360 is formed with an inclined downwardly-facing end surface 2364. It is noted that lower ends 2362 of vertically-extending interior ribs 2360 are integrally formed with radially inwardly-facing wall portion 2358 of annular flange 2356 of outer cylindrical wall 2350. It is further noted that vertically-extending interior ribs 2360 terminate below outer cylindrical wall 2350.

Reference is now made to FIGS. 34A-34H, which are simplified illustrations of linearly driven rotating ventilating element 1916, forming part of axially displaceable rotary drive assembly 1530 of FIGS. 25A-25E.

As seen in FIGS. 34A-34H, linearly driven rotating ventilating element 1916 preferably includes an outer cylindrical wall 2400 to which are connected integrally formed outer edges 2401 of a plurality of circumferentially distributed generally radially-extending vanes 2402. Each of vanes 2402 is formed with a bottom surface 2403. Preferably, there are provided a pair of recesses 2404 interior of outer cylindrical wall 2400 for retaining magnets (not shown) which may serve for sensing the rotational velocity of linearly driven rotating ventilating element 1916.

Each of a plurality of inner edges 2405 of vanes 2402 are joined to an inner cylindrical wall 2406, which terminates at a downwardly-facing edge thereof in a planar, generally circular wall 2408 having formed at a center thereof a socket 2410, which is configured to lockably receive bottom end 2220 of drive shaft 2202 (FIGS. 30A & 30B).

Surrounding socket 2410 is an inner circular cylindrical wall 2420 defining an outer cylindrical wall surface 2422. Extending outwardly from cylindrical wall surface 2422 are a pair of protrusions 2424, each of which has an inclined upwardly-facing surface 2426, presenting a progressively higher surface portion from a leading edge 2428 to a trailing edge 2430 thereof. Protrusions 2424 are operative to engage with downwardly-facing end surfaces 2364 of interior ribs 2360 of linear to rotary converting adaptor 1912, as is described hereinbelow with reference to FIGS. 37A-37G.

Interiorly of cylindrical wall surface 2422 is a circumferential wall 2440 having a top edge 2442 defining a pair of symmetric upwardly-facing teeth 2444, each of which has a pair of inclined tooth surfaces 2446 which meet at a point 2448. Teeth 2444 are operative to interact with teeth 2334 of motor lifting element 1910.

Figure 18A:
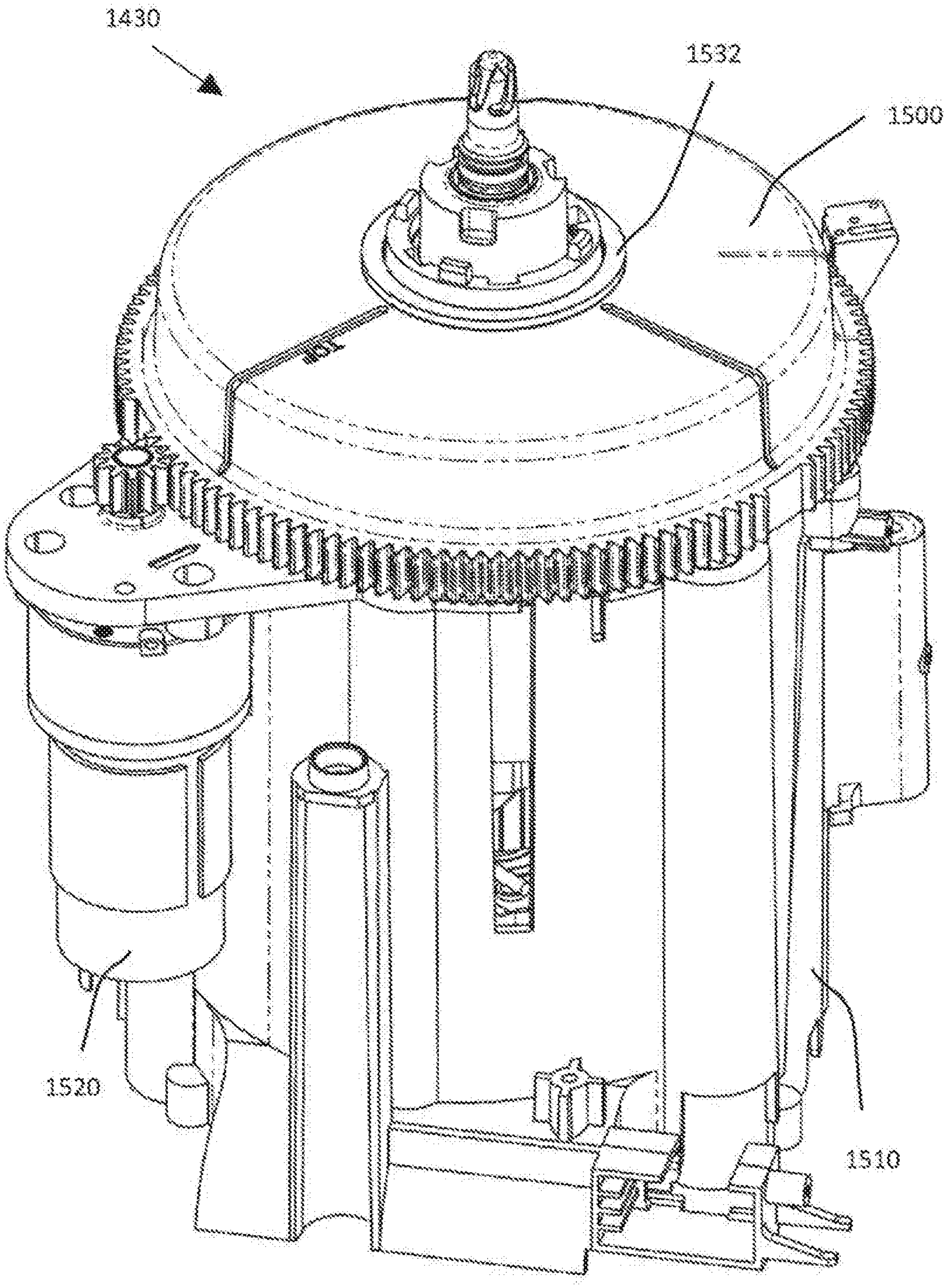
FIGS. 18A, 18B, 18C, 18D, 18E and 18F are simplified respective pictorial, planar side, first planar top, second planar top, planar bottom and exploded view illustrations of a vertically displacing rotary drive motor assembly, forming part of the base assembly of FIGS. 15A-17C.
Figure 18B:
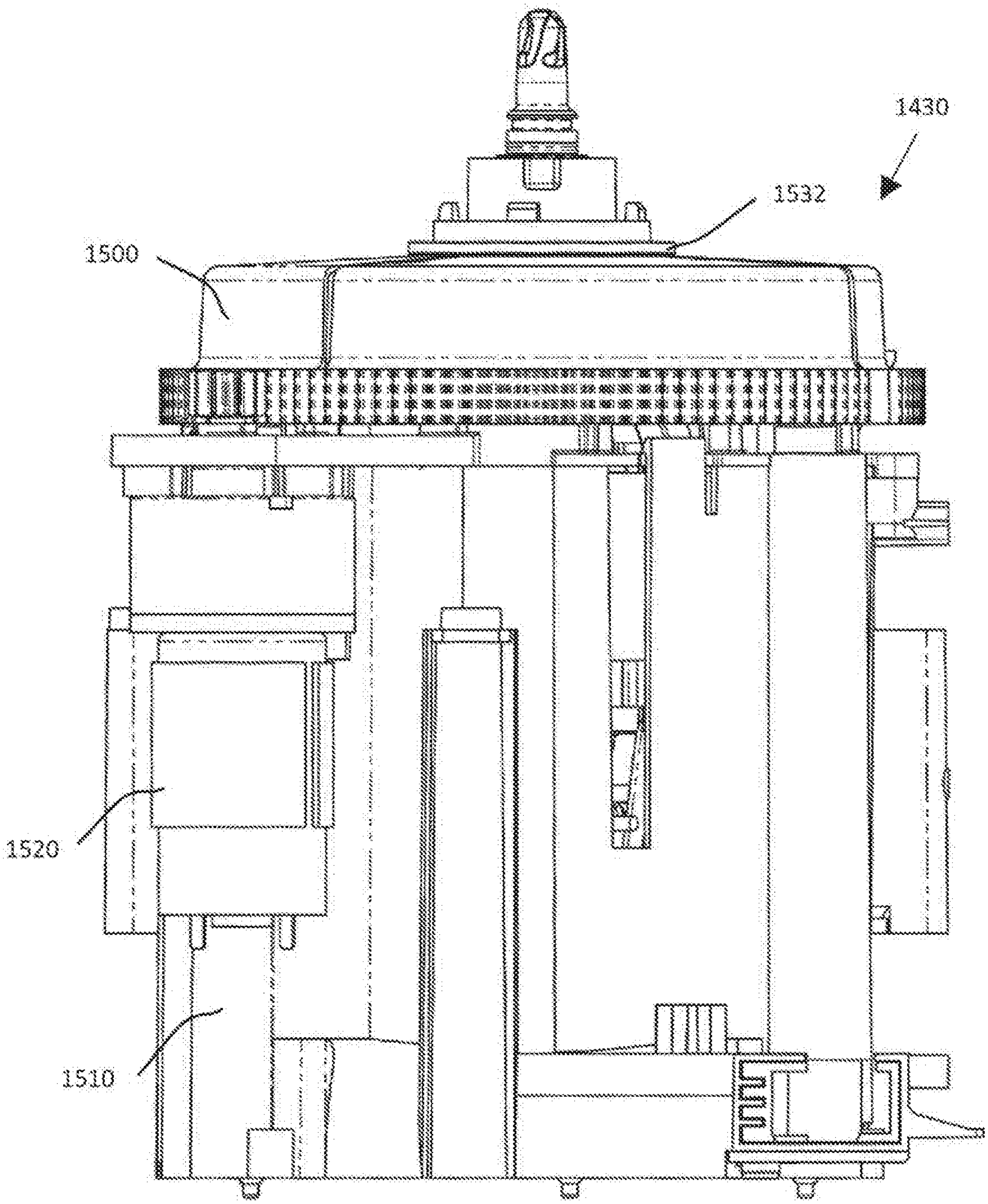
Figure 18C:
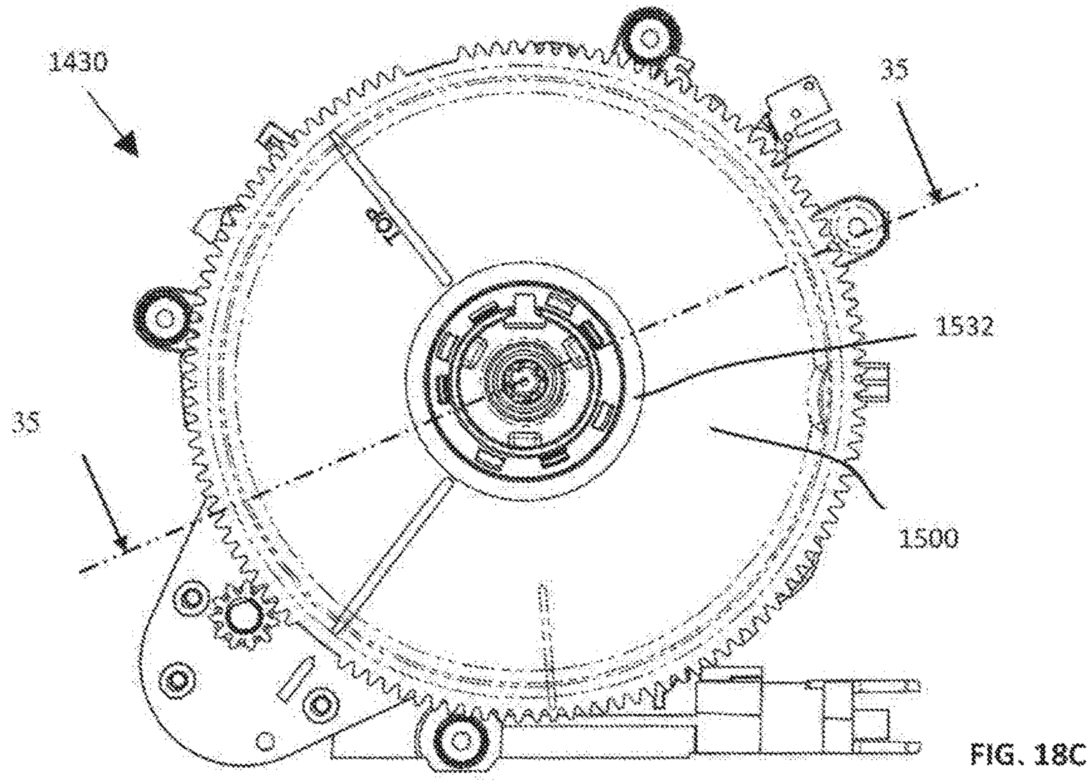
Figure 18D:
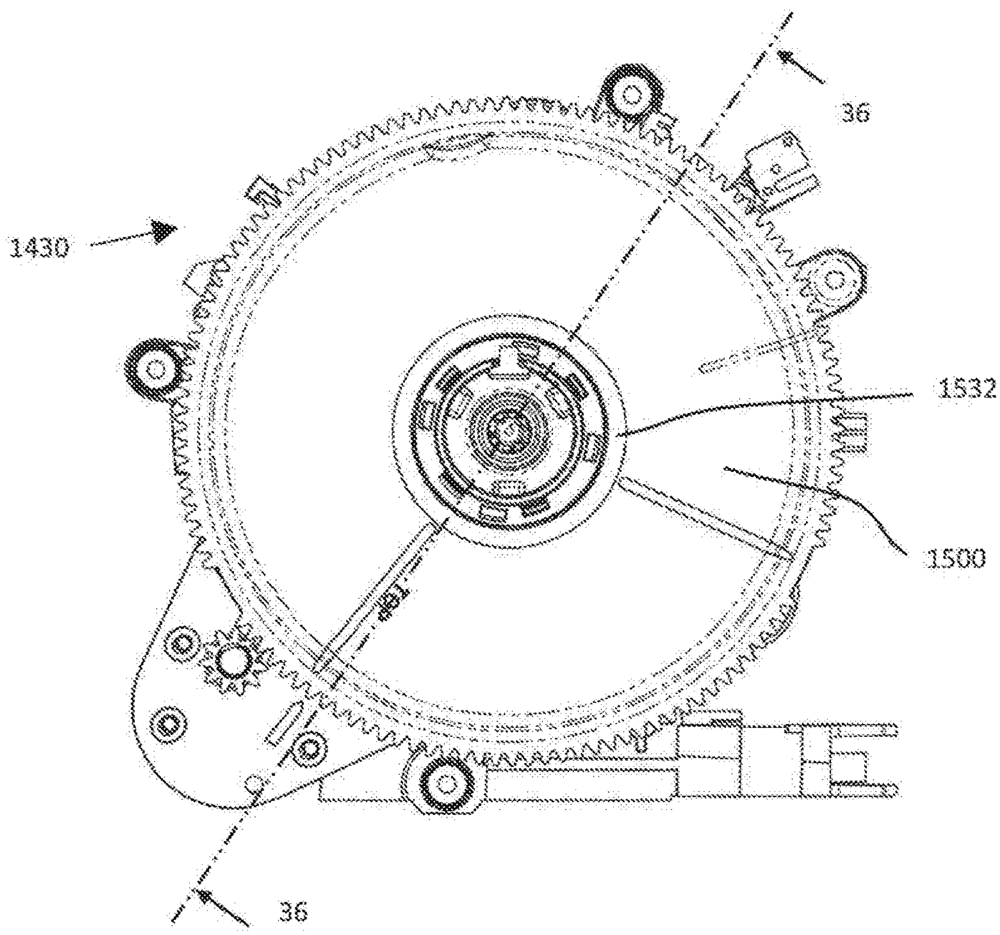
Figure 18E:
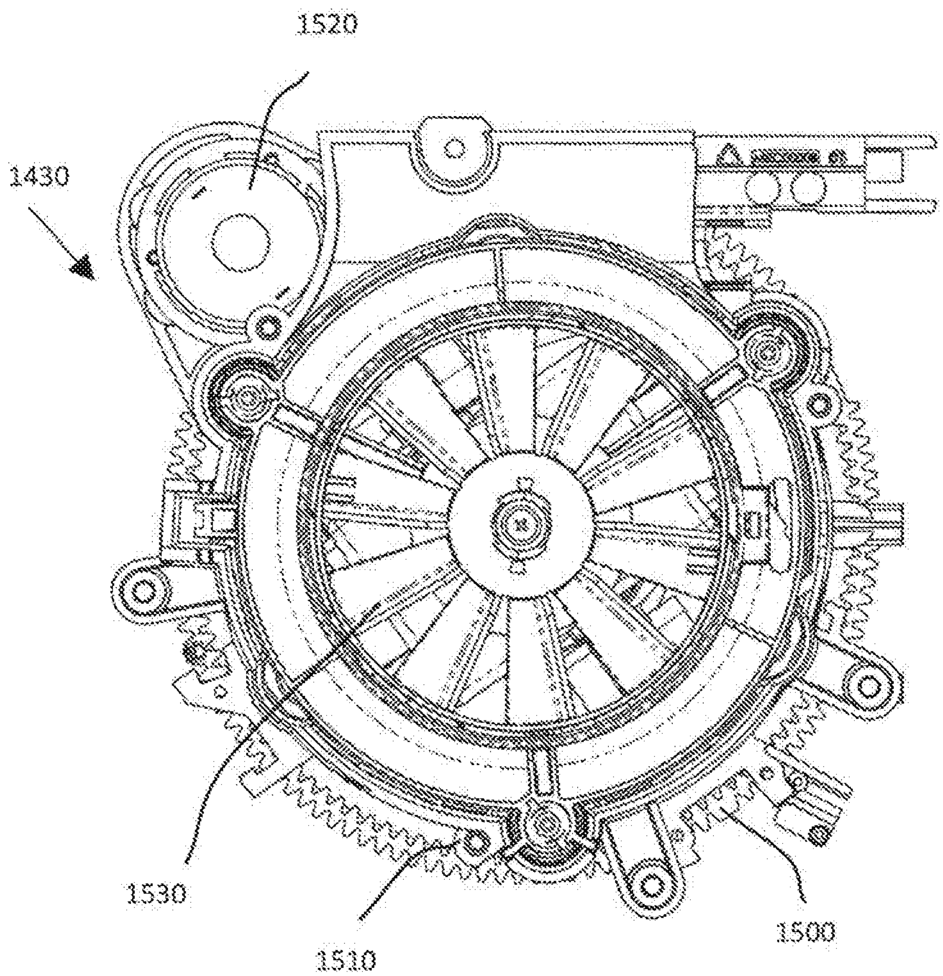
Figure 18F:
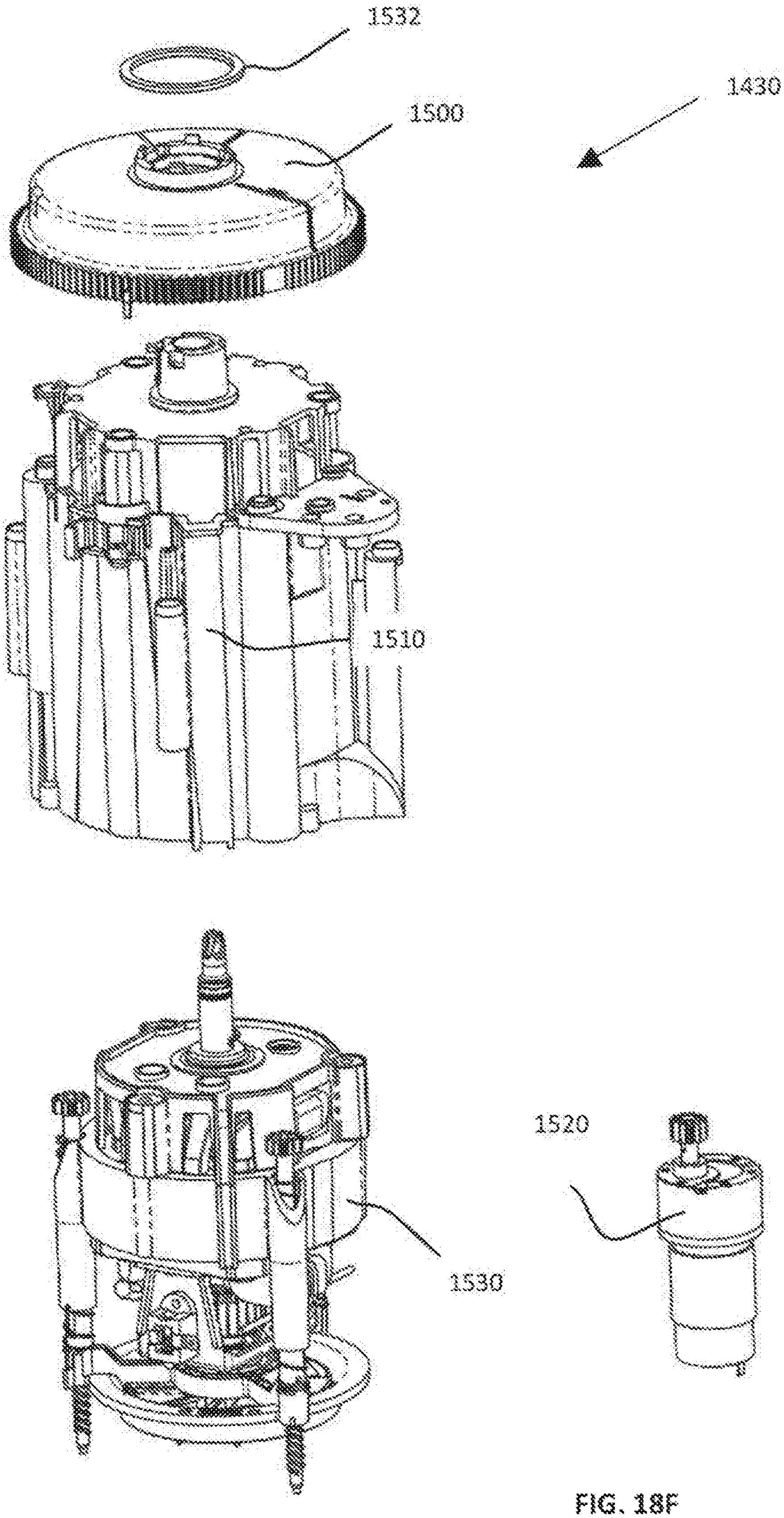
Figure 35:
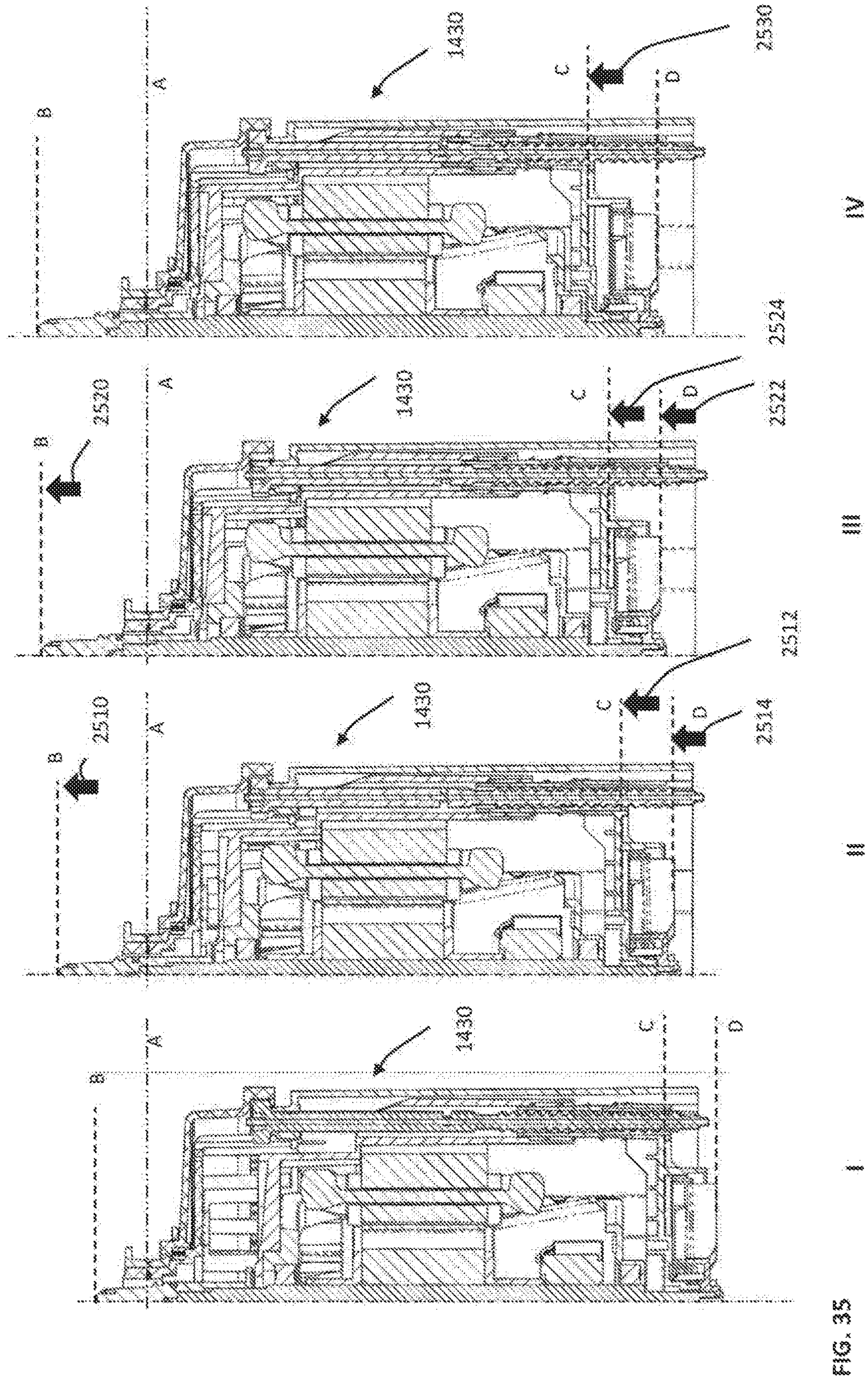
FIG. 35 is a simplified composite sectional illustration, taken along a section line 35-35 in FIG. 18C, illustrating various operative orientations in the operation of the vertically displacing rotary drive motor assembly of FIGS. 18A-34H.

Reference is now made to FIG. 35, which is a simplified composite sectional illustration taken along section line 35-35 in FIG. 18C illustrating various operative orientations in the operation of vertically displacing rotary drive motor assembly 1430 of FIGS. 18A-18F, and to FIGS. 36A, 36B, 36C and 36D, which are sectional illustrations taken along section line 36-36 in FIG. 18D, showing vertically displacing rotary drive motor assembly 1430 in the various operative orientations represented in FIG. 35. It is appreciated that the various vertical displacements described hereinbelow are produced by the operation of spindles 1906 driven by auxiliary rotary drive motor 1520 via rotary drive gear 1500.

Figure 36A:
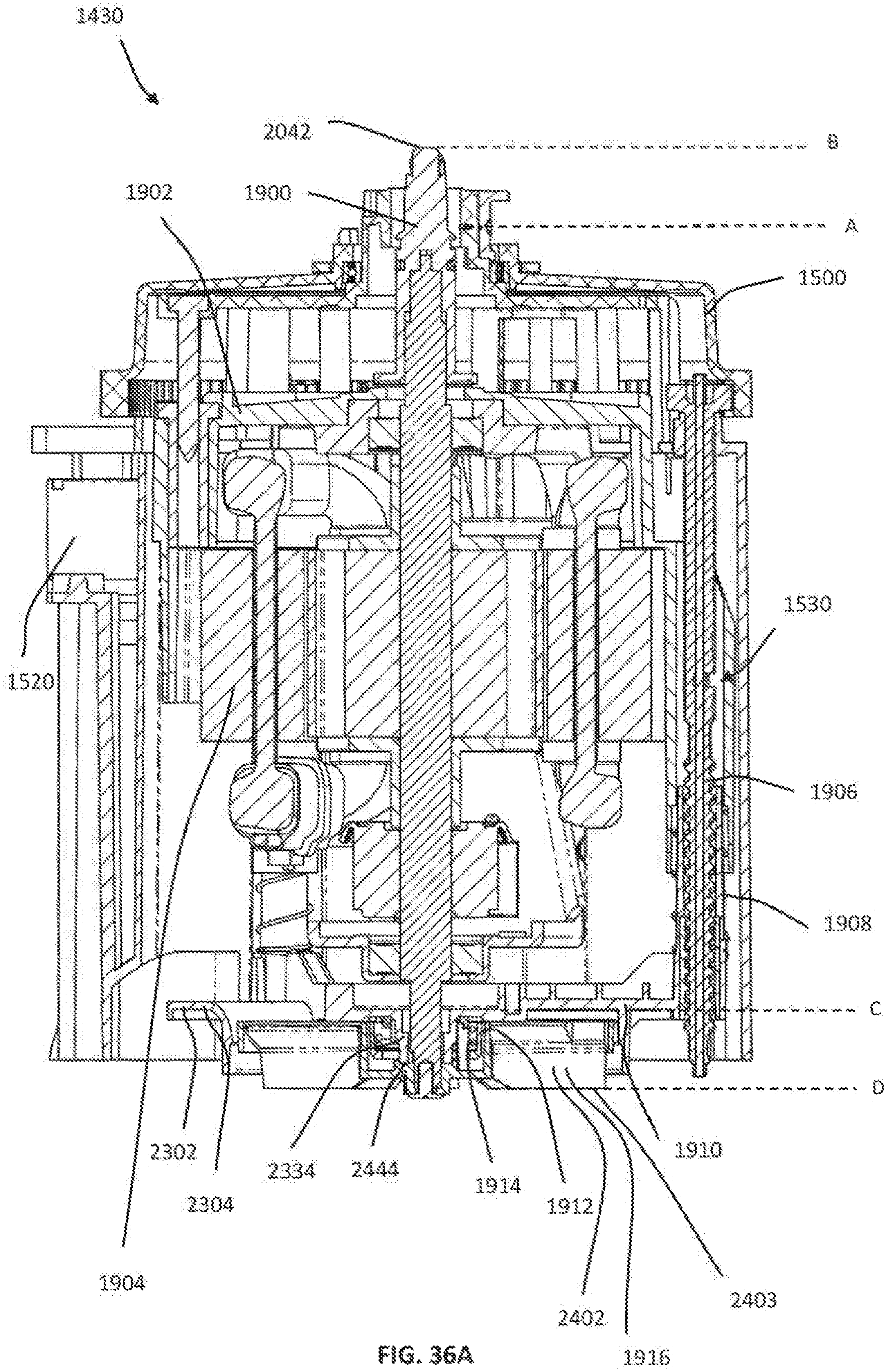
FIGS. 36A, 36B, 36C and 36D are sectional illustrations, taken along section line 36-36 in FIG. 18D, showing the vertically displacing rotary drive motor assembly in the four operative orientations represented in FIG. 35.

In the leftmost portion of FIG. 35, designated as I, and shown in detail in FIG. 36A, vertically displacing rotary drive motor assembly 1430 of FIGS. 18A-18F is in its rest position. In said rest position, axially displaceable rotary drive assembly 1530 is in its lowest vertical position, such that motor lifting element 1910 is at its lowest vertical position, such that teeth 2334 of the motor lifting element 1910 operatively engage corresponding teeth 2444 of linearly driven rotating ventilating element 1916 such that inclined surfaces 2336 of teeth 2334 slidingly engage corresponding inclined surfaces 2446 of teeth 2444.

It is seen that linear to rotary converting adaptor 1912 is in its highest vertical position, relative to motor lifting element 1910, against the urging of spring 1914.

For purposes of reference, top surface 1453 of generally cylindrical top portion 1452 of base housing 1400 (FIGS. 16A-16E) is indicated to lie in a plane designated A. Top surface 2042 of drive shaft assembly 1900 is indicated to lie in a plane designated B, parallel to plane A. Bottom surface 2304 of generally planar annular wall 2302 of motor lifting element 1910 is indicated to lie in a plane designated C, parallel to planes A and B. Bottom surfaces 2403 of each of vanes 2402 of linearly driven rotating ventilating element 1916 are indicated to lie in a plane designated D, parallel to planes A, B and C.

Figure 36B:
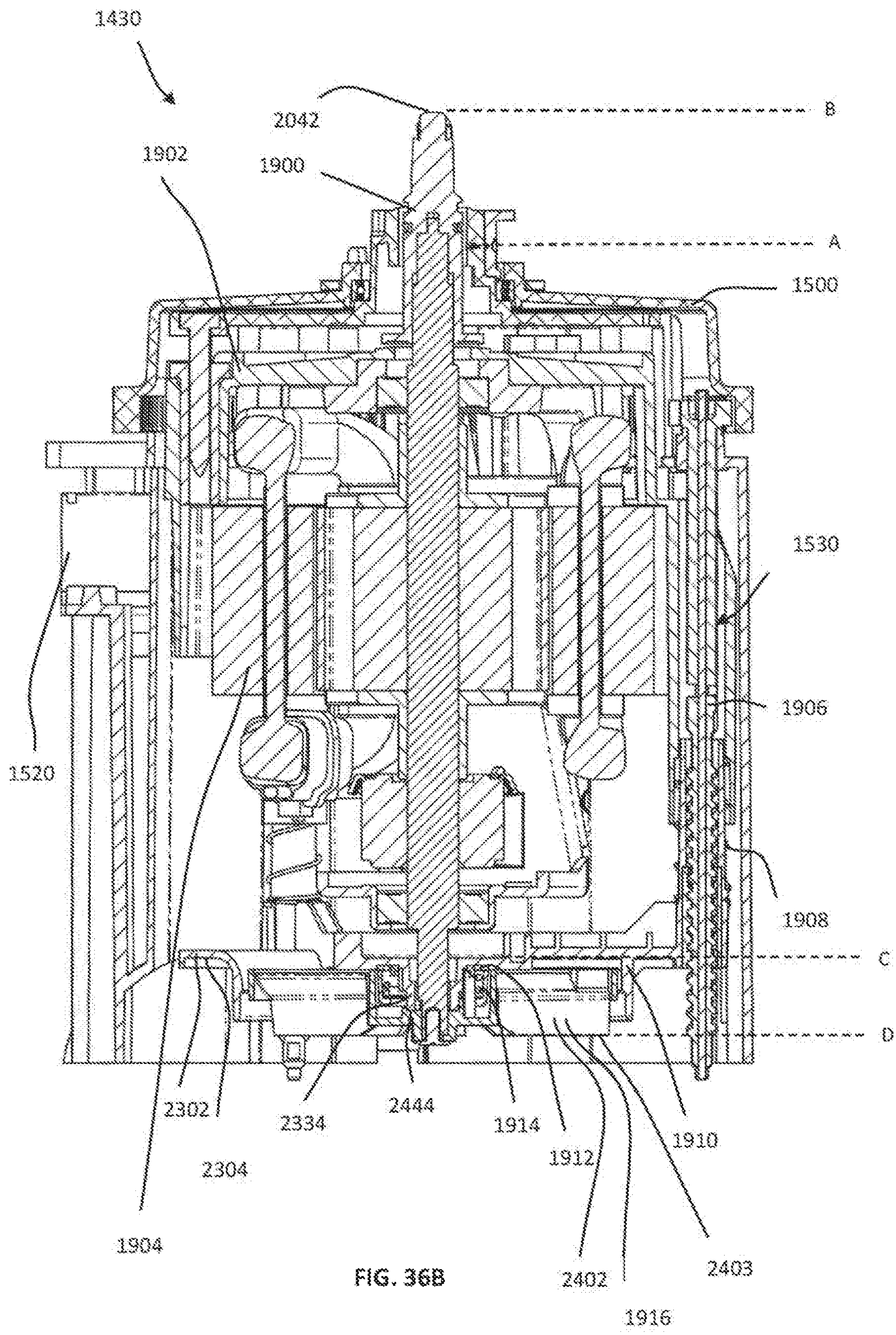

In the next to leftmost portion of FIG. 35, designated as II, and shown in detail in FIG. 36B, vertically displacing rotary drive motor assembly 1430 of FIGS. 18A-18F is in a lower intermediate position. In said lower intermediate position, axially displaceable rotary drive assembly 1530 is in a relatively low but not lowest vertical position, such that motor lifting element 1910 is raised from its lowest vertical position by operation of spindles 1906, while teeth 2334 of the motor lifting element 1910 still operatively engage corresponding teeth 2444 of linearly driven rotating ventilating element 1916 such that inclined surfaces 2336 of teeth 2334 slidingly engage corresponding inclined surfaces 2446 of teeth 2444.

It is seen that linear to rotary converting adaptor 1912 remains in its highest vertical position, relative to motor lifting element 1910, against the urging of spring 1914.

It is appreciated that raising of motor lifting element 1910 provides corresponding raising of motor support bracket assembly 1902 under the urging of coil springs 1908. Inasmuch as electric motor 1904 is fixedly attached to motor support bracket assembly 1902, electric motor 1904 is correspondingly raised such that top surface 2042 of drive shaft assembly 1900, and thus plane B, is raised relative to plane A as indicated by an arrow 2510. It is appreciated that bottom surface 2304 of generally planar annular wall 2302 of motor lifting element 1910, plane C, and bottom surfaces 2403 of each of vanes 2402 of linearly driven rotating ventilating element 1916, plane D, am also raised relative to plane A as indicated by arrows 2512 and 2514, respectively, to a vertical extent generally identical to the raising of plane B relative to plane A.

Figure 36C:
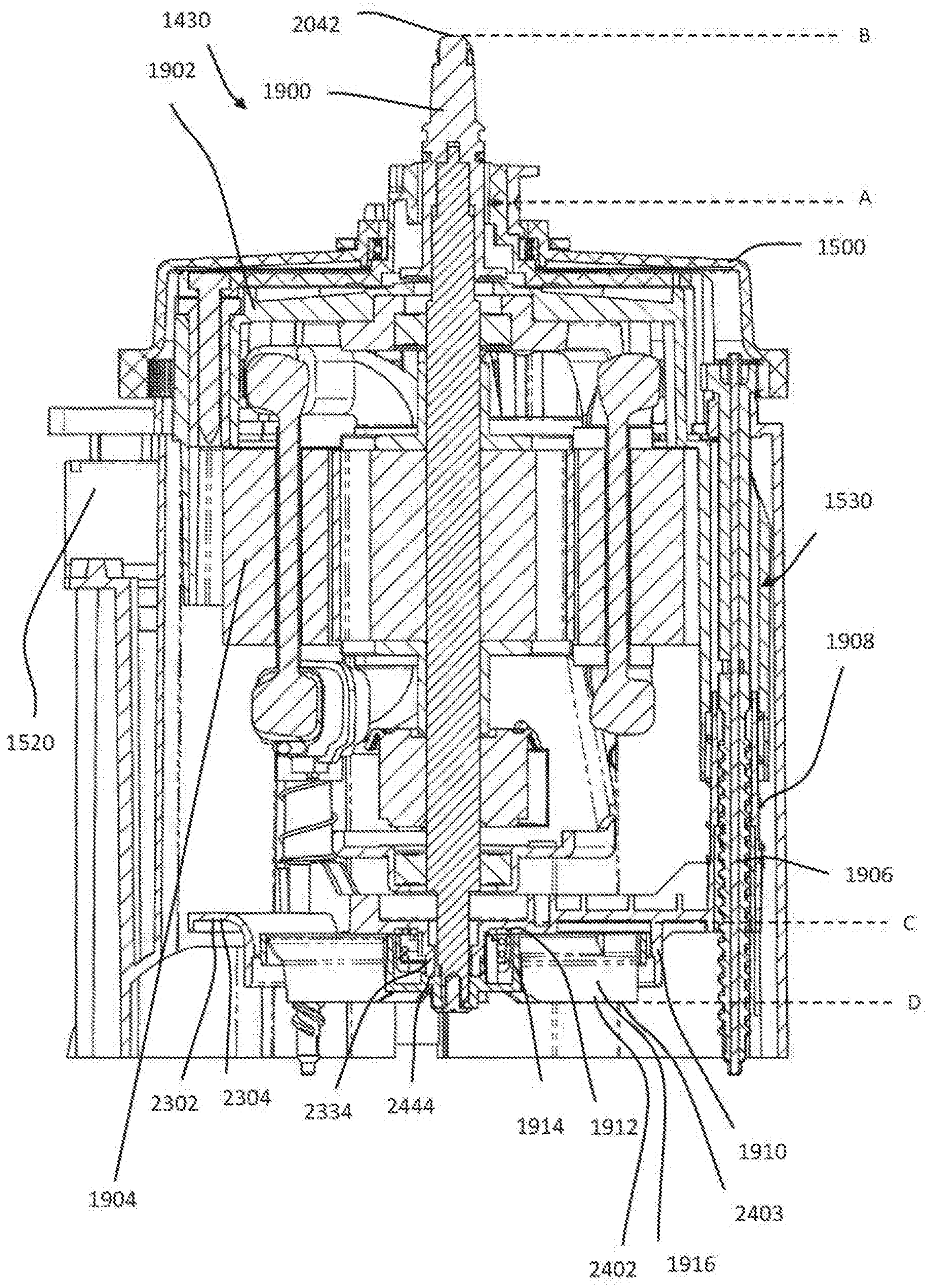

In the next to rightmost portion of FIG. 35, designated as III, and shown in detail in FIG. 36C, vertically displacing rotary drive motor assembly 1430 of FIGS. 18A-18F is in an upper intermediate position. In said upper intermediate position, motor support bracket assembly 1902 is at its highest position. Motor lifting element 1910 of axially displaceable rotary drive assembly 1530 is in a relatively high but not highest vertical position.

It is seen that linear to rotary converting adaptor 1912 remains in its highest vertical position, relative to motor lifting element 1910, against the urging of spring 1914.

It is appreciated that raising of motor lifting element 1910 provides corresponding raising of motor support bracket assembly 1902 under the urging of coil springs 1908. Inasmuch as electric motor 1904 is fixedly attached to motor support bracket assembly 1902, electric motor 1904 is correspondingly raised such that top surface 2042 of drive shaft assembly 1900, plane B, is raised to its highest position relative to plane A, as indicated by an arrow 2520. Accordingly, linearly driven rotating ventilating element 1916 is in its highest position, while teeth 2334 of the motor lifting element 1910 still operatively engage corresponding teeth 2444 of linearly driven rotating ventilating element 1916 such that inclined surfaces 2336 of teeth 2334 slidingly engage corresponding inclined surfaces 2446 of teeth 2444.

It is appreciated that in the operative orientation shown at III, planes B, C and D have been raised further upwardly relative to plane A and relative to their positions indicated at II. Specifically, top surface 2042 of drive shaft assembly 1900, plane B, is at its maximum vertical position relative to plane A and bottom surfaces 2403 of each of vanes 2402 of linearly driven rotating ventilating element 1916, plane D, is also at its maximum vertical position relative to plane A as indicated by an arrow 2522. Plane C is upwardly shifted relative to plane A, as indicated by an arrow 2524, but is not at its maximum vertical position relative to plane A.

Figure 36D:
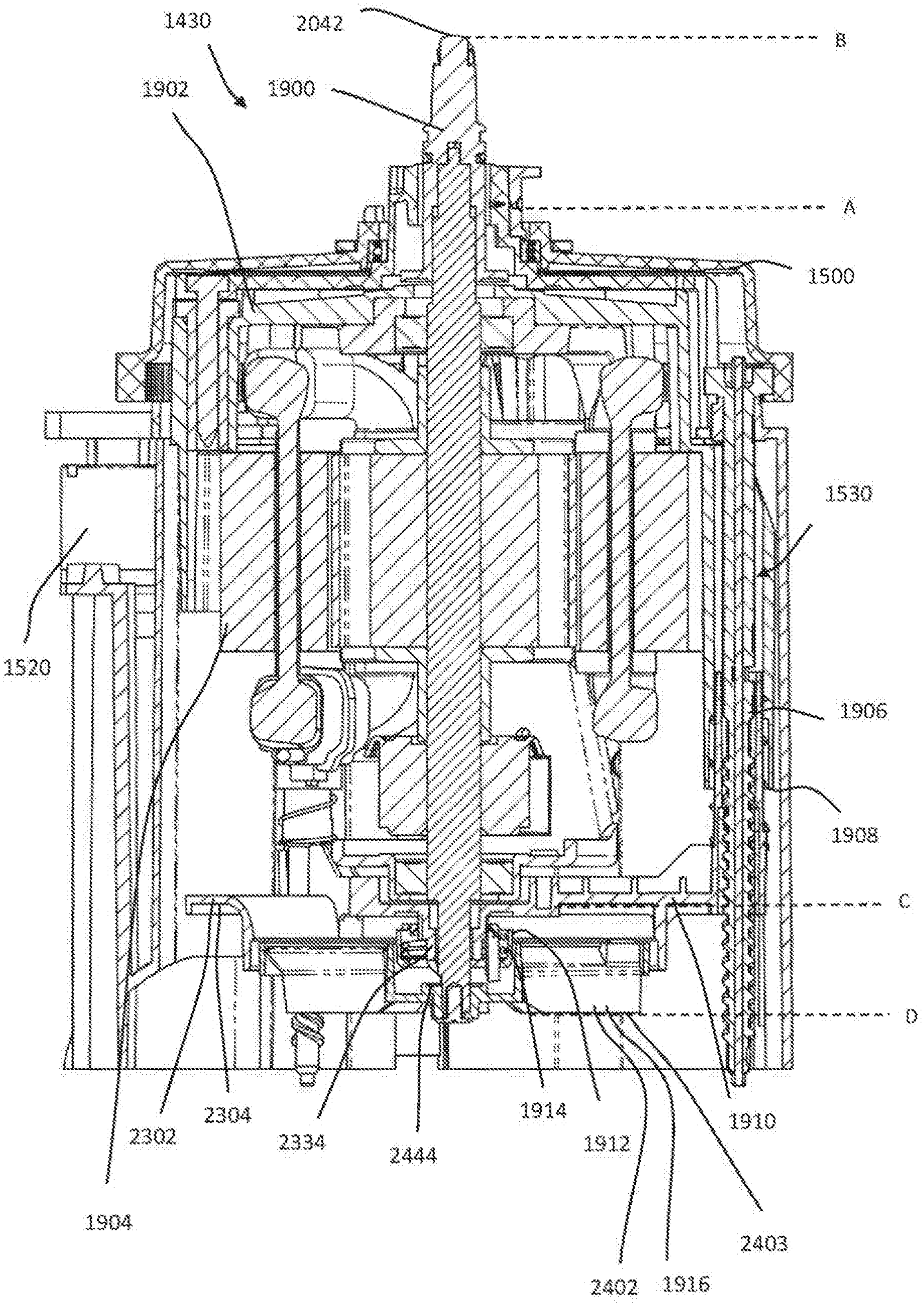

In the right most portion of FIG. 35, designated as IV, and shown in detail in FIG. 36D, vertically displacing rotary drive motor assembly 1430 of FIGS. 18A-18F is in its highest vertical position. In said highest vertical position, motor support bracket assembly 1902 remains at its highest position. Motor lifting element 1910 of axially displaceable rotary drive assembly 1530 is raised to its highest vertical position.

It is seen that linear to rotary converting adaptor 1912 is lowered relative to motor lifting element 1910, under the urging of spring 1914.

Top surface 2042 of drive shaft assembly 1900, plane B, remains at its highest position relative to plane A. Linearly driven rotating ventilating element 1916 remains in its highest position, however, the raising of the motor lifting element 1910 relative thereto causes disengagement of teeth 2334 of motor lifting element 1910 from corresponding teeth 2444 of linearly driven rotating ventilating element 1916, allowing rotation of linearly driven rotating ventilating element 1916 relative to motor lifting element 1910.

It is appreciated that in the operative orientation shown at portion IV of FIG. 35, plane C has been raised further upwardly relative to plane A, as indicated by an arrow 2530, and relative to its position indicated at III. Specifically, bottom surface 2304 of generally planar annular wall 2302 of motor lifting element 1910 in plane C is upwardly shifted relative to plane A, as indicated by arrow 2530, to its maximum vertical position relative to plane A.

Reference is now made to FIGS. 37A-37G, which are partial sectional illustrations showing part of vertically displacing rotary drive motor assembly 1430, seen in FIGS. 35-36D, in seven operative orientations which occur as vertically displacing rotary drive motor assembly 1430 shifts from operative orientation IV of FIGS. 35 and 36D back to operative orientation III of FIGS. 35 and 36C.

Figure 37A:
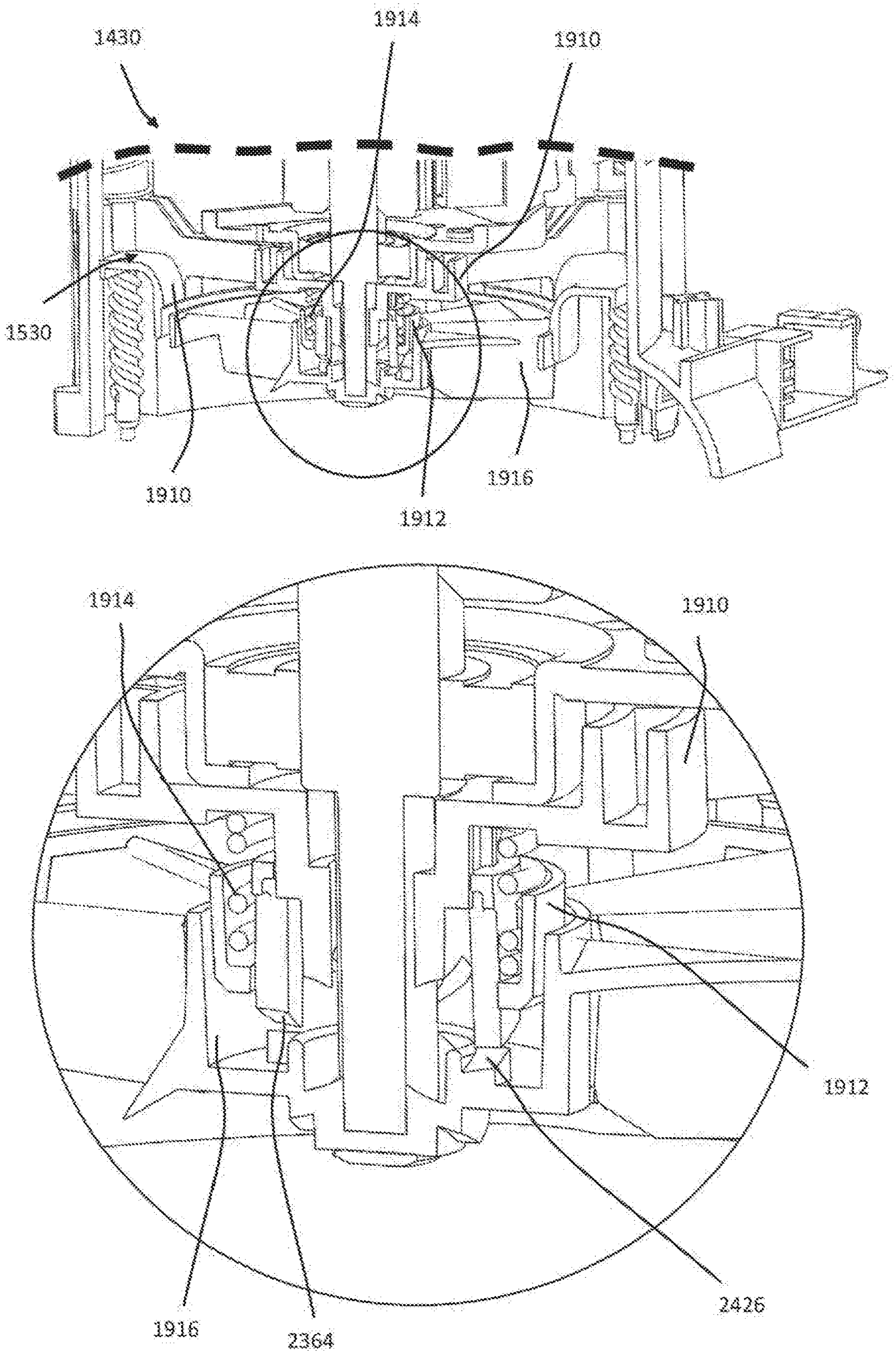
FIGS. 37A, 37B, 37C, 37D, 37E, 37F and 37G are sectional illustrations showing part of the vertically displacing rotary drive motor assembly of FIGS. 35-36D in seven operative orientations.

FIG. 37A shows a first operative orientation of axially displaceable rotary drive assembly 1530, at a stage corresponding to the operative orientation of FIG. 36D, in which the relative rotational orientations of linear to rotary converting adaptor 1912 and linearly driven rotating ventilating element 1916 are such that inclined downwardly-facing end surfaces 2364 of linear to rotary converting adaptor 1912 nearly engage corresponding inclined upwardly-facing surfaces 2426 of linearly driven rotating ventilating element 1916.

Figure 37B:
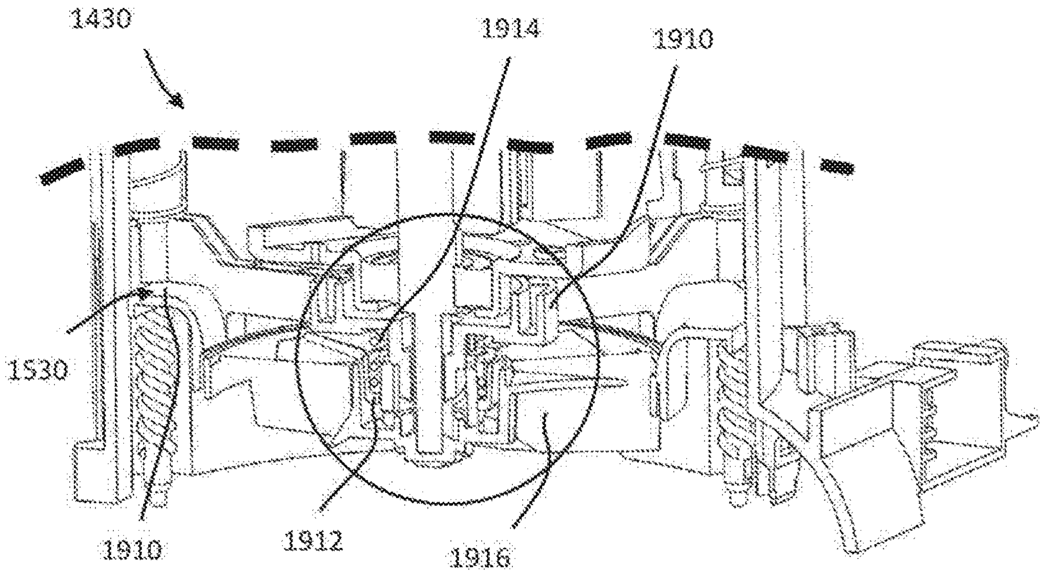
Figure 37B:
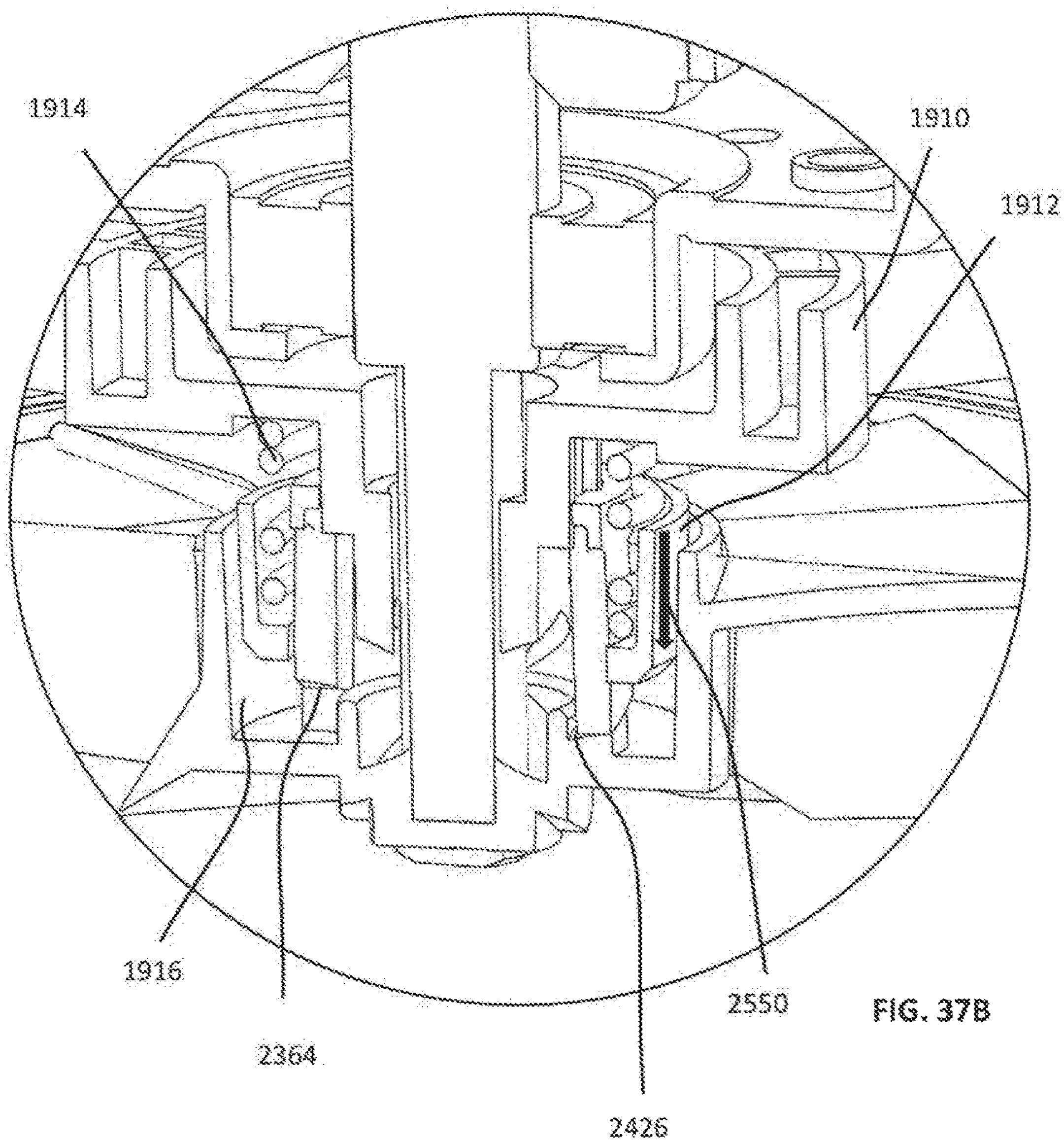

FIG. 37B shows a second operative orientation of axially displaceable rotary drive assembly 1530 in which motor lifting element 1910 and linear to rotary converting adaptor 1912 are shifted downwardly, relative to linearly driven rotating ventilating element 1916, in the direction indicated by an arrow 2550, and in which the relative rotational orientations of linear to rotary converting adaptor 1912 and linearly driven rotating ventilating element 1916 are such that inclined downwardly-facing end surfaces 2364 of linear to rotary converting adaptor 1912 engage corresponding inclined upwardly-facing surfaces 2426 of linearly driven rotating ventilating element 1916.

Figure 37C:
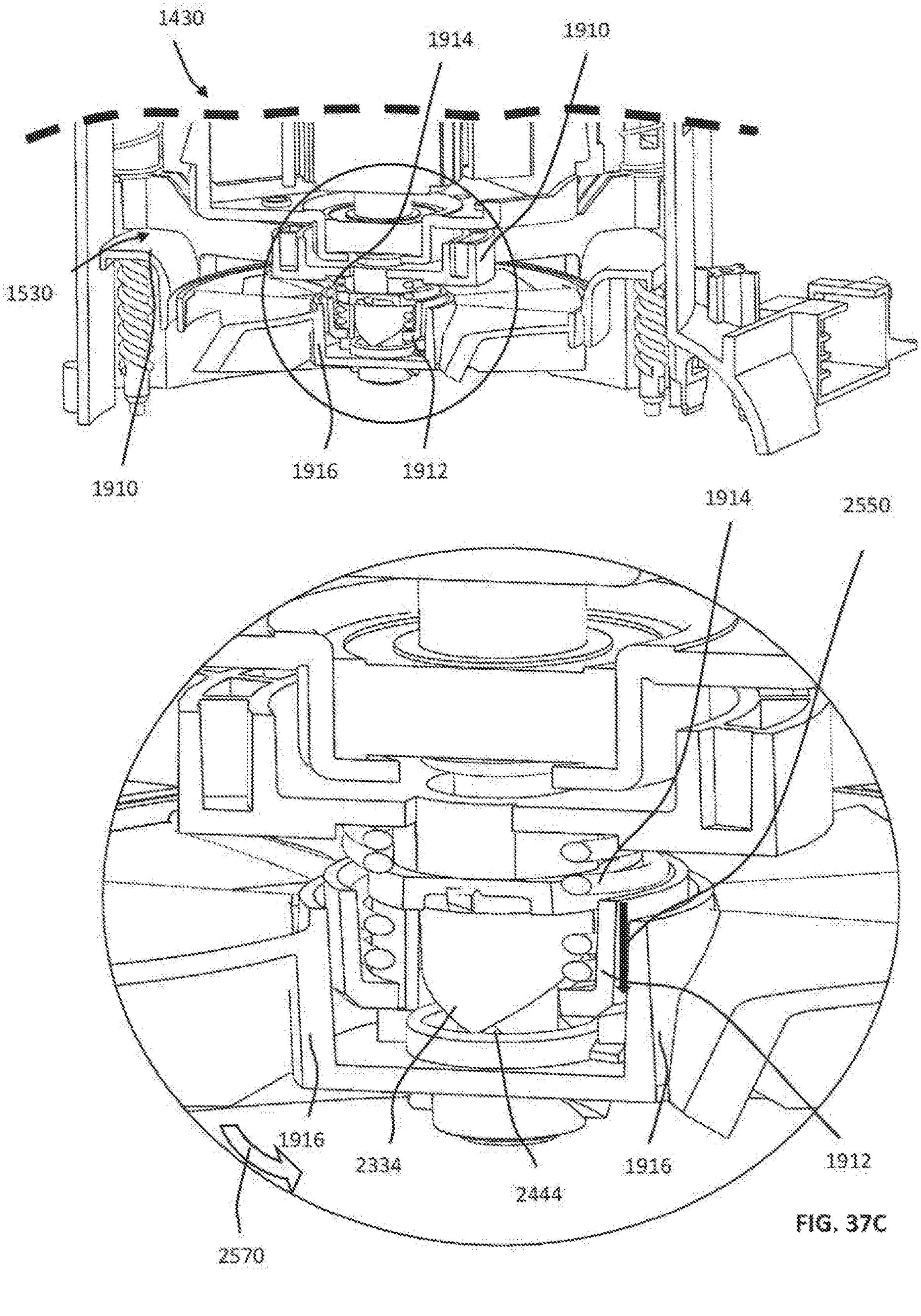

FIG. 37C shows a third operative orientation of axially displaceable rotary drive assembly 1530 in which motor lifting element 1910 and linear to rotary converting adaptor 1912 are shifted further downwardly, relative to linearly driven rotating ventilating element 1916, in the direction indicated by arrow 2550. It is noted that said further downward motion of linear to rotary converting adaptor 1912 results in rotation of linearly driven rotating ventilating element 1916 in the direction indicated by an arrow 2570, so as to rotatably reposition teeth 2444 of linearly driven rotating ventilating element 1916, so that they are about to engage corresponding teeth 2334 of motor lifting element 1910.

Figure 37D:
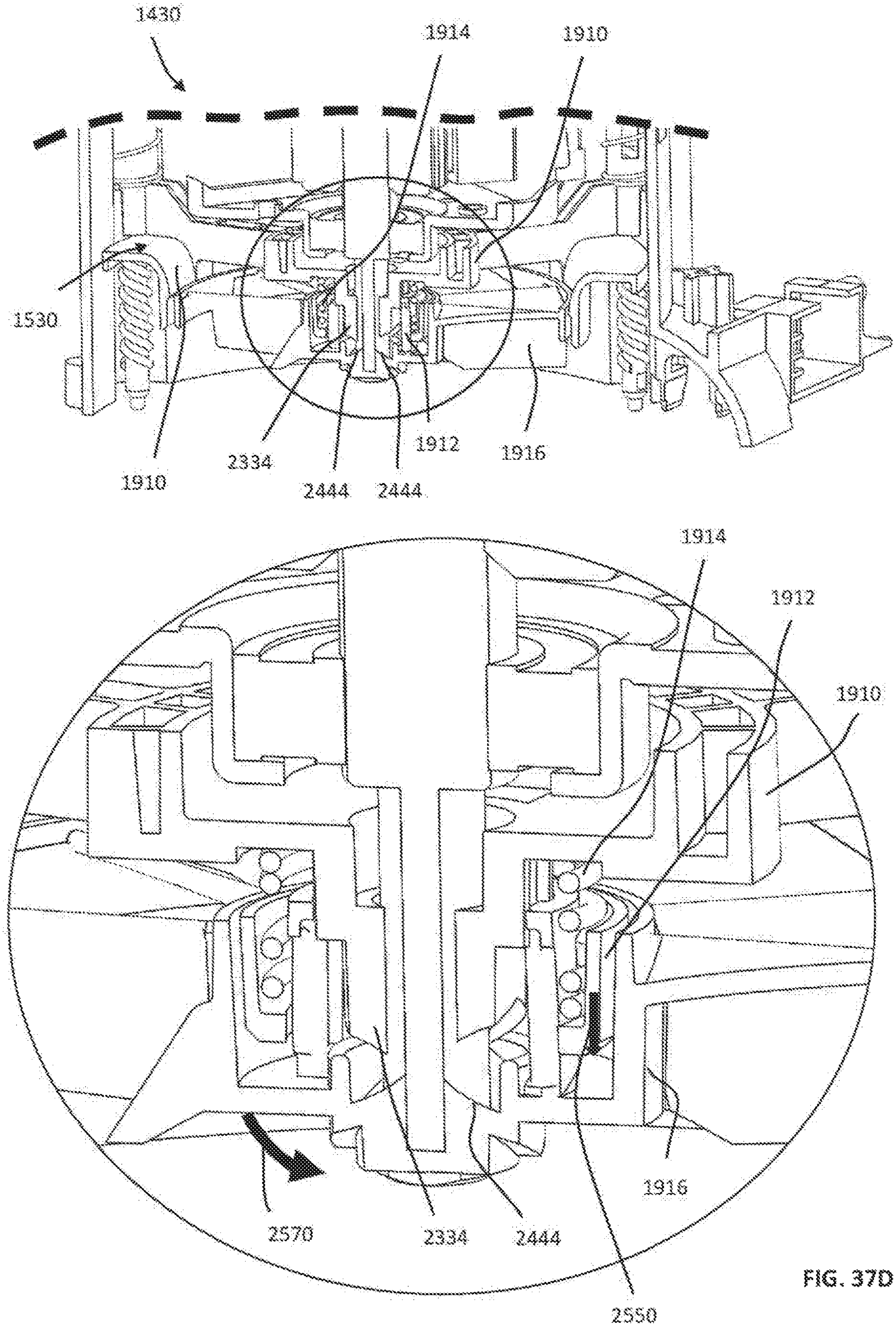

FIG. 37D shows a fourth operative orientation of axially displaceable rotary drive assembly 1530 in which motor lifting element 1910 and linear to rotary converting adaptor 1912 are shifted still further downwardly, relative to linearly driven rotating ventilating element 1916, in the direction indicated by arrow 2550. It is noted that said still further downward motion of linear to rotary converting adaptor 1912 results in further rotation of linearly driven rotating ventilating element 1916 in the direction indicated by arrow 2570.

Figure 37E:
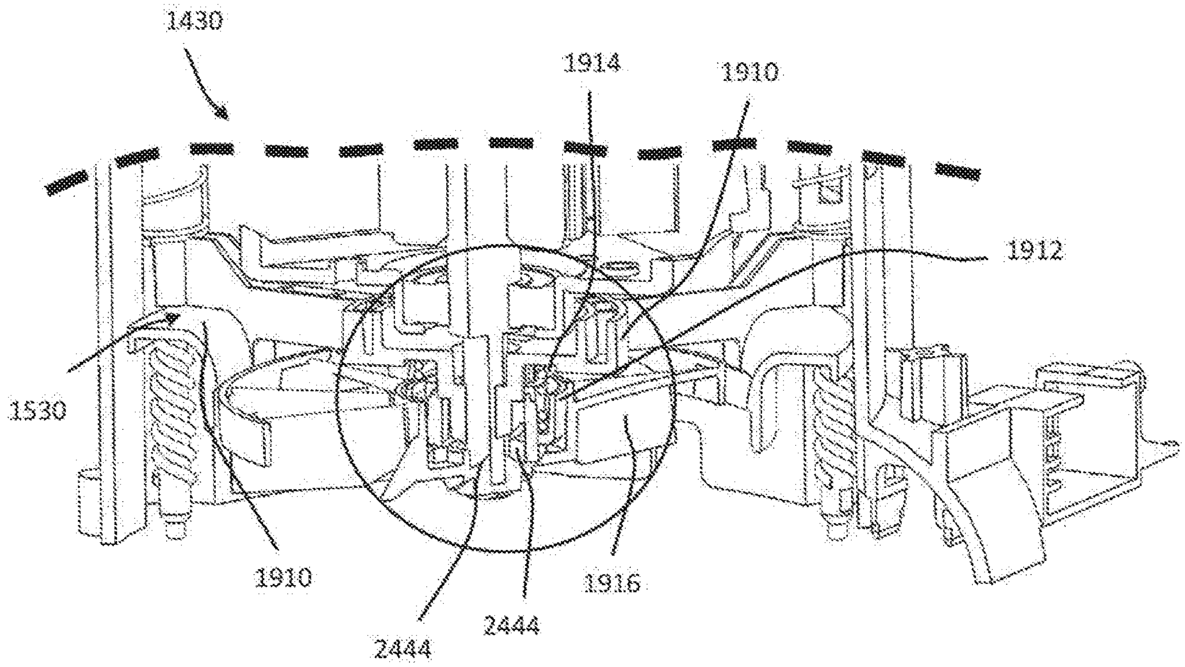
Figure 37E:
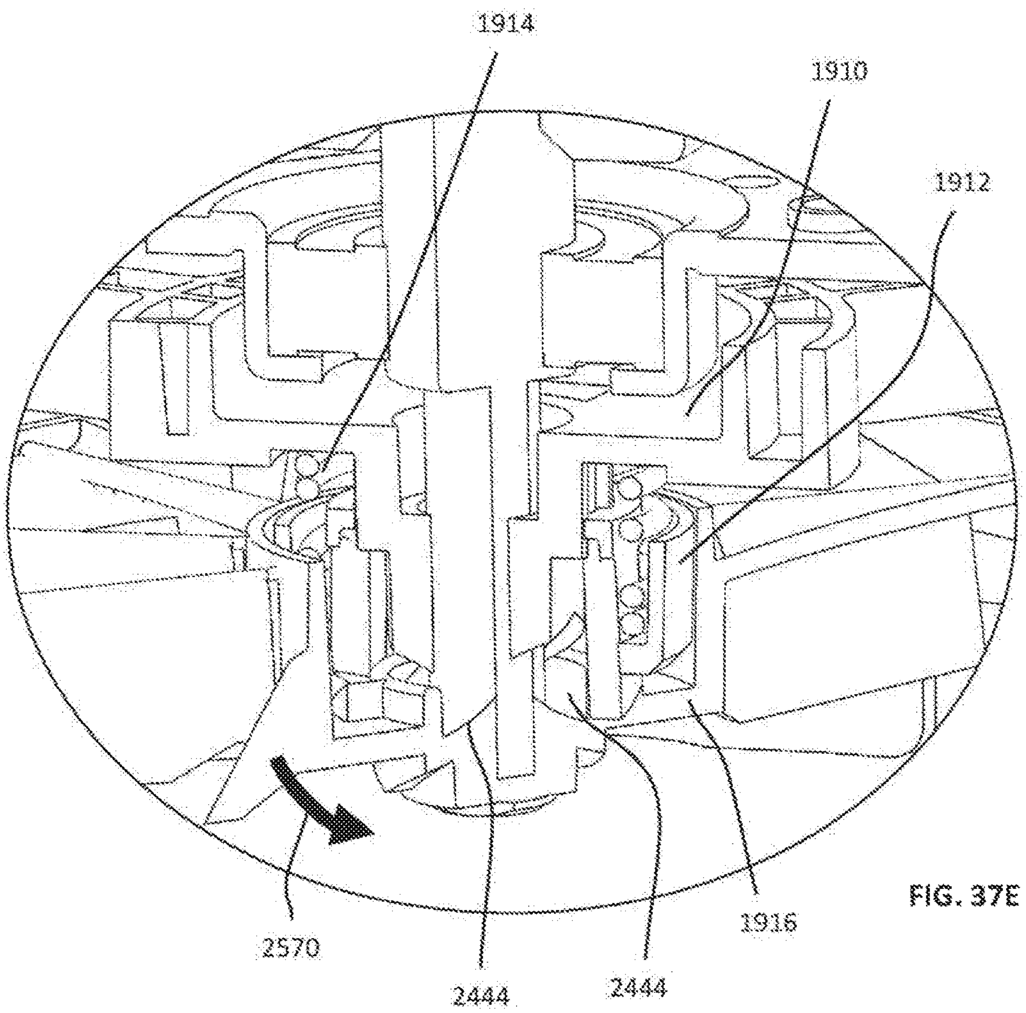

FIG. 37E shows a fifth operative orientation of axially displaceable rotary drive assembly 1530 in which the interference between surfaces 2364 and 2426 produce further rotation of linearly driven rotating ventilating element 1916 in the direction indicated by arrow 2570.

Figure 37F:
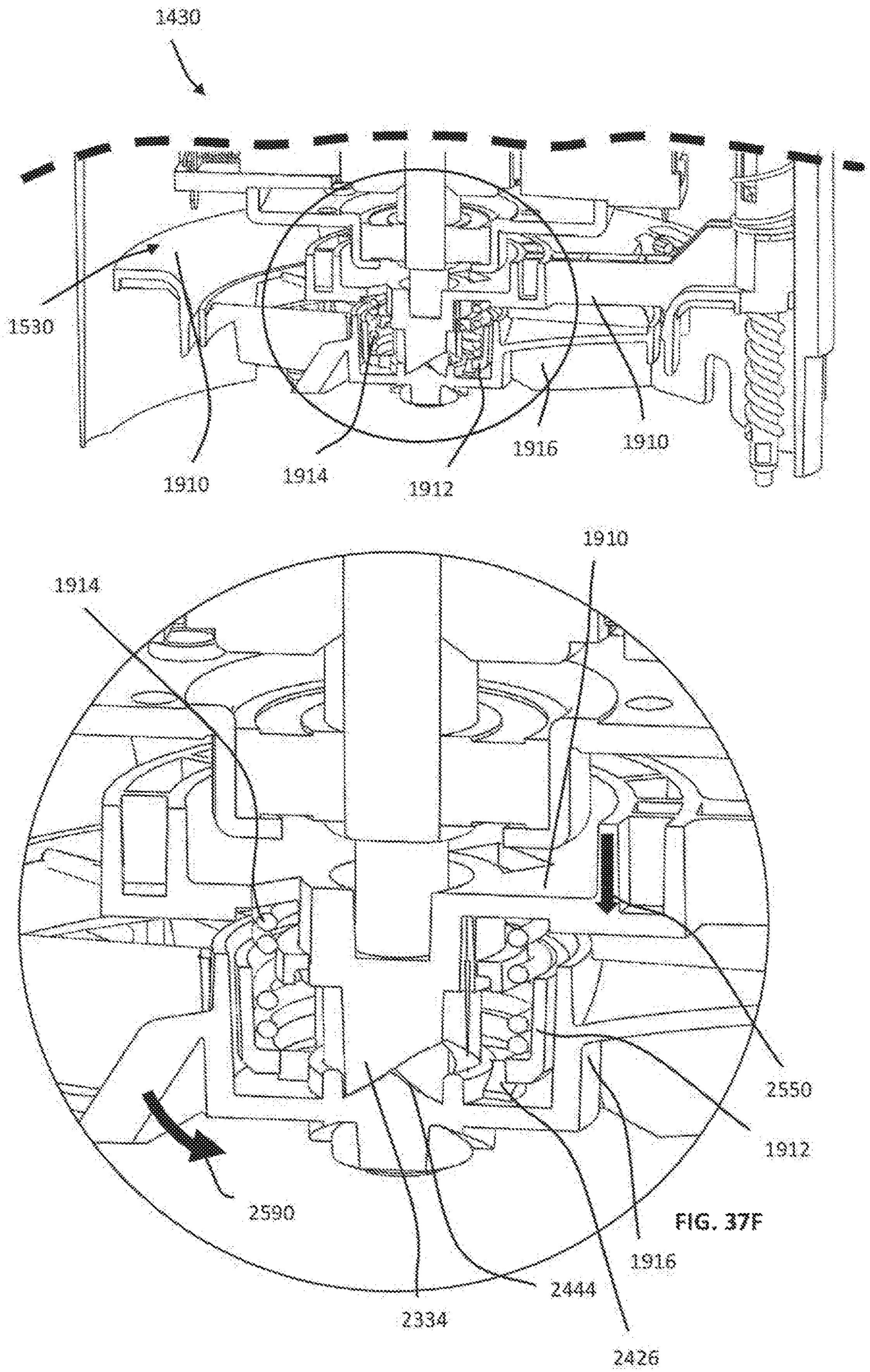

FIG. 37F shows a sixth operative orientation of axially displaceable rotary drive assembly 1530 in which motor lifting element 1910 and linear to rotary converting adaptor 1912 are shifted still further downward relative to linearly driven rotating ventilating element 1916, as indicated by arrow 2550, and in which the relative rotational orientation of linear to rotary converting adaptor 1912 and linearly driven rotating ventilating element 1916 is changed, as indicated by an arrow 2590, such that inclined downwardly-facing end surfaces 2364 of linear to rotary converting adaptor 1912 lie alongside corresponding inclined upwardly-facing surfaces 2426 of linearly driven rotating ventilating element 1916 and no longer interfere with engagement of teeth 2334 of motor lifting element 1910 and teeth 2444 of linearly driven rotating ventilating element 1916.

Figure 37G:
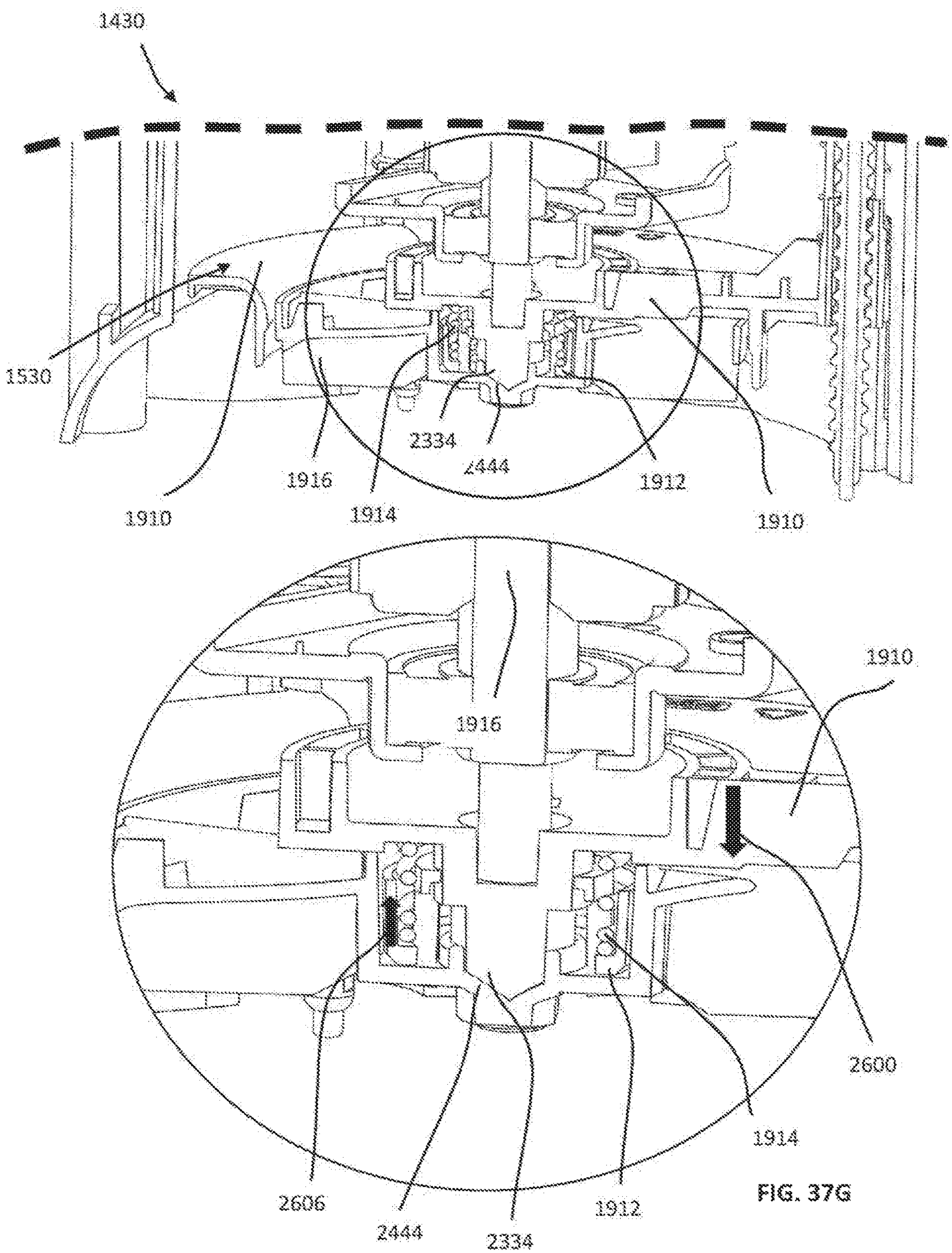

FIG. 37G shows a seventh operative orientation of axially displaceable rotary drive assembly 1530, in which motor lifting element 1910 is shifted still further downward relative to linearly driven rotating ventilating element 1916, as indicated by an arrow 2600, and teeth 2334 of motor lifting element 1910 drivingly engage teeth 2444 of linearly driven rotating ventilating element 1916. In this operative orientation, linear to rotary converting adaptor 1912 is shifted upwardly, relative to motor lifting element 1910, as indicated by an arrow 2606, against the urging of spring 1914.

Figure 38A:
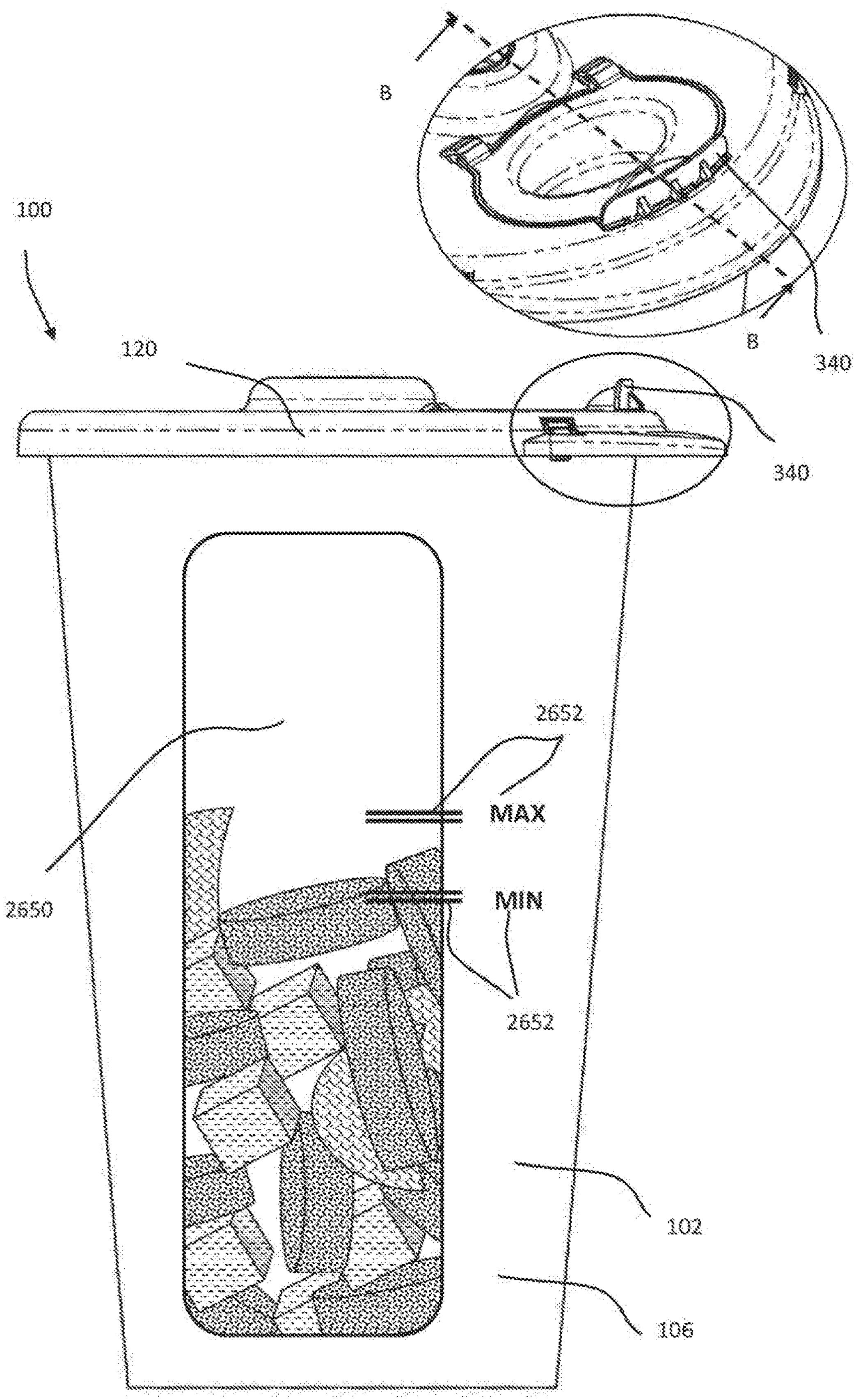
FIGS. 38A and 38B are simplified respective planar side and central cross-sectional illustrations of the SUPCA of FIGS. 1A-6G filled with a frozen or non-frozen food product. 38B being taken along line B-B in FIG. 38A.
Figure 38B:
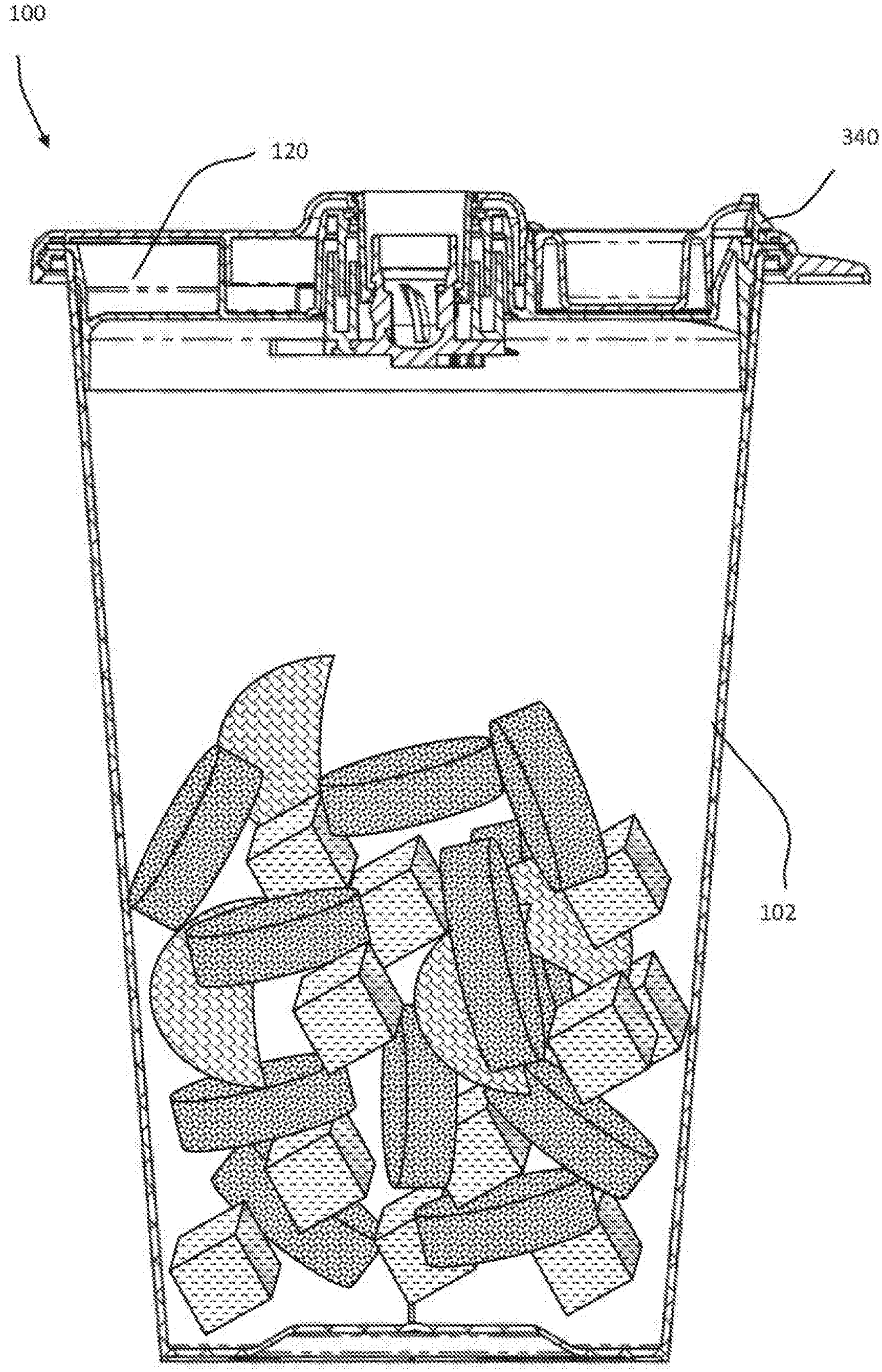

Reference is now made to FIGS. 38A and 38B, which are simplified respective planar side and central cross-sectional illustrations of SUPCA 100 of FIGS. 1A-6G filled with a frozen or non-frozen food product. The description that follows relates to use of SUPCA 100 and MMIDD 1000 with a food product, it being appreciated that SUPCA 100 and MMIDD 1000 are not limited to applications to food products, although use thereof with food products is a preferred use.

As seen in FIGS. 38A & 38B, preferably single-use container body 102 includes on wall 106 thereof a transparent or translucent window 2650, which enables a food product contained therein and a liquid level to be seen. As seen in FIG. 35A, container body 102 preferably includes markings 2652, preferably indicating minimum and maximum fill levels to be reached when adding liquid thereto.

Figure 39A:
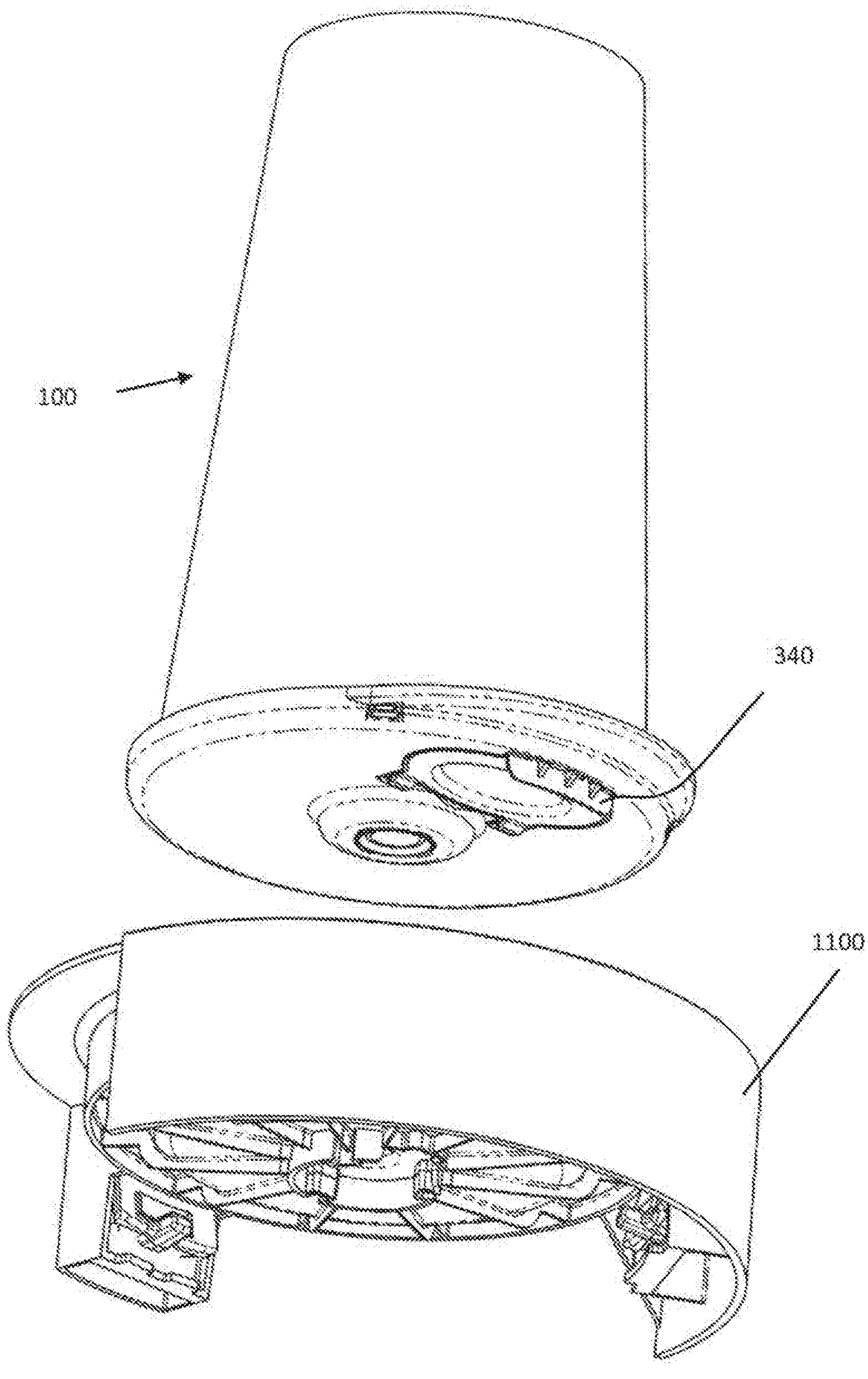
FIGS. 39A and 39B are simplified illustrations, taken from two different directions of the SUPCA of FIGS. 38A & 38B in an upside-down orientation, about to be engaged with the SUPCASCA of FIGS. 9A-14F, forming part of the MMIDD of FIGS. 7A-37G.
Figure 39B:
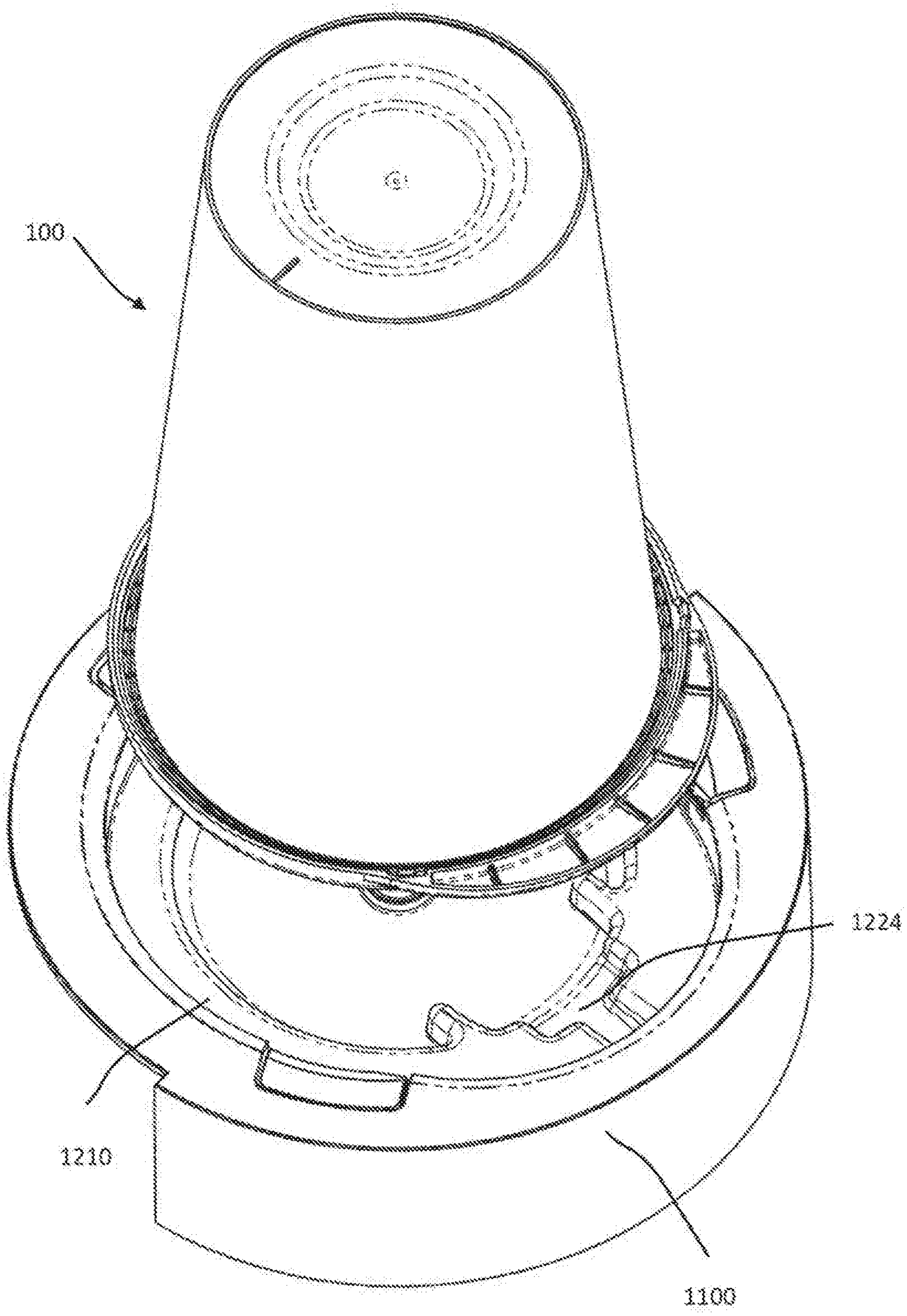

Reference is now made to FIGS. 39A and 39B, which are simplified illustrations, taken from two different directions, of SUPCA 100 of FIGS. 1A-1H in an upside-down orientation, about to be engaged with support element 1100, forming part of SUPCASCA 1030, forming part of MMIDD 1000, and to FIGS. 40A, 40B, 40C and 40D, which are simplified illustrations of SUPCA 100 of FIGS. 39A & 39B, in an attempted but unsuccessful engagement with SUPCASCA 1030, forming part of MMIDD 1000. It is noted that the remainder of MMIDD 1000 is not shown in these drawings for the sake of conciseness.

As seen particularly in FIG. 39A, user-removable multi-function restricting portion 340 is still attached to shallow elongate protrusion 330 via integrally formed frangible connectors 332.

It is noted that the long dimension of user-removable multi-function restricting portion 340 is greater than the long dimension of widened recessed portion 1224 of support element 1100, thereby preventing user-removable multi-function restricting portion 340 from seating therein and thus preventing full seating of SUPCA 100 on generally annular planar container support surface 1210 while user-removable multi-function restricting portion 340 is still attached to shallow elongate protrusion 330.

Figure 40A:
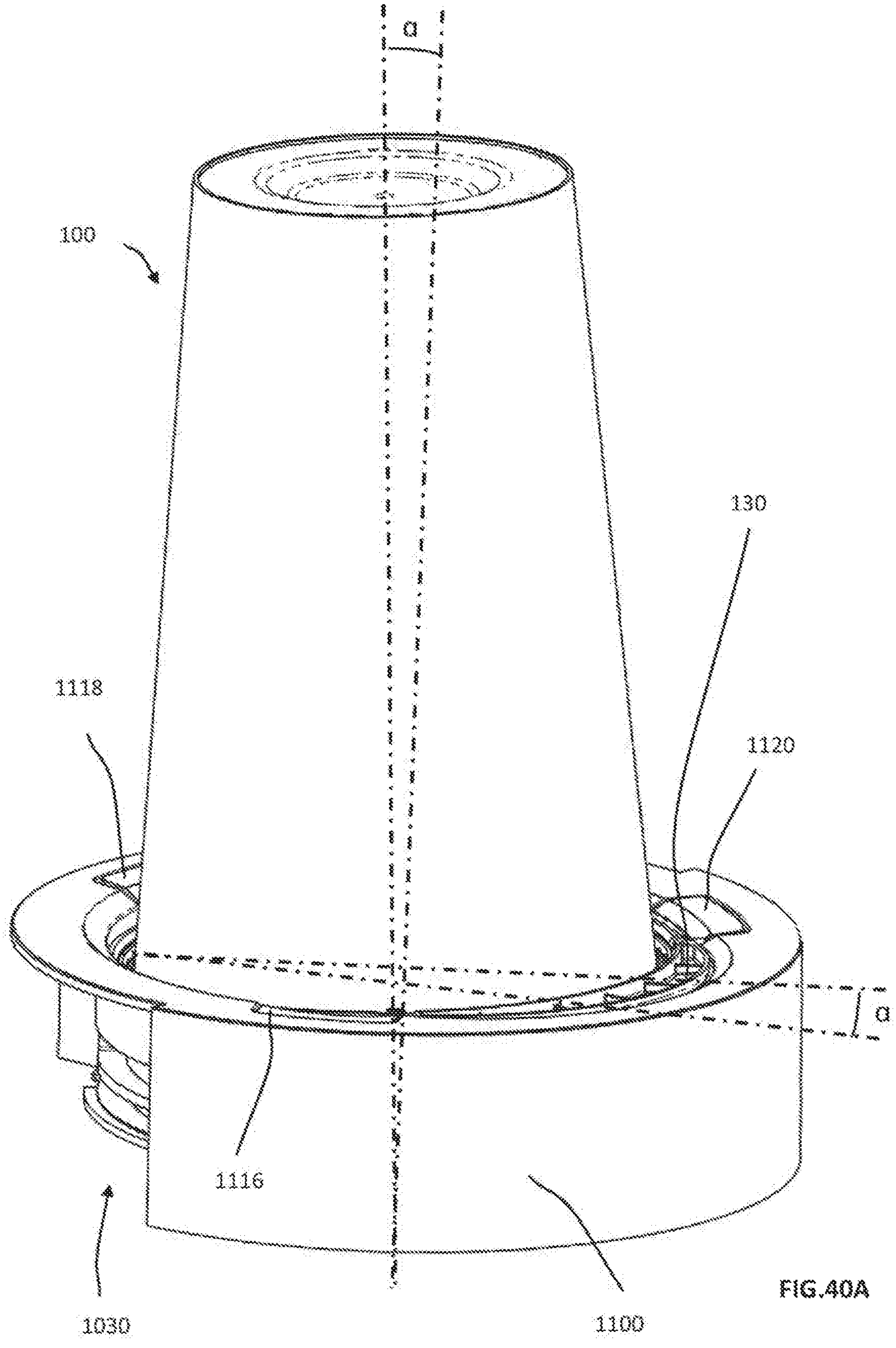
FIGS. 40A, 40B, 40C and 40D are simplified respective pictorial side view, planar top view and first and second sectional illustrations of the SUPCA of FIGS. 39A & 39B, in an attempted but unsuccessful engagement with the SUPCASCA of FIGS. 9A-14F, forming part of the MMIDD of FIGS. 7A-37G.
Figure 40B:
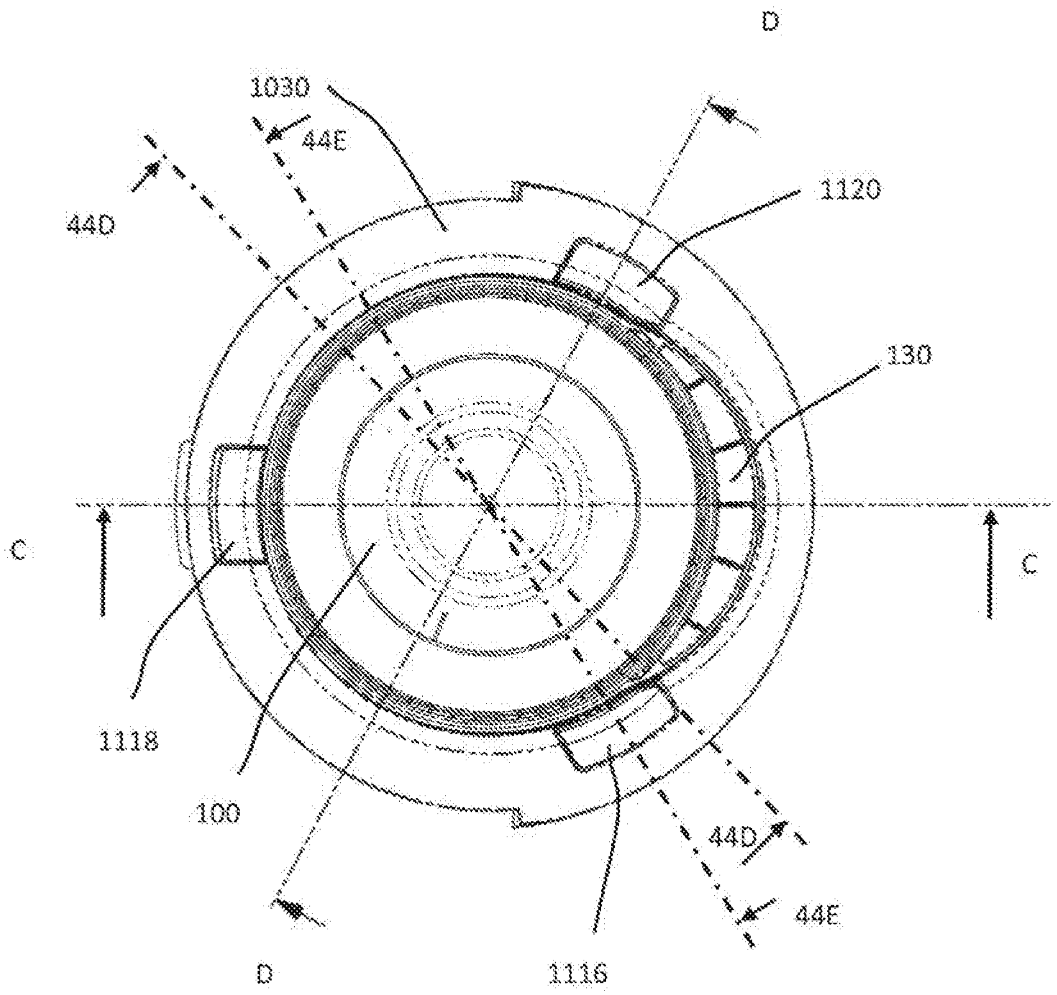
Figure 40C:
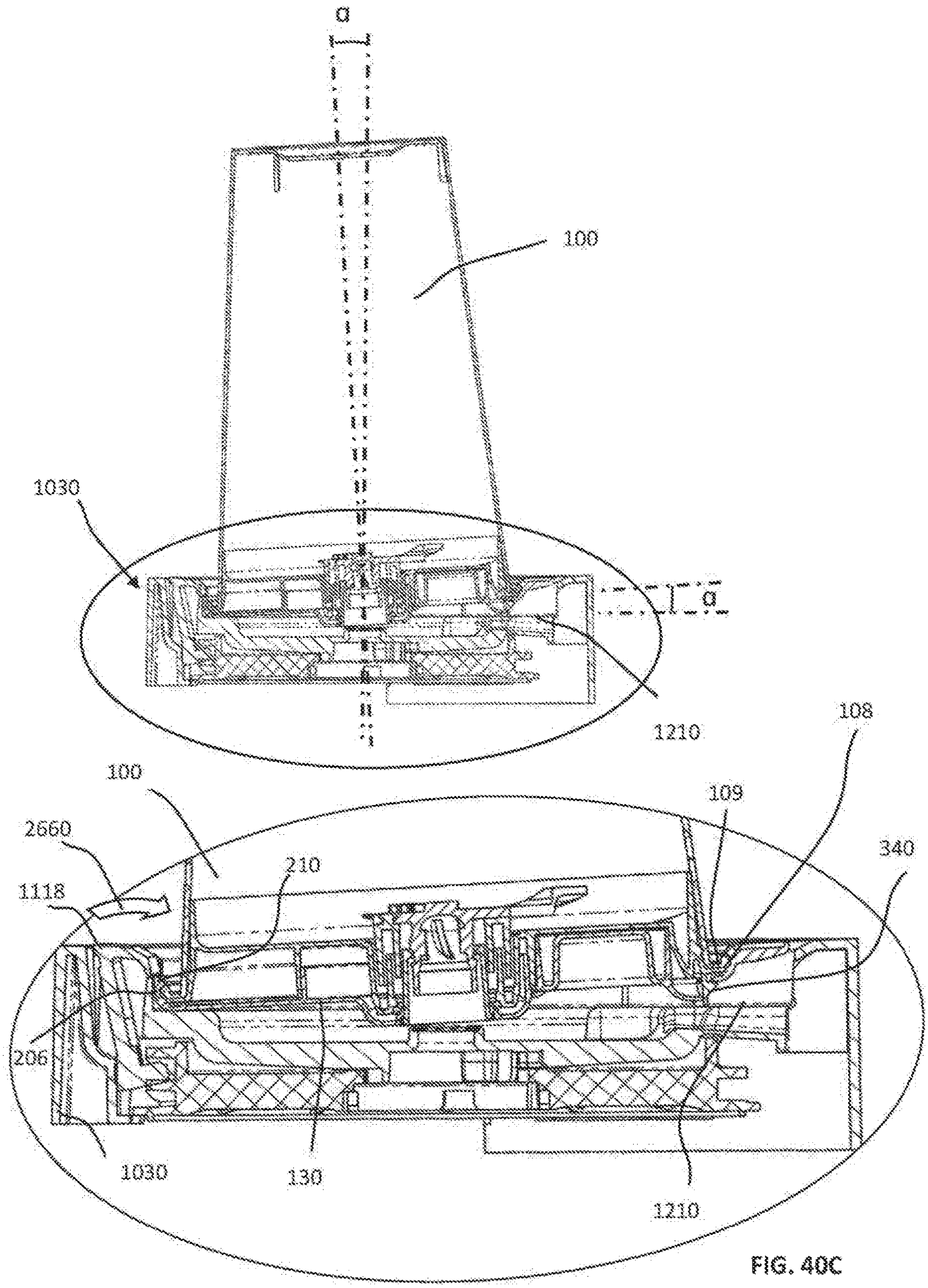
Figure 40D:
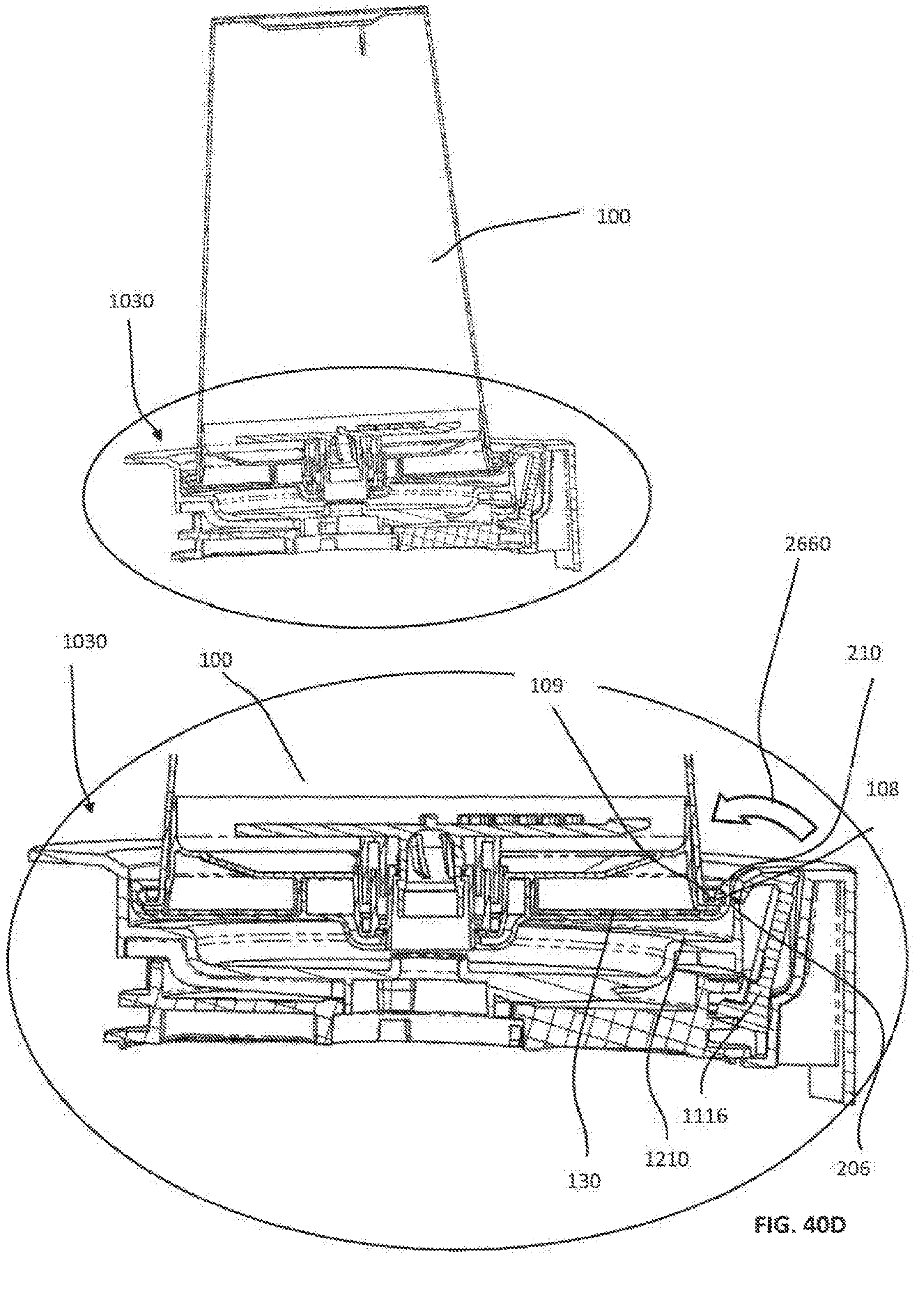

As seen particularly in FIG. 40C, SUPCA 100 is at an angle α with respect to generally annular planar container support surface 1210. In this relative orientation. MMIDD 1000 cannot process the contents of SUPCA 100, as described hereinbelow with reference to FIGS. 44A-55H. As seen particularly in FIG. 40D, at least one of clamps 1116 and 1120 is not fully rotatable, when being rotated in a clamping direction 2660, into a position wherein clamping engagement edge 1134 thereof is in full engagement with downwardly-facing surface 109 of rim 108 of single-use container body 102 of SUPCA 100. As seen in FIG. 40D, generally circular circumferential edge portion 206 of cover 130 of SUPCA 100 impedes clamping portion 1130 from rotating, so that clamping engagement edge 1134 cannot engage downwardly-facing surface 109 of rim 108 of single-use container body 102 of SUPCA 100.

Figure 41A:
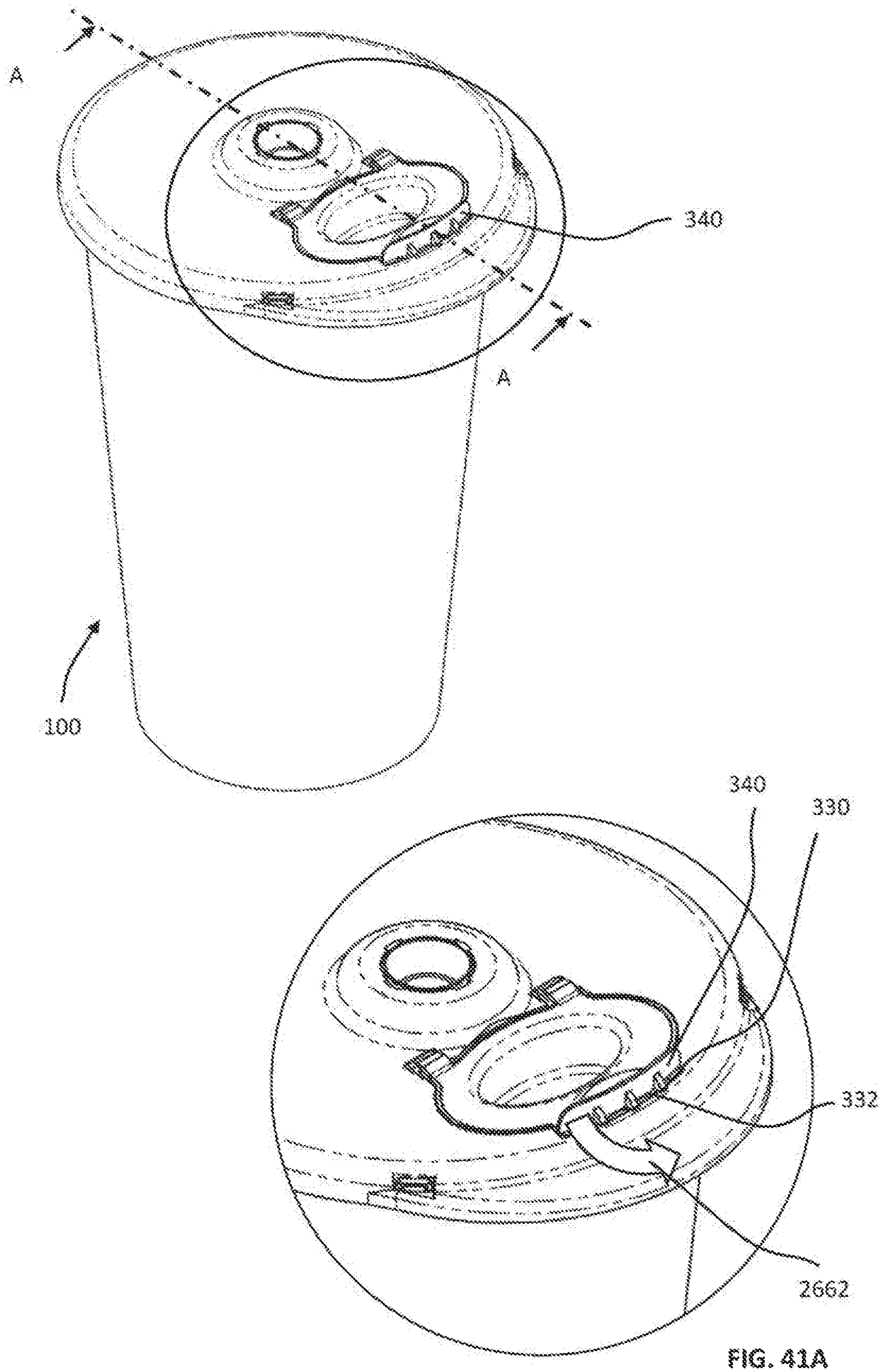
FIGS. 41A and 41B are simplified pictorial illustrations of removal of a user-removable multi-function restricting portion from the SUPCA of FIGS. 38A & 38B.
Figure 41B:
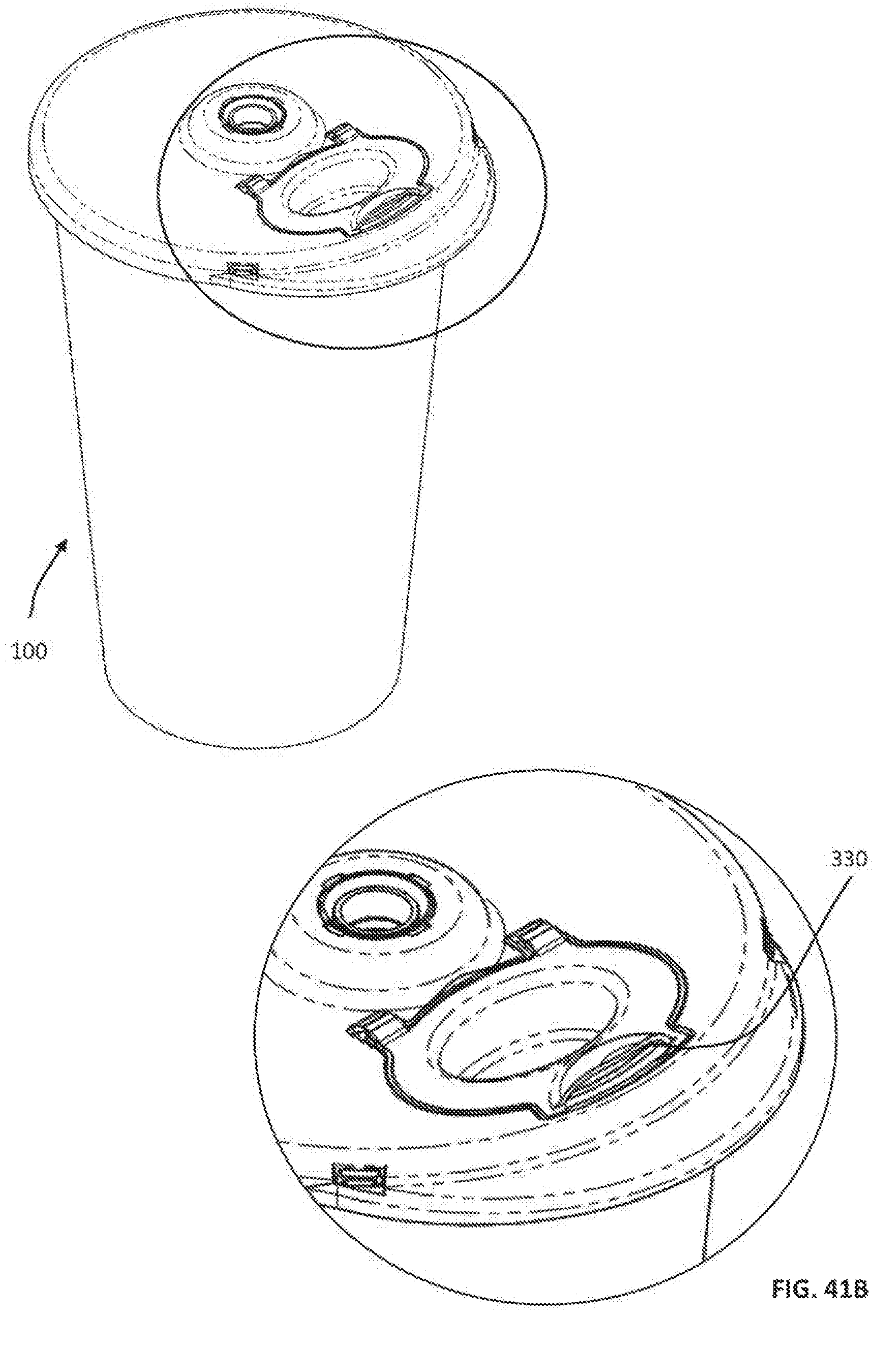

Reference is now made to FIGS. 41A and 41B, which are simplified pictorial illustrations of removal of user-removable multi-function restricting portion 340 of SUPCA 100 of FIGS. 39A & 39B. As seen in FIGS. 41A and 41B, a user manually tears user-removable multi-function restricting portion 340 from shallow elongate protrusion 330 by breaking integrally formed frangible connectors 332, preferably by pulling user-removable multi-function restricting portion 340 in a direction indicated by an arrow 2662.

It is noted that SUPCA 100, having had user-removable multi-function restricting portion 340 removed therefrom, is able to fully seat onto generally annular planar container support surface 1210 and thus be processed by MMIDD 1000, as described hereinbelow with reference to FIGS. 44A-55H. It is appreciated that in the discussion which follows, unless explicitly stated. SUPCA 100 is assumed to have had user-removable multi-function restricting portion 340 removed therefrom.

Figure 42A:
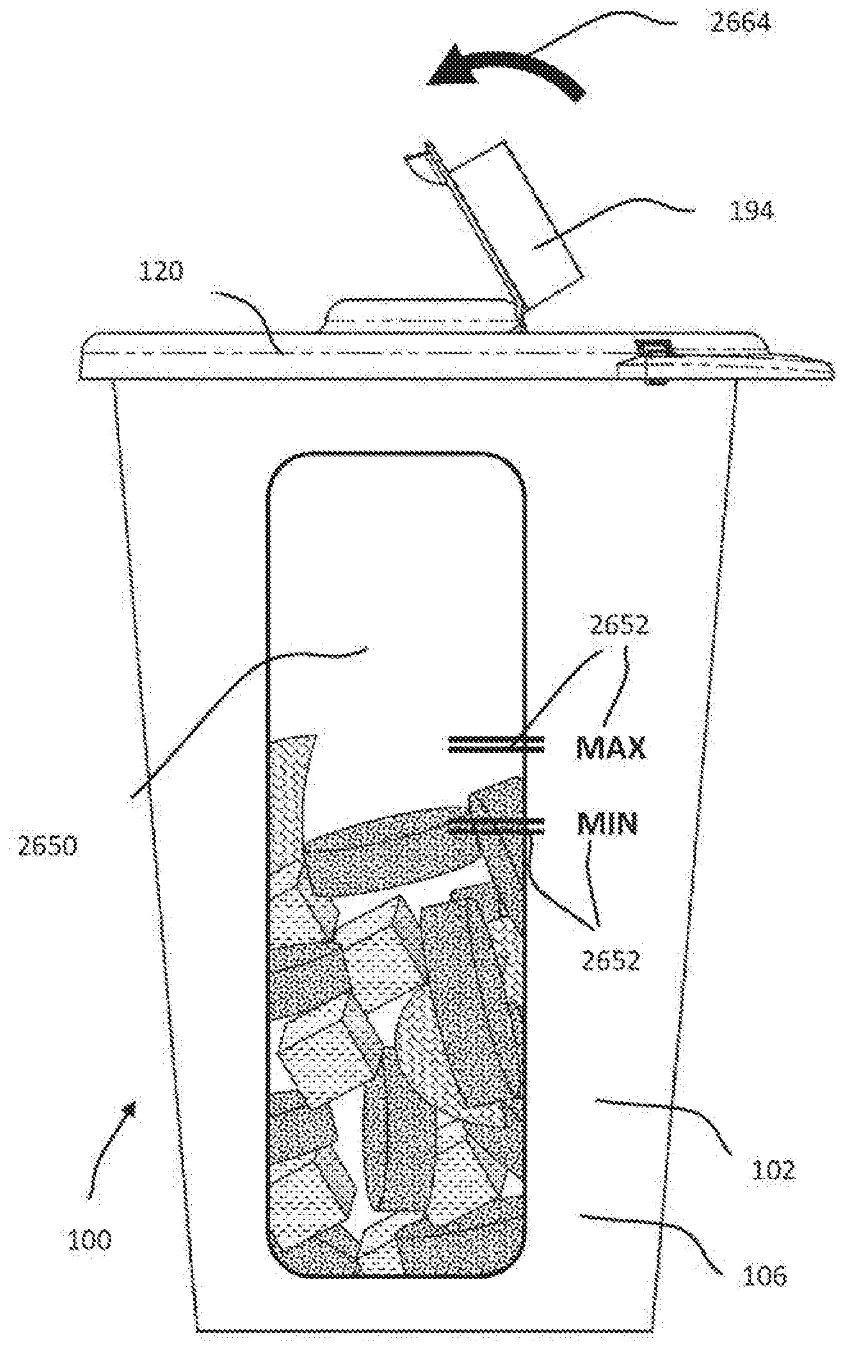
FIGS. 42A, 42B and 42C are simplified side view illustrations of the SUPCA of FIGS. 38A & 38B showing opening of the access door thereof, subsequent filling of said SUPCA with liquid and subsequent closing of the access door, in a situation where said SUPCA contains frozen contents.
Figure 42B:
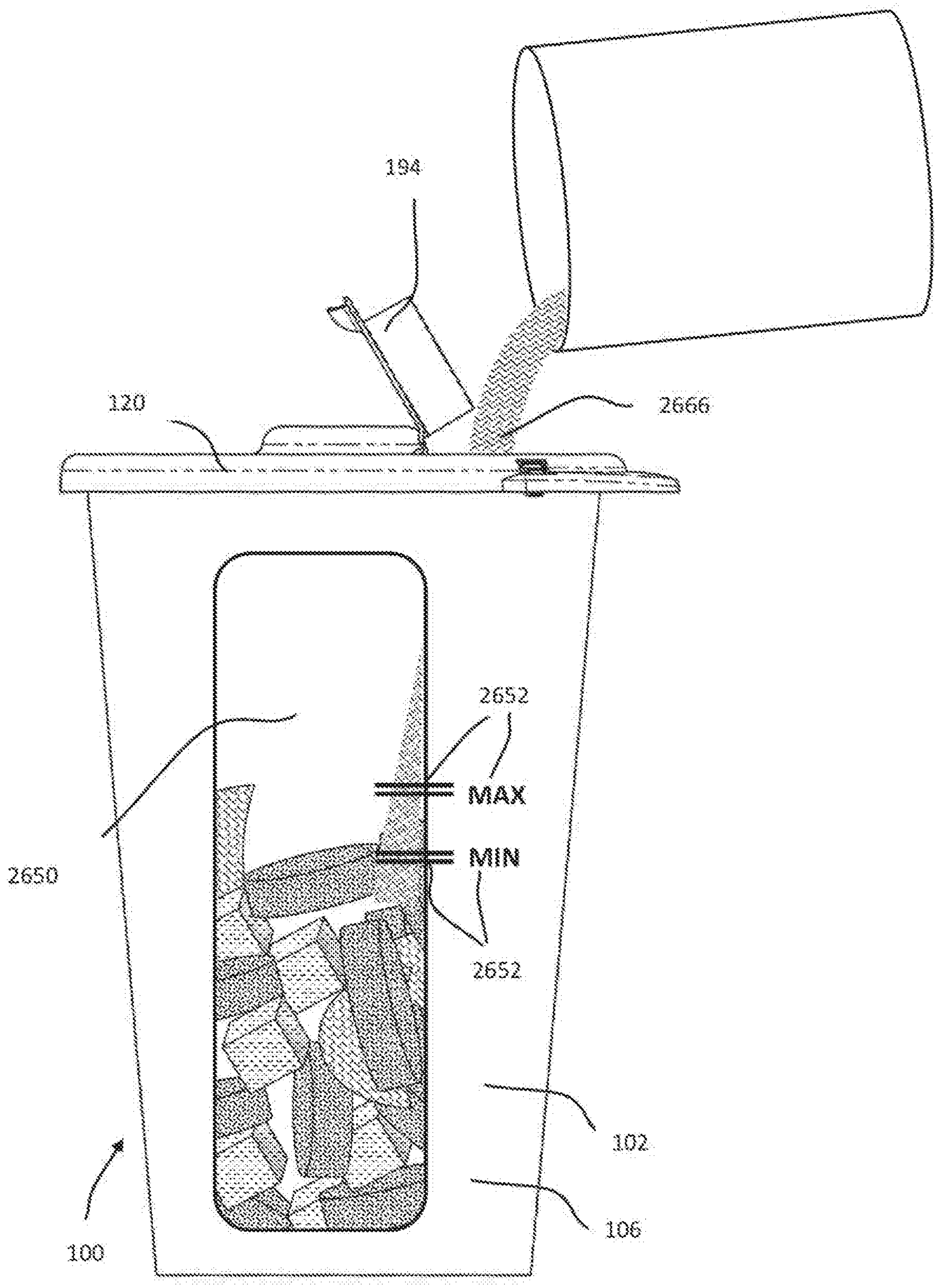
Figure 42C:
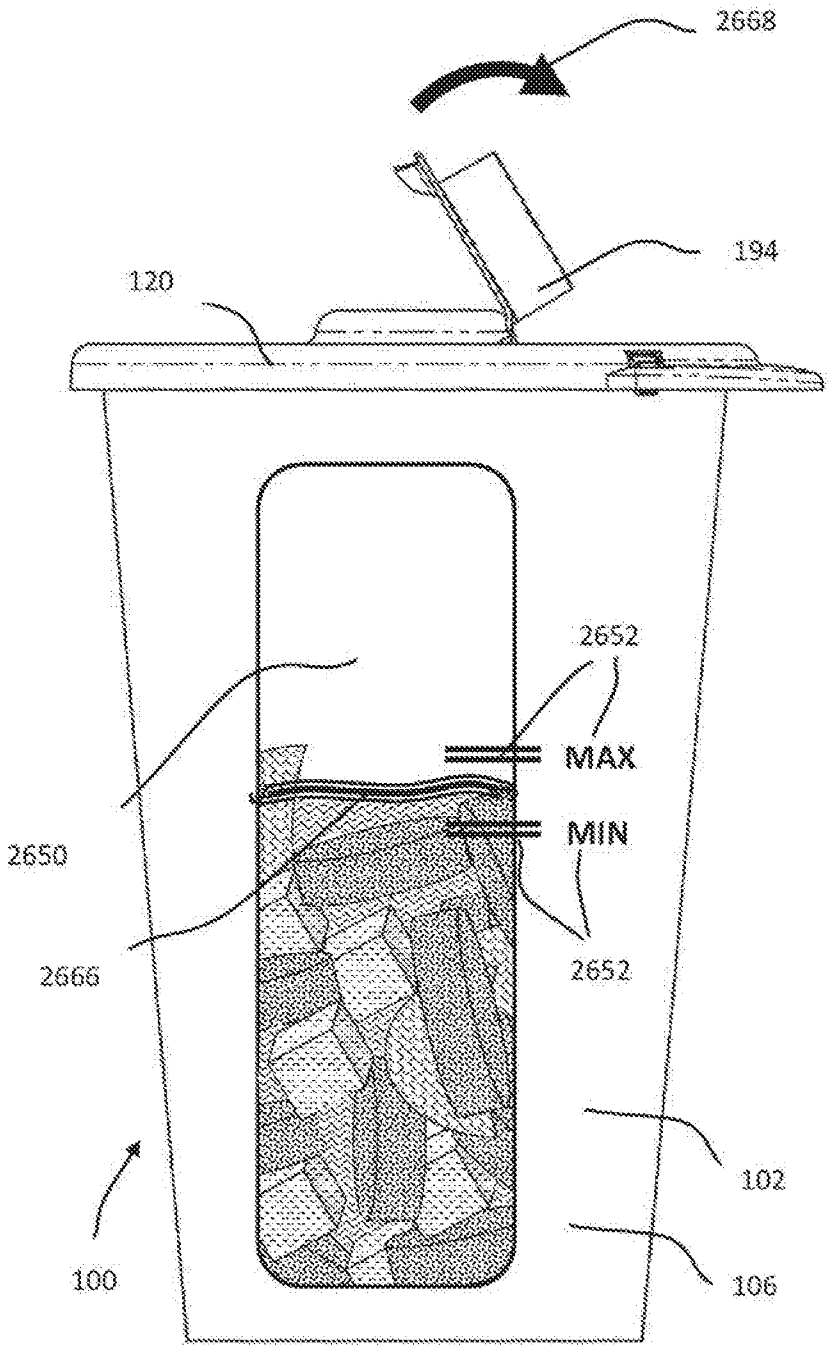

Reference is now made to FIGS. 42A, 42B and 42C, which are simplified side view illustrations of SUPCA 100 of FIGS. 39A & 39B, respectively showing opening of access door 194 thereof in a direction indicated by an arrow 2664, subsequent filling of SUPCA 100 with a liquid 2666 and subsequent closing of access door 194 in a direction indicated by an arrow 2668, in a case where the contents of SUPCA 100 are frozen.

Figure 43A:
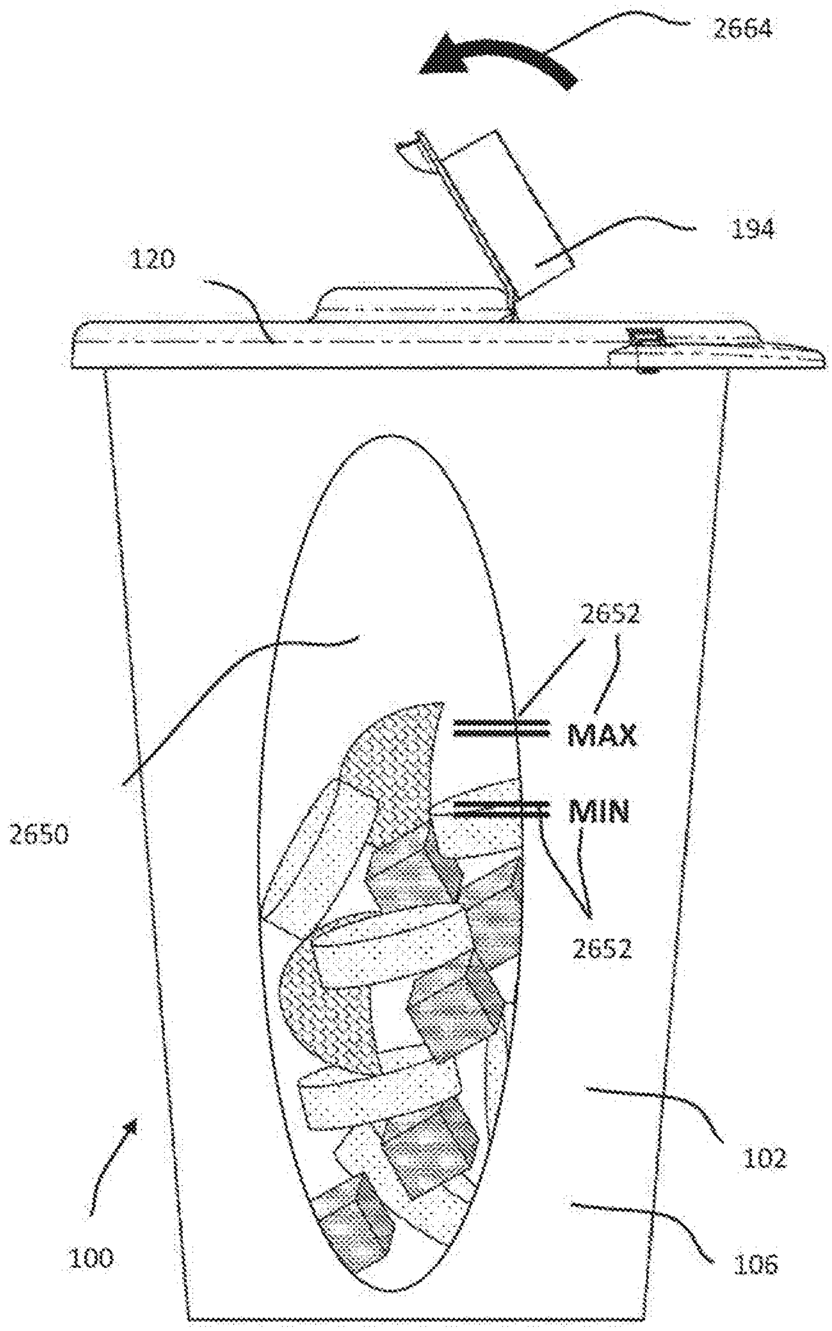
FIGS. 43A, 43B and 43C are simplified side view illustrations of the SUPCA of FIGS. 38A & 38B showing opening of the access door thereof, subsequent filling of said SUPCA with liquid and subsequent closing of the access door, in a situation where said SUPCA contains non-frozen contents.
Figure 43B:
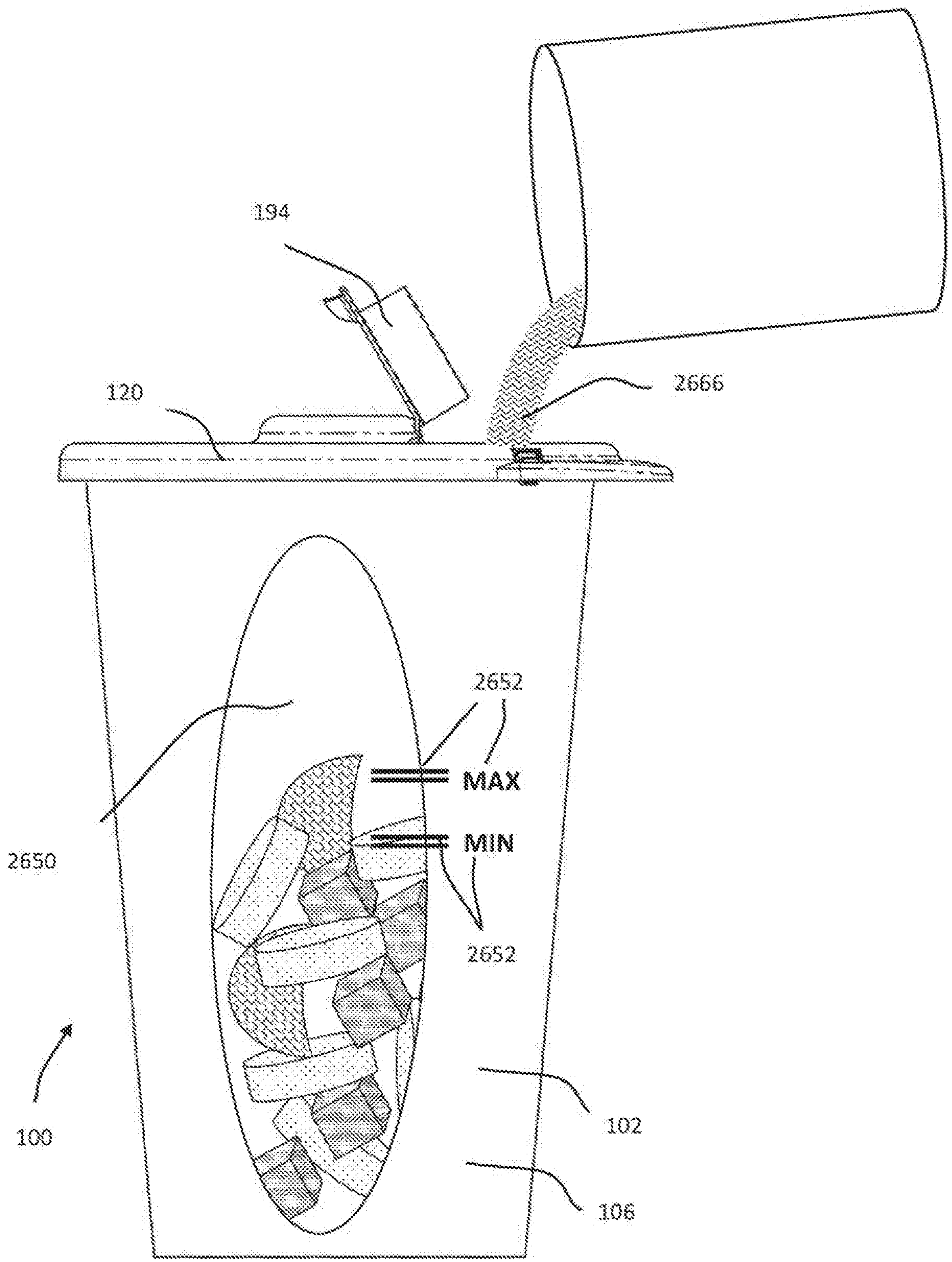
Figure 43C:
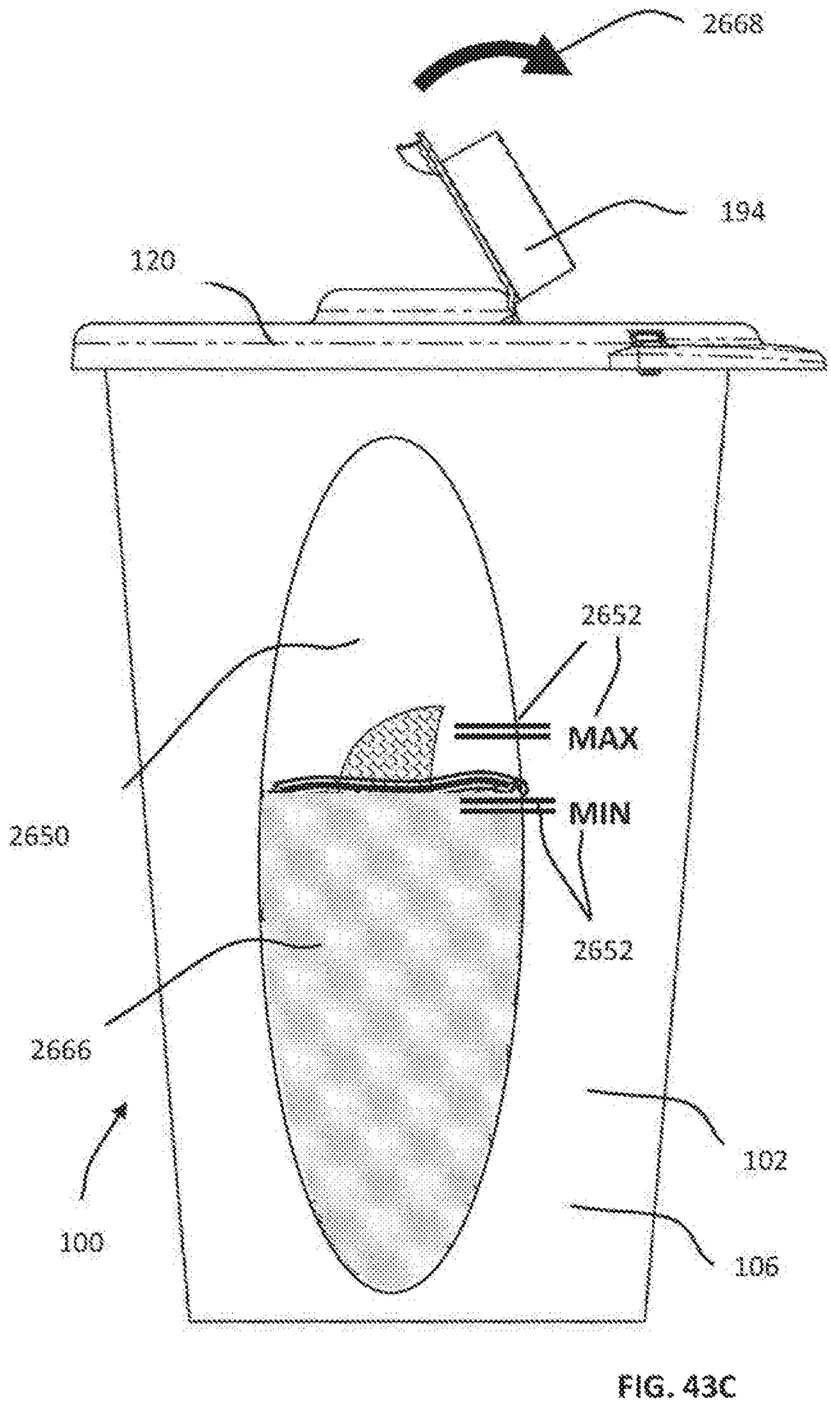

Reference is now made to FIGS. 43A, 43B and 43C, which are simplified side view illustrations of SUPCA 100 of FIGS. 39A & 39B, respectively showing opening of access door 194 thereof in a direction indicated by an arrow 2664, subsequent filling of SUPCA 100 with a liquid 2666 and subsequent closing of access door 194 in a direction indicated by an arrow 2668, in a situation where SUPCA 100 contains non-frozen contents.

Reference is now made to FIGS. 44A, 44B, 44C, 44D, 44E and 44F, which are simplified respective pictorial, sectional, and partial sectional illustrations of SUPCA 100 in an upside-down unclamped orientation in a successful engagement with MMIDD 1000, with top housing assembly 1010 in a door open operative orientation. As seen particularly in FIG. 44F, tabs 320 of SUCSERDREA 120 are in an operative orientation wherein portions 322 and 324 are forced into a mutually parallel orientation, as shown in FIG. 5A.

Figure 44A:
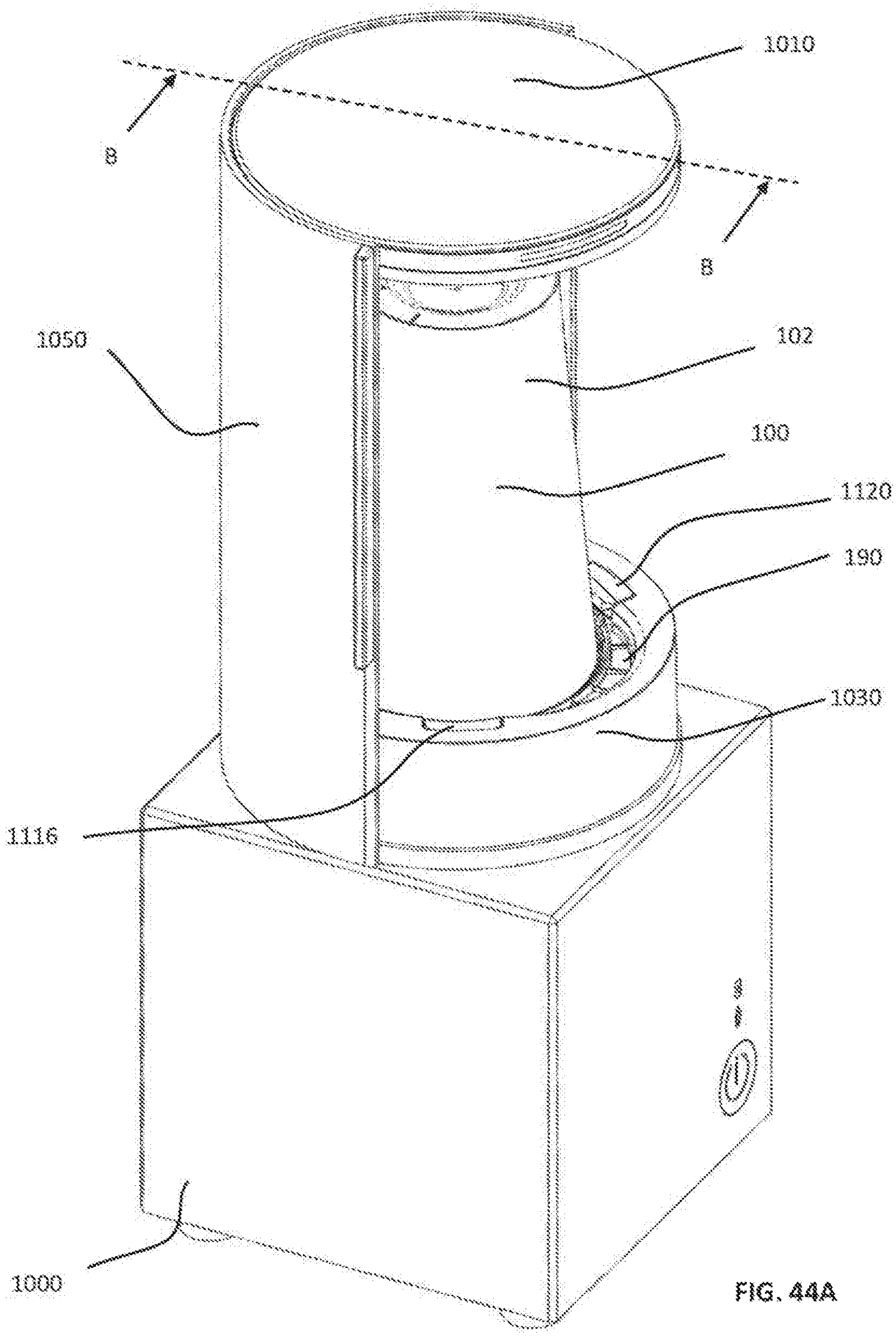
FIGS. 44A, 44B, 44C, 44D, 44E and 44F are simplified respective pictorial, sectional, and partial sectional illustrations of a SUPCA, such as the SUPCA of FIG. 42A-42C or 43A-43C, filled with a food product (not shown) in an upside-down unclamped orientation in typical initial operative engagement with the MMIDD of FIGS. 7A-37G, with the top housing assembly of FIGS. 8A-8C in a door open operative orientation.
Figure 44B:
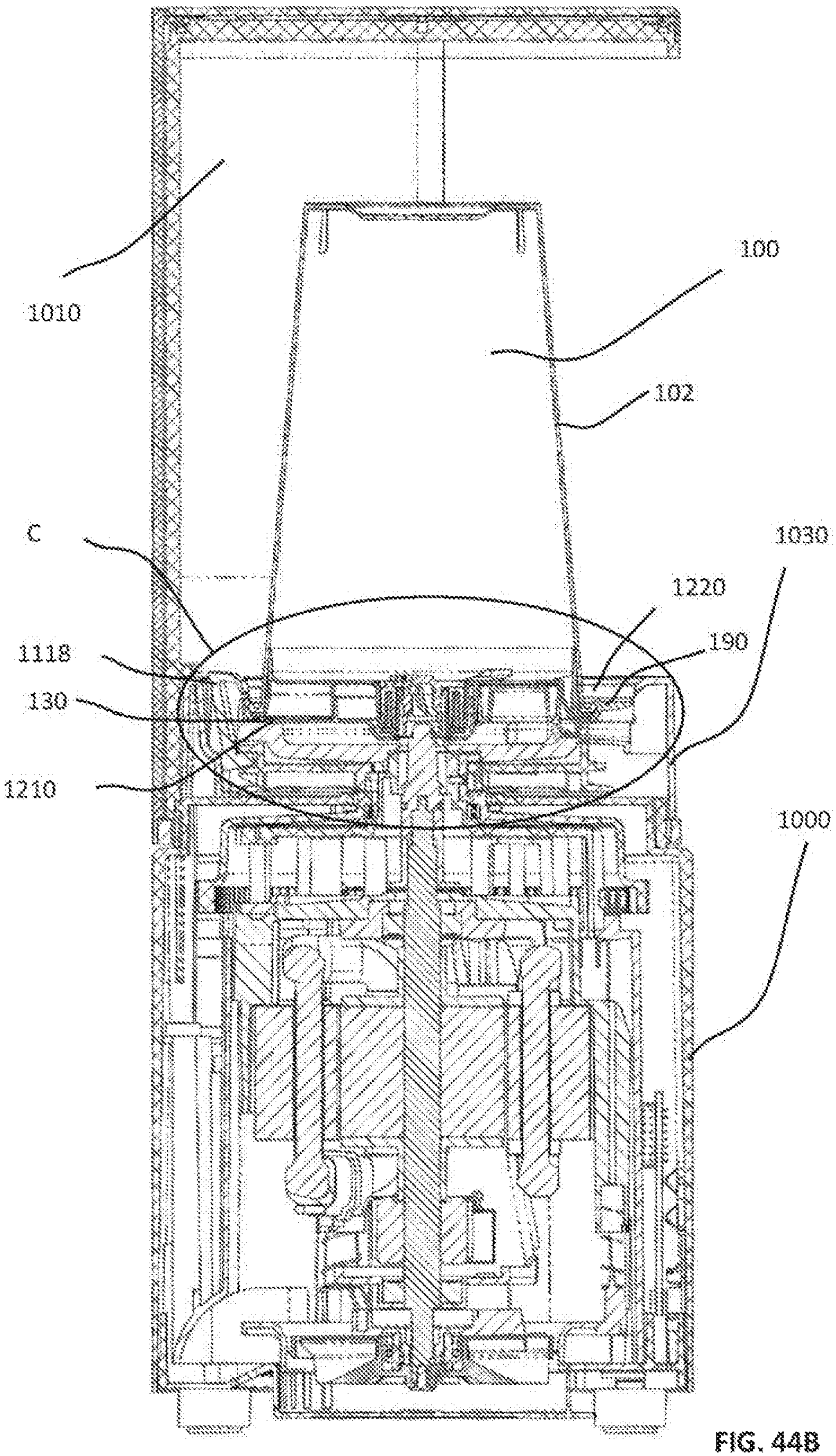
Figure 44C:
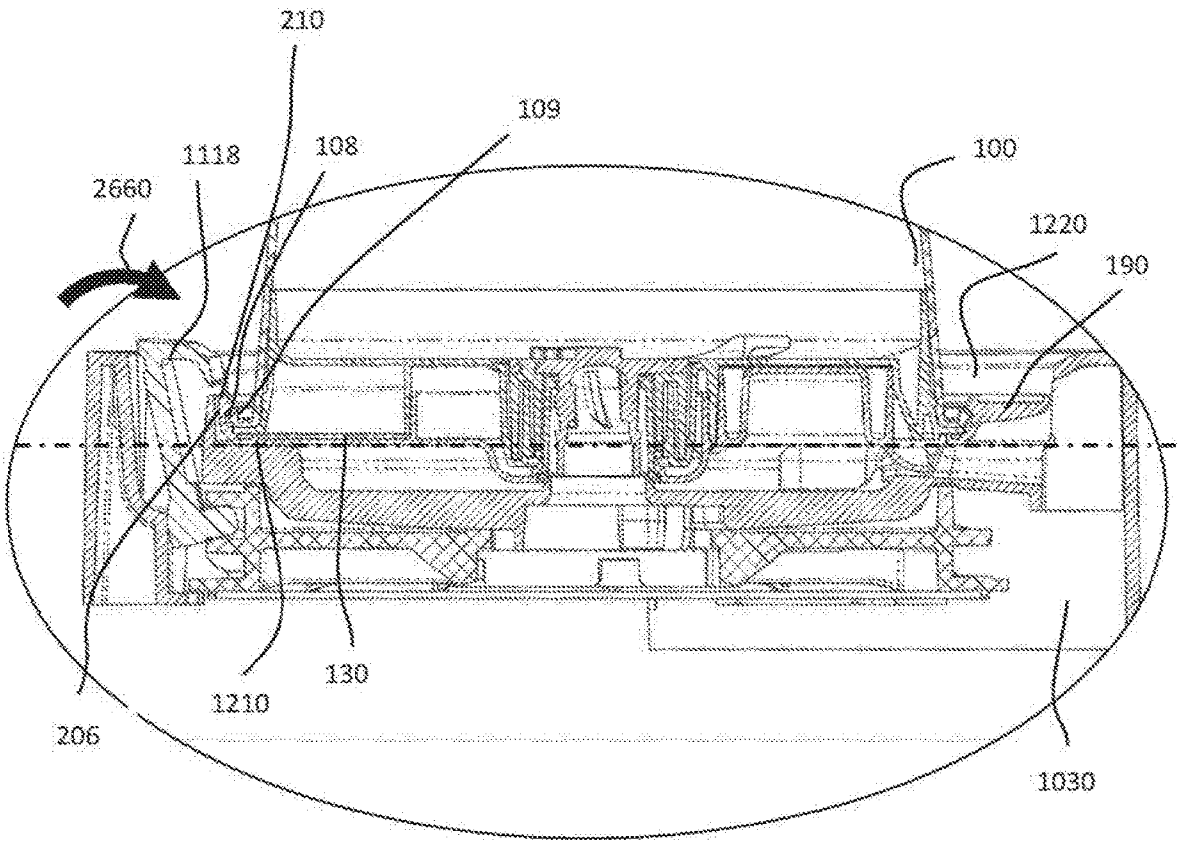
Figure 44D:
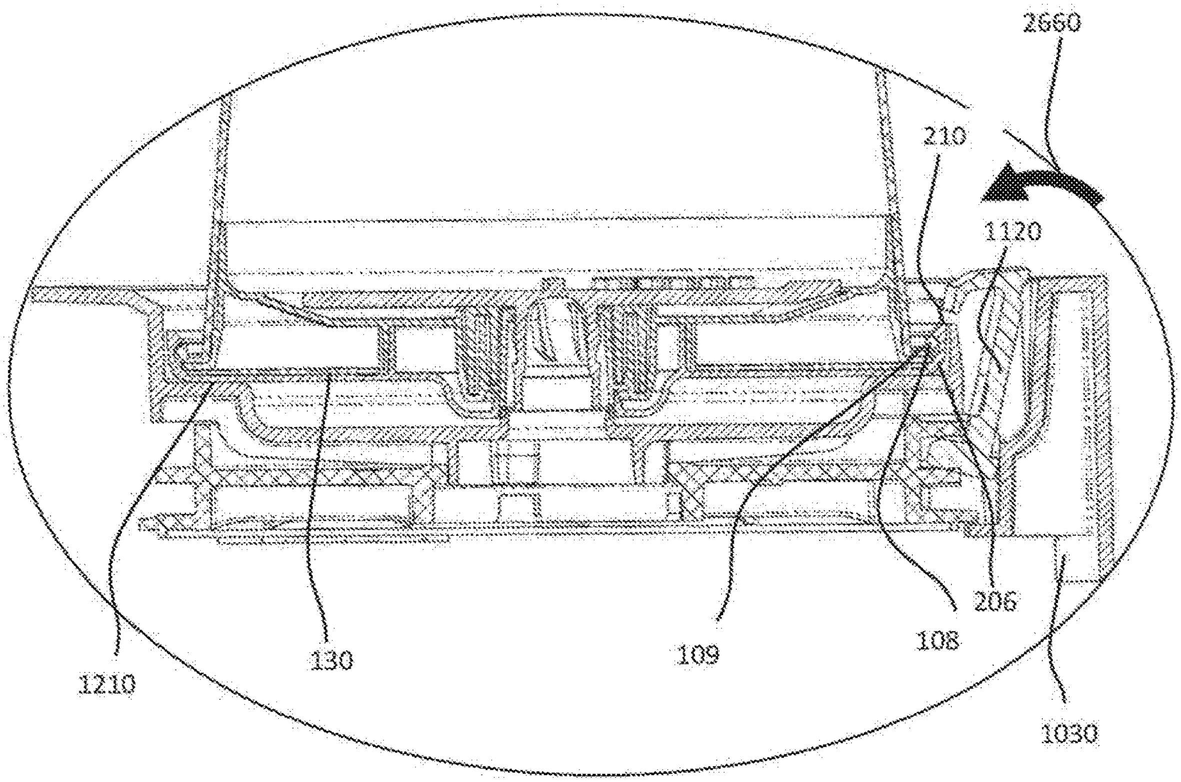
Figure 44E:
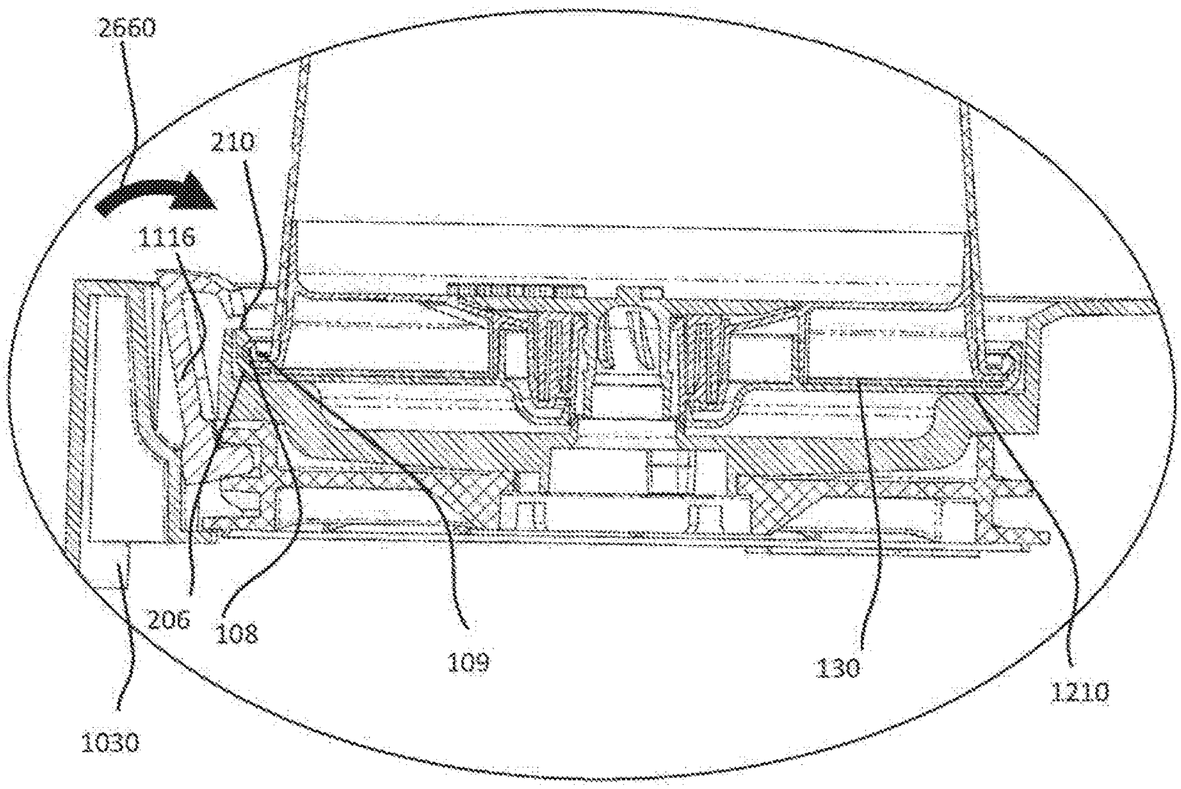

It is noted that FIG. 44C. FIG. 44D and FIG. 44E show each of clamps 1118, 1120 and 1116 respectively in the same relative orientations. It is further noted that FIG. 44E and FIG. 44F both show clamp element 1116 in the same orientation, but are taken along different section lines.

It is seen, in contrast to the orientation shown in FIGS. 39A-39D, that SUPCA 100 is fully seated onto generally annular planar container support surface 1210 and is not angled with respect to generally annular planar container support surface 1210. In this relative orientation. MMIDD 1000 is able process the contents of SUPCA 100, as described hereinbelow with reference to FIGS. 44A-55H.

It is appreciated that seating of front flap 190 of cover 130 of SUPCA 100 in radially outwardly directed extension 1220 of support element 1100 of SUPCASCA 1030 provides desired azimuthal positioning of SUPCA 100 with respect to MMIDD 1000, enabling proper clamping thereof onto SUPCASCA 1030. As seen particularly in FIGS. 44C-44E, when SUPCA 100 is in fully seated engagement with MMIDD 1000, clamps 1118, 1120 and 1116, are rotatable in clamping direction 2660 into a position wherein clamping engagement edges 1134 are in full engagement with downwardly-facing surface 109 of rim 108 of single-use container body 102 of SUPCA 100.

Figure 45:
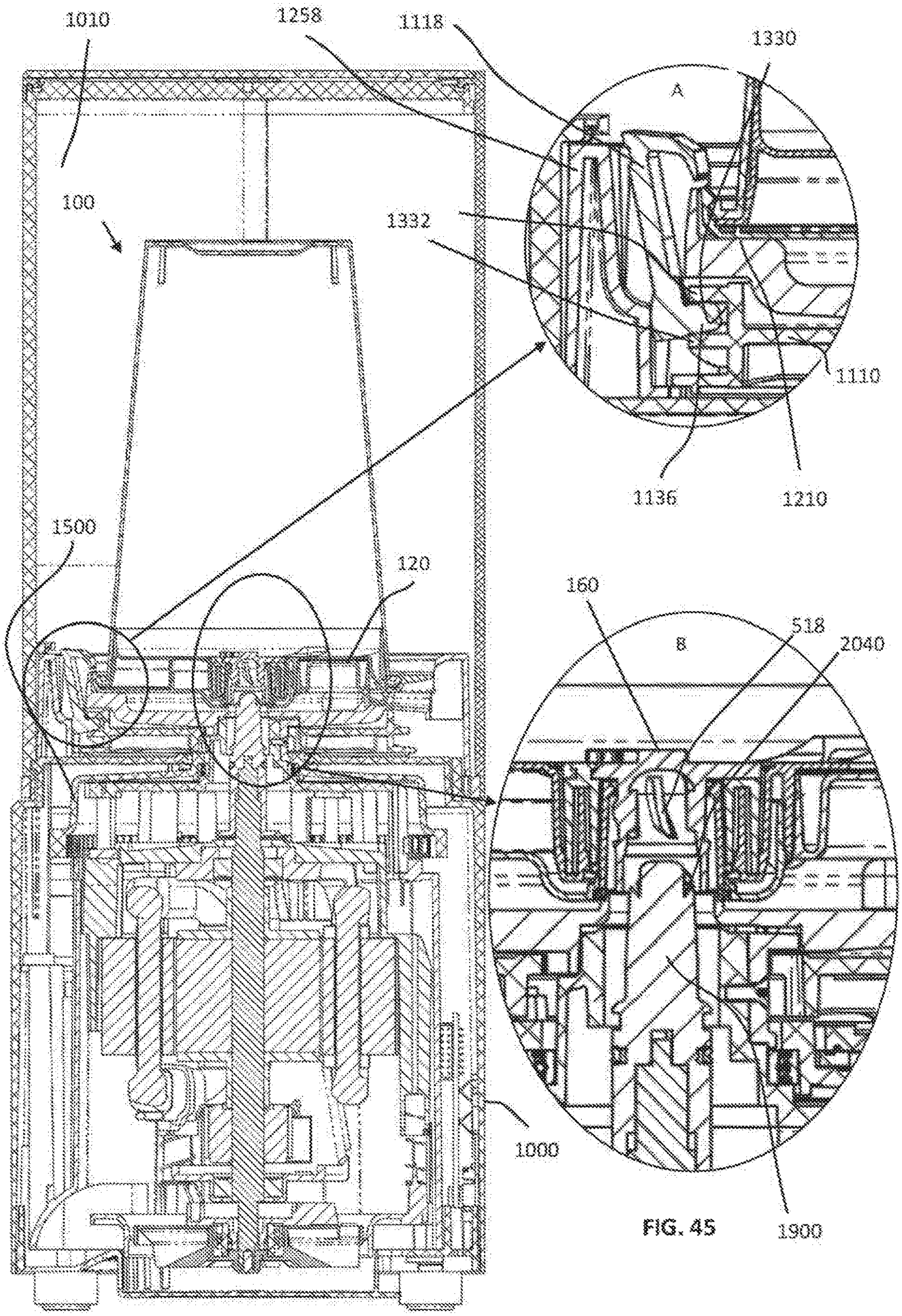
FIG. 45 is a simplified sectional illustration of the SUPCA of FIGS. 44A-44F in an upside-down unclamped orientation in operative engagement with the MMIDD of FIGS. 7A-37G, with the top housing assembly of FIGS. 8A-8C in a door closed operative orientation.

Reference is now made to FIG. 45, which is a simplified sectional illustration of SUPCA 100 in an upside-down unclamped orientation in operative engagement with MMIDD 1000, with top housing assembly 1010 in a door closed operative orientation. FIG. 45 being taken along line B-B in FIG. 44A. It is appreciated that the various elements of MMIDD 1000 remain in their respective rest positions as shown at I in FIG. 35 and in FIG. 36A.

As seen particularly clearly in an enlargement A in FIG. 45, clamp element 1118 is in a retracted operative orientation, being arranged with respect to cam element 1110 whereby cam engagement protrusion 1136 thereof lies at a first location 1334 of a corresponding cam channel 1330, whereby the radial extent of upper circumferential wall 1332 defining cam channel 1330 is at a maximum, forcing clamp element 1118 located in cam channel 1330 at first location 1334 radially outwardly in pocket 1258. This orientation of clamp element 1118 enables SUCSERDREA 120 of SUPCA 100 to clear clamp element 1118 upon insertion of SUPCA 100 into engagement with MMIDD 1000. It is appreciated that clamp elements 1116 and 1120 are similarly positioned within pockets 1256 and 1260, respectively.

It is noted that lower portions of curved splines 518 of blade 160 are azimuthally aligned with top portions of curved recesses 2040 of drive shaft assembly 1900, in order that fully seated engagement between the drive shaft assembly 1900 and blade 160 may be readily achieved by relative axial displacement therebetween followed by relative rotational displacement therebetween.

Figure 44F:
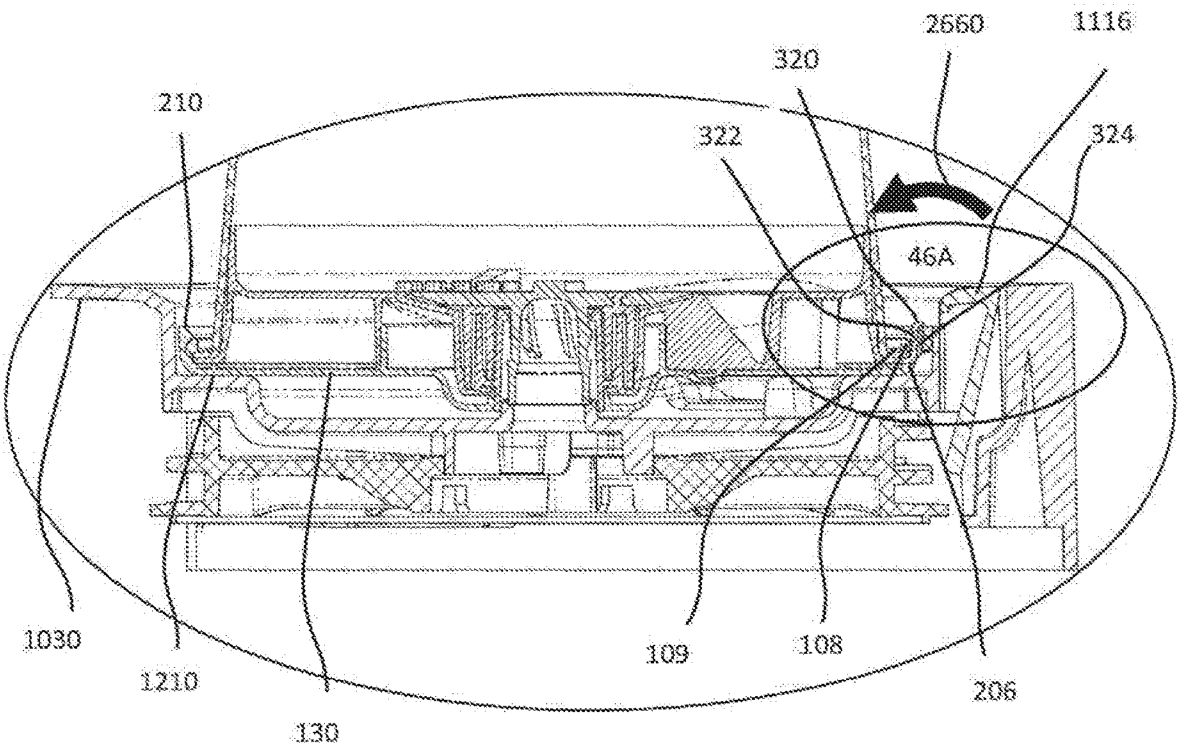

Reference is now made to FIGS. 46A, 46B, 46C and 46D, which are simplified enlarged partial sectional illustrations corresponding to enlargement 46A in FIG. 44F showing four stages in clamping of SUPCA 100 by SUPSCASCA 1030 of MMIDD 1000. It is noted that since FIG. 46A-46D is taken along section line 44D-44D in FIG. 40B, which passes through bevel 1133 of clamp element 1116, clamping engagement edge 1134 is not visible in these figures.

Figure 46A:
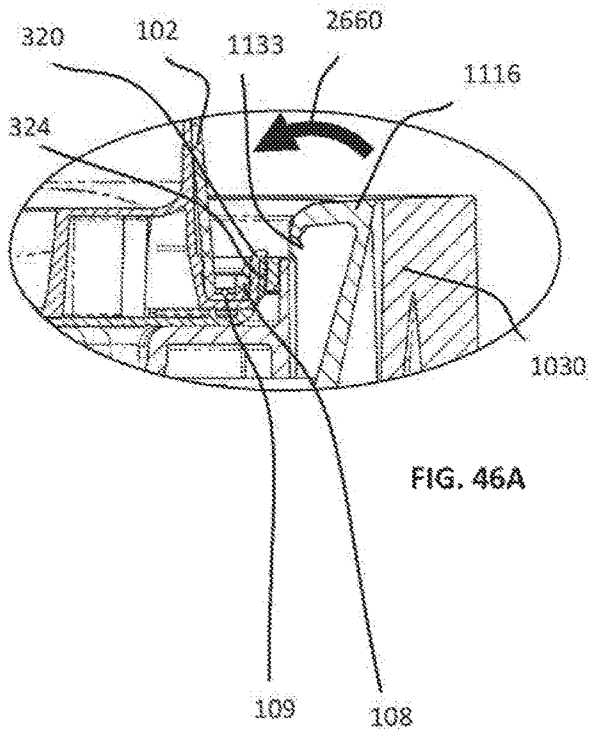
FIGS. 46A, 46B, 46C and 46D are simplified enlarged partial sectional illustrations corresponding to enlargement 46A in FIG. 44F, showing four stages in clamping of the SUPCA of FIGS. 44A-44F, by the SUPSCASCA of FIGS. 9A-14F of the MMIDD of FIGS. 7A-37G.
Figure 46B:
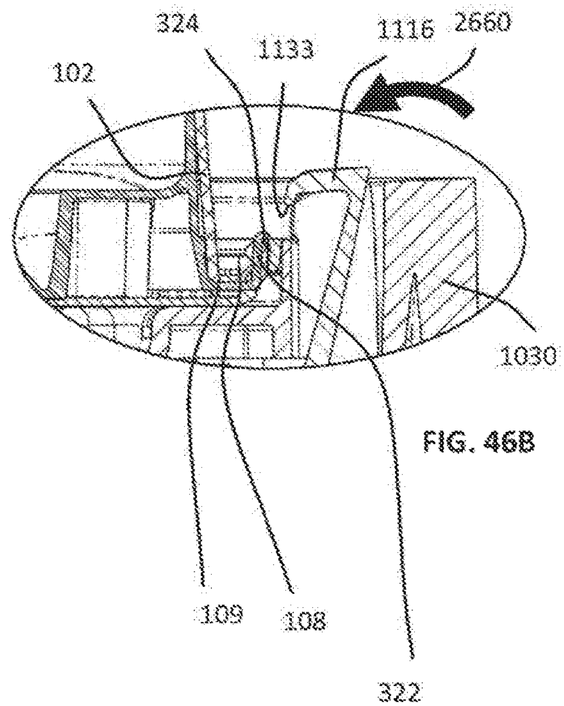

FIG. 46A shows clamp element 1116 in its rest position. FIG. 42B shows clamp element 1116 having moved upwardly slightly and rotated radially inwardly towards SUPCA 100. FIG. 42C shows further rotation of clamp element 1116 such that clamping engagement edge 1134 of clamp element 1116 overlies generally circular circumferential edge portion 206. FIG. 42D shows full clamping engagement of clamp element 1116 with downwardly-facing surface portion 210 of cover 130 and a downwardly-facing surface 109 of rim 108 of single-use container body 102.

Figure 47:
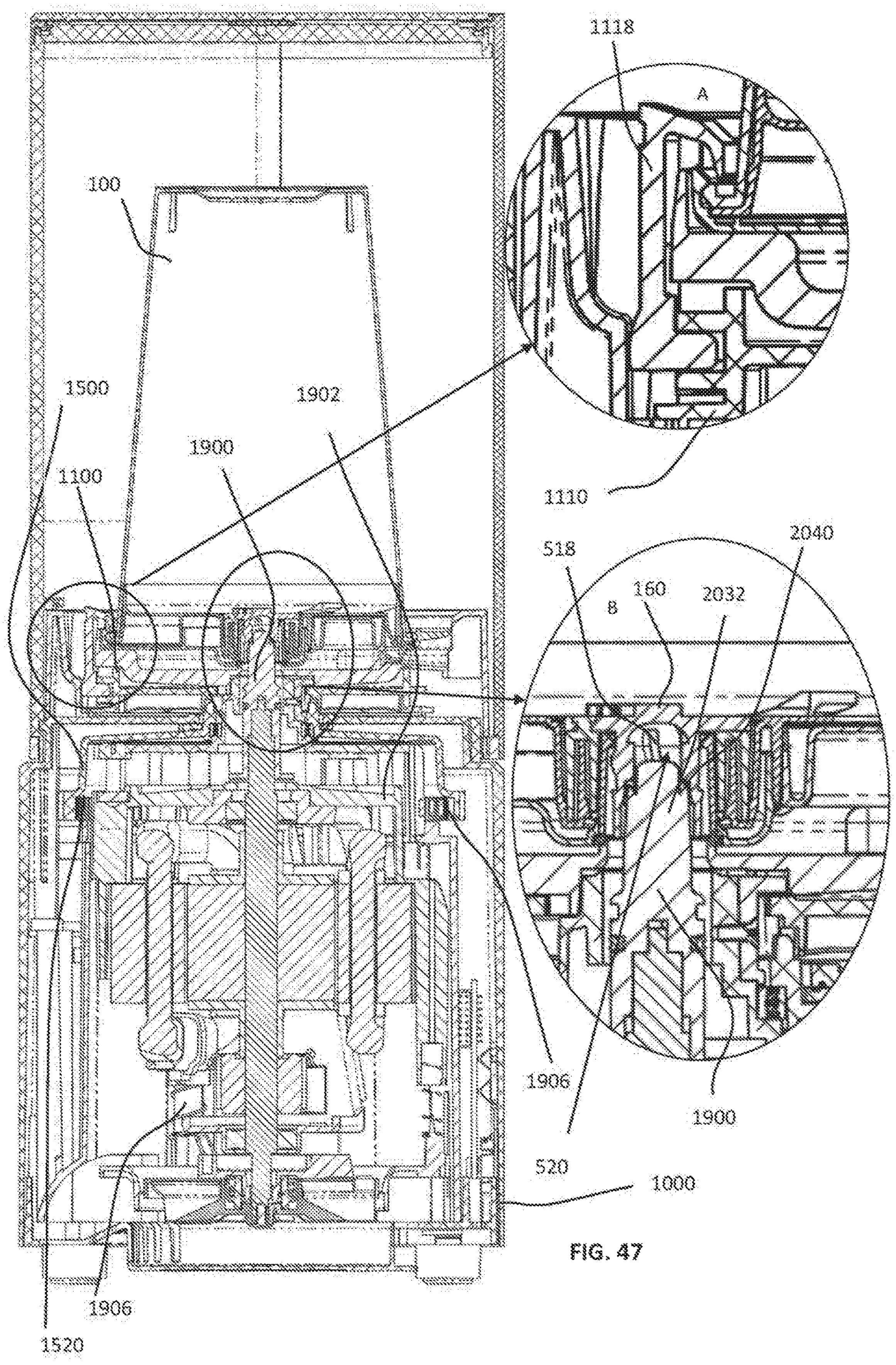
FIG. 47 is a simplified sectional illustration, corresponding to FIG. 45 but showing the SUPCA of FIGS. 44A-44F in upside-down partially clamped operative engagement with the MMIDD of FIGS. 7A-37G.

Reference is now made to FIG. 47, which is a simplified sectional illustration, corresponding to FIG. 45 but showing SUPCA 100 in upside-down partially clamped operative engagement with MMIDD 1000. It is appreciated that the various elements of MMIDD 1000 have moved to their respective positions as shown at II in FIG. 35 and in FIG. 36B.

As seen in FIG. 47, the operation of auxiliary rotary drive motor 1520 in operative engagement with rotary drive gear 1500 causes rotation of spindles 1906 which raises motor support bracket assembly 1902 producing corresponding raising of drive shaft assembly 1900, while rotating cam element 1110, which reorients clamp element 1118 to its inward clamping orientation, as shown in enlargement A of FIG. 47. It is appreciated that clamp elements 1116 and 1120 are similarly positioned within pockets 1256 and 1260, respectively.

As seen particularly clearly in enlargement B of FIG. 47, generally solid section 2032 of drive shaft assembly 1900 is partially seated in drive shaft seating recess 520 of blade 160. It is noted that lower portions of curved splines 518 of blade 160 remain azimuthally aligned with top portions of curved recesses 2040 of drive shaft assembly 1900.

Figure 48:
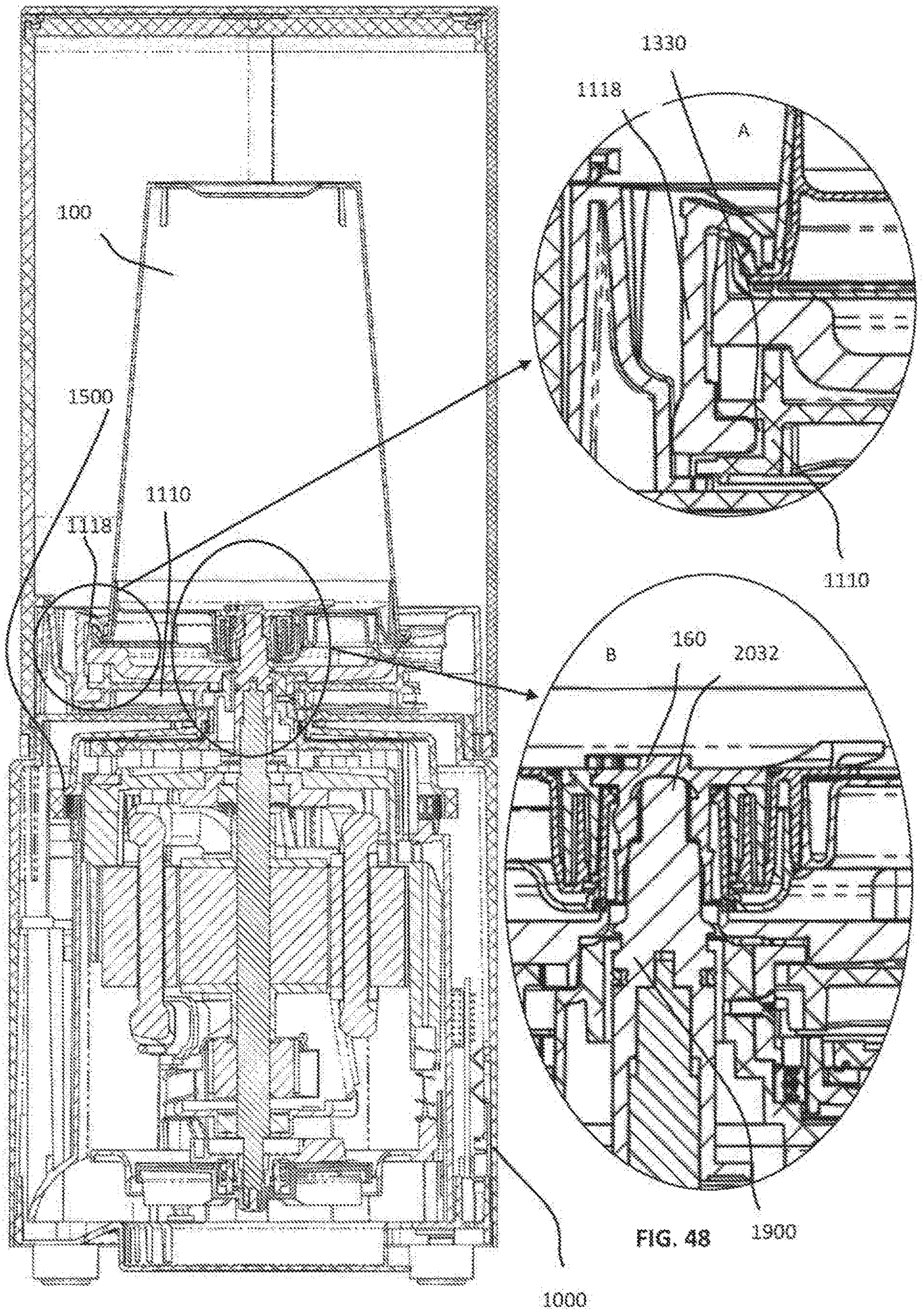
FIG. 48 is a simplified sectional illustration corresponding to FIG. 47 but showing the SUPCA of FIGS. 44A-44F in upside-down fully clamped operative engagement with the MMIDD of FIGS. 7A-37G.

Reference is now made to FIG. 48, which is a simplified sectional illustration, corresponding to FIG. 47, but showing SUPCA 100 in upside-down fully clamped operative engagement with MMIDD 1000, as seen in an enlargement A of FIG. 48. It is appreciated that the various elements of MMIDD 1000 have moved to their respective positions as shown at II in FIG. 35 and in FIG. 36C. The full clamping is a result of each of clamping elements 1116, 1118 and 1120 being located at a lower portion of cam channel 1330 as the result of rotation of cam element 1110.

As seen particularly clearly in enlargement B of FIG. 43A, generally solid section 2032 of drive shaft assembly 1900 is fully seated in drive shaft seating recess 520 of blade 160, such that curved splines 518 of blade 160 are fully engaged with curved recesses 2040 of drive shaft assembly 1900. It is further seen that blade 160 remains in blade receiving recess 420 of lid 140.

Figure 49:
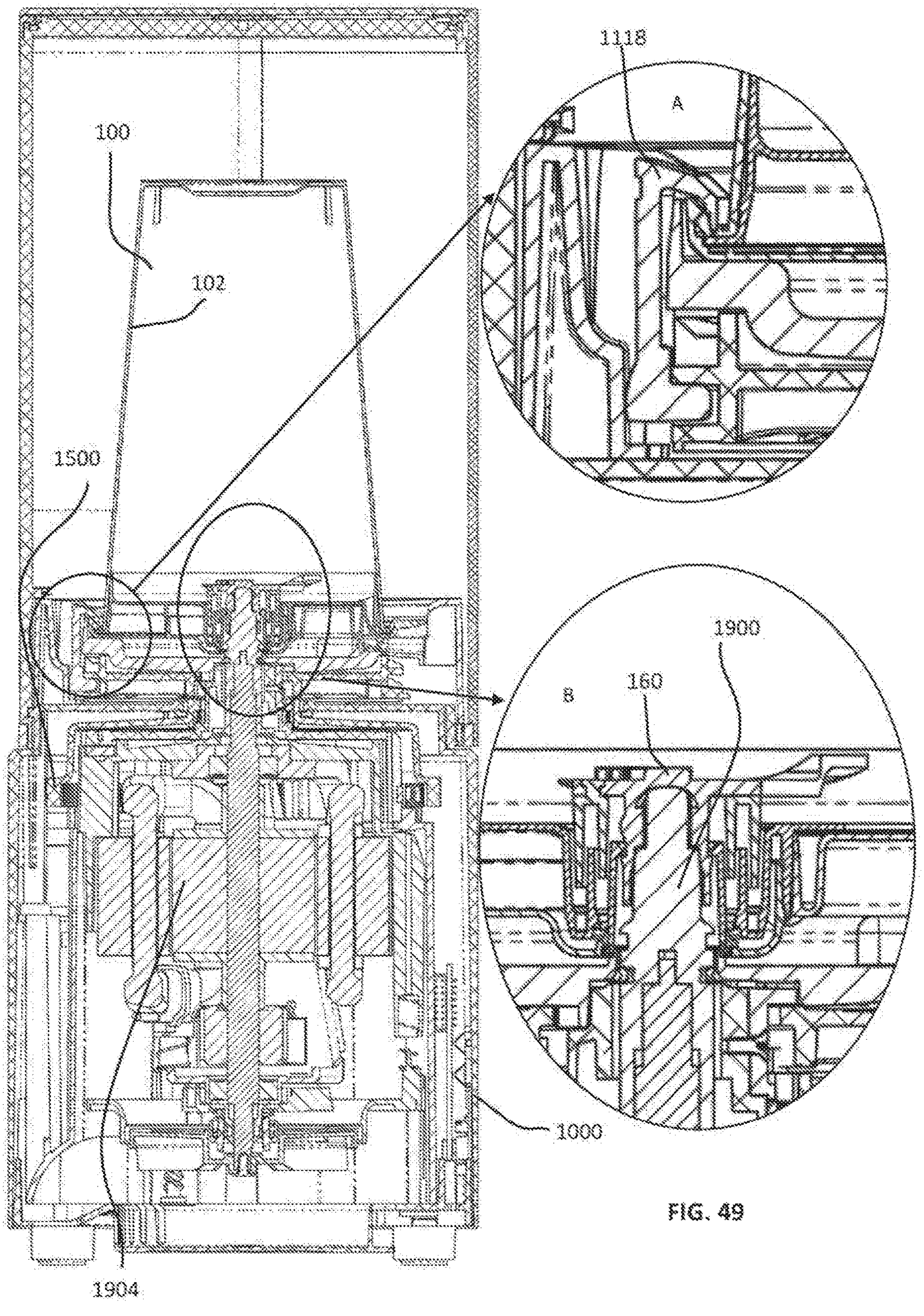
FIG. 49 is a simplified sectional illustration corresponding to FIG. 48 but showing the SUPCA of FIGS. 44A-44F in operative engagement with the MMIDD of FIGS. 7A-37G wherein the blade of FIGS. 6A-6G of said SUPCA is extended and rotatable.

Reference is now made to FIG. 49, which is a simplified sectional illustration, corresponding to FIG. 48 but showing SUPCA 100 in operative engagement with MMIDD 1000 wherein blade 160 of SUPCA 100 is extended and rotatable. It is appreciated that the various elements of MMIDD 1000 have moved to their respective positions as shown at IV in FIG. 35 and in FIG. 36D.

As seen particularly clearly in enlargement B of FIG. 49, drive shaft assembly 1900, which is fully seated in drive shaft seating recess 520 of blade 160, is raised causing blade 160 to be raised out of blade receiving recess 420. Curved splines 518 of blade 160 remain fully engaged with curved recesses 2040 of drive shaft assembly 1900 and produce a bayonet-type engagement therebetween. At this stage, electric motor 1904 is preferably operative to drive blade 160 in rotational motion within the container body 102 for processing the contents thereof, as described hereinbelow with reference to FIG. 55H.

It is a particular feature of the above-described embodiment of the present invention that leakage of liquids from SUPCA 100 when it is in an upside-down state in engagement with MMIDD 1000 is prevented. This leakage prevention is preferably provided by a static/dynamic sealing produced by the interaction of blade 160 and lid 140 of SUCSERDREA 120, whose structures have been described hereinabove with reference to FIGS. 6A-6G and FIGS. 5A-5K, respectively.

Figure 2A:
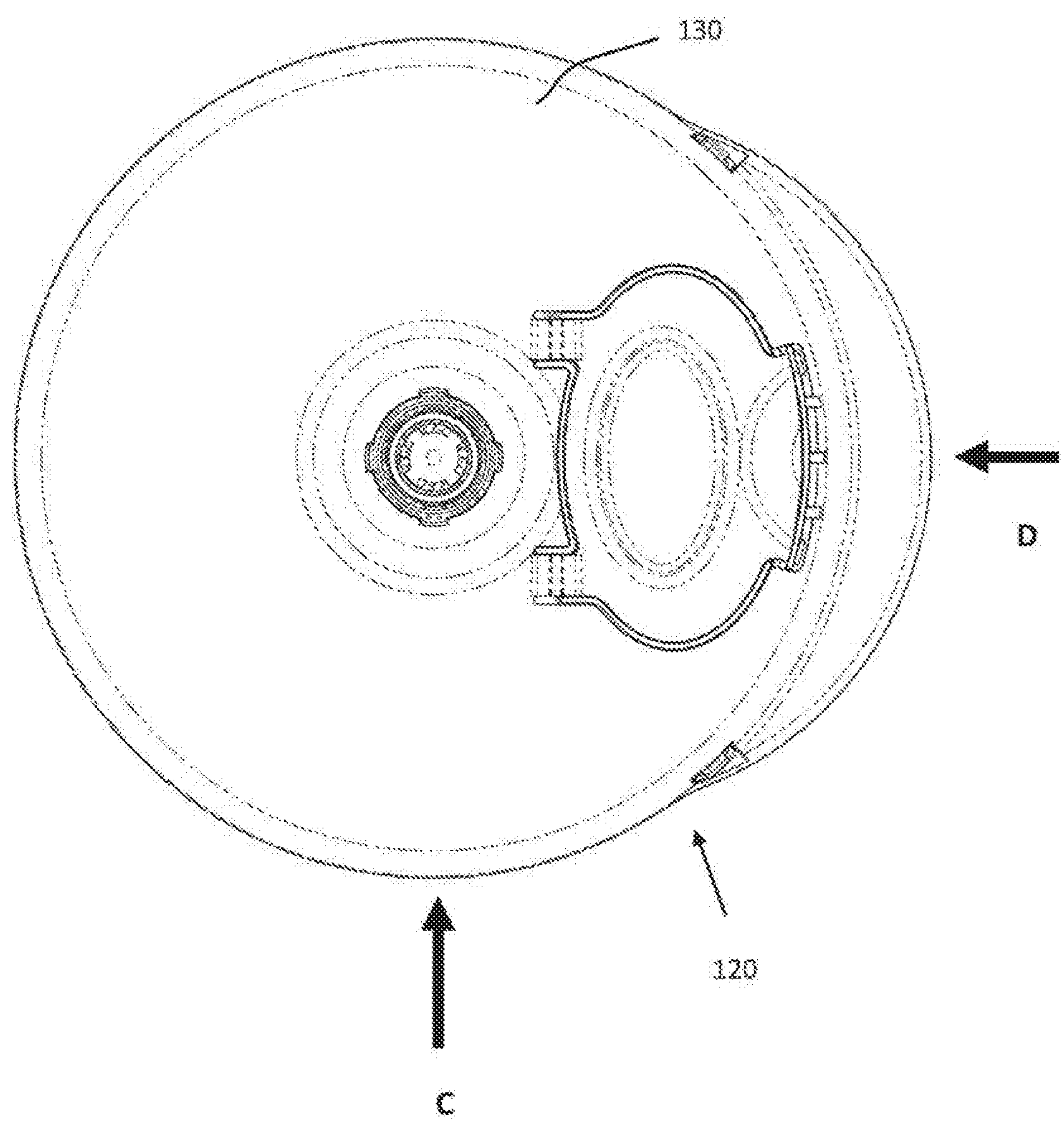
FIGS. 2A, 2B, 2C, 2D, 2E, 2F and 2G are simplified respective planar top view, planar bottom view, first planar side view, second planar side view, first planar sectional, second planar sectional and third planar sectional illustrations of a single-use cover, seal and externally rotatably drivable rotary engagement assembly (SUCSERDREA), forming part of the SUPCA of FIGS. 1A-1H, FIGS. 2C and 2D being taken along directions indicated by respective arrows C and D in FIG. 2A and FIGS. 2E, 2F and 2G, being taken along lines respective lines E-E, F-F and G-G in FIG. 2B.
Figure 2B:
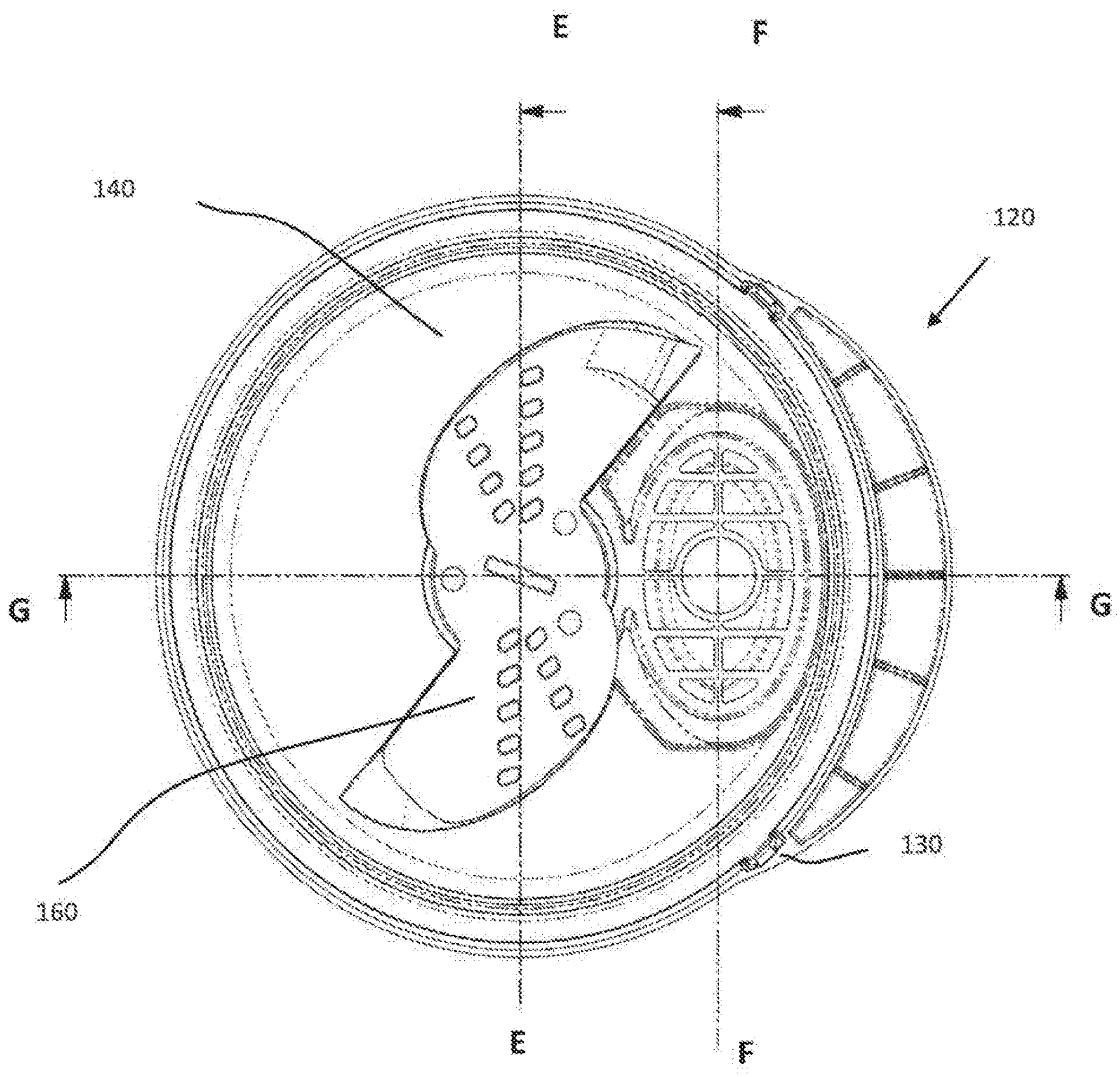
Figure 2C:
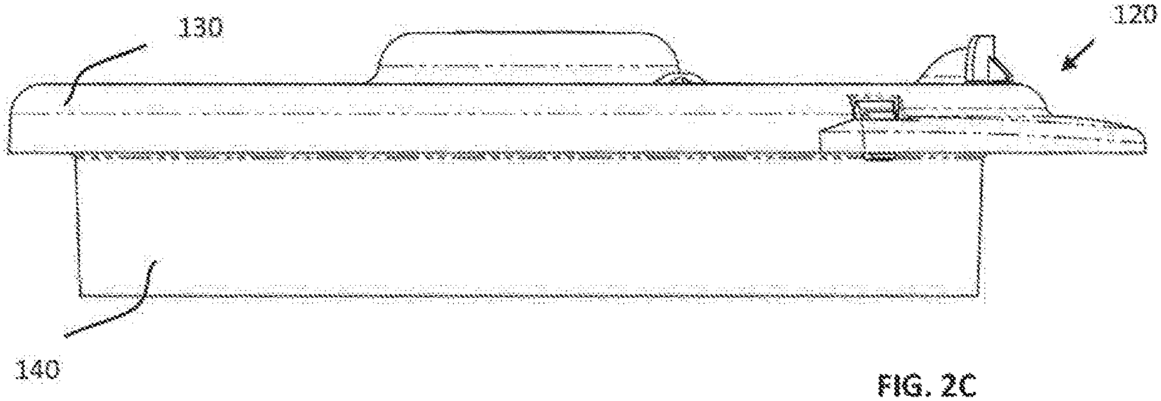
Figure 2D:
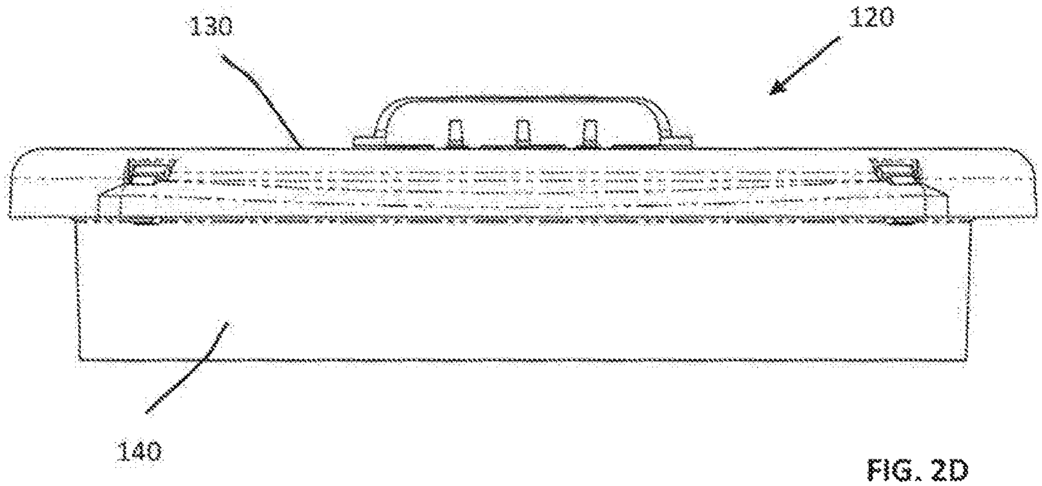
Figure 2E:
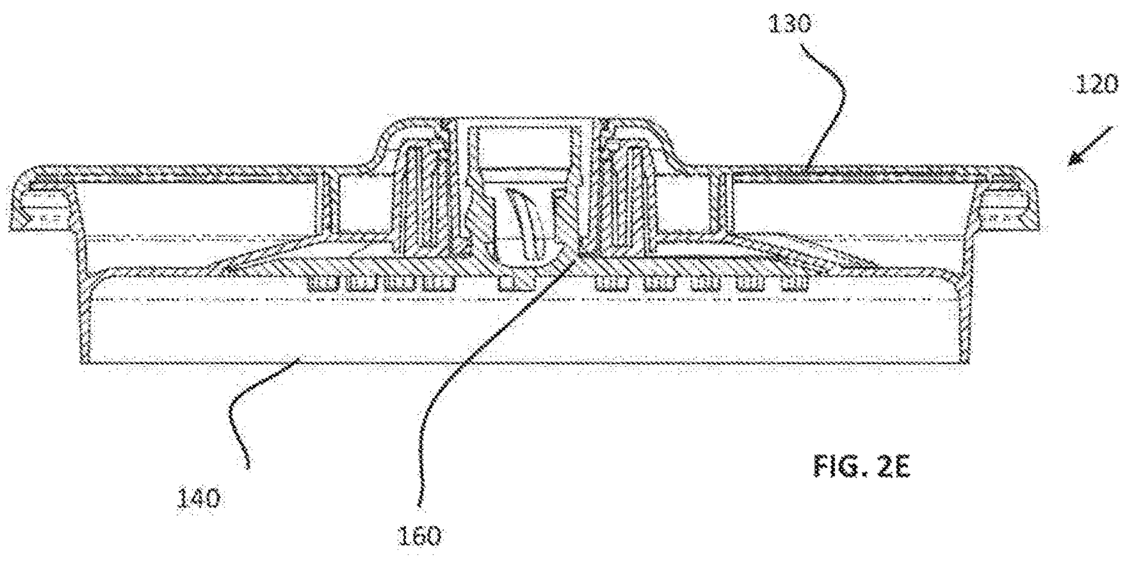
Figure 2F:
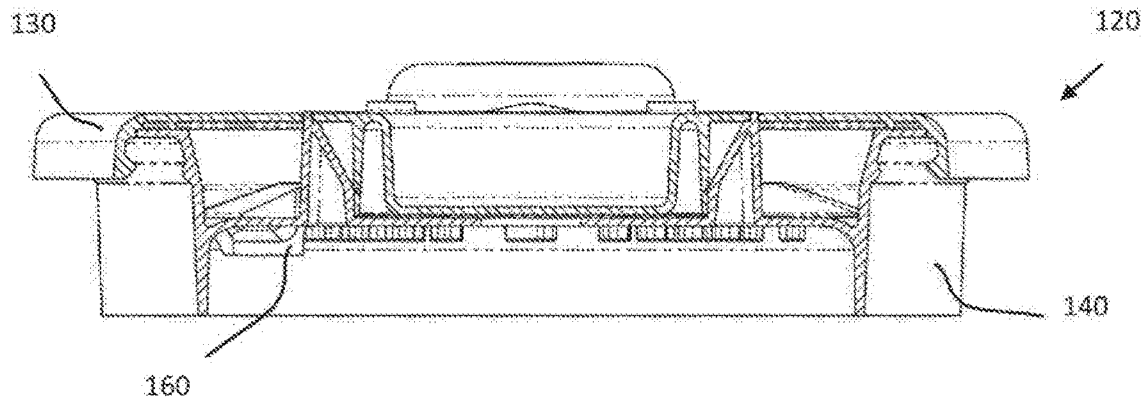
Figure 2G:
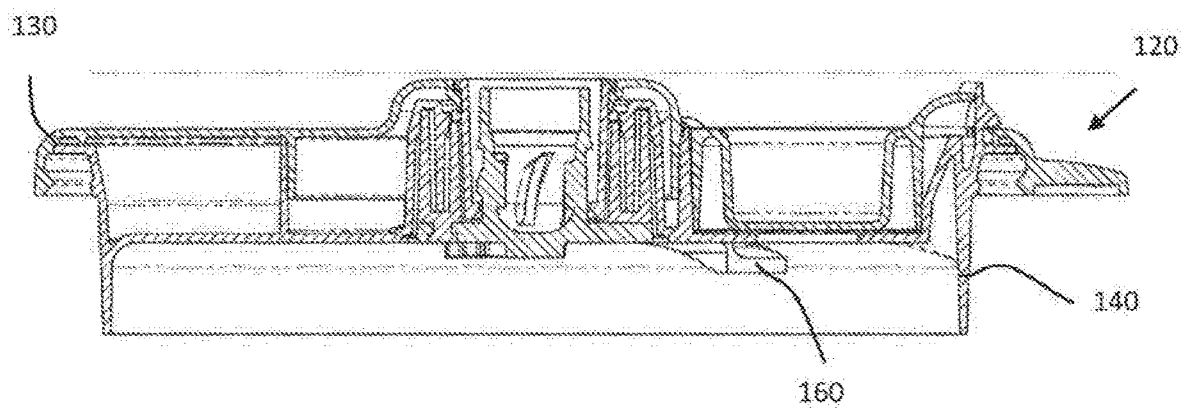
Figure 50A:
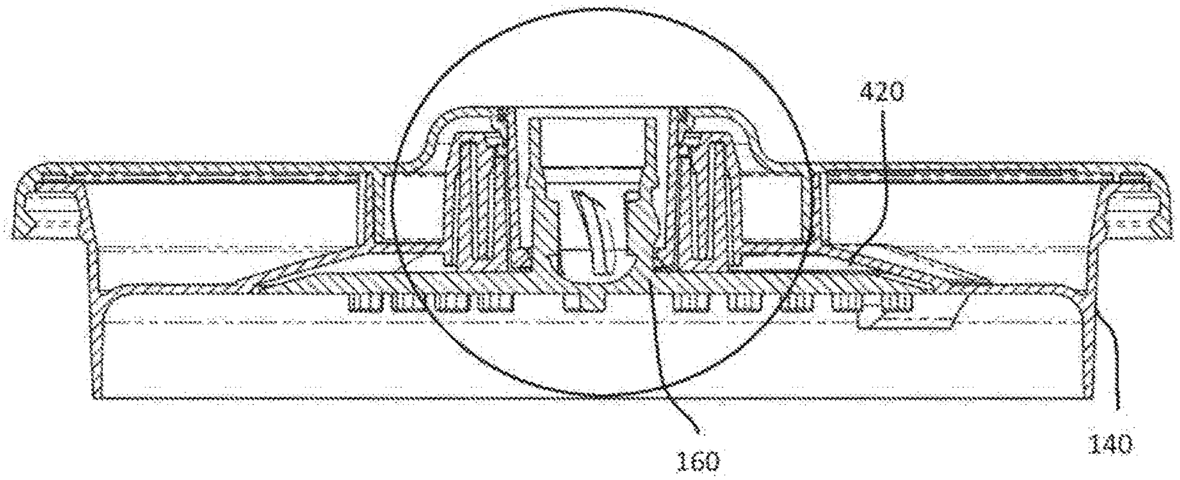
FIGS. 50A and 50B are simplified sectional illustrations of the SUCSERDREA of FIGS. 2A-6G, taken along lines E-E in FIG. 2B, showing two operative orientations providing static/dynamic sealing functionality.
Figure 50A:
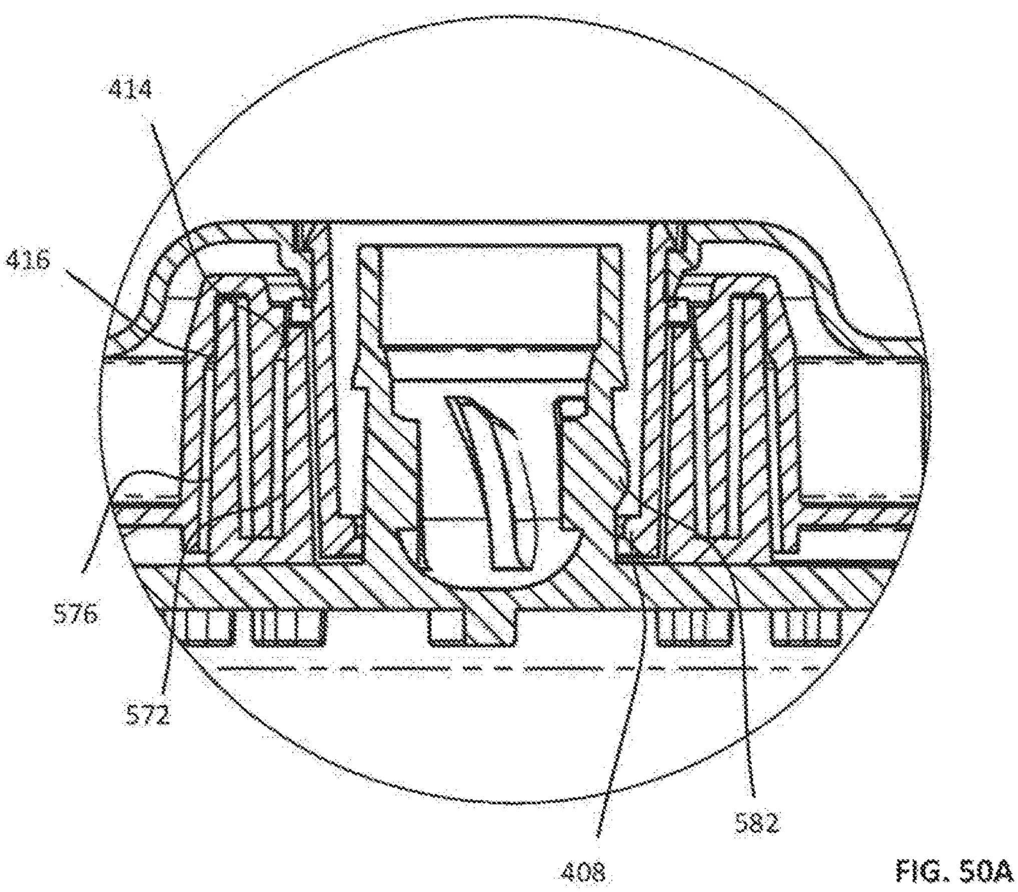
Figure 50B:
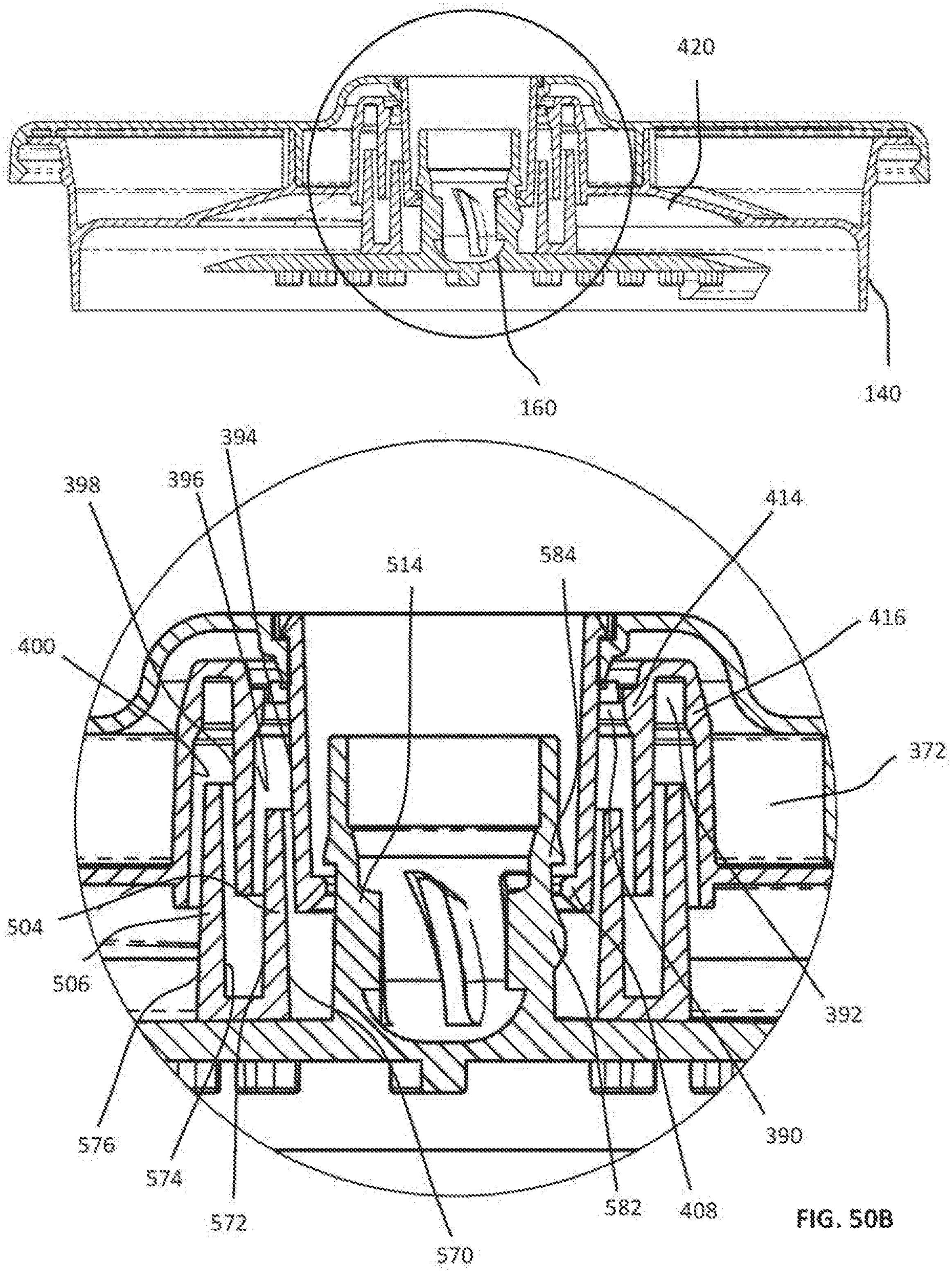

Reference is now made to FIGS. 50A and 50B, which are simplified sectional illustrations of SUCSERDREA 120, taken along lines E-E in FIG. 2B, showing two operative orientations providing static/dynamic sealing functionality. It is noted that FIGS. 50A and 50B are upwardly oriented in the sense of FIG. 1E.

Turning initially to FIG. 50A, it is seen that prior to rotational operation of blade 160, blade 160 is fully seated in downwardly-facing blade receiving recess 420 of lid 140. In this operative orientation, a static seal is defined by pressure engagement between surfaces 572 and 576 of blade 160 and corresponding surfaces of protrusions 414 and 416 of lid 140. It is appreciated that in this operative orientation, blade 160 is mechanically locked to lid 140 against linear mutual displacement therebetween by engagement of inwardly-facing flange 408 of lid 140 with protrusions 582 of blade 160.

Turning now to FIG. 50B, it is seen that immediately prior to rotational operation of blade 160, blade 160 is no longer seated in downwardly-facing blade receiving recess 420 of lid 140. In this operative orientation, which corresponds to operative orientation IV of FIG. 35, a static seal is no longer defined by pressure engagement between surfaces 572 and 576 of blade 160 and corresponding surfaces of protrusions 414 and 416 of lid 140.

However, static sealing is provided by a slight underpressure produced within the region of walls 504, 506 and 514 of blade 160 and recesses 390 and 392 of lid 140 of SUPCA 100 by virtue of raising of blade 160 and possibly also resulting from defrosting of frozen contents of SUPCA 100. Additionally, there are capillary effects between adjacent sealing surfaces 570, 572, 574 and 576 of blade 160 and wall surfaces 394, 396, 398 and 400 of lid 140. The combination of said underpressure and capillary effects resists the leakage of liquid from the interior of SUPCA 100 through the region defined by walls 504, 506 and 514 of blade 160 and recesses 390 and 392 of lid 140 of SUPCA 100.

It is appreciated that in this operative orientation, blade 160 is no longer mechanically locked to lid 140 against linear mutual displacement therebetween by engagement of inwardly-facing flange 408 of lid 140 with protrusions 582 of blade 160. The unlocking results from the axial force provided by raising of drive shaft assembly 1900.

It is noted that, as seen in FIG. 50B, in this operative orientation, to reduce friction, inwardly-facing flange 408 of lid 140 is located at a vertical distance from protrusion 584 of blade 160. It is appreciated that during normal operation of MMIDD 1000 and normal handling of SUPCA 100, provision of inwardly-facing flange 408 of lid 140 prevents disengagement of blade 160 from lid 140.

During rotational operation of blade 160, the configuration of blade 160 and SUCSERDREA 120 are as shown in FIG. 50B, and here dynamic sealing is provided by virtue of centrifugal forces resulting from the rotation of blade 160 relative to lid 140.

It is appreciated that any liquid leaking from SUPCA 100 via SUCSERDREA 120 is preferably channeled via liquid passage apertures 386 into fluid retaining chamber 372 of SUCSERDREA 120.

Figure 51A:
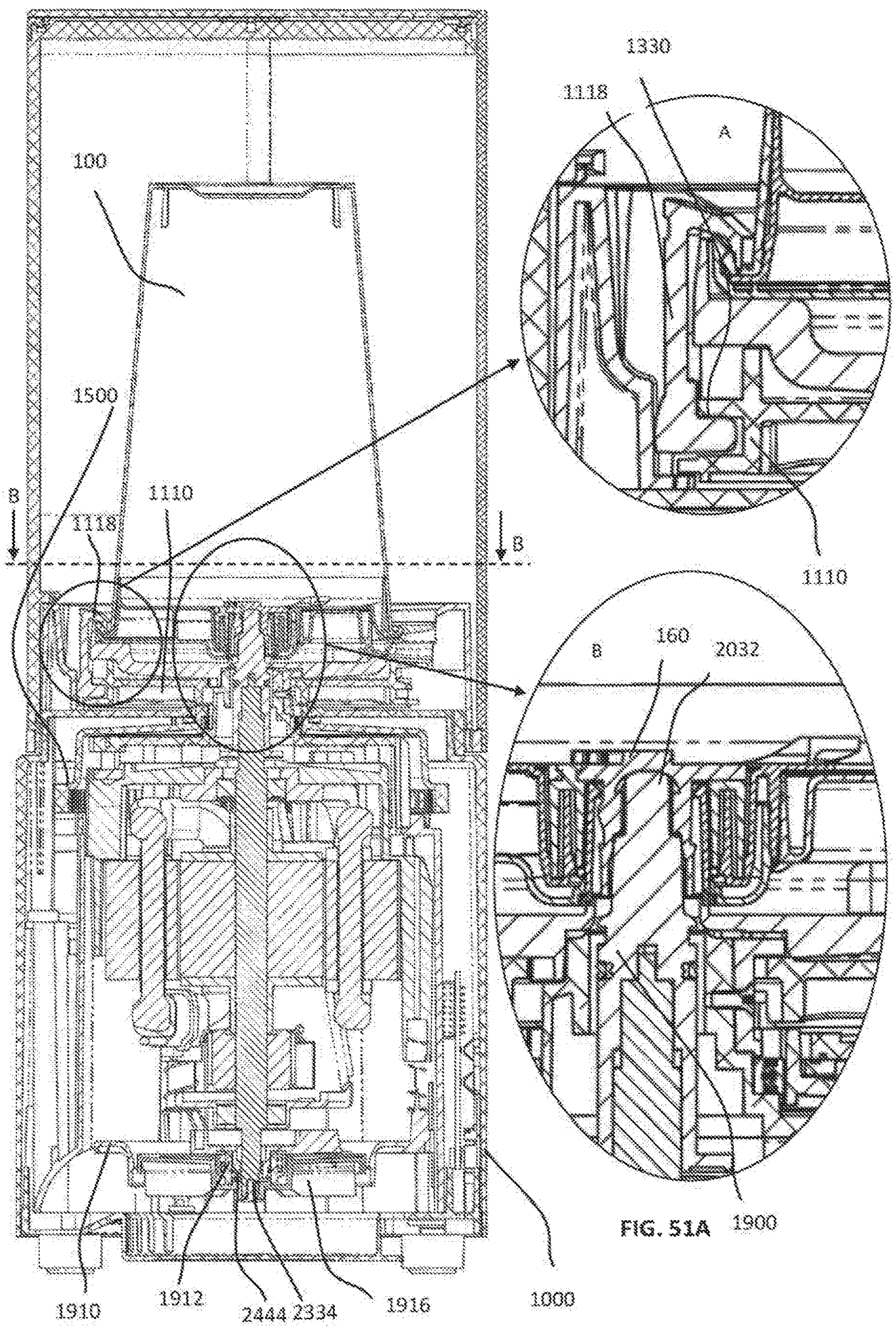
FIG. 51A is a simplified sectional illustration corresponding to FIG. 49, but showing the SUPCA of FIGS. 44A-44F in operative engagement with the MMIDD of FIGS. 7A-37G wherein the blade of FIGS. 6A-6G of said SUPCA is retracted.
Figure 51B:
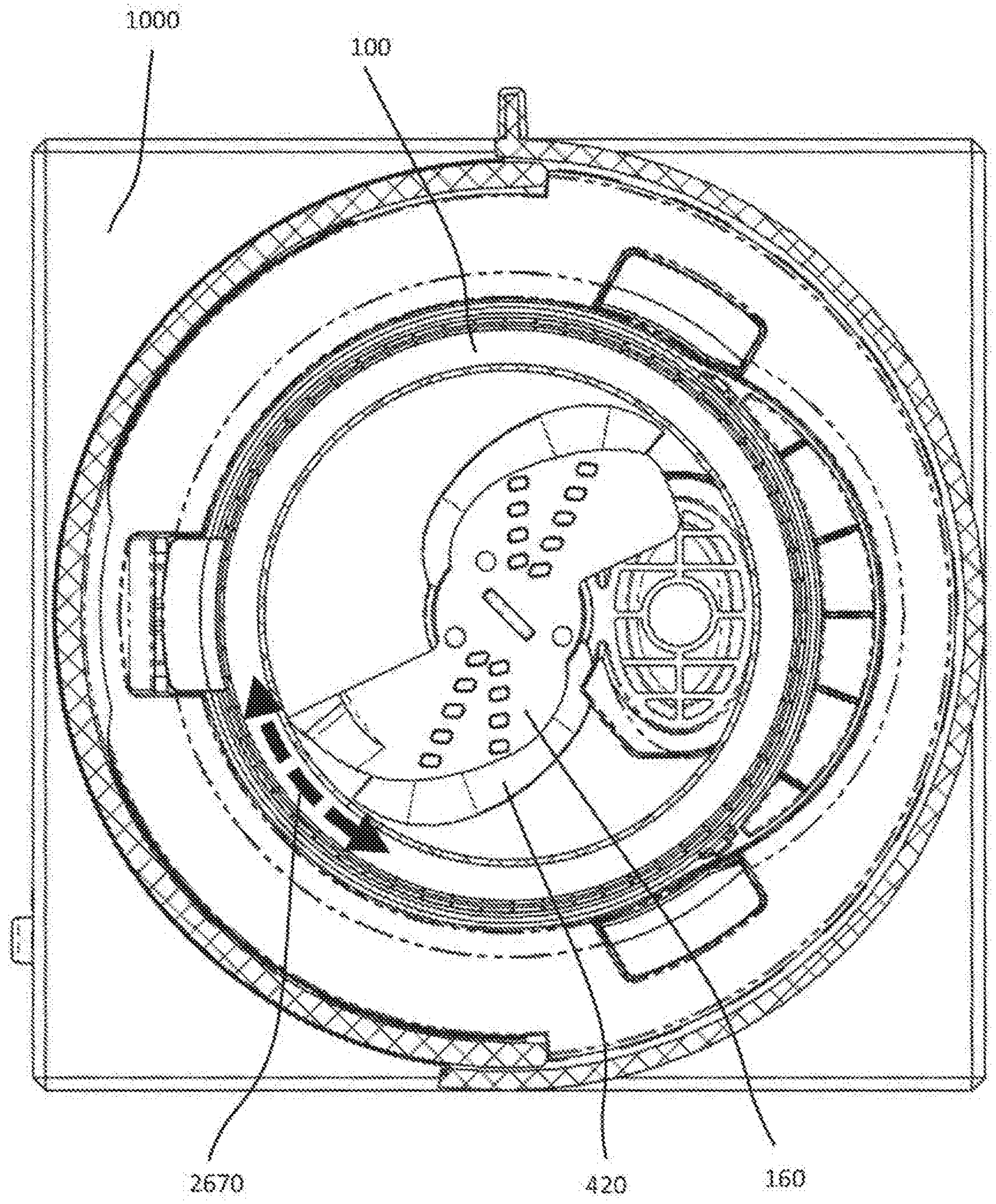
FIG. 51B is a simplified sectional illustration corresponding to FIG. 49, but showing the SUPCA of FIGS. 44A-44F in operative engagement with the MMIDD of FIGS. 7A-37G wherein the blade of FIGS. 6A-6G of said SUPCA is extended and rotatable, and at an arbitrary azimuthal position, taken along lines B-B in FIG. 51A.

Reference is now made to FIGS. 51A and 51B, which are simplified first and second sectional illustrations, wherein FIG. 51A corresponds to FIG. 49 but shows SUPCA 100 in operative engagement with MMIDD 1000 wherein blade 160 of SUPCA 100 is retracted after having been rotated to be aligned with blade receiving recess 420. FIG. 51B shows an arbitrary azimuthal orientation of blade 160 relative to blade receiving recess 420 prior to this rotation.

The rotation of blade 160 to align with blade receiving recess 420, which may be in either a clockwise or counter-clockwise direction, as indicated by an arrow 2670, is produced by mechanical interaction of teeth 2334 of motor lifting element 1910 and teeth 2444 of linearly driven rotating ventilating element 1916, as described hereinabove with reference to FIGS. 37A-37G, which may be preceded by a mechanical interaction of surfaces 2364 and 2426 of linear to rotary convening adaptor 1912 and linearly driven rotating ventilating element 1916, respectively, depending on the precise azimuth location of blade 160 prior to rotation, as shown generally in FIG. 51B. SUPCA 100 remains fully clamped to MMIDD 1000 in the orientation shown in FIGS. 51A and 51B.

Figure 52:
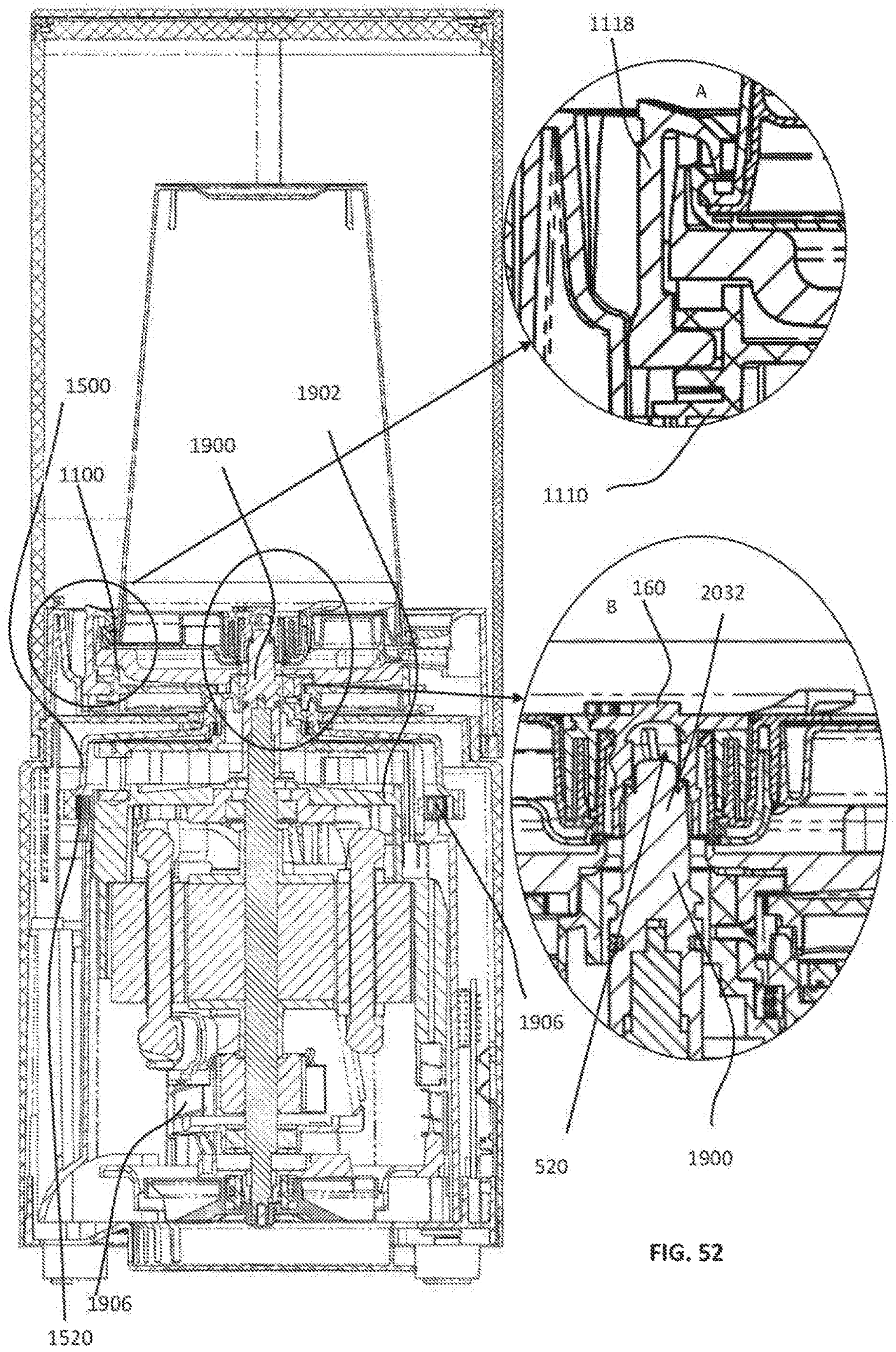
FIG. 52 is a simplified sectional illustration corresponding to FIG. 51A but showing the SUPCA of FIGS. 44A-44F in upside-down partially clamped operative engagement with the MMIDD of FIGS. 7A-37G.
Figure 53:
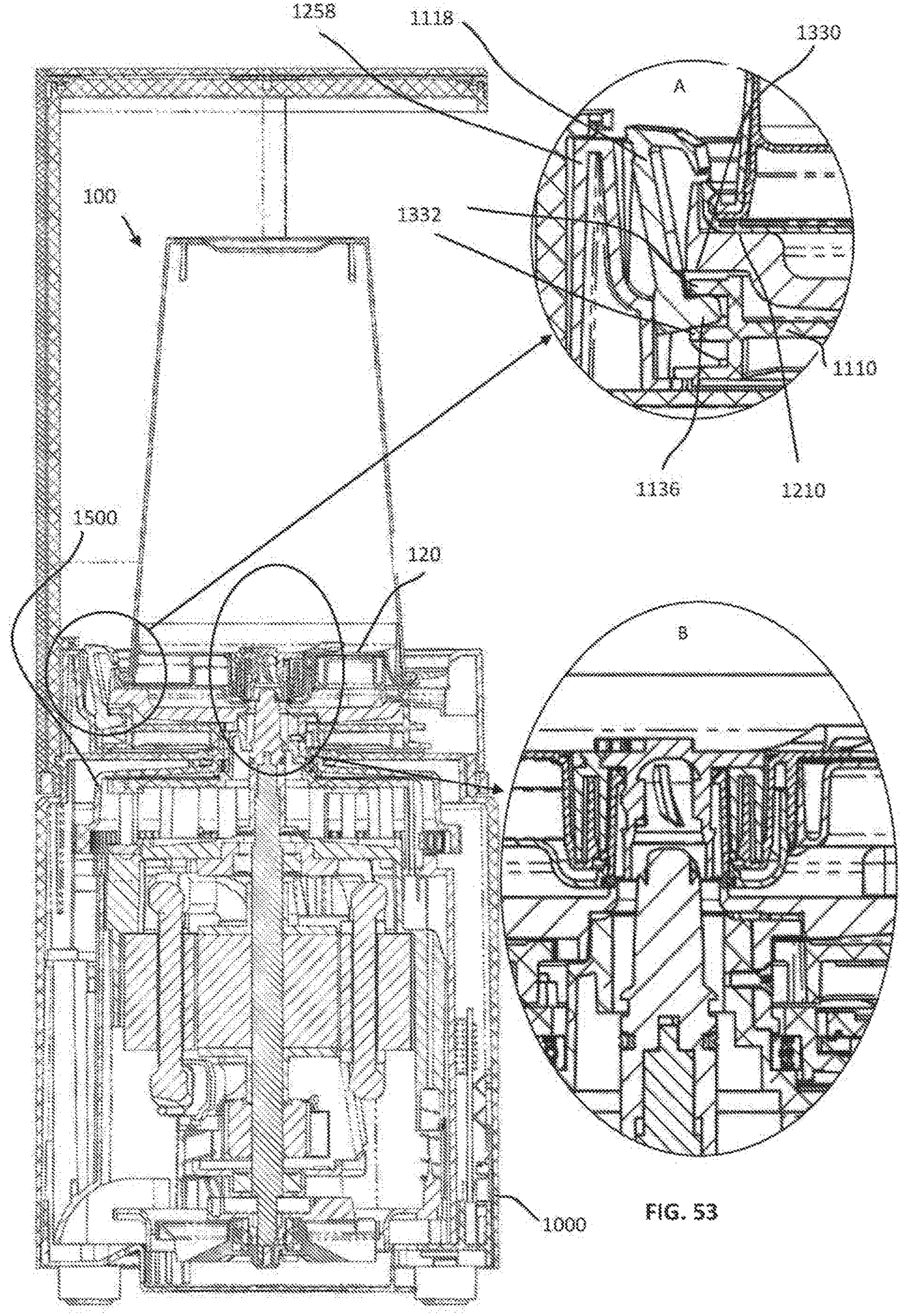
FIG. 53 is a simplified sectional illustration corresponding to FIG. 52 but showing the SUPCA of FIGS. 44A-44F in upside-down unclamped operative engagement with the MMIDD of FIGS. 7A-37G with the top housing assembly of FIGS. 8A-8C in a door open operative orientation.

Reference is now made to FIGS. 52 and 53, which are simplified sectional illustrations, corresponding to FIGS. 47 and 45, respectively. FIG. 52 shows partial unclamping, which is produced by rotation of cam element 1110 as driven by auxiliary rotary drive motor 1520 via rotary drive gear 1500.

It is seen in enlargement B of FIG. 52 that generally solid section 2032 of drive shaft assembly 1900 is no longer fully seated in a drive shaft seating recess 520 of blade 160 by virtue of reverse operation of auxiliary rotary drive motor 1520 in operative engagement with rotary drive gear 1500, which causes reverse rotation of spindles 1906, which, in turn, lowers motor support bracket assembly 1902 producing corresponding lowering of drive shaft assembly 1900, while rotating cam element 1110, which reorients clamp element 1118 to its outward non-clamping orientation, as shown in enlargement A of FIG. 48. It is appreciated that clamp elements 1116 and 1120 are similarly reoriented to their outward non-clamping orientations.

It is appreciated that a transition between operative orientations IV and I shown in FIG. 35 occurs during transitions between the operative orientations shown in FIGS. 49 and 53. It is further appreciated that following completion of rotational operation of blade 160, the SUCSERDREA 120 preferably returns to the operative orientation shown in FIG. 50A.

Figure 54A:
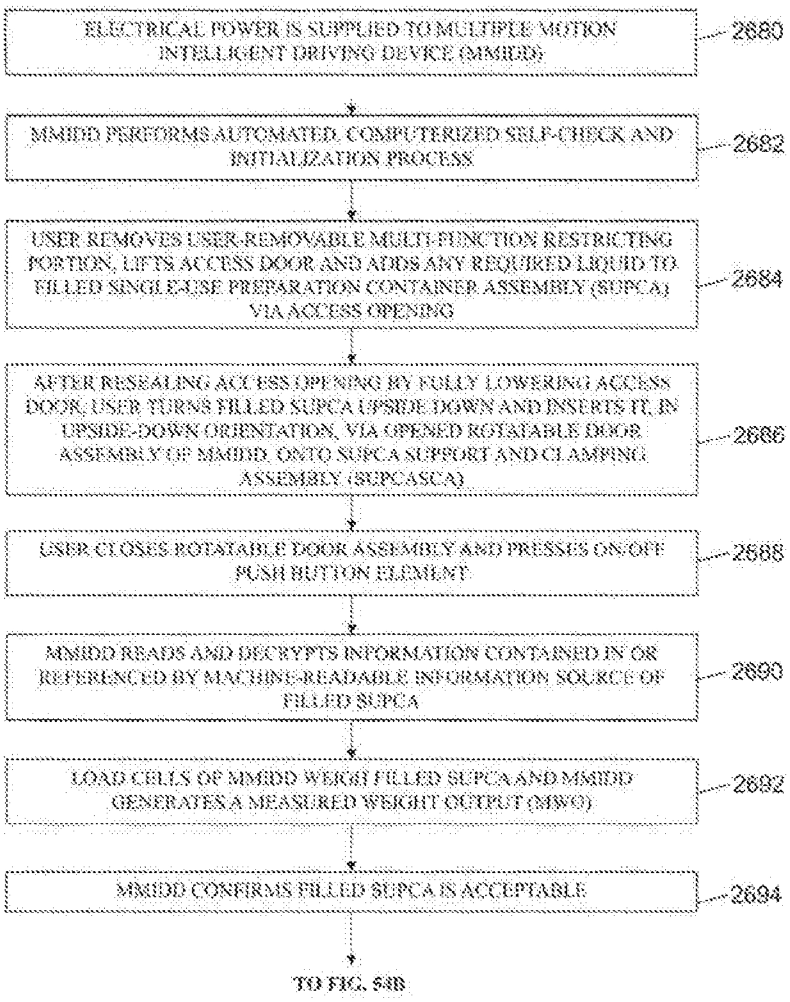
FIGS. 54A and 54B are together a simplified flowchart illustrating control operation of the MMIDD of FIGS. 7A-37G in accordance with a preferred embodiment of the present invention.
Figure 54B:
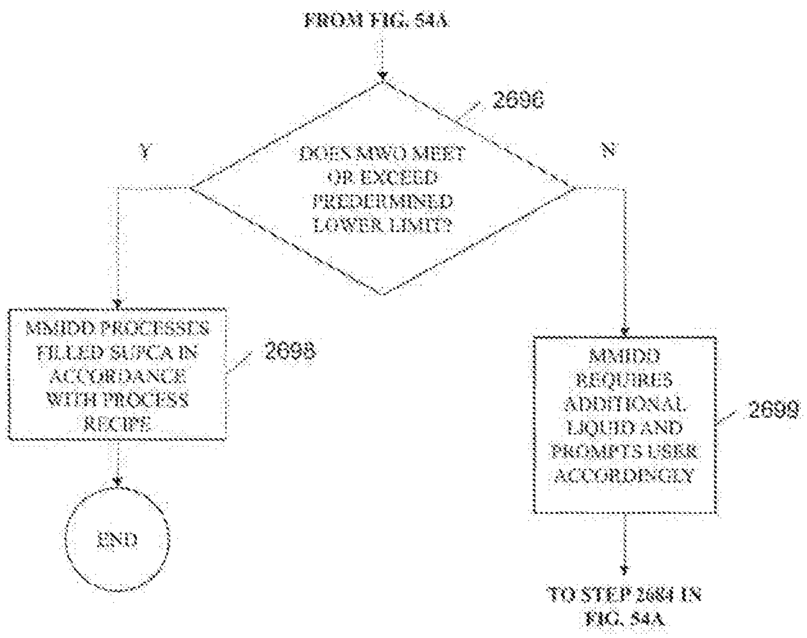

Reference is now made to FIGS. 54A and 54B, which are together a simplified flowchart illustrating control operation of MMIDD 1000 in accordance with a preferred embodiment of the present invention.

As seen in FIGS. 54A & 54B, the principal steps in the operation of the system described hereinabove in FIGS. 1A-53 may be summarized as follows:

At a first step 2680, electrical power is supplied to MMIDD 1000, as by user operation of a power switch (not shown). Then MMIDD 1000 performs an automated, computerized self-check and initialization process, as seen at a second step 2682.

At a third step 2684, a user removes user-removable multi-function restricting portion 340 of SUPCA 100, lifts access door 194 and adds any required liquid to filled single-use preparation container assembly (SUPCA) 100 of FIGS. 1A-6G via access opening 352, as illustrated in FIGS. 41A-43C. It is appreciated that third step 2684 can be performed before, during or after either of steps 2680 and 2682.

After resealing access opening 352 by fully lowering access door 194, a user turns filled SUPCA 100 of FIGS. 1A-6G, containing any added liquid, upside down and inserts it, in an upside-down orientation, via opened rotatable door assembly 1050 of MMIDD 1000 onto SUPCASCA 1030 of MMIDD 1000, as seen at a fourth step 2686 and illustrated in FIGS. 44A-44F.

The process continues to a fifth step 2688, at which a user closes rotatable door assembly 1050 and presses ON/OFF push button element 1420.

At a sixth step 2690. MMIDD 1000 reads and decrypts information contained in or referenced by machine-readable information source 162 of filled SUPCA 100 of FIGS. 1A-6G. This information preferably contains some or all of the following information:

A process recipe for processing of the contents of filled SUPCA 100, including, inter alia, time sequencing of rotation of blade 160 including intended rpm, intended current, current threshold levels and timing;

Reference weight of filled SUPCA 100 (RWF);

Reference weight of the liquid (RWL) to be added by a user to filled SUPCA 100 prior to processing by MMIDD 1000;

Type of filled SUPCA 100 specific ID;

Unique individual filled SUPCA 100 specific ID; and

Internet links to information of possible interest.

The process continues to a seventh step 2692, wherein load cells 1560 of MMIDD 1000 weigh filled SUPCA 100, including any additional user added liquid, and MMIDD 1000 generates a Measured Weight Output (MWO).

Based on some or all of the above information. MMIDD 1000 confirms at an eighth step 2694 that an acceptable filled SUPCA 100 has been inserted into operative engagement therewith. At a ninth step 2696, MMIDD 1000 determines whether or not the MWO meets or exceeds a predetermined lower limit.

As seen in a tenth step 2698, if the MWO of an otherwise acceptable filled SUPCA 100 meets or exceeds the sum of the RWF and RWL, MMIDD 1000 processes filled SUPCA 100 in accordance with the process recipe from machine-readable information source 162 as read by MMIDD 1000 in sixth step 2690, as described in detail hereinbelow with reference to FIGS. 55A-55H.

If the MWO of an otherwise acceptable filled SUPCA 100 is less than the sum of the RWF and RWL, the process continues to an eleventh step 2699, at which MMIDD 1000 requires addition of further liquid to filled SUPCA 100 and prompts the user accordingly. At this point. MMIDD 1000 returns to third step 2684, wherein a user adds required liquid to SUPCA 100, and proceeds therefrom.

Reference is now made to FIGS. 55A-55H, which are together a more detailed series of flowcharts illustrating control operation of MMIDD 1000, including additional steps and processes elucidating the simplified control operation outlined hereinabove with reference to FIGS. 54A and 54B.

Figure 55A:
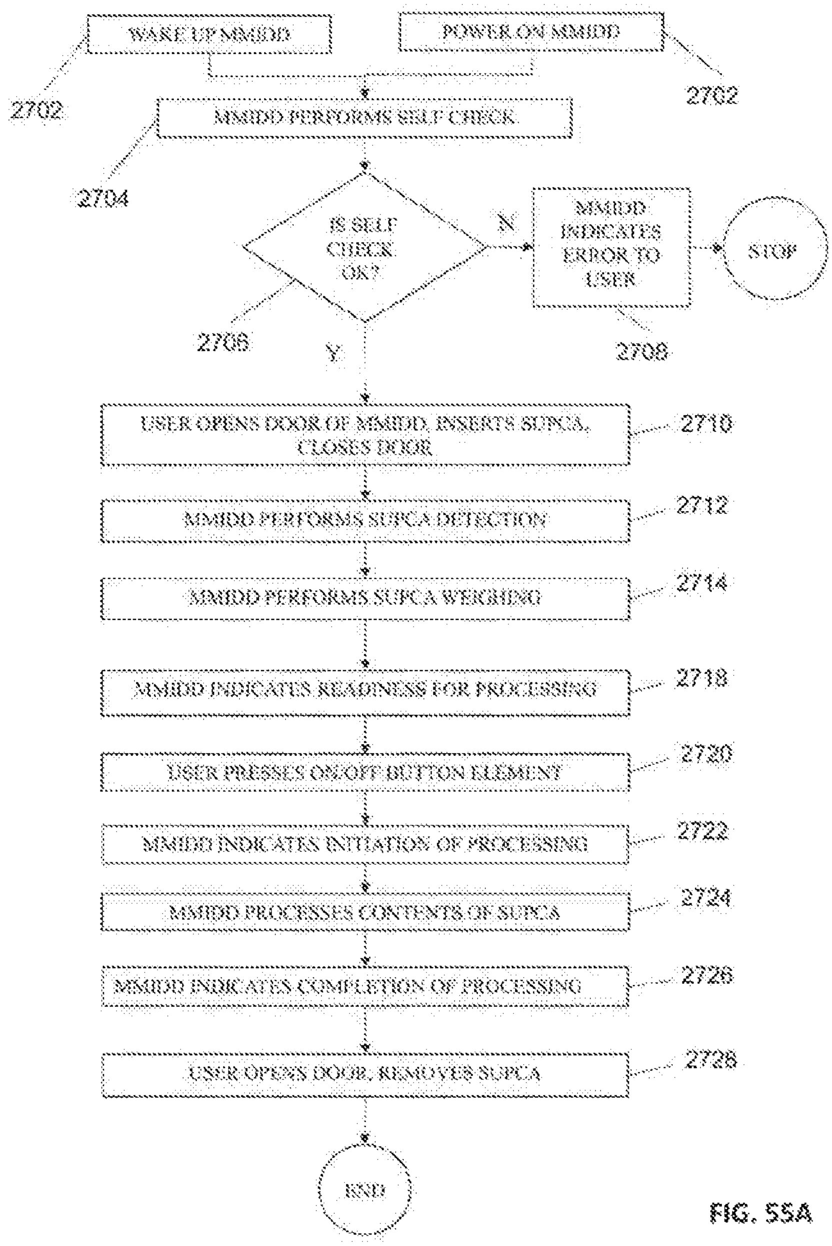
FIGS. 55A, 55B, 55C, 55D, 55E, 55F, 55G and 55H are together a more detailed series of flowcharts illustrating control operation of the MMIDD of FIGS. 7A-37G in accordance with a preferred embodiment of the present invention.

Reference is now made to FIG. 55A, which is a flowchart illustrating the main steps in the operation of the system described hereinabove with reference to FIGS. 1A-53, simplified operational control of which is described in FIGS. 54A and 54B. As seen at a first step 2702. MMIDD 1000 is activated. Such activation may be by way of switching on of electrical power to MMIDD 1000 in the case that MMIDD 1000 is previously non-powered, or may be by way of waking up MMIDD 1000 in the case that MMIDD 1000 is previously in a sleep mode. Upon entering an active powered mode, MMIDD 1000 preferably performs a self-check, as seen at a second step 2704. Second step 2704 is described in detail hereinbelow with reference to FIGS. 55B and 55C.

Following self-check 2704, the results of the self-check are ascertained, as seen at a third step 2706. In the case that the results of the self-check are unacceptable, the user is preferably alerted to the error, as seen at a fourth step 2708 and the operation of MMIDD 1000 is halted. Such an alert may be by way of illumination of one or more LEDs incorporated in buttons and/or icons on the body of MMIDD 1000. In the case that the results of the self-check are acceptable, a user of MMIDD 1000 preferably inserts the inverted, sealed pre-filled SUPCA 100 of FIGS. 42A-43C via opened rotatable door assembly 1050 of MMIDD 1000 onto SUPCASCA 1030, and then closes rotatable door assembly 1050, as seen at a fifth step 2710.

Following insertion of SUPCA 100 at fifth step 2710. MMIDD 1000 preferably detects the presence of SUPCA 100 at a sixth step 2712 and weighs SUPCA 100 at a seventh step 2714. Sixth step 2712 and seventh step 2714 are described in detail hereinbelow with reference to FIG. 55D and FIG. 55E, respectively.

Following successful completion of sixth and seventh steps 2712 and 2714, MMIDD 1000 preferably indicates readiness for performing processing, as seen at an eighth step 2718. Indication of readiness for performing processing may be, for example, by way of illumination of ON/OFF push button element 1420 or other buttons and/or icons on the body of MMIDD 1000, including, for example, a change in color or pattern of illumination. Eighth step 2718 preferably additionally includes MMIDD 1000 checking that rotatable door assembly 1050 is in a closed position prior to indicating readiness for operation.

Responsive to an indication of readiness for performing processing at eighth step 2718, a user preferably presses ON/OFF push button element 1420 to initiate operation of MMIDD 1000, as seen at a ninth step 2720.

Following initiation of MMIDD 1000 operation at ninth step 2720, MMIDD preferably indicates its entry into an operative processing state, as seen at a tenth step 2722. Indication of entry of MMIDD 1000 into an operative processing state may be, for example, by way of a change in the illumination of ON/OFF push button element 1420 or other buttons and/or icons on the body of MMIDD 1000, including, for example a change in color or pattern of illumination.

Upon a user initiating the performance of processing by MMIDD 1000 at ninth step 2720, MMIDD 1000 preferably processes contents of SUPCA 100 at an eleventh processing step 2724. MMIDD 1000 preferably processes contents of SUPCA 100 in accordance with the process recipe as read by MMIDD 1000 in sixth step 2690 of FIG. 54A. Eleventh processing step 2724 is described in detail hereinbelow with reference to FIGS. 55F-55H.

Upon completion of eleventh step 2724, MMIDD 1000 preferably indicates completion of processing of SUPCA 100 at a twelfth step 2726, at which point SUPCA 100 is ready to be removed from MMIDD 1000 by a user. Indication of completion of processing and readiness for removal of SUPCA 100 from MMIDD 1000 may be, for example, by way of illumination of ON/OFF push button element 1420 or other buttons and/or icons on the body of MMIDD 1000, including, for example, a change in color or pattern of illumination. A user may then open rotatable door assembly 1050 and remove SUPCA 100 from MMIDD 1000, as seen at a thirteenth step 2728.

Figure 55B:
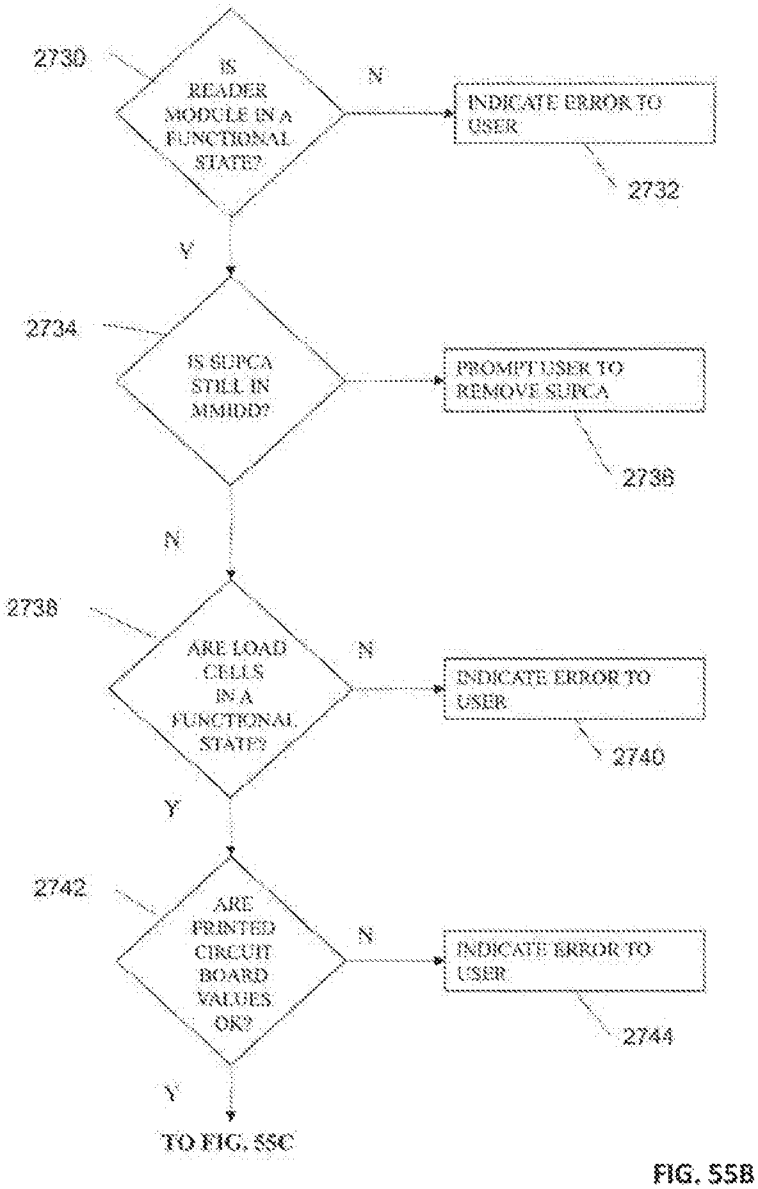
Figure 55C:
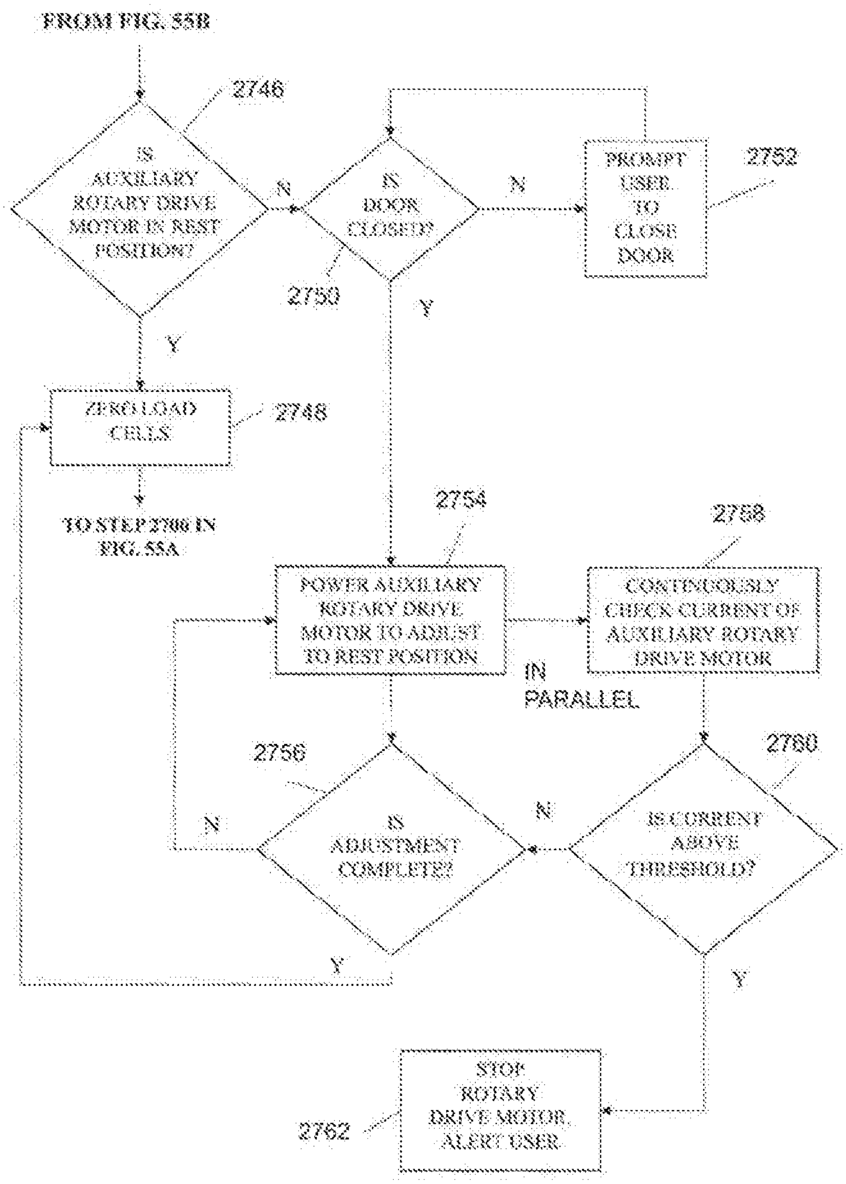

Reference is now made to FIGS. 55B and 55C, which are together a simplified flowchart illustrating sub-steps of fourth step 2704 of FIG. 55A.

As seen in FIG. 55B, self-check 2704 preferably begins at a first self-check sub-step 2730, with MMIDD 1000 checking that a reader module (not shown) included in MMIDD 1000 is in a properly functioning state and hence will be capable of reading machine-readable information source 162 of SUCSERDREA 120 upon insertion thereof in MMIDD 1000. In the case that machine-readable information source 162 is embodied as an RFID tag, the reader module in MMIDD 1000 is preferably embodied as an RFID reader and first self-check sub-step 2730 preferably includes checking that the RFID reader is giving a signal indicative of proper functioning.

If the reader module is not in a properly functioning state, for example, if a reader module embodied as an RFID reader is not providing a suitable signal. MMIDD 1000 preferably alerts the user of this, as seen at a second self-check sub-step 2732.

If the reader module is in a properly functioning state. MMIDD 1000 preferably proceeds to check if a previous SUPCA 100 is still in MMIDD 1000, as seen at a third self-check sub-step 2734. By way of example, in the case that machine-readable information source 162 is embodied as an RFID tag, a reader module embodied as an RFID reader may check for the presence of an RFID tag associated with a SUPCA. If a SUPCA 100 is detected in MMIDD 1000. MMIDD 1000 preferably alerts the user of this and prompts the user to remove SUPCA 100, as seen at a fourth self-check sub-step 2736.

If no SUPCA 100 is detected in MMIDD 1000. MMIDD 1000 preferably proceeds to check if load cells 1560 are in a functional state, for example by way of checking if a load sensor (not shown) associated with load cells 1560 is providing a suitable signal, as seen at a fifth self-check sub-step 2738. If the load sensor is not providing a suitable signal and thus load cells are not properly functioning. MMIDD 1000 preferably alerts the user of this, as seen at a sixth self-check sub-step 2740.

If the load cells are in a functional state. MMIDD 1000 preferably proceeds to perform a self-check on printed circuit board assembly 1440 at a seventh self-check sub-step 2742. Printed circuit board assembly 1440 preferably contains control electronics managing operation of MMIDD 1000, and seventh self-check sub-step 2742 preferably includes checking if voltages and resistances of elements on printed circuit board assembly 1440 are within predetermined acceptable ranges. If the parameters of printed circuit board assembly 1440 are not within acceptable ranges. MMIDD 1000 preferably alerts the user to this, as seen at an eighth self-check sub-step 2744.

Turning now to FIG. 55C, it is seen that if the parameters of printed circuit board assembly 1440 are found to be within acceptable ranges. MMIDD 1000 preferably proceeds, at a ninth self-check sub-step 2746, to check if vertically displacing rotary drive motor assembly 1430, and particularly axially displaceable rotary drive assembly 1530 thereof, is in its rest position, as illustrated in FIG. 36A. By way of example, MMIDD 1000 may confirm that vertically displacing rotary drive motor assembly 1430, and particularly axially displaceable rotary drive assembly 1530 thereof, is in its rest position, by receiving a signal from an optical sensor (not shown) mounted on sensor mounting protrusion 1816 indicating that rotary drive gear 1500 is in a rotational position corresponding to said rest position of vertically displacing rotary drive motor assembly 1430.

If vertically displacing rotary drive motor assembly 1430 including axially displaceable rotary drive assembly 1530 thereof is in its rest position. MMIDD 1000 preferably zeros load cells 1560 at a tenth self-check sub-step 2748, and proceeds to third step 2706 of FIG. 55A.

If, however, vertically displacing rotary drive motor assembly 1430 including axially displaceable rotary drive assembly 1530 is not in its rest position. MMIDD 1000 checks at an eleventh self-check sub-step 2750 if rotatable door assembly 1050 is in a closed orientation relative to static housing assembly 1040. By way of example, MMIDD 1000 may confirm that rotatable door assembly 1050 is in a closed orientation relative to static housing assembly 1040 by receiving a signal from a Hall effect sensor (not shown) mounted on sensor mounting protrusion 1820 indicating that a magnet (not shown) mounted on rotatable door assembly 1050 is in a rotational position corresponding to said closed orientation of rotatable door assembly 1050.

If rotatable door assembly 1050 is not in a closed position. MMIDD 1000 preferably alerts the user of this and prompts the user to close rotatable door assembly 1050, as seen at twelfth self-check sub-step 2752. MMIDD 1000 may alert the user, for example, by way of illumination of ON/OFF push button element 1420 or other buttons and/or icons on the body of MMIDD 1000, including, for example, a change in color or pattern of illumination.

Upon prompting a user to close rotatable door assembly 1050 at twelfth self-check sub-step 2752. MMIDD 1000 returns to eleventh self-check sub-step 2750 and checks if rotatable door assembly 1050 is in a closed position. If at eleventh self-check sub-step 2750 rotatable door assembly 1050 is in a closed position. MMIDD 1000 preferably powers auxiliary rotary drive motor 1520 so as to move vertically displacing rotary drive motor assembly 1430 to the rest position thereof (FIG. 36A), as seen at a thirteenth self-check sub-step 2754. By way of example, thirteenth self-check sub-step 2754 may include rotating auxiliary rotary drive motor 1520 in a counterclockwise direction.

MMIDD 1000 preferably subsequently ascertains at a fourteenth self-check sub-step 2756 whether adjustment is complete. Specifically. MMIDD 1000 checks whether vertically displacing rotary drive motor assembly 1430 and hence auxiliary axially displaceable rotary drive assembly 1530 thereof is at the rest position thereof. In the case that vertically displacing rotary drive motor assembly 1430 has not yet assumed the rest position thereof. MMIDD 1000 returns to thirteenth self-check sub-step 2754.

By way of example, MMIDD 1000 may confirm that vertically displacing rotary drive motor assembly 1430, and particularly axially displaceable rotary drive assembly 1530 thereof, is in its rest position, by receiving a signal from an optical sensor (not shown) mounted on sensor mounting protrusion 1816 indicating that rotary drive gear 1500 is in a rotational position corresponding to said rest position of vertically displacing rotary drive motor assembly 1430.

In the case in which fourteenth self-check sub-step 2756 finds that vertically displacing rotary drive motor assembly 1430 and hence auxiliary axially displaceable rotary drive assembly 1530 thereof is at the rest position thereof. MMIDD 1000 preferably zeros load cells 1560 at tenth self-check sub-step 2748 and then proceeds to third step 2706 in FIG. 55A.

In parallel with the performance of thirteenth and fourteenth self-check sub-steps 2754 and 2756. MMIDD 1000 preferably continuously checks the current of auxiliary rotary drive motor 1520, as seen at a fifteenth self-check sub-step 2758, in order to detect the presence of a possible blockage. If the measured current is above a predetermined threshold, as seen at a sixteenth self-check sub-step 2760, MMIDD 1000 preferably stops auxiliary rotary drive motor 1520 and alerts the user of a malfunction, for example by way of appropriate illumination of one or more icons and/or buttons incorporated in MMIDD 1000, as seen at seventeenth self-check sub-step 2762.

Figure 55D:
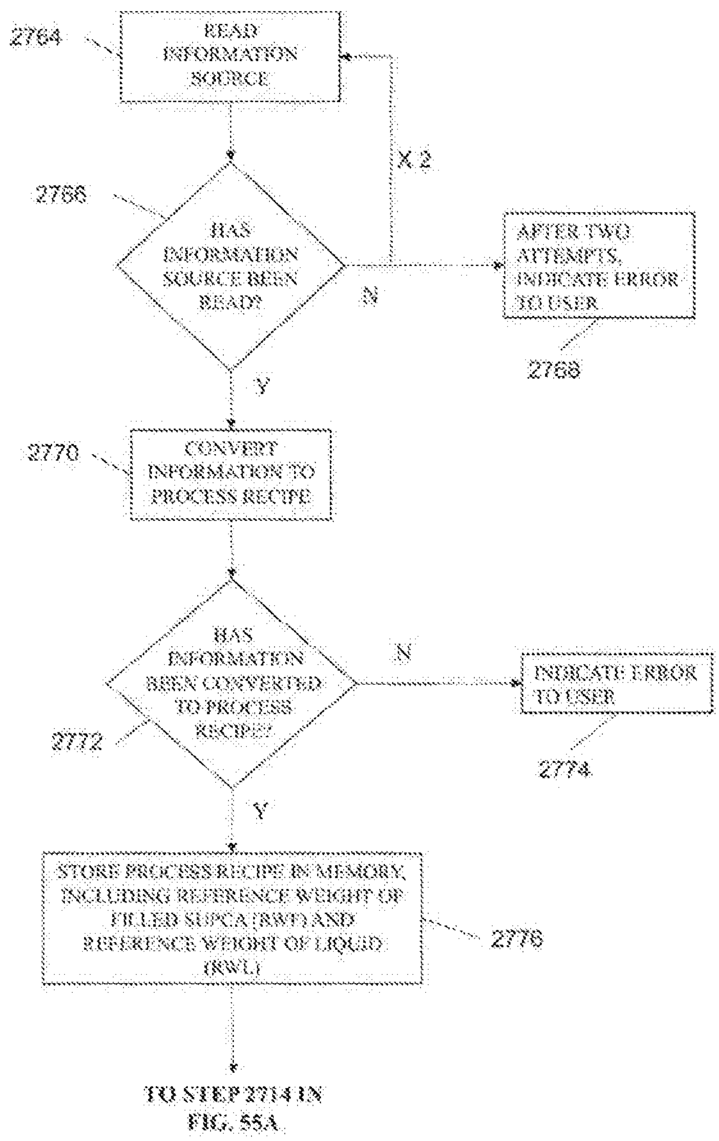

Reference is now made to FIG. 55D, which is a simplified flowchart illustrating sub-steps of sixth step 2712 of FIG. 55A.

As seen in FIG. 55D. MMIDD 1000 preferably reads information contained in or referenced by machine-readable information source 162 of SUCSERDREA 120 at a first SUPCA detection sub-step 2764 and then proceeds, at a second SUPCA detection sub-step 2766, to check if the information has been read. If the information contained in or referenced by machine-readable information source 162 has not been read. MMIDD 1000 preferably repeats first SUPCA detection sub-step 2764. By way of example, MMIDD 1000 may repeat rust SUPCA detection sub-step 2764 twice if second SUPCA detection sub-step 2766 successively indicates that the information has not been read. Following two unsuccessful attempts at carrying out first SUPCA detection sub-step 2764. MMIDD 1000 may indicate this error to a user, for example by way of appropriate illumination of icons or buttons incorporated in MMIDD 1000, as seen at a third SUPCA detection sub-step 2768.

If the information contained in or referenced by machine-readable information source 162 has been read, MMIDD 1000 preferably decrypts the information at a fourth SUPCA detection sub-step 2770. Particularly preferably, MMIDD 1000 preferably converts at least a portion of the information to a process recipe for processing the contents of filled SUPCA 100. Such a process recipe preferably includes information relating to time sequencing of rotation of the blade element 160, including intended rpm, rpm threshold levels and timing.

An exemplary set of instruction steps, structured as a 48 byte structure and suitable for inclusion in or to be referenced by machine-readable information source 162 is set forth in Table 1 below. Additional look-up tables relating to various steps outlined in Table 1 are presented in Tables 2 and 3.

TABLE 1

48 byte structure

| Byte No. | Digit No. | Value range | Value | Description | Definition |
|---|---|---|---|---|---|
| 1 | 1 | 0-1 | 0 | | If value is 0, then recipe can only work if MMIDD is connected to internet |
| | | | 1 | | If value is 1. then recipe is fully programmed |

TABLE 1-continued

| 48 byte structure | | | | | |
|---|---|---|---|---|---|
| Byte No. | Digit No. | Value range | Value | Description | Definition |
| | 2 | 0-9 | 0-9 | | The value 1-9 determines the "mixing" of the data string. It changes the position of e.g. digit no. 2 to e.g. digit no. 24. This number is used to put the digits in the right order again. |
| | 3 | 0-9 | 0-9 | | Digit to add to total sum of digits for Check Sum analysis. |
| 2 | 1<br>2<br>3 | 0-2<br>0-9<br>0-9 | 0-255 | SUPC A weight | Total SUPC A weight (empty SUPC A with ingredients) Each number corresponds to a weight increment of 3 gr → max is 3 × 255 = 765 gr. |
| 3 | 1<br>2<br>3 | 0-2<br>0-9<br>0-9 | 0-255 | Liquid weight | Weight of liquid to be added. Each number corresponds to a weight increment of 3 gr → max is 3 × 255 = 765 gr. |
| 4 | 1 | 0-1 | 0<br>1 | Step 1 definition | Step is preceded by a 0 sec pause.<br>Step is preceded by a 4 sec pause. |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 5 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 6 | 1 | 0-1 | 0<br>1 | Step 2 definition | Step is preceded by a 0 sec pause<br>Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 7 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 8 | 1 | 0-1 | 0<br>1 | Step 3 definition | Step is preceded by a 0 sec pause<br>Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 9 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |

TABLE 1-continued

| 48 byte structure | | | | | |
|---|---|---|---|---|---|
| Byte No. | Digit No. | Value range | Value | Description | Definition |
| 10 | 1 | 0-1 | 0 | Step 4 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 11 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 12 | 1 | 0-1 | 0 | Step 5 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 13 | 1 | 0-2 | 0-1 | | Number of repetitions for this step |
| | 2 | 0-9 | 0-9 | | Upper current limit; 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 14 | 1 | 0-1 | 0 | Step 6 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 15 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 16 | 1 | 0-1 | 0 | Step 7 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 17 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |

TABLE 1-continued

| 48 byte structure | | | | | |
|---|---|---|---|---|---|
| Byte No. | Digit No. | Value range | Value | Description | Definition |
| 18 | 1 | 0-1 | 0 | Step 8 definition | Step is preceded by a 0 sec pause |
| | | | 1 | | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 19 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 20 | 1 | 0-1 | 0 | Step 9 definition | Step is preceded by a 0 sec pause |
| | | | 1 | | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 21 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 22 | 1 | 0-1 | 0 | Step 10 definition | Step is preceded by a 0 sec pause |
| | | | 1 | | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 23 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 24 | 1 | 0-1 | 0 | Step 11 definition | Step is preceded by a 0 sec pause |
| | | | 1 | | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 25 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |

TABLE 1-continued

| 48 byte structure | | | | | |
|---|---|---|---|---|---|
| Byte No. | Digit No. | Value range | Value | Description | Definition |
| 26 | 1 | 0-1 | 0 | Step 12 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 27 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 28 | 1 | 0-1 | 0 | Step 13 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 29 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 30 | 1 | 0-1 | 0 | Step 14 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 31 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 32 | 1 | 0-1 | 0 | Step 15 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 33 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |

TABLE 1-continued

| 48 byte structure | | | | | |
|---|---|---|---|---|---|
| Byte No. | Digit No. | Value range | Value | Description | Definition |
| 34 | 1 | 0-1 | 0 | Slop 16 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 35 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 36 | 1 | 0-1 | 0 | Step 17 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 37 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 38 | 1 | 0-1 | 0 | Step 18 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 39 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 40 | 1 | 0-1 | 0 | Step 19 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 41 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |

TABLE 1-continued

| 48 byte structure | | | | | |
|---|---|---|---|---|---|
| Byte No. | Digit No. | Value range | Value | Description | Definition |
| 42 | 1 | 0-1 | 0 | Step 20 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 43 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 44 | 1 | 0-1 | 0 | Step 21 | Step is preceded by a 0 sec pause |
| | | | 1 | definition | Step is preceded by a 4 sec pause |
| | 2 | 0-9 | 0-9 | | 0 = 0 RPM, 1 = 2.000 RPM, 2 = 3.500 RPM, 3 = 6.000 RPM, 4 = 8.000 RPM, 5 = 10.000 RPM, 6 = 11.000 RPM, 7 = 13.000 RPM, 8 = 15.000 RPM, 9 = 18.000 RPM |
| | 3 | 0-9 | 0-9 | | 0 = 2 sec, 1 = 4 sec, 2 = 6 sec, . . . 9 = 20 sec |
| 45 | 1 | 0-2 | 0-1 | | Number of repetitions for this step |
| | 2 | 0-9 | 0-9 | | Upper current limit: 0 = 6 A, 1 = 6.5 A, 2 = 7 A, 3 = 7.5 A, 4 = 8 A, 5 = 8.5 A, 6 = 9 A, 7 = 9.5 A, 8 = 10 A, 9 = 12 A. |
| | 3 | 0-9 | 0-9 | | Lower current limit: 0 = 2.5 A, 1 = 3 A, 2 = 3.5 A, 3 = 4 A, 4 = 4.5 A, 5 = 5 A, 6 = 5.5 A, 7 = 6 A, 8 = 6.5 A, 9 = 7 A |
| 46 | 1 | 0-1 | 0 | lookup table | This digit refers to the lookup table of |
| | | | 1 | 1 | Table 2, relating to the repetition of |
| | 2 | 0-9 | 0-9 | | steps. |
| | 3 | 0-9 | 0-9 | | |
| 47 | 1 | 0-2 | 0-19 | lookup table | This digit refers to the lookup table of |
| | 2 | 0-9 | | 2 | Table 3, relating to the repetition of |
| | 3 | 0-9 | 0-9 | | steps. |
| 48 | 1 | 0-2 | Any | Stop byte | If this byte equals 255, this is the end |
| | 2 | 0-9 | OR | | of the recipe definition. If ≠ just |
| | 3 | 0-9 | 255 | | continuation of recipe definition. |

TABLE 2

| Look-up table relating to repetition of steps 1-21, referenced by byte 46 | | |
|---|---|---|
| Digit | Sequence Steps to be Repeated | Comments |
| 0 | 0 | Ignore |
| 1 | 10 seconds, 10.000 RPM | Activate |
| 2 | | |
| . . . | | |
| 170 | | time out long |
| 171 | | |
| . . . | | |
| 255 | | |

TABLE 3

| Look-up table relating to the repetition of steps, referenced by byte 47 | | |
|---|---|---|
| Digit | Sequence Steps to be Repeated | Comments |
| 0 | 0 | Ignore |
| 1 | 5 seconds, 5.000 RPM | Activate |
| 2 | | |
| . . . | | |
| 130 | | time out long |
| 131 | | |
| . . . | | |
| 215 | | |

After decrypting machine-readable information at fourth SUPCA detection sub-step 2770, MMIDD 1000 preferably checks that the information has been successfully converted to a process recipe at a fifth SUPCA detection sub-step 2772. If the information has not been successfully converted to a process recipe. MMIDD 1000 alerts the user of this, as seen at a sixth SUPCA detection sub-step 2774.

If machine-readable information has been successfully converted to a process recipe at fourth SUPCA detection sub-step 2770. MMIDD 1000 preferably proceeds to store the obtained process recipe in a memory device of MMIDD 1000, such as a RAM memory, as seen at a seventh SUPCA detection sub-step 2776. As part of seventh SUPCA detection sub-step 2776. MMIDD 1000 preferably stores, inter alia, the reference weight of filled SUPCA 100 (RWF) and the reference weight of the liquid (RWL) to be added by a user to filled SUPCA 100 prior to processing by MMIDD 1000, which RWF and RWL values are preferably included in machine-readable information source 162. After storing the obtained process recipe in a memory device of MMIDD 1000 in seventh SUPCA detection sub-step 2776. MMIDD 1000 continues to seventh step 2714 in FIG. 55A.

Figure 55E:
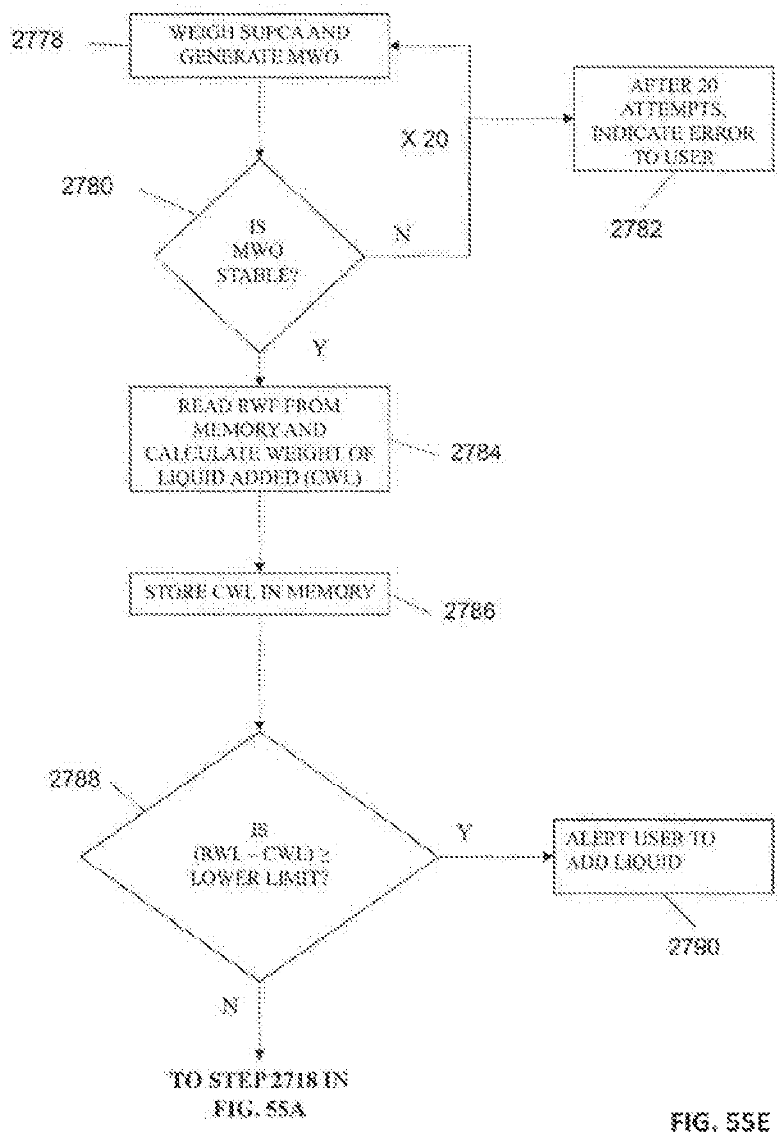

Reference is now made to FIG. 55E, which is a simplified flowchart illustrating sub-steps of seventh step 2714 of FIG. 55A.

As seen in FIG. 55E, load cells 1560 of MMIDD 1000 preferably weigh filled SUPCA 100, as seen at a first SUPCA weighing sub-step 2778, and MMIDD 1000 generates an MWO. MMIDD 1000 then checks at a second SUPCA weighing sub-step 2782 if the MWO generated at first SUPCA weighing sub-step 2778 is stable. If the MWO is not found to be stable, first and second SUPCA weighing sub-steps 2778 and 2780 are preferably repeated until a stable MWO is obtained.

If following multiple repetitions of first and second SUPCA weighing sub-steps 2778 and 2780 a stable MWO has not been obtained, the user is preferably alerted of this at a third SUPCA weighing sub-step 2782. Such an alert may be, for example, by way of illumination of ON/OFF push button element 1420 or other buttons and/or icons on the body of MMIDD 1000, including, for example, a change in color or pattern of illumination. MMIDD 1000 preferably repeats first and second SUPCA weighing sub-steps 2778 and 2780 up to 20 times in order to obtain a stable MWO before MMIDD 1000 alerts a user of malfunction at third SUPCA weighing sub-step 2782. Inability to obtain a stable MWO may be, for example, due to MMIDD 1000 not being placed on a flat and/or stable surface, due to MMIDD 1000 not being free-standing or due to a user touching or leaning on MMIDD 1000.

Following the generation of a stable MWO, MMIDD 1000 preferably calculates the weight of the liquid added by a user (CWL), as seen at a fourth SUPCA weighing sub-step 2784. The CWL is preferably calculated by subtracting the RWF stored in the memory of MMIDD 1000 from the MWO generated in first SUPCA weighing sub-steps 2778. MMIDD 1000 preferably then stores the CWL value obtained, as seen at a fifth SUPCA weighing sub-step 2786.

MMIDD 1000 then compares the CWL value stored at fifth SUPCA weighing sub-step 2786 to the RWL value stored at seventh step 2776 of FIG. 55D and ascertains whether the RWL minus the CWL is greater than or equal to a lower predetermined limit, as seen at a sixth SUPCA weighing sub-step 2788. If the RWL minus the CWL is greater than or equal to the acceptable predetermined limit thereof. MMIDD 1000 requires the addition of liquid to filled SUPCA 100. The user is alerted of this at a seventh SUPCA weighing sub-step 2790. If, however, the RWL minus the CWL is less than to the acceptable predetermined limit thereof, MMIDD 1000 proceeds to eighth step 2718 in FIG. 55A.

Figure 55F:
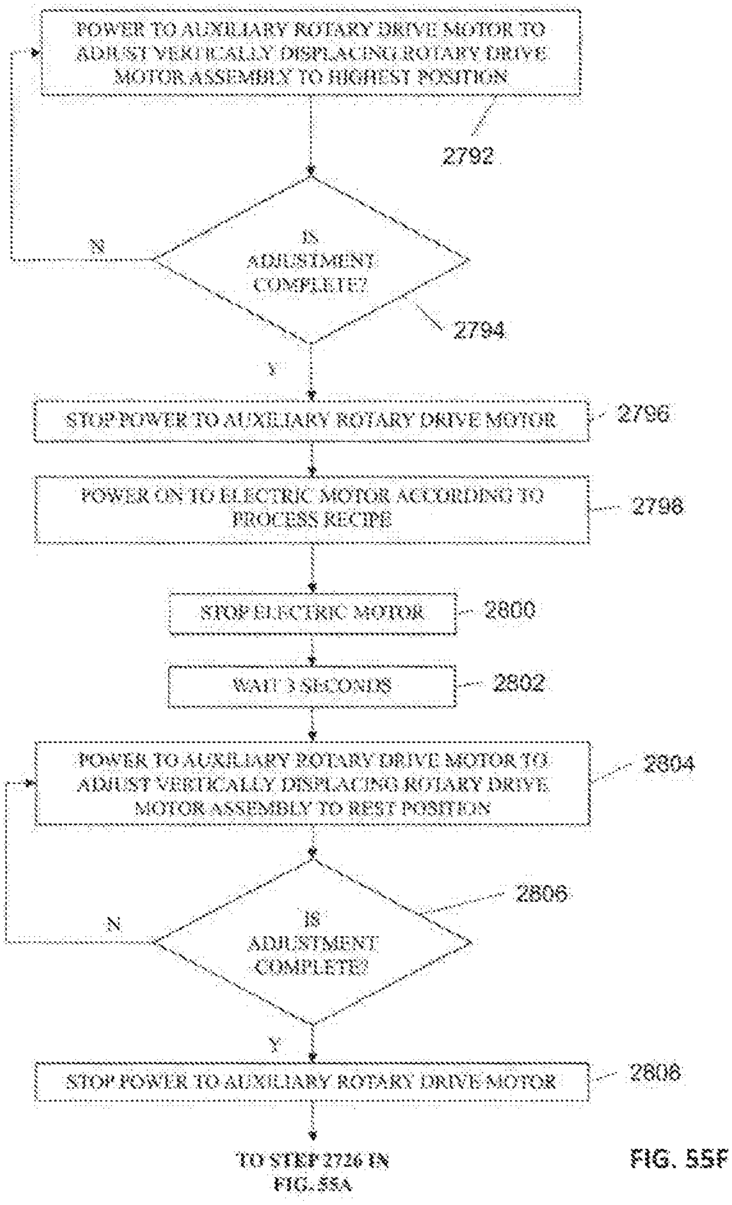

Reference is now made to FIG. 55F, which is a simplified flowchart illustrating sub-steps of eleventh processing step 2724 of FIG. 55A. As seen in a first processing sub-step 2792. MMIDD 1000 preferably powers auxiliary rotary drive motor 1520 at so as to move vertically displacing rotary drive motor assembly 1430, and particularly axially displaceable rotary drive assembly 1530 thereof, to its highest position, as shown in FIG. 36D. By way of example, auxiliary rotary drive motor 1520 may be rotated in a clockwise direction at first processing sub-step 2792.

MMIDD 1000 then proceeds to a second processing sub-step 2794, at which MMIDD 1000 checks if adjustment of vertically displacing rotary drive motor assembly 1430 is complete. By way of example, MMIDD 1000 may confirm that vertically displacing rotary drive motor assembly 1430, and particularly axially displaceable rotary drive assembly 1530 thereof, is in its highest position by receiving a signal from an optical sensor (not shown) mounted on sensor mounting protrusion 1818 indicating that rotary drive gear 1500 is in a rotational position corresponding to highest position of vertically displacing rotary drive motor assembly 1430.

It is appreciated that in parallel with the performance of first and second processing sub-steps 2792 and 2794, MMIDD 1000 preferably continuously checks the current of auxiliary rotary drive motor 1520, as is described in detail hereinbelow with reference to FIG. 55G.

If adjustment of vertically displacing rotary drive motor assembly 1430 is complete, as checked at second processing sub-step 2794, power to auxiliary rotary drive motor 1520 is stopped, as seen at a third processing sub-step 2796.

Following the stopping of power to auxiliary rotary drive motor 1520 at third processing sub-step 2796, power is provided to electric motor 1904 at a fourth processing sub-step 2798. Fourth processing sub-step 2798 is described in detail hereinbelow with reference to FIG. 55H. Electric motor 1904 preferably drives blade element 160 in rotational motion for processing the contents of SUPCA 100, in accordance with the process recipe stored at seventh step 2776 of FIG. 55D, and as described hereinabove with reference to FIG. 49.

As described hereinbelow with reference to FIG. 55H, during operation of electric motor 1904, the current draw thereof is preferably continuously checked in order to ascertain that overloading of electric motor 1904 has not occurred. Should the current be found to exceed a predetermined threshold, thus indicating the possibility of overloading, electric motor 1904 is preferably powered off.

Upon completion of fourth processing sub-step 2798, electric motor 1904 is powered off at a fifth processing sub-step 2800 and MMIDD 1000 pauses, preferably for 3 seconds, as seen in a sixth processing sub-step 2802.

MMIDD 1000 then proceeds to a seventh processing sub-step 2804, at which MMIDD 1000 repowers auxiliary rotary drive motor 1520 in order to return vertically displacing rotary drive motor assembly 1430, and particularly axially displaceable rotary drive assembly 1530 thereof, to the rest position thereof.

As seen at an eighth processing sub-step 2806, one or more sensors preferably check whether vertically displacing rotary drive motor assembly 1430 has assumed said rest position thereof. By way of example, MMIDD 1000 may confirm that vertically displacing rotary drive motor assembly 1430, and particularly axially displaceable rotary drive assembly 1530 thereof, is in its rest position, by receiving a signal from an optical sensor (not shown) mounted on sensor mounting protrusion 1816 indicating that rotary drive gear 1500 is in a rotational position corresponding to said rest position of vertically displacing rotary drive motor assembly 1430.

If vertically displacing rotary drive motor assembly 1430 has returned to its rest position, power is stopped to auxiliary rotary drive motor 1520 at a ninth processing sub-step 2808, and MMIDD 1000 continues to twelfth step 2726 in FIG. 55A.

Figure 55G:
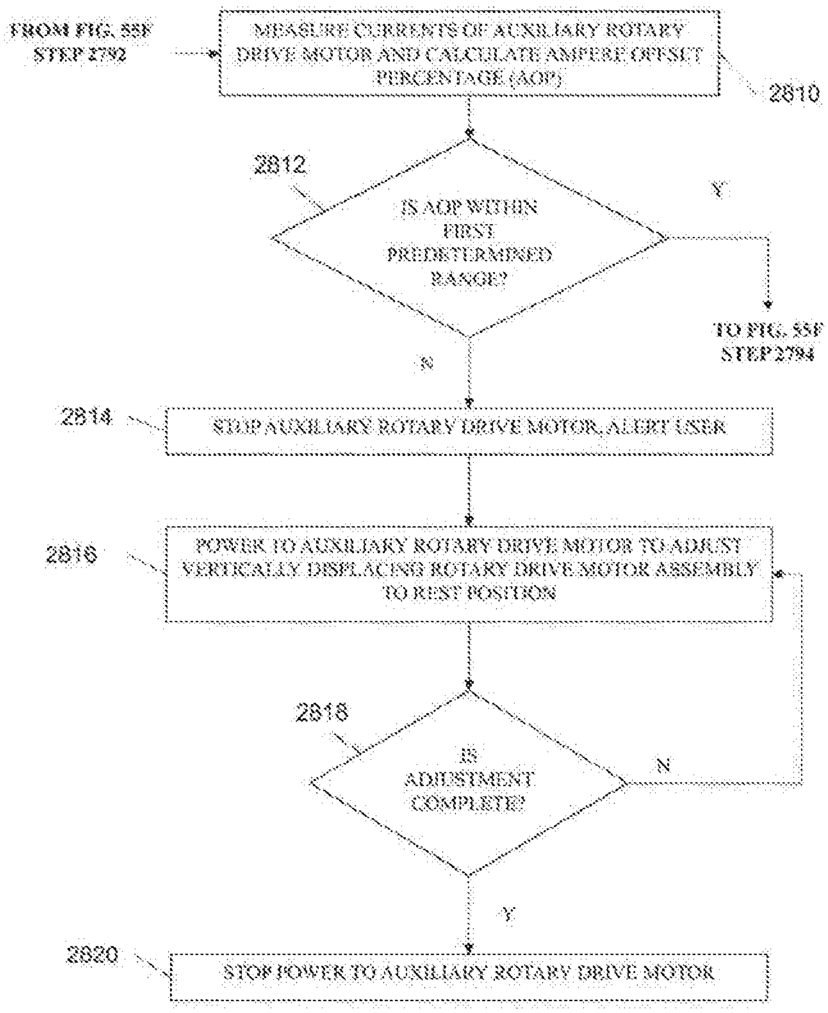

Reference is now made to FIG. 55G, which is a flowchart illustrating further processing sub-steps, performed in parallel with first and second processing sub-steps 2792 and 2794 of FIG. 55F. As seen in a first processing parallel sub-step 2810, the current of auxiliary rotary drive motor 1520 is preferably continuously measured following the onset of first processing sub-step 2792. Measured currents (AREAD) are compared to a predetermined current map (AMAP) and an ampere offset percentage (AOP) defined as ((AMAP−AREAD)/AMAP)*100.

If the AOP is found to lie within an acceptable predetermined range, as seen at a second processing parallel sub-step 2812, auxiliary rotary drive motor 1520 adjustment continues at second processing sub-step 2794 of FIG. 55F.

If, however, at second processing parallel sub-step 2812, the AOP is found to lie outside the acceptable predetermined range, power to auxiliary rotary drive motor 1520 is stopped and the user is notified accordingly, as seen at a third processing parallel sub-step 2814. MMIDD 1000 then proceeds to a fourth processing parallel sub-step 2816, at which MMIDD 1000 repowers auxiliary rotary drive motor 1520 in order to return vertically displacing rotary drive motor assembly 1430, and particularly axially displaceable rotary drive assembly 1530 thereof, to the rest position thereof.

As seen at a fifth processing parallel sub-step 2818, one or more sensors preferably check whether vertically displacing rotary drive motor assembly 1430 has assumed said rest position thereof. Once vertically displacing rotary drive motor assembly 1430 is detected to have returned to its rest position, power to the auxiliary rotary drive motor 1520 is stopped at a sixth processing parallel sub-step 2820.

Figure 55H:
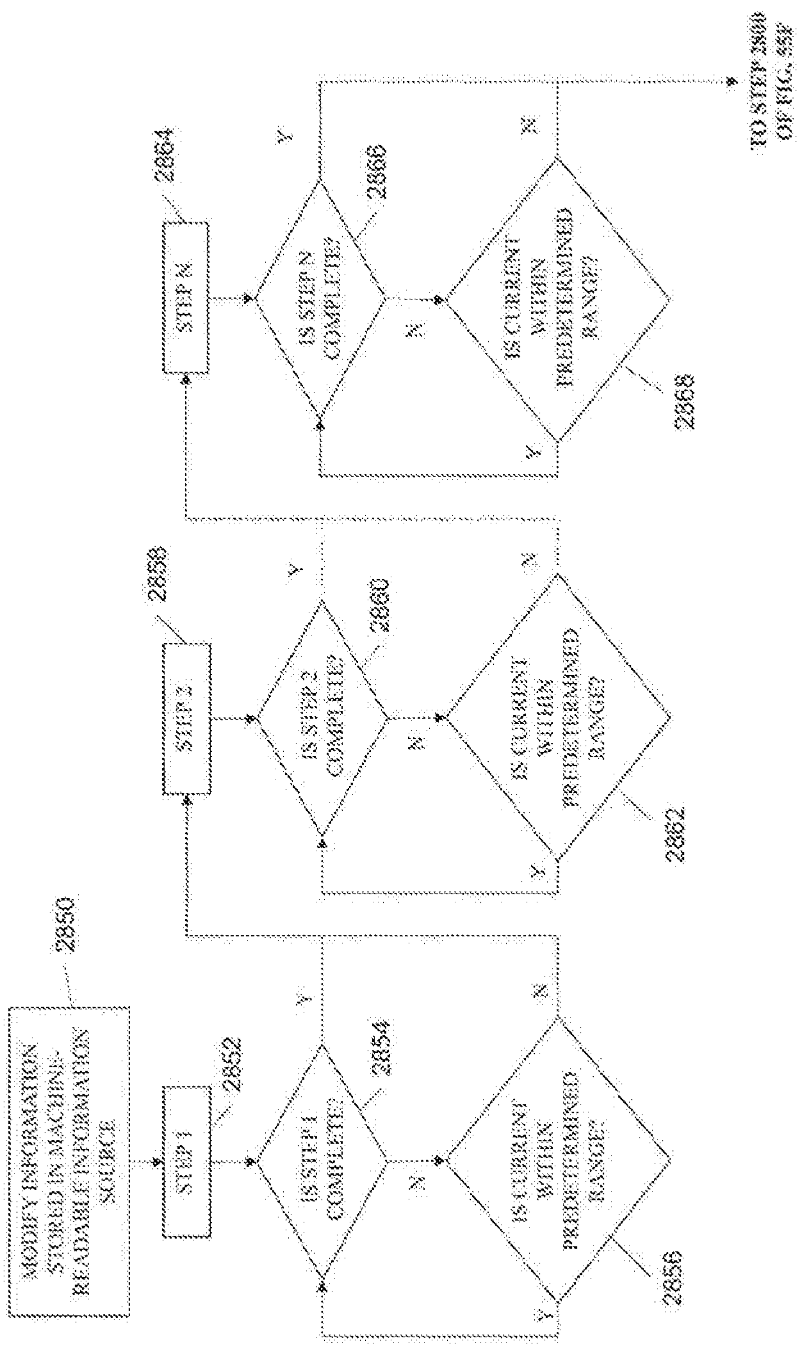

Reference is now made to FIG. 55H, which is a flowchart illustrating further sub-steps of fourth processing sub-step 2798 of FIG. 55F. As seen in first sub-step 2850, MMIDD 1000 preferably modifies the information stored in machine-readable information source 162. By way of example, in an embodiment wherein machine-readable information source 162 is an RFID tag, MMIDD 1000 may change byte 159 of said RFID tag from 255 to 254, thereby indicating for any future sessions that this SUPCA 100 has been processed.

As seen in second sub-step 2852. MMIDD 1000 then proceeds to carry out the first step of the process recipe stored in accordance with the process recipe stored at seventh step 2776 of FIG. 55D. While carrying out said first step of the process recipe, MMIDD 1000 continuously checks if said first step of the process recipe is complete, as seen at a third sub-step 2854. As long as said first step is not complete, MMIDD continuously checks the current of electric motor 1904, as seen at a fourth sub-step 2856.

If the measured current is not within a pre-determined range, MMIDD 1000 proceeds to the next step in the process recipe stored at seventh step 2776 of FIG. 55D, as seen at a fifth sub-step 2858. If, however, the measured current is within said pre-determined thresholds, processing of first step of the process recipe stored at seventh step 2776 of FIG. 55D continues until third sub-step 2854 determines that said first step of the process recipe is complete. At that point, MMIDD 1000 proceeds to the next step in the process recipe stored at seventh step 2776 of FIG. 55D, as seen at fifth sub-step 2858.

The process described above in sub-steps 2852, 2854, and 2856 is preferably repeated for all of the steps in the process recipe. Thus, during each step of the process recipe stored at seventh step 2776, which may include N steps, MMIDD 1000 checks whether the step is complete and whether measured current of electric motor 1904 is within a pre-determined range. Thus, in the illustrated example shown in FIG. 55H, in the second step of the process recipe stored at seventh step 2776, as seen at a fifth sub-step 2858, MMIDD 1000 checks whether that step is complete, as seen at a sixth sub-step 2860, and whether measured current of electric motor 1904 within a pre-determined range, as seen at a seventh sub-step 2862, and continues step by step through the process recipe stored at seventh step 2776, until the Nth step of the process recipe, as seen at an eighth sub-step 2864.

MMIDD 1000 checks whether the Nth step is complete as seen as a ninth sub-step 2866, and whether measured current of electric motor 1904 within a pre-determined range, as seen at a tenth sub-step 2868.

It is appreciated that, if during any of the steps of the process recipe, the measured current is not within a pre-determined range, MMIDD 1000 proceeds to terminate that step of the recipe process and proceed to the step. Thus, if, the measured current is not within a pre-determined range during step N of the recipe process, MMIDD 1000 determines that the processing is complete and proceeds to step 2800 of FIG. 55F. If, however, the measured current is within said pre-determined thresholds, processing of step N of the process recipe stored at seventh step 2776 of FIG. 55D continues MMIDD 1000 determines that said Nth step is complete, as seen at ninth sub-step 2866. At that point, MMIDD 1000 proceeds to proceeds to step 2800 of FIG. 55F.

It is understood that the various steps and sub-steps detailed hereinabove with reference to control operation of MMIDD 1000 are not necessarily performed in the order listed. Furthermore, depending on the particular configuration of the MMIDD and SUPCA employed, various ones of the steps and/or sub-steps may be obviated or may be replaced by alternative appropriate steps.

Figure 56A:
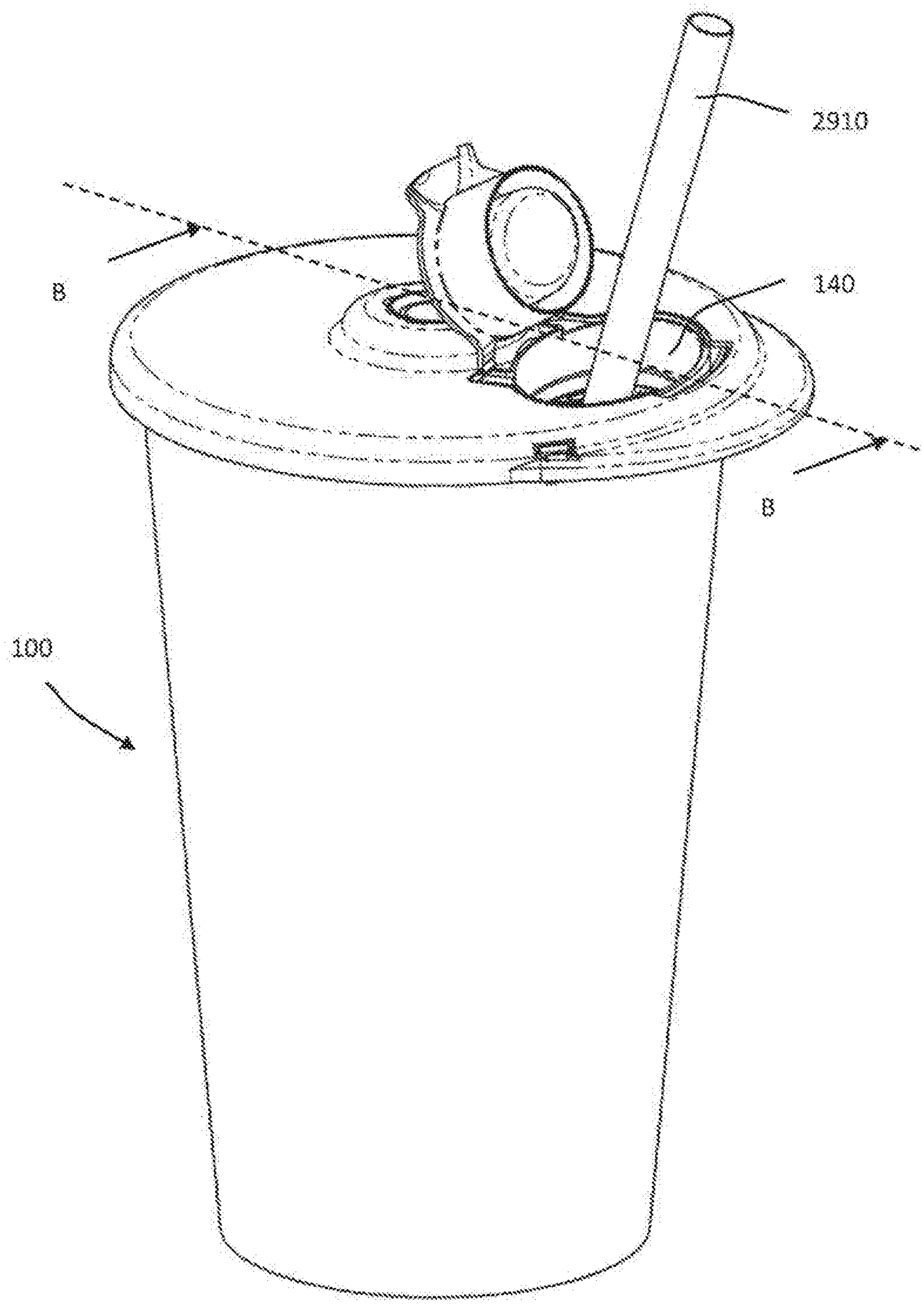
FIGS. 56A & 56B are simplified respective pictorial side view and sectional side view illustrations of a SUPCA, such as the SUPCA of FIG. 42A-42C or 43A-43C, having a straw inserted therein.
Figure 56B:
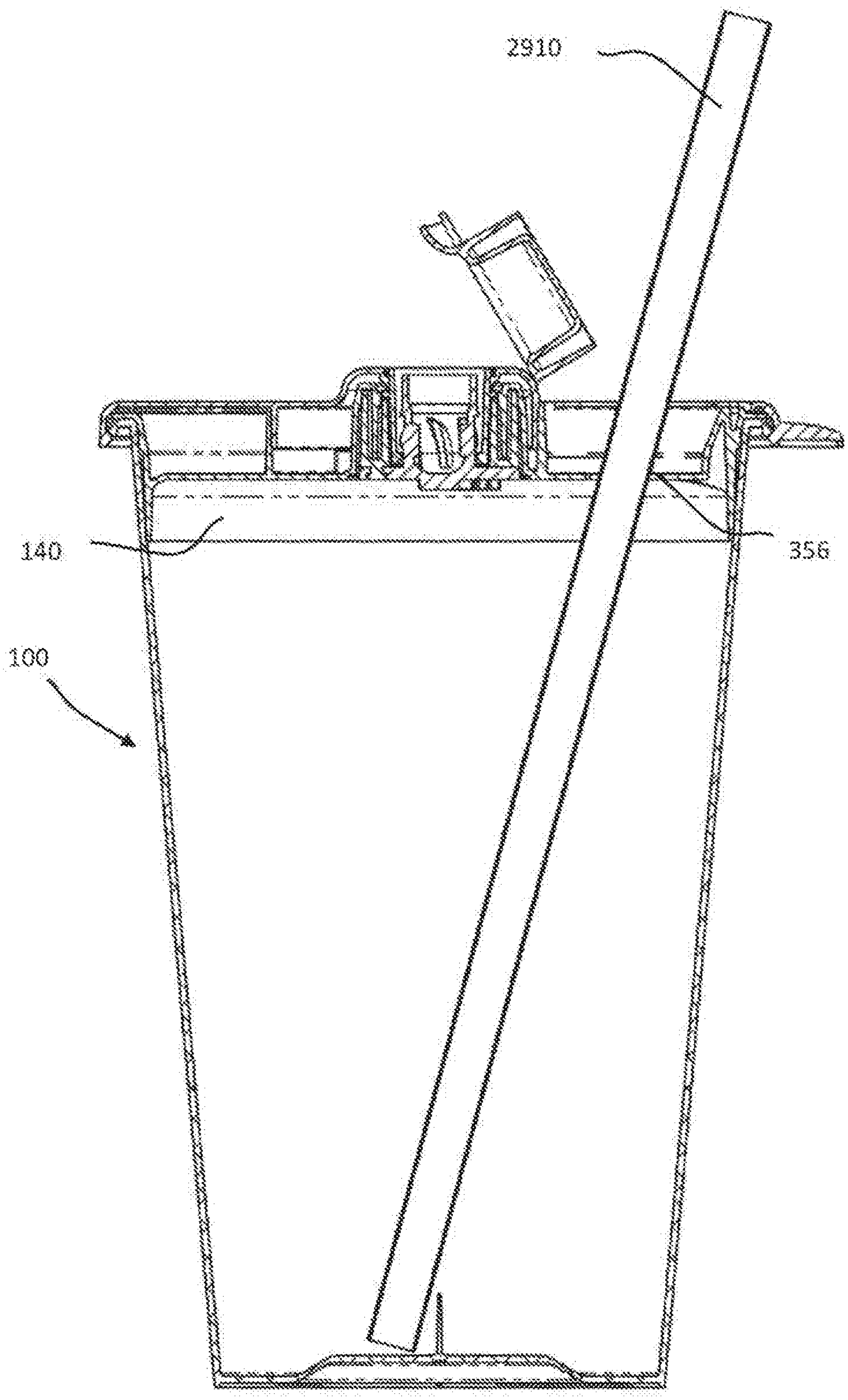

Reference is now made to FIGS. 56A & 56B, which are simplified respective pictorial side view and sectional side view illustrations of SUPCA 100, having a straw 2910 extending through straw aperture 356 of lid 140. Straw 2910 is preferably inserted by a user after contents of SUPCA 100 have been processed by MMIDD 1000 (FIGS. 44A-55H).

Figure 57A:
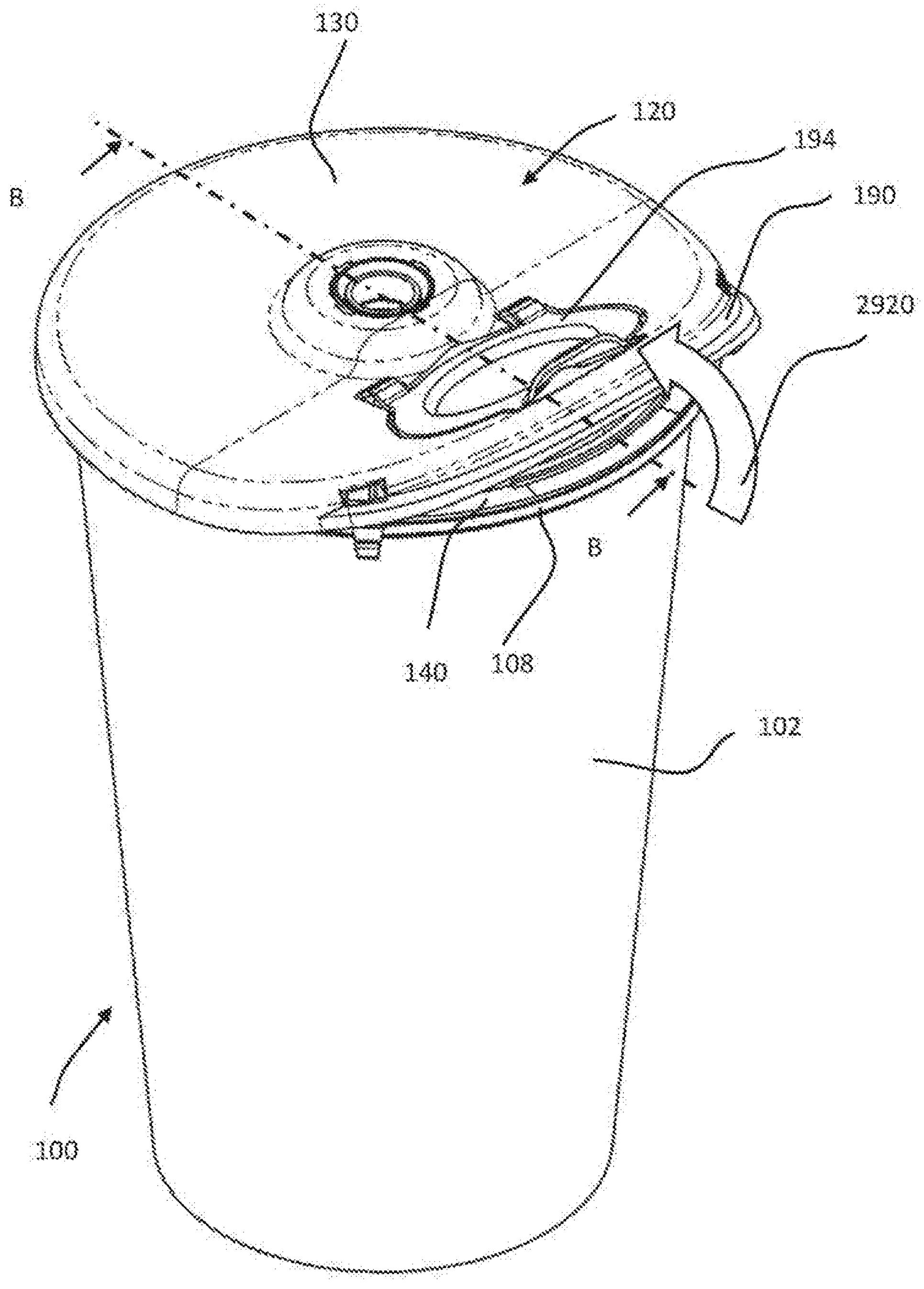
FIGS. 57A, 57B and 57C are simplified respective pictorial and first and second sectional side view illustrations showing successful removal of the SUCSERDREA of FIGS. 2A-6G from the remainder of a SUPCA, such as the SUPCA of FIG. 42A-42C or 43A-43C.
Figure 57B:
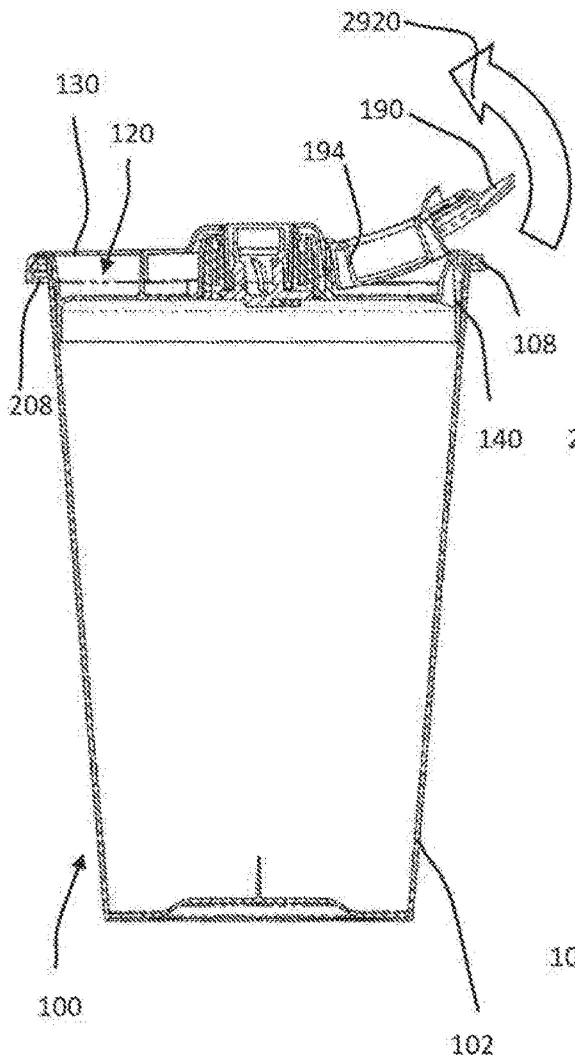
Figure 57C:
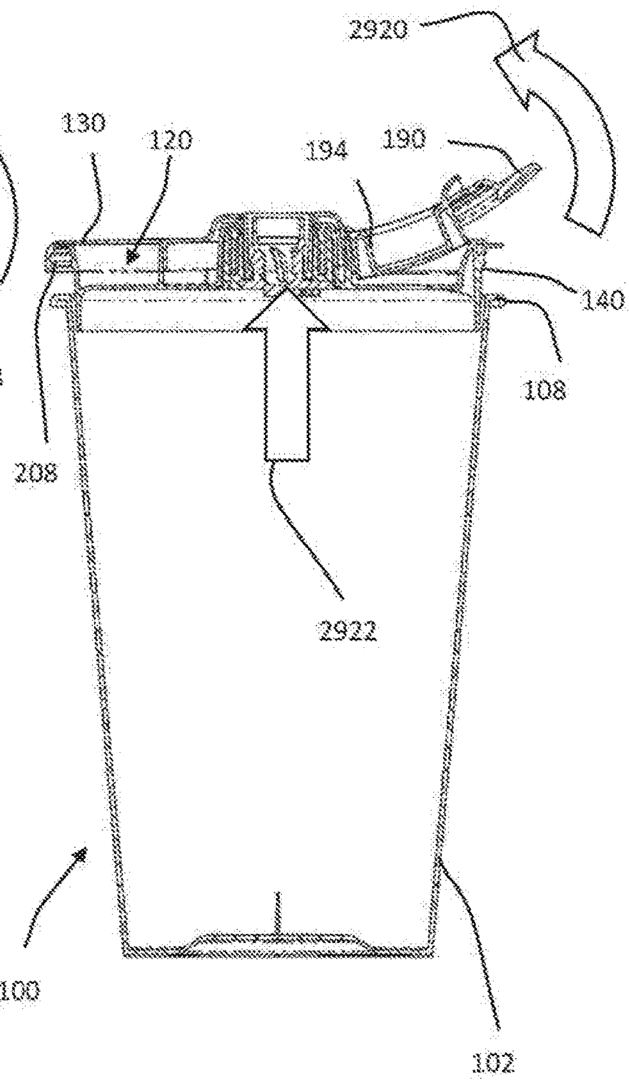

Reference is now made to FIGS. 57A, 57B and 57C, which are simplified respective pictorial and first and second sectional side view illustrations showing successful removal of SUCSERDREA 120 from the remainder of SUPCA 100, FIGS. 57B and 57C being taken along line B-B in FIG. 57A and showing two successive stages of removal. It is noted that the procedure described hereinbelow with reference to FIGS. 57A-57C can be performed either with or without lifting of access door 194 relative to lid 140.

FIG. 57A shows initial slight bending of front flap 190 of cover 130 in a direction indicated by an arrow 2920, produced by a manual peeling type action of a user. At this stage, rim 208 of cover 130 is disengaged from rim 108 of single-use container body 102 along a relatively small percentage of its azimuth.

FIG. 57B shows further bending of front flap 190 of cover 130 in a direction indicated by arrow 2920. It is noted that lid 140 remains fully sealingly seated in single-use container body 102. At this stage, rim 208 of cover 130 is disengaged from rim 108 of single-use container body 102 along a relatively large percentage of its azimuth.

FIG. 57C shows further bending of front flap 190 of cover 130 in a direction indicated by arrow 2920. At this stage rim

208 of cover 130 is disengaged from rim 108 of single-use container body 102 along most or all of its azimuth. It is noted that at this stage lid 140 is partially disengaged from single-use container body 102 having been displaced relative to single-use container body 102 in an upward direction 2922, h is further noted that at this stage. SUCSERDREA 120 can readily be fully removed from the remainder of SUPCA 100.

Figure 58A:
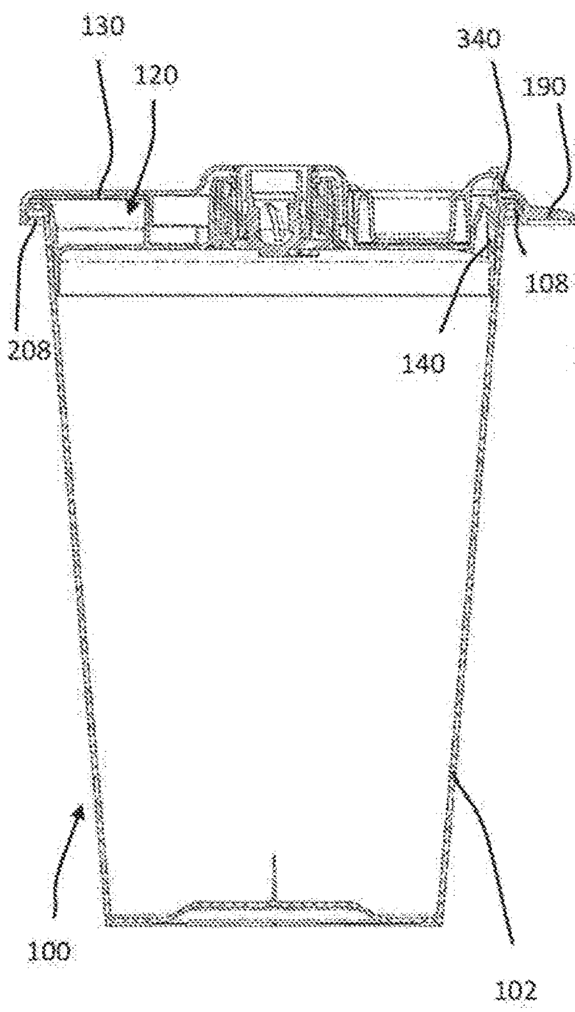
FIGS. 58A and 58B are simplified first and second sectional view illustrations showing an unsuccessful attempt at removal of the SUCSERDREA from the remainder of a SUPCA, such as the SUPCA of FIG. 42A-42C or 43A-43C, when the user-removable multi-function restricting portion was not removed, FIGS. 58A and 58B being taken along line A-A in FIG. 41A, and showing two successive stages of unsuccessful attempted removal.
Figure 58B:
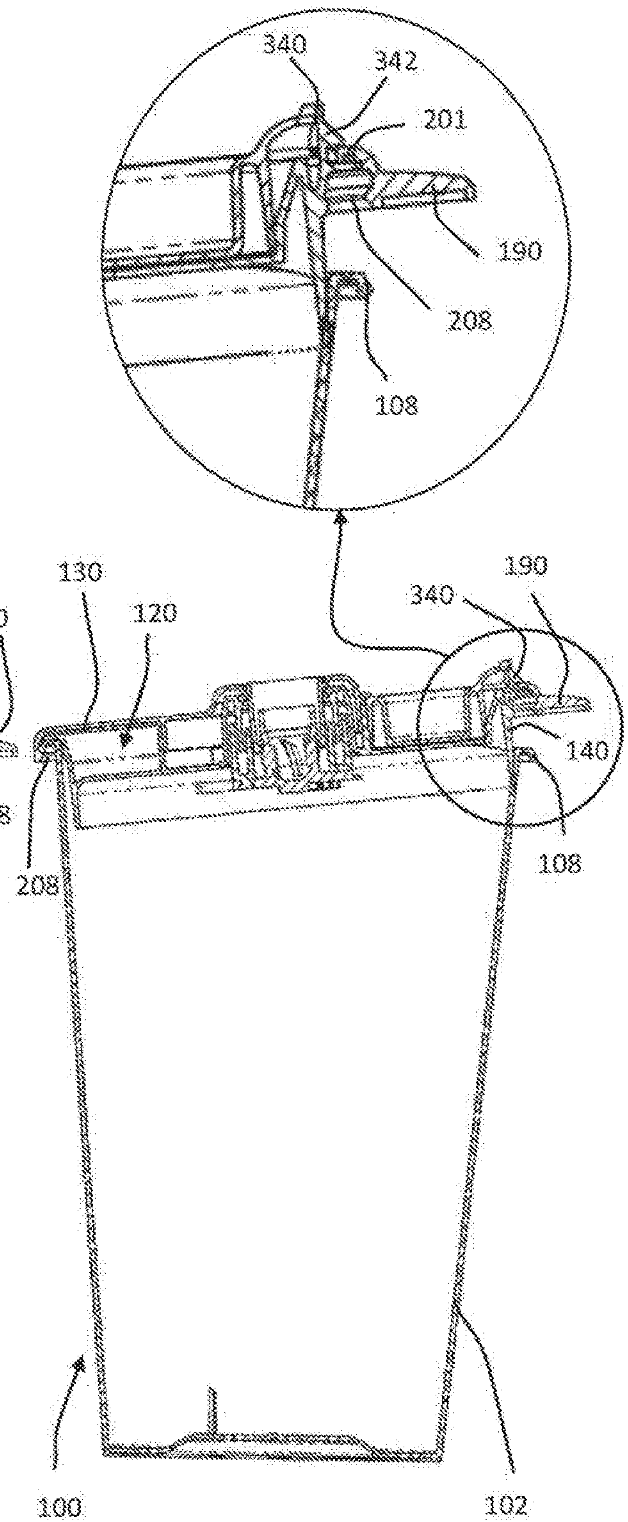

Reference is now made to FIGS. 58A and 58B, which are simplified first and second sectional view illustrations, taken along line A-A in FIG. 41A, showing an unsuccessful attempt at removal of SUCSERDREA 120 from the remainder of SUPCA 100 when user-removable multi-function restricting portion 340 had not previously been removed.

It is appreciated that as long as user-removable multi-function restricting portion 340 is connected to shallow elongate protrusion 330 of lid 140, SUCSERDREA 120 cannot normally assume the operative orientation of FIG. 58B. This is because teeth 342 of user-removable multi-function restricting portion 340 rest on top of edge 201 of surface 172 of cover 130 and thus prevent user lifting of front flap 190. As a result, all of SUCSERDREA 120 is a relatively rigid assembly and cannot be readily pivoted out of sealing engagement with single-use container body 102. As such, rim 208 of SUCSERDREA 120 remains in snap fit engagement with rim 108 of single-use container body 102. It is thus appreciated that the operative orientation shown in FIG. 58B cannot normally be realized.

Figure 59A:
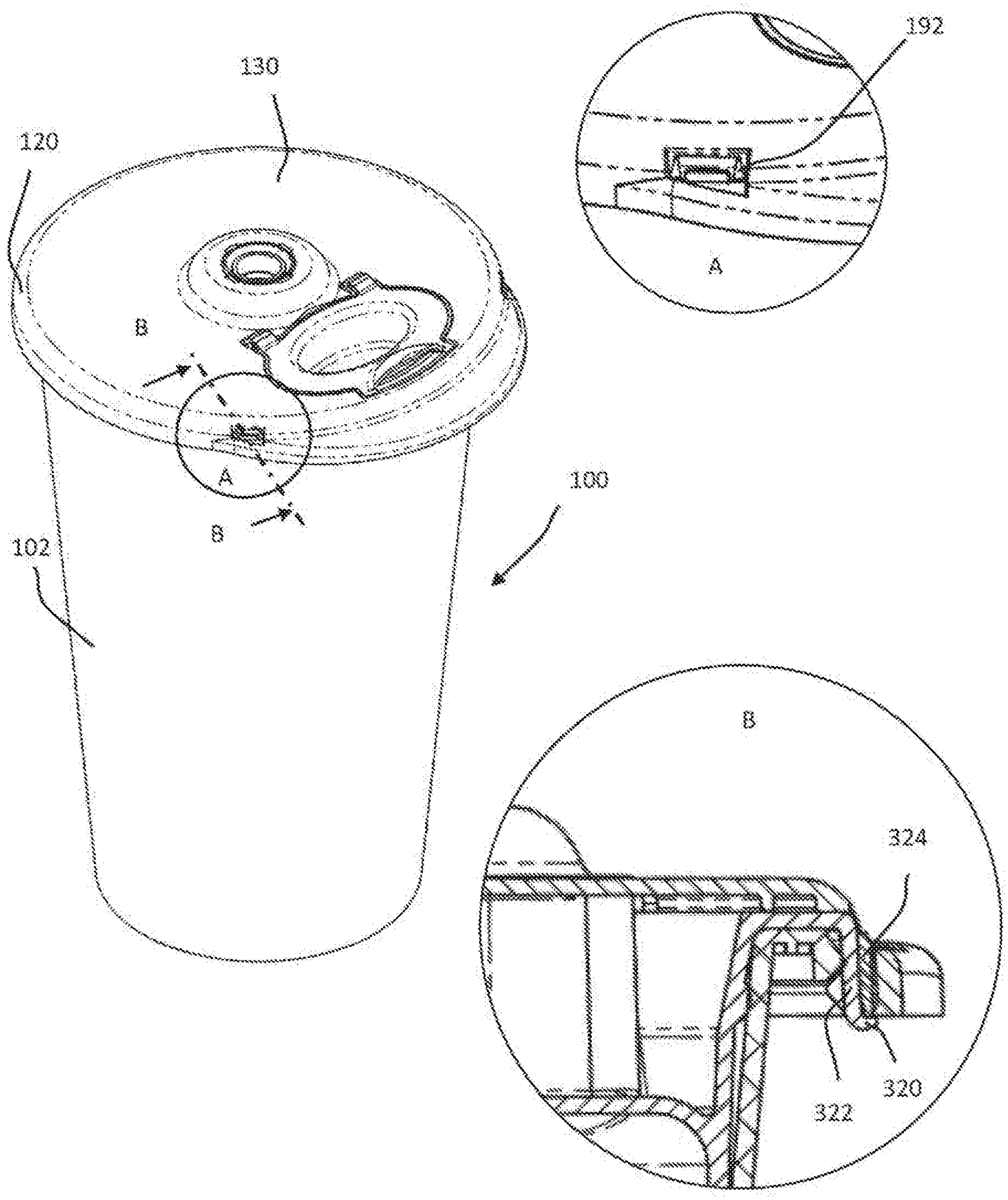
FIGS. 59A, 59B and 59C are simplified pictorial illustrations showing operation of tamper evidencing and re-use preventing tabs, forming part of the SUCSERDREA of FIGS. 2A-6G.
Figure 59B:
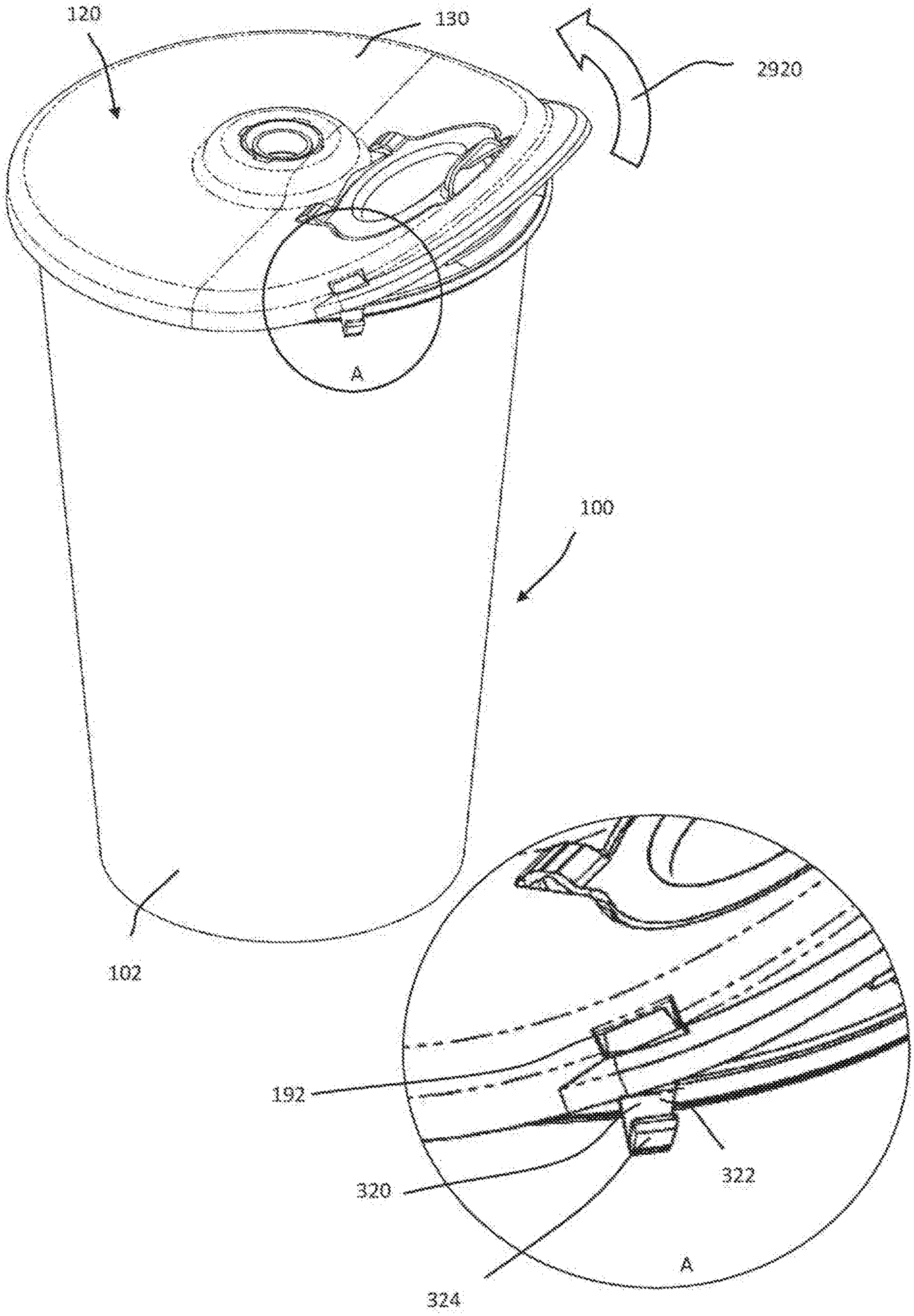
Figure 59C:
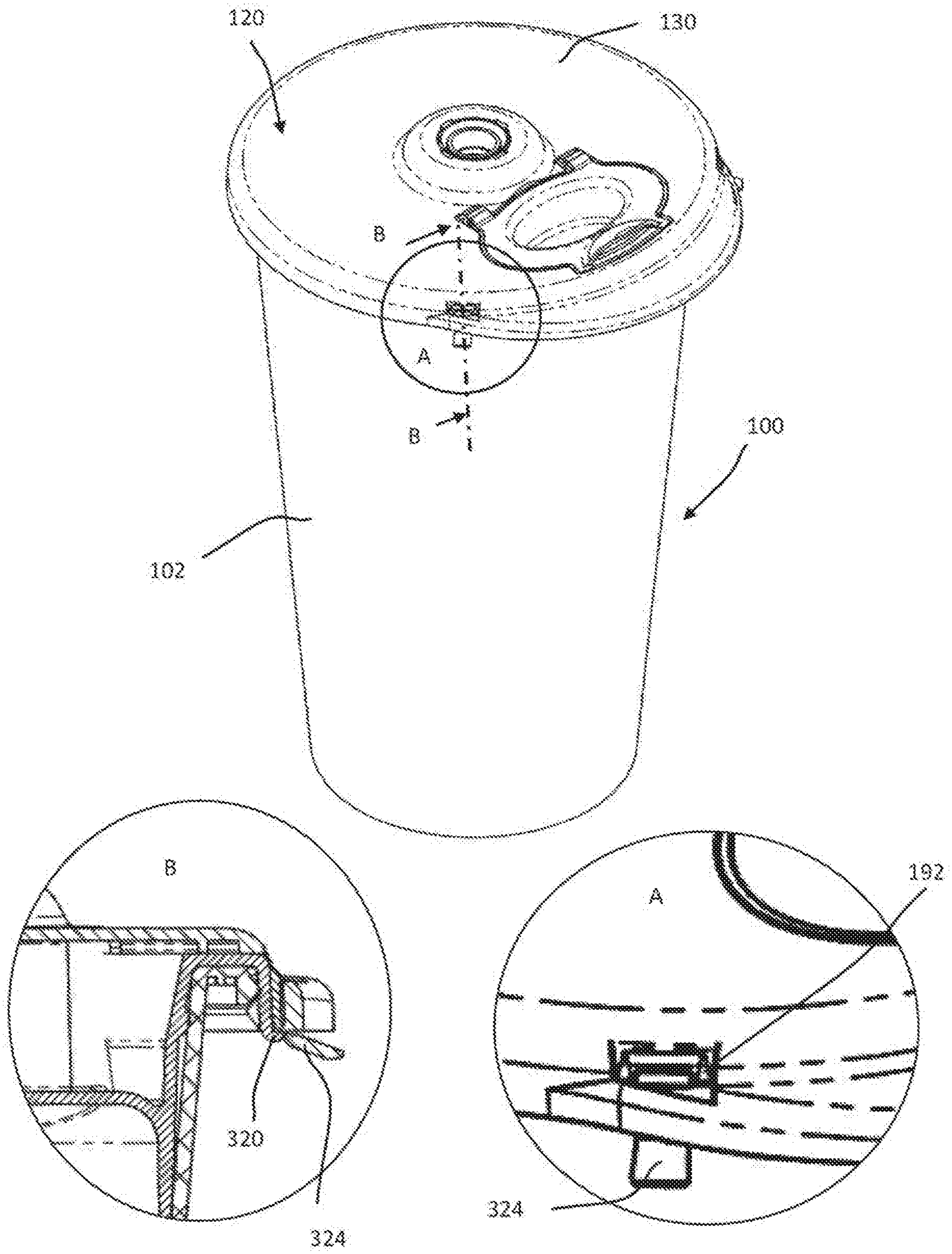

Reference is now made to FIGS. 59A, 59B and 59C, which are simplified pictorial illustrations showing operation of tamper evidencing and re-use preventing tabs 320, forming part of SUCSERDREA 120 of FIGS. 2A-6G.

FIG. 59A, which shows SUPCA 100 in the same operative orientation shown in FIG. 41B, illustrates that prior to removal of SUCSERDREA 120 from single-use container body 102, tamper evidencing and re-use preventing tabs 320 are in engagement with apertures 192 of cover 130, as seen particularly clearly in enlargement A. Thus, as seen particularly clearly in enlargement B, taken along line B-B in FIG. 59A, downwardly-extending portion 322 and radially outwardly-extending portion 324 of tamper evidencing and r-use preventing tabs 320 are in their mutually parallel orientation, as shown in FIG. 5A.

FIG. 59B, which shows the same operative orientation shown in FIG. 57A, illustrates bending of cover 130 in a direction indicated by arrow 2920 such that apertures 192 disengage from tamper evidencing and re-use preventing tabs 320, thus allowing portion 324 is allowed to assume an extended orientation relative to portion 322, as seen particularly in enlargement A.

FIG. 59C shows reattachment of cover 130 and possibly also all of SUCSERDREA 120 to single-use container body 102 following the stage shown in FIG. 59B. As seen particularly clearly in enlargements A and B, where enlargement B is taken along line B-B in FIG. 59C, radially outwardly-extending portions 324 of tamper evidencing and re-use preventing tabs 320 are no longer seated in apertures 192 and cannot readily be reinserted thereto.

Figure 60:
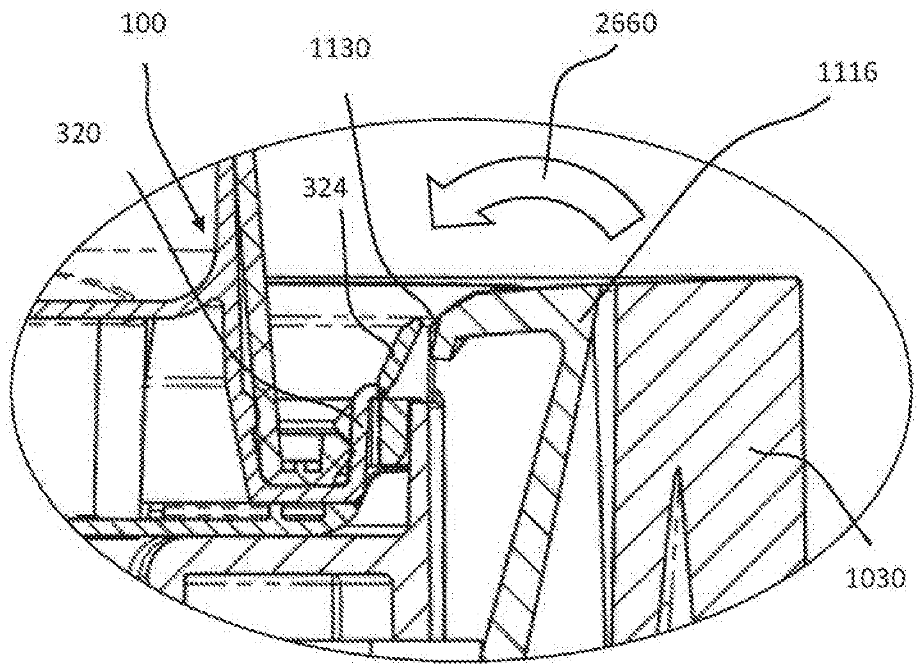
FIG. 60 is a simplified sectional illustration showing how clamping of a SUPCA, such as the SUPCA of FIGS. 58A-58C, is prevented by a tamper evidencing and m-use preventing tab in a case where previously the SUCSERDREA of FIGS. 2A-6G has been at least partially removed from the remainder of said SUPCA.

Reference is now made to FIG. 60, which is a simplified sectional illustration showing how clamping of SUPCA 100 to SUPCASCA 1030 of MMIDD 1000 is normally prevented by tamper evidencing and re-use preventing tab 320 in a case where SUCSERDREA 120 previously has been at least partially removed from the remainder of SUPCA 100. FIG. 60 is taken along section line E-E in FIG. 40B and corresponds generally to FIG. 46A.

Figure 46C:
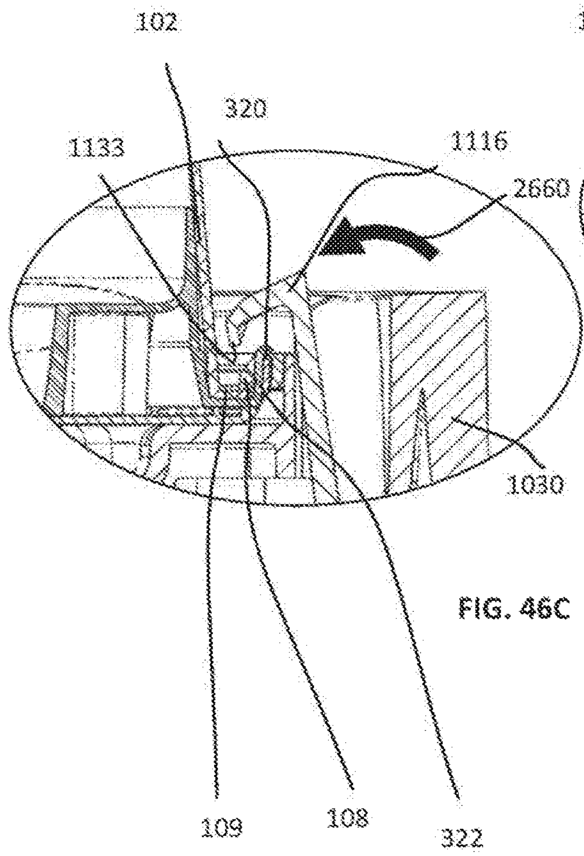
Figure 46D:
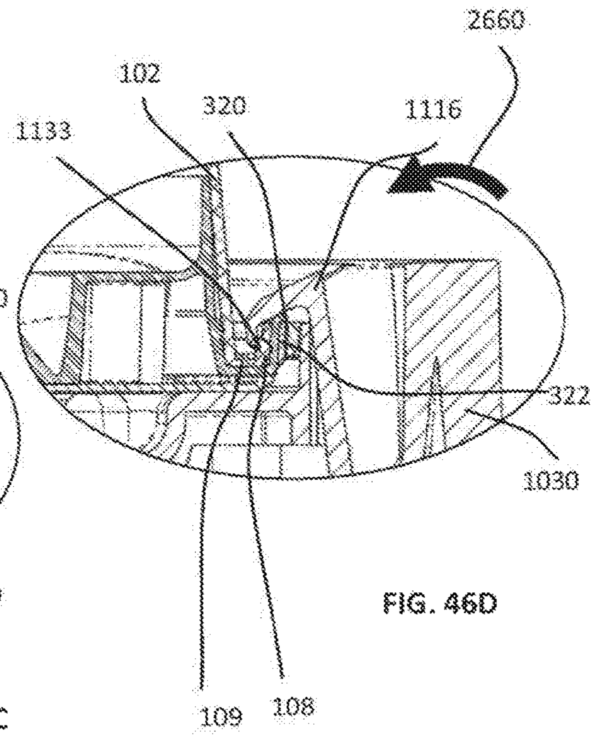

As seen in FIG. 60, radially outwardly-extending portion 324 of tab 320 impedes clamping portion 1130 of clamp element 1116 from rotating in a direction indicated by arrow 2660, thereby preventing clamping engagement edge 1134 of clamp element 1116 from reaching its operative orientations shown in FIGS. 46C and 46D, described hereinabove. This normally prevents reuse of SUPCA 100.

Figure 61A:
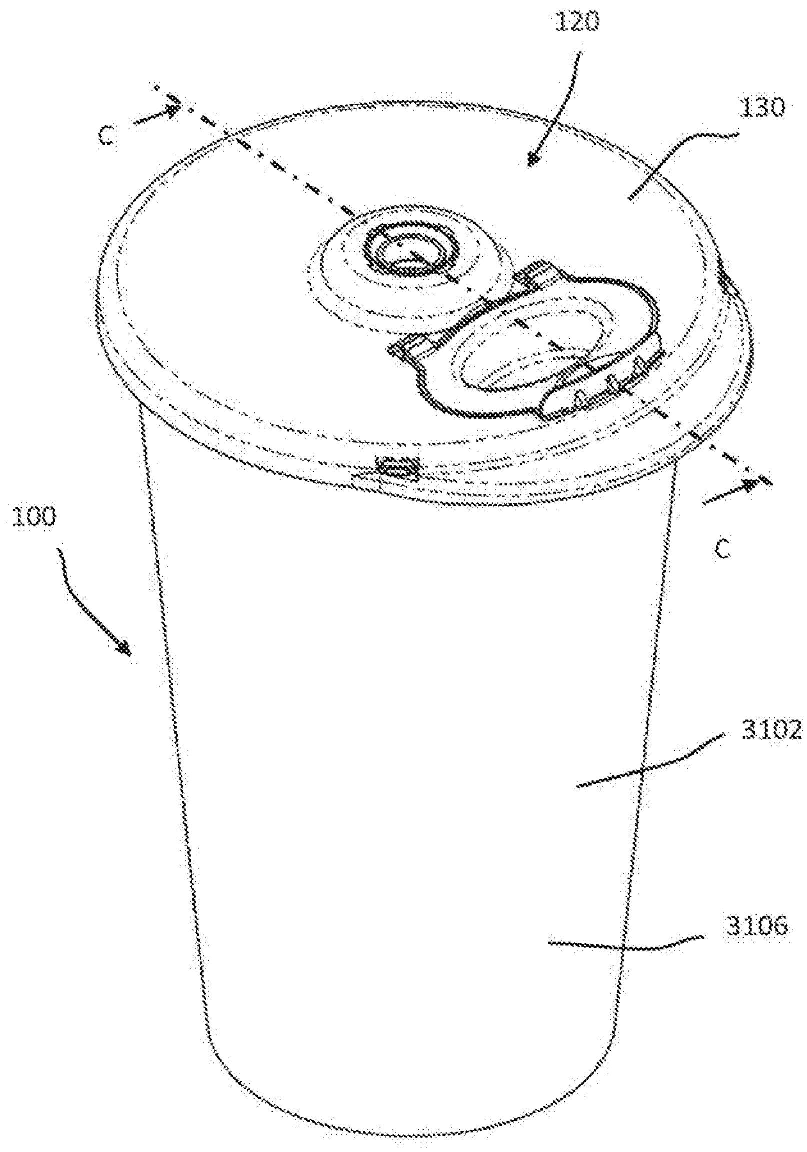
FIGS. 61A, 61B and 61C are simplified respective pictorial, partially exploded and sectional illustrations of an alternate embodiment of the SUPCA of FIGS. 1A-60, having a paper single-use container body, FIG. 61C being taken along line C-C in FIG. 61A.
Figure 61B:
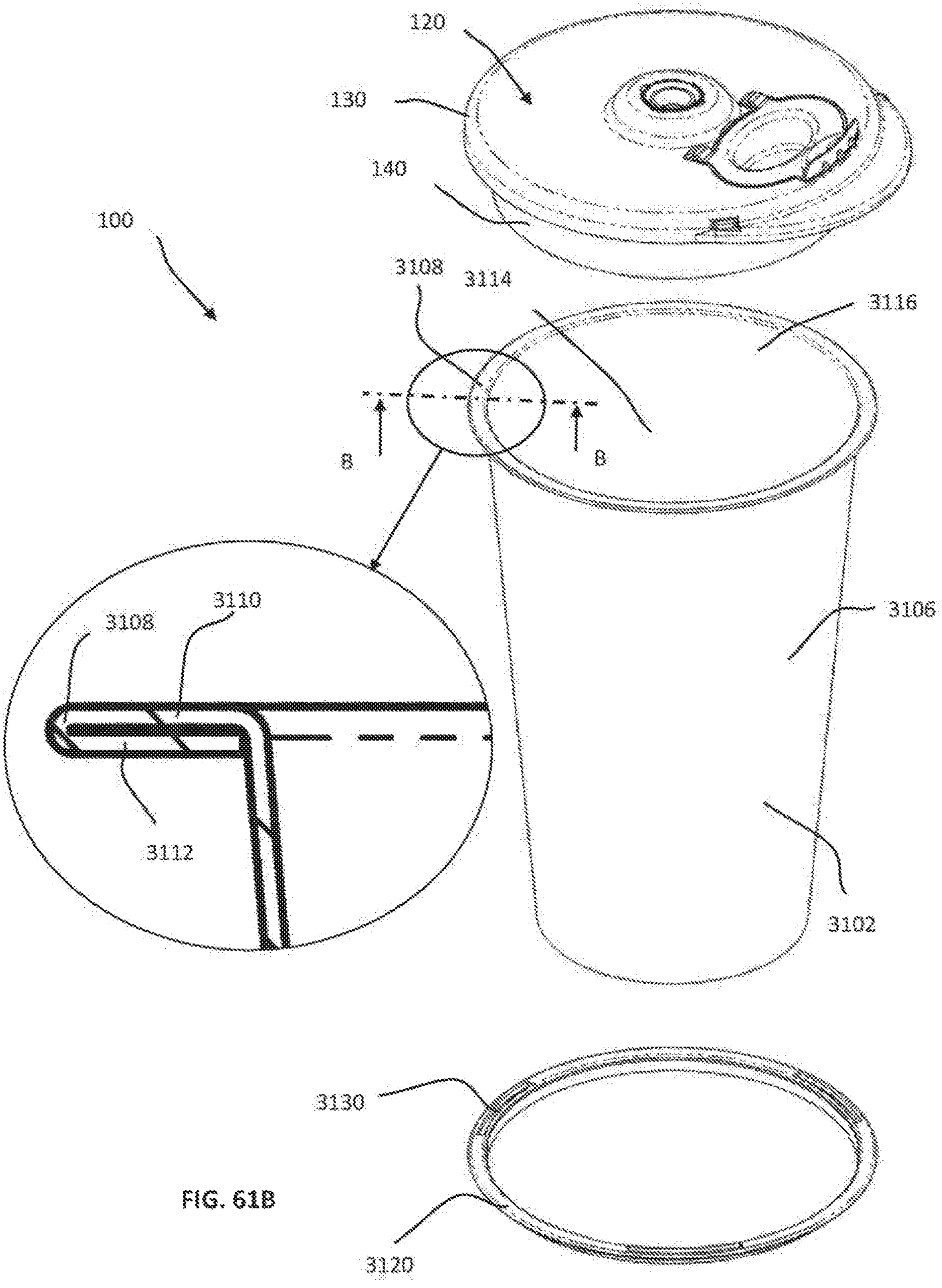
Figure 61C:
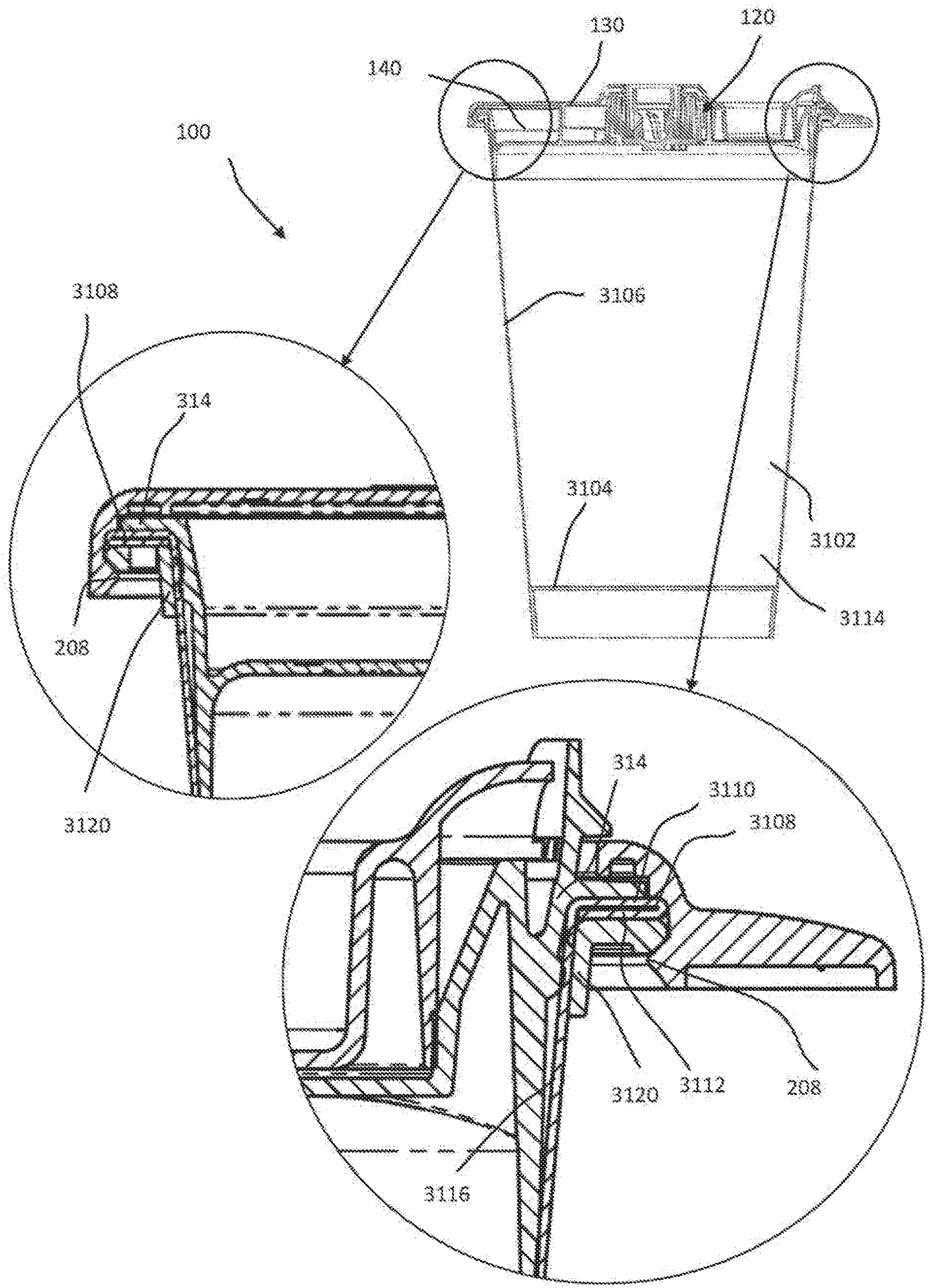

Reference is now made to FIGS. 61A, 61B and 61C, which are simplified respective pictorial, partially exploded and sectional illustrations of an alternate embodiment of SUPCA 100 of FIGS. 1A-60, having a paper single-use container body 3012 instead of a plastic single-use container body 102, as described in FIGS. 1A-1H, FIG. 61C being taken along line C-C in FIG. 61A.

The embodiment of SUPCA 100 shown in FIGS. 61A, 61B and 61C includes a paper single-use container body 3102, formed having a bottom wall 3104, a truncated conical side wall 3106 and a flat circumferential rim 3108. Rim 3108 preferably has a flat top surface 3110 and a flat bottom surface 3112, as seen particularly in a sectional enlargement in FIG. 61B, taken along line B-B in FIG. 61B. Paper single-use container body 3102 further includes an inner surface 3114, an upper circumferential portion 3116 of which is sealingly engaged by generally circumferential cylindrical outer edge 310 of lid 140 of SUCSERDREA 120.

In accordance with this embodiment of the present invention, a rim support ring 3120 is located in touching engagement with flat bottom surface 3112 and is retained therein by snap fit engagement thereof by rim 208 of cover 130 of SUCSERDREA 120, described hereinabove with reference to FIGS. 2A-6G. Details of the snap fit engagement are shown in the sectional enlargements of FIG. 61C. As seen in FIG. 61C, flat circumferential rim 3108 of paper single-use container body 3102 is retained between ring 3120 and flange 314 of lid 140 of SUCSERDREA 120.

It is noted that ring 3120 is formed with three elongate mutually azimuthally distributed apertures 3130, each of which accommodates one of clamp elements 1116, 1118 and 1120 of MMIDD 1000.

It is appreciated that the structure of paper single-use container body 3102 and ring 3120 enable SUCSERDREA 120 of FIGS. 3A-60 to be used interchangeably with plastic single-use container bodies 102 or paper single-use container bodies 3102 equipped with rings 3120. It is further appreciated that a SUPCA 100 including paper single-use container body 3102, ring 3120 and SUCSERDREA 120 can be processed by MMIDD 1000 as described hereinabove with reference to FIGS. 44A-55H.

It will be appreciated by persons skilled in the art that the present invention is not limited to what has been particularly shown and described hereinabove. The scope of the present invention includes both combinations and subcombinations of various features described hereinabove as well as modifications thereof, all of which are not in the prior art.

The invention claimed is:

1. A method of processing contents of a container, the method including:

providing a container including:

a cup body; and a cup closure assembly configured for removable operative engagement with the cup body, the cup closure assembly including:

a hinged spout cover;

filling the container with contents to be processed by a container contents processor;

providing a container contents processor including a container support and clamping assembly including;

a container support;
a cam element; and
a plurality of clamp elements;
placing the container in an upside-down orientation on said container support of the container contents processor;
clamping the container in the upside-down orientation onto the container support, said clamping comprising rotating said cam element to position said plurality of clamp elements in a clamping orientation;
processing the contents to be processed by the container contents processor;
disengaging the container from the container contents processor following the processing; and
unclamping the container from the container support, said unclamping comprising rotating said cam element to position said plurality of clamp elements in a non-clamping orientation.

2. A method according to claim 1 and also comprising:
returning the container to an upright orientation; and
removing the contents of said container from said container.

3. A method according to claim 2 and also comprising removing said cup closure assembly from said cup body.

4. A method according to claim 3 and also comprising reengagement of said cup closure assembly with said cup body following said removing of said cup closure assembly from said cup body.

5. A method according to claim 1 and wherein:
said cup closure assembly also comprises a user-removable multi-function restricting portion integrally formed with said cup closure assembly and detachable therefrom,
said user-removable multi-function restricting portion being operative, when integrally attached to said cup closure assembly, to prevent normal user opening of said hinged spout cover, and
said user-removable multi-function restricting portion being operative, when integrally attached to said cup closure assembly, to prevent normal user disengagement of said cup closure assembly from said cup body; and
said method also comprises detaching said user-removable multi-function restricting portion from said cup closure assembly prior to said filling the container.

6. A method of processing contents of a container, the method including:
providing a container including:
a cup body; and
a cup closure assembly configured for removable operative engagement with the cup body, said cup closure assembly including:
a hinged spout cover;
an interior portion arranged to define a circumferential seal with an inner circumferential surface of said cup body; and
an outer portion arranged for engagement with said interior portion and bendable disengagement therefrom;
filling the container with contents to be processed by a container contents processor;
placing the container in an upside-down orientation on a container support of the container contents processor;
clamping the container in the upside-down orientation onto the container support;
processing the contents to be processed by the container contents processor;
disengaging the container from the container contents processor following the processing;
unclamping the container from the container support;
returning the container to an upright orientation;
removing said cup closure assembly from said cup body; and
removing the contents of said container from said container,
and wherein normally, during said removing said cup closure assembly from said cup body, said interior portion and said outer portions are joined to each other.

* * * * *